INVENTOR
Arnold Lesti

April 22, 1969
A. LESTI
3,440,617
SIGNAL RESPONSIVE SYSTEMS

Original Filed Feb. 6, 1961

INVENTOR
Arnold Lesti

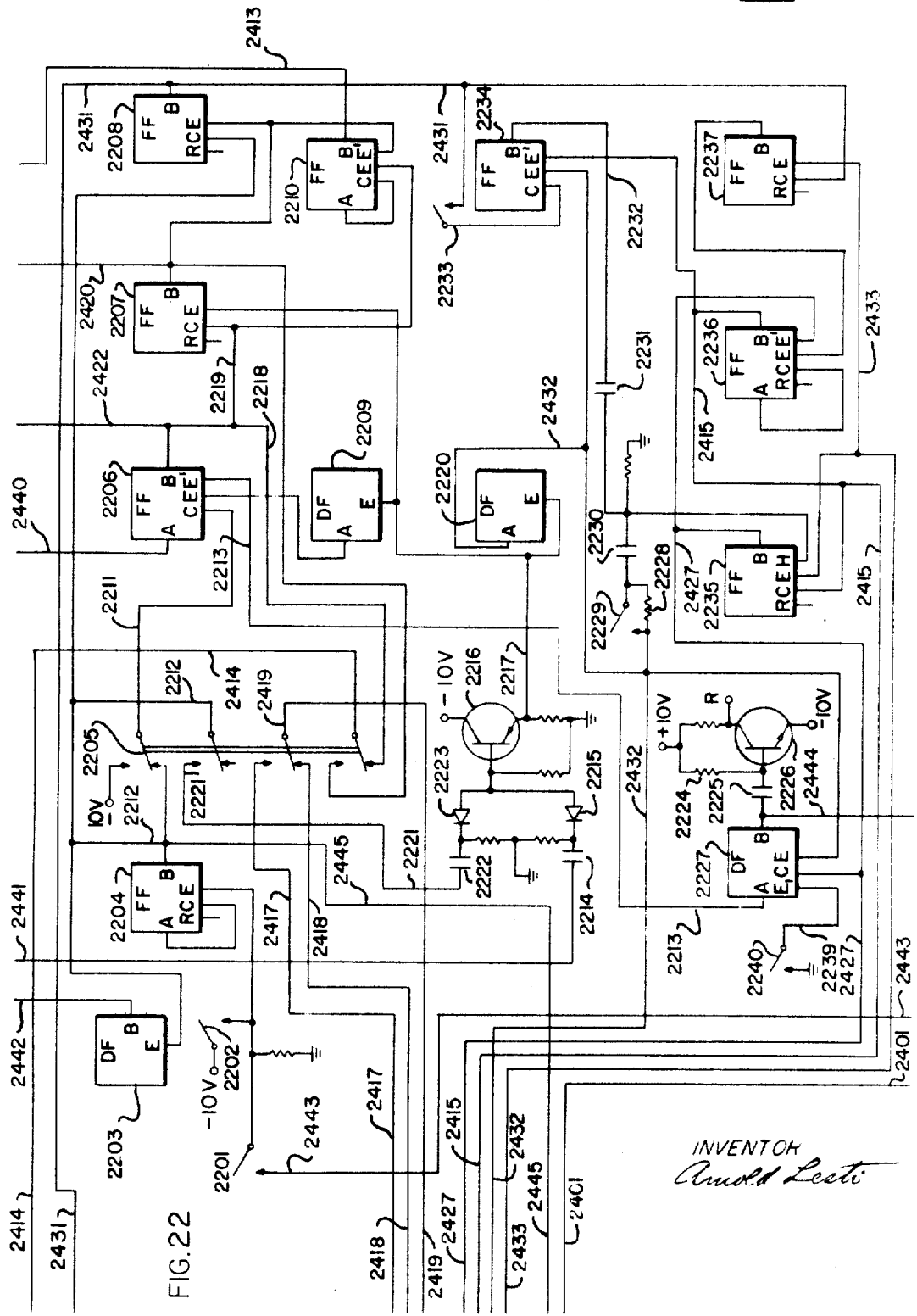

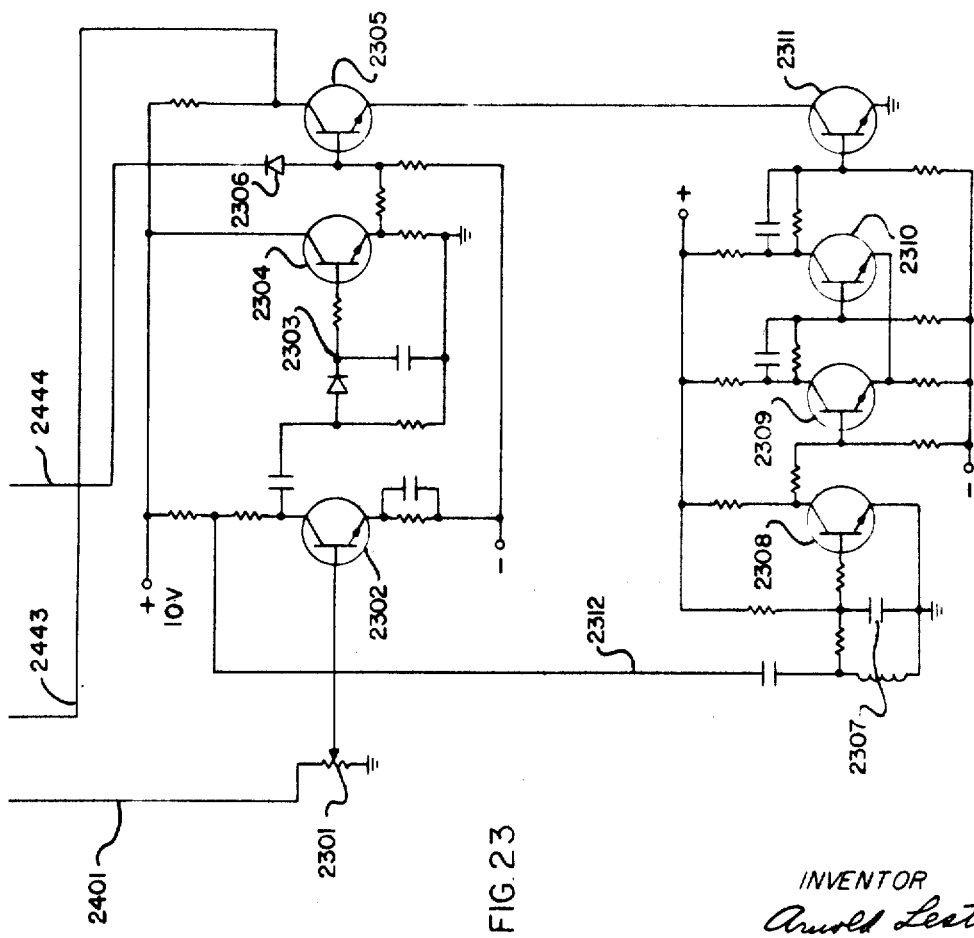

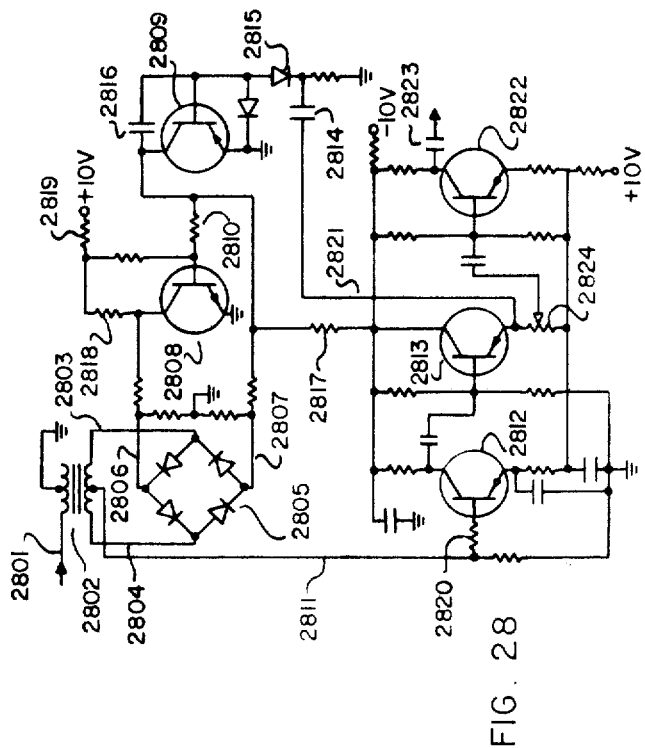
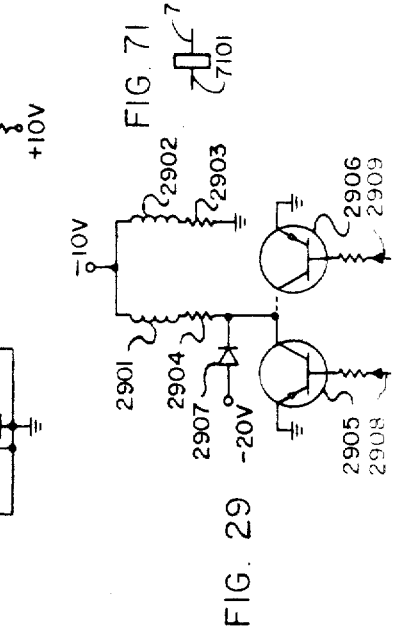
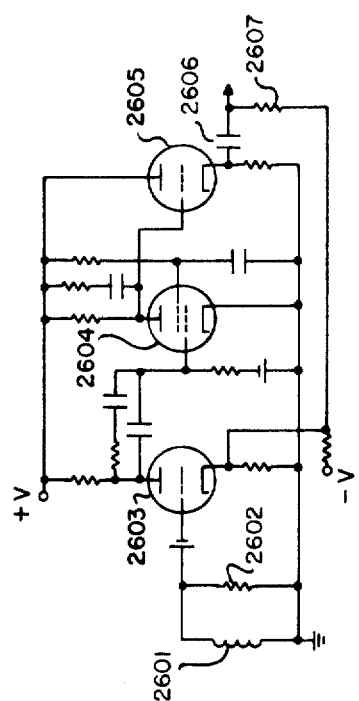
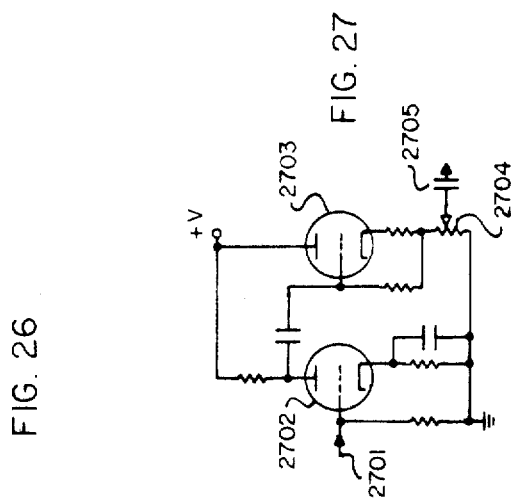
FIG. 28
FIG. 29
FIG. 71
FIG. 26
FIG. 27
INVENTOR
Arnold Lesti

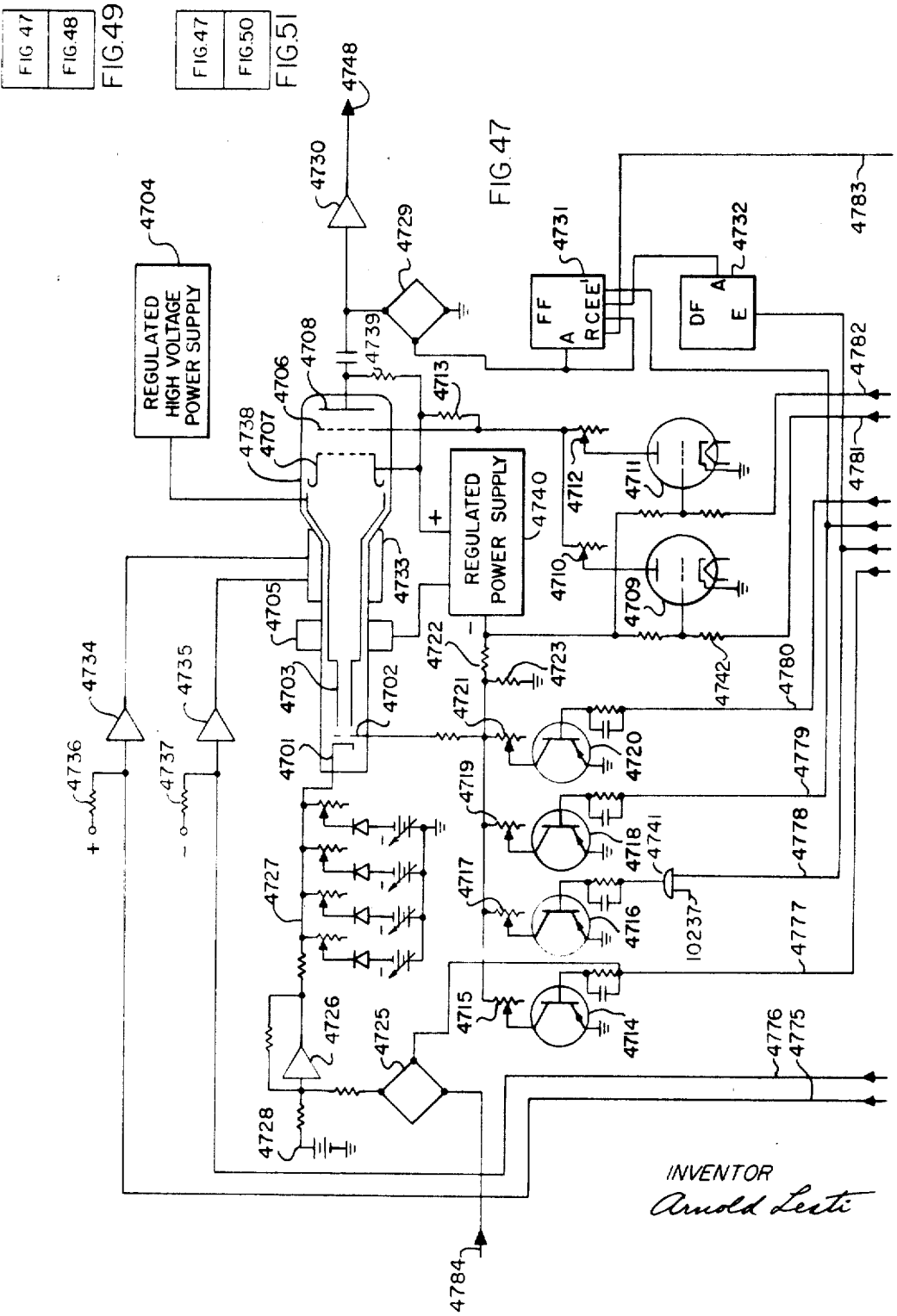

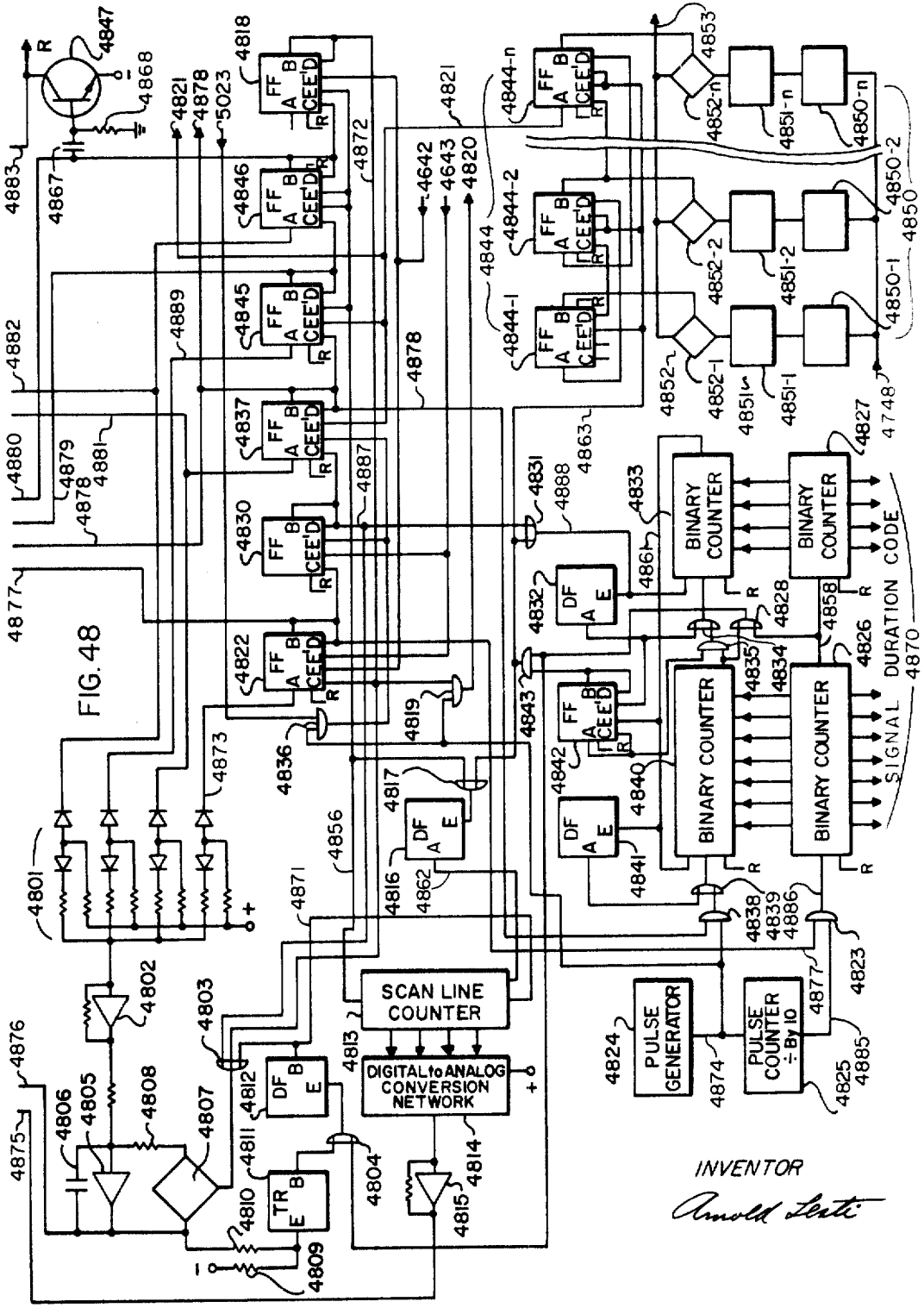

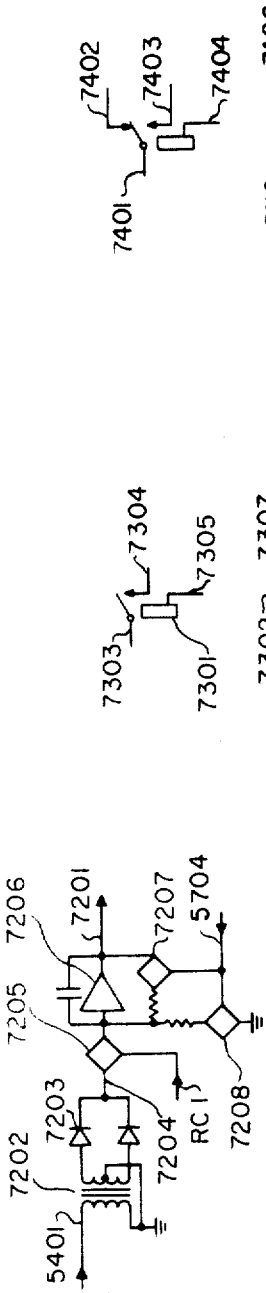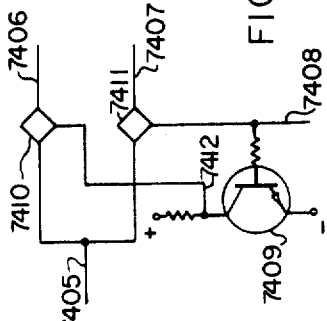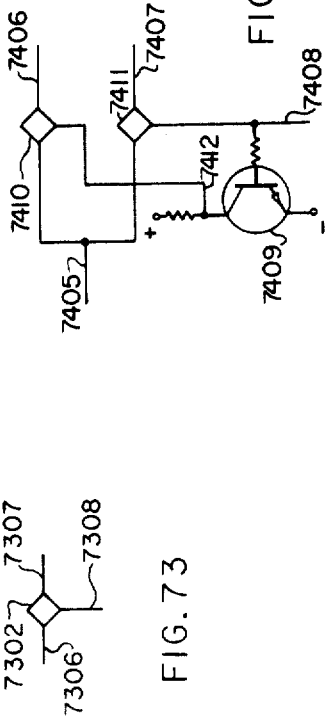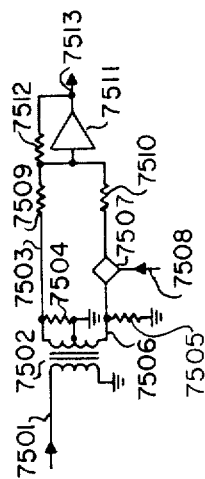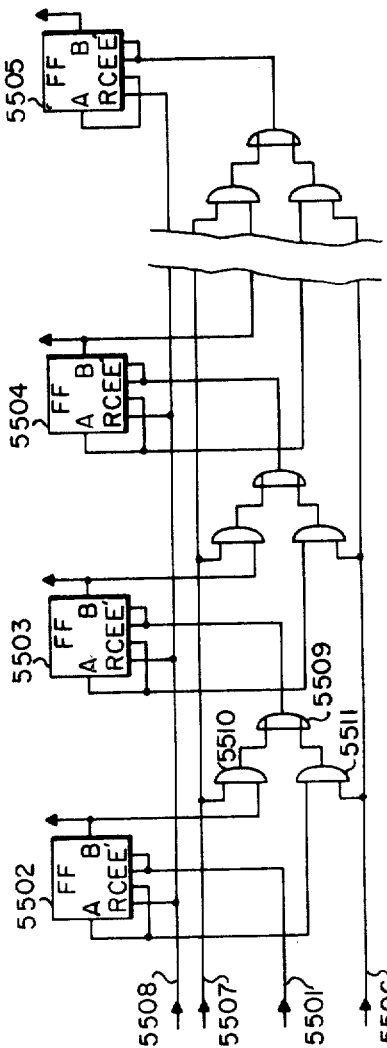

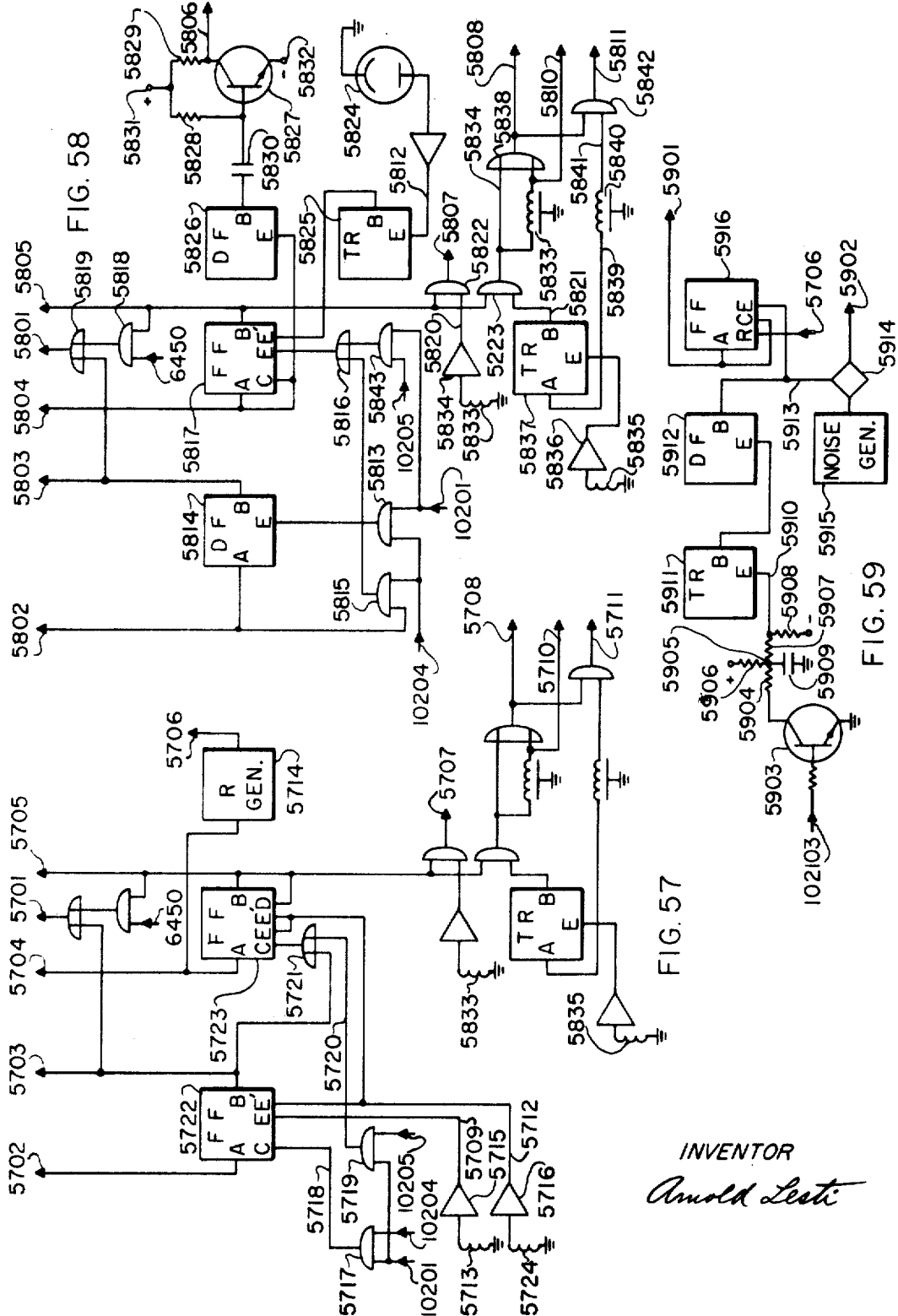

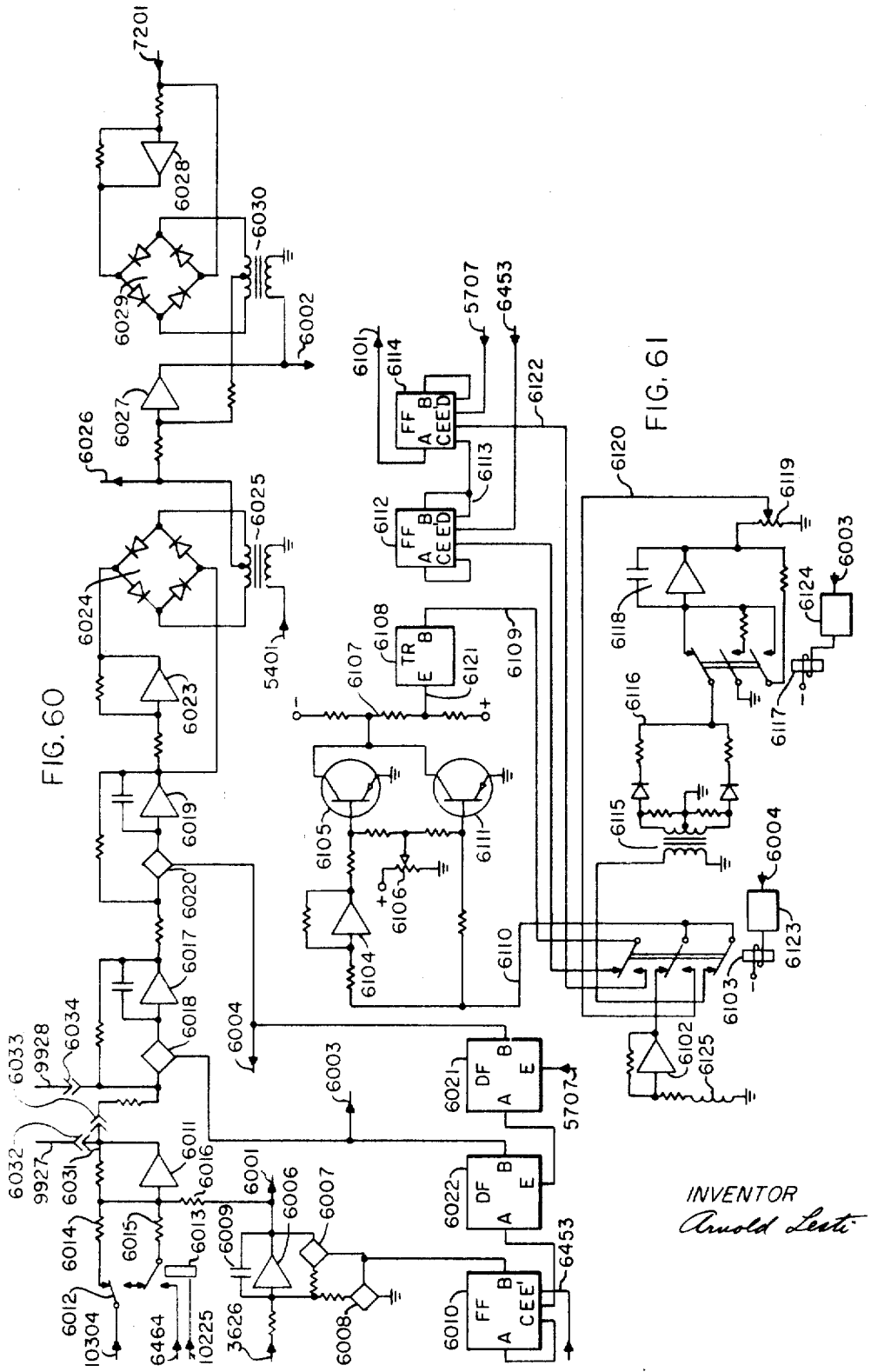

INVENTOR
Arnold Lesti

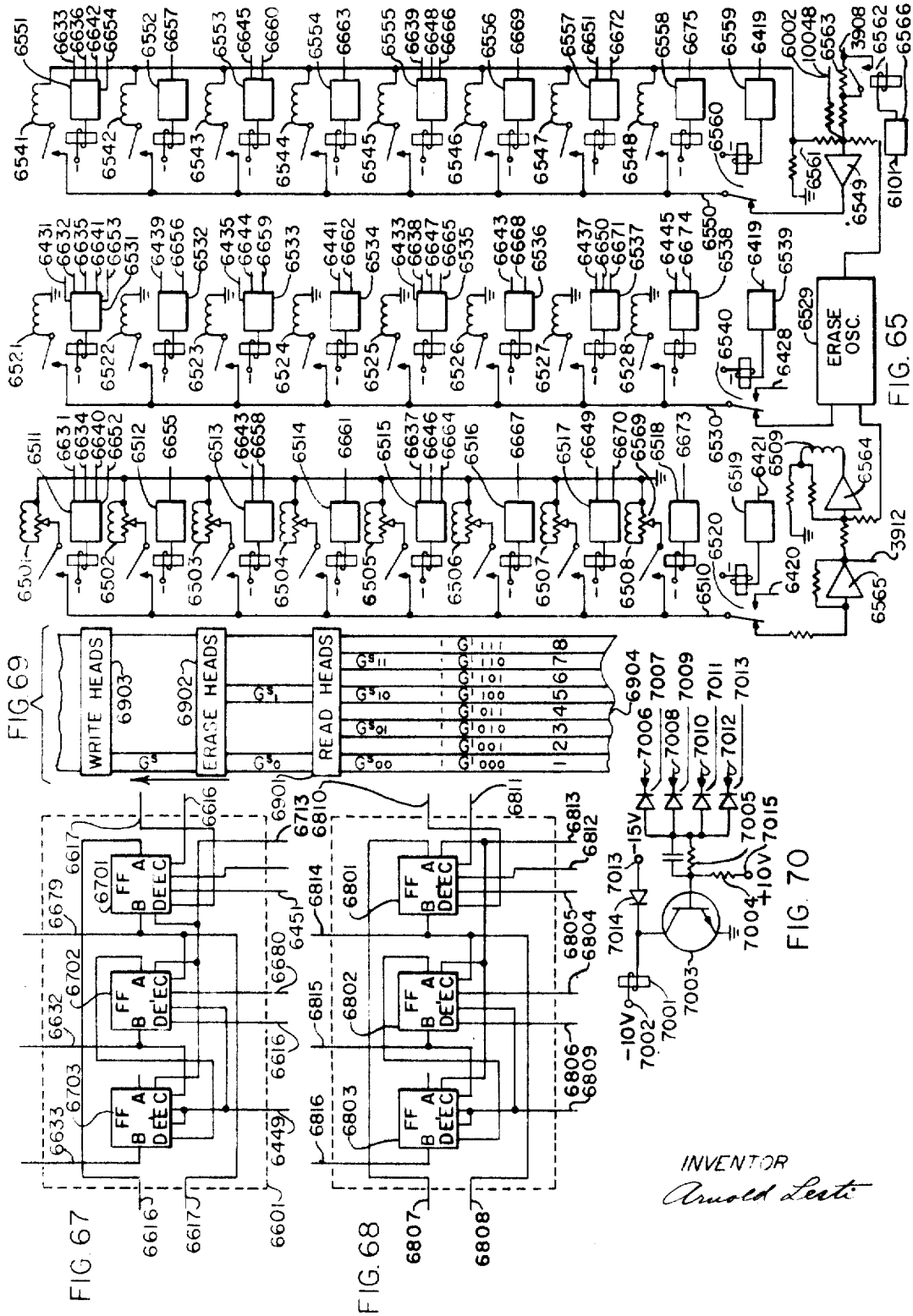

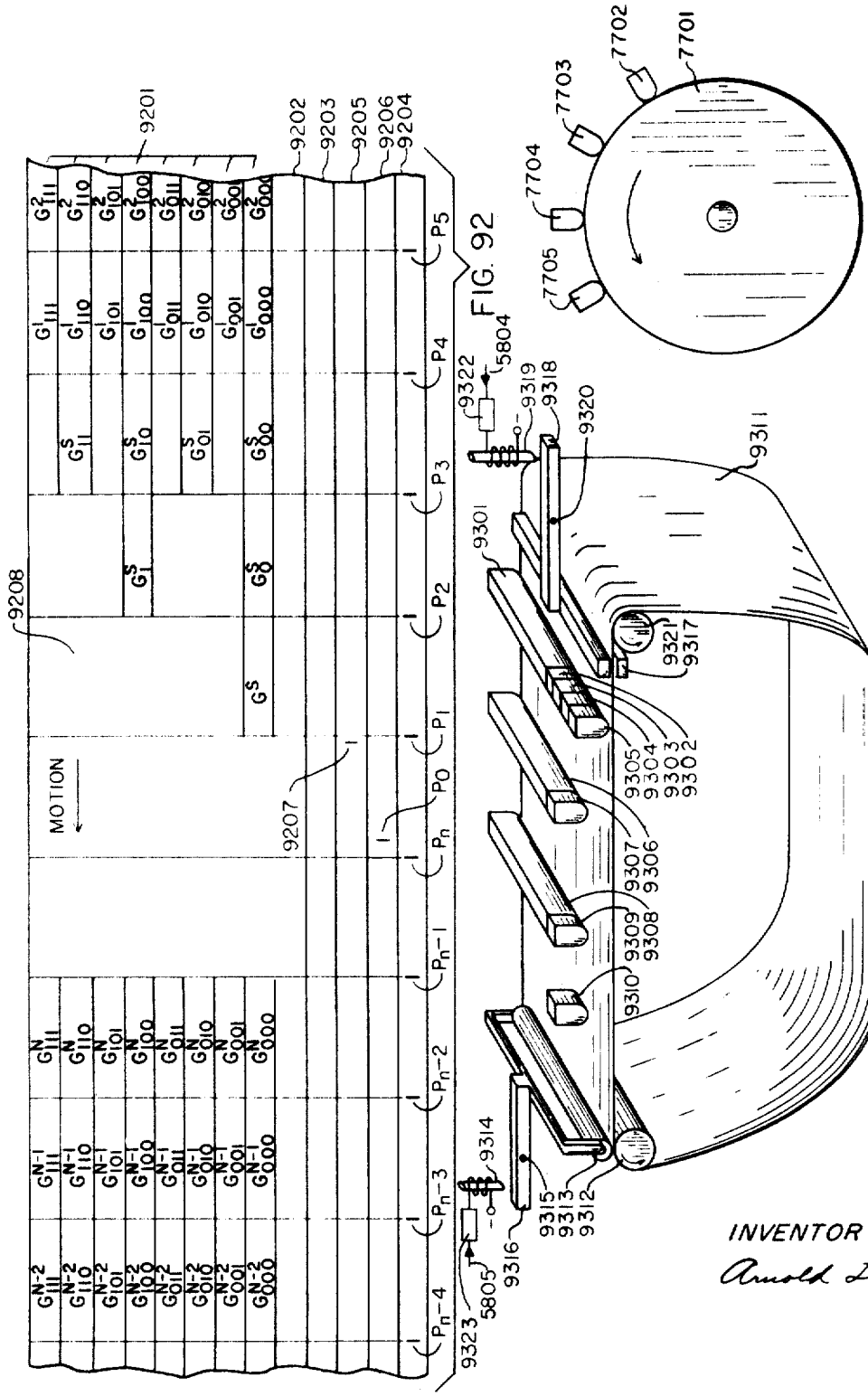

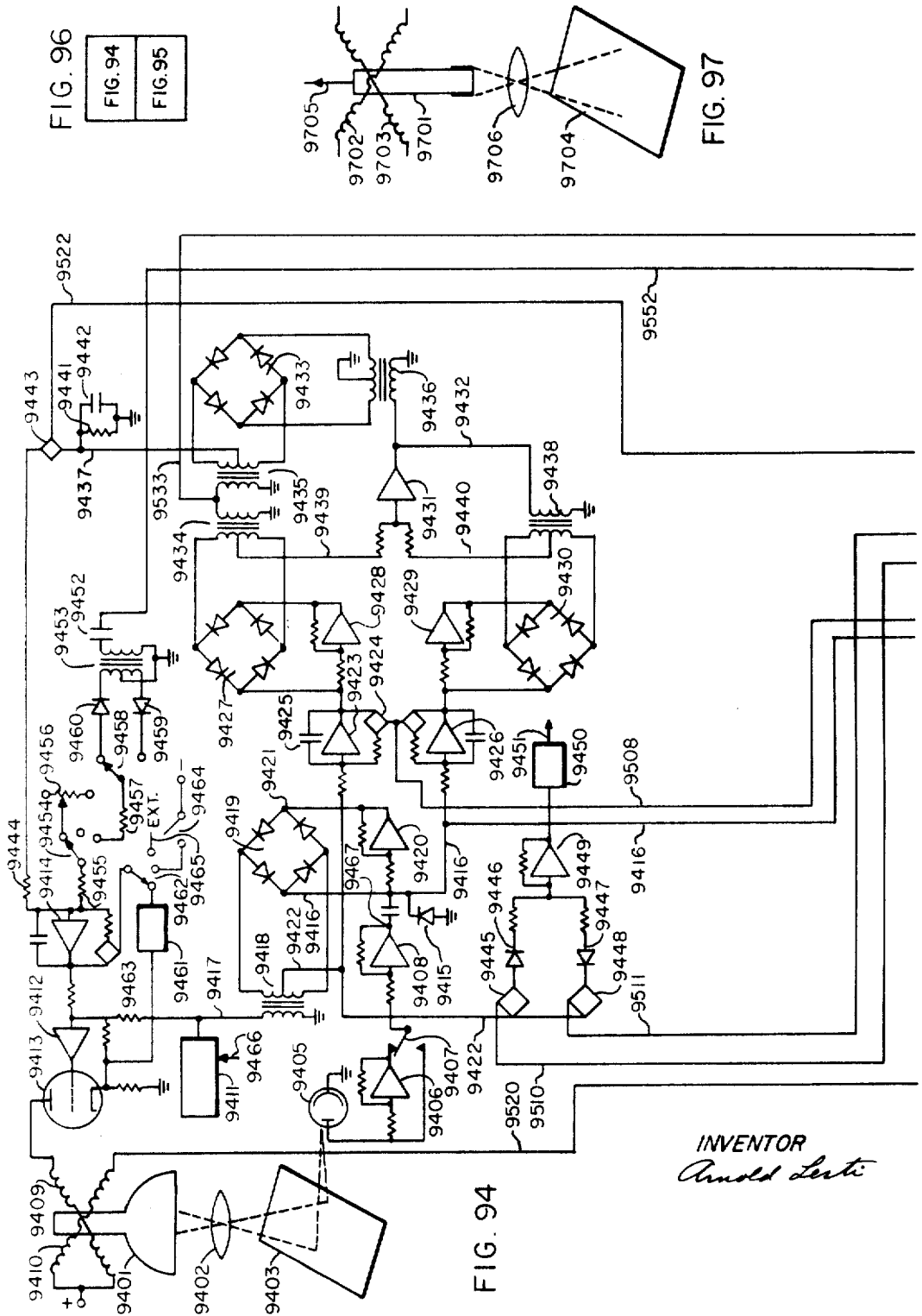

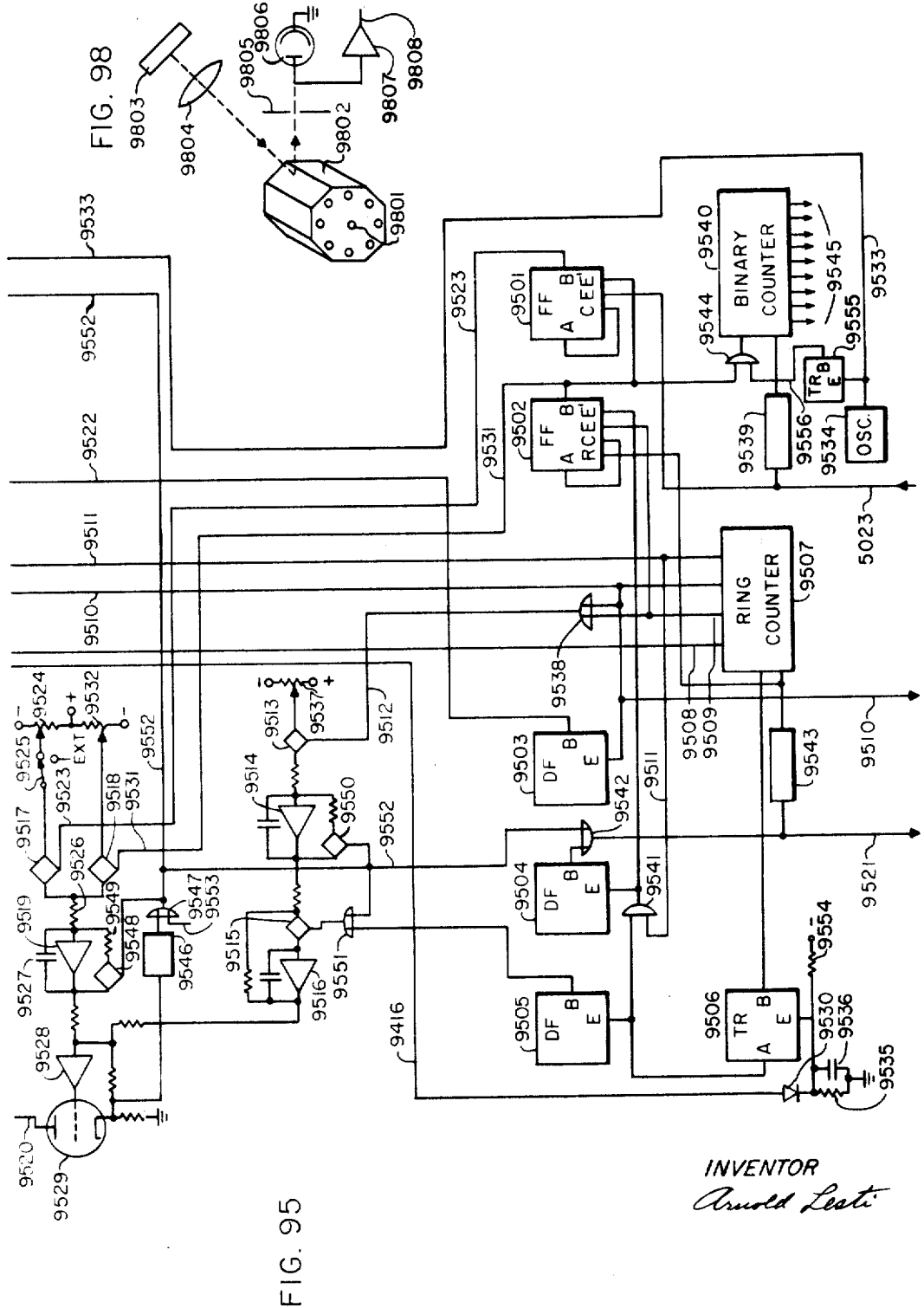

INVENTOR
Arnold Lesti

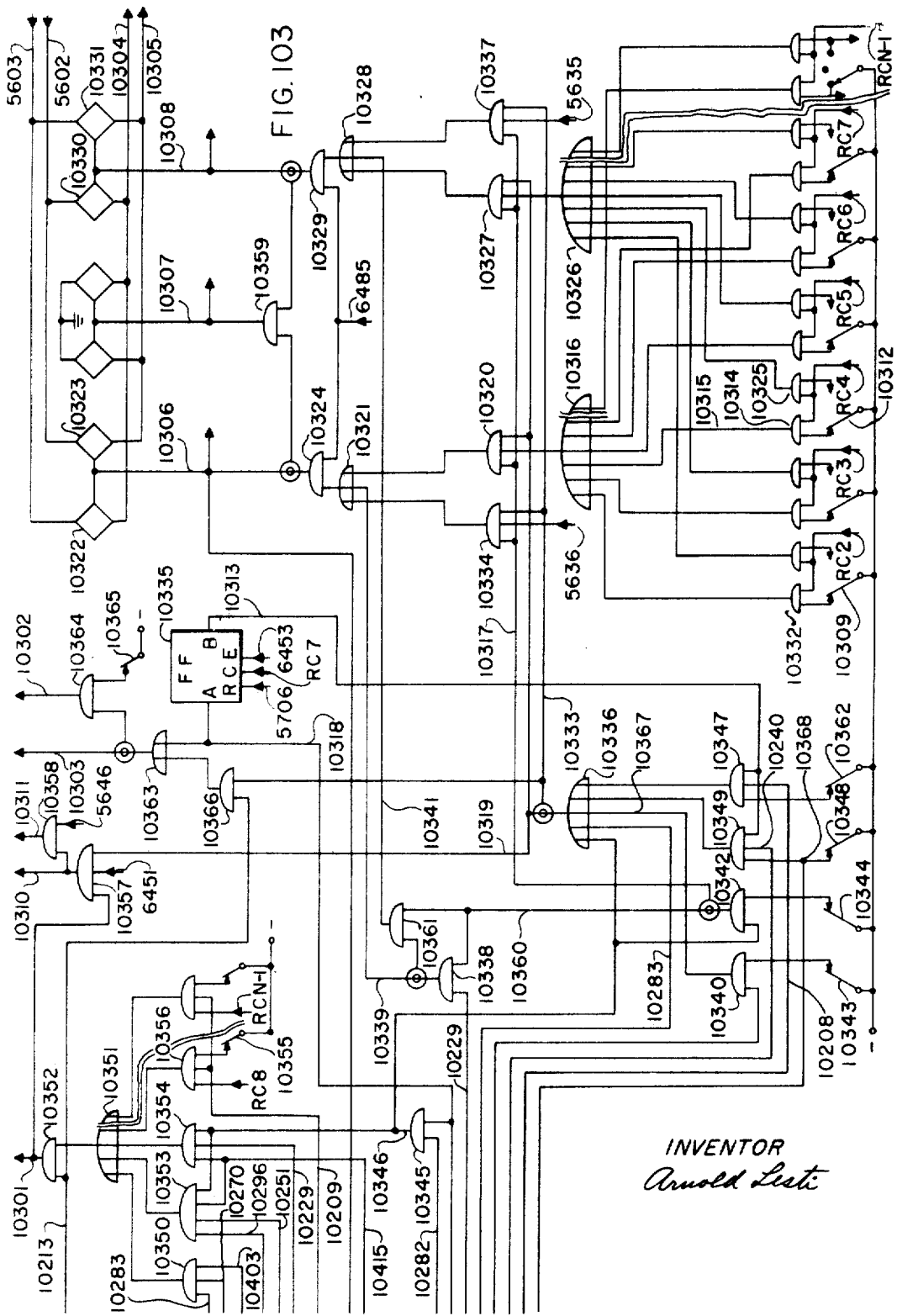

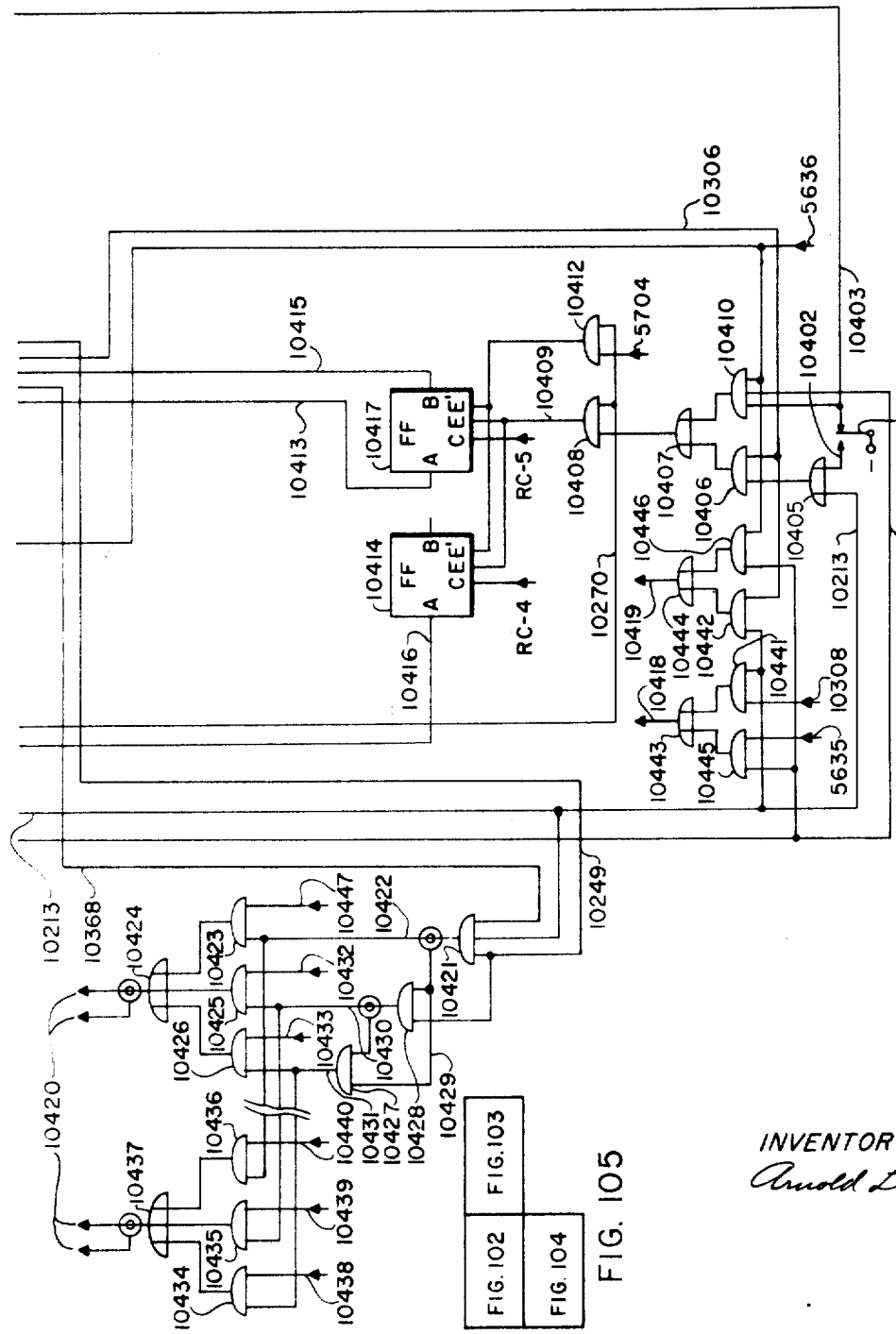

INVENTOR
Arnold Lesti

United States Patent Office 3,440,617
Patented Apr. 22, 1969

3,440,617
SIGNAL RESPONSIVE SYSTEMS
Arnold Lesti, Wheaton, Md., assignor to Andromeda Inc.
Kensington, Md., a corporation of Maryland
Continuation of application Ser. No. 87,204, Feb. 6, 1961.
This application Mar. 31, 1967, Ser. No. 641,717
Int. Cl. G06f 3/14; G06g 7/22
U.S. Cl. 340—172.5
70 Claims

ABSTRACT OF THE DISCLOSURE

Analog and hybrid vector signal-classifying systems with inter alia (1) position, duration, amplitude, normalizing; (2) frequency and feedback transformations; (3) linear and nonlinear correlation of received signals with one or more vector memory functions to provide a scalar signal or signals indicative by polarity and/or magnitude either of a classifying of received signal in one of two or more recognized signal classes or of a rejection of the received signal; (4) adaptive learning in respect to desired classification of signals and desired numerical distribution of signals among classes; (5) automatic control of error parameter; (6) trees and ladders of vector memory functions; (7) different selectable modes of classifying and learned switching from one mode to another; (8) cascaded classifying operations; (9) centroid image scanning.

This application is a continuation of my copending application Ser. No. 87,204 filed Feb. 6, 1961, and entitled "Learning Machines," now abandoned.

LEARNING MACHINES

This invention relates to learning machines or systems which will perform output operations in response to input signals after the establishment of a learned relation between input signals and output operations. Machines of this kind will learn to recognize signals of various types applied as inputs.

Because of the highly complex nature of the relations of the more useful forms of input signals and the meanings which the signals convey, it is impractical to predetermine and construct all such relations in a machine. Accordingly, in accordance with this invention, such complex subtle relations are established by the machine itself in a learning or conditioning process, wherein the machine is permitted to adjust itself for proper operation as determined by the nature of its internal and external environments, to yield meaningful useful output operations in response to a large variety of input signals.

The input signals often may not be repeated exactly in the same manner. In accordance with this invention, such signals are grouped into classes by the learning operation, and signals which belong to the same class when presented as inputs to the machine will cause the same meaningful response. Signals derived from speech, writing, printing, or other visual and audible forms, and signals due to mechanical movements, temperature and pressure changes, contacts, and electrical signals, are signals to which the machine in response to which it will yield meaningful useful output operations.

The input signals may be classified in terms of the classes of responses which they produce when applied as input to the learning machine. Different specified input signals may produce the same response if the learning machine is taught and it learns to produce the same response when it is desired that the different signals produce the same result. The specified signals may be taught to produce entirely different responses under a different set of circumstances.

An illustration of this is the case of spoken words, for example, the word "democrat" when spoken to the learning machine can be stated in a variety of ways by different persons. The learning machine may be taught to produce the same response such as a specific digitalized output coded signal when the word "democrat" is spoken to it regardless of the manner in which it is spoken. In this case the digitalized response can be considered as an identifying category for all those input signals which collectively stand for the word "democrat" and such an output coded signal can be placed in a specific meaningful category. If it is necessary, however, to identify the manner in which the word "democrat" is spoken such as the ways in which Mr. Smith speaks the word in contrast to the ways in which Mr. Jones speaks the same word, then the learning machine can be taught to produce the same coded response whenever Mr. Smith speaks the word "democrat," but when Mr. Jones speaks the same words to the learning machine an entirely different and consistent coded output signal can be produced. In this manner the machine establishes a meaningful category by identifying the speaker. The learning machine can be taught to recognize many different spoken words and to produce unambiguous output responses to identify the words regardless of the speaker in one mode of operation, or it may be taught and it will learn to recognize words as spoken to identify the sources and other characteristics of the words.

The learning process itself is achieved by the occurence of the required outputs at the time that the input signals take place. Persons may cause the forced presentation of such desired outputs in one form of the teaching operation. In another form, a teaching machine may be used to present the inputs and outputs. Such information may be stored in magnetic tape, for example.

Learning machines of this type may be taught and they will learn to read printed and written information and to give unambiguous output responses to the same printed or written characters regardless of the variations in which they occur. They can also learn to recognize images, pictures, geometrical figures, paterns and other forms of visual information.

An object of this invention is to produce a recognition machine in which responses are independent of the amplitude of the input signals, or independent of the duration of the input signals when the form of the signal extends over a different duration. In the case of speech input signals the recognition process can be made independent of the duration of words spoken. The foregoing independence of the recognition process can be achieved, in accordance with this invention, by having the machine learn many of the typical variations of the signals and then to give extrapolated and interpolated responses of the other variations close to the learned instances of the signals without further learning. In a preferred form, the input signals are transformed into another set of input signals which have invariant properties with respect to certain parameters so that when such transformed input signals are applied to the learning machine and made to give learned output responses the responses are the same and are given correctly without further learning to all applied signals which have variations with respet to the stated parameters. In the case of spoken words one such parameter is the variation of the duration of a given spoken word as spoken by the same or different persons. Invariance of response is achieved in this case by a time normalizer which produces the transformed signals all of constant duration. Such transformed signals are normal signals, and input signals must be at least normalized with respect to duration before being referred to herein as normal signals without further qualifications.

Another object of this invention is to provide learned recognized responses of input signal sequences in which the learned output produced is in response to the sequence taken as a whole. In the case of speech the sequence of signals is a sequence of spoken words or sequences of segmented words and combination of words such as a meaningful spoken sentence and the output response would be an unambiguous digitalized code. In the case of reading the sequence would be a word which is a sequence of letters, or it could be a printed or written word which is a sequence of letters, or it could be a printed or written sentence made up of a sequence of both letters and words. In one form of this invention learned recognition of applied signals is produced wherein each applied signal is of constant duration and each represents a unique sequence of one or more input signals. Such applied signals are normal signals and have the same duration regardless of the number of component signals in the sequence which an applied signal represents, or regardless of the duration variations of the component signals, or regardless of the variations of the intervals of time or spacing between the component signals. The applied signals may also have a form which is the same regardless of the stated variations of the durations of any component signal if the component has a specified form over a different duration.

In a continuous signal such as continuous speech the learning machine performs a preliminary transformation on the continuous signal by segmenting the signal into a series of component signals. The way that the machine forms the segments is an internal function and not necessarily related to the ways in which the signal may be meaningfully divided. Such meaningful aspects are brought out later in the learning process. It is only necesary that the segmentation is consistent and creates a statistically stable class of component signals. For example, certain words may be broken down into two, three or more segments, whereas certain other combinations of words will only form one signal segment component.

Another object of this invention is to provide learning machines of the above type in which input signal sequence recognition becomes more certain as more component signals of the sequence are applied. This makes recognition more reliable and relatively more independent of irregularities in the signal members of a sequence.

Another object of this invention is to utilize the above transformed signals of constant duration in connection with image scanning for image recognition. Vertical and horizontal scanning may be used as in television, but with the horizontal scanning preferably made slower than the vertical scanning. Then the duration of the horizontal scanning with signal energy is the duration of the input signal. If this input signal is transformed into a corresponding normal signal of constant duration which is then applied to the learning machine, the learned output signals would become independent of the image magnification along the horizontal axis and recognition of all expanded and contracted images along this axis would take place without requiring learning of all of the possible images obtained. The scanning axis can be shifted into a reference position with respect to the image by means which utilize the scanned signal. The scanned signal can be either multiplied or not by a displacement signal which latter signal gives the vertical instantaneous positions of the scanning with respect to the reference position. Either one or the other of the resultant signal can be further processed and transformed into the stated corresponding signal of constant duration. This arrangement would cause learned output signals which are not only independent of the magnification of the images along the horizontal direction but also independent of the magnification along the vertical direction if the displacement signal is multiplied as indicated above. All of the possible signals obtained by independent contraction or expansion of the images along the vertical or horizontal direction would then not require any further learning after once the corresponding transformed signal has been learned. The said transformed signal is the normal signal. The normal signals eliminate duration variations of any type of input signals. Those signals for which the learning machine is required to produce the same response and vary in duration when presented require no further learning if their form is substantially the same when they are normalized in duration.

The input signals applied to the learning machine may not be repeated exactly when the same meaning is intended such as when a word is spoken on different occasions even by the same person. The various input signals may be thought of as being signal vectors in a space of as many dimensions as there are distinguishable sample points in the signal. If the signal is a speech signal or a scanning signal it may be considered as being a function of time. Over the duration interval in which the learning machine is to recognize the signal the function of time has various values and the distinguishable features extend down to a limiting interval of time whose total number gives the dimensions of the space in which the signal may be considered a vector. As far as the recognition process is concerned, the total number of possible distinguishable signal vectors are determined by the resolving power of the machine to separate signal vectors which differ by a smallest signal vector, which sets the resolving power if all signal vectors are normalized with magnitude equal to unit distance. The smallest angle between two close signal vectors which the machine can separate is also a measure of its resolving power. The total number of signal vectors with the smallest angle of separation with adjacent signal vectors is the total number of signals which can be presented to the machine. This number is very large and the machine will never even receive all the possible signal vectors. Signal vectors have included certain random noise components whose presence sets a lower limit to the resolution angle and an upper limit to the total number of distinguishable signals. An operation between any two vectors in which all corresponding components of each vector are multiplied and then the products are added is called the inner products given by $$\sum_i F_i G_i$$

This is also equal to $$\left(\sqrt{\sum_i F_i^2}\right) \left(\sqrt{\sum_i G_i^2}\right) \cos \theta$$

where $\theta$ is the angle between the two signal vectors and $F_i$, $G_i$ are the corresponding components in the signal coordinate system. The index $i$ identifies each component of the signal vectors. The designations for signal vectors such as $F_i$ or $G_i$ sometimes refers to the components of the signal vectors when the $i$'s are to be individually examined, and sometimes refers to the entire signal vector when the vector as a whole is considered. In one form of the learning process according to this invention learning consists in finding a memory signal vector $G_i$ whose inner product with a predetermined set of input signal vectors $F_{ij}$ gives a set of corresponding learned output value scalars $V_j$ wherein index $j$ identifies the different input signals. A desired set of assigned scalar values $B_j$ are introduced in the teaching operation every time a corresponding signal $F_{ij}$ is presented to the learning machine. The learned process itself is iterative. The various desired $B_j$ values are presented in turn in any order with the corresponding $F_{ij}$ signals. The memory signal vector $G_i$ gradually assumes a value which will cause the proper values of $V_j$ equal to the corresponding $B_j$ when the learning process is substantially complete and a convergence has been attained to the necessary value of the $G_i$ memory signal vector and the $V_j$ output value scalars. During learning error scalars are produced equal to $B_j - V_j = e_j$. The error scalar $e_j$ is divided by scalar $$\sum_1 F_{ij}^2 = U_j$$

giving scalar $e_j/U_j$. This, in turn, is multiplied by the vector signal $F_{ij}$ to produce $$\frac{e_j}{U_j} F_{ij}$$

which is called the error signal vector $\Delta G_{ij}$. The latter is added to the memory signal vector $G_i$ giving $G_i + \Delta G_{ji}$ as the new value of the memory signal vector to replace $G_i$. If the same $F_{ij}$ is presented immediately thereafter, $e_i$ will be equal to zero and $V_j = B_j$ indicating correct response. However, if other signal vectors are presented there will be errors $e_j$ produced which will be reduced as the iterative process of learning is continued. The above learning process is equivalent to solving a set of simultaneous linear equations $$\sum_1 F_{ij} G_i = V_j$$

by iteration. More details of this process are explained in the specification hereinbelow.

Whenever the learning process causes the machine to give a correct response to a signal vector $F_{ij}$ then a class of related input signals will give responses $V_j$ which are close enough to $B_j$ such that the responses so produced are considered equivalent. This can be adjusted by range control means or gap control means according to the invention. The class of similar input signals so determined are the actually learned signals and any signal presented to the machine in the same class of related signals gives the same response. Since the signals presented are not exactly the same on successive presentations even if the same meaningful signal is intended, the convergence process is actually operating on classes of input signal vectors when learning, and all signals in the same class are related and give the same response.

The error signal vector can be multiplied by an error signal parameter or constant $C$ always of the same polarity, giving $$C \cdot \frac{e_j}{U_j} F_{ij}$$

as an adjusted error signal vector wherein the constant $C$ can be changed to lower absolute values when the learning operation is advanced. In accordance with one form of the invention the error parameter $C$ may be adjusted automatically by first computing a unidirectional scalar function of the $e_i$ and the $F_{ij}$, and adding the scalars for a series of successively applied input signals. At the end of the application of a predetermined number of the input signals, the sum of the scalars is computed and $C$ is made proportional to that sum, in one adaptation. When $C=1$, no error is produced when the same signal is applied next. Lowering $C$ as learning progresses in accordance with reduced average errors is desirable for the reduction of the probability of errors when learning has been completed, while by starting with a high value of $C$ during the earlier stages of learning a higher speed of learning is obtained. Changes of the required learned responses will increase errors and cause an increase of $C$ temporarily until the new requirements are grossly met and then $C$ can be lowered again for a better adaptation to the new conditions. The use of the adjustable parameter $C$ is desirable when the input signals are grouped into classes of signals in which each class has related signals, referred to above, and by lowering $C$ the learning process gives optimum response to the average input signal vector in the class. Such classes are referred to also as forced classes of input signals. The parameter $C$ preferably should not be permitted to attain the value of zero.

It is often convenient to refer to the terms used in statistics such as the means $\mu_i$ of the coordinates components of any signal vector in a specific class of signals and the variances $\sigma_i^2$ about the means of the coordinate components, in which $i$ identifies the coordinate components whose variances and means are under consideration.

An object of this invention is to provide learning machines of the above type having method and means for porducing a set of digitalized output responses. In one preferred adaptation the digitalized output responses are a set of binary responses in each of which one or the other of two possible states is produced according to the value of $V_j$ referred to above. If $V_j$ occurs in a predetermined range of positive values then one of the states of digitalized response is produced, while if $V_j$ falls in a predetermined range of negative values the other state of digitalized response is produced. A set of $G_{ir}$ memory signals is provided producing corresponding $V_{jr}$ each controlling a binary output. The total set of outputs produces a binary output number whose total possible unique combinations of responses are equal to $2^n$ where $n$ is the number of $G_{ir}$ memory signals and corresponding output digitalized binary stages of response. Teaching then consists of assigning a set of corresponding $B_{jr}$ to produce the set of learned $V_{jr}$ scalars which, in turn, control the set of output digitalized responses.

In connection with the ranges of values of the $V_j$ referred to above, another object is to produce a range of values near zero such that if $V_j$ occurs in this range a no-response condition is produced in the respective binary output stage. It can then be arranged so that if one or more, or a predetermined number of no-response conditions are produced then the output responses of the other stages and the entire output is inhibited so that the machine will ignore input signals which produce such no-response conditions. The probabilities of an input signal to produce a $V_j$ which will occur within a predetermined range may be set by adjusting the size of the range. For example, if nothing is known about a signal the range or gap around zero may be adjusted to a size so that such a signal will have a probability $P$ of causing $V_j$ to fall in the zero gap. If there are $n$ stages of binary digitalized outputs then the probability that all stages will have a response is $(1-P)^n$. With $n=10$ and $P=.5$ this gives .001, with $P=.75$ this gives .000001, which are the respective probabilities that any signal which has not been learned and regarding which nothing is known will cause a coded output.

The $V_j$ values produced from certain input signals may be taught to produce zero; that is, by deliberate teaching $V_j=0$. Those signals which do not give a no-response condition but which should do so, can be taught to produce responses in the zero range. This will not rely on the above probability considerations, although some learning and some probability can work together to give the desired results.

With one of the $G_{ir}$ memory signal vectors and a set of input classes of signals the total maximum number of responses that can be forced to be produced independently cannot exceed the number of linearly independent $F_{ij}$ signal vectors which are called upon to give different forced learned responses. This, in turn, cannot exceed the number of possible components in each of the memory signal vectors or each input signal vector, and it cannot exceed the total possible sine and cosine Fourier components present either in the input signal or the memory signal in the period in which the signal is defined, whichever is least. For one $G_{ir}$ memory signal the maximum number N of linearly independent input signals from which a maximum N of forced or arbitrarily chosen responses can be learned and produced, wherein each independent signal produces one of the chosen responses, determines that a maximum number of N classes of input signal vectors can be designated. Any signal vector in any one class of such classes produces the same learned forced chosen response, which can be a digitalized response in a preferred form of this invention, and all signals in the same class are related signals. The inner product $V_j$ produced by $G_{ir}$ and each signal vector in any one of the classes differ from the assigned scalar value $B_{jr}$ for that class by less than a predetermined maximum value. The range control or gap means, referred to above, determines the maximum value of the allowable differences of $B_{jr}-V_{jr}$. During learning the actual signals presented are not exactly the same even when the same signal is intended. The signals are samples of a class of signals with an infinite number of signal members, and the learning machine is presented with a larger and larger number of samples as learning progresses. In the above N classes each class has an infinite number of signals. Samples presented to the learning machine from each class will cause the $G_{ir}$ vector to gradually assume a value to satisfy all signals in the N classes. It is dsirable to reduce the gap size and reduce the maximum value of $B_{jr}-V_{jr}=e_{jr}$, thereby reducing the probability of response by an unlearned signal. When learning has progressed such that with the error signal parameter $C=1$ the range of $e_{jr}$ may be wider than is necessary. It may become desirable to decrease it, and even with the same range not all signals in the various classes may give the correct response, then C should be reduced in value and learning allowed to continue. Then the $G_{ir}$ memory signal vector will assume a value such that the average input signal vector in any one of the N maximum stated classes can produce an output scalar $\overline{V}_{jr}$ very closely equal to the corresponding assigned scalar value $B_{jr}$. As C is reduced so will the difference $B_{jr}-\overline{V}_{jr}$ be reduced. Then the variance and standard deviation of $e_{jr}$ will be obtained, since then the second moment is taken substantially about the mean of the signal vector distribution in the class of signals with assigned output $B_{jr}$, and the squared errors are minimized.

Certain meaningful signals such as a specific spoken word will have many different signal representations. A spoken word represents an infinite class of input signals, and many samples of these signals will be applied to the learning machine as the word is spoken by the same person on different occasions or by different persons. It may be necessary for the learning machine to assign more than one class of the above stated maximum N classes of input signals to represent a given spoken word because the signal vectors representing the same word may have a wide angular separation. It is often convenient to refer to the maximum of N forced classes as the degrees of freedom per $G_{ir}$ memory signal vector.

The limitations of the N degrees of fredom per $G_i$ memory signal is not a limitation of the number of actual signal classes which can be separated and distinguished by forced learning by the machine. The learning machine first separates the totality of signals into gross subdivisions, then into further subdivisions of the subdivision, and so on until M final subdivisions are obtained. Each final subdivision of input signals can then be forced into the stated N classes of signals. Signal members in one of the N forced classes produce the same forced response and are related signals. Then the machine can be forced to recognize a maximum total of M·N signals or signal classes.

It follows then, in accordance with this invention, that the limitation of the maximum number N of forced learned responses which operate in one member of the set of $G_{ir}$ signal memories requires that a multiplicity of sets of $G_{irk}$ memories be utilized to increase the forced response, wherein r identifies the specific output bit of a set of output bits, i identifies the coordinate components of the memory signal vector, and k identifies each final subdivision of the M final subdivisions and thus identifies classes of input signals which will operate with the identified memory signal vector.

By the associated methods and means to be described, in one preferred form of this invention, another set of $G_i$ memory signal vectors is provided called steering $G_i$'s whose inner product with any presented input signal vector will be either a positive or negative value which determines respectively either one or the other of two other steering $G_i$'s. The selected one of these, in turn, is used to select others, and so on until the final subdivision is obtained.

The number of input signals and signal classes which can be learned is limited only by the resolution capabilities of the learning machine referred to above in connection with the resolution angle $\theta$. For easily attainable minimum angles the number of such signals is extremely large.

A feature of this invention is to provide methods and means for producing signal segments or signal components for the recognition of continuous speech. The considerations given above on the recognitions of signal sequences apply. The signal energy content of the continuous speech can be detected in a short interval and when it exceeds a predetermined value the beginning of a signal segment is recognized and the signal segment continues while the signal energy rate keeps exceeding the predetermined value. When the signal energy rate falls below the predetermined value the signal segment or signal component ends. This signal component is then normalized and processed by the learning machine for recognition. The signal components are produced by pauses and gaps between words in continuous speech. These will differ according to the various ways in which the same speaker speaks and further differ according to the various ways in which different speakers speak even when the same sentences are spoken. The principle of the applied signals which are normal signals invariant with respect to certain parameters, such as duration of signal components, mentioned above, apply in the case of continuous spech to represent sentences.

The normal signal vector components identify a point in the signal space whose coordinates are the components, and these points can be used to identify any signal. A signal can be referred to as the signal point. With unit vectors any possible signal point is on the surface of a hypersphere. The neighborhood of any signal point has an infinite number of other signal points. Of the whole infinite set of signal points certain subsets thereof represent signal classes. Those which the learning machine can be forced to recognize are called forced subsets or forced classes of input signals or forced normal signals, as the case may be. The entire set can be covered by a finite number of subsets of signal points. Each one of the forced subsets is a class of an infinite number of signals any member of which can give the same distinctive learned output response. The entire set of possible signal points need not be covered by the forced subsets, and in practice this cannot occur. The maximum number N of forced subsets of input signals do not overlap ordinarily and are disjoint. For suppose that two of such forced subsets overlaps, and each were forced to give different output responses, then the input signals in the overlapping common portions of the forced subsets would be required to give different output responses at the same time, which is a contradiction. While the maximum number of forced subsets is N, and the maximum number of forced output responses is also N when the signals from any one subset produce a response different from the response produced by signals from any other subset, it is also possible to cause signals from two or more dispoint forced subsets of the maximum number N to give the same output response. This still leaves N as the maximum number of disjoint forced subsets of signals, but the produced output responses which differ from each other would then be less than N.

When learning has occurred in the presence of noise vectors which have not caused overlap of subsets of signals which are to be separated, and later the noise is increased to cause overlap, then the signals in the newly created intersecting subsets of input signals cannot be separated and errors will be produced. A new learning procedure can then start to cause separation inside of the regions which noise created. If the noise has completely mixed the signals which are to be separated to the point where when two separate signal vectors with $\theta$ between them have a different noise vector added to each so that the two resulting vectors have no more than the minimum resolvable angular separation, then the two signals cannot be separated. The machine will keep redistributing its forced subsets until a maximum of N forced subsets are obtained such that all forced subsets with noise added will produce substantially minimum squares of the errors. Random noise or white Gaussian noise carries no information and it is added to all signal vectors and spreads the various classes of signals thus reducing the number of separable classes. Noise here refers to signals which are not coherent with any signal which the machine is to learn, and such noise may come in at any time and become mixed with a legitimate signal. Nonergodic noise which shows characteristic signal form will interfere with certain classes of signal vectors and not with others, and will reduce the number of recognizable classes of signals because of the lack of predictability of the noise among the classes of signals in which it appears and causes spread.

In the case of continuous speech or any signal sequence the end of the sequence can be identified in learning by the lack of occurrence of new component signals for a predetermined interval. The signal segments or component signals produce digitalized output codes each of which contribute to cause the production of a signal function of time referred to as the transformation signal. The transformation signal is combined with the next received component normal signal to produce a dervied signal which is also normal. The derived signal is an input signal to the learning machine and it causes the production of a digitalized output signal which, in turn, produces a corresponding transformation signal. The next received component normal signal is combined with the transformation signal to produce another derived signal, which carries sequence status, as input to the learning machine. This process is repeated every time another component signal of a sequence is received. In a preferred form the digitalized output code is combined with the coded output of a sequence status counter and the combined code is used to produce the corresponding transformation signal which carries sequence status information of the specific signal sequence up to that time. When the last component normal signal is received it is combined with the transformation signal produced by the preceding component signal to produce the last derived signal of the sequence. The last derived signal is the applied signal proper to represent the whole sequence referred to above when sequences were first mentioned. The applied signal which is the last normalized derived signal is learned by the learning machine and produces a distinctive digitalized output as the learned response to the entire sequence of signals or spoken sentence as the case may be.

Spoken sentences are segmented and a whole sentence is mapped into a corresponding applied signal as explained above. Each forced subset of applied signals contains an infinite number of signals but the variances $\sigma_i^2$ and standard deviations of the coordinates of the applied signal points with means $\mu_i$ are reduced by the normalizing procedures and by the successive digitalization of the signal segments and other procedures given hereinbelow. Even the same sentence as spoken by the same person on different occasions or by different persons will be mapped into a finite number of disjoint forced subsets of applied signals in which each subset contains an infinite number of signals. When any applied signal from any one of these forced subsets is received the learning machine can be forced to produce the same digitalized learned response thus recognizing the sentence regardless of how it is spoken. The normalizing and digitalizing procedures will reduce the number of mapped disjoint forced subsets for the same reasons that it reduces the variance in any forced subset.

The learning machine can deal with signal environments in which the means $\mu_i$ and variances $\sigma^2$ are stable and the $G_i$ memory signal vectors will be converging towards coordinate signal components $$\sum_j A_j F_{ij}$$

as a linear combination of the corresponding components of the average $F_{ij}$ input signal vector in the forced subset by the process of reducing the error signal parameter C. The subscript $i$ refers to the coordinate components and $j$ refers to the signal class or forced subset. The $A_j$ are weighting constants which have fixed magnitude and sign for a fixed state of the memory signal vector and consists of the sum $$\sum_\tau C(e_j, F_{ij}) \cdot \frac{e_j(\tau)}{U_j(\tau)}$$

This sum converges to $A_j$ as the learning or iterative index $\tau$ is increased. $C(e_j, F_{ij}, \tau)$ indicates that C is a function of $e_j$, $F_{ij}$ for all $i$'s and $\tau$. C is proportional to the cumulative squared errors in a specific number of trials. With $C=1$ always, the sum will converge if the number of independent input signal vectors is finite and is equal to or less than the dimensions of the space which can be occupied by the $G_i$ signal vector which equals the sum of all the $i$'s. The parameter C should be reducible preferably to a fixed value greater than zero.

In the foregoing descriptions the various signals were designated as signal vectors such as $F_i$ or $G_i$ wherein the subscript $i$ identified the coordinate components. It will be convenient often to replace such a designation by one in which time $t$ or an independent variable $x$ replaces the index $i$. Then $F_i$ would be replaced by $F(t)$ and $G_i$ would be replaced by $G(t)$ as functions of time. The dimensions of the space could then be theoretically infinite, but in practice the shortest interval of time within the finite interval of duration of the function in which changes of the signal can be detected would set a finite limit to the dimensions of the space. Other forms of interpreting the signal include the frequency spectrum which is finite, or the Fourier analysis of the signals which would, in actual circuits, set a limit to the signal components and the coordinates of the space. For convenience of designation $F(t)$, $G(t)$, and other functional notations, including $F(x)$, $G(x)$, are used in the specification and claims; it being understood that these are equivalent to the other vector notations. Since the index $i$ is replaced by $t$ or $x$, the same $i$ can be used to identify the different functions or classes of functions such as $F_i(t)$. In the case of $G_j(x)$ the index $j$ identifies the different memory signals. The term signal vector or signal function is used interchangeably depending upon which is more appropriate to describe the ideas. When summating with respect to the independent variable $t$ or $x$ an integral sign $\int$ is used instead of the summation sign $\Sigma$, it being understood that the ideas involved are equivalent.

Another object of this invention is to further reduce the effects of the variability of the input signal members of sequence of signals, upon different presentations when the sequence is to produce the same output coded response, as more signal members of the sequence are presented. Mode B is the designation given for the state of operation of the learning machine in which learning and recognition are accomplished with respect to input signal sequences. One method of operation in mode B is to cause the steering $G(t)$ memory signals alone to operate until the applied signal which is the last derived signal in the sequence is received. This produces a class of applied signals to represent the various different presentations of a sequence when all of such presentations are to produce the same output coded response. Such applied signals will be confined into certain ones of the M final subdivisions of signals. Associated $G(t)$ memory signals will then place the applied signals into forced classes and any such applied signal will produce the same forced output coded response. When mode B is used in the above manner a given signal component will cause the selection of a specific set of steering $G(t)$ memory signals. This, in turn, will produce a corresponding digitalized state of a steering code register and, in one adaptation, a sequence status counter code. Both of these codes are the combined mode B steering feedback code. Accordingly, an input signal component $f_{rk}(t)$ of a sequence is changed into normal signal $f^*_{rk}(t)$ which produces the said mode B steering feedback code designated as $C_{rk}$. This code produces a transformation signal $T_{rk}(t)$ as a function of time. Index $k$ identifies the sequence status of any signal component. The next input signal $f_{r(k+1)}(t)$ is changed into normal signal $f^*_{r(k+1)}(t)$. A Q function of $T_{rk}(t)$ and $f^*_{r(k+1)}(t)$ is produced which is the derived signal $Q[T_{rk}(t), f^*_{r(k+1)}(t)]$ as a function of time. The derived signal is utilized to produce digitalized mode B steering feedback code $C_{r(k+1)}$ which produces $T_{r(k+1)}(t)$. This, in turn, is combined with the next $f^*_{r(k+2)}(t)$ to produce another derived signal, and so on, until applied signal $F_1(t)$ is produced equal to the last derived signal $Q[T_{r(n-1)}(t), f^*_{rn}(t)]$ wherein $n$ represents the last of the consecutive digits which identify the order in the sequence of the signal components, and $r$ identifies any input signal in a class of related input signals. The index $r$ can have any identifying value in any position of the sequence independently of its value in other positions. The input sequence starts with signal component $f_{r1}(t)$ and ends with $f_{rn}(t)$. The various members in the set of related signals such as $f_{r1}(t)$, which are intended to contribute to the production of the same output code, will produce by steering certain steering feedback codes $C_{r1}$ as a digitalized representation of any signal in the stated set. From these relatively few $C_{r1}$ codes there are produced corresponding discrete signals $T_{r1}(t)$ to represent the infinite number of signals in the stated set. Each of the $T_{r1}(t)$ has no variance in contrast with the variance of the infinite number of signals in the subset of the set of signals of $f_{r1}(t)$, which subset is mapped into the stated $T_{r1}(t)$. In feedback of codes for sequence recognition it is desirable to form the Q function in such a manner so that the information which has been arrived at cumulatively by the application of the preceding signal members of the sequence contributes to the production of the next code members if the next input signal $f_{rk}(t)$ is noisy or greatly distorted or even absent from the sequence. The next derived signal preferably should have weighting in favor of $T_{r(k-1)}(t)$ as an independent input. A Q function with these properties is $$Q[T_{r(k-1)}(t), f^*_{rk}(t)] = T_{r(k-1)}(t) \cdot f^*_{rk}(t) + \left( \sqrt{\int_{t_1}^{t_2} \overline{f^*_{rk}{}^2(t)} dt} \right) \cdot P \cdot T_{r(k-1)}(t)$$

This Q function has less variance than $f^*_{rk}(t)$ since the right hand member of the sum involving one of the $T_{r(k-1)}(t)$ and the square-root member has no variance. The variability of $f_{r(k-1)}(t)$ is represented by the variable sample inputs from the subset of the set of signals related to $f_{r(k-1)}(t)$ which are mapped into the subset of corresponding normal signals $f^*_{r(k-1)}(t)$ which, in turn, are mapped into a single $T_{r(k-1)}(t)$ with no variance. In this function, if $f^*_{rk}(t)$ is missing, an internally generated signal is utilized to produce a signal to replace $$\sqrt{\int_{t_1}^{t_2} f^*_{rk}{}^2(t) dt}$$

which is a scalar magnitude having no detailed information and serves to carry $T_{r(k-1)}(t)$ which latter signal alone then would be the derived signal to carry on the sequencing and lead to the identification of the sequence based upon the cumulative information contained in $T_{r(k-1)}(t)$. This particular Q function has another property which is used in conjunction with the assignment of $\pm \sqrt{U_i}$ to $B_i$, namely, that it produces learned outputs which are invariant to amplitude changes of either $f^*_{rk}(t)$ or $T_{rk}(t)$ independently. Under ordinary operation only $f^*_{rk}(t)$ can have amplitude variations, while the $T_{r(k-1)}(t)$ have constant amplitude under all conditions since they are internally produced signals derived from fixed codes. As $k$ is increased, if $f^*_{rk}(t)$ becomes noisy or unreliable, the learning machine will learn to place greater reliance on the $T_{r(k-1)}(t)$ term and less on $f^*_{rk}(t)$. This can be controlled by the weighting constant P. Since the probability of the occurrence of succeeding specific terms increases as the lengths of certain sequences increase, $T_{r(k-1)}(t)$ either alone or with very little help from $f^*_{rk}(t)$ can determine the rest of the sequence. There are sequences each with the property that the full sequence is determined when a portion of it is received.

It is also possible to control mode B by the production of the $C_{rk}$ codes derived from the G-memory signals associated with the M final subdivisions wherein the $C_{rk}$ codes are forced output codes. Then the result would be mode B forced feedback codes. Every step in sequencing of any specific code then would require teaching and learning thus using degrees of freedom of the G-memory. In this case the $C_{r1}$ and corresponding $T_{r1}(t)$ would be single and mapped from a set having an infinite number of signals all related to $f_{r1}(t)$. Mode B steering feedback control may produce more than one $T_{r1}(t)$ each of which is mapped from a corresponding subset of the stated set. However, mode B steering feedback control possesses the property that the degrees of freedom of the G-memory required are independent of the number of signal components which exists in the sequence.

Another object of this invention is to provide the method and means of achieving recognition and learning machines of the above types in which the basic learning formulas are non-linear. In the linear formulas a set of input signals $F_i(x)$ are multiplied by the memory signal $G(x)$ producing a product function $F_i(x) \cdot G(x)$. This is integrated giving $$\int_{x_1}^{x_2} F_i(x) \cdot G(x) dx = V_i$$

as the produced output value and wherein $x_1$ and $x_2$ are the limits of integration and the limits of $x$ such that $F_i(x)$ and $G(x)$ are defined in the interval $x_1 \leq x \leq x_2$. The linear designation refers to certain basic operators, the correlator and subtractor. There are many nonlinear operations which take place in transforming the signals from the environment which are applied to the linear operators, and the system is still considered to be linear herein. Moreover, the basic operators are working with statistically distributed signals with probability density of the distribution consisting of complicated functions. The straight-forward iterations in conventional solutions of linear equations become more complicated since exactly the same equations are seldom if ever repeatedly presented, as is required in ordinary linear processing. The applicable simplified theory is presented first, and then the statistics will be superimposed. The latter is described later hereinbelow.

The linear learning process consists in finding $G(x)$ which will give the correct values of $V_i$ in response to any one of multiplicity of $F_i(x)$ input signals as functions of $x$. For each presentation of an $F_i(x)$ an error function is produced $\Delta G_i(x)$ which is added to $G(x)$ giving corrected function $G(x) + \Delta G_i(x)$ to replace $G(x)$. In the linear process the value of $$\Delta G_i(x) \text{ equals } C \cdot \frac{e_i}{U_i} F_i(x)$$

wherein $e_i = B_i - V_i \cdot B_i$ is the desired assigned value introduced in teaching $$U_i = \int_{x_1}^{x_2} F_i{}^2(x) dx$$

and C is the error constant or error parameter. The independent variable $x$ can be equal to the independent variable $t$, the time in which the signals occur, in one adaptation. Whether or not the main system is linear depends upon the multiplier, integrator, and subtractor. If these units are linear, the main system is linear; otherwise, it is not. The multiplier and integrator combination is often referred to as the correlator. The above linear system is a special case of the nonlinear systems described below.

Assume that the above designations of signals, $F_i(x)$ and $G(x)$ are operated upon jointly to produce the scalar $V_i$ in a nonlinear manner, such as when the integral of the products of the sums of successive weighted powers of $F_i(x)$ and $G(x)$ is taken, for example. This could be the case if the multiplying transfer curve is not straight. Then $e_i$ should be computed as a function of $B_i$ and $V_i$ so that $e_i = 0$ when $B_i = V_i$, and preferably $e_i$ should go through zero monotonically. It is not necessary to take a linear difference, although if this is done the system will still be nonlinear. The next step is to compute a unidirectional function of $e_i$ such as the square powers giving $E(e_i)$. Then the negative rate of change of $E(e_i)$ is taken with respect to the memory signal $G(x)$ giving $-\partial E(e_i)/\partial G(x)$. The integral of the square of the derivative of the error gives $$\int_{x_1}^{x_2} (\partial e_i/\partial G(x))^2 dx$$

The first rate is divided by the integral to give $\Delta G(x)$, and this is multiplied by an adjustable error constant K giving $K \cdot \Delta G(x)$. In turn, this is added to the memory signal to give corrected signal $G(x) + K \cdot \Delta G(x)$ to replace $G(x)$. If the same $F_i(x)$ is applied next with the new corrected memory signal the error $e_i$ will be less than it was before the correction. If the various input signals are applied this system will converge iteratively under suitable conditions to a $G(x)$ memory signal function which satisfies all of the requirements which the teaching operation imposes. A special case of the above nonlinear process which lends itself to straightforward implementation, when the independent variable $x$ is time, is as follows:

Let the joint operator be $M_1(F_i(t), G_j(t)) + V_{ij}(b)$ which is of a type of be described further hereinbelow. This designation calls for a multiplicity of memory signals and a multiplicity of independently produced outputs as functions of time $V_{ij}(t)$, and $V_{ij}(b)$ as output values at $t=b$, the end of the computation time of the $M_1$ operator. Another operator $M_2$ is next used as a linear subtractor operating on $B_{ij}$ and $V_{ij}(t)$ producing $$(B_{ij} - V_{ij}(t)) = e_{ij}(t)$$

as error functions of time, where the $B_{ij}$ are the desired assigned output values introduced in the teaching operation. Then $e_{ij}(b)$ is the error value at $t=b$, the end of the computation time for the $M_1$ operator. Increments $\delta G_j(t)$ are added to $G_j(t)$ for substantially every value of $t$, thereby producing increments $\delta e_{ij}(t)$ as functions of time. Then $\delta e_{ij}(t)$ is divided by $\delta G_j(t)$ producing substantially the derivative functions $\delta e_{ij}(t)/\delta G_j(t)$ wherein $t$ is treated the same as the other indices $i$ and $j$ and $G_j(t)$ is varied at fixed $t$'s. These are squared and integrated producing $$\int_a^b \left(\frac{\partial e_{ij}(t)}{\partial G_j(t)}\right)^2 dt$$

wherein $a$ and $b$ are the beginning and end respectively of the intervals of time in which the integrations occur. The next step is dividing and multiplying to produce the error functions of time signals $$k \cdot \frac{-e_{ij}(b)}{\int_a^b \left(\frac{\partial e_{ij}(t)}{\partial G_j(t)}\right)^2 dt} \cdot \frac{\partial e_{ij}(t)}{\partial G_j(t)} = k \cdot \Delta G_{ij}(t)$$

wherein $k$ is an error adjustment constant. Finally, the $k \cdot \Delta G_{ij}(t)$ are added to the respective $G_j(t)$ memory signals to produce $G_j(t) + K \cdot \Delta G_{ij}(t)$ as the corrected memory signal to replace the $G_j(t)$ whereby if $F_i(t)$ and $B_{ij}$ are applied again the error values $e_{ij}(b)$ then produced would be reduced substantially signifying learning operation. In the above nonlinear systems it is preferred to divide each input signal by $$\sqrt{\int_a^b F_i{}^2(t) dt}$$

or by $$\int_a^b |F_i(t)| dt$$

in order to amplitude normalize the signals before introducing them to the learning machine such that the quotient signals thus produced replace $F_i(t)$ in the above nonlinear iterative formulas.

In connection with the linear versus non-linear systems, nothing that is done to the input signals by way of changing, normalizing, or transforming them in any manner, whether or not such transformations are nonlinear, changes the learning system from linear to nonlinear or vice-versa. Such a basic operation is controlled by the correlator and linear subtractor referred to above for the linear systems, and by the nonlinear operators $M_1$ and $M_2$ in the first mentioned non-linear systems, and $M_1$ and a linear subtractor in the second. The two operators $M_1$ and $M_2$ could be combined into one defining a set of nonlinear equations in N unknowns, and the learning operation consists in finding the value of the unknowns which are the values necessary to construct the memory signal function, referred to above. The linear system can be considered as a special case of the nonlinear system. This is demonstrated in the following substitution in the second mentioned nonlinear system with linear subtractor which at the same time gives a further manner of interpreting the derivative functions. The derivative functions $$\partial e_{ij}(t)/\partial_j(t)$$

become $$\frac{\partial}{\partial G_j(t)}\left(B_{ij} - \int_a^b F_i(t) \cdot G_j(t) dt\right)$$

when the operator used in the linear case is substituted for $e_{ij}(t)$. By definition this gives $$-\frac{\partial}{\partial G_j(t)} \int_a^b F_i(t) \cdot G_j(t) dt$$

$$= \frac{-1}{\delta G_j(t)} \left[ \int_a^b F_i(t)(G_j(t) + \delta G_j(t)) dt - \int_a^b F_i(t) G_j(t) dt \right]$$

$$= \frac{-1}{\delta G_j(t)} \int_a^b F_i(t) \delta G_j(t) dt = -F_i(t)$$

The last result follows from $\delta G_j(t)$ which is a variation from the regular form of the amplitude of $G_j(t)$ at one instant of $t$ or, in practice, a very small range of $t$, and zero at all other times. This is repeated for every instant of $t$ with a distinct $\delta G_j(t)$ for every distinct $t$. The effect of the integration then disappears. Instead of $b$, the upper limit of integration could also be equal to $t$ itself with the same result. That is, $\partial e_{ij}(b)/\partial G_j(t) = \partial e_{ij}(t)/\partial G_j(t)$ and if $-F_i(t)$ is substituted in the nonlinear formulas in place of the derivatives, the linear formulas are obtained. A summation sign with the summation index equal to a large number of discrete values of $t$ would give the same result as the integral version as far as the practical applications are concerned.

It is another object of this invention to provide a learning or recognition machine which will extrapolate and interpolate the response given to a newly received input signal which it has never received before to the response which is given by that learned signal which most closely resembles or is most closely correlated with, or has the smallest angular separation from the stated newly received signal. The gaps, referred to above, can be set with sufficient width to permit the same output operation of signals in the related class of input signals as explained. This class is increased in size if the gaps are increased to permit interpolation and extrapolation of any other signal in a larger class which has never been received before. During the early stages of learning the number of samples from the class will be small and extrapolation will be with respect to the signals which have been learned in the immediate past. As learning progresses the optimum response will be given to the average signal in the class if the error parameter C is allowed to decrease in value as learning progresses.

Another object of this invention is to provide the method and means for performing the various mathematical and other operations required for the learning machines described above. In one form, the multipliers used to multiply $F_i(t)$ and $G_j(t)$ are ring multipliers using solid state diodes, which can multiply the signals as analog voltage functions of time. A preferred refinement, according to the invention, is the use of solid state compressors each to compress $F_i(t)$ and $G_j(t)$, respectively. Then the compressed signals are multiplied. The compressed and multiplied signal is applied to an expander also comprising solid state devices. In accordance with this invention, the compressors are cube-root compressors and the expander is a cubic expander. In both units the linear terms of the transfer characteristics of the solid state diodes are cancelled to leave substantially the cube terms. Both the compressors and expander permit an increase of the dynamic range of the overall multiplying system beyond the range of the ring multiplier alone. The expander output is applied to an analog integrator consisting of a chopper stabilized D.C. amplifier with a capacitor in the feedback path. Means for discharging the capacitor are provided at the end of the integrating interval. The output of the integrators $V_{ij}$ are applied to an analog subtractor consisting of a resistor feedback D.C. amplifier, and $B_{ij}$ is applied thereto also, to give error output $B_{ij} - V_{ij} = e_{ij}$. Solid state diodes are used to obtain the square $F_i(t)$, and an analog integrator, in turn, integrates $F_i^2(t)$ to produce $$\int_{t_1}^{t_2} F_i^2(t) dt = U_i$$

The $\sqrt{U_i}$ is obtained by solid state devices and amplifiers. An analog divider is provided by the use of a solid state multiplier and analog subtractor, and with another multiplier this can produce the error function $$C \cdot \frac{e_{ij}}{U_i} F_i(t) = \Delta G_{ij}(t)$$

The techniques are relatively simple. Overall accuracy of the machine is obtained of high order because of the self-correcting nature of the learning or conditioning process which is in an iterative feedback loop. Analog adders are provided which are the same as the subtractor except for polarity of the inputs. In one version, the error parameter C is a manually adjusted gain control such as a rheostat or potentiometer. In another version, the error constant or error parameter C is automatically adjusted by a first integrator acting as a counter of operation pulses applied each time a signal is received, and a second integrator which receives rectified signals $$\frac{e_{ij}}{U_i} F_i(t)$$

averaging them over a predetermined count established by the first integrator. The second integrator also receives adjusted operation pulses of constant polarity opposite to that of the rectified signals. At the end of the predetermined count the polarity of the output of the second integrator determines the sense of movement of a motor driven potentiometer which controls the value of the parameter C. These techniques are also controllable by digital counters instead of the analog integrators.

The above signals may be processed by digital techniques instead of the analog ones described. An analog-to-digital encoder can be used to convert the analog signals into digital form. Then addition, subtraction, multiplication, and division can be done on a digital basis. A digital-to-analog decoder can be used to convert the digital signals into corresponding analog form. In a still further adaptation, multiplication is achieved by a digital-to-analog decoder in which the digital signal input is one of the signals to be multiplied, while the other is made to be the reference voltage itself of the decoder. Similarly, for dividing, an analog-to-digital encoder can be used in which the dividend signal is the analog input, while the analog signal divisor is applied as the reference voltage of the encoder.

It is a feature of this invention to provide storage means to temporarily store the input signals and to permanently store the memory signals in a manner to permit the latter to be modified from time to time as the learning process continues. In one adaptation the signals are stored in analog form, while in another adaptation the signals are digitalized and stored in a digital storage memory means. In one form of storage for $G(t)$ or $F_i(t)$ a movable magnetic medium is provided such as magnetic tape or a magnetic drum with writing and reading heads, as well as erase heads in certain adaptations. Such movable magnetic storage media can be used for storage of signals in either analog or digital form.

In one preferred form of the analog storage the signals are used to modulate a carrier frequency signal to produce a modulated, suppressed carrier frequency signal which is recorded and stored in a magnetic medium. The purpose of the carrier frequency is to provide signals of low phase and amplitude distortion when they are recovered from storage by playback. The procedure for correcting the $G(t)$ signals is to provide temporary storage into which $G(t)$ is transferred by playback from the $G(t)$ storage. The playback $G(t)$ signal is recorded on the temporary storage. The $G(t)$ signal is erased from the regular storage in the analog storage adaptation. The error signal $\Delta G_i(t)$ is added to $G(t)$ as recovered from temporary storage to produce the corrected signal $G(t) + \Delta G(t)$. One method of adding is by the use of summing inputs of an amplifier with feedback circuitry.

The error signal $\Delta G_i(t)$ is carrier modulated because it is derived from $F_i(t)$ which is carrier modulated. $G(t)$ is carrier modulated as recovered from storage, and so is the corrected signal $G(t)+\Delta G_i(t)$. The recovered $G(t)$ is first demodulated by a synchronous demodulator to recover the envelope with correct polarity. The carrier frequency itself, which is used in the modulators and the demodulators, is derived from a recording on the movable magnetic tape or drum, as the case may be. The demodulated $G(t)$ is modulated by the same carrier frequency. The modulated corrected memory signal $G(t)+\Delta G_i(t)$ is then recorded in the regular storage to replace $G(t)$. The regular storage will be referred to as storage. The process of transferring $G(t)$ from storage, to temporary storage, and after correction, back to storage, is a recirculating procedure of the memory signal, and in the analog storage version it is preferred to use synchronous demodulation and modulation as a step in the recirculation of the signal in order to lock and reestablish the correct high frequency signal phase at every pass. Otherwise, phase distortion would become cumulative.

When $G(t)$ is in digital form it may be placed in storage and temporary storage and recirculated indefinitely by reclocking at every pass. In the digital adaptation clock signals are used instead of the carrier frequency. In the digital version it is possible to use movable magnetic tape or drum for storage, as well as magnetic core memory, storage tubes and other forms. In certain forms of digital storage it is unnecessary to erase the memory since the corrected digital signal $G(t)+\Delta G_i(t)$ can be recorded over $G(t)$ wherein $G(t)$ is destroyed while $G(t)+\Delta G_i(t)$ replaces it.

When it becomes necessary to store a multiplicity of memory signals $G_j(t)$, a different storage section is required for each of the various memory signals. In one adaptation, wherein time sharing of common operations is utilized, common temporary storage means are used to store the temporarily transferred $G_j(t)$ each transferred to the temporary storage means at different times. In the various adaptations fiducial signals and timing signals are provided, derived from the movable magnetic medium or from timing signal generators, to sequence the various operations at exactly the correct times.

In connection with storing $G_j(t)$ memories, introduced above, in one adaptation the actual storage sections which stores these may be on magnetic tape or the storage surface of a magnetic drum. From reference positions a succession of consecutively active $G_j$ storage sections can be placed in which each section is contained in one of a group of $2^n$ sections, wherein $n$ starts at 0 and is a positive integer identifying successive groups of memory sections in this case also called steering sections, in each of which only one section can be utilized at any one time, and the next one utilized is in the next consecutively presented group as movement of the magnetic medium occurs. All memory sections in the same groups pass at the same time but only one section is used per group in one cycle of selection. The final selection is one of M final groups. Each final group may have a maximum of $\log_2 N$ storage sections all of which must be passed in one cycle of operation to produce any one of a maximum of $N$ selected output operations which define a maximum of $N$ forced input signal classes. The steering memory sections do not include those in the group $\log_2 N$.

The learning machine learns to select each of the M final groups on the basis of the number of signals directed into a final group as a fixed ratio of the total number of different input signals received by the machine. In one form of this type of learned selection, each steering storage section has stored, adjacent to those portions of storage medium which stores the respective $G_j(t)$ memory signal, a digital number $N_1$ which represents the count of the number of times that the associated storage section has been used. The next selected storage section has a number $N_2$ stored into it. Every time a storage section is used one is added to the number. Means are provided to recover these numbers from storage and a computation made of $\frac{1}{2}N_1-N_2/\frac{1}{2}N_1=Z$. If this ratio is negative in polarity then means are provided to add a weighted function of Z and reversed $F_i(t)$, then being received, to the $G_j(t)$ associated with $N_1$ thus tending to cause steering away from the selection which makes $N_2$ larger. If this ratio is positive in polarity then a weighted function of Z and direct $F_i(t)$ is added to the $G_j(t)$ associated with $N_1$, thus tending to cause steering more in the direction to increase $N_2$. If $Z=0$, no correction of steering is made. Instead of $\frac{1}{2}N_1$ which causes all of the M final groups to receive an equal number of signals, it is possible to choose some other predetermined fraction P giving $PN_1$ to control a predetermined number of signals which are to be directed to the respectively selected final groups.

A feature of the above type of learned selection of memories is that during the actual time of learning storage sections are selected and final subdivisions of input signals are made in accordance with the frequency of occurrence of the input signals. If a prepared list of input signals, such as a list of words, is made in which all signals therein are presented to the machine each with equal frequency of occurrence and $P=\frac{1}{2}$, then over a sufficiently long period of time the number of signals directed to the storage sections of any given final group are equal to the number directed to the storage sections of any other final group. If the frequency of occurrence of the signal $F_i$, where $i$ identifies the signal, is normalized and equal to $p_i$ being then a measure of its probability of occurrence, then the sum $$\sum_1 p_i$$

of the probabilities of the signals directed to any given final group is equal to the corresponding sum for signals directed to any other final group. If P is not equal to $\frac{1}{2}$, the stated sums then would be multiplied by constants in accordance with the values of the P's. To normalize $p_i$ a sufficiently long period of time should be used in order to obtain closely representative probabilities of occurrences.

In the process of learning to select memories the assignments of $B_i$ are self-assignments which take place in the following manner: The gap around zero does not exist, and there is no upper bound to limit the production of a digitalized response when $V_{ij}$ is positive, and there is no lower bound to limit the production of a digitalized response when $V_{ij}$ is negative. When a signal is presented to the machine, whatever polarity is produced of $V_{ij}$ is the assigned polarity for $B_i$. In learned selection such a polarity assignment is reversed only under control of the polarity of $r$. In accordance with this invention self-assignment may be used also as a method of assignment of $B_i$ independently of whether or not learned selection of memories is utilized.

Another feature of this invention is to provide further means for the selection of storage sections, which when selected, can be used for the production of learned output codes which are the responses to a maximum of N classes of input signals. A first stage of learned selection may be utilized to produce output codes associated with a corresponding number $n_1$ of classes of input signals, wherein every signal in each class produces the same output code. Any signal in one forced class among the $n_1$ classes can be used to select a specific storage section or a specific set of storage sections. The latter can be used to store second stage memory signals $G_j(t)$ which are operated only with the signals in the one stated class. In turn, the stated class can be forced into $n_2$ subclasses each of which can be used to select a distinct output code which can be used to select third stage storage sections. The process can be continued to $n_3, n_4, \ldots$ and $n_r$ subclasses of input signals. The total number of classes of input signals which can be forced would be the product $(n_1 \cdot n_2 \cdot n_3 \cdot \ldots n_r = N$ classes, each of which can be used to select one of a maximum of N output codes.

In connection with one form of implementing the non-linear adaptations of the learning machines, a feature is to utilize a source of high frequency signal such as a sinusoidal or square wave voltage signal whose frequency is above the highest frequency signal component of the system which carries significant information content. This source of signal produces $\delta g(t)$ which is added to $G(t)$ as recovered from storage to obtain $G(t) + \delta G(t)$. The latter signal is applied to the $M_1$ operator which can consist of a nonlinear multiplier. A high-pass filter can extract $\delta e_{ij}(t)$ from the resulting error $e_{ij}(t)$. The rest of the operations can be produced by the various mathematical operators of the type described above. Instead of the high-pass filter $V_{ij}(t)$ produced by $G(t)$ can be subtracted from the value of $V_{ij}(t)$ produced by $$G(t) + \delta G(t)$$

to yield $\delta e_{ij}(t)$.

Another feature for normalizing signals with respect to duration is to provide a cathode ray storage tube with target storage area and a scan beam wherein the beam moves at first rate for recording of the input signal, and the beam moves at a second rate for read-out which may be different from the first rate, in order to produce output signals of constant duration. In one adaptation the recording rate of scan is constant for all signals, and the read-out rate is proportional to the duration of the input signal. In another adaptation the recording rate is inversely proportional to the duration of the input signal and the read-out rate is constant. The storage tube may also serve as the temporary input storage means for the input signals. In a further adaptation read-out of the same stored signal is repeated for each of a group of memory signals $G_j(t)$ to produce the same $F_i(t)$ as the index $j$ is varied to bring each of the specified $G_j(t)$ into operation in turn.

In those adaptations of the learning machines of the kind described in which signal sequences are presented, or in which a large variation in the rate of presentation of signals occurs, input signal buffer storage units are preferred to temporarily store the input signals prior to their presentation to the recognition equipment. In one form of the input buffer storage a magnetic tape recording and playback system is used in which there is a recording station to record received input signals, and a reading station for playback of the recorded signals. Between the recording and reading stations there is slack position of the magnetic tape to store an accumulation of recorded input signals which are presented at a faster rate than can be processed by the learning equipment. The learning equipment will request and start the playback of any recorded signal which appears first at the reading station. When a signal has been received by the learning equipment and is being processed the tape stops at the reading station until the equipment is finished processing the signal. Then the next signal recorded on the tape will move to the reading station by request of the machine. In the meantime, input signals can be recorded as they are presented from the signal environment and accumulate in the slack positions of the tape. Another feature is to use a reversible counter which counts in the forward direction when signals are received at the recording station, there being one count per signal segment received. Every time that a recorded signal is read at the reading station the counter counts one count in the reverse direction. The total count represents the number of input signal segments stored in the positions of the tape between the recording and reading stations. When there are no signals stored the count is zero and a request for playback will not cause any movement of the tape in the reading station. In the case of meaningful sequences the end of a sequence can be identified by an end-of-sequence mark on a separate track obtained by lack of the occurrence of a signal for a predetermined interval. This can be used for learning to identify the end of a sequence by the learned operation of a sequence control output bit whose digitalized condition controls final read-out of the entire output code to an output utilization register according to whether or not a sequence of input signal components has been received which, taken as a whole, produces a meaningful response. The end-of-sequence marks can be used to identify the end of sequences even without the learned sequence control output bit as an optional feature. When used the sequence control output bit can be useful after learning has taken place and the tape buffer storage unit has stored into it a partial sequence of signal components which must not produce a final read-out until more sequence components are received. The output of the tape input signal buffer storage unit as playback signals from the reading station can be applied to the cathode ray storage tube, of the type described above, for normalizing the signals with respect to duration or for synchronizing and adapting the signals for use with the $G_j(t)$ memory signals, or both, in one form of practicing this invention.

In such applications in which the buffer storage units of the above type are used, and wherein the start time needed to bring the tape up to normal speed is long enough so that early portions of the input signal may fail to be recorded on the tape, it is preferred to use a start anticipator circuit and buffer start storage unit. The latter unit in one adaptation can take the form of either a continuously moving magnetic tape or drum unit, having a recording station with a recording head for continuous recording of the input signals being received. A reading station located at a suitable distance from the recording station will give a playback of the recorded input signals with a delay great enough to allow the buffer storage unit time to start in response to the start anticipator circuit. The latter starts to actuate the buffer storage unit very quickly after a signal is received. The recovered signal by playback is applied to the buffer storage unit, which latter unit will have had sufficient time to attain full recording speed when the delayed signal is applied so that no portion of the received signal will fail to be recorded.

When the received signals consist of relatively high frequency component signal carriers modulated by lower frequencies, such as speech signals, it is preferred to first demodulate the signals and extract the envelope as demodulated signals and then to apply the latter to the learning equipment. In another form the input signals are first passed through a filter which has an increasing response for the higher frequencies. A differentation circuit can do this, for example, since $$\frac{d}{dt}(\sin \omega t) = \omega \cos \omega t$$

which makes the increase of amplitude proportional to $\omega = 2\pi f$ where $f$ is the frequency in cycles per second. The demodulation would take place after differentiation. The effect of this is to make the demodulated signal $F_i(t)$ change to $K \cdot F_i(t)$ when all the frequencies are shifted in the same proportion, where K is a constant. If this is used in the adaptation which makes learning independent of amplitude, as is described in detail hereinbelow, the effect will cause the responses of the machine to be corrected without further learning, from signals with melodies or chords or signal combinations in which the only change is the key in which the melody or chord is presented or the only change is a multiplication of all frequencies by a constant. Another manner of processing speech signals and signals of related characteristics is to utilize the demodulated outputs of both the straight frequency transfer demodulated output and the differentiated frequency transfer demodulated output with reversed polarity, and then to apply the combination of these signals as an input signal to the learning equipment. A still further manner of processing this class of signals is to provide a set of filters with different transfer characteristics, and then to provide the demodulated combined outputs of the filters as a signal to the learning equipment.

In a detailed version of the use of a set of filters, a first cathode ray storage tube is utilized to store the input signal $f_{11}(t)$ wherein the beam moves at a constant rate for storage. Then the beam is moved at another constant rate for read-out. The read-out is repeated by retracing the same storage positions as many times as there are filters, with no substantial interval of time between the instant at which the end of the stored signal is read and the start of read-out of the beginning of the stored signal for the next retracing read-out. At each repeated read-out of the same signal a different filter is switched into the read-out circuit such that the output of each filter passes the read-out signal in accordance with frequency transfer characteristics of the filter. The output of each filter is demodulated to extract the envelope signal. The demodulated outputs of all the filters are combined to produce a single signal made up of a set of successively occurring filtered demodulated signals which together comprise signal $f_{12}(t)$. One of the filters can have substantially constant frequency transfer characteristic. The signal $f_{12}(t)$ is next applied to a second storage tube of the type already described for normalizing the duration of $f_{12}(t)$. The read-out of the second storage tube is applied to the learning equipment as normal signal $f^*_1(t)$. In a further adaptation a Q function of $f^*_1(t)$ and $T_{i-1}(t)$ is produced by operators such as an adder, multiplier, squarer, integrator, and square-root operator by means described elsewhere herein to produce a derived signal which is presented to the learning equipment proper. The effect of providing the above set of demodulated filtered signals is to retain information regarding the amplitude and presence of the carrier signal frequencies while at the same time information regarding the phase of the carrier frequencies is discarded since, in the case of speech for example, the phases of the carriers are not normally required to contain information. On the other hand, the phase and amplitude of the envelope frequencies have significant information and are retained. Moreover, the learning equipment proper can deal more effectively with the lower envelope frequencies. This method of changing the input signals provides a large number of dimensions for the space occupied by the signals thus increasing the maximum number of forced classes of signals per $G_j(t)$ function. At the same time the signals are normalized. Also, the carrier frequencies have a fixed representation in time of occurrence of the $G_j(t)$ functions and fixed locations in the memory thus providing correlation of phonetic characteristics, and this also makes continuous sounds such as vowels identifiable.

Reference is made above to the use of $$\sqrt{U_i} = \sqrt{\int_{t_1}^{t_2} F_i^2(t)\,dt}$$

for normalizing the amplitude of the input signals. In the linear or non-linear cases dividing the input signals by either $\sqrt{U_i}$ or $$\int_{t_1}^{t_2} |F_i(t)|\,dt$$

will make the response of the machine independent of any stretch or contraction of the input signal, because these divisors will be stretched or contracted in the same manner and the quotient signal, as a function of time, presented to the learning machine as the actual input signal will be unchanged. The same result may be achieved in the learning machine with linear operators by making the assignment $$B_i = \pm \sqrt{U_i}$$

or $$B_i = \pm \int_{t_1}^{t_2} |F_i(t)|\,dt$$

because when either one or the other of these values is inserted in the formula for the error function no change in its value is obtained for any value of K in $K \cdot F_i(t)$ if the latter replaces $F_i(t)$, where K is a positive stretch constant. If the first mentioned normalizing method is used it is preferred that $B_i = \pm 1$, a constant with the polarity assigned in teaching. In the second mentioned amplitude normalizing method the assignment consists in teaching the polarity of the magnitudes. Another feature of this invention is to provide a comparator to establish the range or gap control referred to above. Such a comparator has two basic reference voltages. When these are made equal to $\sqrt{U}$ and $-\sqrt{U}$ or $$+\int_{t_1}^{t_2} |F_2(t)|\,dt$$

and $$-\int_{t_1}^{t_2} |F_i(t)|\,dt$$

this will complete the requirement for amplitude invariance by the second mentioned method. The reference voltages are compared to the actual output $V_{ij}$ and two gaps are provided whose range can be manually adjusted, whereby if $V_{ij}$ has a sign and magnitude within one or the other of two gaps one or the other of two corresponding trigger circuits are actuated to determine the digitalized output state. As different $G_j(t)$ memory signals are brought into operation with the same $F_i(t)$, a series of digitalized output states of the comparator are produced. These operate a shift register in one adaptation. At the end of the series the digitalized state of the shift register is transferred, if other criteria are met, to an output utilization register.

If it is deliberately desired that learning takes place to distinguish a signal when its amplitude is multiplied by a constant then, in the linear machine, a non-linear operator can be inserted in the circuitry of the input signal prior to its presentation to the learning equipment proper. One form of a symmetrical operator could be either the cube-root compressor or expander, referred to above. A non-symmetrical nonlinear operator can be inserted in the path which will make it possible to learn both changes of amplitude and reversals of polarity of signals with the same form. A nonsymmetrical operator can be obtained, by way of example, with a cube-root compressor with the solid state diodes which produce one-half of the overall transfer having different characteristics than the other solid state diodes which produce the other one-half. One method of achieving this is to provide either shunt or series resistors with one of the sets of diodes.

In the case of input signals such as those derived from speech, in which demodulation is provided to transform the signals prior to their presentation to the learning equipment, the process of demodulation itself may be non-linear. This is to be interpreted in the sense that if a set of linearly dependent envelope signals are modulating a carrier frequency signal, after demodulation these envelope signals may become linearly independent. This is achieved by the difference of the charging time constant provided by the demodulation diodes and associated circuit and the discharging time constant when the diodes present an open circuit. The value and difference of these time constants may be predetermined to produce the desired effects. Signals of this type also may be used with the non-linear operators of the above type if recognition to amplitude change of the same signal is desired.

Other adaptations in connection with image recognition are to provide a flying spot scanning system or a mechanical scanning system for converting the images into a voltage function of time. The system can operate with a camera tube such as is used in television. Another feature is to provide scanning of the image in three cycles. In the first cycle of scanning the total flux of the image signal $f_{11}'(t)$ is produced as $$\int_{t_1}^{t_2} f_{11}'(t)dt$$

wherein $t_1$ and $t_2$ are the beginning and end respectively of the interval of scanning. The instants $t_1$ and $t_2$ are determined by detection of the magnitude of $f_{11}'(t)$. A signal which is proportional to the vertical displacement of scanning $y(t)$ is produced with respect to a reference axis along the horizontal direction. Then $$f_{11}'(t) \cdot y(t) = f_{12}'^{*}(t)$$

is computed as well as $$\int_{t_1}^{t_2} f_{12}'^{*}(t)dt$$

The latter is divided by $$\int_{t_1}^{t_2} f_{11}'(t)dt$$

to produce $\bar{y}$ which, in turn, is added to the vertical scanning circuit to shift and correct the reference axis. This finishes the first cycle of scanning. In the second scanning interval the scanning signal is $f_{11}(t)$ instead of $f_{11}'(t)$ because of the shift of the scanning axis. Then $f_{11}(t)$ is multiplied by $y(t)$ producing $f_{11}(t) \cdot y(t) = f^{*}_{12}(t)$. The latter has both positive and negative polarity values. In the second cycle of scanning one of these polarities alone is transferred to an output circuit through a first rectifier. This may be either positive or negative, but without loss of generality refer to this as the positive part of $f^{*}_{12}(t)$ in the second cycle of scanning. In the output circuit the signal is $f_{12}(t)$ in the first interval of its occurrence. Then a third cycle of scanning is produced over the same image and $f^{*}_{12}(t)$ is produced again substantially, or a signal which serves the same purpose. Then $f^{*}_{12}(t)$ is transferred through a second rectifier of reversed polarity with respect to the first to pass the negative part of $f^{*}_{12}(t)$ to the output circuit. In the output circuit signal $f_{12}(t)$ is produced in the second interval of its occurrence whereby $f_{12}(t)$ is then completely formed. Signal $f_{12}(t)$ is then presented to the learning equipment which normalizes it with respect to duration and amplitude. The production of $f_{12}(t)$ into completely shifted positive and negative portions eliminates the necessity for the learning equipment and memory means to be accurate down to very short intervals of time in which the signal fully reverses in polarity. The vertical scanning is rapid and successive scanning lines are closer than the finest detail which must be recognized. As presented to the learning equipment $f_{12}(t)$ can be smoothed to filter out the high frequency components due to vertical scanning. While it was mentioned previously that vertical scanning is more rapid than horizontal scanning, this was done by way of example only. The horizontal could be the faster rate, in which case the shifted scanning axis referred to above would be in the vertical direction and other appropriate and obvious corresponding changes would be made. This method of scanning images can be used for the recognition of images, which when once recognized, can be presented with any independent magnifications or contractions in the vertical and horizontal directions and still be recognized. Images with full range of variations of intensity of light can be recognized wherein such variations may contribute to the significant signal content for recognition. For reading printed and written information the scanning range is slightly larger than a letter or word depending upon which is to be considered an information unit. In the case of letters the horizontal scanning is from left-to-right and stops at the extreme right of each letter and resets at the left side of the letter for each of the second and third scans. At the end of the third scan of the same letter the scanning will not reset but will be moved further to the left for the scanning of the next succeeding letter. Integrators may be used to store reference voltages of the horizontal and vertical deflection circuits to maintain the center of scanning in the proper positions. By inserting additional signals into the integrators the center of scan can be moved into any desired position.

In the above described image recognition system the production of signal $f_{12}(t)$ from $f^{*}_{12}(t)$ is done when invariance of recognition with respect to vertical magnifications of the images is necessary. If this requirement is unnecessary then signal $f_{12}(t)$ may be derived from signal $f_{11}(t)$ wherein the latter's positive and negative values are shifted in a manner similar to that described above for $f^{*}_{12}(t)$. The determination of $\bar{y}$ is unnecessary if the scanning system has a fixed reference axis of scanning with respect to the image which is established by external positioning means. Any light signal picked up by photoelectric devices converting the same into electrical signals, whether or not scanning is involved, may be used as input signals to the learning machine. When scanning is involved the center of scanning may be shifted from one position to successive other positions producing a series of input signals $F_1(t)$, $F_2(t)$ ... $F_n(t)$ and a corresponding succession of $G_j(t)$ memory signals may be switched into operation, thereby producing a set of output operations, which together may be utilized for a complete recognition of the sequence, or the sequence of input signals may be treated in the manner described above in connection with Q functions. The shifting of the center of scanning may be controlled by the output operation or code produced by the previous input signal instead of predetermined control. The method of switching memory signals when successive input signals are received may be done also for any form of input signals to the learning machine derived from speech or other sources.

Various criteria may be used under optional manual control for teaching and learning. If the output signal $V_{ij}$, referred to above, falls in the gap established in the comparator which has the same polarity as the teaching assignment of $B_{ij}$ or if $V_{ij}$ falls in the zero gap and the teaching assignment is $B_{ij}=0$, then in one mode of operation under optional control no error function will be produced and the memory signals will not be modified. But if $V_{ij}$ falls outside of the respective gaps which are called for by $B_{ij}$ then an error function is produced and the corresponding $G_j(t)$ signals will be corrected. A further criterion, also under optional manual control, is that learning will take place at all times so long as $\Delta G_{ij}(t)$ exists and is not equal to zero, and recirculation of the memory will take place even when $\Delta G_{ij}(t)=0$. A still further condition which may be controlled manually is that no learning or correction is to take place at all regardless of $\Delta G_{ij}(t)$. Then the machine is under operation-mode only in contrast to operation-mode-and-learning mode. A further adaptation is to provide methods and means for producing the error function and directing it into the memory to be algebraically added to $G(t)$ by manually assisted adjustments and controls. Such methods and means are described in detail hereinbelow. Of course, the preferred form of teaching is by teaching keys or auxiliary automatic teaching units, and the generation of $\Delta G_{ij}(t)$ and addition of it to $G_j(t)$ is fully automatic. The latter is also described in detail hereinbelow.

By optional manual control it is possible to bring into active operation the various modes of utilizing the learned recognition of sequences referred to herein which include modes A and B. The operating mode alone or the operating-and-learning mode of the machine can be referred to as the operating and teaching modes respectively. Optional manual control to place the machine in either operating or teaching mode can be accomplished. With either of these it is possible to use other optional features jointly in a variety of combinations. By optional control, mode B can be used under the sole control of the end-of-sequence mark in the input buffer storage unit, whereby the mark determines the end of a sequence of signals. By further optional control the end of a sequence can be placed under joint control of the mark and the sequence control output bit. Under operating mode and joint bit and mark B mode control an internal start signal is generated after a predetermined delay if before that delay an environmental signal has not been received and the sequence control bit calls for the continuation of B mode after the buffer has produced the mark. The internally started signal will then cause the sequence to continue based upon the information content of $T_{rk}(t)$ alone.

Mode A is the designation given for the state of operation of the learning machine in which learning and recognition are accomplished with respect to any one received input signal in which the signal produces a sequence of specific learned output codes. Such a situation arises, for example, when the learning machine receives an input signal produced from a spoken word and this is required to produce a sequence of codes wherein each code represent a corresponding letter of the spelled word. This kind of sequence of codes can actuate an electric typewriter to actually print out the word. Whenever any kind of signal is received which requires the production of an output sequence of responses consisting of an output sequence of codes wherein each code consists of a set of binary bit, mode A operation may be utilized.

Mode A sequencing is produced in a preferred form by receiving an input signal such as $f_i(t)$ and producing normal signal $f^*_i(t)$ from it. Then the normal signal is held in temporary storage until the whole operation of mode A is completed and all the codes in the output sequence are produced. For example, one manner of accomplishing this is to produce a first output code from $f^*_i(t)$. This is a forced output code produced from the G-memories associated with certain selected M subdivisions of signal classes. Another code $C_{i1}$ is produced which includes the count of a sequence status counter which starts with count 0 and adds one to its count for each succeeding output operation produced. Code $C_{i1}$ produces transformation signal $T_1(t)$. A Q function of $f^*_i(t)$ and $T_1(t)$ equal to $Q[T_1(t), f^*_i(t)]$ is produced as a derived signal. The latter is input to the learning equipment which then produces a second output code. The sequence status counter adds one to its count and $C_{i2}$ is produced. Then $C_{i2}$ produces $T_2$. This, in turn, produces another Q function $Q[T_2(t), f^*_i(t)]$ which is input to the learning equipment to produce a third output code. The operation continues in this manner until a final code is produced which is the last member of the codes to be required for output utilization. If $n$ is a positive integer whose maximum value is the number of members in the sequence, then another code is produced, in a preferred adaptation, designated as stop-code $C^*_{i(n+1)}$ which can be the same for all mode A sequences. Code $C^*_{i(n+1)}$ can be detected when it occurs and this can be used to restore the learning machine by clearing the $f^*_i(t)$ signal from the temporary storage and by clearing the sequence status counter and restoring the machine and preparing it for receiving any other input signal which may occur. Another manner of accomplishing mode A is to utilize any code $C_{i1}$ to switch into operation a set of $G_1$-memories associated with the index $K=1$, and then to permit the same $f^*_i(t)$ signals as recovered from storage again, to operate with the memory signals in the $G_1$-memories.

Then $C_{i2}$ is produced. This code, in turn, selects $G_2$-memories which operate with $f^*_i(t)$ to produce $C_{i3}$, and so on, until the total sequence of output codes is produced.

This latter method and the former described method may be used in combination, so that a portion of the bits of $C_{ik}$ may be used to switch memories, while the remaining portion may be used to produce the Q functions. This combined type of feedback may be used for both mode A and mode B operations.

Another feature is to utilize operation in B mode first to to produce the applied signal $F_i(t)$ which represents a whole input sequence of signals, and then to switch the operation of the machine from mode B into mode A. Operations in this manner would permit the machine to give a sequence of output codes in response to an entire sequence of received input signals. For example, a spoken sentence could cause the production of a sequence of output codes which could be utilized further to print-out spelled out sequences of words to represent the spoken sentence.

Mode C is the designation given for the state of operation of the learning machine in which learning and recognition are accomplished with respect to single input signals wherein a specific received input signal produces a single coded response. Modes A, B, and C may be controlled by a portion of the actually learned and produced output codes, thus the machine learns which mode to go into next. Absence of either mode A or mode B can be made the condition for mode C.

In connection with the production of the $T_{rk}(t)$ transformation signals, a preferred method of accomplishing this is to provide for the transfer of the code $C_{rk}$ into a digital counter in which the code sets the code count of the counter. Then a series of pulses is applied to the counter to permit the count to add one for each pulse applied. When the end of the count is reached a reset pulse is generated. Then the counter is reset to zero and the code $C_{rk}$ is again transferred to the counter and the counting by the pulses is repeated until a new reset pulse is generated. The operation is continued in this manner for the production of a sequence of reset pulses which occur with an interval of separation dependent upon code $C_{rk}$. For each distinct $C_{rk}$ there is produced a distinct series of pulses. The series of pulses can be used to produce in one adaptation, a series of square waves many of which are applied for each interval of time in which $G(t)$ occurs. In such an interval the series of square waves is signal $T_{rk}(t)$. The square waves may be produced by permitting each pulse in the series to turn a bi-stable flip-flop from its current state to the other state. The signal $T_{rk}(t)$ may be derived from the flip-flop. The $T_{rk}(t)$ signals, thus produced, are distinct and linearly independent.

Another object is to provide more than one learning machine of the above type to operate together. In one adaptation, this may be achieved by utilizing any output code $C_{rk}$, which is transferred to an output utilizing register of a first machine, to produce a corresponding signal $T_{rk}(t)$. The latter is then applied as input to a second learning machine. If $C_{rk}$ represents a sequence in mode B, then each signal into the second machine represents a sequence of inputs in the first machine. In a similar manner, the outputs of the second machine may be applied as inputs to a third machine, and so on for other machines, up to the $n^{th}$ machine. If the output of each machine is learned, then the final output of the $n^{th}$ machine is a learned output code, which is a highly efficient coded representation of the long signal sequence of the first machine. The machines may be used in any of the various modes. For example, all but the last machine could be operated in mode B. The last could be mode B first, followed with mode A. Then the final output could be made to represent a series of coded responses produced from a very long input signal sequence into the first machine. The coded intermediate stages would represent significant information regarding the subdivisions of the long input signal sequence. Memory efficiency is high since, in steering feedback, the memory size depends only on the number of information units and not on the number of component signals in each information unit. By connecting machines in series organized information units are obtained which represent more component signals.

Another feature is to connect a series of learning machines each in mode A, wherein each coded output of a given machine would produce a transformation signal $T_{rk}(t)$ which would be applied as input to the next machine, and so on. A signal presented to the first machine could cause the production of a long series of coded responses in the last machine. Great efficiency in coding could be achieved in this manner. For example, if the last machine accepts input signals each of which represents a word and produces printed letter sequences as spelled words, the machine which produces as outputs the input signals into the last machine, must receive input signals each of which represents a whole sentence. The storage capacity for G-memories of the sentence machine is required to distinguish the different sentences, without regard to the internal structure of each sentence, since the details are left for the succeeding machines in the sequence to work out. In this manner the total memory capacity required by all machines is far less than would be required if a complete detailed specification were contained separately for each complex information units stored. The output of a sequence of machines in mode B could be applied to a sequence of machines in mode A thus yielding great overall efficiency of memory capacity.

A further object is to provide learning machines which can be used to translate from one language to another. The inputs to such machines may be speech in one language with the outputs consisting of a sequence of codes to produce typing or printing in another language. In one version, the inputs may be read by the machine in one language and synthetically spoken by the machine as translations in another language, or the read inputs in one language may be typed as outputs in a translated language, or speech inputs in one language may produce speech output in another language. The production of synthetic speech in response to coded signals does not, in itself, form the subject matter of this invention. Various standard means are available for doing this. However, the production of the coded signals to actuate the synthetic speech producer, may be learned and machines in modes A, B, and C would be necessary to achieve the above methods of translation, and the method of operating various machines in both the various modes and in series would provide greater efficiency and capacity.

The above mentioned and other features and objects of this invention and the manner of attaining them will become more apparent and the invention itself will be best understood by reference to the following description and embodiments of the invention, and to the appended claims taken in conjunction with the accompanying drawings, in which:

FIGS. 14, 15, 16, 17, 18, 19, 20, 21, 22, and 23 when assembled as shown in FIG. 24 provide a detailed schematic of one form for practicing the invention, designated as System I.

FIG. 24 is a layout showing how the sheets of FIGS. 14–23 are arranged side-by-side to form a single schematic diagram.

Figure 25:
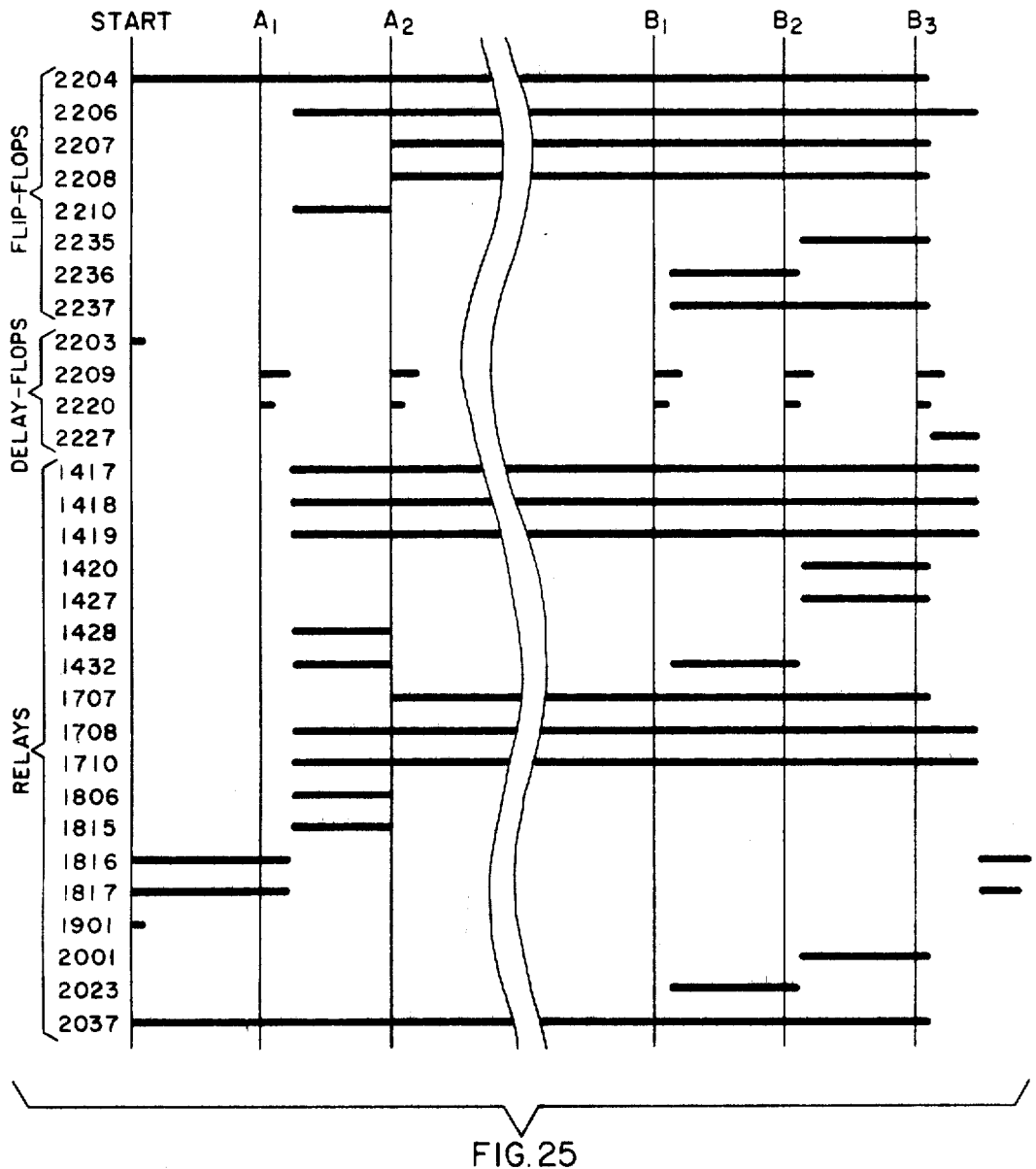

FIG. 25 is a timing diagram for system illustrated in FIG. 24.

FIG. 26 is a schematic diagram of the cathode follower.

FIG. 27 is a schematic diagram of pre-amplifier for the microphone or other pick up devices.

FIG. 28 is a schematic diagram of the AGC circuit.

FIG. 29 is a schematic diagram of the relay driver.

Figures 30, 31, 32, 90, 91:
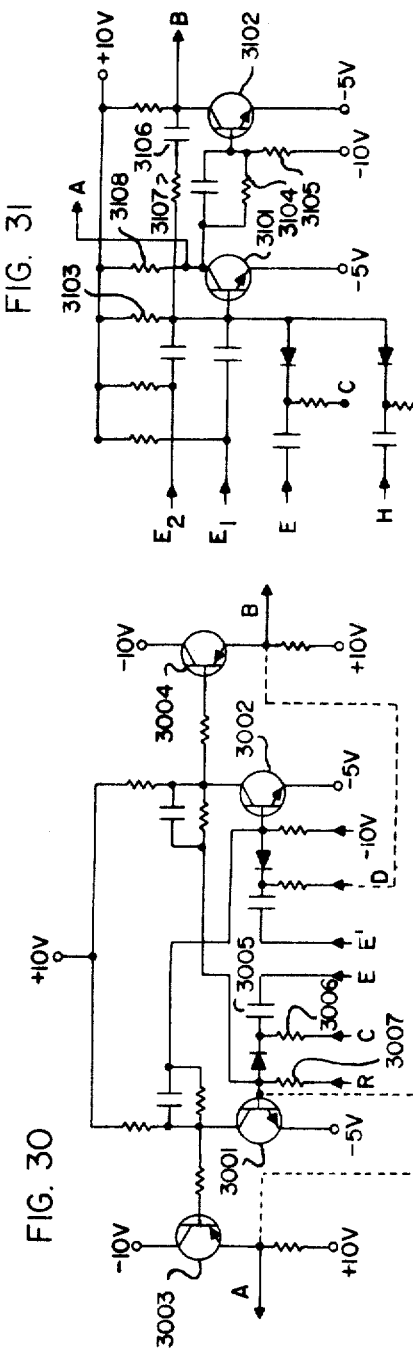

FIG. 30 is a schematic diagram of the bistable flip-flop.

FIG. 31 is a schematic diagram of a monostable flip-flop.

FIG. 32 is a schematic diagram of the output display and zero gap control circuits.

Figure 33:
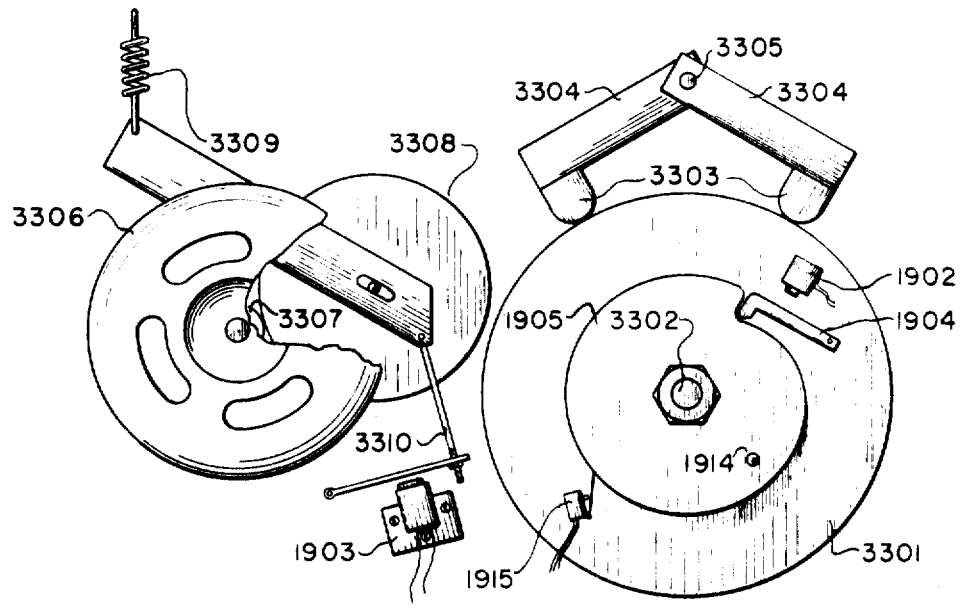

FIG. 33 is a side view of the magnetic drum, heads, and drive.

Figure 34:
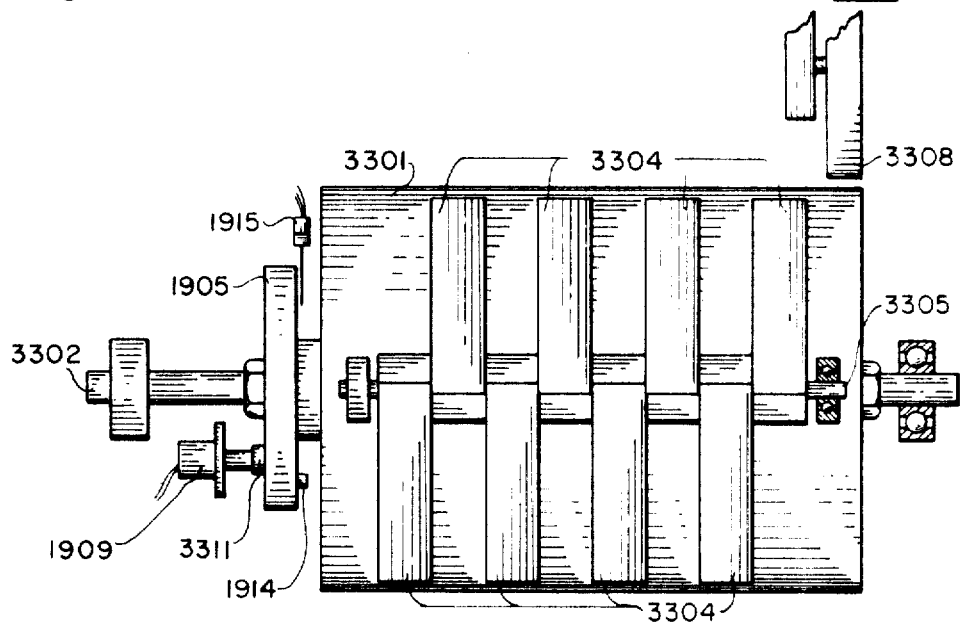

FIG. 34 is a top view of the drum, head, and drive.

Figure 35:
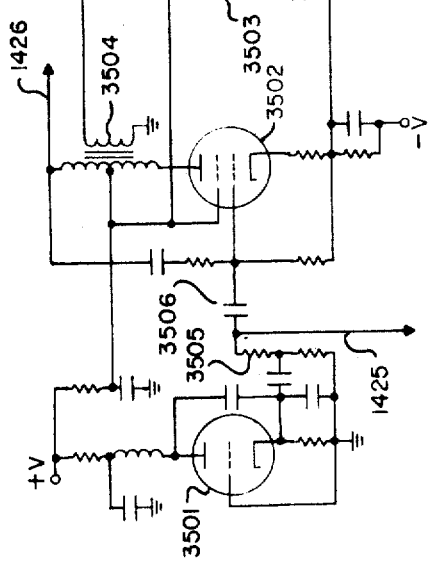

FIG. 35 is a schematic diagram of the erase oscillator.

FIGS. 36, 37, 38, and 39 when assembled as shown in FIG. 40 provide a block diagram of one form of the invention with learned selection of memories and input signal sequence recognition, designated as System II.

FIG. 40 is a layout showing how the sheets of FIGS. 36–39 are arranged side-by-side to form a single diagram.

Figure 41:
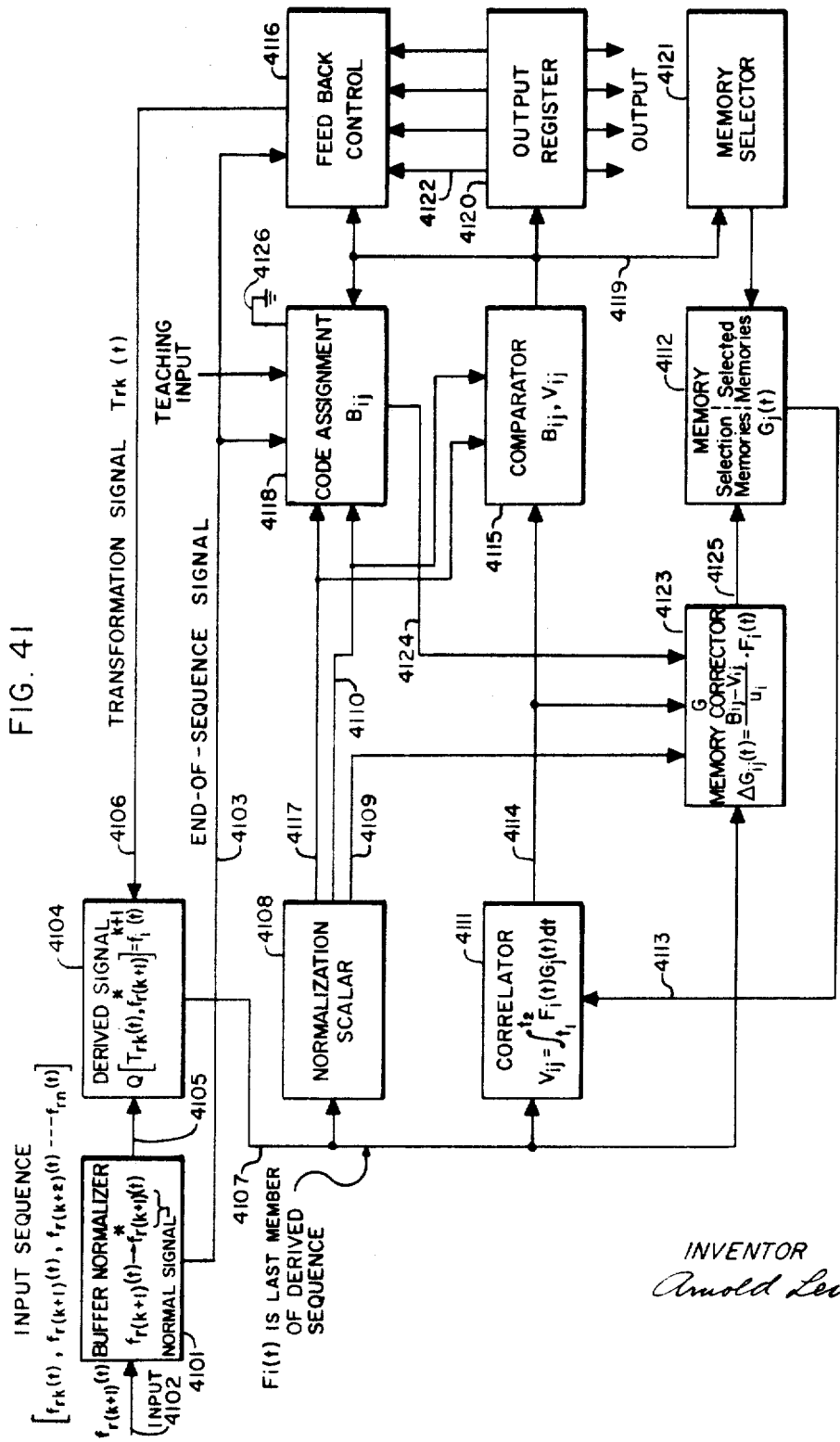

FIG. 41 is a simplified block diagram of the system illustrated in FIGS. 36, 37, 38 and 39.

Figure 42:
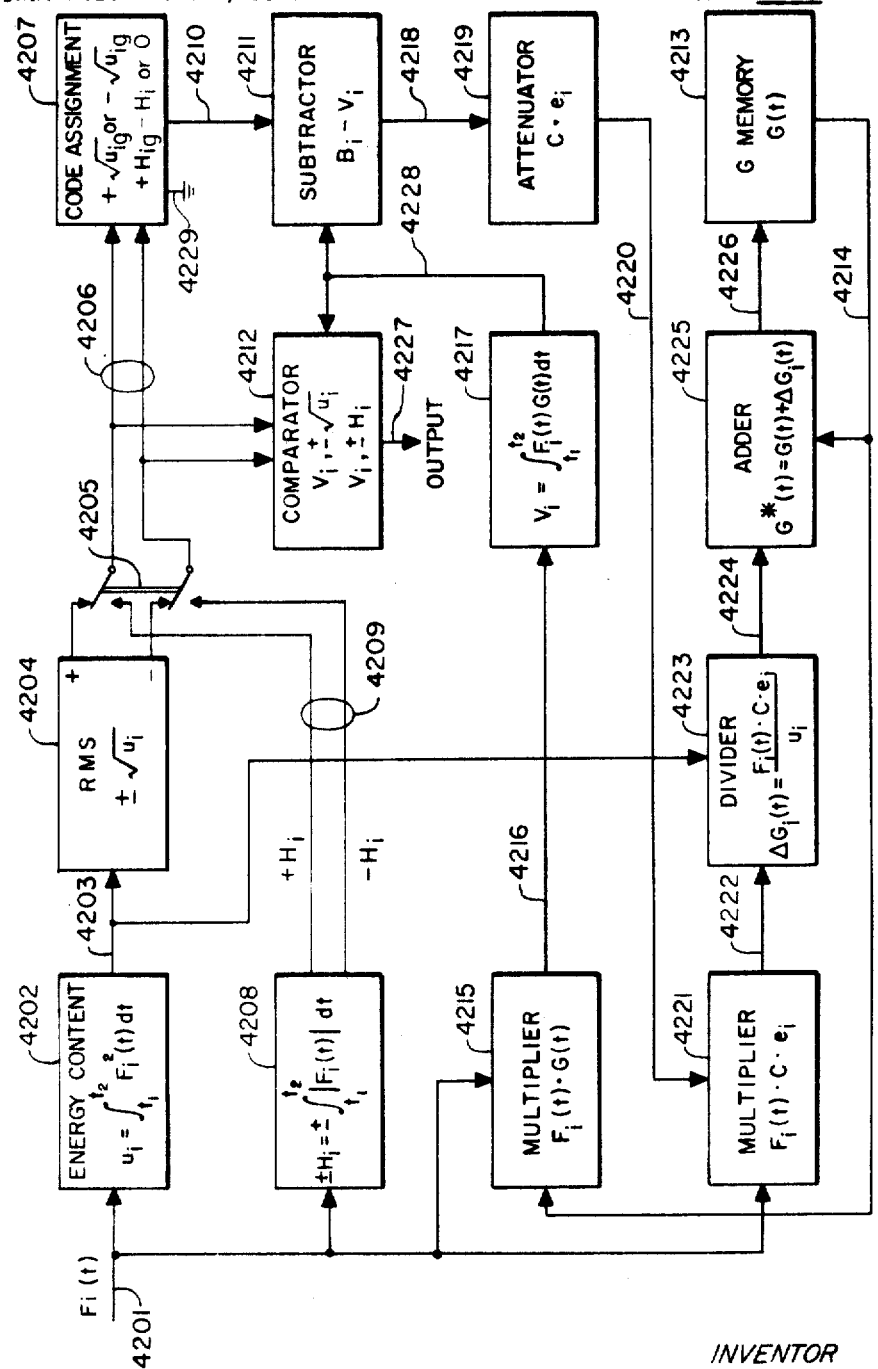
Figure 43:
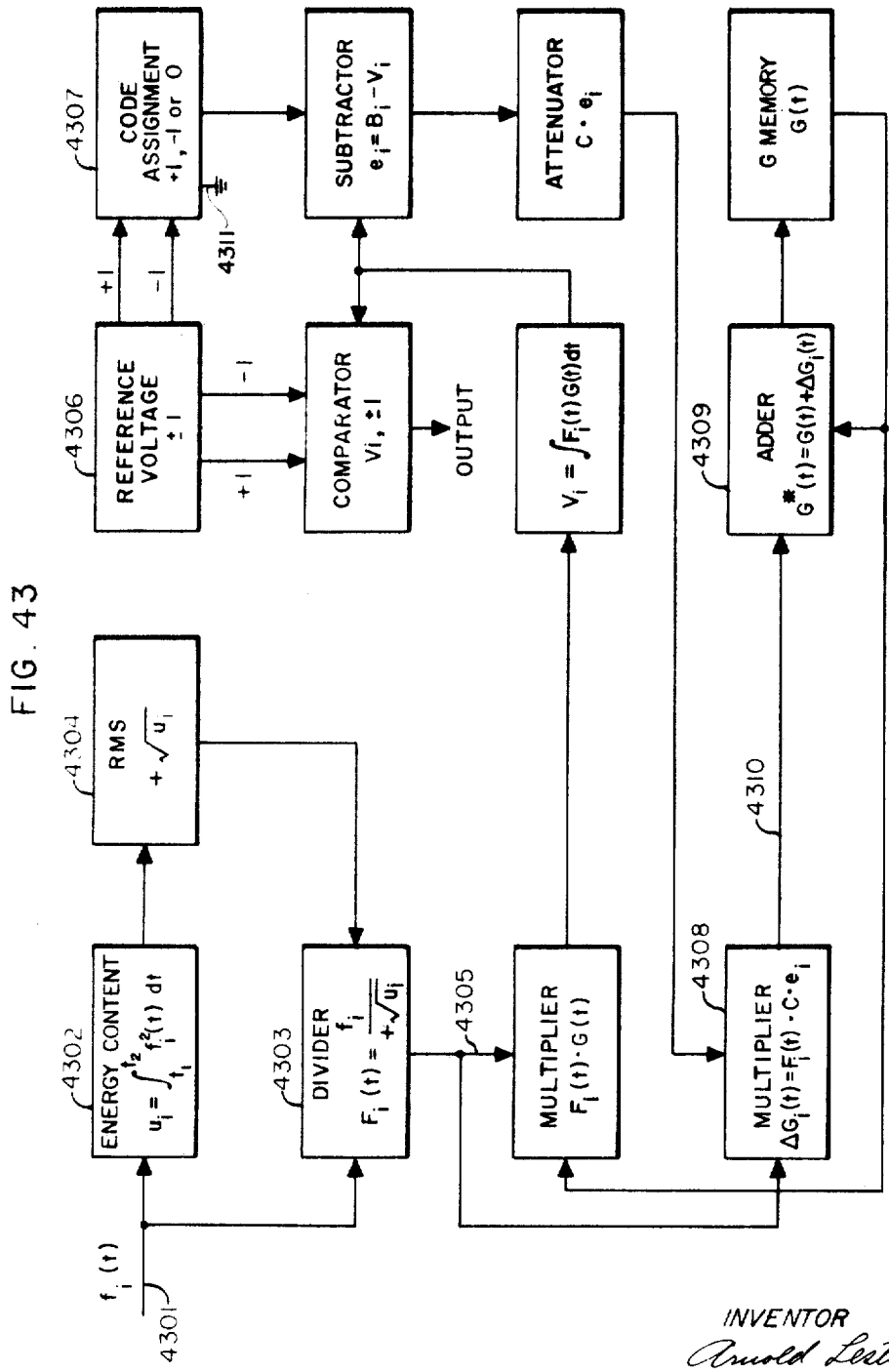
Figure 44:
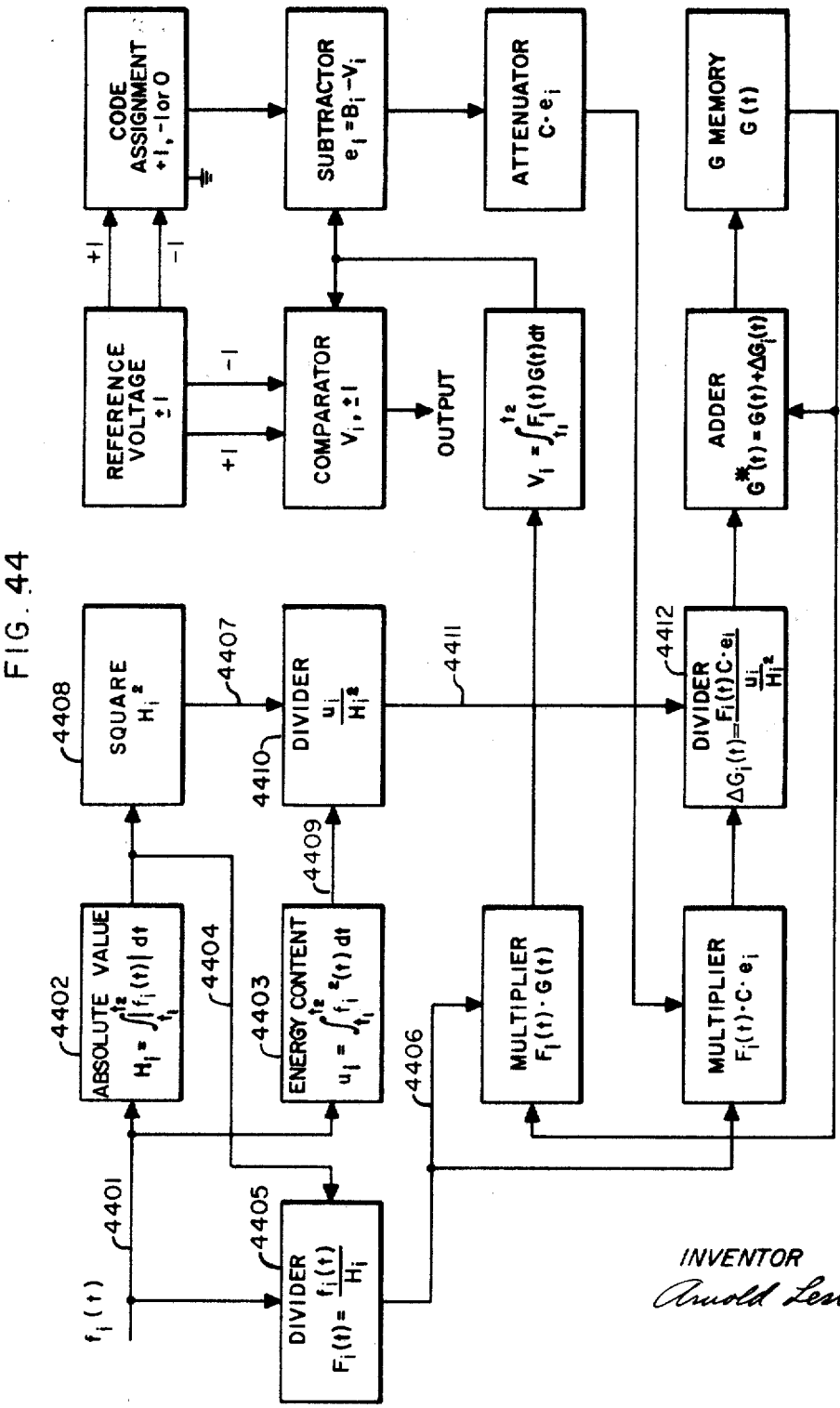

FIGS. 42, 43, and 44 are block diagrams of a first, second, and third methods respectively for amplitude normalizing.

Figure 45:
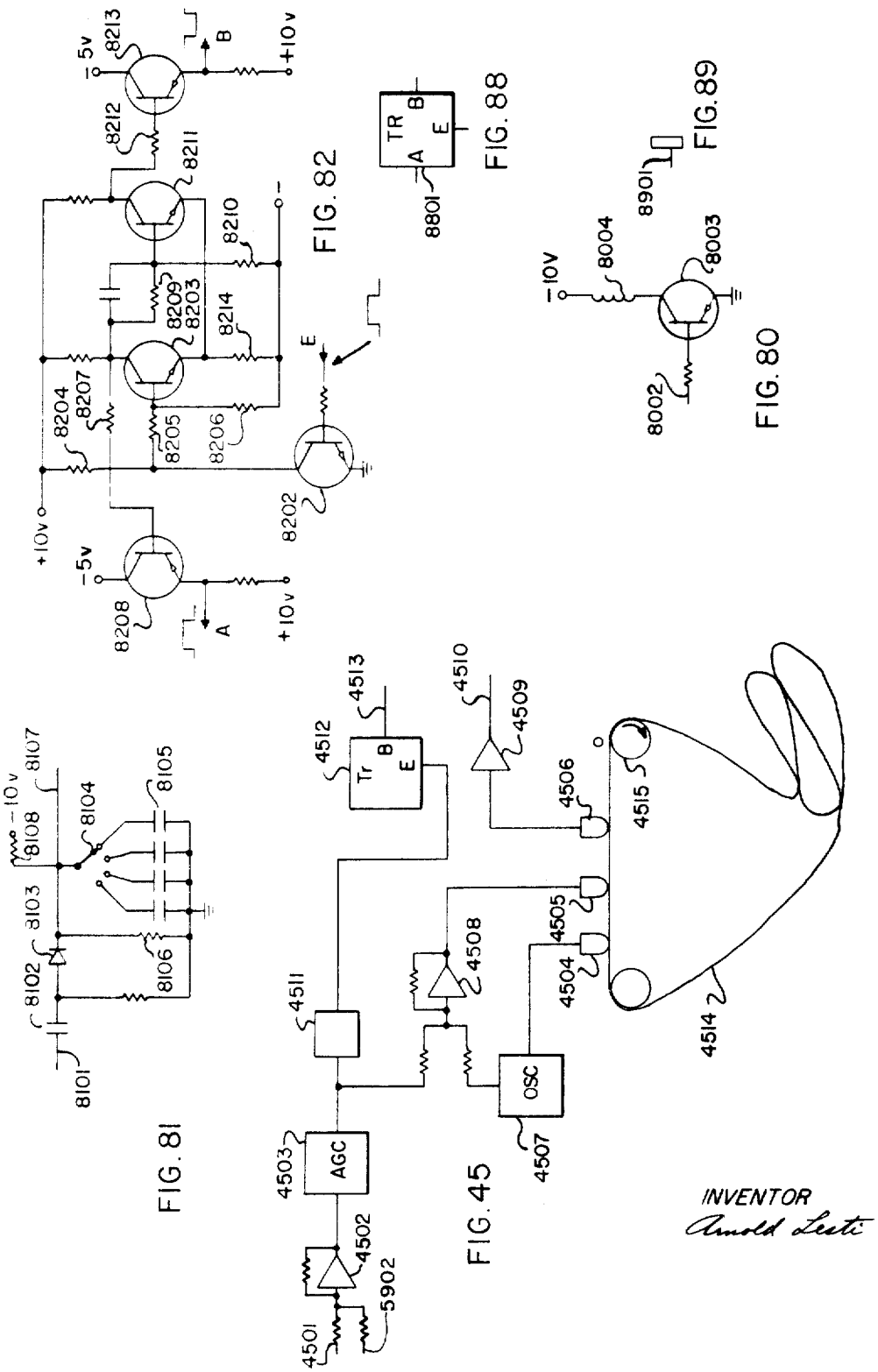

FIG. 45 is a block diagram of the start anticipator.

Figure 46:
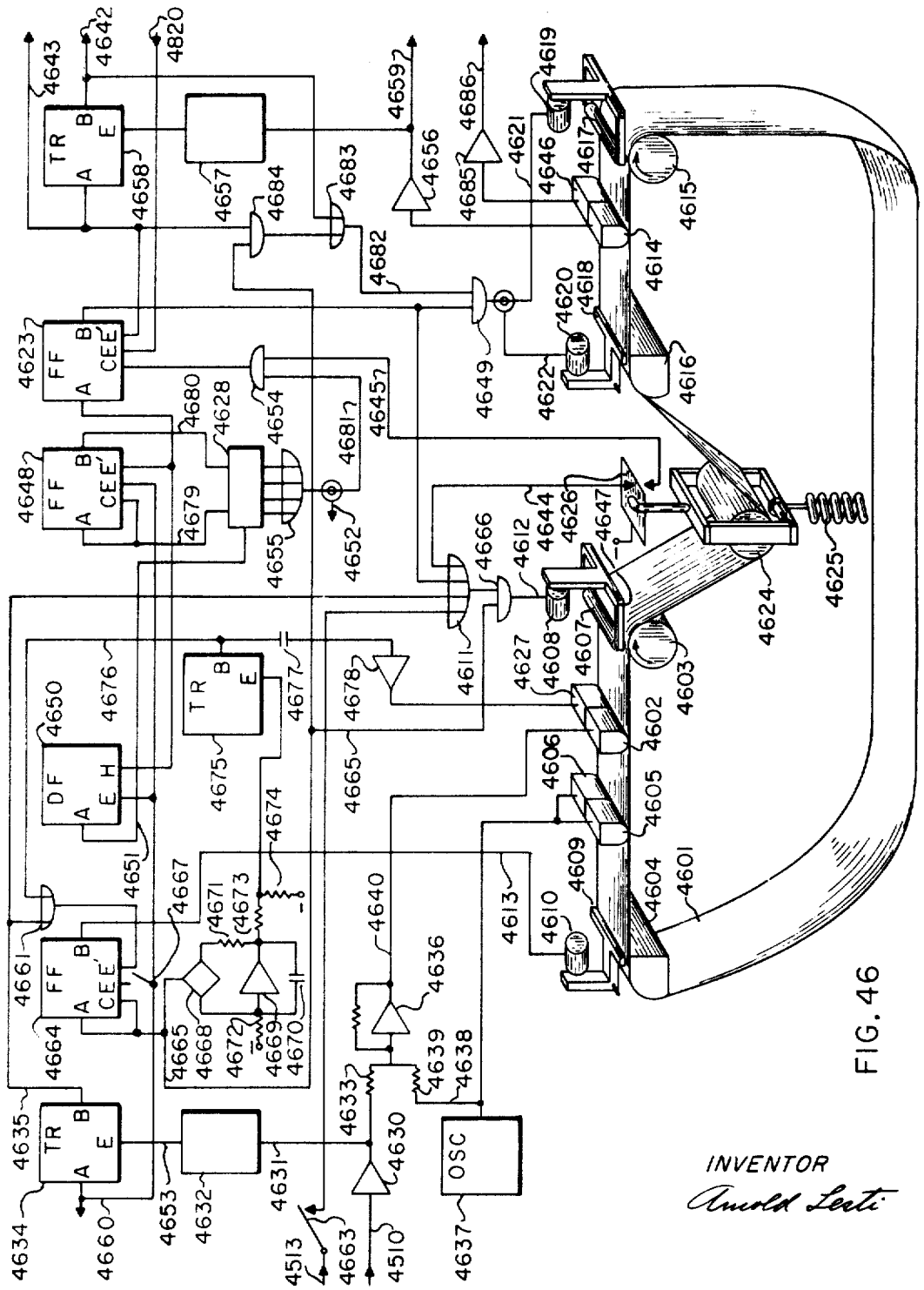

FIG. 46 is a block diagram of the input tape buffer.

FIG. 47 is a schematic diagram of the cathode ray buffer storage tube circuit.

FIG. 48 is a diagram of signal transformation control circuit primarily used for speech input signals.

FIG. 49 is a layout showing how the sheets of FIGS. 47 and 48 are arranged to form a single diagram of the overall signal transformation circuit.

Figure 50:
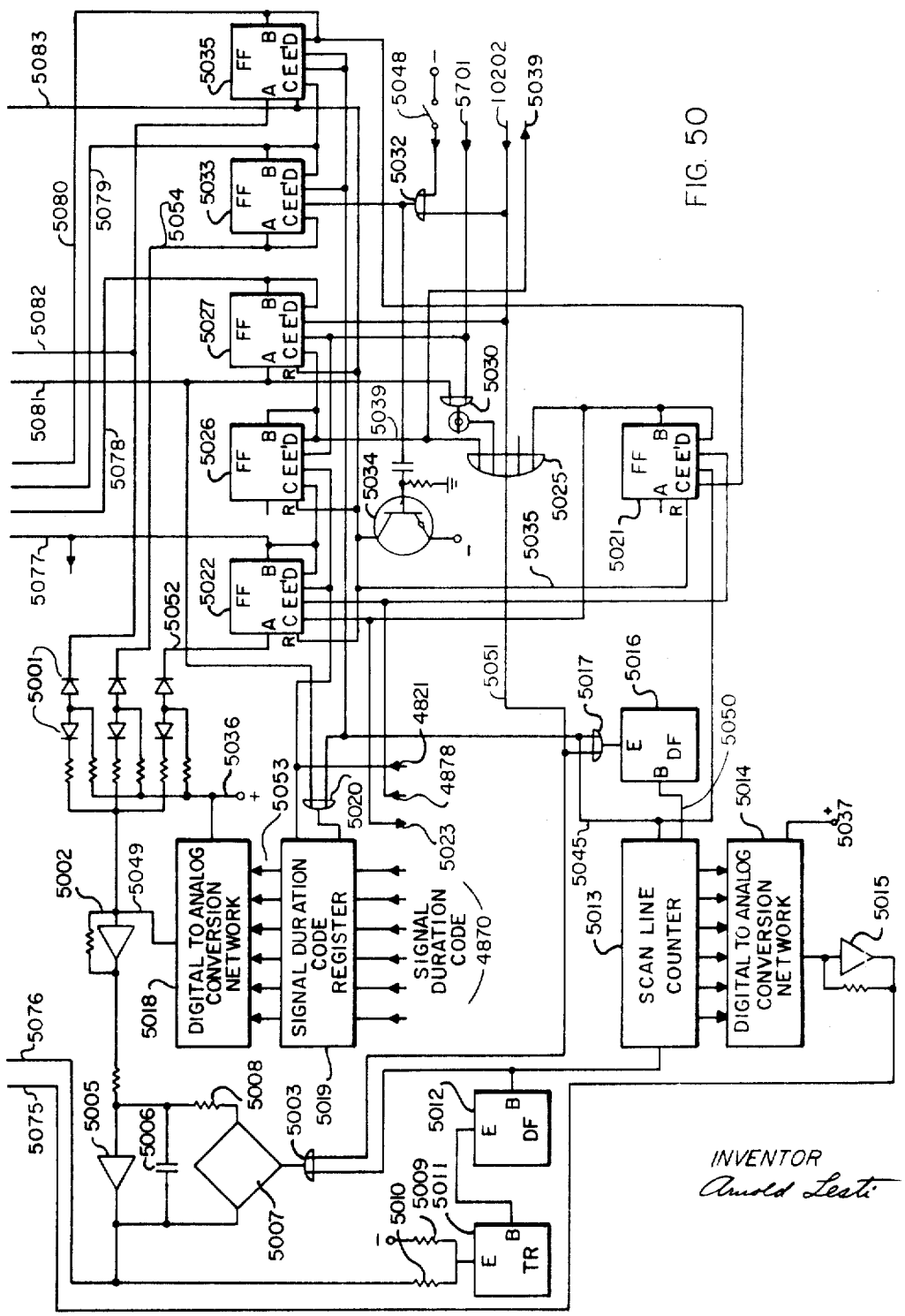

FIG. 50 is a diagram of the signal time normalizer control circuit.

FIG. 51 is a layout showing how the sheets of FIGS. 47 and 50 are arranged to form a single diagram of the overall time normalizer.

Figure 52:
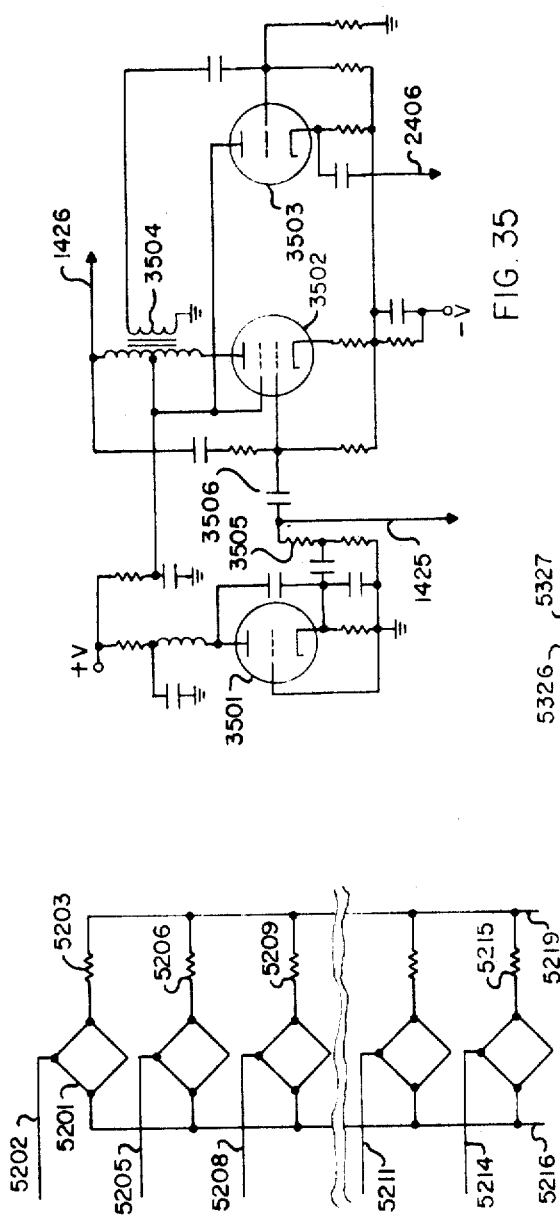

FIG. 52 is a diagram of the digital-to-analog converter.

Figure 53:
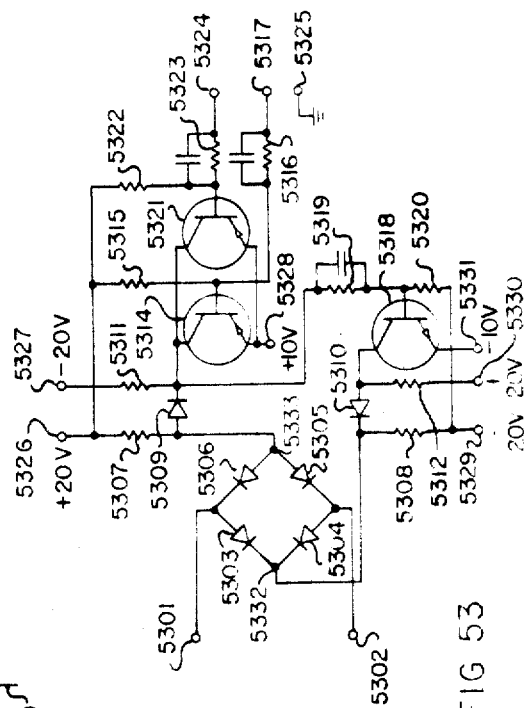

FIG. 53 is a schematic diagram of the high speed electronic switch.

Figure 54:
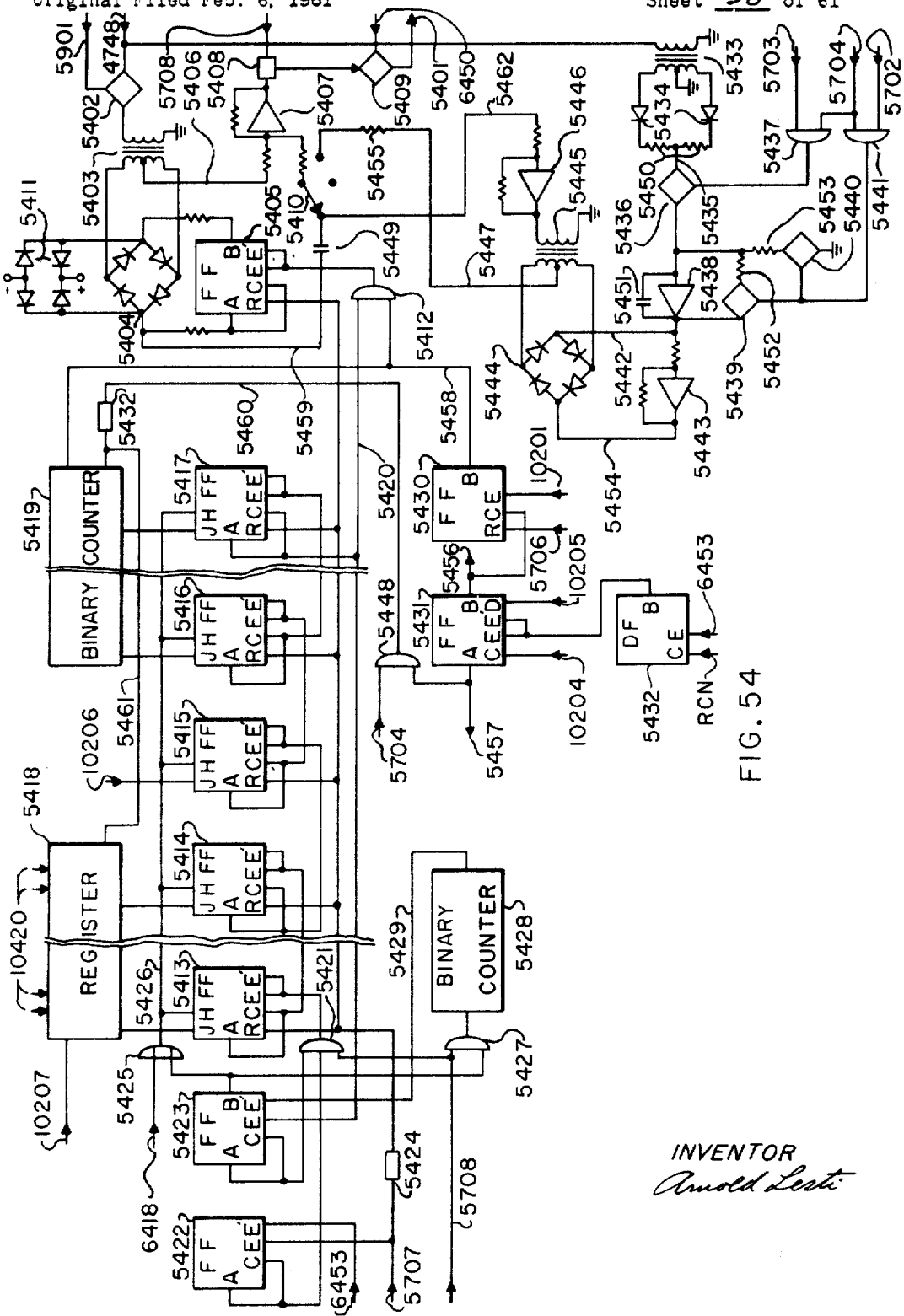

FIG. 54 is a block diagram of the transformation circuit for feedback of output codes to input.

FIG. 55 is a block of the bidirectional binary counter.

Figure 56:
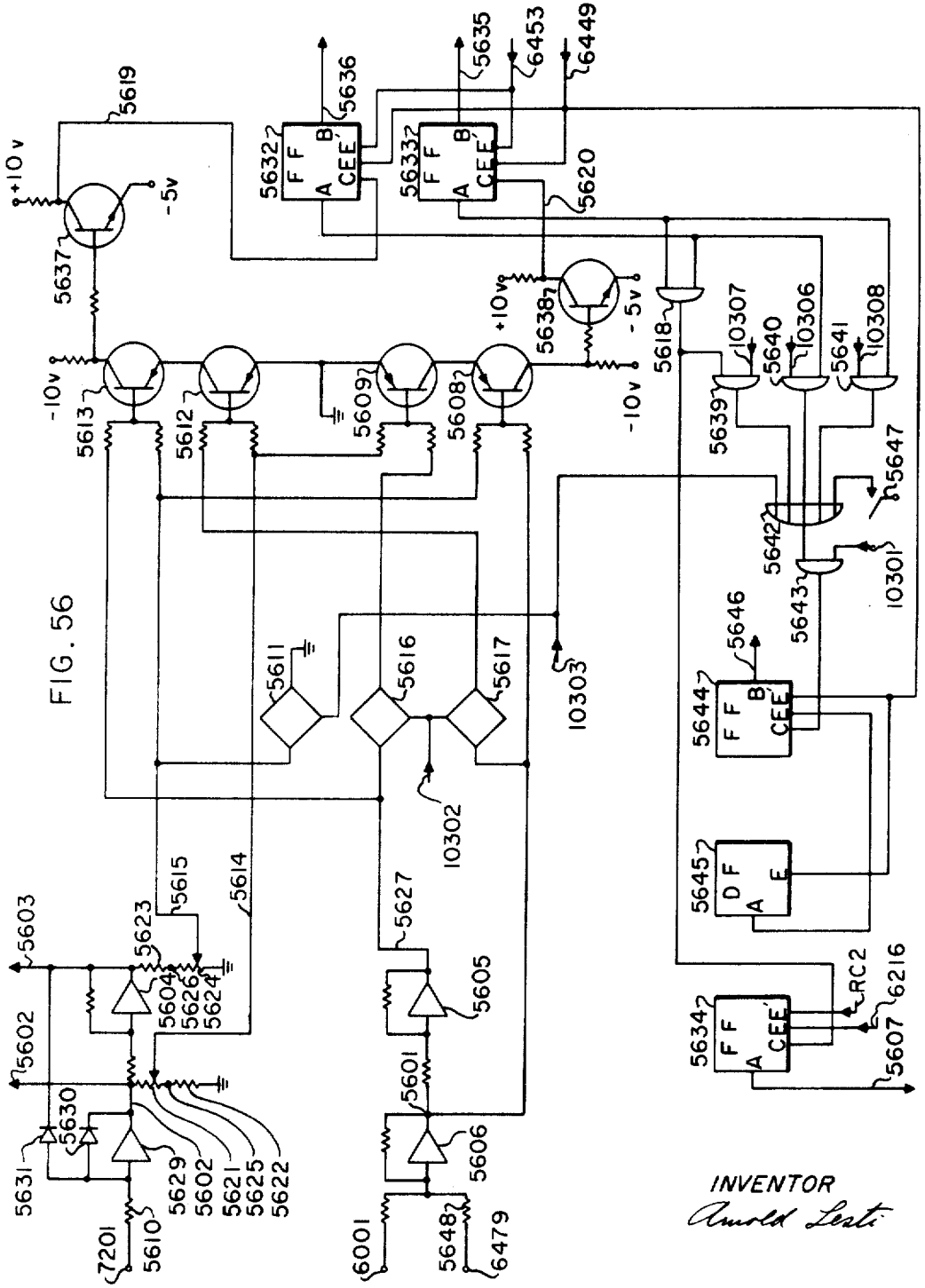

FIG. 56 is a diagram of circuits which take the square-root of the energy content signal, the comparator and gap control.

FIG. 57 is a diagram of the magnetic drum memory cycling control.

FIG. 58 is a diagram of the magnetic tape memory start-stop control.

FIG. 59 is a diagram of the B mode internal start circuit.

FIG. 60 is a detailed block diagram of the integrator, subtractor, sample and hold numbers one and two, multiplier, and divider circuits of the system with layout in FIG. 40.

FIG. 61 is a diagram of the G-memory overload detector and illustrates the overload pick-up head.

Figure 62:
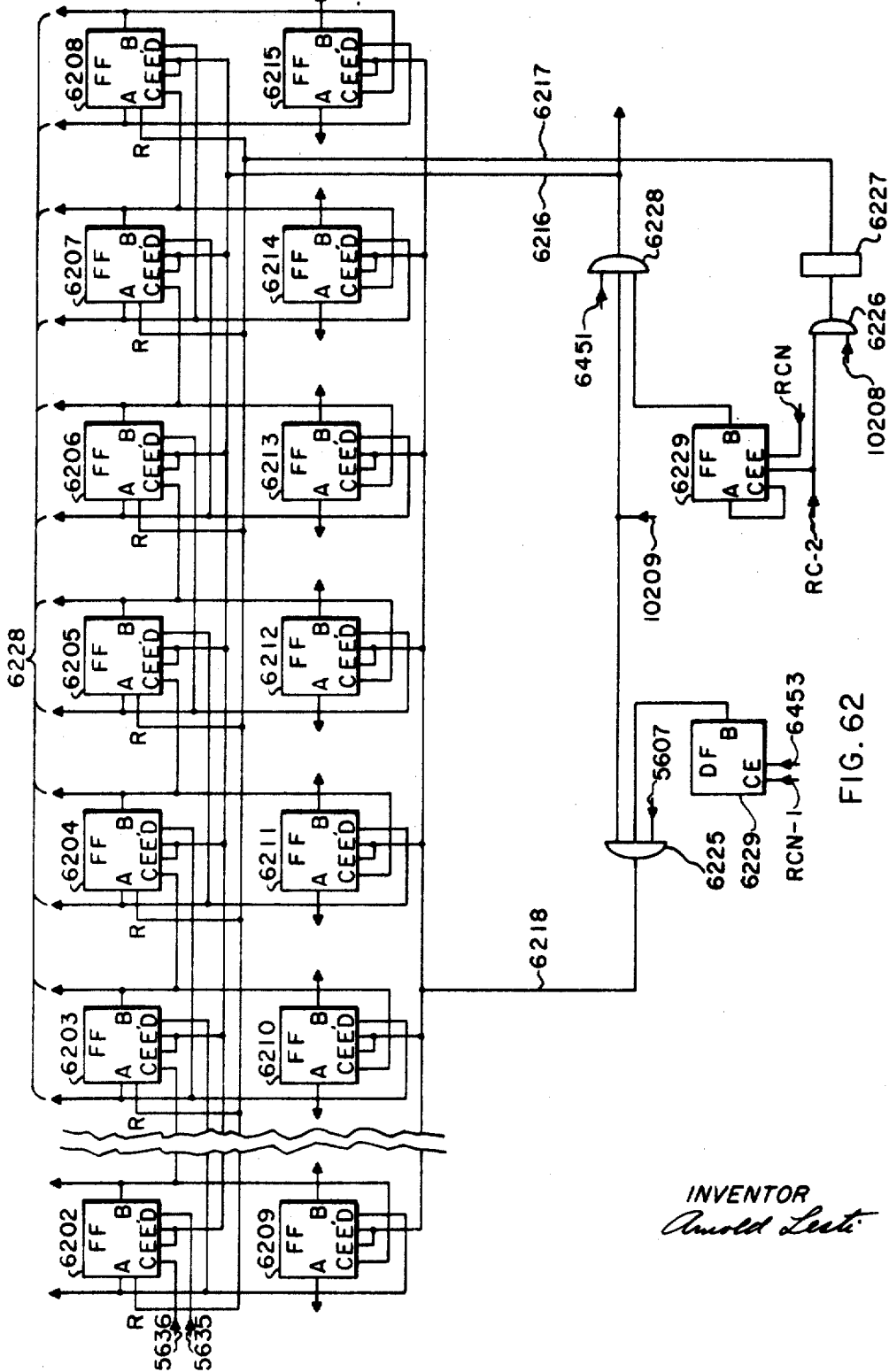

FIG. 62 is a detailed diagram of the shift register, the output register and display, the output register control, and the shift-register control circuits.

Figure 63:
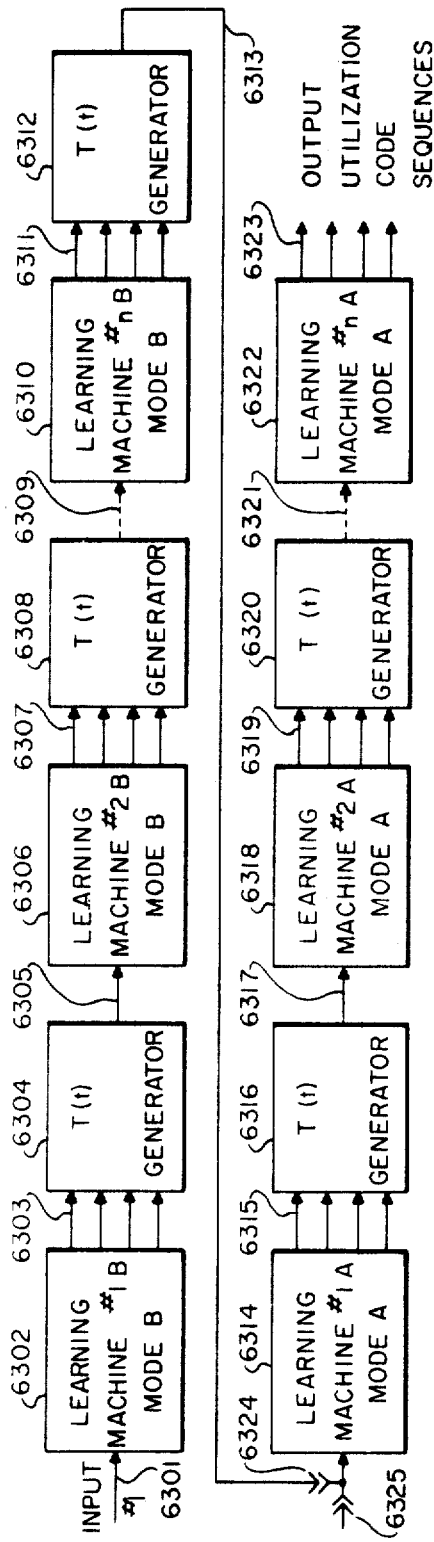

FIG. 63 is a block diagram showing how learning machines may be connected in series.

Figure 64:
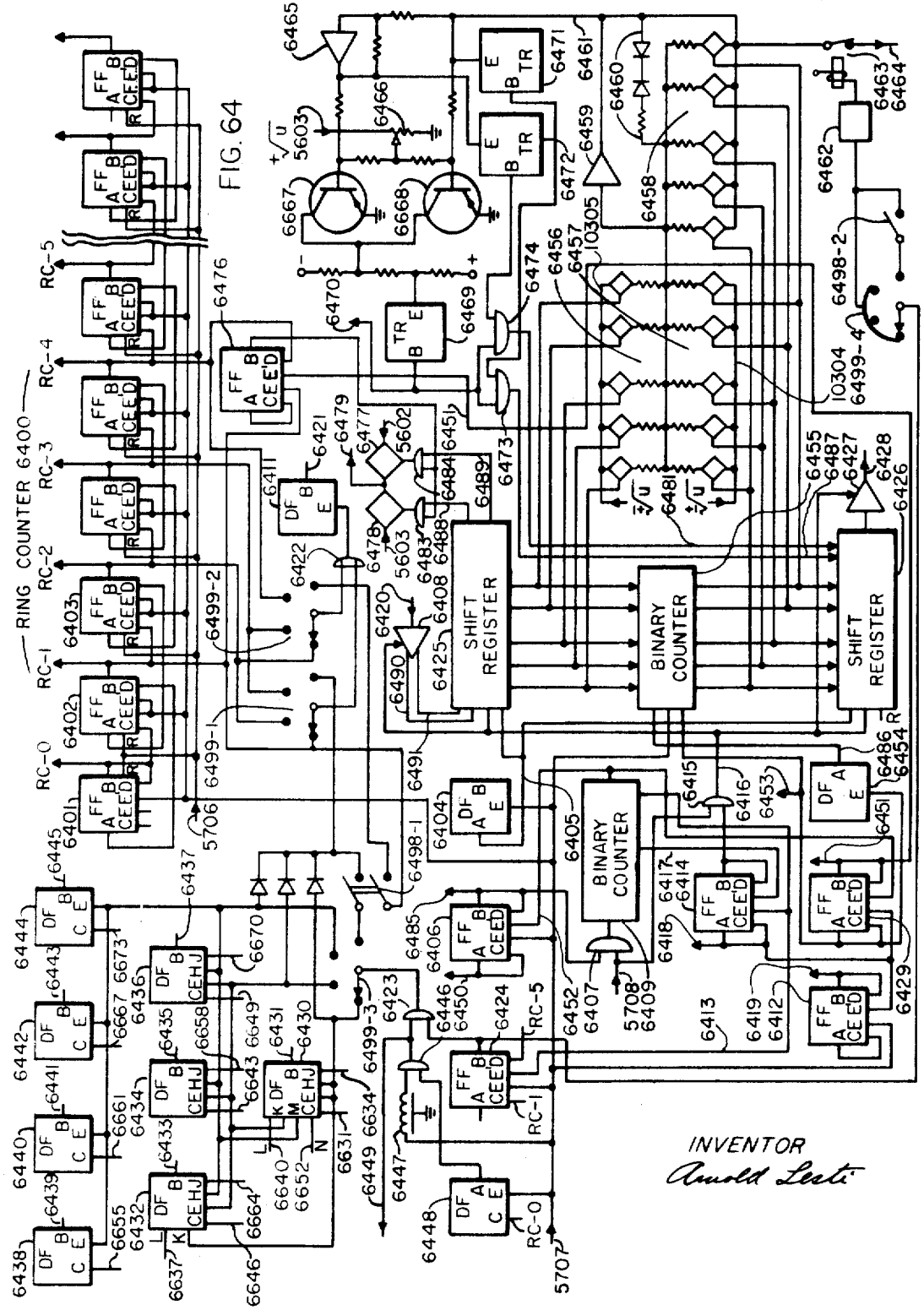

FIG. 64 is a detailed block diagram of the ring counter, learned selection of memory control, memory selection ratio circuit, memory selection utilization counter, and memory selection ratio gap control circuits.

FIG. 65 is a diagram of the read, erase, and write heads, head selection switches for the G-memory, the temporary track write head and its write amplifier, write and read amplifiers of the G-memory and other associated circuits.

Figure 66:
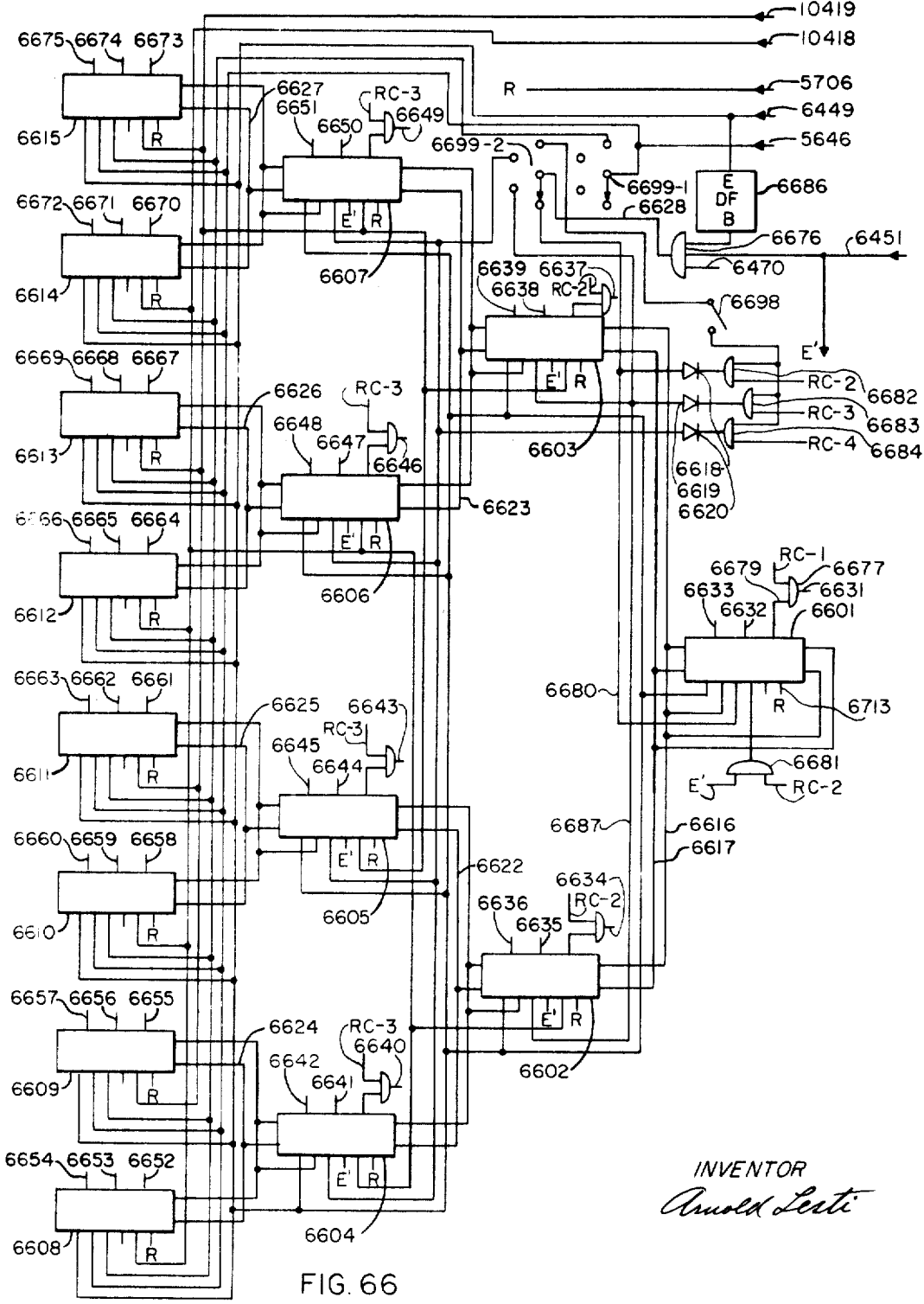

FIG. 66 is a block diagram of the G-memory head selection circuit.

FIG. 67 is a detailed block diagram of the first selector of the G-memory selectors.

FIG. 68 is a detailed block diagram of all the G-memory selectors except the first.

FIG. 69 is a diagram of the location of the tracks on the magnetic recording medium.

FIG. 70 is a schematic diagram of the driver for the head selection switches.

FIG. 71 is a symbolic representation of the circuit shown in FIG. 29.

FIG. 72 is a diagram of the input signal squaring, integrator, and associated circuits.

FIG. 73 is a diagram of a single-pole-single-throw electromechanical switch and its interchangeable electronic switch.

FIG. 74 is a diagram of a single-pole-double-throw electromechanical switch and its interchangeable electronic switch.

FIG. 75 is a diagram of a switched analog inverter.

Figure 76:
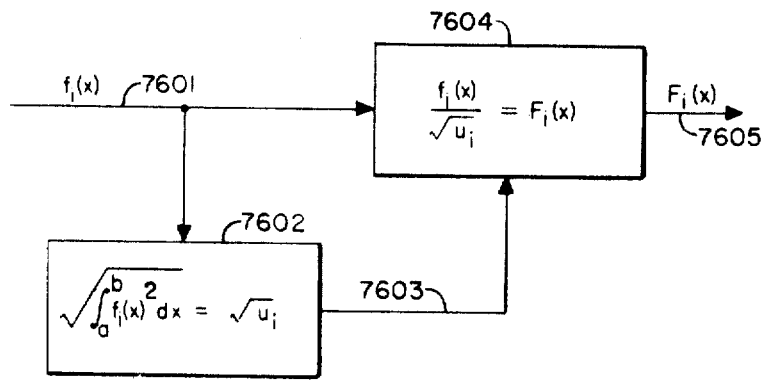

FIG. 76 is a block diagram of the input signal amplitude normalizer.

FIG. 77 is a diagram of the magnetic drum G-memory and relative positions of the various heads.

Figure 78:
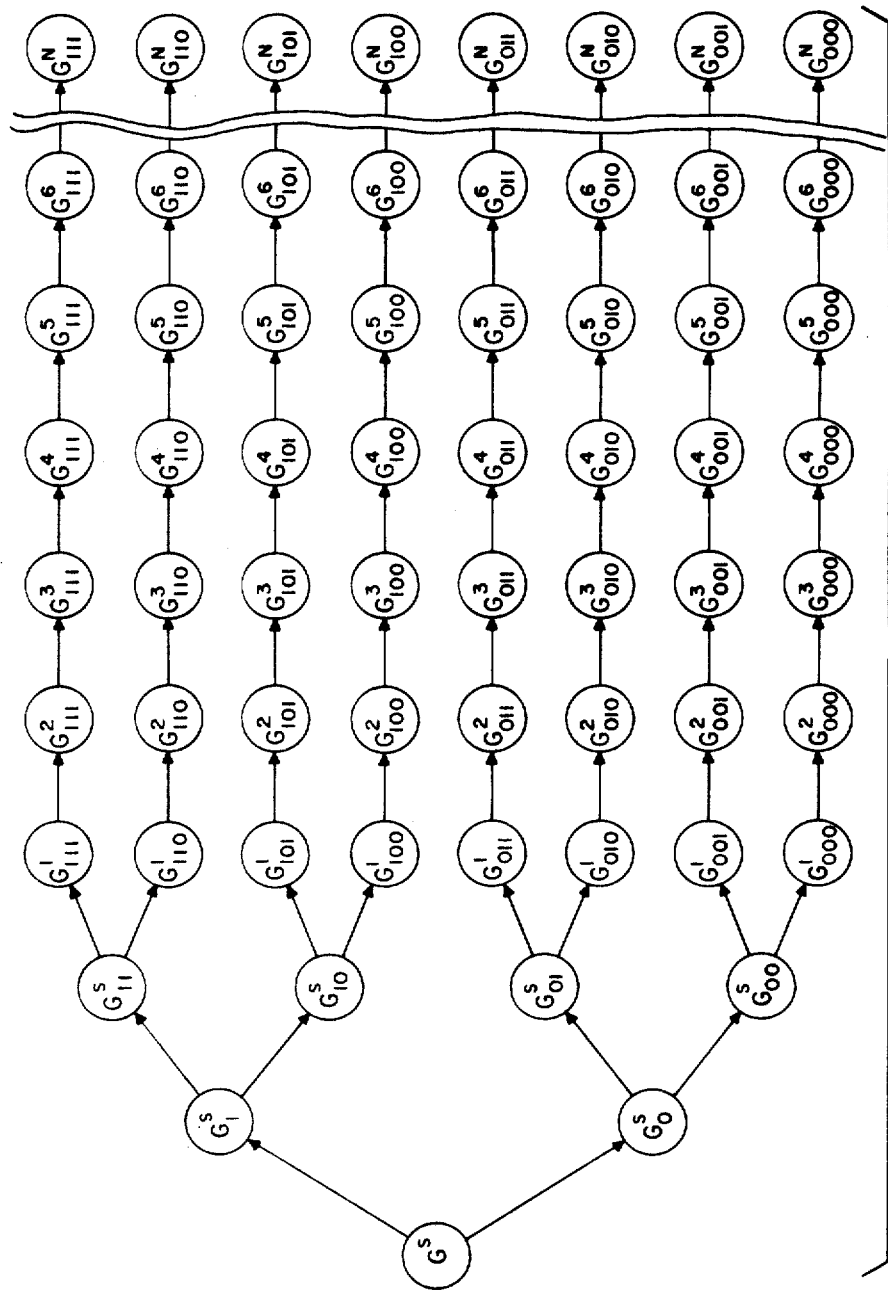

FIG. 78 is a diagram illustrating the selection relation between the G-memories.

Figure 79:
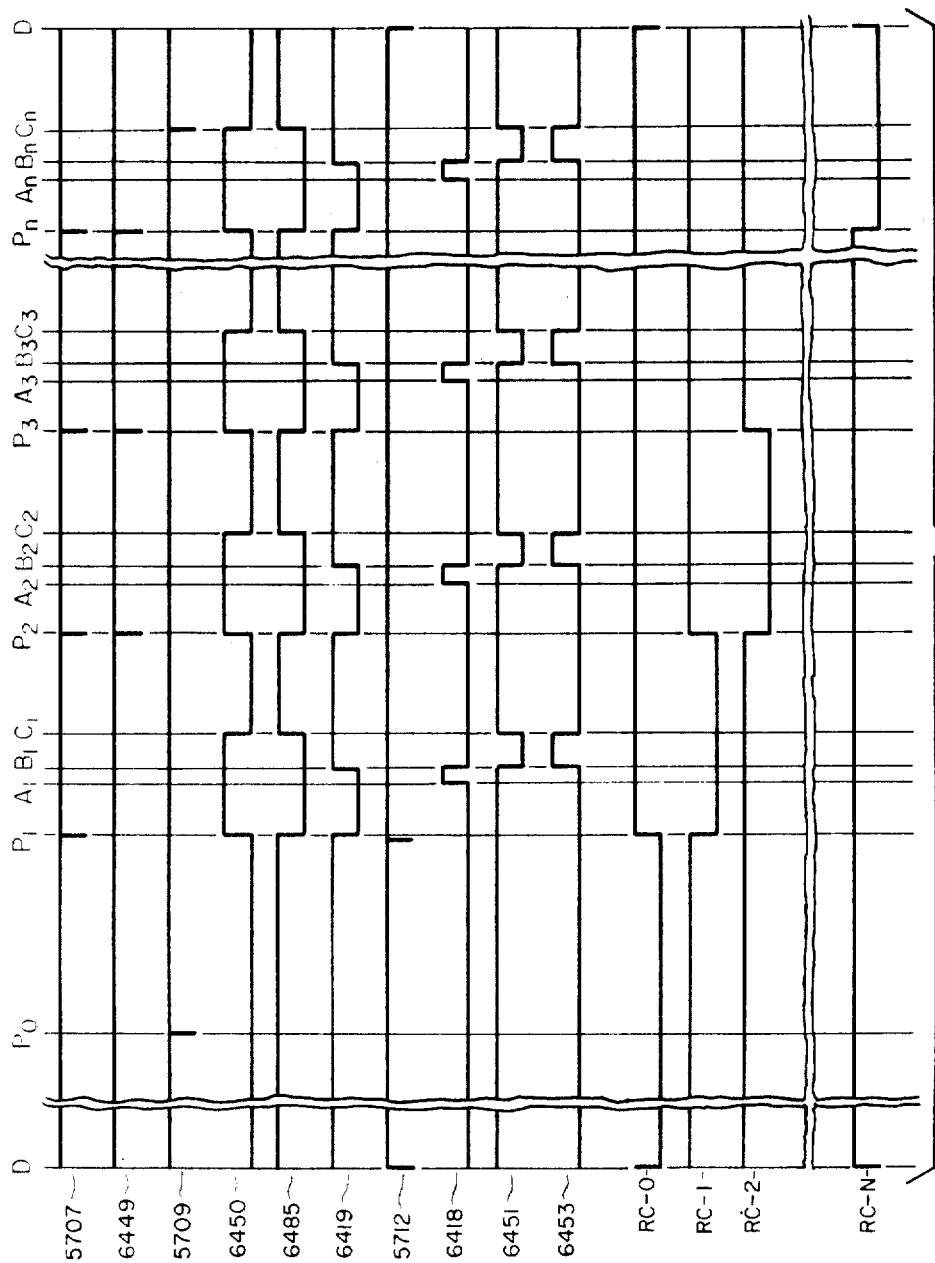

FIG. 79 is a timing diagram of the main pulses of the system.

FIG. 80 is a schematic diagram of the transistor control circuit for the solenoids of the input tape buffer.

FIG. 81 is a schematic diagram of the rectifier and filter circuit for detection of input signals.

FIG. 82 is a schematic diagram of the trigger circuit used in various circuits.

Figure 83:
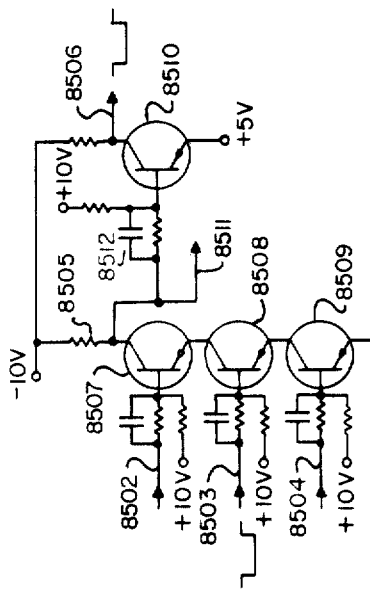

FIG. 83 is a schematic diagram of a typical OR-gate circuit.

Figure 84:

FIG. 84 is a symbolic representation of the circuit shown in FIG. 83.

Figure 85:
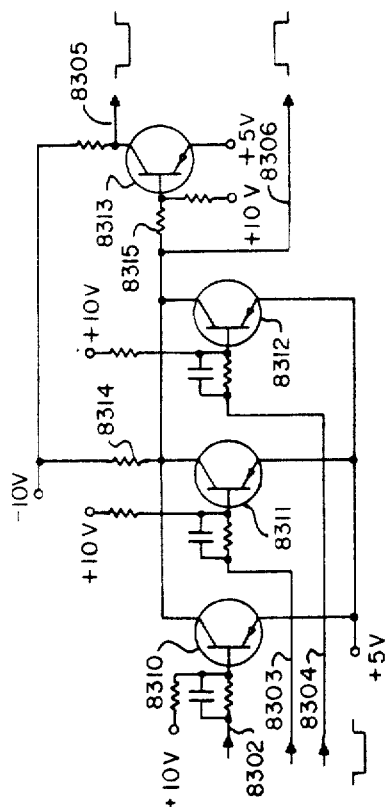

FIG. 85 is a schematic diagram of a typical AND-gate circuit.

Figure 86:

FIG. 86 is a symbolic representation of the circuit shown in FIG. 85.

Figure 87:
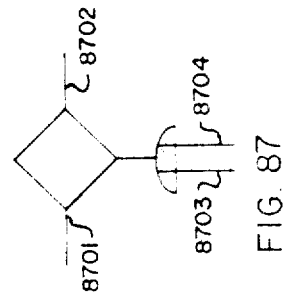

FIG. 87 is a symbolic representation of the circuit shown in FIG. 53.

FIG. 88 is a symbolic representation of the circuit shown in FIG. 82.

FIG. 89 is symbolic representation of the circuit shown in FIG. 80.

FIG. 90 is a symbolic representation of the circuit shown in FIG. 30.

FIG. 91 is a symbolic representation of the circuit shown in FIG. 31.

FIG. 92 is a diagram of the magnetic recording medium surface with head layout, fiducial marks and home position pickup.

FIG. 93 is a diagram of the magnetic tape G-memory drive, heads, and associated mechanical equipment.

FIGS. 94 and 95 together form a block diagram of the input signal processor of the image recognition adaptation of this invention.

FIG. 96 is a layout showing how sheets of FIGS. 94 and 95 are arranged to form a single diagram.

FIG. 97 is a diagram illustrating a form of camera tube image pickup for the system with layout in FIG. 96.

FIG. 98 is a diagram illustrating a form of mechanical image scanning pickup for the system with layout in FIG. 96.

Figure 99:
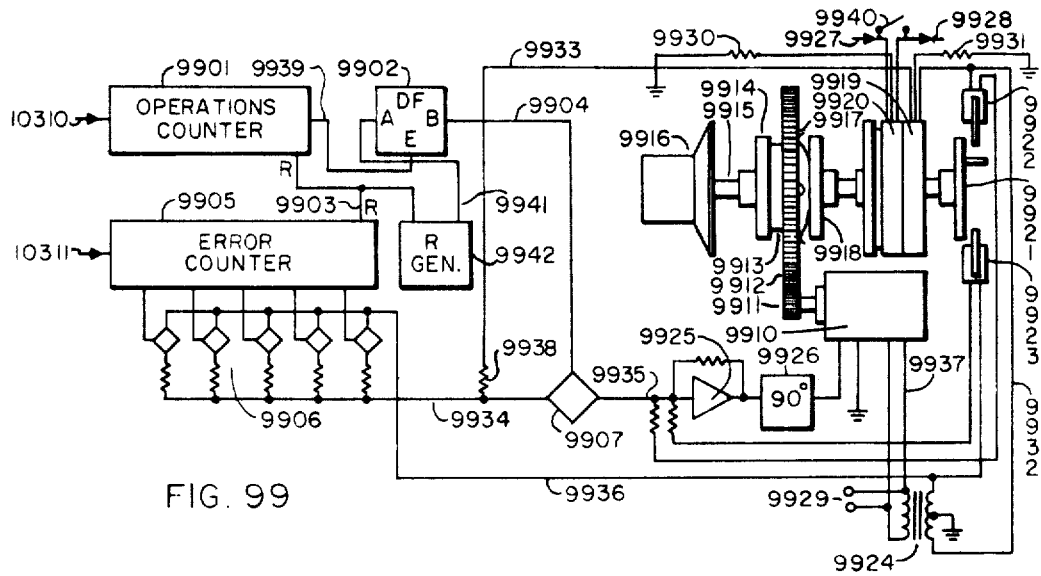

FIG. 99 is a diagram of one form of automatic control of the error parameter of the error function.

Figure 100:
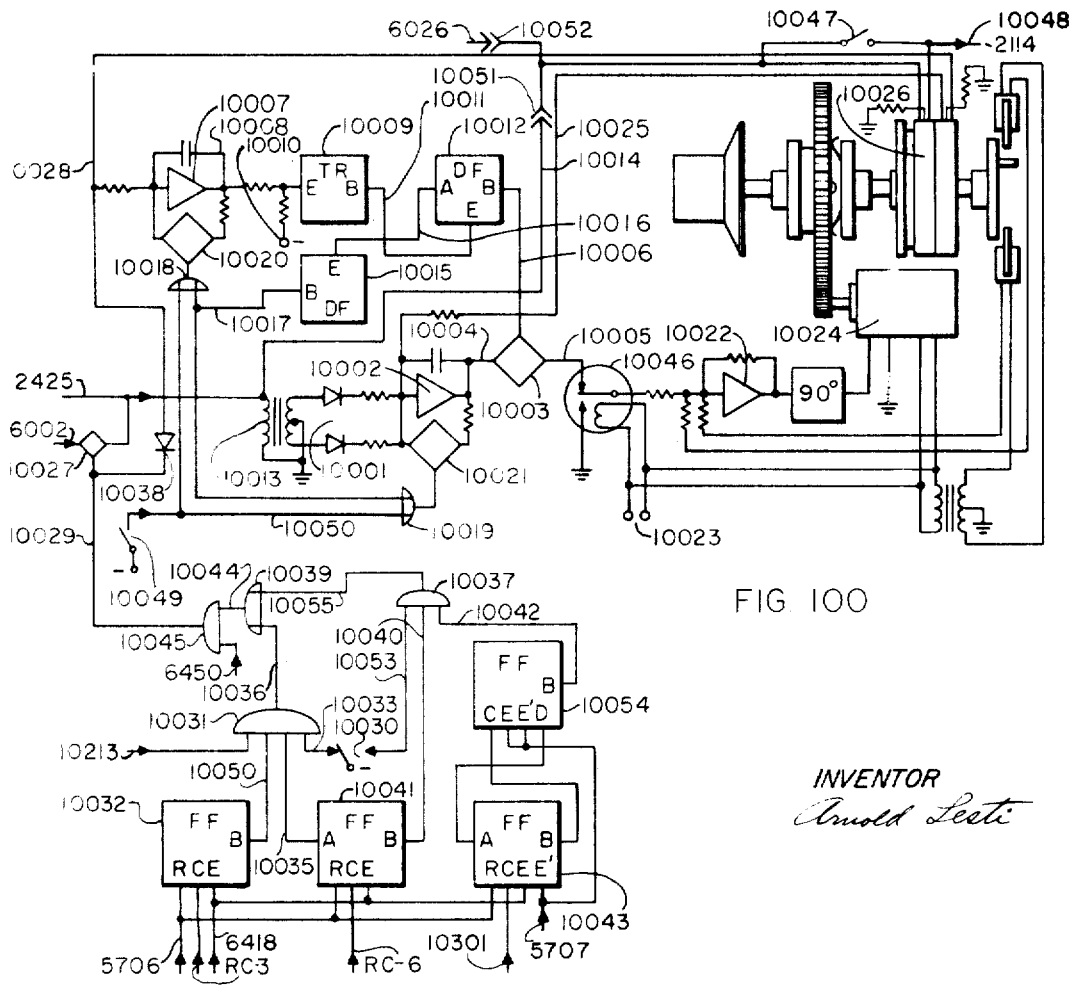

FIG. 100 is a diagram of another form of automatic control of the error parameter of the error function.

Figure 101:
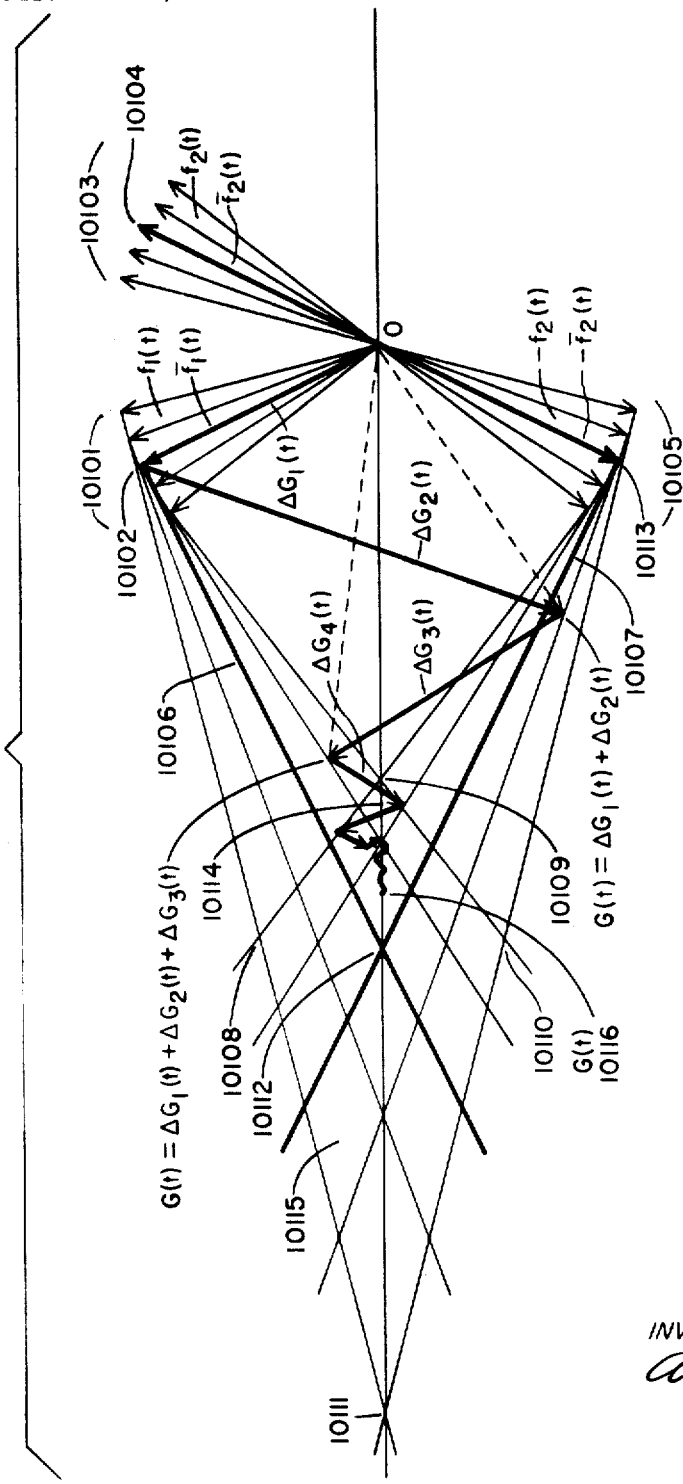

FIG. 101 is a vector diagram of the convergence of the learning process illustrating the effects of changes in the value of the error parameter of the error parameter of the error function.

Figure 102:
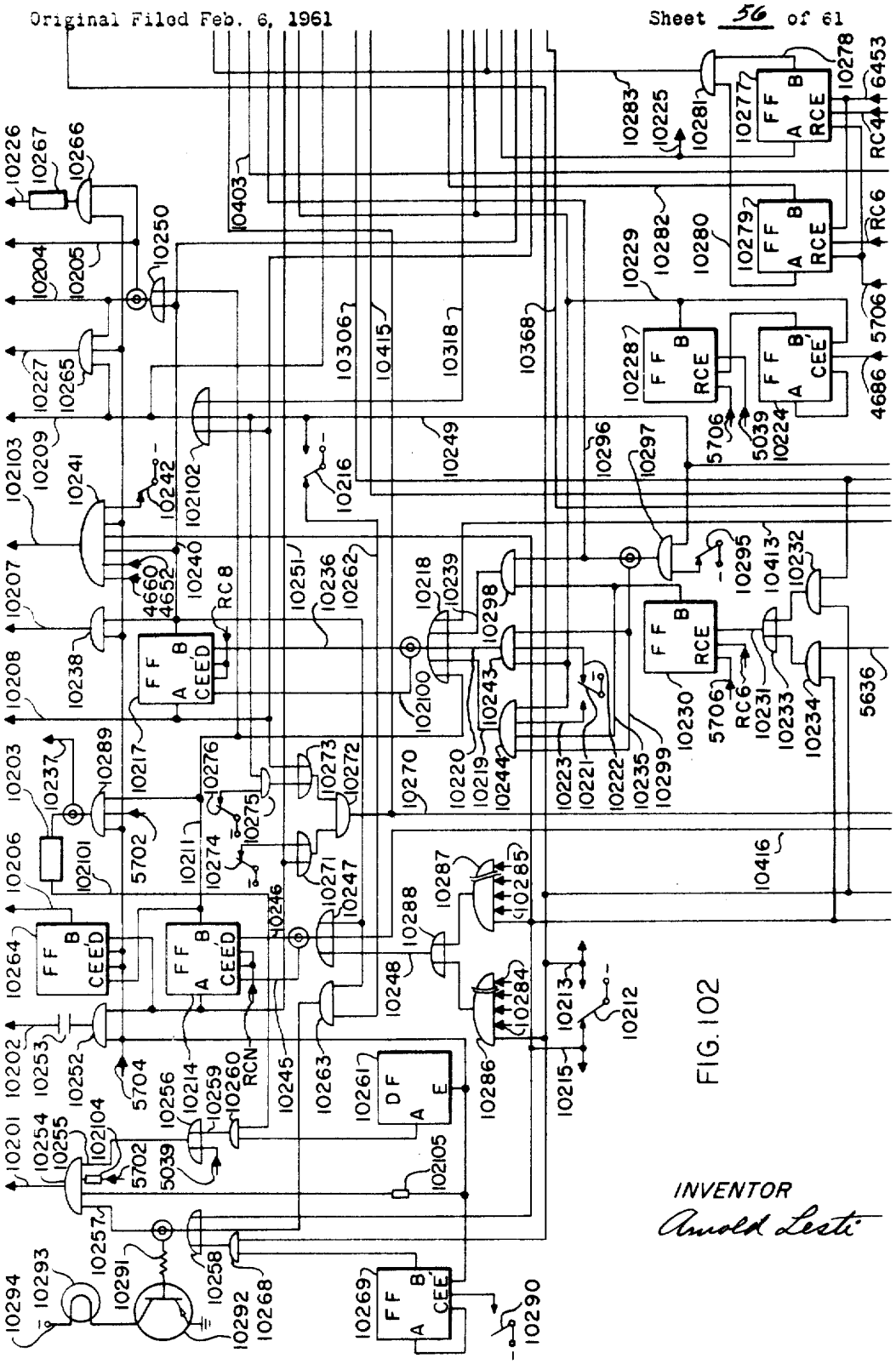

FIGS. 102, 103, and 104 are a block diagram of the teaching keys and sequencer and control circuits for modes A, B, and C.

FIG. 105 is a layout showing how the sheets of FIGS. 102, 103, and 104 are arranged side-by-side to form a single diagram.

Figure 106:
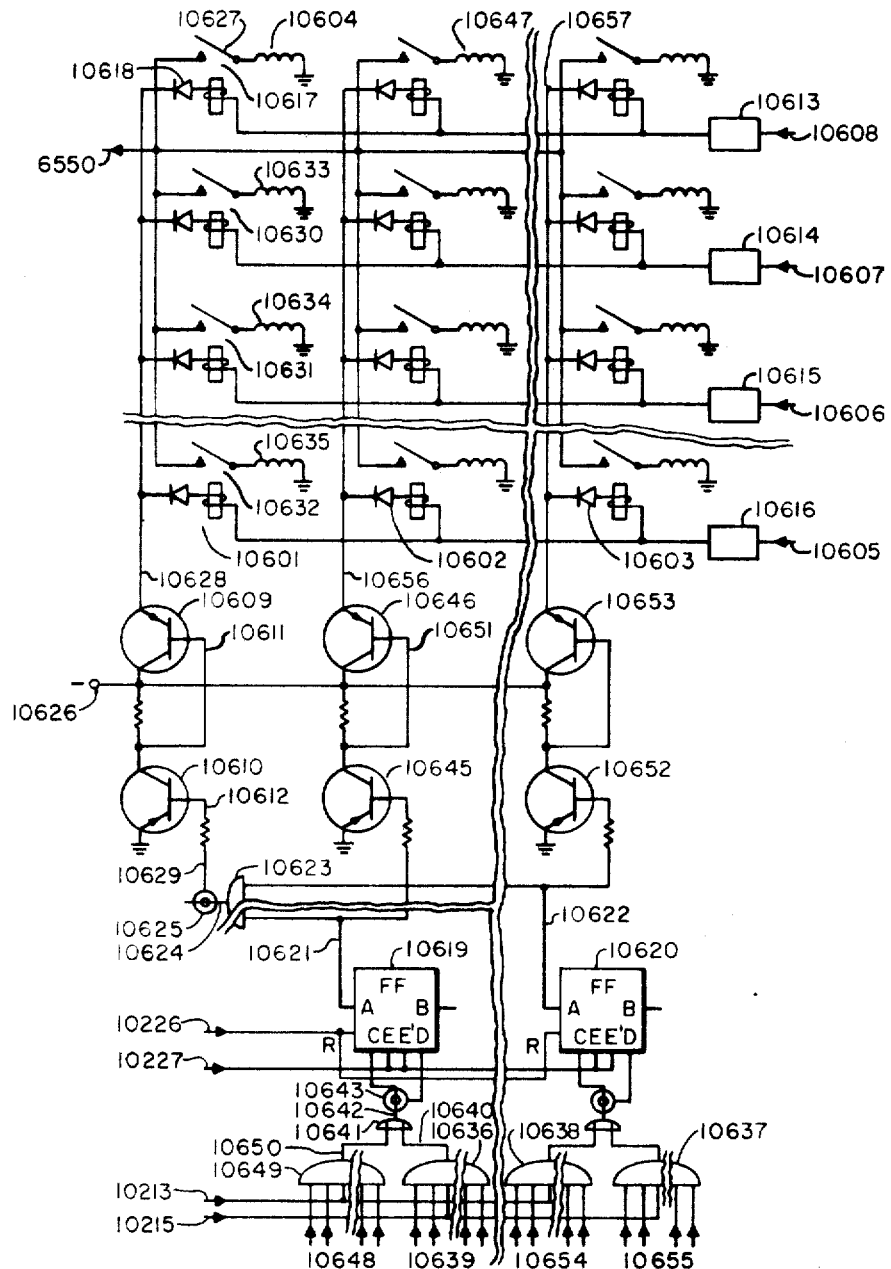

FIG. 106 is a block diagram showing the selection of different groups of memories.

Figure 107:
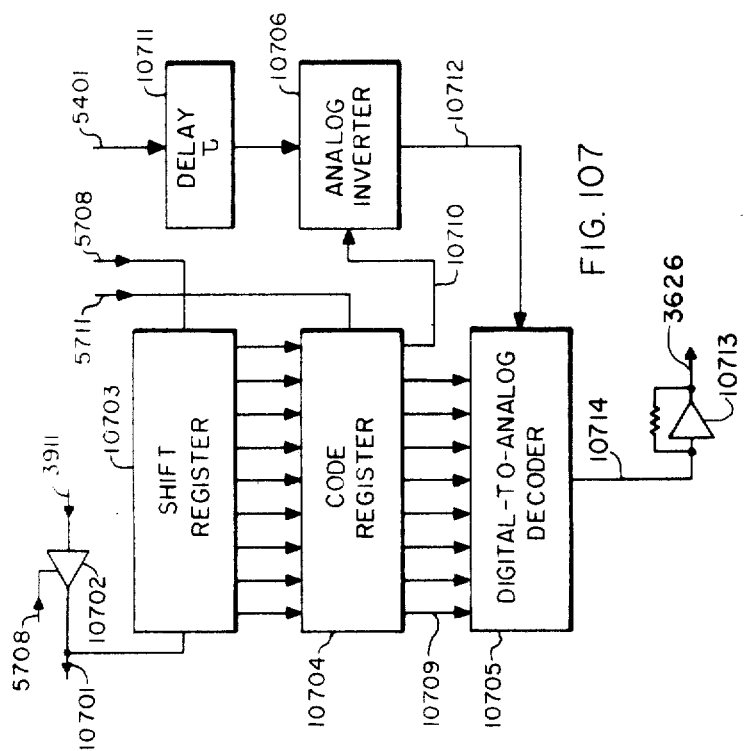

FIG. 107 is a block diagram of the decoder-multiplier used in conjunction with digital conditioned memory storage.

Figure 108:
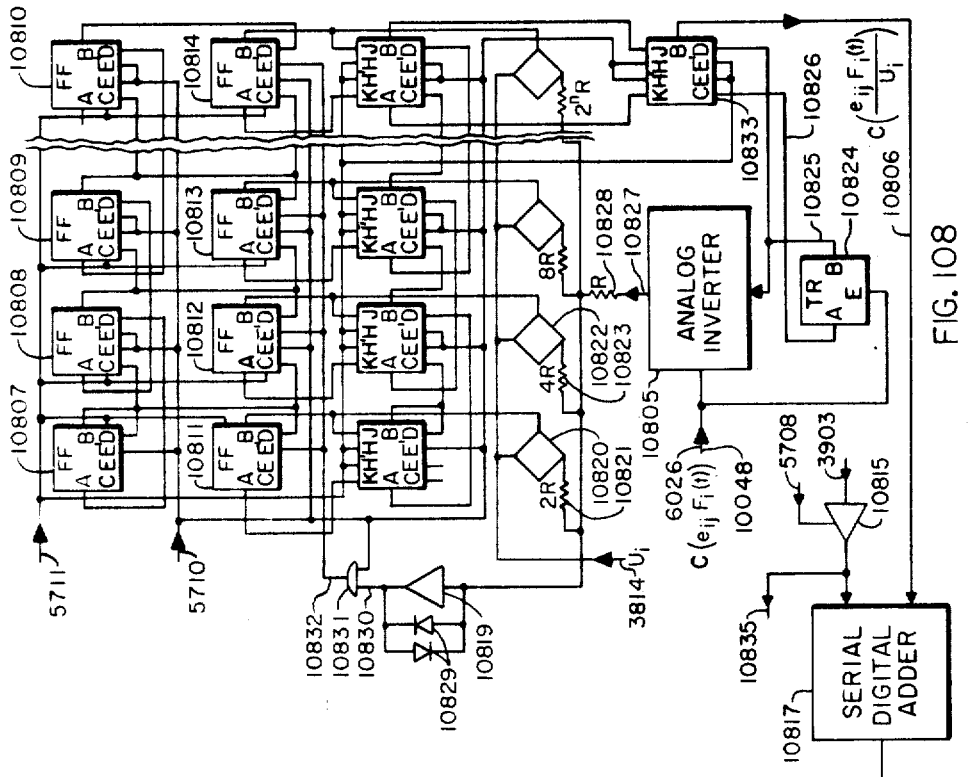

FIG. 108 is a block diagram of an encoder divider and digital adder used in conjunction with digital conditioned memory storage.

Figure 109:
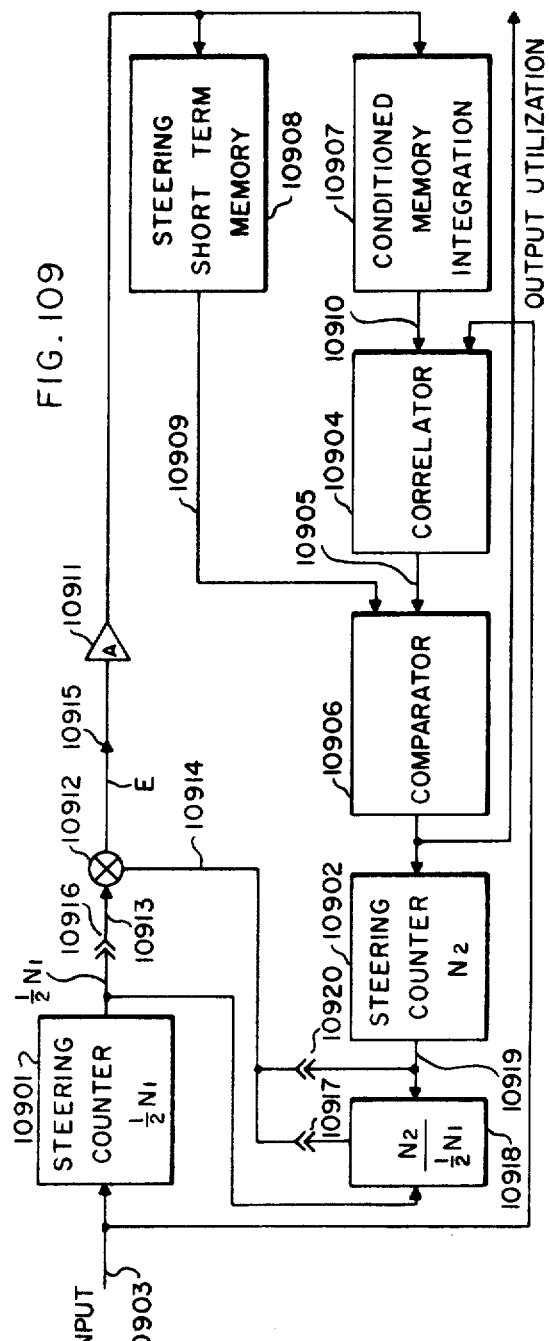

FIG. 109 is a block diagram of the feedback connections involved in the learning of steering.

Figure 110:
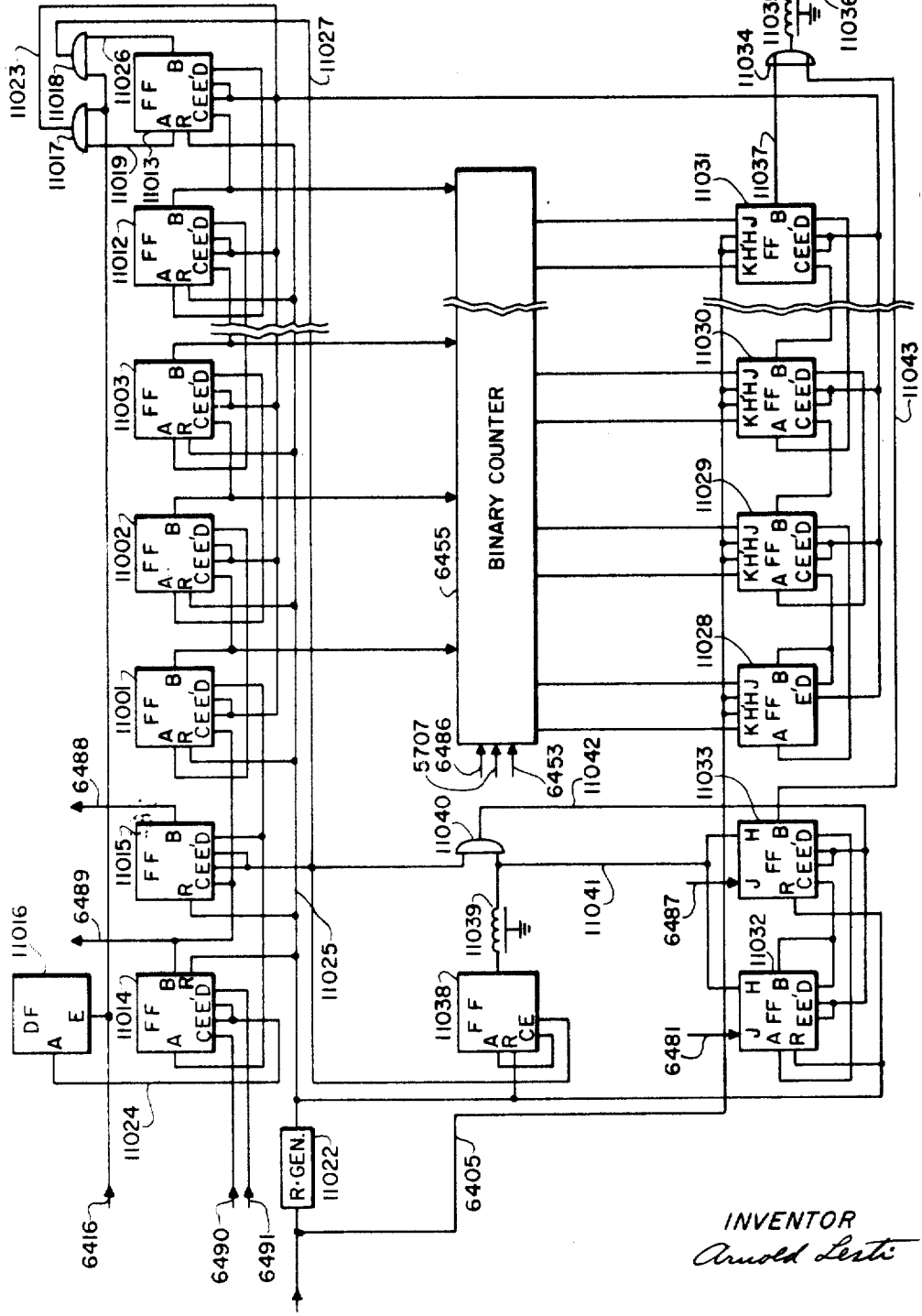

FIG. 110 is a detailed diagram of the shift-register for the steering utilization codes.

GENERAL DESCRIPTION

Figure 1:
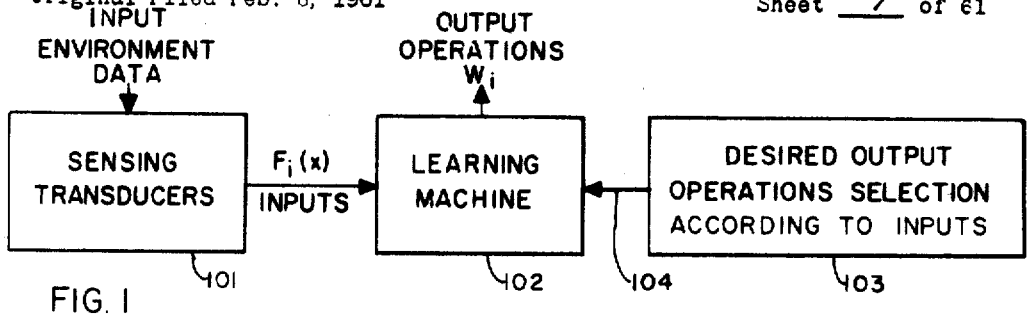
FIG. 1 is a general block diagram of the learning machine.

FIG. 1 is a highly generalized block diagram in which 101 represents such sensing transducers as a microphone for speech inputs, or an image scanner such as a television type camera pickup, or a flying spot scanner, or a mechanical scanner of light images. Electrical input signals $F_i(x)$ would be produced which are applied to 102 the learning machine proper. Transducers may be used also for producing electrical signals from pressure, temperature, switches and variable resistors which give electrical signal information regarding mechanical movements, tachometers, speed indicators, generators and other devices. At the time when certain signals $F_i(x)$, each identified by a specific $i$, are applied then the desired outputs are supplied by 103 which consistently correspond with the inputs upon repeated presentation at different times in any order. The desired outputs may be supplied as voltage signals at 104. The learning machine 102 establishes an internal memory of the requirements which gradually satisfies all the desired conditions. When learning has been completed the application of any one of a set of learned input signal such as $F_i(x)$ will produce that output signal which corresponds to the desired output signal which was repeatedly presented previously when that particular $F_i(x)$ input was applied. When the machine learns it requires teaching. The application of the desired outputs by 103 is the teaching operation. When teaching ceases, and if the machine has fully learned, then the application of any input signal $F_i(t)$ will produce the learned output which corresponds with the taught desired output. The learned outputs are produced on bus $W_i$.

Figure 2:
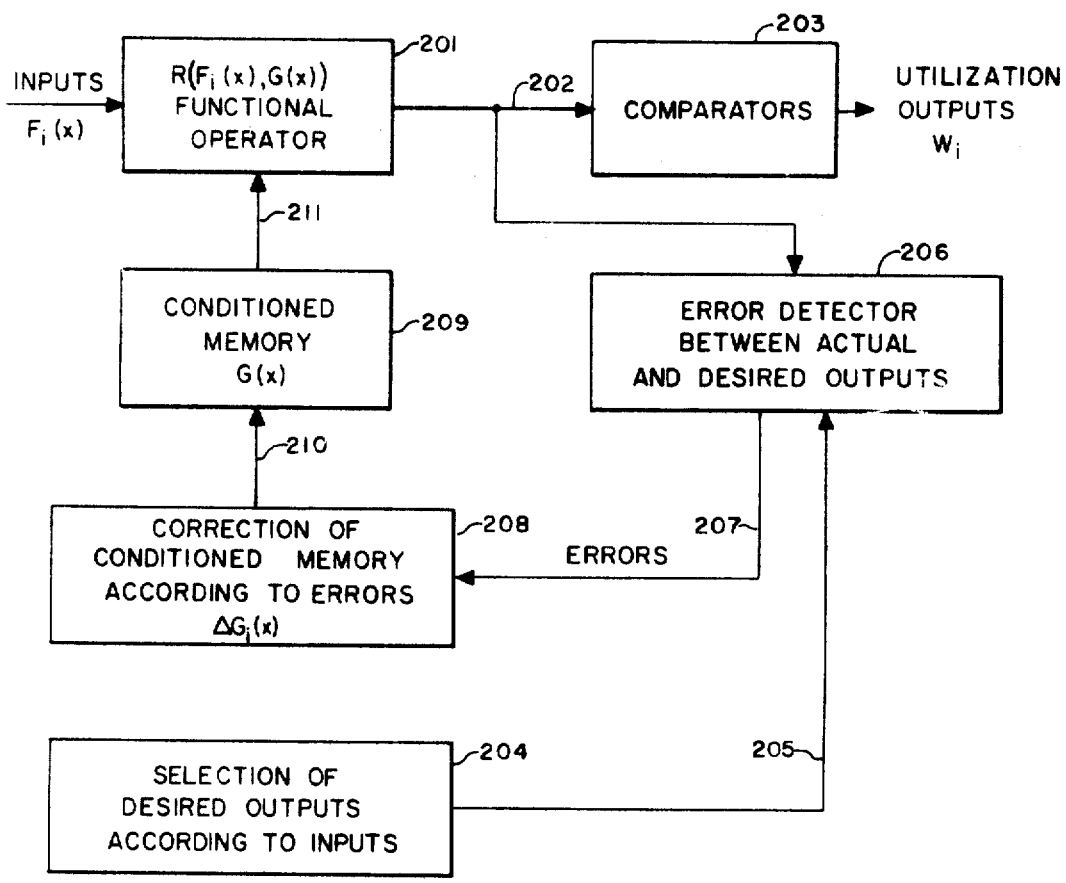
FIG. 2 is a general block diagram of the learning machine showing the conditioned memory and memory correction means.

FIGURE 2 is a more detailed block diagram than FIG-

URE 1. The learning machine has a functional operator 201 which produces $R(F_i(x), g(x))$. This may be a linear or nonlinear operator as previously described. Its purpose is to generate a scalar output at 202 which depends for its value upon both the form of the input signal $F_i(x)$, as a function of the independent variable $x$, and the form of the memory signal $G(x)$ which is also a function of the same $x$. In certain adaptations, $x$ may be equal to time, defining the functions in a certain specified interval. A comparator 203 provides reference voltage ranges or gaps of voltage ranges such that if the voltage at 202 is of a value equal to that in any of the specified ranges a corresponding specified digitalized response is produced $W_i$, where $i$ identifies a specific response of a set of responses. In certain preferred adaptations $W_i$ has two or three possible states in each output operation in a set of output operations. In FIGURE 2 block 204 represent the teaching equipment by means of which desired outputs are selected when certain corresponding inputs occur. This operation places the desired voltage at 205 which is applied to the error detector 206. The preferred form of 206 is a subtractor which subtracts the actually produced voltage at 202 from the voltage at 205 to produce an error scalar at 207. The error detector may be a nonlinear operator, approximating a linear subtractor. Block 208 represents the error function generator $\Delta G_i(x)$ which is produced by means which utilize the error scalars. In the linear version this generator also utilizes the input signal $F_i(x)$. In the non-linear version this generator does not utilize $F_i(x)$ but produces $\Delta G_i(x)$ by taking the rate of change of the error scalar with respect to $G(x)$, the memory signal itself. Block 209 of FIGURE 2 represents the conditioned memory which stores the memory signal $G(x)$ permitting the same to have itself modified by $\Delta G_i(x)$ via bus 210 which causes the transfer into the memory and the change of $G(x)$. In preferred adaptations the process of modifying the memory signal stored in 209 is to add $\Delta G_i(x)$ to it to produce $G(x) + \Delta G_i(x)$ to replace $G(x)$. The memory signal is recovered from the memory on bus 211 which presents it to the functional operator 201. In this overall operation the repeated application of the various inputs $F_i(x)$ accompanied by the teaching operation of presenting the desired signals on bus 205 will eventually cause the production of the desired output operations $W_i$ corresponding to the taught signals after teaching ceases and the $F_i(x)$ are still presented. When teaching ceases the mode of operation is termed operating-mode and under this condition bus 207 is inactivated so that no error signals and correction of the memory signal will take place.

Figure 3:
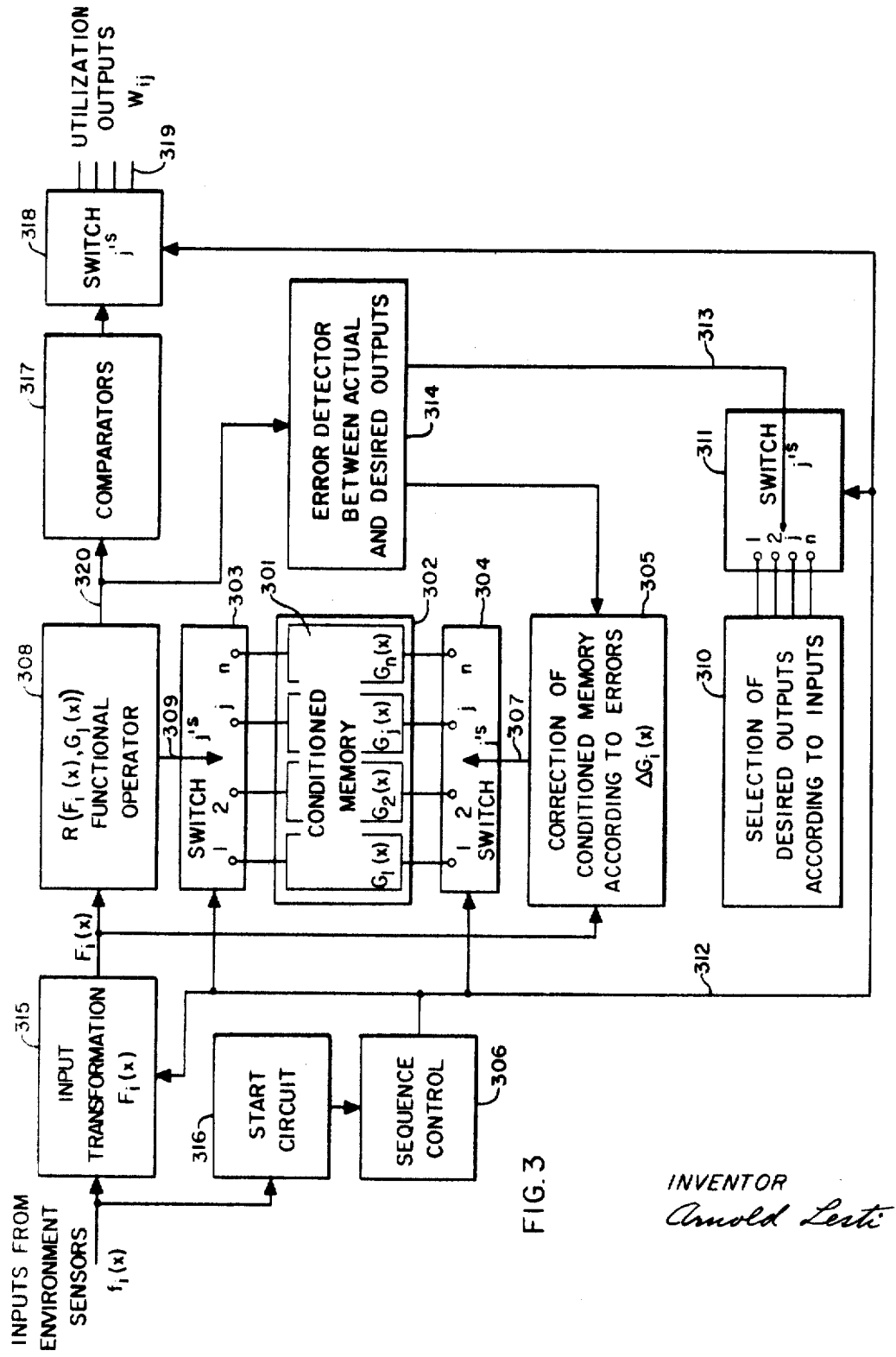
FIG. 3 is a general block diagram of the system with a multiplicity of conditioned memories and correction means.

FIGURE 3 illustrates a general form of practicing the invention in which a plurality of memory signals $G(x)$ stored in individual memories such as 301 in conditioned memory 302 are utilized. There are sequencing switches, which may be constructed in the form of electromechanical devices or fully electronic or solid state devices, designated 303, 304, 311, and 318. Switch 304 connects the individual error signals $\Delta G_i(x)$ generated in common generator 305, and present on bus 307, to each of corresponding $G_j(x)$ memories in 302, in turn, under control of sequence control unit 306. Switch 303 connects the individual memory signals as recovered from the respective memories to common functional operator 308 via bus 309 under control of sequence control 306. During the teaching operation the desired signals are produced in the teaching unit 310 and there is a switch 311, synchronized with switches 303 and 304 also under the control of 306 via common bus 312, which transfers each of the individually available desired voltages, in turn, to bus 313 and to error detector 314. The input signals from the sensors are applied as $f_i(x)$ to unit 315 which transforms them into corresponding signals $F_i(x)$ suitable for processing by the learning equipment. The input transformation unit may contain a temporary storage device to store any received input signal and make it available by successive read-outs to the functional operator 308 as successive $G_j(x)$ signals are presented. The sequencing control 306 controls the recording, successive read-outs, and erasing of the temporary memory in 315. The input transformation unit 315 may also contain a duration normalizer, demodulators, and modulators for carrier modulation and frequency filters. Various forms of these adaptations will be described hereinbelow. When a signal is received a start circuit 316 is actviated which senses the presence of the signal and starts the operation of the sequence control which further cause the operation of the other units. The operation of units 305, 308, 310, 314, 317, and each memory such as 301 in 302 is the same as the operation described for the corresponding units in FIGURE 2. Switch 318 switches the output signals of comparator 317 as they are produced from signals at 320, in turn, to a set of outputs $W_{ij}$ equal in number to the number of conditioned memories. Switch 318 and associated outputs 319 may consist of a shift register and output registers, in one adaptation, which will produce a learned digitalized output code according to desired outputs established during the teaching operation, as learned responses to corresponding received input signals.

Figure 4:
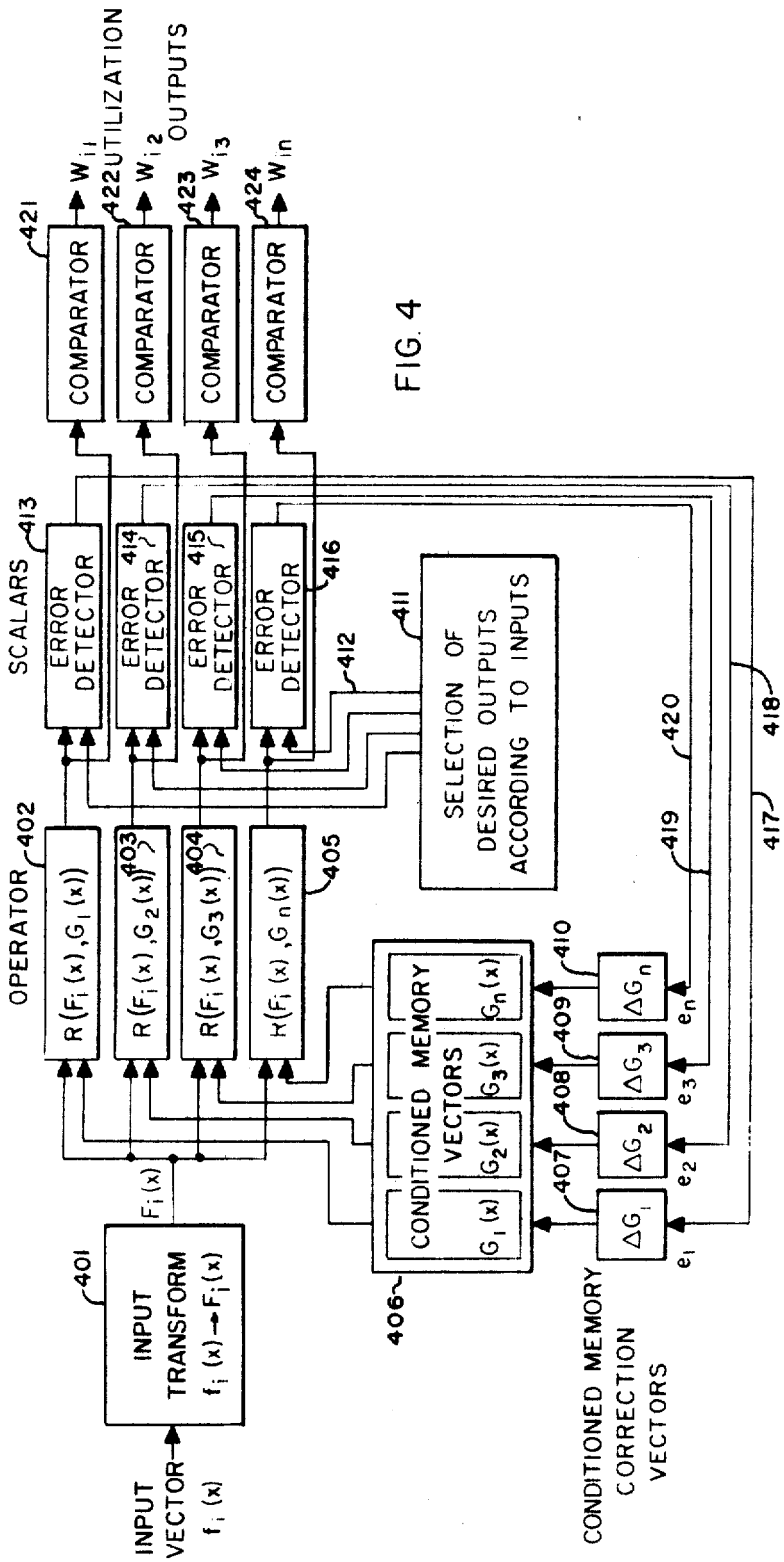
FIG. 4 is a general block diagram of the system with conditioned memories, operators, error detectors, and comparators.

In contrast with the sequencing mode of operation illustrated in FIGURE 3, in which the basic operators are timed shared, FIGURE 4 illustrates another form of practicing the invention in which the operations are conducted simultaneously in parallel. In FIGURE 4 unit 401 operates in the same manner as unit 315 of FIGURE 3 except that the read-out of the temporary storage of the input signal need occur only once. Each of the operators marked 402, 403, 404 and 405, operates respectively with the signals $G_j(x)$ in the corresponding designated memories in the memory unit 406. Each of the units 407, 408, 409, and 410 supplies correction signals $\Delta G_j(x)$ to the corresponding memory. The index $j=1, 2, 3, \ldots n$ identifies each of the conditioned memories. The teaching unit 411 serves the same purpose as corresponding unit 310 in FIGURE 3, except that the buses generally represented by 412, are applied to the respective error detectors 413, 414, 415, and 416 each of which operates in the same manner as the corresponding units in FIGS. 2 and 3, to produce respective error scalar values at buses 417, 418, 419, and 420 which supply the corresponding correction vector units each of which is the same as unit 305 in FIG. 3. Each of the comparators 421, 422, 423, and 424 is supplied with an input bus from a corresponding operator, and each comparator produces a digitalized output on the respective buses $W_{i1}, W_{i2}, \ldots W_{in}$. In a preferred form the possible values of each $W_{ij}$ can be either one or the other of two values. Parallel operation gives greater speed of performance but requires more equipment. The final output may be a binary digitalized output code having as many bits as there are conditioned memory units. In case $x$ is time then all the units are still operated in parallel each starting to operate at the same time and ending, after a predetermined interval, at the same time.

Figure 5:
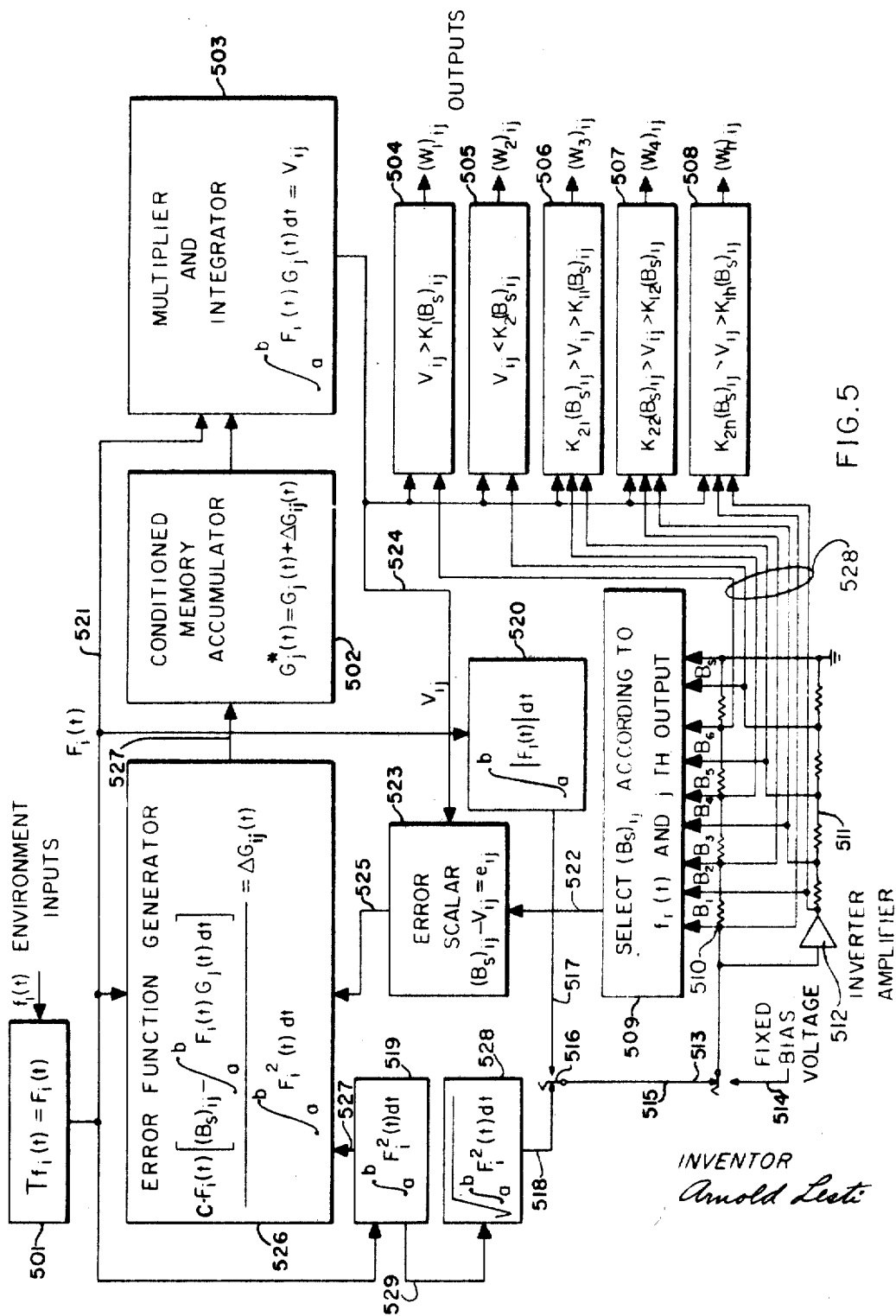
FIG. 5 is a general block diagram showing mathematical operators in a general linear system.

In FIG. 5 the received input signals are transformed by 501 into corresponding applied input signals $F_i(t)$ for the purposes mentioned in connection with the preceding figures. The conditioned memory 502 is designated as an accumulator since the memory signals in any state $G_j(t)$ becomes $G_j^*(t) = G_j(t) + \Delta G_{ij}(t)$. In FIG. 5 the signals are functions of time occurring in cyclically repeated intervals each with a beginning at time $t=a$ and end at time $t=b$, respectively. The multiplier and integrator block 503 represents the linear operator or correlator which receives signals $G_j(t)$ and $F_i(t)$ and produces $$\int_a^b F_i(t) \cdot G(t) dt = V_{ij}$$

as output values or correlations for each of the memory signals and input signals. The range of the desired output values is restricted to certain values. In the comparator blocks 504 to 508 inclusive various generic desired ranges of $V_{ij}$ are set forth. One or more these may be used in the machine. The teaching unit 509 is a switching unit to select one of the $(B_s)_{ij}$ values including zero and the selection depends upon the received input signal and the memory signal. The choice is one of the various $B_s$ voltages shown developed by the resistor dividers 510 and 511. These voltage dividers also supply the $B_s$ voltages to the comparators through buses 528. Resistor divider 511 is provided with inverted voltage by amplifier 512. The source of voltage may be selected by switch 513. It may be a fixed bias source from bus 514 or a variable source from bus 515. The latter may be selected further by switch 516. If switch 516 selects bus 518 then the source of voltage is 530 which generates $$\sqrt{\int_a^b F_i^2(t) dt}$$

which corresponds to the RMS of the input signal and has the property that any multiplication of $F_i(t)$ by a stretch constant $k$ also multiplies the RMS by the same amount. Block 530 is supplied via bus 529 with energy content signal $$\int_a^b F_i^2(t) dt$$

generated in block 519 which also supplies the denominator in 526 over bus 527. If switch 516 selects bus 517 then the source of voltage is 520 which generates $$\int_a^b |F_i(t)| dt$$

which is the integral of the absolute value of $F_i(t)$, which integral has the same property as the RMS. Both units 519 and 520 receive $F_i(t)$ as inputs from main bus 521. The selected $(B_s)$ from 509 are applied via 522 to subtractor 523 which also receives $V_{ij}$ on bus 524 from 503. The subtractor determines $(B_s)_{ij} - V_{ij} = e_{ij}$ as the error scalars which are applied via bus 525 to error signal generator 526. The latter computes $$\frac{C \cdot e_{ij}}{\int_a^b F_i^2(t) dt} \cdot F_i(t) = \Delta G_{ij}(t)$$

which are the error signals proper having the adjustable error parameter C. Bus 527 carries the error signals to the conditioned memory accumulator which adds them to the signals already existing in the memory. FIG. 5 is to be looked upon primarily as a block diagram of one adaptation of the basic linear system as mathematical operations. Given in detail hereinbelow are certain derivations of these and other formulas which indicate how the learning process achieves correct input and output relations by the repeated applications of the selected $(B_s)_{ij}$ or desired outputs concurrently with the reception of corresponding input signals $f_i(t)$. This permits a set of $G_j(t)$ memory signals to become established which satisfy the desired conditions and produce a set of outputs $(W_k)_{ij}$. In certain preferred adaptations the outputs are quantized or digitalized if $V_{ij}$ falls within certain predetermined ranges of values.

Figure 6:
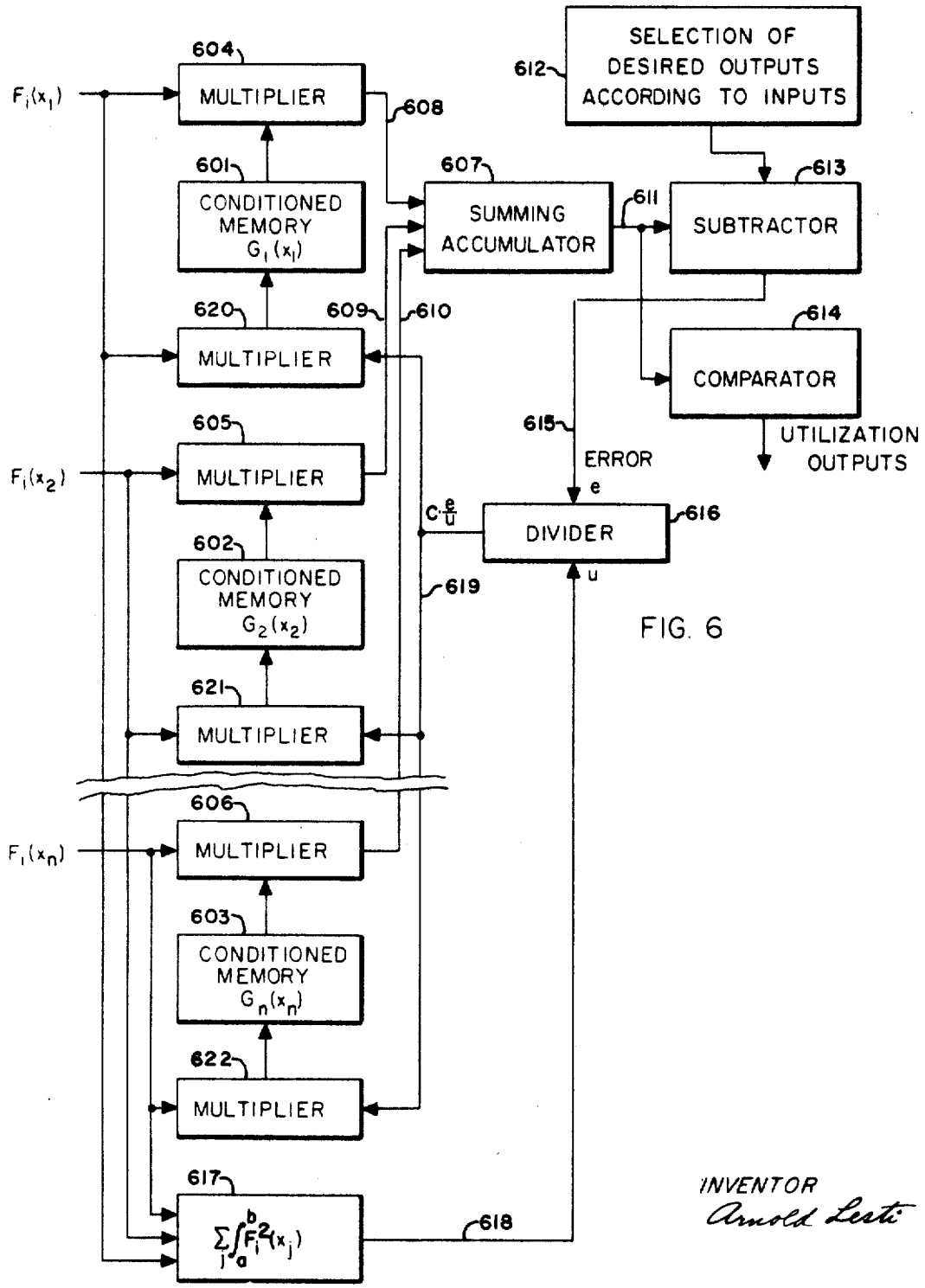
FIG. 6 is a general block diagram of the system with subdividing inputs and common accumulator and divider.

In FIG. 6 there is illustrated in block diagram the method of splitting each signal $F_i(x)$ into a multiplicity of separate signals such as $F_i(x_1)$, $F_i(x_2)$, ... $F_i(x_n)$ wherein the separate functions of $x$ are the same $F_i(x)$ designated in distinct ranges of $x$ which together cover all the range of $x$ in which $F_i(x)$ is defined. If the range of $x$ is $a$ $a \leq x \leq b$ then $a \leq x_1 x_2 \ldots \leq x_n \leq b$. The conditioned memories 601, 602, and 603 each operate only with the corresponding portions $F_i(x_1)$, $F_i(x_2)$, ... $F_i(x_n)$ of the input signals. Similarly the multipliers 604, 605, and 606 multiply the respect signal portions and memory portions to produce $F_i(x_1) \cdot G(x_1)$, $$F_i(x_2) \cdot G(x_2), \ldots F_i(x_n) \cdot G(x_n)$$

respectively. All of these are applied to the accumulator 607 which adds them all and holds the sum. One form of this accumulator may be an amplifier with feedback capacitor and a series of input resistors each connected to one of the corresponding product functions on buses 608, 609, and 610. Other adaptations utilizing digital techniques may use a digital accumulator. The results, on output bus 611, equal $$\int_a^b F_i(x_1) \cdot G(x_1) + F_i(x_2) \cdot G(x_2) + \ldots + F_i(x_n) \cdot G(x_n) dx =$$
$$\int_a^b F_i(x) \cdot F(x) dx = V_i$$

which is the same result obtained by operator 503 in FIG. 5. Units 612, 613, and 614 operate in a manner similar to the corresponding units in the previous figures where shown. The error $e$ on bus 615 is fed as dividend to the divider 616. Unit 617 computes $$\sum_j \int_a^b F_i^2(x_j) dx$$

the sum of the squared value of the separate input signals. This unit can include solid state squaring devices and analog integrators in one version. The output $u$ on bus 618 is applied as the divisor to divider 616. Various versions of the divider are described hereinbelow. The quotient $$C \frac{e}{u}$$

is applied on bus 619 which supplies each of the multipliers 620, 621, and 622. The latter multipliers are supplied with the separate signals $F_i(x_1)$, $F_i(x_2)$, and $F_i(x_n)$ respectively to produce corresponding error signals $C \cdot \Delta G_i(x_1)$, $C \cdot \Delta G_i(x_2)$, and $C \cdot \Delta G_i(x_n)$. The parameter C is supplied by gain adjustment in the divider. It could be supplied also by gain adjustment in 613, or 617 or even individually in units 620, 621, and 622. The error signals are applied to the respective conditioned memories and added thereto to correct the same. One advantage of the use of separated portions of an input signal wherein each portion is processed separately by the various multipliers and memories is that greater speed of operation may be obtained when the separated signals may be applied simultaneously by a preliminary processor. Smaller memory units may be used with faster rates for providing the memory signals.

Figure 7:
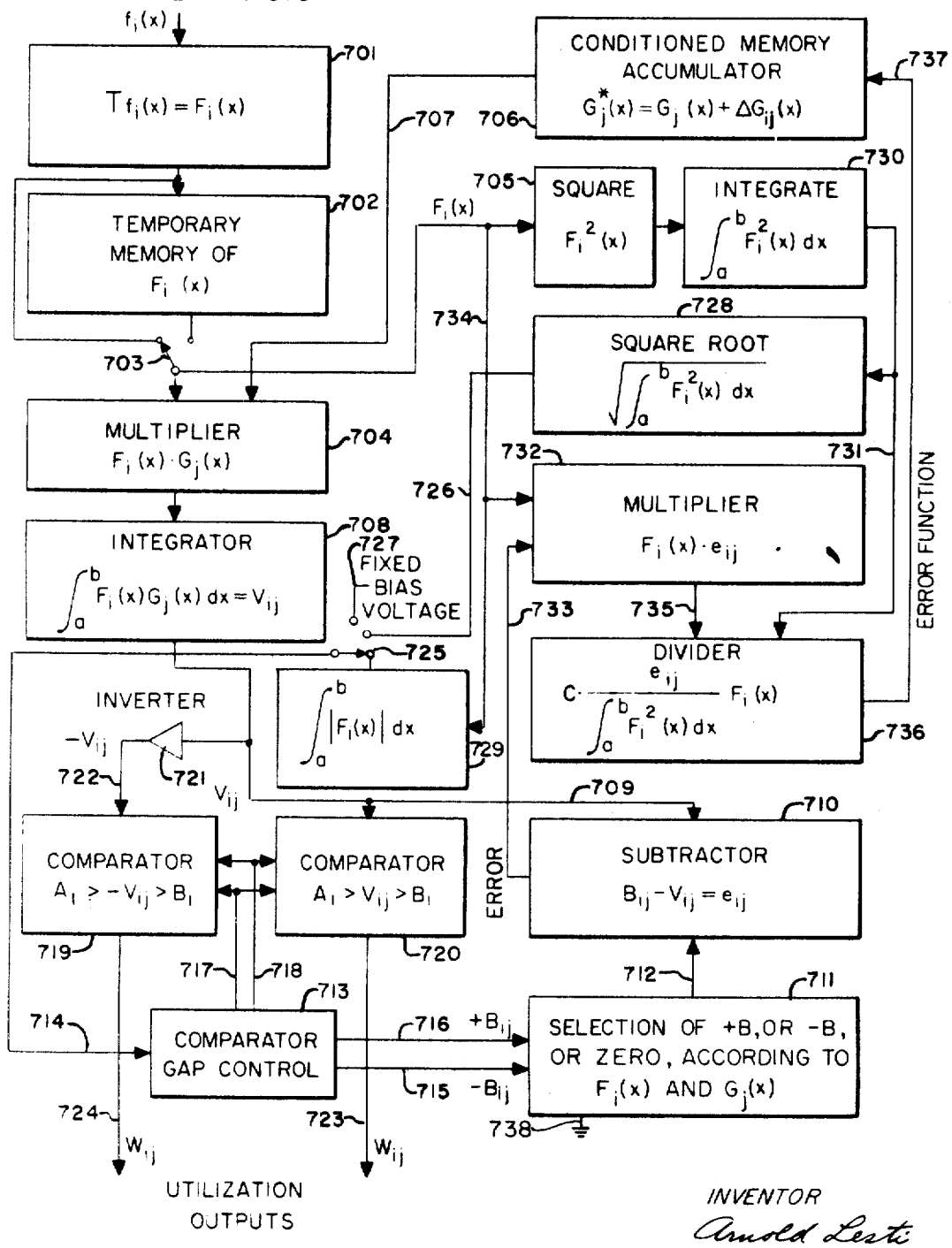
FIG. 7 is a general block diagram with detailed mathematical operators of a linear system.

What is often referred to herein as the linear system is diagrammed in FIG. 5 with respect to certain general mathematical operations. In FIG. 7 the same linear system is diagrammed with more detailed blocks shown with respect to which method and means of implementation may be readily attained in preferred embodiments described hereinbelow. There are many nonlinear operations in the linear system such as the transformation operation $tf_1(x) = F_i(x)$ in block 701, which performs in the same manner as certain operations described in the corresponding block in FIGS. 3, 4, and 5. Switch 703 may select $F_i(x)$ directly or after $F_i(x)$ is stored in temporary memory 702. The signal at the switch is directed to multiplier 704 which multiplies $F_i(x)$ with the signals from the conditioned memory accumulator 706 via bus 707. The outputs of 704 are signal functions of time $$F_i(x) \cdot G_j(x)$$

the index $j$ identifies any specific memory signal out of a multiplicity. In FIG. 7 it may be assumed that either serial or parallel operation is possible and this comes within the scope of the formulas and the independent variable $x$ may be equal to time in preferred embodiments. The output of 704 feeds integrator 708 which produces $$\int_a^b F_i(x) G_j(x) dx = V_{ij}$$

as output values each associated with a memory signal and an input signal. The output of 708 is applied to the subtractor 710 by bus 709. The subtractor subtracts $V_{ij}$ from the assigned values $B_{ij}$ to produce the error scalers $e_{ij}$. The block marked 711 represents the method and means of teaching or assigning the desired values $B_{ij}$ to 710 via bus 712 and consists, in this case, of assigning either zero value from bus 738 or the positive (+) value or the negative (−) value of the absolute value of B which exists on buses 715 and 716, respectively. Each assingment is made according to the currently received input function $F_i(x)$ and a $G_j(x)$ function. The (+) and (−) values of B and B itself is provided through the comparator gap control 713 which receives the voltage from bus 714. In 713 there is a reversing amplifier, in one form of the invention, to reverse the signal on 714 and supply it to lead 715. The straight signal goes to bus 716. These buses 715 and 716 supply unit 711 which latter unit connects either 716 or 715 to 712 according to the assignments. Buses 717 and 718 supply direct and reversed adjusted reference voltages to comparators 719 and 720. In the comparators these adjusted voltages are designated $A_1$ and $B_1$ respectively corresponding to the voltage limits on each side of $B_{ij}$. The output of 708 on bus 709, consisting of any of the occurring values $V_{ij}$, is reversed through amplifier inverter 721 and supplied as $-V_{ij}$ on bus 722. The inversion at this point enables comparator 719, fed through bus 722, to operate when comparator 720, fed through bus 709 with direct $V_{ij}$, cannot operate, and vice versa. Assume that the comparator voltages $A_1$ and $B_1$ are positive and $A_1 > B_1$. Then, if the voltage of $V_{ij}$ at 709 is positive and if it lies between $A_1$ and $B_1$, comparator 720 will operate and cause a digitalized change in voltage designated as signal $W_{ij}$ on bus 723. On the other hand, if the voltage of $V_{ij}$ at 709 is negative comparator 720 cannot operate, but the inverter 721 will reverse the voltage at 722 and cause a positive signal to go into comparator 719, which operates exactly the same as comparator 720, causing a digitalized output signal $W_{ij}$ on bus 724. Switch 725 may be used to select a fixed bias voltage on bus 727 for reference magntiude of $B_i$, or the RMS voltage $$\sqrt{\int_a^b F_i^2(x)\,dx}$$

generated in 728 and supplied on bus 726, or the integral of the absolute value of the applied signal $F_i(x)$ generated in 729 and supplied to switch 725 for selection. The reference voltage supplied by 728 or 729 enables the learning machine to give output responses which are independent of amplitude changes of the signal such that the response, if learned for $KF_i(x)$ at one or a few values of K, will need no further learning for any values of K within the saturation limit of the equipment. In this and other reference to this type of invariance it is assumed that K is a stretch constant with the same polarity at all times. Without preliminary processing, the linear system will reverse its output if the signal $-F_i(x)$ is presented instead of $F_i(x)$. Moreover, the two cannot be separated on a linear basis alone, without nonlinear input transformation circuitry. The squaring circuit 705 produces $F_i^2(x)$ from the input signal. The squared signal is applied to the integrator 730 to produce the energy content signal $$\int_b^a F_i^2(x)\,dx$$

which is supplied to bus 731 as a voltage. The square-root circuit 728 takes the square-root of the energy content. In a preferred form this uses solid state diodes in a feedback circuit with associated amplifiers. Details of this and other circuits are given hereinbelow. In one form the error scalar produced by 710 is supplied to the multiplier 732 via bus 733. The multiplier receives $F_i(x)$ from bus 734 and multiplies the error scalers $e_{ij}$ and $F_{ij}$ giving $F_{ij}(x) \cdot e_{ij}$ on bus 735. The latter is applied to divider 736 which uses the energy content signals supplied by 730 and divides them into $F_{ij}(x)e_{ij}$. At this point the error signal parameter C may be introduced, either as a gain adjustment manually set, or as an automatic gain adjustment obtained by circuitry which use the accumulated error signals established by a succession of received input signals. The latter type is detailed further hereinbelow. The parameter C may be introduced at other points in the circuitry such as gain adjustments in units 710 or 732. The error signals from unit 736 consists of $$C \cdot \frac{e_{ij}}{\int_b^a F_i^2(x)\,dx} \cdot F_i(x) = \Delta G_i(x)$$

which are applied to bus 737 and fed to the conditioned memory accumulator 706 which adds $\Delta G_{ij}(x)$ to $G_j(x)$ producing corrected memory signals $G_j(x) + \Delta G_{ij}(x)$ to replace $G_j(x)$. The corrected signals are held in storage and supplied to bus 707 for use in the multiplier 704 when any other input signal is received.

MATHEMATICAL DERIVATIONS

Linear systems

In the foregoing description, particularly in connection with FIGS. 5 and 7, the formulas given will cause the $G_j$ memory functions to become established by a succession of additions thereto of error signals which when carried on sufficiently will give the correct and desired output operations when the learned signals are applied to the machine. It is stated above that mathematically the linear formulas are equivalent to solving a set of linear simultaneous equations in $n$ unknowns. Each one of the equations has coefficients which represent the various values of the signal as either occurring in time or distributed in space. In the finite systems, which are those which occur in practice, $n$ is a finite number. The same unknows are common to all of the equations and when they are found they are stored in the memory by the machine thus providing an efficient mode of storing learned ability to respond, since the actual received signals from the environment are not individually stored.

After suitably modifying and transforming a received input signal and producing a signal $F_1(x)$ it is multiplied by the memory signal, whatever it may be. To start, the memory signal may be zero or some extraneous signal may be present in the memory. The memory signal $G(x)$ is multiplied by an input $F_1(x)$ in the set of signals which are to be recognized to give $F_1(x) \cdot G(x)$. This is then integrated to produce $$\int_a^b F_i(x) \cdot G(x)\,dx$$

wherein $a$ and $b$ are the limits of integration, being also the limits of the range of the $x$ in both $F_1(x)$ and $G(x)$ such that $a \leq x \leq b$. In the linear system it is assumed that $G(x)$ is made up, or at least includes, a linear combination of all of the input signals received and learned by the machine. That is, $$G(x) = A_1 F_1(x) + A_2 F_2(x) + \ldots + A_n F_n(x) \quad (1)$$

If it is desired to change $G(x)$ by adding to it $\Delta G(x)$ which consists of $\Delta G(x) = K_i F_i(x)$ made up of some constant $k$, to be determined, multiplied by the $F_i(x)$ then being received, and if $$\int_a^b F_i(x) \cdot G(x)\,dx \neq B_i$$

where $B_i$ is the desired value, but the inequality sign shows that $F_i(x)$, being received and the existing state of the memory does not produce $B_i$ close enough to be acceptable as the desired response, then the memory signal is modified as follows, $$\int_a^b F_i(x)(G(x)+K_iF_i(x))dx = B_i \quad (2)$$

In Equation 2 the previous inequality becomes an equality and then the value of $K_i$ must be found by the machine to satisfy (2). If (2) is solved for $K_i$ the result is, $$K_i = \frac{B_i - \int_a^b F_i(x)G(x)dx}{\int_a^b F_i^2(x)dx} \quad (3)$$

If (3) is multiplied by the input signal $\Delta G(x)$ is obtained. The numerator of (3) is the error scalar $e_i$. The denominator is $U_i$, so that the error functions become $$\frac{e_i}{u_i} \cdot F_i(x) = \Delta G_i(x) \quad (4)$$

*Gauss-Seidel iteration in learning*

If the right-hand side of (1) is multiplied by each $F_i(x)$, integrated and equated with the respective desired $B_i$'s the set of $n$ equations is obtained $$A_1\int_a^b F_1^2(x)dx + A_2\int_a^b F_2(x)F_1(x)dx + \cdots + A_n\int_a^b F_n(x)F_1(x)dx = B_1$$

$$A_1\int_a^b F_1(x)F_2(x)dx + A_2\int_a^b F_2^2(x)dx + \cdots + A_n\int_a^b F_n(x)F_2(x)dx = B_2$$

$$\vdots$$

$$A_1\int_a^b F_1(x)F_n(x)dx + A_2\int_a^b F_2(x)F_n(x)dx + \cdots + A_n\int_a^b F_n^2(x)dx = B_n \quad (5)$$

The set (5) of equations has a matrix of the integrals which is positive definite and symmetric, and the $F_i(x)$ signals are linearly independent. The unknowns in (5) are the A's which, when determined, can be inserted in (1) to produce $G(x)$ which will then satisfy all of the conditions required to produce the predetermined set of the $B_i$'s on the right-hand side of (5). In solving (5) by producing the error function (4) what is actually being done, for example, in Equation 1 is that the coefficient $A_1$ has added to it the $K_1$ of Equation 3 if $F_i(x)=F_1(x)$. Then the first equation in (5) has its first A changed to $(A_1+K_1)$ to satisfy it, if it started as an inequality. In a similar manner, if $F_2(x)$ is presented to produce the second equation of (5) then a $K_2$ is found which is added to $A_2$ giving $(A_2+K_2)$ to satisfy it. In a further similar manner all $A_i$'s have added to them a corresponding $K_i$ to satisfy each equation, in turn down to the $n^{th}$ equation. As each equation is satisfied the previous equations become inequalities. Then the process is repeated starting with the first. Actually the order in which they are taken makes no difference. As the process is continued, the values of the added K's become smaller and converge to zero. Then the equations are all satisfied simultaneously. When any member $F_i(x)$ of the set of input signals is presented the proper $B_i$ is produced, which was presented as the desired signal on the right-hand side of Equations 5 while the corresponding $F_i(x)$ was being applied in the teaching operation. Final or even near convergence produces a learned state of the memory signal $G(x)$ given by (1).

The above learning process is iterative and the procedure which the machine follows in utilizing the signal actually presented, as the signal to use to correct its memory, consists in applying the classical Gauss-Seidel method of solving a set of simultaneous equations by iteration, given by (5) as applicable to learning according to this invention.

It is an established mathematical theorem that the classical Gauss-Seidel method for solving a set of linear equations will always find a solution and the iterative process will converge under the sufficient condition that the matrix of the equations is positive definite. A positive definite matrix is also symmetric. The process will always converge with the matrix of (5) since it is positive definite, the sum of all the integral terms being equal to $$\int_a^b (F_1(x)+F_2+\ldots+F_n(x))^2 dx$$

which is always positive and the diagonal terms are always positive and never equal to zero. This method of learning will always produce the correct response so long as the $F_i(x)$ are linearly independent.

In case the memory signal starts out with a noise signal or some extraneous signal before learning or while learning is in progress, then the extraneous signal will be cancelled out by the iterative learning process. If the Equations 5 are represented by $$\sum_i A_i \int_a^b F_i(x)F_k(x)dx + \int_a^b F_k(x)N(x)dx = B_k \quad (6)$$

wherein $N(x)$ is an undesired noise signal present in the memory and in all of the equations. The index K gives the different equations as K changes. The term with the noise can be transposed giving $$\sum_i A_i \int_a^b F_i(x)F_k(x)dx = B_k - \int_a^b F_k(x)N(x)dx \quad (7)$$

The iterative learning process can then continue as explained for Equations 5 above. The right hand side of (7) does not change as learning continues, or at least it is assumed that $N(x)$ has been caught in the memory at a certain time and remains there without further change. This will give the learning process a chance to cancel it. If in (7) certain of the $B_k=0$, then the task of the process is to provide a set of $A_i$'s which will satisfy all other conditions and cancel the noise term in the memory.

Formula 4 as derived, which includes the integral form (3), is used in practicing the invention in various adaptations. Unqualified proof of the convergence of the process by use of (4) with the integrals follows by the solution of (5) with the classical Gauss-Seidel iteration in which every step of the iteration is a teaching presentation of a specific signal. Equations (5) are applicable when a definite number of signals are to be recognized each of which is always the same when presented, and the convergence takes place even when the detailed structure of each signal is very large, and the process is valid either with a finite or infinite detailed structure in each signal.

When it is desired to provide a learning machine which is presented with input signals which are not precisely repeatable, and wherein such signals are statistical samples of an infinite set of signals, then Formula 4 must be multiplied by the parameter C. If each signal in such an infinite set is a finite signal, the need for the parameter C can be shown by extending the Kaczmarz iterative method. First the applicability of the Kaczmarz iteration will be shown to repeatable signals and its equivalence to the Gauss-Seidel method for such repeatable but finite signals. Then by an extension of the Kaczmarz iteration under the section below on statistical distributions there is shown the need for parameter C for infinitely distributed signals which are not precisely repeatable.

Kaczmarz iteration in learning

The error function (4) can be considered to be a finite signal vector in a finite $n$-dimensional Euclidean space. There it is the vector $\Delta G_1(x)$ which must be added to a point in the space which is a representation of the present state of the memory $G(x)$. The correction vector is directed from point $G(x)$ towards and into and perpendicular to the subspace which is the locus of all memory functions which satisfy the particular $F_1(x)$ then being presented, considering all such equations finite, notwithstanding the integral signs which can be replaced in this case by summation signs. When $G(x)+\Delta G_1(x)$ is formed carrying the memory into the subspace, the new state of the memory satisfies the input signal which was presented. Designate $F_1(x)=F_1(x)$ where $i=1$ for that input signal which then is satisfied by $G(x)+\Delta G_1(x)$. This latter point is the starting position when another input signal $F_2(x)$ is presented. An error vector $\Delta G_2(x)$ is computed which is directed from point $G(x)+\Delta G_1(x)$ towards and into and perpendicular to the subspace which is the locus of all memory functions which satisfy $F_2(x)$. The new state of the memory then would be $G(x)+\Delta G_1(x)+\Delta G_2(x)$. The solution of the set of equations $$\int_a^b F_1(x) \cdot G(x) dx = B_i \qquad (8)$$

requires that the subspaces of the memory vectors which satisfy each $F_1(x)$ separately must intersect in a subspace which is the subspace which contains $G(x)$ which satisfies (8) for all input signals. The index $i$ identifies the various equations. The integration is a finite summation over $n$ finite values of definition of each of the $F_1(x)$ and $G(x)$. This finite limitation on the integration, for the present purpose, is not a limitation on the integration in Equations 5, which latter equations have a finite number of A's but can have an infinite number of values in the respective signal functions, even though in practice, even these are finite. Return to Equation 8 and the concept of intersecting subspaces in the $n$-dimensional Euclidean space. The subspace which contains all memory signal vectors and $G_0(x)+\Delta G_1(x)$, any of which satisfies $F_1(x)$ in (8), each have a distance (RMS) smaller to the point $G_0(x)+\Delta G_1(x)$ than to the point $G_0(x)$ which is not in the subspace, because a right triangle is defined in which the distance to $G_0(x)$ is the hypotenuse which is greater than either of the other two sides. Similarly, the subspace which contains all memory signals vectors and $$G_0(x)+\Delta G_1(x)+\Delta G_2(x)$$

any of which satisfies $F_2(x)$ in (8), each have a distance smaller to the point $G_0(x)+\Delta G_1(x)+\Delta G_2(x)$ than to the point $G_0(x)+\Delta G_1(x)$. And in a further similar manner, signals $F_3(x)$, $F_4(x)$, ... $F_n(x)$ may be applied, and error signals $\Delta G_3(x)$, $\Delta G_4(x)$, $\Delta G_5(x)$ ... are calculated each directed perpendicular to a subspace respectively satisfying the presented signal vector, and the intersection of all the subspaces which satisfies as $G(x)$ all the presented $F_1(x)$ is separated by a smaller distance to the last point generated by the addition of the last error signal than to any other point previously generated. The successive reduction ratios $r_k$ are always less than some number $r<1$ such that $r_k<r<1$, where $k$ is a positive integer giving the consecutive order of presentation of each different input signal. Then the memory signal vectors thus generated will converge to the correct $G_1(x)$ which will satisfy (8).

The above method of solving Equation 8 having a set of $F_1(x)$ functions each with discrete finite values at $n$ discrete values of $x$, defining a signal matrix, achieves the same result as the set of Equations 5 solved by the Gauss-Seidel iterative process. The method of moving with the $\Delta G_1(x)$ perpendicular to a subspace is the Kaczmarz method of solving linear equations, and the above indicates its applicability to learning systems.

If the various signals $F_1(x)$ are distinguished by subscript $i$ and if each signal has a set of discrete values identified by $j$ instead of $x$ we would obtain a matrix of $F_{ij}$. Call this a matrix $(a_{ij})$ consisting of a maximum number of $n$ rows and $n$ columns. We shall use the values $x_j$ in this to correspond to the discrete values attained by $G(x)$ at the discrete set of $x$'s. Then Kaczmarz method solves $$\sum_j b_{ij} x_j = B_i \qquad (9)$$

by starting from a point with a set of $x_j$'s, with $j=1, 2, 3, \ldots n$, or the origin as a possible start point. Kaczmarz iteration consists in adding the error vector, having $j=1, 2, 3, \ldots n$ components, consisting of $$\frac{B_i - \sum_j a_{ij} x_j{}^1}{\sum_j a_{ij}{}^2} \cdot a_{ij} = \Delta x_{ij} \qquad (10)$$

to the $x_j$'s giving $x_j + \Delta x_{ij}$ as the new set of values to replace each of the $x_j$'s with one fixed value of index $i$ identifying one pass into the subspace. When repeated, this process will converge to a set of $x_j$'s which solve (9).

Equivalence of Gauss-Seidel and Kaczmarz iterations in learning

The above Kaczmarz method is equivalent to a corresponding Gauss-Seidel iterative method under the following conditions:

Let the Kaczmarz matrix $(a_{ij})=T$, let $T^*=$transpose of T. Then $TT^*=(C_{ik})$ is a positive definite non-singular symmetric matrix. Let $$\sum_k C_{ik} A_k' = B_i \qquad (11)$$

where the $B_i$ are the same as in (9), and the set $A_k$'s is an approximate solution to (11) including 0 to start. Since $(C_{ik})$ is positive definite it provides a sufficient condition for convergence of (11) by Gauss-Seidel's iteration. During the next cycle of iteration $$\sum_k C_{ik} A_k'' = B_i$$

where the $A_k''$ are the next Gauss-Seidel iterative values obtained by making one complete pass through all of the equations. If we look at $A_k'$ and $A_k''$ at a time when a certain specific index $i$ in $C_{ik}$ is applied and $i=k$, then $A_k''-A_k'=\Delta_k$ and for each $\Delta_k$ with $i=k$ there is a $$\frac{B_i - \sum_j a_{ij} x_j'}{\sum_j a_{ij}{}^2} \qquad (12)$$

in (10) which corresponds, and the following infinite sums converge $$\sum_{t=1}^{\infty} \Delta_{tk} = A_k \qquad (13)$$

The set of $A_k$'s solve (11). In (13) the index $i$ is eliminated since it equals the index $k$. In practice the interative index $t$ of learning and teaching cycles which has been inserted in $\Delta_{tk}$, is never required to be greater than a moderate number to give sufficient accuracy of solution for Equation 11 to meet the practical requirements. The above indicates the equivalence of the Kaczmarz iteration and the Gauss-Seidel iteration which is useful for the present methods of realizing learning machines. If $TT^*$ is a Gauss-Seidel matrix, then T is a Kaczmarz matrix. In the foregoing, $TT^*$ corresponds to the matrix of the integrals in Equations 5, while T corresponds to the matrix $(a_{ij})$ in (9), which also corresponds to the set of $F_1(x)$'s in Equation 8, assuming finite signals.

41

The signals in the linear system, $F_i(t)$ and $G(t)$, can be converted into corresponding Fourier series of sine and cosine components. If $$\int_{t_1}^{t_2} F_i(t)G(t)dt = B_i$$

is taken but with the Fourier term substituted, there will be obtained a dropping out of all product terms except those with identical sine or cosine terms having the same argument. The coefficients of the retained components form a set of simultaneous equations in which the Fourier coefficients in the expansion of $G(t)$ constitute the unknowns. The iterative process of the learning machine will solve for these in the same manner as is described above in connection with Kaczmarz or Gauss-Seidel iteration. It is preferred not to include the constant term in the expansion. If the ratio of frequencies of the highest to lowest frequency Fourier components is multiplied by two, the result will be the dimensions of the space in which the signals can be considered as vectors, and will give the maximum number of forced classes possible. The factor of two is derived from the coefficients of both the sine and cosine terms in the expansion. In practice, this means that if the highest frequency which carries significant information is determined, and the period of time is known in which both $F_i(t)$ or $G_i(t)$ occur, then the maximum number of separable classes of signals per G-function can be quickly determined.

Figure 10:
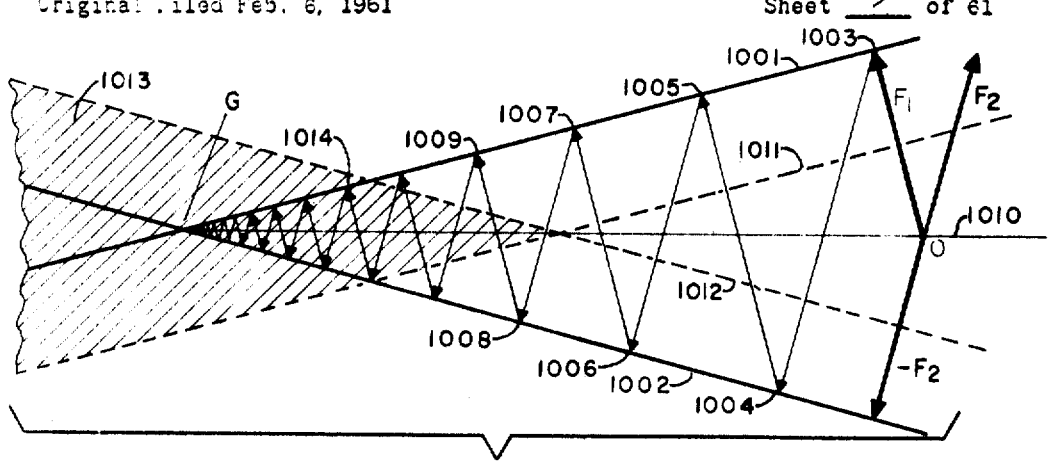
FIG. 10 is a vector diagram of the convergence of the learning process.

FIG. 10 is an illustration in two dimensions of the Kaczmarz iterative process utilized in the invention. $F_1$ and $F_2$ represent two signal vectors which are to be separated. Line 1001 is the focus of points of the G's which satisfy $|F_1||G|\cos\theta = +B$. Since $F_2$ is required to give a negative value when presented, it is reversed when its error vector is applied. This gives line 1002 as the locus of points which satisfy $|F_2||G|\cos\theta = -B$, where the G which satisfy both equations is to be determined and $\theta_1$, $\theta_2$ are the angles between $F_1$, G and $F_2$, G, respectively. If signal $F_1$ is presented first, and if $G=0$ is the start condition of the memory, then the vector from O to 1003 is the first error vector and equals $F_1$ itself. We assume here that the signals are normalized and presented as unit vectors. If the state of the memory is the point 1003, and signal vector $F_2$ is presented the answer given will be incorrect and an error vector consisting of the vector from point 1003 to point 1004 is generated and added to the memory bringing its value to point 1004, which will satisfy the presentation of $F_2$ if it should be presented again. Note that the vector between points 1003–1004 is parallel to $F_2$. If $F_1$ is presented next the state of the memory at point 1004 will not give the correct answer, so that the error vector from point 1004 to 1005, parallel to $F_1$, is computed and added to the memory giving point 1005 as the new value of G which satisfies $F_1$. In a similar manner successive presentations of $F_2$ and $F_1$ will produce successive points representing the memory states such as 1006, 1007, 1008 and 1009 and so on, until the point G is reached which satisfies both conditions at the same time since it occupies both lines 1001 and 1002. The point G is the state of the memory and the line from O to G may be considered as the memory signal vector. The line from O to 1010 is in the direction negative to G. It can be noted that the projecting of $F_1$ on G is positive, while the projection of $F_2$ on G is negative since it falls on the line from O to 1010. Formula 9 is equivalent to $|F_1||G|\cos\theta_1 = B_1$, where $|F_1|$ and $|G|$ are the RMS or distances or norms of the vectors respectively and $\theta_1$ is the angle between vector $F_1$ and vector G. If $+B=1$ and $-B=1$, the lines 1001 and 1002 may be considered as distances along the respective vectors of $+1$ and $-1$. If Equation 9 is turned into inequalities such that $$\sum_j a_{ij}x_j > \tfrac{1}{2}$$

42 and $$\sum_j a_{2j}x_j < -\tfrac{1}{2}$$

then $F_1$ is satisfied with any G vector with points in the region above line 1011 which cuts $F_1$ in half, while $F_2$ is satisfied by any point below line 1012 which cuts $-F_2$ in half. Under these conditions any value of the memory signal vector in the cross-hatched region 1013 will satisfy the inequalities simultaneously and will give a state of the memory which can be attained more quickly since the error vectors beyond the point 1014 need not be computed. Absolute values of less than ½ can be used in the inequalities. Inequalities of the above type will also permit signal vectors which differ from $F_1$ and $F_2$ by an angular displacement within predetermined limits to give a response to satisfy predetermined inequalities. This can be used to trigger circuits to give the same digitalized responses as the signal vectors $F_1$ and $F_2$ from which the stated signals differ respectively by less than the predetermined maximum angular amounts.

Figure 11:
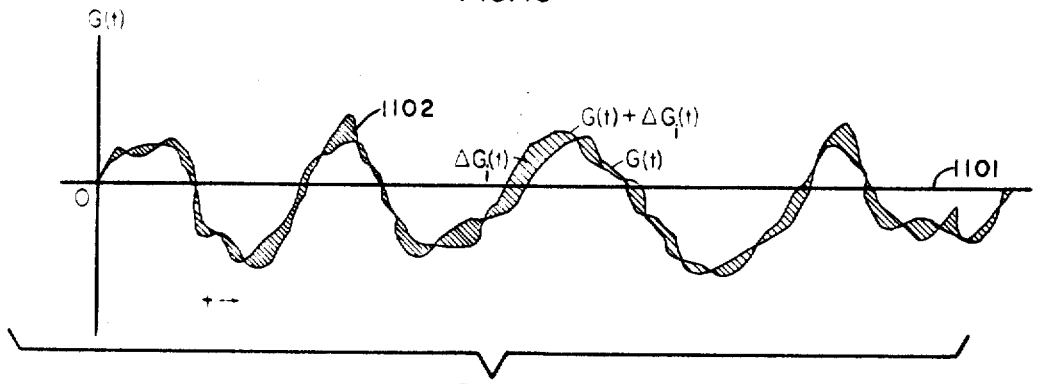
FIG. 11 is a waveform diagram of a conditioned memory $G(t)$ function with error function $G(t)$.

FIGURE 11 illustrates a $G(t)$ memory signal function with zero axis 1001 and the flow of time being from left-to-right. The error signal $\Delta G_i(t)$ when superimposed on $G(t)$ is shown as a shaded area. The added $\Delta G_i(t)$ produces $G(t)+\Delta G(t)$. The shaded area represents the least RMS signal which can be used to change $G(t)$ to give the corrected response to signal $F_i(t)$ which is used in computing $\Delta G_i(t)$.

Figure 12:
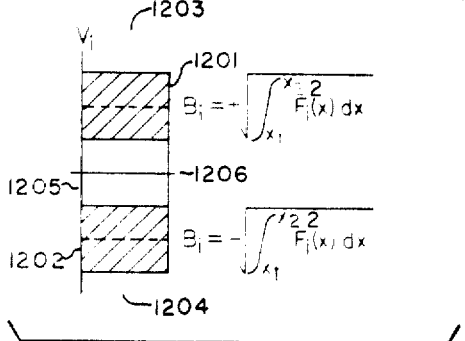
FIG. 12 is a diagram illustrating comparator gaps with normalizing values.

FIG. 12 illustrates the gap or range regions of voltage in the comparator. $B_i$ lies in the center of the shaded areas. If $$V_i = \int_a^b F_i(t)\cdot G(t)dt$$

has a value in the upper shaded area 1201 then one state of a two-state binary output choice is made, while if $V_i$ has a value in the lower shaded area 1202, the other of the two-state binary response is made, in one adaptation. In a further version, if $V_i$ occurs outside the shaded areas then neither one nor the other of the stated two-state binary response is produced. Such a no-response can occur above the upper shaded area 1203, in the lower area 1204, or in the center 1205 around zero voltage indicated by 1206. The value of $$B_i = \pm \int_a^b |F_i(x)|dx$$

could be used instead of the ones shown. Also, $B_i$ may be fixed reference voltages.

Figure 13:
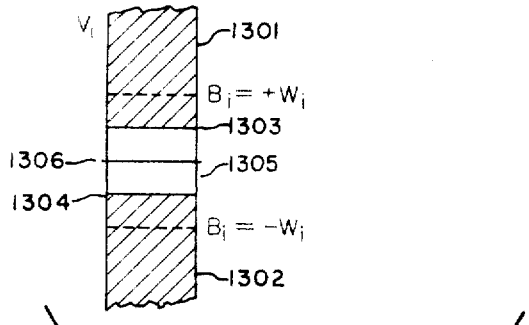
FIG. 13 is a diagram illustrating comparator gaps with outside bounds removed.

FIG. 13 illustrates the gaps with shaded areas 1301, 1302 having no upper bounds, so that any $V_i$ voltage produced with a value above the point marked 1303 will give an output response to make one choice, while if the voltage of $V_i$ is more negative than point marked 1304 the other choice is made in output response, and if $V_i$ produces a voltage in region 1305 around zero 1306 no response is given. Of course, the region around zero for both FIGS. 12 and 13 may be reduced to zero size, so that response must be either one or the other of the two-states without a no-response possibility. The sizes of the regions may be controlled as explained further hereinbelow.

In both FIGS. 12 and 13 the gaps around zero and the value of zero may be learned or taught so that the learned values of $B_i$ given above would be included with another possible condition; namely, that $B_i=0$. Then the learned signals will include those which give a zero response. This could be used in a trinary coding system, or in a preferred system wherein a zero response in any output will produce a no-response condition. Even without learning zero the probabilities for a no-response are very high for an unspecified signal, if at least one of the set of $V_i$'s contributing to the total digitalized output gives a response in the zero range.

EFFECTS OF STATISTICAL DISTRIBUTION OF INPUT SIGNALS

The linear systems illustrated in FIGS. 5 and 7 should be looked upon as a framework by which the statistical properties of the signals operate. The linear formulas give the gross properties. In practice, as has been pointed out above, the input signals applied to the machine are finite samples of a class of an infinite number of signals. Rarely do two samples of signals coincide exactly. There are probabilities of occurrence and probability densities of distributions of signals. Some of the considerations on forced classes of signals have been given. Since the machine usually must have fewer degrees of freedom than there are total numbers of signals which must be distinguished, it divides the signals into forced classes. Inside a forced class there is a signal which is the average signal $\overline{F}_i(t)$ of the class. It can be regarded as one which has average coordinate components in its class. There is also a subspace of $\overline{G}(t)$ functions which satisfies $\overline{F}_i(t)$. That subspace is perpendicular to $\overline{F}_i(t)$. In learning to operate for optimum results, the machine will acquire memory signals such as $\overline{G}(t)$ which give the least error or no error to the average signals in the respective forced classes. The machine will find a $\overline{G}(t)$ function which lies at the intersection of a set of subspaces each of which satisfies respectively an average signal $\overline{F}_i(t)$ in the $i^{th}$ forced class.

A list of symbols and formulas is given below which is employed in connection with the derivations. In these, the independent variable $t$ is used which may signify time, but $t$ could be $x$ instead, which could correspond to space or other convenient parameters.

$F_i(t)$ = any given vector in a forced class $i$
$\overline{F}_i(t)$ = average signal vector in a forced statistical class $i$
$G(t)$ = present memory signal vector
$\phi_i$ = angle between vector $F_i(t)$ and $G(t)$, $\phi_i = \phi_i(s)$
$\theta_i$ = angle between any vector in forced class $i$ and average signal vector $\overline{F}_i(t)$ in that class, $\theta_i = \theta_i(s)$
$\theta_{i1}$ = Angle between vector $F_i(t)$ and vector $\overline{G}(t) - \overline{F}_i(t)$. The latter vector is perpendicular to vector $\overline{F}_i(t)$, $\theta_{i1} = \theta_{i1}(s)$
$s$ = The ordered domain of angular measure with respect to a reference system in the $i^{th}$ class of signals, at $\bar{s}$ with average signal $\overline{F}(t)$. All the coordinates of $s$ may equal zero for $\overline{F}(t)$. Any other vector $F_i(t)$ has an angle $\theta_j$ with respect to $\overline{F}(t)$, and $\theta_i = \theta_i(s)$. Also, $\theta_{i1} = R\theta_{i1}(s)$, $\phi_i = \phi_i(s, G(t))$. For each set of values of the coordinates of $s$ there is an $F_i(t)$.

$$\bar{f}_i(t) = \frac{\overline{F}_i(t)}{|\overline{F}_i(t)|}$$

$P_i(s)$ = multivariate probability density function of $s$ in $i^{th}$ class $$V_i = \int_{t_1}^{t_2} F_i(t) G(t) dt = |F_i||G|\cos \phi_i$$

$$e_i = B_i - V_i$$

$$U_i = \int_{t_1}^{t_2} F_i^2(t) dt$$

$$B_i = \pm 1 \text{ or } \pm\sqrt{U_i} = \pm|F_i(t)|$$

$$\Delta G_i(t) = \frac{e_i}{U_i} \cdot F_i(t), \quad \Delta \overline{G}_i(t) = \frac{B_i - \int_{t_1}^{t_2} \overline{F}_i(t) G(t) dt}{\int_{t_1}^{t_2} \overline{F}_i^2(t) dt}$$

$$\overline{G}(t) = G(t) + \Delta \overline{G}(t)$$

$C$ = error parameter, multiplier $\Delta G_i(t)$ $$C = \overline{C} \int\!\!\!\int\!\!\!\int_S^{S+\Delta S} P_i(s) ds$$

It is necessary to determine the sum of the components of the corrections of the memory signal towards the subspace of the $\overline{G}(t)$'s, first upon the presentation of each $F_i(t)$ separately, and then all $F_i(t)$ in the $i^{th}$ class over a period of time in which the statistics has had a chance to give significantly accurate results. Each inner product is a scalar which must be multiplied later by a unit vector to obtain a vector with the proper direction. The above stated components of corrections each consists of the projection of $\Delta G_i(t)$ on $$\frac{\Delta \overline{G}_i(t)}{|\Delta \overline{G}_i(t)|}$$

or, what amounts to the same thing, the projection of $\Delta G_i(t)$ on $$\frac{\overline{F}_i(t)}{|\overline{F}_i(t)|}$$

which is given by $$\int_{t_1}^{t_2} \Delta G_i(t) \cdot \frac{\overline{F}_i(t)}{|\overline{F}_i(t)|} dt$$

$$= \int_{t_1}^{t_2} \left(1 - \int_{t_1}^{t_2} \frac{F_i(t)}{|F_i(t)|} \cdot G(t) dt\right) \cdot \frac{F_i(t)}{|F_i(t)|} \cdot \frac{\overline{F}_i(t)}{|\overline{F}_i(t)|} dt$$

$$= \int_{t_1}^{t_2} (1 - |G(t)|\cos \phi_i) \cdot \frac{F_i(t)}{|F_i(t)|} \cdot \frac{\overline{F}_i(t)}{|\overline{F}_i(t)|} dt$$

$$= (1 - |G(t)|\cos \theta_i) \cos \theta_i \quad (14)$$

Expression 14 can be multiplied by $P_i(s)$, the probability density giving, $$P_i(s)(1 - |G(t)| \cos \phi_i) \cos \theta_i \quad (15)$$

From the central limit theorem we can be assured that the samples of the random signals in the forced class have a sample average which itself has a distribution with mean $\mu$ and variance $\sigma^2/n$ and is a normal distribution, wherein there is a pair $\mu$, $\sigma^2$ of means and variances for each of the coordinates in $s$ of $P_i(s)$, and the theorem is true regardless of the form of the distribution of $P_i(s)$. The errors due to the central limit theorem can be made small by large numbers of samples and can be made less than the slight errors introduced by the finite size of the parameter C which will result in slight deviations from the average.

In order to determine the effects of all of the signals presented over a period of time when the statistical properties of the signals have had time to produce smooth results, the parameter C should be applied to multiply the various $\Delta G_i(t)$ error vectors, so that the memory signal will move by slow increments approximating a smooth transition from one state to another. Expression (15) should be incorporated into an integral which will add up all the various values which it would acquire over a statistically significant period of time when domain $s$ has been sampled sufficiently. We can here use the concept of multiple integration, regarding $ds$ as an elementary $n$-dimensional volume unit whose size is very small. Then the multiple integration adds up all of the products of (15) with the different $\Delta s$ or $ds$ units. This will give the change due to all of the input signals acting over a period of time in which the random samples of the input signals presented have produced significantly accurate statistics. Multiple integration over $s$ should be carried out. The dimension of $s$ are usually less than the number of degrees of freedom of the signal system; that is, the domain $s$ is a subspace of a total space in one-to-one correspondence with the signal space. There should be as many integrals as there are dimensions or coordinates in $s$. Integrating (15) in this manner produces $$\overline{C}\left[\int\!\!\!\int\!\!\!\int_S P_i(s) \cos \theta_i ds - |G(t)| \int\!\!\!\int\!\!\!\int_S P_i(s) \cos \phi_i \cos \theta_i ds\right] \quad (16)$$

The left hand side of (16) is a constant since it is based on the statistics of the forced class without external reference. The right hand side of (16) has double projections from the vector $G(t)$ to the vector $F_i(t)$, and the resulting projection is projected further onto $\overline{F}_i(t)$. Up to a multiplicative constant determined by adjusting parameter C, (16) gives the magnitude $x$ of the change of memory towards and perpendicular to the subspace of possible $\overline{G}(t)$'s. Let $G(t)=\overline{G}(t)+h\overline{f}_i(t)$ and by varying $h$, $G(t)$ moves perpendicular to $\overline{G}(t)-\overline{f}_i(t)$. Let $q+h=1$. Then (16) can be written as $$\overline{C}\Bigg[q\iiint_S P_i(s)\cos\theta_i ds$$

$$+h\iiint_S P_i(s)\cos\theta_i ds - |G(t)|\iiint_S P_i(s)\cos\phi_i\cos\theta_i ds\Bigg]=x$$

Since $$\iiint_S P_i(s)\cos\phi_i\cos\theta_i ds = \cos\overline{\phi}_i\iiint_S P_i(s)\cos\theta_i ds$$

and $G(t)\cos\overline{\phi}_i=q$ where $\phi_i$ is the angle between $G(t)$ and $f_i(t)$, and it is true substantially that $$|G(t)|\iiint_S P_i(s)\cos\phi_i\cos\theta_i ds = q\iiint_S P_i(s)\cos\theta_i ds$$

then $$x=\overline{C}\cdot h\iiint_S P_i(s)\cos\theta_i ds = h\cdot K$$

Expression (16) is linear with respect to any change of $h$, positive or negative, while constant K is dependent upon the parameter $\overline{C}$ and the internal statistics of the $i^{\text{th}}$ class, and substantially independent of the position of $G(t)$. The parameter C should be considered as having attained a small fixed value for (16) to apply, and then the change of memory per learning time, or the velocity is obtained by (16) towards and normal to the subspace of possible $\overline{G}(t)$'s.

Expression (16) should be multiplied by unit vector $$f_i(t)=\frac{\overline{F}_i(t)}{|\overline{F}_i(t)|}$$

to obtain the corresponding vector velocity. Since (16) is linear the memory vector point will move until it is on line $\overline{G}(t)-\overline{f}_i(t)$. If $\tau$ is the learning time, and since expression (16) is the negative displacement per unit of learning time, then $$\frac{dx}{d\tau}=-\frac{x}{k}$$

or $$\frac{dx}{x}=-\frac{d\tau}{k}$$

Then log $$x=-\frac{\tau}{k}+C_1$$

where $C_1$ is the constant of integration. If $A=e^{C_1}$ then $$x=Ae^{-\frac{\tau}{k}}$$

The latter shows that as the learning or teaching time increases $x$ approaches zero. This means that the memory point $G(t)$ will move perpendicular to the subspace of possible $\overline{G}(t)$'s. If the memory point starts on the other side of the subspace, (16) will change sign because its right hand member will be greater than the left hand one, since the velocity is negatively proportional to the displacement. The subspace of $\overline{G}(t)$'s represents memory points in stable equilibrium with respect to the statistics due to the velocity generated by magnitude (16). In a reasonably short finite time substantial convergence to the stable position will be achieved.

It is to be noted that if $P_i(s)$ has the greater values around the mean $\overline{F}_i$, then (16) will have relative greater magnitude than if the distribution $P_i(s)$ were weak around the mean. Another way of stating this is that the cosine terms, $\cos\theta_i$, favor those distributions which have small variance, and (16) increases in value when the variance of $P_i(s)$ decreases. Learning is slower when the variance of the input signal distribution is large.

In the above analysis the memory $G(t)$ is to be considered as being fixed. $\overline{G}(t)$ satisfies $\overline{f}_i(t)$, the normalized mean giving unity as inner product. The objective is to determine the way the memory is changing, or to find the memory velocity for any given state of memory $G(t)$.

In order to obtain the memory velocity component in the direction at right-angle to the direction of the component whose magnitude is given by (16), or the direction which is along the line $\overline{G}(t)-\overline{f}_i(t)$, it is necessary to find the projection of $\Delta G_i(t)$ along this line. This is given by $$\int_{t_1}^{t_2}\Delta G_i \frac{\overline{G}(t)-\overline{f}_i(t)}{|\overline{G}(t)-\overline{f}_i(t)|}dt$$

$$=\int_{t_1}^{t_2}(1-|G(t)|\cos\phi_i)\cdot\frac{F_i(t)}{|F_i(t)|}\cdot\frac{\overline{G}(t)-\overline{f}_i(t)}{|\overline{G}(t)-\overline{f}_i(t)|}dt$$

$$=(1-|G(t)|\cos\phi_i)\cos\theta_{i1} \quad (17)$$

By picking a set of coordinates, or a point of $s$, corresponding $\theta_i=\theta_i(s)$, $\theta_{i1}=\theta_{i1}(s)$ and $F_i(t)$ are picked, and by further picking $G(t)$ a corresponding $\phi_i=\phi_i(s, G(t))$ is picked. Multiplying (17) by $P_i(s)$ yields, $$P_i(s)(1-|G(t)|\cos\phi_i)\cos\theta_{i1} \quad (18)$$

By taking the multiple integration of (18), the same as was done in (16), there is obtained, $$\overline{C}\Bigg[\iiint_S P_i(s)\cos\theta_{i1}ds - |G(t)|\iiint_S P_i(s)\cos\phi_i\cos\theta_{i1}ds\Bigg] \quad (19)$$

This gives the magnitude of the velocity vector along the direction of $\overline{G}(t)-\overline{f}_i(t)$, tending to cause the memory signal vector to move in the general direction to point $f_i(t)$. The left member of (19) equals zero when $P(s)$ is fully symmetrical. Then there will be as many positive projections on $\overline{G}(t)-\overline{f}_i(t)$ by $\cos\theta_{i1}$ as there are negative ones thus cancelling. For the purpose of the projections in the formula it is convenient to visualize $\overline{G}(t)-\overline{f}_i(t)$ as a vector going through the origin, although as part of the signal system of vectors it may be considered also as going through the point $\overline{f}_i(t)$. For the $P_i(s)$ that are likely to occur in practice (19) will be close to zero. In that case it may be written as $$-\overline{C}|G(t)|\iiint_S P_i(s)\cos\phi_i\cos\theta_{i1}ds \quad (20)$$

Formula 20 becomes zero when $G(t)$ is zero, or if $G(t)$ equals $K\overline{f}_i(t)$, because then $\cos\phi_i$ gives symmetrical projections which $\cos\phi_{i1}$ will cause to be projected further equally about the origin for cancellation. Formula 20 will change sign if $G(t)$ goes through the origin along the direction of $\overline{G}(t)-\overline{f}_i(t)$. The velocity vector itself may be obtained by multiplying either (19) or (20) by $$\frac{\overline{G}(t)-\overline{f}_i(t)}{|\overline{G}(t)-\overline{f}_i(t)|}$$

If $P_i(s)$ has small variance then (19) or (20) will be very small and vice versa. If the signals are distributed mostly about the mean $\overline{F}_i(t)$ such signals cause $\phi_{i1}$ to be near 90° making (19) or (20) very small.

For the memory at point $G(t)$, the expressions (16) and (19) or (20) give the magnitudes of the velocity components normal and parallel respectively to the line $\overline{G}(t) - \bar{f}_i(t)$. If (16) equals $X_i(G)$ and the absolute value of (19) or (20) equals $Y_i(G)$, both as functions of G, wherein one or the other of (19) or (20) is used but not both, then the expression, $$X_i(G)\bar{f}_i(t) - Y_i(G)\frac{G(t) - \bar{f}_i(t)}{|G(t) - \bar{f}_i(t)|} \quad (21)$$

gives to full velocity vector when the memory signal is at point $G(t)$. With small variance of $P_i(s)$ in the forced signal class $i$, the left side member of (21) will be large and the right side member will be small, which is the desirable condition. On the other hand, if the variance of $P_i(s)$ is large, the left side member will be small and the right side member will be large which is undesirable.

There will be a multiplicity of forced classes such as the $i^{th}$ class. If there are $n$ such classes, then with a small constant C, (21) can be converted into, $$\sum_{i=1}^{n} \left( X_i(G)\bar{f}_i(t) - Y_i(G)\frac{\overline{G}(t) - \bar{f}_i(t)}{|\overline{G}(t) - \bar{f}_i(t)|} \right) \quad (22)$$

which adds the velocities due to the signals in all classes. If the $X_i(G)$ terms are large and the $Y_i(G)$ terms are small due to small variances in the $P_i(s)$, then convergence of the system as indicated previously in connection with Kaczmarz, Gauss-Seidel, and FIG. 10, will follow substantially with C starting at 1 and gradually reduced. When the process has proceeded where the overall errors are significantly reduced and forced classes are obtained, then the parameter C is reduced further in order to make the statistical Formula 22 operate smoothly to find the best solutions for the average signals in all the forced classes. The parameter C can be reduced gradually. By keeping it large to start, faster learning will occur. When C is reduced the machine is already giving significantly accurate results. The slower convergence with reduced C will permit the operation of Formula 22 to produce a memory signal vector which will cause smaller probabilities of errors, since their second moment about the mean is the least in the forced class. The signals $V_i$ will have less errors and fall within smaller gaps as illustrated in FIGS. 12 and 13. The probability of occurrence of the $V_i$'s for unspecified and unlearned signals which will occur in the smaller gaps, is less. Moreover, even without the zero gap and with FIG. 13 applying, greater accuracy is achieved because then the upper region will receive $V_i$'s from one class with less chance that any signal in that forced class will cause a $V_i$ which will be in the lower class because the second moment of the signal class is least about the mean. Another forced class which will cause $V_i$'s to be in the lower region also will be more accurately distinguished with respect to all the signals therein.

If the $Y_i(G)$ terms in 22 are relatively large compared to the $X_i(G)$ terms, due to forced signal classes of large variances or signal spread, and if C is large, convergence will start as signals from different classes are consecutively applied as inputs to the machine. By keeping $C=1$, or large, and so long as the subspace of the next possible memory signal vectors which satisfy any of the next presented signals in the next forced class is disjoint from the subspace of other memory signals which satisfy other classes of signals a large C is in order. The memory signal starts at $G(t)$ and then $\Delta G_1(t)$ is added to it such that $G(t)+\Delta G_1(t)$ and all $G(t)+\Delta G_1 t$'s that can be formed by the application of any signal in the class of which $\bar{f}_1(t)$ is the average signal forms a subspace of memory signals which may be disjoint with respect to any other space which satisfies any other class of input signals. So long as this is so it is advantageous to keep $C=1$ and a large $Y_i(G)$ does not prevent effective convergence. The process continues by applying a signal $f_2(t)$ to produce $G(t)+\Delta G_1(t)+\Delta G_2(t)$. The latter is closer to the intersection space which satisfies $\bar{f}_1(t)$ and $\bar{f}_2(t)$ than $G(t)+\Delta G_1(t)$. As the process continues further successive G-memory signal vectors get closer to the space of all possible intersections of the loci of all points which satisfy all classes of input signals.

When the G-memory vector arrives inside of the space where the possible G-vectors are no longer disjoint from other subspaces which satisfies other memory signals, then the parameter C is reduced, but not to zero. This can be determined approximately by the reduction of the average errors produced. As C is reduced the Formula 22 becomes effective. With large C values the gross and rapid iterative process with relatively few iterations prevented the statistics from showing its effects. A large $Y_i(G)$ will slow down learning. With small C this effect is accompanied by a relatively small $X_i(G)$ because of the large variance in $P(s)$, so that learning speed is further reduced. The situation is aided by starting with large $C=1$, then the $X_i(G)$ term will be large because of the large distances into the disjoint subspaces. By presenting the machine with input signals for which errors are the largest the $X_i(G)$ terms will also be large, even with high variance. The iterative process will continue, as is pointed out above, until the subspace of all possible intersections of the solution loci is reached by the memory satisfying all forced classes of signals. Then, with C greatly reduced but not zero, Formula 22 will operate to carry the memory further near the intersection of all the subspaces each of which has respective loci which satisfy the respective average signal $\bar{f}_i(t)$ in the corresponding forced class of input signals, satisfying substantially all average signals in every forced class. Inside the subspace which satisfies all forced classes the memory will move slowly under the influence of all the velocity vectors which equals the velocity given by (22). If (22) is positive the net velocity will lead the memory $G(t)$ to a position near the intersection of the subspaces which satisfy all average signal vectors in the forced classes. That position has zero velocity satisfying, $$\sum_{i=1}^{n} \left( X_i(G)\bar{f}_i(t) - Y_i(G)\frac{\overline{G}(t) - \bar{f}_i(t)}{|\overline{G}(t) - \bar{f}_i(t)|} \right) = 0 \quad (23)$$

The position defined by (23) is stable because any noise which may cause the memory to move out will set up velocities to move the memory back into it. The restoring velocities are also substantially linear with respect to displacement of the memory away from the subspace which satisfied (23). If the right side term of (23) involving $Y_i(G)$ is equal to zero, then the subspace of zero velocity into which the memory signal vector will move will be the intersection of all the subspaces which satisfy all the $\bar{f}_i(t)$'s.

It is to be noted that noise added to the signal vectors will increase the variance, thus increasing the $Y_i(G)$ term and decreasing the $X_i(G)$ term, which will slow down the learning, and cause (23) to deviate more from the intersection of the subspaces which satisfy all mean signals $\bar{F}_i(t)$, thus increasing the errors.

The actual number of degrees of freedom $n_1$ used out of the maximum $n$ of the signal vector $G(t)$, where $n_1 < n$, divide the signal classes into $n_1$ forced classes each of which gives substantially minimum second moments of the errors produced by $G(t)$ for the $n_1$ degrees of freedom. If the errors produced are too large further learning will require more degrees of freedom which will divide the classes into a larger number of smaller forced classes each of which gives minimum second moments of the errors. The memory signal vector in the learning operation moves in the direction to minimize all of the squared errors. The total squared errors or absolute value of the errors are least when $G(t)$ has moved as close as possible to the intersection of all the subspaces which satisfies all of the $\bar{f}_i(t)$.

FIG. 101 is vector diagram of the process of convergence when forced classes of signals are involved in two dimensions. The signal class with any signal $f_1(t)$ marked 10101 has average signal $\bar{f}_1(t)$ marked also 10102. The class of signals $f_2(t)$ marked 10103 has average signal marked 10104, $\bar{f}_2(t)$. The class $f_2(t)$ produces a class of signals 10105 each signal of which has a sign opposite to the sign of a corresponding signal in the class $f_2(t)$ marked 10103. The line marked 10106 is the subspace of G-memories which satisfies $\bar{f}_1(t)$. The line 10107 is the subspace which satisfies $\bar{f}_2(t)$ and in turn it satisfies $\bar{f}_2(t)$ when it is considered that the requirement on $\bar{f}_2(t)$ and $f_2(t)$ is to produce an output signal of opposite sign to the output signals produced by any $f_1(t)$. The point marked 10112 is the subspace of intersection of subspaces 10106 and 10107 which is the intersection which satisfies both $\bar{f}_1(t)$ and $\bar{f}_2(t)$. The space enclosed by the area bounded by lines which intersect at points 10108, 10109, 10110, and 10111 is the subspace of all intersections 10115 which satisfy both signal classes 10101 and 10105. The space enclosed by lines which intersect at points 10102, 10109, and 10108 is disjoint from the other spaces, and so is the space enclosed by lines which intersect at points 10109, 10110, and 10113. If the memory signal vector starts at $G(t)=0$ and a signal in 10101 is applied such as $\bar{f}_1(t)$ itself the vector $\Delta G_1(t)$ is produced and added to $G(t)=0$. The memory will then be at point 10102. If a signal in class 10105 is next applied a correction vector $\Delta G_2(t)$ is produced and added to the memory to give $\Delta G_1(t)+G_2(t)$. Then a signal from class 10101 is next applied to produce $\Delta G_3(t)$ which when added to the previous state of the memory produces $\Delta G_1(t)+\Delta G_2(t)+\Delta G_3(t)$. Two G-memory vectors are also shown in dotted lines. In the same manner $\Delta G_4(t)$ is produced and ade giving 10114. Since $|\Delta G_4(t)|$ and $|\Delta G_3(t)|$ are significantly lower than the previous corrections, C is next reduced from its previous value which was $C=1$, although in practice this could be done after averaging over more absolute errors. With C reduced the next added correction carries the memory into the region 10115. As the process continues the memory will move inside of subspace 10115 which is the subspace of all intersections, and C is further reduced from time to time as the average squared or absolute value of errors become smaller. In accordance with the discussions given above the memory signal vector will move to point marked 10116 the final value of $G(t)$ very near to the intersection point 10112 which satisfies the average signal vectors $\bar{f}_1(t)$ and $\bar{f}_2(t)$. In FIG. 101 the lines corresponding to lines marked 1011 and 1012 in FIG. 10 are not shown although it is understood that the gap and range concepts are also to be incorporated when needed in the adaptations which utilize the process according to FIG. 101. Coming within the scope of this invention is the use of the parameter C with a fixed value such as $C=1$ at all times, or the use of the parameter C at some small fixed value at all times which will certainly cause convergence even if the time taken is longer; or the use in a preferred adaptation of a variable C which can be either manually adjusted in accordance with the observed average squared errors or automatically adjusted to lower values as the average squared errors are reduced but C always should be larger than zero. The latter preferred adaptations will produce the shortest time needed for learning. If C is not allowed to become smaller than a predetermined coarse amount, the statistical process of summation of the $C \cdot \Delta G_1(t)$ will cause short term deviations of the movement of the memory signal $G(t)$ from that shown by the Formula 22 which assumes that C is small, but never actually zero.

The error values which consist of $B_i - V_i = e_i$ are equal to $1 - |G(t)| \cos \phi_i$. When $G(t) = \overline{G}(t)$, perfect response is obtained to the normalized average input signal $\bar{f}_1(t)$, but not to the other signals in the same class. $|G(t)| \cos \phi_1$ is the projection of $G(t)$ on $f_1(t)$, and $|G(t)| \cos \overline{\phi}_1$ is the projection on $\overline{F}_1(t)$ with angle $\overline{\phi}_1$, and $$|G(t)| \cos \phi_1 = 1$$

When $\overline{G}(t)$ is used the projections subtracted from unity equal errors $|\overline{G}(t) - \bar{f}_1(t)| \sin \theta_1$ for any signal with angle $\theta_1$ to the average signal. The squared errors over a period of time in which the statistical properties of the signals have had time to give significant results is given by $$|\overline{G}(t) - \bar{f}_1(t)|^2 \iiint_S P_i(s) \sin^2 \theta_i ds \qquad (24)$$

This expression gives the least squared errors in the class of signals $i$ and calls for the memory signal $\overline{G}(t)$ to give perfect output for average signal $\bar{f}_1(t)$. If the memory signal moves away from $\overline{G}(t)$ into the neighborhood of $\overline{G}(t)$ the sum of the squared errors will increase. In particular, if $G(t)$ moves such that $$G(t) = \overline{G}(t) - h \cdot \bar{f}_1(t)$$

the squared errors increase. This would also show that the velocity vector expression (16) is causing change of the memory to reduce the squared errors. The order of integration in the integral (24) makes no difference. There are small ranges of one coordinate $s_1$ of $s$ around the zero of $s$ in which $\theta_1 = \theta_1(s)$ undergoes small angular change and for which approximately $\sin \theta_1 = \theta_1$. Another coordinate $s_2$ of $s$ can also be taken along with $\sin \theta_1$ can be specified in the same way and similarly for $s_3$, $s_4$, and so on, until all of the dimensions of $s$ have been been used. Iterative integration with respect to these, in turn, can produce the integral of (24), and where $\sin \theta_1 = \theta_1$ is sufficiently close for even the largest angular separation in any forced class which is likely to occur in practice. Of course, it is not necessary to make the approximation, since $\theta_1 = \theta_1(s)$ can be specified directly if necessary.

To show that (24) is the minimum sum of squared errors in the above stated sense, first project $$G(t) = \overline{G}(t) - h \cdot \bar{f}_1(t)$$

onto $\bar{f}_1(t)$. This gives a projection length $q\bar{f}_1(t) \neq \bar{f}_1(t)$, where $q = 1 - h$. Then $$|G(t)| \sin \overline{\phi}_1 = |G(t) - q\bar{f}_1(t)| = |G(t) - h \cdot \bar{f}_1(t) - q\bar{f}_1(t)| = |\overline{G}(t) - \bar{f}_1(t)|$$

The errors are normalized with respect to the input signal which is also normalized. Substituting $|\overline{G}(t) - q\bar{f}_1(t)|$ for $|\overline{G}(t) - \bar{f}_1(t)|$, adding $h$ units, squaring, multiplying by $P_i(s)$, and integrating gives $$\iiint_S (|G(t) - q\bar{f}_1(t)| \sin \theta_i + h)^2 P_i(s) ds \qquad (25)$$

$$= |G(t) - q\bar{f}_1(t)|^2 \iiint_S P_i(s) \cdot \sin^2 \theta_i ds +$$

$$2h |G(t) - q\bar{f}_1(t)| \iiint_S P_i(s) \cdot \sin \theta_i ds + h^2 \iiint_S P_i(s) ds \qquad (26)$$

The first term of (26) equals (24). The second term of (26) is very nearly equal to zero for small angles because for $\sin \theta = \theta$ it defines the mean at zero value. For larger angles the second term would be equal to zero with $P_i(s)$ fully symmetrical. The last term equals $h^2$ since the integral equals unity. This leaves $h^2$ as the amount by which (26) exceeds (24). Therefore, (26) is greater than (24) regardless of the sign of $h$. In the above analysis it is recognized that in general the errors become large as $|G(t)|$ increases so that the effects of size of the memory signal influences the errors. Errors (26) are larger than (24) even when $|G(t)|$ in (26) is smaller than $\overline{G}(t)$ in (24.).

If noise is added to the signal vectors there will be a spread of the signals and an increase of variance of the errors. This will increase the errors as can be noted in Formula 24 in which the integral term is closely related to variance and is equal to it for small $\theta_i$'s wherein $\sin \theta_i = \theta_i$. The errors by Formula 24 are not the errors which would be produced by the digitalized response of the machine when such response is under control of gaps or range control means. If the gap in which the errors deviate contain substantially all of the error deviations then no actual error of digitalized response would be given. If the gap does not contain all of the deviations of the errors, then the errors of digitalized response will be proportional to $$\iiint_{s^*} P_i(s^*) ds^*$$

in which $s^*$ represents the ranges of $s$ which determine all $\theta_i = \theta_i(s^*)$ for which $$|\overline{G}(t) - \overline{J}_i(t)| \sin \theta_i| > A$$

wherein A is the maximum allowable value of $|B_{ij} - V_{ij}|$, and $\overline{F}_i(t)$ produces $\overline{V}_{ij} = B_{ij}$ and all other $F_i(t)$'s in the same forced class of signals produce corresponding $V_{ij}$'s. The above formulas, which involve the probability density function $P_i(s)$, are equally applicable when input signal sequences are received by the machine. Any sequence of input signals can be represented by an applied input signal which is the input signal proper considered in the above formulas with $P_i(s)$.

NONLINEAR LEARNING SYSTEMS

Figure 8:
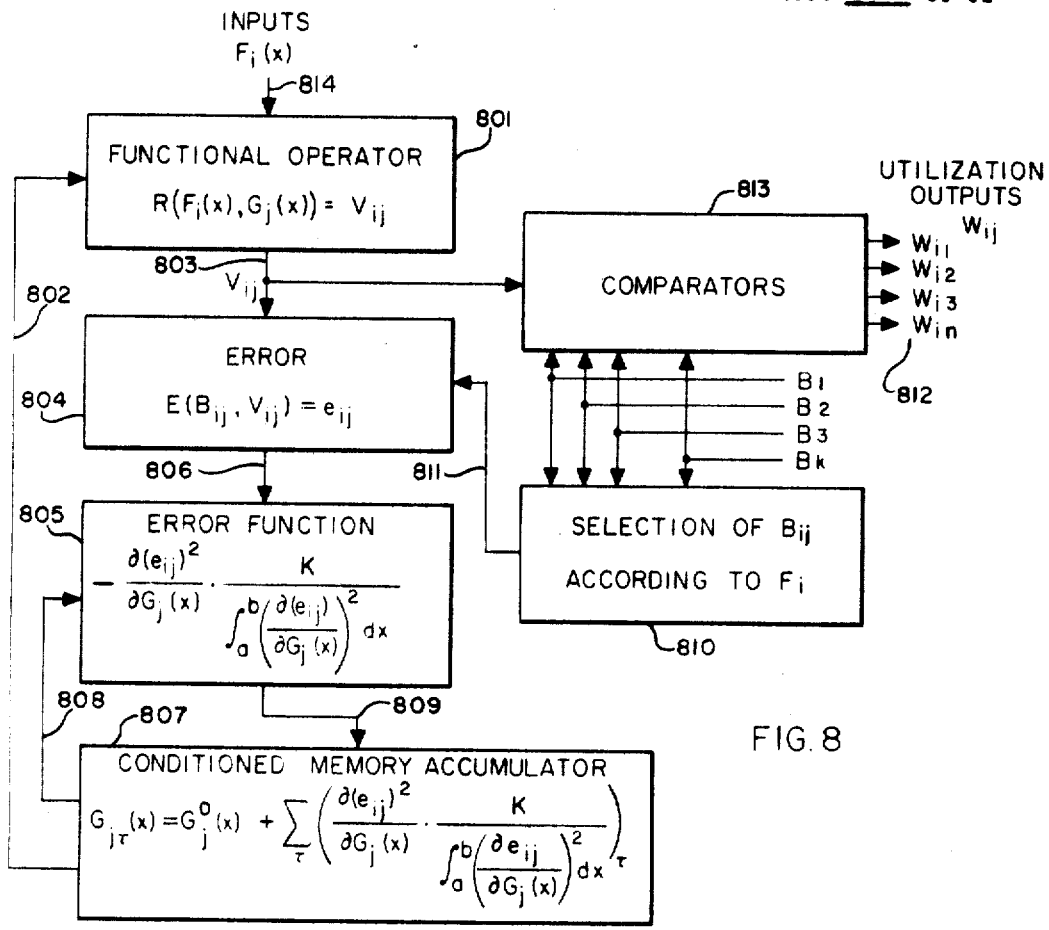
FIG. 8 is a general block daigram of a nonlinear learning machine.

In FIG. 8 block 801 shows a nonlinear operator $R(F_i(x), G_j(x)) = V_{ij}$ which takes any input signals $F_i(x)$ and combines it with the memory signals $G_j(x)$ on bus 802 to produce a corresponding set of scalars $V_{ij}$. An example of such a nonlinear operator is $$\int_a^b F_i^{1/3}(x) \cdot G^{1/3}(x) dx$$

Another example is, $$\int_a^b [(A_1 F_i(x) + A_2 F_i^2(x) + \ldots + A_l F_i^n(x))(B_1 G_j(x) + B_2 G_j^2(x) + \ldots + B_n G_j^n(x))]^p dx = V_{ij}$$

The scaler voltages $V_{ij}$ on bus 803 are applied to error operator 804 which can be a linear subtractor or a nonlinear subtractor, such as $(B_{ij} - V_{ij})^{\frac{1}{2}}$ for example. The subtractor operator should give zero when $B_{ij} = V_{ij}$, and $e_{ij}$ should go through zero monotonically; otherwise, the exact form of these operators need not be known or specified. The learning feedback will compensate for them. The error signals are directed to the error function generator 805 via bus 806 which utilizes memory signals $G_j$ from conditioned memory accumulator 807 placed on bus 808. The error function is obtained by taking a unidirectional function of the error $e_{ij}$ such as $e_{ij}^2$. Then the partial derivatives are taken of $e_{ij}^2$ with respect to $G_j(x)$. For each partial derivative of $e_{ij}^2$ there is a value of $x$ held at a fixed value and the form of $G_j(x)$ is varied at that fixed value of $x$. This is done for every value of $x$ within the resolution capabilities of the machine. In the same manner the partial derivatives of $e_{ij}$ are taken with respect to $G_j(x)$. These are squared and integrated throughout entire range $a \leq x \leq b$. The integral is the divisor of the partial derivatives of the squared errors. The result is multiplied by a gain adjustment constant K and yields the error function $$\frac{\partial e_{ij}^2}{\partial G_j(x)} \cdot \frac{K}{\int_a^b \left(\frac{\partial e_{ij}}{\partial G_j(x)}\right)^2 dx} \quad (27)$$

The error function (27) is applied to bus 809 and to the conditioned memory accumulator 807. Whatever $G_j(x)$ function exists in the accumulator memory 809 the error function is added to it. If the state of the memory was initially $G_j(x)$ which could be zero, then after $\tau$ presentations of various input signals the state of the memory will be $$G_{j\tau}(x) = G_j^0(x) + \sum_\tau \frac{\partial e_{ij}^2}{\partial G_j(x)} \cdot \frac{K}{\int_a^b \left(\frac{\partial e_{ij}}{\partial G_j(x)}\right)^2 dx} \quad (28)$$

The teaching unit 810 provides the desired output signals $B_{ij}$ at the time when a signal $F_i(x)$ is presented. The selection can be done by any person teaching the machine. The act of teaching places any one of the voltages $B_1, B_2, B_3, \ldots, B_k$ on bus 811 when an $F_i(t)$ is presented. The index $j$ identifies any one of a set of G-functions or memory signals. The $B_{ij}$ have values which are picked from the limited number of the $B_1, B_2, B_3, \ldots, B_k$ which in practice are fewer than the total number of $B_{ij}$'s. The comparators 813 are the same as the ones shown in the previous figures, and give digitalized outputs on respective utlization buses generally designated as 812, there being one $W_{ij}$ per memory signal. The index $i$ is the same as used in $B_{ij}$. Gap control means, trigger circuits, and register can be contained in 813.

In this nonlinear system, the memory signals will eventually acquire values which will satisfy all the desired conditions set up during teaching which causes learning or the establishment of the correct memory signals. This can be shown as follows:

Let $de_{ij}^2$ equal the total differential of $e_{ij}^2$. Then $$de_{ij}^2 = \sum_r \frac{\partial e_{ij}^2}{\partial G_j(x_r)} \cdot dG_{ij}(x_r) \quad (29)$$

wherein there are a set of discrete values $x_r$. By letting $$dG_{ij}(x_i) = -\frac{\partial e_{ij}}{\partial G_j(x_r)} = -2e_{ij} \frac{\partial e_{ij}}{\partial G_j(x_r)}$$

then $e_{ij}^2$ will go down the gradient, and using the integral sign instead of the summation sign, it follows that $$de_{ij}^2 = -4e_{ij}^2 \int_a^b \left(\frac{\partial e_{ij}}{\partial G_j(x)}\right)^2 dx = 2e_{ij} de_{ij} \quad (30)$$

Note that $x$ is a parameter which identifies the various partial derivatives and allows G to vary at all fixed $x$ values. Since $$\frac{de_{ij}}{\int_a^b \left(\frac{\partial e_{ij}}{\partial G_j(x)}\right)^2 dx} = -2e_{ij}$$

by substitution this yields $$dG_{ij}(x) = \frac{1}{\int_a^b \left(\frac{\partial e_{ij}}{\partial G_j(x)}\right)^2 dx} \cdot \frac{\partial e_{ij}}{\partial G_j(x)} \cdot de_{ij} \quad (31)$$

Integrating (31) from initial error $e_{ij}$ to final error $e^*$, while holding the partial derivatives fixed, will give $$\Delta G_{ij}(x) = \frac{1}{\int_a^b \left(\frac{\partial e_{ij}}{\partial G_j(x)}\right)^2 dx} \cdot \frac{\partial e_{ij}}{\partial G_j(x)} \int_{e_{ij}}^{e^*} de_{ij} \quad (32)$$

$$\Delta G_{ij}(x) = \frac{1}{\int_a^b \left(\frac{\partial e_{ij}}{\partial G_j(x)}\right)^2 dx} \cdot \frac{\partial e_{ij}}{\partial G_j(x)} (e^* - e_{ij}) \quad (33)$$

If $e^* = 0$ then $(0 - e_{ij})$ is the whole error. It is preferable to take a small increment of the error since the whole error is unknown and the partial derivatives are known at $e_{ij}$ only for one pass, and a straight line segment of descent for a short distance is taken. Let $(e^* - e_{ij}) = -ke_{ij}'$ then since, $$\frac{\partial e_{ij}^2}{\partial G_j(x)} = 2e_{ij} \frac{\partial e_{ij}}{\partial G_j(x)}$$

it follows that $$\Delta G_{ij}(x) = -\frac{\partial e^2_{ij}}{\partial G_j(x)} \cdot \frac{K}{\int_a^b \left(\frac{\partial e_{ij}}{\partial G_j(x)}\right)^2 dx} \quad (34)$$

which is the error function to be added to the memory signal given in FIG. 8. By substituting $-ke_{ij}$ in (33) it becomes the formula for the error signal given in FIG. 9 with $x=t$ and $e_{ij}=e_{ij}(b)$.

The above analysis is based on one pass, or one input function is presented, and $B_{ij}$ is taught. If the same input function is repeatedly presented the errors will converge to zero. This can be shown from equation (30) which actually represents the change of error of one pass, so that by dividing $d(e_{ij})^2$ by $d\tau$ the right side of the equation stands unchanged, since it is the total differential of $e_{ij}^2$ per pass $d\tau$ this yields, $$\frac{de_{ij}^2}{d\tau} = -4e_{ij}^2 \int_a^b \left(\frac{\partial e_{ij}}{\partial G_j(x)}\right)^2 dx \quad (35)$$

$$\frac{de_{ij}^2}{e_{ij}^2} = -4 \int_a^b \left(\frac{\partial e_{ij}}{\partial G_j(x)}\right)^2 dx\, d\tau \quad (36)$$

$$\text{Log } e_{ij}^2 = \left(-4 \int_a^b \left(\frac{\partial e_{ij}}{\partial G_j(x)}\right)^2 dx\right)\tau + V \quad (37)$$

$$e_{ij}^2 = A \exp -4\tau \int_a^b \left(\frac{\partial e_{ij}}{\partial G_j(x)}\right)^2 dx < Ae^{-c_1\tau} \quad (38)$$

In which $C_1$, a positive constant, can be found always such that $$\int_a^b \left(\frac{\partial e_{ij}}{\partial G_j(x)}\right)^2 dx > C_1$$

where $C_1 > 0$, since $e_{ij}$ crosses zero, and where $e^V = A$, and V is the constant of integration. At $\tau=0$, $(e_{ij})^2 = A$. Equation (38) shows that as $\tau$, the iterative variable of learning, increases the squared errors $(e_{ij})^2$ decrease and approach zero and can be made as close to zero as is desired by increasing $\tau$. In the above it is assumed that the iterative cycles of learning and presentation of the same input function are frequent and the corrections per presentation are small, and while the correction steps are discrete and give finite differences, over a long period of time or with frequent presentations, the smooth curves of the equation are approximated when there are many $\tau$ values.

Next will be considered the case where different input signals are presented successively in various orders until a whole group of input signals are repeatedly presented into the nonlinear system of FIG. 8. Let the sum of the squared errors for the different input functions with identifying index $i$ for the input signal and $j$ for the memory signal, equal $$U_j = \sum_i e_{ij}^2$$

Then the total differential per $d\tau$ of iteration, where now $\tau$ represents a cycle of iterations through all the input signals, is given by $$\frac{dU_j}{d\tau} = \int_a^b \left(\sum_i \frac{\partial e_{ij}^2}{\partial G_j(x)}\right) dG_j(x) dx \quad (39)$$

As before, the $U_j$ will go down the gradient by making $$dG_j(x) = -\sum_i \frac{\partial e_{ij}^2}{\partial G_j(x)}$$

then $$\frac{dU_j}{d\tau} = -\int_a^b \left(\sum_i \frac{\partial e_{ij}^2}{\partial G_j(x)}\right)^2 dx \quad (40)$$

The term $$\int_a^b \left(\sum_i \frac{\partial e_{ij}^2}{\partial G_j(x)}\right)^2 dx$$

is a nonsingular quadratic form always positive and having square terms $e_{ij}^2$ and their coefficients $$4 \int_a^b \left(\frac{\partial e_{ij}}{\partial G_j(x)}\right)^2 dx$$

are always positive and never equal to zero, and the nonlinear operators should be such that the $e_{ij}$ go through and cross zero and with distinctive values of the derivatives at zero. The quadratic form is positive definite and its charactertistic roots are all positive, and a positive constant $C_1 > 0$ can be found less than the least root $\lambda$ such that $$\frac{dU_j}{d\tau} = -\int_a^b \left(\sum_i \frac{\partial e_{ij}^2}{\partial G_j(x)}\right)^2 dx < -C_1 U_j \quad (41)$$

Then, $$\frac{dU_j}{U_j} < -C_1 d\tau \quad (42)$$

and $\log_e U_j < -C_1 \tau$, and with $e^V = A$ $$U_j < A l^{-C_1\tau}$$

Expression (42) indicates that the sum of the squared errors produced by all the input signals with one fixed index $j$, as the iterative cycles of teaching and learning increase, is decreased to as low a value as may be required. An increase of $\tau$, the teaching and learning duration variable, will cause a lowering of $U_j$ asymptotically. While the actual operation gives finite differences, the above analysis assumes all the steps of $\tau$ are numerous enough to give a smooth approximation. In the above, the independent variable can be equal to time $t$ which governs the machine's own internal processing, and is not the same as $\tau$ which represents presentation numbers of input signals.

The system of FIG. 8 may be physically realized by a parallel input of all the elements of $F_i(x)$ into the functional operator. In the case of image pickup this would consist of separate photoelectric units each responsive to a different portion of the image. The leads for the units would be fed in parallel into the functional operator, which may consist of a series of solid state devices each mixing the $G_j(x)$ function on separate buses for the different $x$'s with the corresponding leads from the pick-up units. The solid state mixers would be followed by capacitors to store the mixed signals. Then the output of all of these could be combined by summing resistors to produce $V_{ij}$. Then a single subtractor of conventional type could be used for 804, although it could have great nonlinearity such as $(B_{ij} - V_{ij})^{\frac{1}{4}}$ which latter function can be produced by diodes as is shown elsewhere herein. The parallel input signal can remain applied while $G(x)$ is changed by $\delta G_j(x)$ for every value of $x$. For each such value a divider in 805 divides the corresponding change $\delta(e_{ij})^2$ produced in 805 which is the change of $(e_{ij} + \delta e_{ij})^2 - e_{ij}^2$ by $\delta G_j(x)$ giving $$-\frac{\partial (e_{ij})^2}{\partial G_j(x)}$$

Likewise, $$\frac{\partial e_{ij}}{\partial G_j(x)}$$

is produced, squared to give $$\left(\frac{\partial e_{ij}}{\partial G_j(x)}\right)^2$$

and then integrated between the limits $a$ and $b$. The error function so produced by successively applying $\delta G_j(x)$ for every value of $x$ needs a full cycle of passing through the memory in order to yield the integral term. All the values of $$-\frac{\partial e_{ij}{}^2}{\partial G_{ij}(x)}$$

can be stored in 805 as produced. At the end of the cycle each such value can be divided with a single divider by the integral term and multiplied by $k$ while the result can be added into the accumulator 807 wherein each value of $G_j(x)$ with $x$ moving to all of its successive values can have added to it the error function at each corresponding value of $x$. This is a combined parallel and serial operation. The parallel part of the operation yields $e_{ij}$ completely and quickly so that great generality in the forms of the operators in 801 and 804 can be permitted. Certain detailed means of carrying out the indicated operations are similar to those shown hereinbelow in connection with the implementation of the other systems. The system of FIG. 8 also may be fully serialized even in the input side. By scanning of images or by the pick-up of speech signals, input signals as functions of time may be produced and these can be stored temporarily and retrieved serially at high speed, applied to 801 and 804 for the full production of $e_{ij}$ at time $t=b$. This must be repeated for each value of $x$ of $G_j(x)$, and $G_j(x)$ also must be produced as a function of time at the same high speed. A more economical method of serializing the system of FIG. 8, with some limitations, is shown in FIG. 9.

Figure 9:
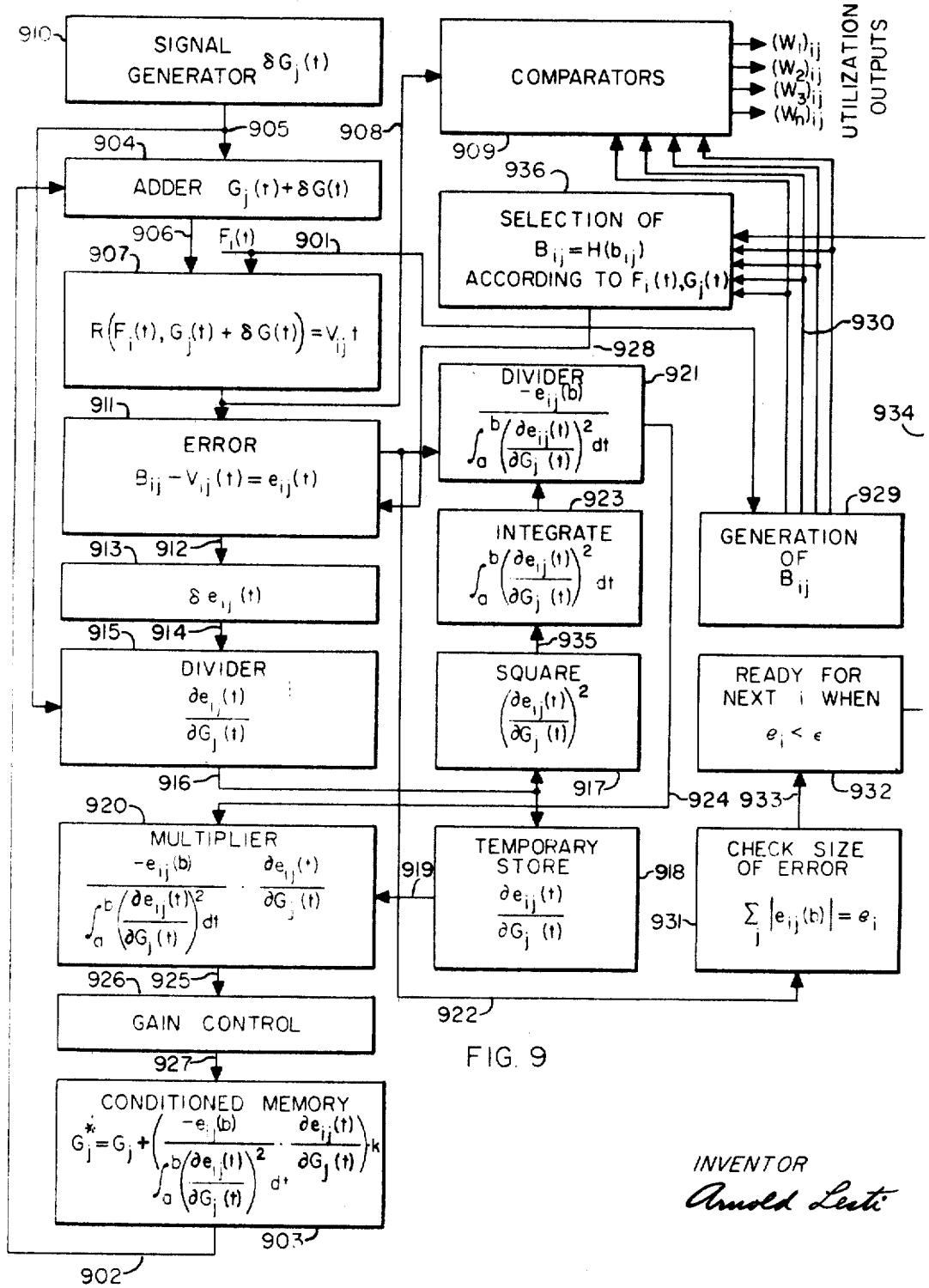
FIG. 9 is a general block diagram showing a detailed version of a nonlinear learning machine.

In FIG. 9 is shown a nonlinear system which implements the one shown in FIG. 8 with particular use of time as the independent variable. The input signal at bus 901 marked $F_i(t)$ may be the end result of preliminary processing and transformation of the actual input signals into the machine. Such processing is not shown in FIG. 9 and is not shown in FIG. 8, but is disclosed elsewhere herein. In FIG. 9 the conditioned memory signal $G_j(t)$ is placed on bus 902 from unit 903 which stores the $G_j(t)$'s. The $G_j(t)$ signal is fed to adder 904, which adder also receives small sinusoidal or square wave incremental signals $\delta G_j(t)$, from bus 905 placed there by signal generator 910. By definition this high frequency incremental signal has the effect when added to the signals $G_j(t)$ on bus 902 of varying $G_j(t)$ while holding $t$ substantially constant as a first step to taking $\partial e_{ij}(t)/\partial G_j(t)$. The sum is delivered on bus 906 and applied to nonlinear operator 907 which performs in a manner similar to the unit marked 801 in FIG. 8. In FIG. 9 unit 907 produces $V_{ij}(t)$ as a function of time, since $G_j(t)$, the incremental signal and $F_i(t)$ are functions of time. The beginning of the interval is $t=a$, and the end is $t=b$. The operator 907 produces its final output at time $t=b$, and at such time the signal $V_{ij}(b)$, a scalar, is used by the comparator 909, delivered thereto from bus 908.

In operator 907, cross-products of signal values of either $F_i(t)$ or $G_j(t)$ or both that take place at different times should not occur, which limits the type of nonlinear operators which can be used in 907 of FIG. 9. This is not a limitation of the corresponding operator 804 of FIG. 8, because in FIG. 8 the error $e_{ij}$ is fully determined by all the values of $x$ before the partial derivatives are taken. Operator 907 can use the examples given above when the production of $V_{ij}$ for FIG. 8 was first introduced. Separate nonlinear operations on $F_i(t)$ and $G_j(t)$ and then further mixing them in a nonlinear manner is possible for FIG. 9. But the nonlinear part of the operation must be finished before the next instant of time in which significant information is produced without nonlinear memory. The result can be added in a linear integrator. That is, unit 907 can contain a nonlinear mixer or nonlinear multiplier followed by a linear integrator.

In FIG. 9, the output of operator 907 is applied to the linear subtractor 911 which produces $B_{ij}-V_{ij}(t)=e_{ij}(t)$. In turn, 911 delivers $e_{ij}(t)$ to bus 912 to unit 913 which passes the increment $\delta e_{ij}(t)$ from $e_{ij}(t)$ which was produced by the incremental signal $\delta G_j(t)$ into 904. Unit 911 also receives $B_{ij}$ from bus 928 and from the teaching unit 936. If the incremental signal from the signal generator 910 is of high frequency, the unit 913 may consist of a high-pass filter which will pass the high frequency $\delta e_{ij}(t)$ signals and reject all the lower frequency components. In that case the filter should give low phase shift or at least controlled phase shift at the high frequency. Unit 913 may also consist of a delay unit which delays the signal from 912 by an interval of time equal to ½ the period of the pulses of signal generator 910 as applied to bus 905. Unit 913 then takes the difference between the signal at 912 and the delayed signal to produce $\delta e_{ij}(t)$. The latter signal is applied to the divider 915 via bus 914 as the dividend with divisor consisting of $\delta G_j(t)$ on bus 905.

The quotient signals are the partial derivatives $$\frac{\partial e_{ij}(t)}{\partial G_j(t)}$$

supplied on bus 916 to squaring unit 917 and temporary storage unit 918. The latter supplies bus 919 with the derivatives signals which, in turn, supplies the signals to multiplier unit 920. At time $t-b$ the value of the error is $e_{ij}(b)$ which is supplied to divider 921 through bus 922. The output of 917 at 935 is supplied to the integrator 923 which produces $$\int_a^b \left(\frac{\partial e_{ij}(t)}{\partial G_j(t)}\right)^2 dt$$

which is applied to unit 921 as divisor which produces $$\frac{-e_{ij}(b)}{\int_a^b \left(\frac{\partial e_{ij}(t)}{\partial G_j(t)}\right)^2 dt}$$

The latter signal is placed on bus 924 and delivered to the multiplier 920. The signals on buses 919 and 924 are multiplied and delivered to bus 925, gain control unit 926 which multiples by $k$, and bus 927 yielding thereon $$K \cdot \frac{-e_{ij}(b)}{\int_a^b \left(\frac{\partial e_{ij}(t)}{\partial G_j(t)}\right)^2 dt} \cdot \frac{\partial e_{ij}(t)}{\partial G_j(t)} \quad (43)$$

as the error signals which are added to the memory signals $G_j(t)$ to produce new memory signals $G_j^*(t)$ to replace $G_j(t)$. Unit 903 serves to add the errors (43) and to store the memory signals.

In FIG. 9 unit 929 the generation of $B_{ij}$ takes place. This could be equal to $$\sqrt{\int_a^b F_i{}^2(t)dt}$$

or $$\int_a^b |F_i(t)|dt$$

but a constant voltage such as unity voltage reference is preferred for highly nonlinear operators in 907. Unit 929 generates a multiplicity of reference voltages $b_{ij}$ on buses generally represented by 930 which delivers the $b_{ij}$ to teaching unit 914 wherein the selection of the voltages takes place during teaching according to $F_i(t)$ and $G_j(t)$; that is, for each signal received and for each memory signal $G_j(t)$ a voltage on one of the buses 930 is chosen and connected to bus 928. The presentation on 928 coincides with the time that $G_j(t)$ memory signal is activated in unit 903. At that same time a corresponding derivative signal is taken out of temporary storage 918 and applied to units 920, 926, and 903 through the appropriate buses, and a correction of the memory signal function is made in accordance with the error signal $e_{ij}(t)$. In this nonlinear system it is possible to set the gain control constant $k$ by unit 926, and expect that a reduction of error will take place so that if $F_i(t)$ is presented again $e_{ij}(t)$ will be reduced. It is also possible to maintain $F_i(t)$ in temporary storage by means not shown in FIG. 9, but shown and detailed elsewhere herein, and then to check the size of $$\sum_j e_{ij}(b) = e_i$$

for all the memory signals and one input signal held in storage. Unit 931 adds up all the $e_{ij}(b)$ errors with $i$ fixed. If the absolute value of the errors is less than $\epsilon$ then $F_i(t)$ is cleared from the temporary storage and the machine is restored and made ready to receive the next input signal. Unit 932 checks by subtraction to determine that the signal at 933, which is the summed error from 931, is less than units 931 and 932 are refinements which may be dispensed with, since the system will work without them. These units permit full error reduction per presentation of input signal. Units 931 and 932 have connections and components similar to components 10001, 10002, and 10003 of FIG. 100. However, bus 10006 of FIG. 100 would be controlled when all memories have been passed once to render diode switch 10003 conductive to pass the voltage at 10004 to bus 10005. The latter voltage would actuate a trigger circuit activating bus 934 to stop 936 and restore the rest of the circuit of FIG. 9. Detailed connections for restoring circuitry are shown in connection with other figures illustrated herein.

The comparator 909 of FIG. 9 receives any $V_{1j}(t)$ signal from 907 and determines if it falls in any gap or range, which is predetermined and adjusted in 909, with range centers equal to the voltages on the respective buses 930. If the $V_{1j}$ being received falls in a predetermined range of values then a corresponding trigger circuit is operated which actuates one of the buses $W_k(ij)$ of the utilization outputs as the output response proper. For each memory signal $G_j(t)$ there is a sequence in time, in one serial adaptation, in which the state of one of the output buses is determined. In a preferred adaptation there are two controlling buses for digitalized binary operation. These buses can operate a shift register and a utilization output register. The comparator 813 in FIG. 8 is similar to 909 in FIG. 9.

The system of FIG. 9 is a special case of the system in FIG. 8, and the derived mathematical formulas from (27) to (42), inclusive, apply to the system of FIG. 9. These same formulas also apply to the linear systems shown in FIGS. 5 and 7, because the linear systems are special cases of them in which certain operators are linear. The considerations on statistics and the reduction of parameter C to obtain formulas which cause the memory signals to give optimum responses to the average signals in forced classes, also apply for the nonlinear systems of FIGS. 8 and 9. The parameter $k$, as the gain adjustment constant in Formulas 34 and 43, takes the place of the parameter C in Formulas 16 and 19, and $k$ may be adjusted in the same manner, either by a fixed setting, manual adjustment, or automatic adjustment according to the circuitry in FIGS. 99 and 100. The nonlinear systems may employ a large number of inexpensive non-linear elements and be capable of operating accurately. They may provide also great sensitivity to certain types of signals.

The method and means for implementing the various other blocks of FIG. 9 are shown substantially in the various detailed diagrams and descriptions for System I and System II. Block 907, for example, in one version, could have the compressor identical to the one shown in FIG. 17 connected to 901 and the compressor identical to that shown in FIG. 21 fed from bus 906. The two compressed signals could be applied to a multiplier identical to that shown in FIG. 18 with quad 1803 and the result can be fed directly into the integrator shown in FIG. 18 without the expander. Then the operator 907 will be nonlinear, and meet the requirement of FIG. 9 that $$\frac{\partial e_{ij}(t)}{\partial G_j(t)} = \frac{\partial e_{ij}(b)}{\partial G_j(t)}$$

Other units such as the adders, multipliers, and dividers are similar to corresponding units in Systems I and II.

FIG. 76 indicates a preferred method of normalizing the input signal $f_i(x)$ before it is presented to the nonlinear systems of FIGS. 8 and 9. The input signal on bus 7601 is applied to unit 7602 which squares the signal and integrates through the range $a \leq x \leq b$ and then takes the square-root of the integration. The signal produced in unit 7602 on bus 7603 is $$\sqrt{\int_a^b f_i^2(x)\,dx} = \sqrt{U_i}$$

Signal $f_i(x)$ and $\sqrt{U_i}$ are applied to the divider 7604 which divides $f_i(x)$ by $\sqrt{U_i}$ to produce $$\frac{f_i(x)}{\sqrt{U_i}} = F_i(x)$$

the normalized quotient signal. $F_i(x)$ is independent of any change of amplitude of $f_i(x)$ because if $f_i(x)$ is multiplied by a positive stretch constant $k$ then $F_i(x)$ is unchanged. Instead of $\sqrt{U_i}$ unit 7602 could also compute $$\int_a^b |f_i(x)|\,dx$$

which would produce an $F_i(x)$ on bus 7605. The signal $F_i(x)$ may be applied to bus 814 of FIG. 8 or bus 901 of FIG. 9 as input signal. Normalizing of input signal in this manner is preferred for the nonlinear systems. The variable $x$ may be made equal to time in FIG. 76.

SYSTEM I (FIGS. 14–25, 33, 34)

Introduction

General

This section describes an adaptation of the Learning Machine in which manual assistance is necessary in order to compute the error signal in the teaching-mode. It is designed to receive electrical signals such as those derived from sound inputs and to indicate the category in which the signal belongs. There are three categories possible, hereinafter referred to as the positive, negative and zero category arbitrarily selected by the operator.

Output indication can be given by an electrical meter in one adaptation. The needle points to a positive value for a positive category, to a negative value for a negative category and stays in the center for the zero category. In addition the output can be shown by two indicator lights, one which goes on for a positive category, the other for a negative category and neither for a zero category, for each output bit within the capacity of the machine.

A magnetic drum may be used to record the incoming signal $F_i(t)$ temporarily. The same drum may be used to store the internal memory function $G(t)$. This Learning Machine performs its various operations in units of time which will be referred to as cycles, each cycle corresponding to one revolution of the drum. The circuit connections are shown in FIG. 14 through 23 inclusive, and the relation of these figures with respect to each other is shown in FIG. 24.

Operation sequence

The sequence of operations is illustrated in FIG. 25, the timing diagram. Vertical lines represent the divisions between cycles, and the line on the extreme left represents the time of starting. The next vertical line to the right is labeled $A_1$ and marks the end of the first revolution of the drum. During this cycle the incoming function is recorded on its track. Determination of the output response category is made during the next cycle and the results is displayed at the time represented by vertical line $A_2$.

The irregular vertical line to the right of $A_2$ is used to indicate the passage of an indeterminate length of time during which the operator manipulates the various controls. The drum continues to rotate but the machine does no further operations until so directed by the operator.

Teaching cycles are designated by vertical lines labeled $B_1$, $B_2$ and $B_3$. When the operator causes teaching to take place, the teaching cycle begins at the next time the drum reaches its initial point which is indicated by the vertical line $B_1$. Between $B_1$ and $B_2$ the new $G(t)$ function is generated and recorded on a track of the drum. This not the same track as used by the previous G-function. Two tracks are used alternately to store the G-function, a change being made each time a new G-function is created.

During the cycle from $B_2$ to $B_3$ the old G-function and $F_1(t)$ are erased. At $B_3$ the drum is halted and the machine is ready to repeat the sequence of operations.

Control circuits

Primary control circuits used in System I are the transistorized flip-flops which with their interconnections, are shown in FIG. 22. These circuits are the same as those shown in FIGS. 30 and 90 and described in connection with those drawings.

The flip-flops have two states of operation designated as A and B states. Initially all flip-flops are placed in the A state and are forced into the B state at the appropriate time. The timing diagram, FIG. 25, shows the states of the flip-flops during the operating cycle. A broad horizontal line associated with the designation number of a flip-flop shows the time it is in the B state.

A fiducial pulse produced once per revolution of the drum is used to step the control circuits. These fiducial pulses correspond to the times $A_1$, $A_2$, $A_3$, $B_1$, $B_2$, and $B_3$ shown on FIG. 25. The fiducial pulse is brought from the drum to the control circuits of FIG. 22 on bus 2441 and coupled through capacitor 2214 and diode 2215 to the base of transistor 2216. The output of this emitter follower is bus 2217 which conducts the pulse to other parts of the control circuit.

Magnetic drum

Figure 19:
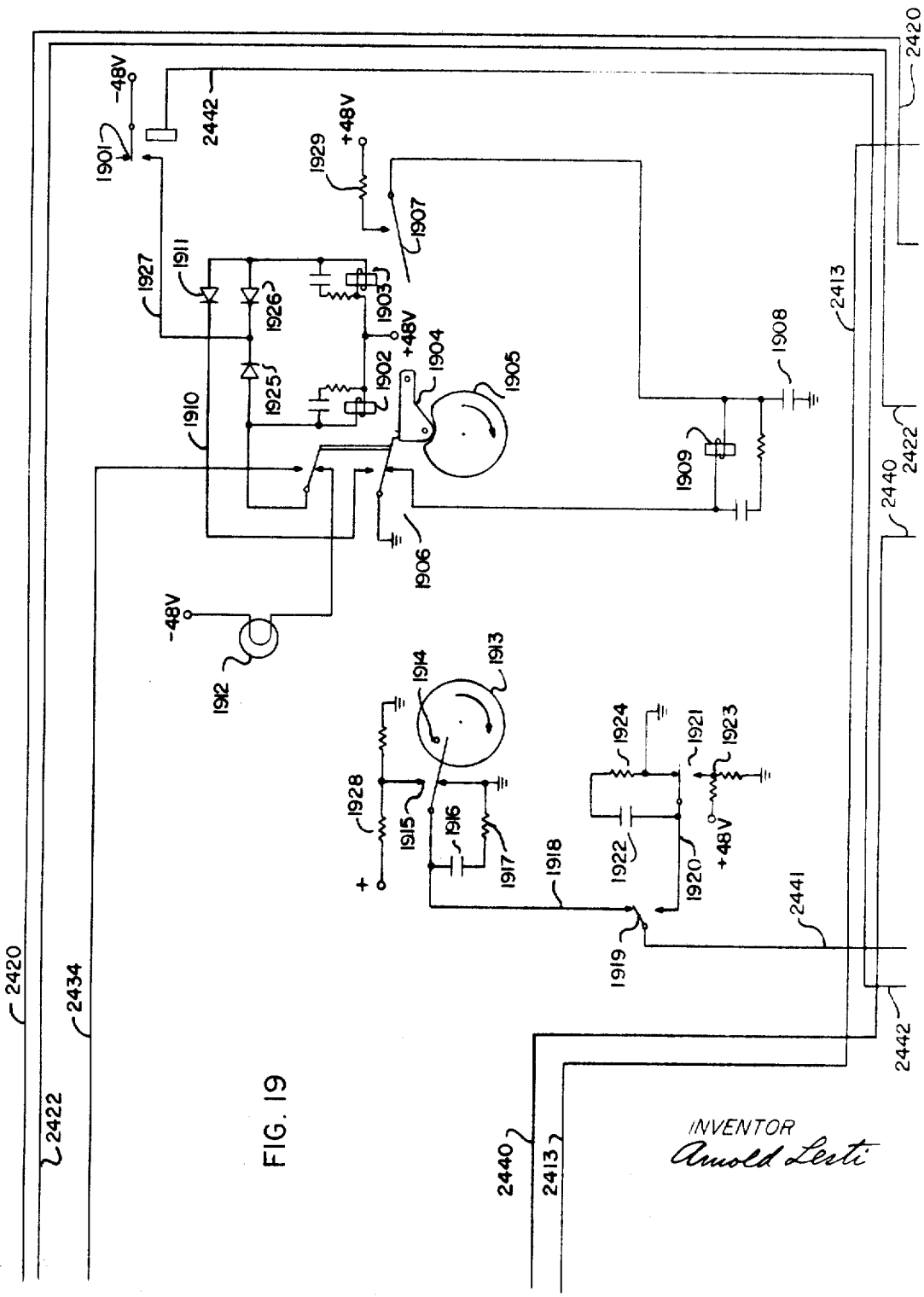

The drum is illustrated by a side view in FIG. 33 and a top view in FIG. 34. Some of the control circuits used with it are shown in FIG. 19. The drum itself is labeled 3301 and rotates on shaft 3302. Cam 1905 is rigidly attached to shaft 3302 and when cam follower 1904 falls down into a detent on the cam the shaft is prevented from rotating. To permit rotation, solenoid 1902 must be energized and lift cam follower 1904 out of the detent.

Each of the magnetic recording heads 3303 is rigidly attached to its corresponding arm 3304 and all of the arms are free to rotate about shaft 3305. Thus the heads are pressed against the surface of the drum by their own weight. Motor 3306 furnishes the power to rotate the drum and runs continuously. Pinion 3307 is rigidly attached to the shaft of the motor and turns idler 3308 which is normally held away from the drum by spring 3309. When solenoid 1903 is energized it pulls linkage 3310 down which forces idler 3308 between pinion 3307 and drum 3301, thus causing the drum to rotate. To bring the drum to a halt, current through solenoid 1903 is cut off which releases the motor from driving. Solenoid 1909 is energized which forces brake shoe 3311 against the side of cam 1905 and halts the drum. Cam follower 1904 falls into the detent of cam 1905 and holds the drum in a precise position.

Recording on drum

Signals are first modulated by a carrier and then recorded on the drum. The carrier frequency is often referred to as the clock and is obtained from a recording on the clock track. This track is never erased. When a G-function is corrected, the old G-function has the error function added thereto and the result is demodulated: The demodulater signal is again modulated by the carrier and recorded. This ensures that the phase of the G-function with respect to the clock is always the same per correction pass or recirculation of the G-function. Otherwise, the phase errors would become cumulative. Current feedback is used in the amplifier which drives the recording head to make the waveform of the current through the head very nearly equal to the waveform of the signal input to the amplifier. The carrier system makes it possible to score and retrieve the memory signals with low cumulative amplitude and phase distortions.

Operating-mode

General

This section describes the operation of the System I during the first two cycles, that is from the start until time $A_2$ as illustrated in FIG. 25.

The incoming signal actuates a circuit which starts the drum rotating. During the first cycle the incoming function is recorded. In the second cycle $F_1(t)$ and $G(t)$ are multiplied together and the product integrated over the entire duration of the functions. In addition, the F-function is squared and integrated over this same period.

At the end of the second cycle the category in which the machine places the input function is displayed to the operator. If he is not satisfied with the result he may manipulate the controls and institute the learning process which will correct the machine.

First cycle

Figure 14:
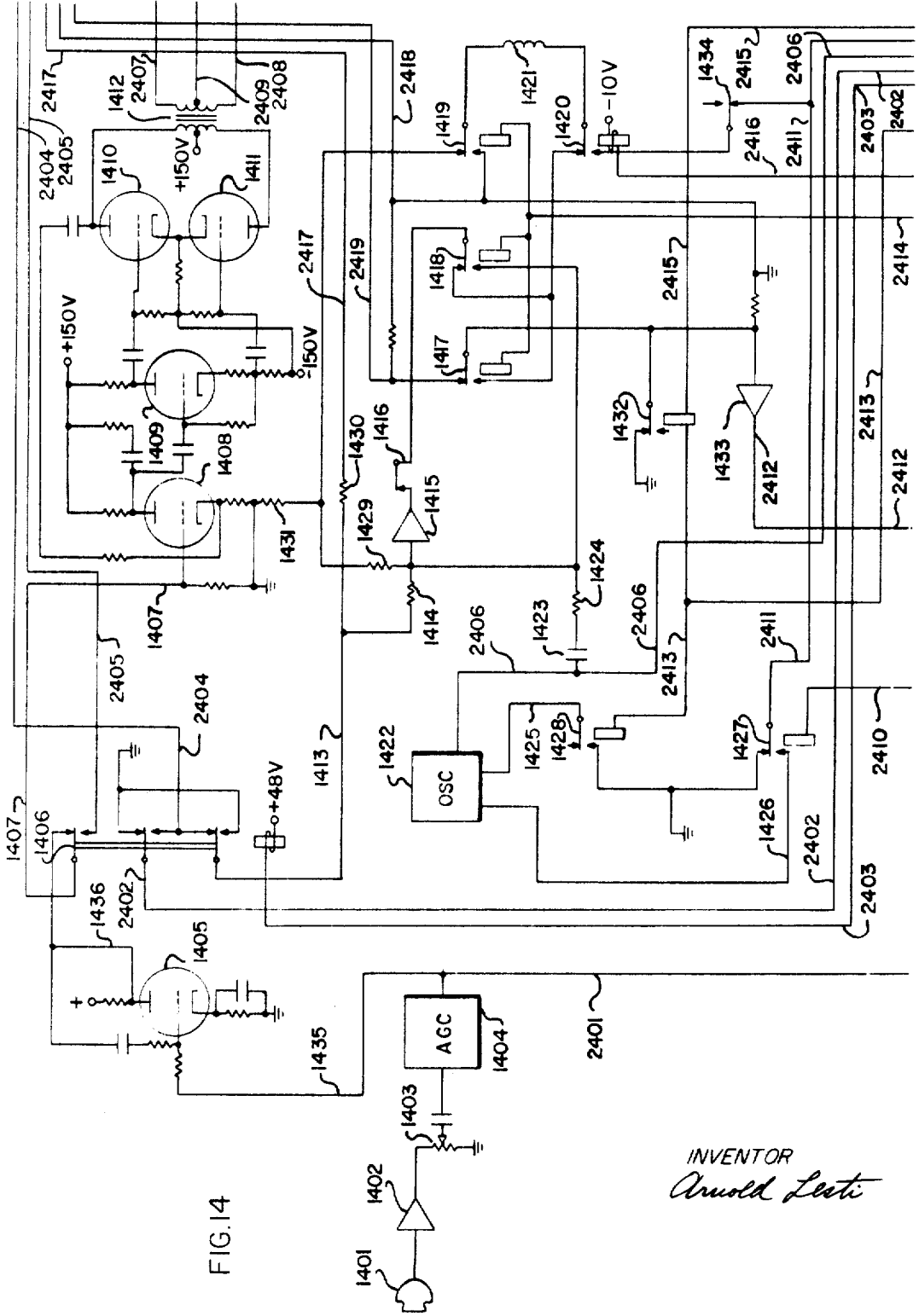

*Input circuits*—FIG. 14 shows the input microphone and some of its associated circuits. A sound picked up by microphone 1401 will be amplified by preamplifier 1402, pass through level control 1403 and on through automatic gain control circuit 1404. The detail of automatic gain control circuit 1404 is shown in FIG. 28 and explained in a discussion of that figure. Bus 2401 connects the output of this circuit to the start circuit.

*Start circuit.*—The start circuit is shown in FIG. 23. Its function is to determine whether or not a sound picked up by microphone 1401 should start the machine and if the machine is to be started to pass a pulse on to the control circuits.

Bus 2401 connects the output of automatic gain control circuit 1404 to potentiometer 2301, the level control for the start circuit. The slider of potentiometer 2301 is connected to the base of transistor 2302 and the amplified signal appears at its collector. The presence of a signal in the rectifier and filter circuit in the coupling between the collector of transistor 2302 and the base of transistor 2304 will develop positive potential at point 2303. If the signal has enough amplitude the potential at point 2303 will go positive far enough to cause transistor 2304 to conduct. Transistor 2304 is connected as an emitter follower and when conducting will tend to make the base of transistor 2305 go positive.

Another output of transistor 2302 is connected by line 2312 to resonant circuit 2307 which is tuned to a frequency near the basic repitition rate of the human voice. If the input signal has frequency components in this range, sufficient voltage swing will be developed at the base of transistor 2308 to cause it to change back and forth from a conducting to a nonconducting state. When there is no signal input to transistor 2308, the bias on its base keeps it in a normally conducting state. Transistors 2309 and 2310 form a positive feedback circuit which is connected so that when transistor 2308 is conducting it will keep transistor 2309 cut off and this in turn will cause transistor 2310 to conduct which will hold the base of transistor 2311 at such a low potential that it will not conduct.

As transistor 2308 swings to a nonconducting state, transistors 2309 and 2310 will be forced to change state which will raise the potential at the base of transistor 2311 high enough to allow it to conduct. The action resulting is such that transistor 2311 is turned off and on sharply at each axis crossing of the input signal.

Transistors 2305 and 2311 are connected in series so that the output at the collector of transistor 2305 will go negative when both transistors are conducting. This happens when two conditions have been met: transistor 2305 conducts only when the incoming signal has sufficient energy and transistor 2311 will conduct only when it contains certain frequencies. These conditions are the criteria for starting the machine and the output on bus 2443 connects this signal on to the control circuitry.

Flip-flop 2204, shown in FIG. 22, is the part of the control circuit which distinguishes the halt condition from the run condition. When it is in the A state the machine is halted and conversely the B state plates the machine in the run condition. The time at which flip-flop 2204 changes from the A to B state is indicated on FIG. 25, the timing diagram, by the vertical line labeled "start." Bus 2443 is connected through the contacts of switch 2201 to the E input of flip-flop 2204. In normal operation, switch 2201 is closed and the output of the start circuit is transmitted to the E input of flip-flop 2204 and forces it into the B state. This starts the machine operation.

Drum control

The circuits for controlling the drum are shown in FIG. 19. As explained in Section ID, it is necessary for both solenoids 1902 and 1903 to be energized if the drum is to rotate.

Reference to FIG. 19 shows that one end of each of these solenoids is connected to +48 volts. The other end of solenoid 1902 is connected to the anode of diode 1925 and the cathode of this diode is connected to bus 1927. Similarly solenoid 1903 is connected through diode 1926 to bus 1927. Bus 1927 is connected to the normally open contacts of relay 1901 and the swinger of this relay is connected to −48 volts. Thus when relay 1901 is actuated there is a current path from +48 volts through solenoid 1902 to −48 volts and similarly a path through solenoid 1903. This will provide enough current to energize the solenoids. It takes less current for the solenoids to hold in position than it does to pull in position, so that once they have had a chance to pull in the current is reduced by returning their current paths to ground instead of −48 volts.

Operation of the control circuits to accomplish the actions described in the above paragraph will now be described.

Figure 20:
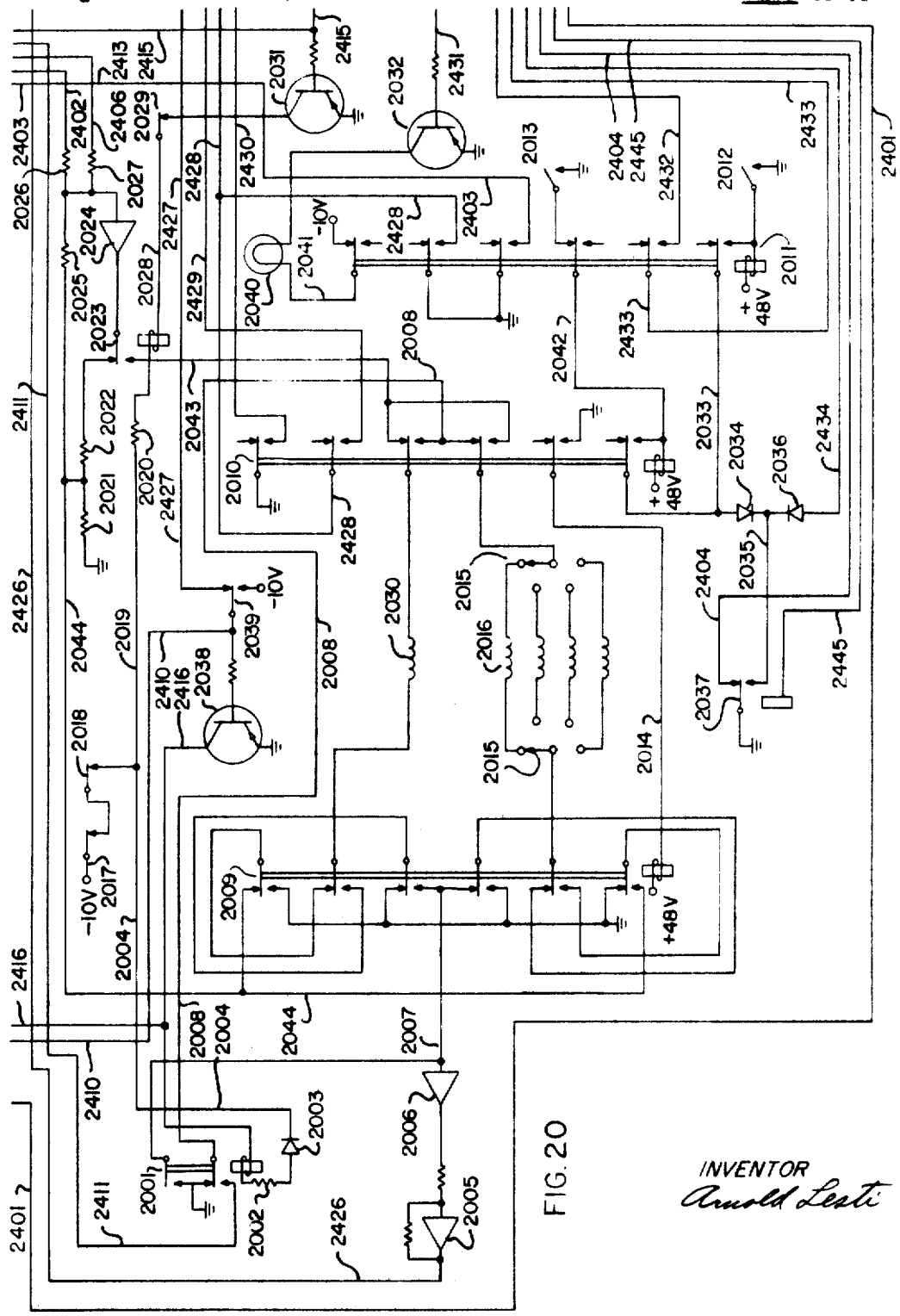
Figure 21:
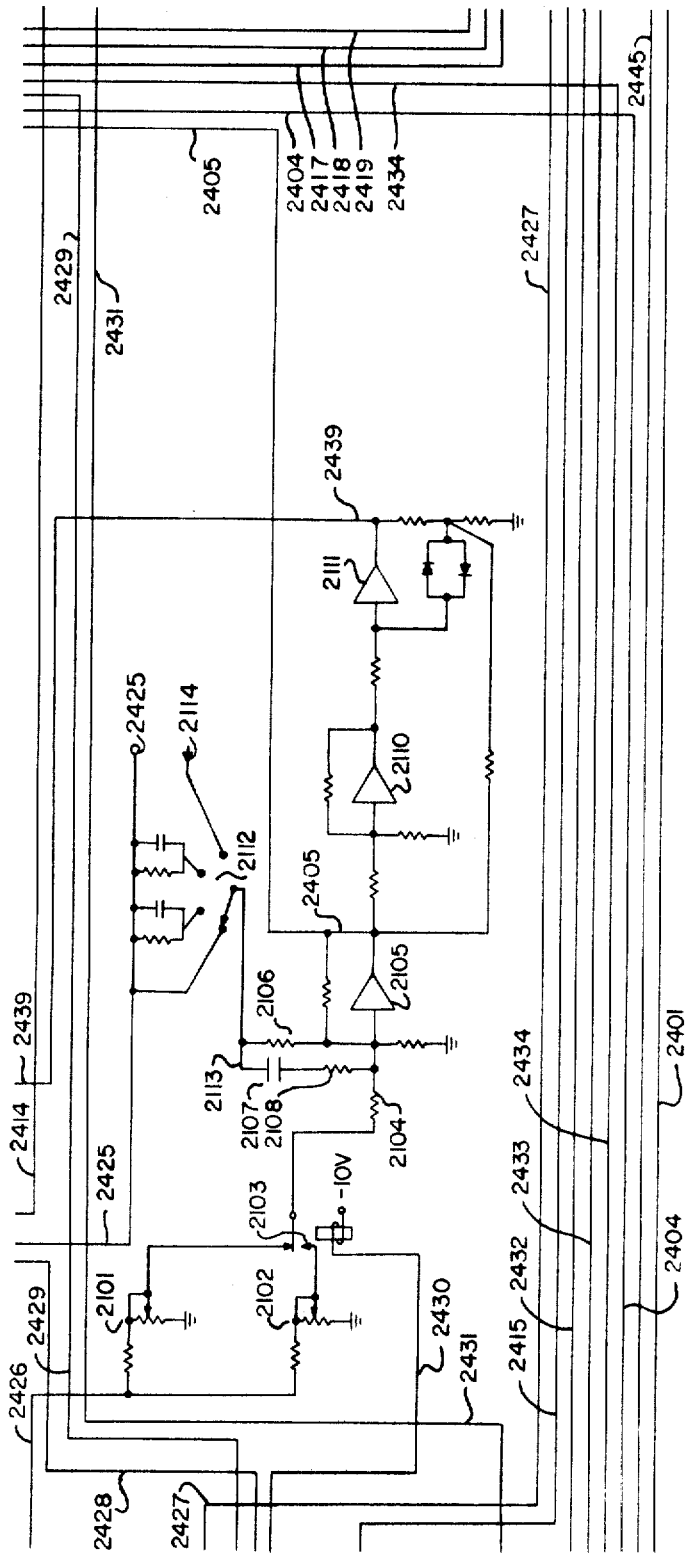

One of the connections of the B output of flip-flop 2204 is bus 2445 which is connected to the control of relay 2037 as shown in FIGS. 20, 21, and 22. Therefore, this relay will be operated at the start time and remain operated until the machine is halted. This is illustrated in the timing diagram, FIG. 25.

Reference to FIG. 20 shows that when this relay is operated there is a path from bus 2434 through diode 2036, bus 2035 and the contacts of relay 2037 to ground.

Another connection of the B output of flip-flop 2204 is to the E input of delay-flop 2203. The B output of the delay-flop is bus 2442 which is connected to the control of relay 1901 as shown in FIGS. 19 and 22. Therefore, delay-flop 2203 and consequently relay 1901 will be operated at the start time and remain operated for the period of the delay-flop.

As explained above, when relay 1901 is operated it will energize solenoids 1902 and 1903. Solenoid 1902 will lift cam follower 1904 out of the detent in cam 1905 thus leaving the cam free to rotate. FIG. 19 shows that when cam follower 1904 is raised, it actuates switch 1906. A section of this switch will now connect one end of solenoid 1902 to bus 2434 which in previous discussion was shown to have a path through relay 2037 to ground at this time. A current path is thereby established from +48 volts through the solenoid to ground. This provides enough current to hold the solenoid and it is no longer dependent on the position of relay 1901 but will remain actuated as long as relay 2037 is operated.

Switch 1906 also provides a path from solenoid 1903 through diode 1911 and bus 1910 and its contacts to ground. Therefore, solenoid 1903 will be energized as long as solenoid 1902 is energized. This will keep motor 3306 engaged to drive the drum as was described in Section ID.

FIG. 19 shows that when switch 1906 is in its normal position there is a path from −48 volts through indicator lamp 1912, the normally closed contacts of switch 1906 on through solenoid 1902 to +48 volts. This will provide enough current to light the lamp but not enough to actuate the solenoid. The lamp will be lit when cam follower 1904 is down in the detent of cam 1905 and therefore, enables the machine operator to know when the drum is locked in its halt position.

Recording incoming signals

This section describes operations during the first cycle in which the incoming signal is amplified, filtered and passed through an impedance transforming circuit to a modulator circuit where it modulates the clock frequency. This resulting modulated clock frequency is then fed to the input of the amplifier which drives the recording head.

Figure 15:
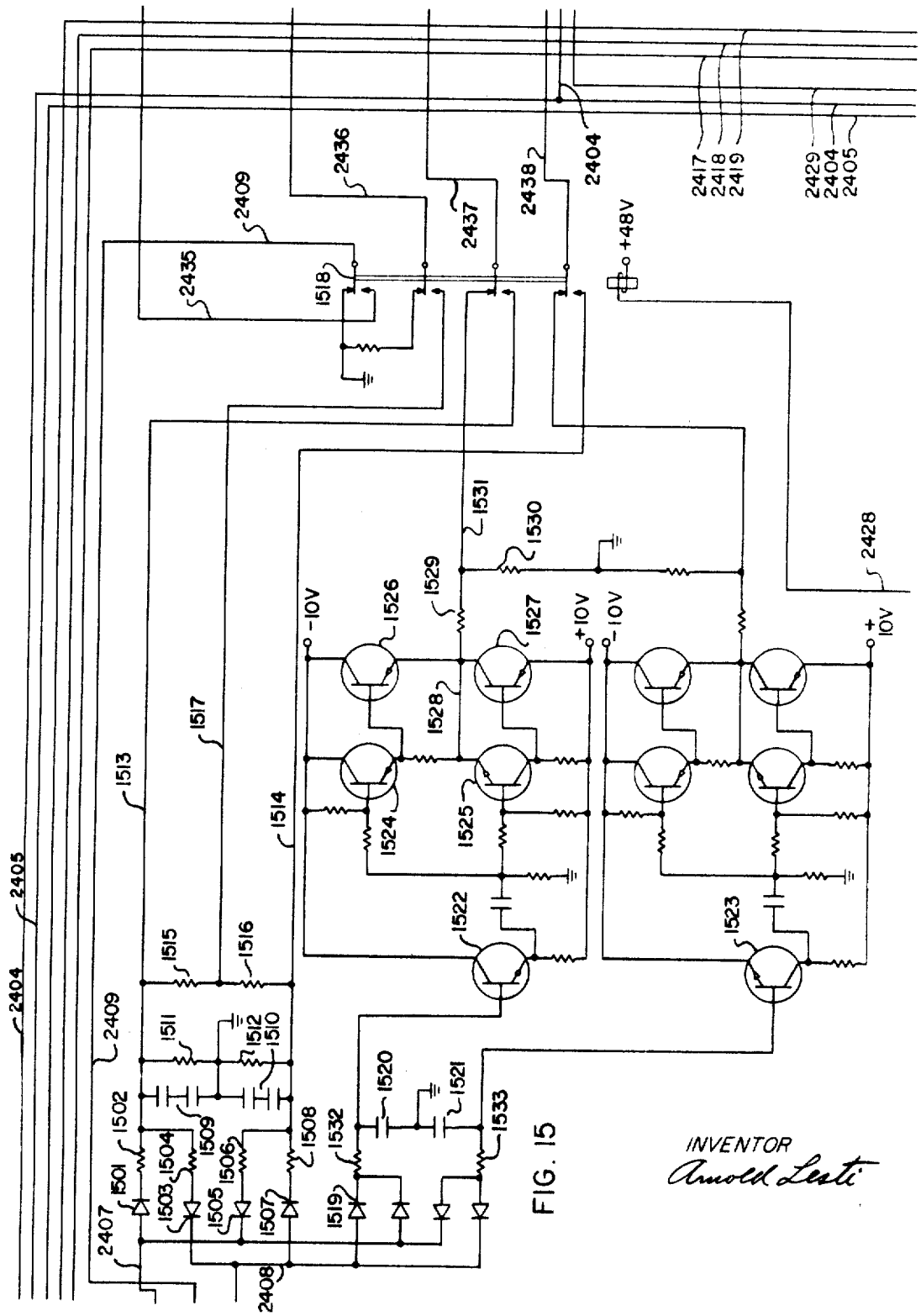
Figure 16:
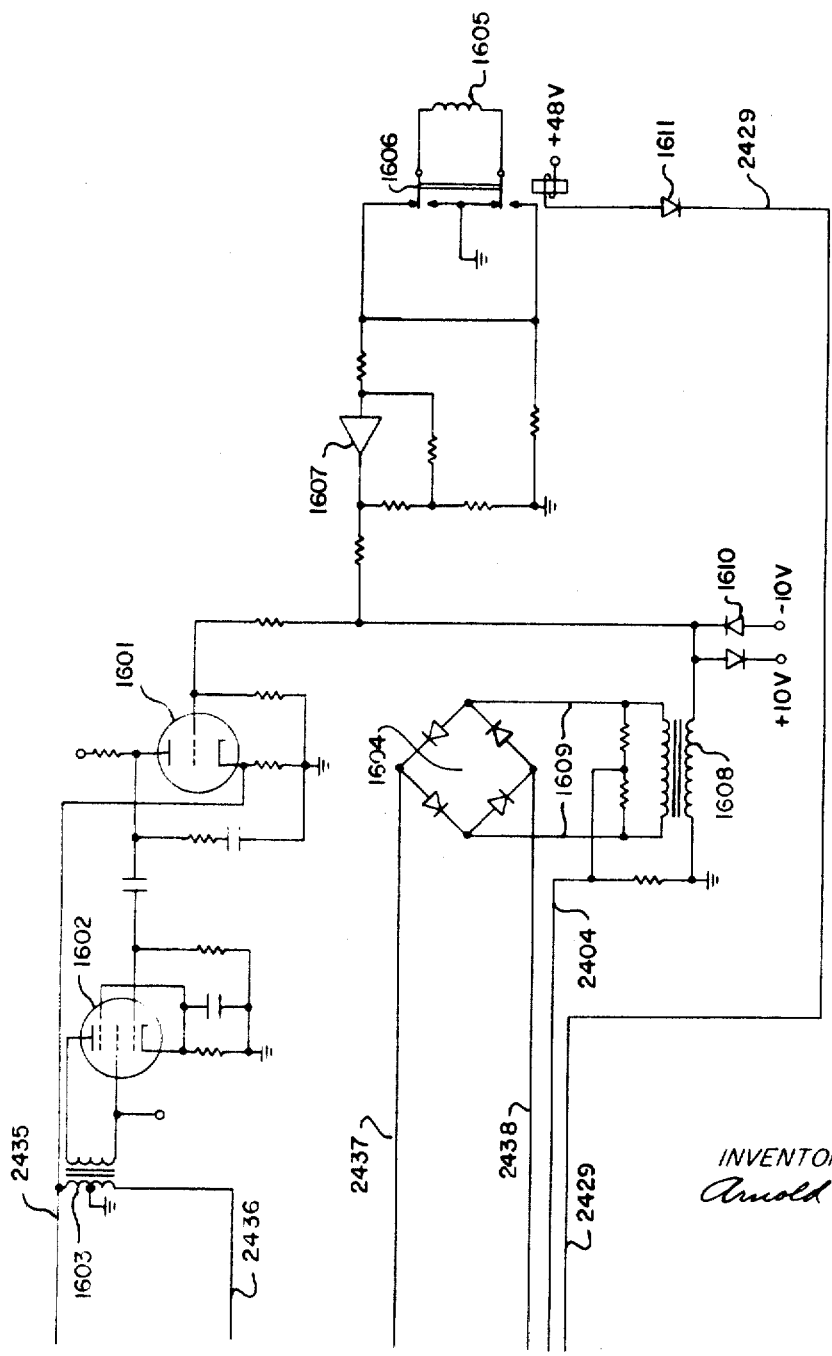

Amplification is done by tubes 1405, 1408, 1409, 1410, and 1411 shown on FIG. 14. Filtering is done by resistors 1532 and 1533 and capacitors 1520 and 1521 shown on FIG. 15. Modulation is done in quad 1604 which is shown in FIG. 16. The output of this modulator is connected to amplifier 1415 whose output goes to recording head 1421, both of which are shown in FIG. 14.

As explained previously, the incoming signal is present at the output of automatic gain control circuit 1404. It is picked up at that point and connected by bus 1435 to the grid of tube 1405 which is operated as a conventional amplifier. The output of tube 1405 is connected by bus 1436 to a normally closed contact of relay 1406. During the first cycle this relay is always in the normal position which is shown in FIG. 14. Therefore, the signal passes through the contacts of relay 1406 to bus 1407 and on to the grid of tube 1408 where it is again amplified and passed on to the grid of tube 1409. Tube 1409 is connected as a phase splitter with two outputs of equal amplitude but opposite phase. These outputs go to the grids of tubes 1410 and 1411 which operate push pull into the primary of transformer 1412.

Bus 2409 connects the centertap of the secondary of transformer 1412 to a swinger of relay 1518. During the first cycle this relay is always in the normal position shown in FIG. 15 and this grounds bus 2409. Outputs of transformer 1412 are buses 2407 and 2408 which are connected through diodes 1519 to resistor 1532 and 1533 and capacitors 1520 and 1521. The diodes are oriented so that a signal through transformer 1412 will put a positive charge on the ungrounded side of capacitor 1520 and a negative charge on capacitor 1521. These diodes, capacitors and associated resistors form a rectifier and filter circuit which determines the frequency components of the signal to be allowed through to subsequent circuits.

The voltages developed across capacitors 1520 and 1521 are inputs to transistor circuits whose outputs are connected to diode quad 1604. These transistor circuits provide a source of sufficient current at a low enough impedance to drive quad 1604 satisfactorily.

Capacitor 1520 is connected to the base of transistor 1522, an emitter follower. The base of transistor 1526 is connected to the emitter of transistor 1524 and the base of transistor 1527 is connected to the emitter of transistor 1525. Transistors 1524 and 1525 are biased so that when there is no signal coming through transistor 1522 the currents from the +10 volt power supply through transistors 1525 and 1527 to point 1528 equals the current from the −10 volt power supply through transistors 1524 and 1526 to point 1528 and therefore point 1528 will be at ground potential.

Now if a signal moves the emitter of transistor 1522 in a negative direction the bases of transistors 1524 and 1525 become more negative. This makes transistors 1524 and 1526 conduct more current and transistors 1525 and 1527 conduct less. Current will flow through resistors 1529 and 1530 and therefore point 1528 will move in a negative direction. If the emitter of transistor 1522 moves in a positive direction the opposite effect will take place and point 1528 will move in a positive direction. The voltage changes of point 1528 are transmitted through resistor 1529 and bus 1531 through normally closed contacts of relay 1518 to bus 2437 and from there to quad 1604.

The voltage developed across capacitor 1521 is connected to the base of transistor 1523. It is passed through circuits similar to those described above and produces a voltage on bus 2438 which is equal in amplitude but opposite in phase to that on bus 2437.

The other input to multiplier quad 1604 is the clock frequency. It is pre-recorded on a track of the magnetic drum and is picked up by head 1605 and passed through contacts of relay 1606 to amplifier 1607. The phase of the clock can be reversed by energizing relay 1606. Amplifier 1607 drives the primary of transformer 1608 with the amplitude limited by diodes 1610. The output of transformer 1608 is on buses 1609 which connect it to multiplier quad 1604. This circuit is used several places in Systems I and II and reference describing its operation is given elsewhere. As a result of the multiplication taking place, the output of quad 1604 on bus 2404 is the clock frequency modulated by the incoming signal.

Bus 2404 connects the resulting signal to the contacts of relay 1406 which connect it to bus 1413 where, through resistor 1414, it is one input to the summing point ef amplifier 1415. Another input to amplifier 1415 is the recording bias frequency which comes from oscillator 1422 through resistor 1424 and capacitor 1423. The output of amplifier 1415 is connected to switch 1416.

During this cycle switch 1416 and relays 1417, 1418, 1419, and 1420 are in the normal states shown in FIG. 14. This provides a path from the output of amplifier 1415 through switch 1416, the contacts of relays 1418 and 1420 and on to one side of head 1421.

The other side of the head is connected to contacts of relay 1419 which in turn connect it to the junction of resistors 1431 and 1429. Resistor 1431 goes to ground and resistor 1429 goes to the summing point of amplifier 1415. This forms a current feedback connection so that the wave shape of the current through the head follows the wave shape of the sum of the voltage inputs to amplifier 1415.

Second cycle

*Control circuit operation.*—The second cycle begins at time $A_2$ which is represented by a vertical line on the timing diagram FIG. 25.

The signal causing the change over from the first cycle to the second is the fiducial mark produced by the drum. Cam 1905 and disc 1913 are the same, but for purposes of clarity of description they are shown separately in FIG. 19 and discussed independently in the explanation. Attached to the shaft of the drum is disc 1913 which has fastened to it pin 1914 which is at right angles to the surface of the disc. As disc 1913 rotates, pin 1914 will come in contact with the swinger of switch 1915 and force it over against the normally open contacts. When in this position the contacts complete a path from ground through resistor 1917, capacitor 1916, switch 1915, and resistor 1928 to the +48 volt power supply which will place a positive charge on capacitor 1916. Disc 1913 continues to rotate and will eventually reach a point where pin 1914 slips off the swinger of switch 1915 and allows the swinger to fall back to the normally closed position. This will allow capacitor 1916 to discharge through resistor 1917 and produce a negative pulse on bus 1918. This pulse is the fiducial mark. In normal operation switch 1919 will be in the position illustrated in FIG. 19, therefore, the pulse will be transmitted from bus 1918 through switch 1919 and on over bus 2441 to the control circuits on FIG. 22.

The negative fiducial mark pulse is transmitted from bus 2441 through capacitor 2214 and diode 2215 to the base of transistor 2216. Transistor 2216 is an emitter follower and therefore once each revolution of the drum, a negative pulse is produced on its emitter, bus 2217. The first pulse is at the time represented by the line marked $A_1$ on FIG. 25.

Reference to FIG. 22 shows that bus 2217 is connected to the inputs of delay-flops 2209 and 2220, and therefore both will be actuated by each fiducial mark. This is illustrated in the timing diagram, FIG. 25, by the short horizontal lines. The delay of delay-flop 2209 is shown to be longer than that of 2220.

FIG. 22 shows the A output of delay-flop 2209 is connected to the E input of flip-flop 2206 and that the C input of this flip-flop is connected by bus 2211 to switch 2205. In normal operation switch 2205 will be in the position illustrated in FIG. 22 which connects bus 2211 to the B output of flip-flop 2204. Reference to FIG. 25 shows that flip-flop 2204 was placed in the B state at the start time, therefore the C priming input of flip-flop 2206 has had a signal since the start time and the signal coming on its E input will force it into the B state.

The time that flip-flop 2206 is in the B state is shown by the corresponding horizontal line in timing diagram, FIG. 25. This flip-flop is used to control directly or indirectly the changes of state of other flip-flops and relays which must occur in changing from the first cycle to the second cycle. These are indicated in FIG. 25 as occurring at the time flip-flop 2206 changes state and take place as follows:

(1) The B output of flip-flop 2206 is connected to the control of relays 1708 and 1710 by bus 2422. The relays remain energized as long as the flip-flop is in B state.

(2) The B output of flip-flop 2206 is connected by bus 2218 to contacts of switch 2205 and through them to bus 2414 and on to controls of relays 1418, 1417, and 1419. These will remain energized as long as the flip-flop is in B state.

(3) The A output of flip-flop 2206 is connected by bus 2440 to the controls of relays 1817 and 1816. These relays are energized only when the flip-flop is in the A state, so that at this time they return to normal state.

(4) The B output of flip-flop 2206 is connected by bus 2219 to the E input of flip-flop 2210. Since flip-flop 2210 is self primed it will now go to B state.

(5) The B output of flip-flop 2210 is connected by bus 2413 to the controls of relays 1806, 1815, 1432, and 1428. These remain energized as long as flip-flop 2210 is in the B state.

Reading the $F_1(t)$ signal

During the second cycle the incoming signal $F_1(t)$ recorded during the first cycle is read out from the memory.

As explained above, relays 1417, 1418, and 1419 are operated at this time. Reference to FIG. 14 shows that under these conditions one end of head 1421 is connected through contacts of relay 1419 to ground and that the other end of the head is connected through contacts of relays 1420 and 1417 to the input of cathode follower 1433.

Relay 1432 is also operated which removes ground connection from the input of cathode follower 1433. Therefore, the signal picked up by head 1421 will pass through the cathode follower and appear at its output on bus 2412.

Figure 17:
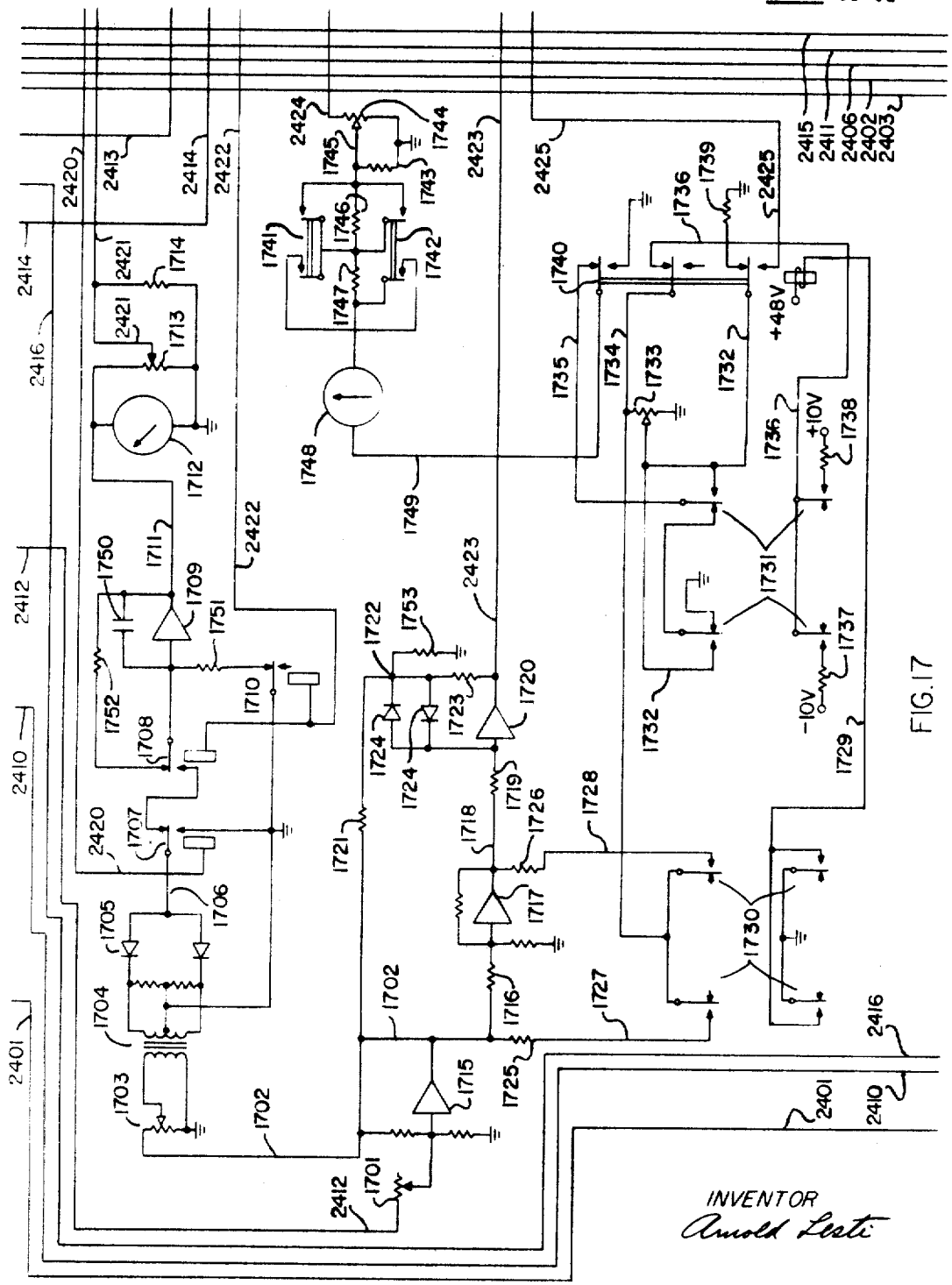

FIG. 17 shows that bus 2412 is connected through variable resistor 1701 to the summing point of amplifier 1715. The variable resistor provides an adjustable gain for the amplifier.

By means of the above connections the stored input function is read out of the memory and made available at the output of amplifier 1715 on bus 1702.

Reading the G-function

In a previous section it was mentioned that the $G(t)$ signal or memory function can be stored in one of two places which are used alternately. These two places are the tracks of heads 2030 and 2016 shown in FIG. 20.

As shown in FIG. 20, head 2016 can be any one of four heads as determined by the position of switch 2015. For the purposes of this discussion, it will be assumed that initially relays 2009 and 2010 are in the states shown in FIG. 20, that the G-function is stored on the track of head 2016 and that the track of head 2030 has been erased.

One side of head 2016 is connected through the contacts of relay 2009 to bus 2007 which is the input of cathode follower 2006. The other side of head 2016 is connected through contacts of relay 2010 to bus 2008 which ties it to contacts of relay 2001 and these in turn provide a path to ground.

Signal $G(t)$ picked up by head 2016 is a signal input to cathode follower 2006 which passes it on to the input of amplifier 2005 and it appears at the output on bus 2426. FIG. 21 shows that bus 2426 is connected through resistor-potentiometer combination 2101 to the normally closed contact of relay 2103 and also through resistor-potentiometer combination 2102 to the normally open contacts of relay 2103.

One side of the solenoid of relay 2103 is connected to the $-10$ volt supply and the other side is connected by bus 2430 to a normally open contact of relay 2010. When relay 2010 is closed it provides a path from bus 2430 to ground which will complete the solenoid circuit and actuate relay 2103. Earlier in the discussion it was assumed that at this time relay 2010 was in the state shown in FIG. 20 and therefore relay 2103 is not operated but is in the state shown in FIG. 21. The signal path is then from bus 2426 through resistor-potentiometer combination 2101, relay 2103, and resistor 2104 to the summing point of amplifier 2105.

Operating on $F_1(t)$ and $G(t)$

The $F_1(t)$ and $G(t)$ signals read from the memory must now be multiplied together and the product integrated to produce $$\int_{t_1}^{t_2} F_i(t) \cdot G(t) dt$$

This is also called correlation of $F_i(t)$ and $G(t)$.

Since an analog multiplier will have the least accuracy when one input is near zero, the two functions are compressed before they are multiplied and the product expanded. This will result in using the multiplier more in its favorable region and less in its unfavorable region.

The compression curve used is the cube root. That is, the instantaneous cube roots of the F and G functions are obtained, multiplied and the resulting product is cubed. Thus:

$$(F_1(t))^{1/3} \cdot (G(t))^{1/3} = (F_1(t) \cdot G(t))^{1/3}$$
$$[(F_1(t)(G)(t))^{1/3}]^3 = F_1(t) \cdot G(t)$$

FIG. 21 shows the circuits used in getting the cube root of the G-function. Amplifier 2105 has two inputs to its summing point, one through resistor 2104 and one through resistor 2106. The other end of resistor 2106 is connected to bus 2425 which goes to a normally open contact of relay 1740 as shown in FIG. 17. This relay is operated only during the learning process which will be described later. Therefore the only input to amplifier 2105 at this time is through resistor 2104 which the previous section showed was the G-function. The amplified G-function will appear at the output on bus 2405.

This signal is now passed on to amplifiers 2110 and 2111 and produces the cube root of the G-function on bus 2439, the output of amplifier 2111. The method of operation of this circuit is described in another section.

Figure 18:
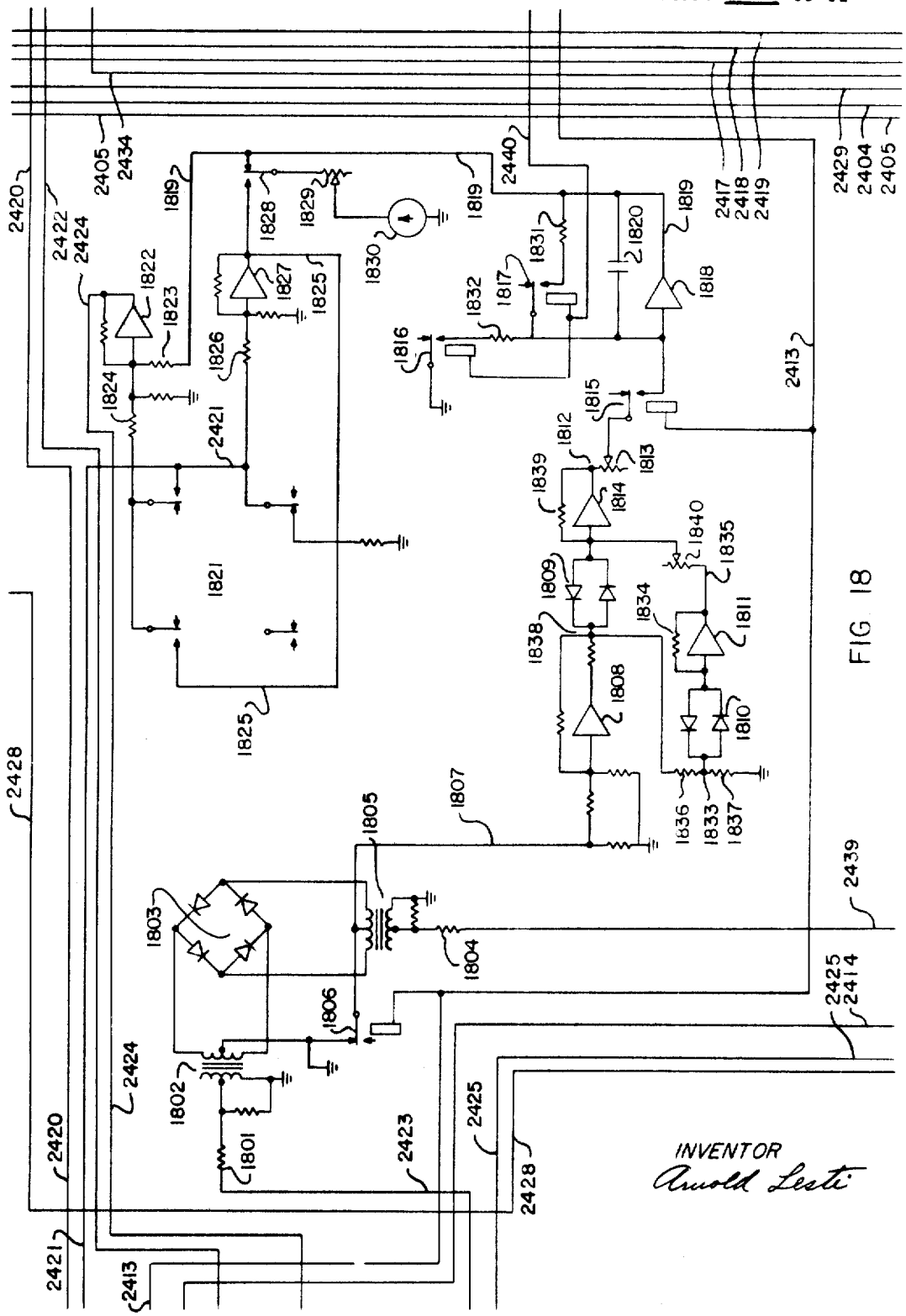

Bus 2439 is connected through resistor 1804 to the primary of transformer 1803 which, as is shown in FIG. 18, is one input to multiplier quad 1803.

The section above describes how the F-function is made available at the output of amplifier 1715 on bus 1702. Reference to FIG. 17 shows that it is an input to amplifiers 1717 and this amplifier in conjunction with amplifier 1720 form a cube root circuit similar to that used by the G-function, and in the same manner will produce the cube root of the F-function on bus 2423, the output of amplifier 1720.

FIG. 18 shows that bus 2423 is connected through resistor 1801 to the primary of transformer 1802 and thus is the other input to multiplier quad 1803.

By means of the connection described above the cube roots of the F and G-function are the two inputs to the multiplier. The reference describing the method of operation of the multiplier circuit is given in another section. The output of the multiplier is on bus 1807, the centertap of the secondary of transformer 1805. Another connection of this centertap is to relay 1806 which, as FIG. 18 shows, in its normal state will ground this point. Reference to FIG. 25 shows that this relay is operated at this time and the centertap ungrounded allowing the multiplier to furnish an output signal on bus 1807.

The product which now appears on bus 1807 must be cubed. This function is performed by amplifiers 1808, 1811, 1814, and associated circuits in a manner described in another section. The result appears at point 1812, the output of amplifier 1814.

Integration to produce $$\int_{t_1}^{t_2} F_i(t) G(t) dt = V_i$$

is performed by amplifier 1818 with capacitor 1820 as its feedback path. Relay 1815 controls the time of integration by switching on and off the signal input to the summing point. It is necessary to have capacitor 1820 completely discharged and referenced to ground at the beginning of the integration and this is accomplished by means of relays 1816 and 1917. Reference to the timing diagram, FIG. 25, shows that during the first cycle these relays are operated. In this state, relay 1817 will shunt resistor 1831 across capacitor 1820 and keep it discharged. At the same time relay 1816 provides a path from the summing point of amplifier 1818 through resistor 1832 and the contacts of relay 1816 to ground.

FIG. 25 shows that at the time flip-flop 2206 goes to the B state relays 1816 and 1817 are released which removes the shunt from capacitor 1820 and ungrounds the summing point. At the same time relay 1815 is operated and establishes a path from point 1812 through variable resistor 1813 and the contacts of relay 1815 to the summing point of amplifier 1818. Therefore the process of integration by amplifier 1818 and capacitor 1820 will begin at this time designated as $t_1$ in the formula.

Squaring $F_1(t)$

Another operation which takes place during the second cycle is that $F_1(t)$ is squared and the result integrated. The circuits involved in this are shown in FIG. 17. A previous section describes how the F-function is made available on bus 1702. From this point the function is connected through potentiometer 1703 to the primary of transformer 1704. The secondary of the transformer is connected to diodes 1705 and the diodes joined to bus 1706 as shown in FIG. 17. This circuit produces a current through bus 1706 which is proportional to the square of the voltage appearing on bus 1702. The operation of this circuit is described in another section.

Integration is performed by amplifier 1709 with capacitor 1750 as its feedback path. Reference to FIG. 25 shows that in the first cycle, relays 1707, 1708, and 1710 are in the states shown in FIG. 17. This connects resistor 1752 across capacitor 1750 and connects the summing point of amplifier 1709 to ground through resistor 1751 which results in the input and output of the amplifier being at ground and no charge can accumulate on capacitor 1750.

At the time following $A_1$ when flip-flop 2206 goes to the B state, relays 1708 and 1710 will be operated. This removes the connections of resistor 1752 across capacitor 1750 and of resistor 1751 to ground and establishes a path from bus 1706 through relays 1707 and 1708 to the summing point of amplifier 1709. Therefore amplifier 1709 will start integrating at this time and will develop at its output on bus 1711 a voltage proportional to the integral of the square of the F-function or $$U_i = \int_{t_1}^{t_2} F_i^2 dt$$

Control operation at end of cycle

The operations described in the previous section, which begin at the time following $A_1$ when flip-flop 2206 goes to the B state, will continue until the next fiducial mark at the time indicated by the vertical line labeled $A_2$ on FIG. 25. At time $A_2$, designated as $t_2$ in the formula, it is necessary to disconnect the inputs to the integrators and let them maintain the values held at that time. The drum continues to rotate and an indicator lamp is lit to show that the second cycle has been completed.

The rotation of the drum will activate the drum control circuits and produce a negative pulse on bus 2217 at time $A_2$ in the same manner as at time $A_1$. Reference to FIG. 22 shows that bus 2217 is connected to the E input of flip-flop 2207 and that the C priming input to this flip-flop is connected to the B output of flip-flop 2206. Since flip-flop 2206 is in the B state, flip-flop 2207 will now be forced into the B state by the pulse on its E input.

The B output of flip-flop 2207 is shown to be connected to the E input of flip-flop 2208 and the C primary input of flip-flop 2208 is connected to the B output of flip-flop 2204. As flip-flop 2204 has been in the B state since the start time there will be a signal at the C priming input of flip-flop 2208 and therefore the pulse on the E input of the flip-flop will force it into the B state at this time.

Another connection of the B output of flip-flop 2207 is to the E' input of flip-flop 2210 and this will result in flip-flop 2210 being forced into the A state at the time flip-flop 2207 goes into the B state.

The changes of states of flip-flops described above are portrayed in the timing diagram, FIG. 25, and the operations of the relays as well.

The B output of flip-flop 2207 is connected by bus 2420 to the control of relay 1707 and will actuate the relay at time $A_2$. Reference to FIG. 17 shows that this disconnects the input to amplifier 1709. The output of amplifier 1709 on bus 1711 will then be the value of $F_i(t)$ squared integrated over the time interval from the operation of relays 1708 and 1710 until relay 1707 is operated at time $A_2$.

Bus 2413 connects the B output of flip-flop 2210 to the controls of relays 1815, 1806, 1432, and 1428. When flip-flop 2210 goes to the A state at time $A_2$, all these relays will be released as is illustrated in FIG. 25.

Relay 1815 returning to its normal state will disconnect the input to amplifier 1818 as is shown in FIG. 18. The voltage on the amplifier output bus 1819, will be the product of F and G integrated over the time relay 1815 was operated.

When relay 1806 returns to normal it will ground the centertap of transformer 1805 which is the output of multiplier quad 1803 and prohibit any further signals passing this point.

FIG. 14 shows that when relay 1432 returns to normal it grounds the input of cathode follower 1433 and thereby stops all signals on this path.

Releasing relay 1428 will remove the ground connection from bus 1425 and allow outputs from oscillator 1422.

The output of flip-flop 2208 is bus 2431. Reference to FIG. 20 shows that it is connected through a resistor to the base of transistor 2032. The emitter of the transistor is grounded and the collector is connected to one side of indicator lamp 2040. The other side of the lamp is connected by bus 2041 to contacts of relay 2011. A previous discussion showed that relay 2011 is in the state shown in FIG. 20 at this time and therefore connects bus 2041 to the $-10$ volt supply. When flip-flop 2208 goes to the B state, bus 2431 goes negative and current flows from ground through transistor 2032 and indicator lamp 2040 to the $-10$ volt supply and the lamp will glow. This indicates to the operator that the second cycle has been completed.

Operation of manual controls for interpreting result

As explained in the above section, the integral of the product of F and G now appears on bus 1819 and the integral of F squared appears on bus 1711. In order to interpret the result of the machine decision, the integral of the product (which will be referred to as $V_i$) is compared with the square root of the integral of F squared (which will be referred to as the assigned B). This is done by use of manual controls in a manner which will now be described. The assigned $B_i$ can also include $B_i = 0$.

The square root of the integral of F squared is found by means of potentiometer 1713 and meter 1712. As shown in FIG. 17, bus 1711 is connected to one side of meter 1712 and potentiometer 1713. The meter will read the voltage on bus 1711 which is the integral of F squared. There is a dial attached to the slider of potentiometer 1713 which has been calibrated so that when the machine operator adjusts the indicator to the same value as the reading on meter 1712, the voltage at the slider on bus 2421 is the square root of the voltage appearing on bus 1711. After the operator has made this adjustment, then bus 2421 will carry the value of $B = \sqrt{U_i}$.

Reference to FIG. 18 will show that bus 2421 is connected through resistor 1826 to the summing point of amplifier 1827. This amplifier has a gain of unity so that since it has B as its input it will have $-B$ on its output bus 1825. This gives both $+\sqrt{U_i}$ and $-\sqrt{U_i}$ as possible assignments of desired outputs. Zero is a third possible assignment.

Bus 1825 is connected to the normally open contact of switch 1828. The operator now actuates this switch and connects bus 1825 to variable resistor 1829 which is also connected to meter 1830. Then the variable resistor is adjusted until the meter reads a predetermined value. For purposes of this discussion let us assume the value is $-1$. This normalizes the meter with respect to B, that is, a voltage at switch 1828 will give a reading on the meter which will be in the same ratio to one as the measured voltage is to the voltage B.

When switch 1828 is returned to the position shown in FIG. 18, it connects variable resistor 1829 to bus 1819 which is the output of amplifier 1818 and carries the value of $V_i$. Meter 1830 therefore reads the value of $V_i$ with respect to B. If $V_i$ equals plus B then the meter reads $+1$, and if $V_i$ equals $-B$ then it reads $-1$, etc.

*Operating-and-learning-mode*

General

When the machine operator observes the results of the machine decision, he can decide if the machine needs teaching. Meter 1830 should read plus one for a positive category, minus one for a negative category and zero for zero category. If the result is wrong or not close enough to the correct reading, the operator assists in the generation of a new $G(t)$ signal which will give the correct answer.

The new $G(t)$ is produced by measuring the error (i.e., the difference $e_i$ between the actual result $V_i$ and the desired result $B_i$) and algebraically adding a portion of the F-function called the error signal to the old G-function. The amount added is proportional to the size of the error.

Manual controls are operated to determine the amount and polarity of $F_1(t)$ to be used. After the controls are set the operator will actuate a switch which will cause the machine to generate and store a new $G(t)$, erase $F_1(t)$ and the old $G(t)$ and then come to a halt.

Operation of manual controls

In the following description the direction for throwing the switches (i.e., left or right, up or down) correspond to the way the switches are drawn in FIGS. 14 through 23. Of course the switches could have been wired in a different manner without affecting the machine's ability to operate, but the wiring shown was chosen to make it easier for the operator to remember the proper sequence of operation of the switches.

The object of the learning process is to generate a G-function such that when it is applied to an incoming function in the identification process, the resulting $V_1$ will equal plus or minus $B_1$ or zero according to which one the operator specified during the learning process.

The difference between the desired result and the actual result is called the error, and amplifier 1822 is used as a subtractor to determine the error $e_1 = B_1 - V_1$. Reference to FIG. 18 shows that one input to the summing point is from bus 1819 through resistor 1823. Previous discussion showed that bus 1819 has the value of $V_1$ on it at this time.

Another input to the summing point comes from switch 1821 through resistor 1824. FIG. 18 shows that when switch 1821 is in the center position resistor 1824 is left unconnected and when the switch is thrown to the right it is connected to bus 2421 and that throwing the switch to the left hand position connects the resistor to bus 1825. Thus the operator can have $\sqrt{U_1}$ or $-\sqrt{U_1}$ or zero as one input to amplifier 1822.

If, for example, it is desired to teach the machine to give a result of $V_1$ equal to minus B, then the polarities are such that switch 1821 should be thrown to the right hand position. This connects plus B as an input and, since $V_1$ is negative, if they are equal they will cancel each other at the input and there will be no output from amplifier 1822. If they are not equal the amplitude of the output will be proportional to the difference of the inputs and the polarity of the output will show the direction of difference. Had the operator desired the machine to have as a result $V_1$ equal to plus B, switch 1821 would have been thrown to the left. In either case the error appears on bus 2424 at the output of amplifier 1822.

In accordance with the theory as explained in another section, it is necessary to divide the error by the value of the integral of F squared or $$U_i = \int_{t_1}^{t_2} F_i^2(t) dt$$

This is accomplished by means of potentiometer 1744 and meter 1712. The dial attached to the slider of this potentiometer is calibrated so that when the indicator is set to a particular number the ratio of the output on bus 1745 to the input on bus 2424 is equal to the reciprocal of that number. The numbers on the dial correspond to numbers on the face of meter 1712. Now the reading on meter 1712 is the value of the integral of $F_1$ squared, so that, when the dial of potentiometer 1744 is set to the number read on meter 1712, then the value on bus 1745 is equal to the value on bus 2424 divided by the integral of $F_1$ squared, or $e_1/U_1$.

As the value on bus 2424 is the error $e_1$, then the value on bus 1745 after adjusting the potentiometer is the desired quotient $e_1/U_1$ which the theory says should be multiplied with the F-function. This multiplication is done by means of potentiometer 1733. The potentiometer is set so that the ratio of the voltage at its slider on bus 1732 to the voltage at its input on bus 1734 is the same as the ratio of the voltage on bus 1745 to a fixed voltage derived from the voltage on either the +10 bus or −10 bus. To accomplish this meter 1748 is used as a nulling device. FIG. 17 shows that bus 1745 is connected through resistors 1746 and 1747 to one side of meter 1748 and that the other side of the meter is bus 1749 which is connected through relay 1740 to bus 1735 and on to switch 1731 and through its contacts to ground. Relay 1740 and switches 1730 and 1731 are at this time in the positions illustrated in FIG. 17. Meter 1748 is a zero center meter and therefore the direction of deflection will depend upon the polarity of the voltage on bus 1745. Connections of the meter and of switch 1731 are arranged so that, if switch 1731 is thrown in the same direction as the deflection of meter 1748, then a voltage of the same polarity as that on bus 1745 will be applied to the meter on bus 1749. For example, a negative voltage on bus 1745 will cause the meter needle to deflect to the left. Throwing switch 1731 to the left connects bus 1736 to the −10 volt supply through resistor 1737. Bus 1736 is also connected through the contacts of relay 1740 to bus 1734 which is connected to potentiometer 1733. The slider of the potentiometer is connected to bus 1732 which is now connected by switch 1731 to bus 1735. Relay 1740 connects bus 1735 to bus 1749. By means of these connections a negative voltage is brought to one side of meter 1748 and the amplitude of this voltage can be varied by moving the slider of potentiometer 1733. The slider is now adjusted until the needle of meter 1748 is at the zero center indicating that the two inputs are of equal amplitude and the same polarity. Switches 1741 and 1742 are used to short out one or both of resistors 1747 and 1746 and thereby increase the sensitivity of meter 1748 and allow the position of the slider on potentiometer 1733 to be set more precisely in nulling the meter.

FIG. 17 shows that the slider of potentiometer 1733 is also connected by bus 1732 to contacts of relay 1740 to resistor 1739 and on to ground. Resistor 1739 puts the same impedance from bus 1732 to ground as will be there when relay 1740 connects bus 1732 to bus 2425. This keeps the ratio of impedance from bus 1732 to ground to the impedance from bus 1734 to ground the same when relay 1740 is actuated as when it is in the normal state.

After potentiometer 1733 has been correctly adjusted, switch 1730 is thrown in the same direction as switch 1731. FIG. 17 shows that one end of the solenoid of relay 1740 is connected to +48 volts and the other end to bus 1729. Bus 1729 is connected to normally open contacts of switch 1730 and will be connected to ground if the switch is thrown to either the right or left hand position. Therefore when switch 1730 is thrown relay 1740 will be actuated. This disconnects bus 1735 from bus 1749 and grounds bus 1749. It also disconnects bus 1732 from resistor 1739 and connects it to bus 2425. The connection between bus 1734 and bus 1736 is now broken.

Switch 1730 also connects bus 1734 to either bus 1727 or 1728 depending on the direction the switch is thrown. As explained in a previous section, the signals on buses 1727 and 1728 are equal in amplitude and opposite in polarity. The connections to switch 1730 have been chosen so that, when it is thrown in the same direction as switch 1731, the connection to bus 1734 is the proper polarity to correct the G-function for the direction of the error indicated by the polarity of the signal on bus 2424.

The slider of potentiometer 1733 is set by the procedure described above to give the proper amount of correction to the G-function as was indicated by the amplitude of the voltage on bus 1745.

All the manual controls are now in proper adjustment for proceeding with the learning process.

The operator now presses push-button switch 2012 and as FIG. 20 shows, this provides a path from the +48 volt supply through the solenoid of relay 2011 to ground and thus actuates the relay. Once the relay has pulled in, a path is established from +48 volts through the solenoid contacts of relay 2011, bus 2033, diode 2034, bus 2035, and contacts of relay 2037 to ground. Therefore, after push-button switch 2012 is released, relay 2011 will stay operated as long as relay 2037 remains operated and connects bus 2035 to ground.

When relay 2011 is actuated its contacts ground bus 2403 which establishes a path from the +48 volt supply through the solenoid of relay 1406 and bus 2403 to ground as is shown in FIGS. 14 and 20. This will cause relay 1406 to operate at the same time as relay 2011.

FIG. 20 shows that in the operated position, relay 2011 also grounds bus 2428 which is connected to the solenoid of relay 1518 and, in the same manner as described above, will cause that relay to operate at the same time as relay 2011.

Reference to FIG. 20 also shows that when relay 2011 operates, it breaks the connection between bus 2041 and the −10 volt supply and thus extinguishes indicator lamp 2040.

Another result of operating relay 2011 is that it then connects buses 2432 and 2433. These affect the control circuits in a manner which will be discussed in a later section.

This completes the operation of the manual controls and no further action takes place until the next fiducial mark.

*First teaching cycle*

General

During this cycle the new $G(t)$ is to be generated and recorded. It is generated by adding algebrically the present $G(t)$ signal and the error signal obtained from $F_1(t)$. The amplitude and polarity of $F_1(t)$ in the error signal $\Delta G_1(t)$ to be added has been determined by the adjustment of the manual controls previously described. The process produces $$\Delta G_i(t) = \frac{e_i}{U_i} \cdot F_i(t)$$

The first cycle in the learning process begins at the first fiducial mark following the actuation of pushbutton switch 2012. That time is indicated on FIG. 25 by the vertical line labeled $B_1$.

Control circuit operations

The fiducial mark at $B_1$ will produce a pulse on bus 2217 and thus actuate delay-flop 2220 in the same manner as described in an earlier section.

The delayed pulse output of delay-flop 2220 is on bus 2432 and is connected through the contacts of relay 2011 to bus 2433 and from there to the E input of flip-flop 2237.

FIG. 22 shows the C priming input of flip-flop 2237 is connected to the B output of flip-flop 2208 and reference to FIG. 25 shows that flip-flop 2208 is in the B state at this time. Since flip-flop 2237 has its C input primed, the pulse on its E input at this time will force it into the B state. The output of flip-flop 2237 is connected to the E input of flip-flop 2236 and, since the C input of flip-flop 2236 is self primed, flip-flop 2236 will now go to the B state. These changes of state are illustrated in FIG. 25.

The B output of flip-flop 2236 is on bus 2415 which FIG. 14 shows is connected to the control of relay 1432 and therefore actuates it at this time. When relay 1432 operates it ungrounds the input of cathode-follower 1433 and allows the F-function picked up by head 1421 to pass on through to other circuits on bus 2412 in the same manner as described in a previous section.

Another connection of bus 2415 is shown on FIG. 20 and is through a resistor to the base of transistor 2031. The emitter of transistor 2031 is grounded and the collector is connected through the contacts of switch 2029 to bus 2028 and from there on through the coil of relay 2023, resistor 2020, bus 2019, and contacts of switches 2018 and 2017 to a supply voltage.

Switches 2029, 2017, and 2018 are normally closed as illustrated in FIG. 20. Therefore, when flip-flop 2236 is in the B state, bus 2415 is negative which biases transistor 2031 into conduction causing current to flow through the solenoid of relay 2023 and operate the relay.

Actuating relay 2023 connects the output of amplifier 2024 to bust 2043 which is in turn connected through contacts of relay 2010 to one end of head 2030. The other end of head 2030 is connected through contacts of relay 2009 to bus 2044 and from there through resistor 2025 to the summing point of amplifier 2024.

Generating new G-function

During this cycle the G-function picked up by head 2016, amplified and connected to the summing point of amplifier 2105 in the same manner as that previously described.

The F-function is picked up by head 1421 and reaches bus 1702 on FIG. 17 through the same switching path described above.

FIG. 17 shows that bus 1702 is the input to amplifier 1717. This is a unity gain amplifier so that its output on bus 1718 has the same amplitude as but opposite polarity from the input. Therefore buses 1727 and 1728 carry the F-function and a negative F-function. A previous section describes how the proper one of these is selected, attenuated by potentiometer 1733 and this attenuated F-function is connected to bus 2425. FIG. 21 shows that bus 2425 is an input to the summing point of amplifier 2105 through switch 2112 and resistor 2106. Capacitor 2107 and resistor 2108 are connected across resistor 2106 to produce phase shift in the signal. The function of switch 2112 is described further hereinbelow.

Thus one input to amplifier 2105 is the G-function and the other is the modified F-function and its output on bus 2405 is the sum of the two, which is the new G-function. The modified F-function is equal to $$\frac{e_i}{U_i} \cdot F_i(t) = \Delta G_i(t)$$

and is often called the error signal or error function.

Recording new G-function

This new G-function will be recorded on the track of head 2030 during this cycle in the manner which will now be described.

Bus 2405 is connected to contacts of relay 1406 as shown in FIG. 14. As explained in an earlier section this relay is operated at this time and so connects bus 2405 to bus 1407, the input to the grid of tube 1408. There the signal is further amplified and passed on through circuits to the primary of transformer 1412 in the same manner as described previously.

From the secondary of transformer 1412 the signal passes through the synchronous demodulator before reaching multiplier circuit 1604. The synchronous demodulator contains diodes 1501, 1503, 1505, and 1507, resistors 1502, 1504, 1506, 1508, 1511 and 1512 and capacitors 1509 and 1510. Output of the synchronous demodulator is on buses 1513 and 1514. This output will be the envelope of the signal coming through transformer 1412, but the polarities of buses 1513 and 1514 will depend on the relation of the phase of the signal to that of the clock.

During this cycle the clock signal is brought to the centertap of the secondary of transformer 1412 by bus 2409. The recorded clock frequency is picked up by head 1605 and amplified by amplifier 1607 and tubes 1601 and 1602. Transformer 1603 is in the plate circuit of tube 1602 and therefore the amplified clock frequency appears on its secondary on bus 2435. Relay 1518 is operated as explained in the section describing operation of manual controls, so that bus 2435 is connected to bus 2409, the centertap of transformer 1412.

As an example illustrating the operation of the synchronous demodulator, assume that the signal on the secondary of transformer 1412 is such that bus 2407 is in phase with the clock on bus 2409 and therefore bus 2408 is out of phase with bus 2409. When the voltage on bus 2409 is positive then the voltage developed by transformer 1412 between centertap 2409 and output bus 2407 is positive and therefore the voltage on bus 2407 with respect to ground is positive and equal to the sum of these two voltages. As stated previously, the voltage developed across the secondary of the transformer at this time is such that the voltage on bus 2408 is negative with respect to that on bus 2409. Thus the voltage between bus 2408 and ground is equal to the difference between these two voltages. The amplitude of the clock on bus 2409 is made to be larger than the maximum signal that will be induced across one half the secondary of transformer 1412. Therefore with the assumptions made above, the signal on bus 2408 will be positive with respect to ground but smaller in amplitude than that on bus 2407. Reference to FIG. 15 shows that bus 2407 has a path through diode 1501 and resistor 1502 to bus 1513 and one side of capacitor 1509. Bus 2408 has a path through diode 1503 and resistor 1504 to this same point. Diode 1501 has its anode connected to bus 2407 and therefore when bus 2407 is positive the diode presents minimum impedance to current flowing from bus 2408 to capacitor 1509. Thus in this example the main current flow will be from bus 2407 through diode 1501 and resistor 1502 to capacitor 1509 and will charge the capacitor so that bus 1513 is positive with respect to ground.

There is a path from bus 2407 through diode 1505 and resistor 1506 to bus 1514 and capacitor 1510, but diode 1505 has its cathode connected to bus 2407 so that only a negligible amount of current will flow through this path when bus 2407 is positive. The path from bus 2408 through diode 1507 and resistor 1508 to bus 1514 and capacitor 1510 will pass current when bus 2408 is positive and therefore under assumed conditions at this time capacitor 1510 will be charged so that bus 1514 will be positive. Since the voltage on bus 2407 is larger than that on bus 2408, the voltage on bus 1513 will be larger than that on bus 1514.

During the next half cycle when all polarities reverse, buses 2407 and 2408 will both be negative but again bus 2407 will have the larger amplitude because it is in phase with the clock on bus 2435. Bus 2407 will conduct through diode 1505 and resistor 1506 and charge capacitor 1510 negatively more than it was charged positively during the previous half cycle. The negative voltage on bus 2408 will cause current to flow through diode 1503 and resistor 1504 and tend to charge capacitor 1509 negatively but will not be sufficient to overcome the positive charge accumulated during the previous half cycle.

As long as bus 2407 is in phase with the clock on bus 2409, then bus 1513 will be positive and bus 1514 will be negative with respect to ground. When bus 2408 is in phase with bus 2435 then the diodes are arranged so that bus 1514 will be positive and bus 1513 will be negative.

The time constants of capacitor 1509 and resistor 1511 and that of capacitor 1510 and resistor 1512 are such that the envelope of the signal coming through transformer 1412 appears on buses 1513 and 1514.

Another output of transformer 1603 is bus 2436 which is connected through contacts of relay 1518 and over bus 1517 to the junction of resistors 1515 and 1516. These form a path for injecting the clock frequency on buses 1513 and 1514 which will buck out the unwanted clock frequency that gets through from bus 2409 when there is no signal coming through transformer 1412.

Contacts of relay 1518 now connect bus 1513 with bus 2437 and bus 1514 with bus 2438 and these in turn connect to multiplier quad 1604. The other input to the multiplier is the clock frequency on bus 1609. Bus 2404 is the output of multiplier quad 1604 and is the clock modulated by the envelope of the signal.

The signal on bus 2404 is connected through contacts on relay 1406 to bus 2402 and from there through resistor 2026 to the summing point of amplifier 2024.

Another input to the summing point of amplifier 2024 is from bus 2406 through resistor 2027. FIG. 14 shows that bus 2406 is the bias frequency output of oscillator 1422.

The above discussion has shown that the two input signals to amplifier 2024 produce now $G(t)+\Delta G_1(t)$ or the new G-function, further combined with the recording bias. As previously explained the output of amplifier 2024 is now connected to one end of head 2030 and therefore the new G-function will be recorded on the track of head 2030. The other end of head 2030 has a path to ground through the contacts of relay 2009, bus 2044, and on through resistor 2021. From the junction of resistor 2021 and bus 2044 there is a path through resistor 2025 to the summing point of amplifier 2024. This is a current feedback path which will tend to make the wave form of the current in the recording head follow more closely the voltage wave form of the input signal.

This process of generating and recording a new corrected G-function will continue until the end of this cycle.

*Second teaching cycle*

General

In this cycle the F-function and the old G-function are erased by connecting the heads of their tracks to an output of oscillator 1422.

Control circuit operation at beginning of cycle

The fiducial mark which causes the change from the first to second cycle occurs at the time represented by the vertical line labeled $B_2$ on the timing diagram, FIG. 25. It actuates delay-flop 2220 and results in a pulse on bus 2433, in the same manner as described in a previous section. Reference to FIG. 22 shows that bus 2433 is connected to the E input of flip-flop 2235. The C priming input of flip-flop 2235 is connected to the B output of flip-flop 2236 on bus 2415 which carries a signal at this time. Therefore this pulse on the E input forces flip-flop 2235 to the B state.

The B output of flip-flop 2235 on bus 2427 is connected to the E' input of flip-flop 2236 and will return flip-flop 2236 to the A state at this time. The controls of relays 2023 and 1710 are connected by bus 2415 to the B output of flip-flop 2236 and consequently they will now return to their normal state. Relay 1432 will again ground the input of cathode follower 1433 and relay 2023 will disconnect the output of amplifier 2024 from bus 2043 and return it to the dummy load resistor 2022.

Bus 2427 is also connected to the contacts of switch 2039 as shown in FIG. 20 and this switch is closed in normal operation.

On the other side of switch 2039, one connection is bus 2410 which goes to the control of relay 1427 as shown in FIG. 14. Another connection is through a resistor to the base of transistor 2038. The collector of transistor 2038 is bus 2416 which, reference to FIG. 14 shows, is connected to the control of relay 1420. Bus 2416 also has a path through the coil of relay 2001, resistor 2002, diode 2003, and bus 2004 to contacts of switch 2018. Switches 2018 and 2017 are normally in the positions shown in FIG. 20, and provide a path from bus 2004 through the switches to a supply voltage.

As a result of the connections described above, relays 1420, 2001 and 1427 are energized when flip-flop 2235 is in the B state.

Erasing $F_1(t)$ from temporary storage

The previous section explained that relays 1427 and 1420 are operated during this cycle. Switch 1434 is normally in the state illustrated in FIG. 14. Reference to FIG. 14 will show that at this time there is a path from the erase output of oscillator 1422 on bus 1426 through relay 1427, bus 2411, switch 1434, and relay 1420 to one side of head 1421. FIG. 25 shows that relay 1419 is operated at this time. Therefore relay 1419 connects one end of head 1421 to ground and a path is provided for current to flow through the head. Sufficient current is provided by oscillator 1422 to erase the signal recorded during the first cycle of the identification process previously described.

Erasing the G-function

The 2411, carrying the erase signal output of oscillator 1422, is also connected to a normally open contact of relay 2001 as shown in FIG. 20. Since relay 2001 is operated at this time, bus 2411 will be connected to bus 2008 and this in turn is connected through contacts of relay 2010 to one end of head 2016. The other end of the head is connected through contacts of relay 2009 to bus 2007 and from there through contacts of relay 2001 to ground.

By means of these connections a path is established from the erase output of oscillator 1422 through head 2016 to ground. The data recorded in the track of this head will be erased in the same manner as that described in the previous section for head 1421.

Control operations at end of cycle

The erasing described in the previous sections will continue until the next fiducial mark causes it to stop and brings the drum to a halt. This pulse occurs at time labeled $B_3$ on FIG. 25 and results in actuation of delay-flop 2220 as have the previous fiducial marks.

FIG. 22 shows that the A output of delay-flop 2220 is on bus 2432 and one of its connections is to the E input of delay-flop 2227. The C priming input of delay-flop 2227 is energized at this time by the B output of flip-flop 2235 on bus 2427. Therefore delay-flop 2227 will be actuated at this time and its output on bus 2444 will go negative and stay negative for the duration of the delay-flop action.

Reference to FIG. 23 will show that line 2444 is connected through diode 2306 to the base of transistor 2305. As long as bus 2444 is negative this will prevent any start pulses from occurring on bus 2443, the collector of transistor 2305.

The negative going voltage on bus 2444 is differentiated by capacitor 2225 and resistor 2224 to produce a pulse on the base of transistor 2226. This in turn produces a pulse R on the collector of transistor 2226 and this is fed to the R inputs of flip-flops 2204, 2207, 2208, 2235, and 2237 forcing them all to go to the A state. The B output of flip-flop 2204 controls relay 2037 that of flip-flop 2207 controls relay 1707 and that of flip-flop 2235 controls relays 1420, 2001, and 1427. Therefore at this time all these relays are returned to their normal state.

The A output of delay-flop 2227 is connected to the E' input of flip-flop 2206 by bus 2213 as shown on FIG. 22 and will force flip-flop 2206 to the A state at the time delay-flop 2227 returns to normal. Relays 1708, 1710, 1418, 1417, and 1419 are controlled by the B output of flip-flop 2206 and will be de-energized and return to normal at this time. Relays 1817 and 1816 are controlled by the A output of flip-flop 2206 and they will now be energized.

When relay 2037 returns to normal it opens the connection between bus 2035 and ground. This breaks the current path to ground of the solenoid of relay 2011 which has been connected through its own contacts to bus 2033 and diode 2034 to bus 2035. Relay 2011 will then return to normal and this opens the ground return paths of relays 1406 and 1518 and allows them to return to normal.

Bus 2035 is also in the ground return path of solenoid 1902 as has been described in a previous section. When bus 2035 is removed from ground current no longer flows through solenoid 1902 so it is no longer able to hold cam-follower 1904 up and operate switch 1906. However, cam-followed 1904 will be held up by cam 1905 until the rotation of the cam brings the detent under cam-follower 1904 and this allows the follower to drop. Switch 1906 will then return to its normal position.

Returning switch 1906 to normal breaks the path from solenoid 1903 through diode 1911, bus 1910 and the contacts of switch 1906 to ground. Solenoid 1903 no longer has current through it and therefore will no longer force the motor to engage and drive the drum in the manner described in a previous section. Solenoid 1903 also no longer holds switch 1907 closed. When switch 1907 was closed it provided a path through resistor 1929 to +48 volts which allowed a charge to accumulate on capacitor 1908.

At the time switch 1906 returns to the normal position it establishes a path for capacitor 1908 to discharge its current through solenoid 1909 and the contacts of switch 1906 to ground. Solenoid 1909 forces brake 3311 against cam 1905 during the time current is flowing and halts the drum.

At this time the drum is halted and all control flip-flops are in the A state. In the preceding description it was assumed that switch 2013 was open as shown in FIG. 20. The operator will now close it. Since relay 2011 is in the normal state as illustrated in FIG. 20, there will now be a path from the solenoid of relay 2010 through bus 2042, the contacts of relay 2011 and the contacts of switch 2013 to ground. Relay 2010 will now be operated and its contacts and buses 2014 and 2430 will provide current paths that will operate relays 2009 and 2103. Operating these relays switch the functions of heads 2016 and 2030 so that the next time the machine is operated the G-function is now read from the track of head 2030 and a newly generated G-function will be recorded on the track of head 2016. This is just the reverse of the purposes the tracks were used for in the preceding description. At the next time the machine comes to a halt after being taught, switch 2013 is again operated and relays 2010, 2009, and 2103 return to normal. In this manner the roles of storing the G-function and receiving the new G-function alternate between the tracks of heads 2016 and 2030.

Relay 2103 controls the signal path of the G-function between amplifiers 2005 and 2105. When the G-function is picked by head 2016 the path is through potentiometer 2101 and when it is picked up by head 2030 the path is through potentiometer 2102. This provides an independent amplitude control of each G-function source to compensate for differences in output of tracks and heads.

Reference to FIG. 16 shows that one end of the solenoid of relay 1606 is connected to +48 volts and the other end through diode 1611 to bus 2429. Reference to FIG. 20 shows that when relay 2010 is operated it connects bus 2429 to bus 2428. It is also shown that bus 2428 is connected to normally open contacts of relay 2011 and when that relay is operated it connects bus 2428 to ground. As a result of these connections, when relays 2010 and 2011 are both operated then there will be a path from +48 volts through the solenoid of relay 1606 to ground. The orientation of diode 1611 is such that current will flow and the relay will be operated. As shown in FIG. 16, operation of relay 1606 reverses the connections to head 1605 and this reverses the phase of the clock picked up by the head. Therefore a G-function is recorded on the track of head 2016 with the clock carrier in one phase and on the track of head 2030 with the opposite phase.

OTHER MODES OF OPERATION OF SYSTEM I

General

The preceding sections have described the operation of the machine when it is performing the normal functions it was designed for. Many switches are provided by which the operator can cause it to deviate from normal operation and these will be described in this section.

Manual start and inhibit start

The machine can be manually started by pressing pushbutton switch 2202 which as FIG. 22 shows will connect the E input of flip-flop 2204 to −10 volts and thus force the flip-flop into the A state. This starts the machine on the sequence of operations.

Manual reset

The switch for manually resetting the control flip-flops is shown in FIG. 22. Pushbutton switch 2240 grounds bus 2239 which causes a negative going signal to appear on the E' input to delay-flop 2227 and actuates it. The output of delay-flop 2227 is an input to transistor 2226 and produces the R pulse on its collector which resets the flip-flops in the same manner as described in the section discussing the control operations at the end of the second teaching cycle.

Forced restore

After observing the results at the end of the identification process, the machine operator may decide not to teach the machine. He may cause the machine to go into the erase cycle and halt by pressing pushbutton switch 2229 and holding it closed until the next fiducial mark produces a pulse on bus 2217. This pulse will actuate delay-flop 2220 whose output on bus 2432 is connected to switch 2229. In the closed position switch 2229 shorts out resistor 2228 and this permits a sufficient amount of the pulse on bus 2432 to be transmitted through capacitor 2230 to the H input of flip-flop 2235 to force it into the B state. Putting flip-flop 2235 in the B state starts the same sequence of events as described in the section discussing control operations at the beginning of the cycle in which erasing takes place and the machine continues through this cycle and halts in the same manner as previously described.

Identify only

Should the operator desire to use the machine for identification only he can cause the machine to begin an erase cycle immediately following the identification process by placing switches 2018 and 2233 in positions opposite to those shown in FIGS. 20 and 22. These switches are physically joined to operate at the same time, but are drawn separately for clarity. Operating these switches will cause a change in the sequence of events shown in FIG. 25. The machine will now go from A₂ directly to B₂, omitting the intermediate steps.

As shown in FIG. 22, the B output of flip-flop 2208 on bus 2431 is connected to the C priming input of flip-flop 2234 when contacts of switch 2233 are closed. Thus flip-flop 2234 will be primed at the time flip-flop 2208 is put in B state, which FIG. 25 shows is at time A₂. The delayed output of delay-flop 2220 following A₂ is on bus 2432 which is shown connected to the E input of flip-flop 2234 and forces it into the B state at that time. Bus 2232 connects the B output of flip-flop 2234 through capacitor 2231 to the H input of flip-flop 2235 so that flip-flop 2235 is forced into the B state at this time. The state of flip-flop 2235 causes the machine to erase and halt in the same manner as described in connection with the second teaching cycle.

FIG. 20 shows that when the contacts of switch 2018 are open there is no longer a path from buses 2019 and 2004 through switch 2017 to the voltage supply. This prevents any current flow through the solenoids of relays 2001 and 2023 and therefore they cannot be operated.

Relay 2001 must be operated to erase the G-function as described in the second teaching cycle, and relay 2023 must be operated to write the G-function. Thus there can be no writing or erasing of the G-function in this mode of operation.

Preventing writing and erasing

Writing the F-function on head 1421 can be stopped by opening switch 1416 shown on FIG. 14. This breaks the connection between the output of writing amplifier 1415 and 1421.

Writing the G-function can be prevented by opening switch 2029 illustrated on FIG. 20. This will interrupt the current path through the solenoid of relay 2023 and keep it from operating. Opening either switch 2017 or 2018 will also prevent writing the G-function, but in addition will prevent erasing.

When the machine operator does not want the F-function stored on the track of head 1421 to be erased, he can place switch 1434, shown on FIG. 14, in the open position. Thus the erase signal which appears on bus 2411 cannot pass through switch 1434 and the contacts of relay 1420 to head 1421 as it would otherwise do in an erase cycle.

Manual erase

FIG. 20 shows that operating switch 2039 places −10 volts on bus 2410 and through a resistor to the base of transistor 2038. This produces the same effect on these circuits as a negative signal on bus 2427 and will erase the F- and G-functions in the same manner as described above.

Shortening identification process

There is a mode of operation possible in which the first and second cycles of the identification process are combined. That is the F-function is multiplied by the G-function at the same time it is recorded instead of waiting until the next cycle. This mode is selected by placing switch 2205 in the opposite state from that illustrated in FIG. 22. In this position the C priming input of flip-flop 2206 on bus 2211 is disconnected from the B output of flip-flop 2204 and connected to a negative voltage supply so that it is always primed. The output of flip-flop 2204 on bus 2212 is now connected through contacts of switch 2205 to bus 2221 and on through capacitor 2222 and diode 2223 to the input at the base of transistor 2216.

The controls of relays 1418, 1417, and 1419 on bus 2414 are now connected to the B output of flip-flop 2207 or bus 2420 instead of the B output of flip-flop 2206 on bus 2218.

Reference to FIGS. 14 and 22 will show that in this mode there is now a path from bus 1413 through resistor 1430 and bus 2417 to the contacts of switch 2205 and from there on through bus 2419 and the contacts of relay 1417 to the input of cathode-follower 1433.

As a result of the above connections, when the machine is started in the customary manner flip-flop 2204 is forced at that time into the B state and recording of the incoming function on the track of head 1421 takes place as has been previously described in a previous section. In addition the B output of flip-flop 2204 now reaches the input of transistor 2216 and produces a pulse on bus 2217 which triggers delay-flop 2209. The C input of flip-flop 2206 is now primed so when the delayed output of delay-flop 2209 reaches the E input of flip-flop 2206, it will be forced into the B state. Placing flip-flop 2206 in the B state de-energizes relays 1817 and 1816 and energizes relays 1708 and 1710 and also forces flip-flop 2210 into the B state and this, acting through bus 2413, will cause relays 1806, 1815, 1432, and 1428 to operate. These relays establish connections as described previously and these, in addition to the new connection from bus 1413 through switch 2205 to the input of cathode follower 1433, are all that is necessary for the machine to perform the tasks of the operating cycle as well as those of the input cycle.

The next fiducial pulse produced will have the same effect as the $A_2$ pulse described previously and the remainder of the sequence of the machine's operations will be the same with the exception that when flip-flop 2207 is forced into the B state at $A_2$ time its B output connection on bus 2420 is now connected through switch 2205 to bus 2414 and therefore relays 1418, 1417, and 1419 will operate at this time. These relays disconnect head 1421 from the output of writing amplifier 1415 and connect it to the input of cathode-follower 1433.

Manual fiducial mark

For testing purposes it is sometimes desirable to be able to manually step the control system through its sequence of operations. This can be done by throwing switch 1919 to the opposite position from that shown in FIG. 19 so that bus 2441 is disconnected from bus 1918 and connected to bus 1920. Operating pushbutton switch 1921 will connect capacitor 1922 to point 1923 and the capacitor will charge toward the potential of that point. When switch 1921 is released capacitor 1922 will discharge through resistor 1924 and produce a pulse on bus 1920 which will be transmitted through bus 2441, capacitor 2214, and diode 2215 to the base of transistor 2216 and produce a fiducial pulse on bus 2217.

Reducing error correction

In previous discussion a description was given of the operation of the machine in determining the error in the G-function during the identification process and that this error was reduced or eliminated in the learning process. For some applications it is desirable to introduce the parameter C during the learning process, as described elsewhere herein.

Switch 2112 shown on FIG. 21 provides control over the amount of correction made. Reference to FIG. 21 shows that switch 2112 can vary the path from bus 2425 to point 2113. In the position of the switch illustrated there is a direct connection, but in other positions of the switch the signal will go through a resistance capacitance combination. These resistances in addition to resistor 2106 form the input resistance from bus 2425 to the summing point of amplifier 2105 and therefore control the gain of the amplifier with respect to the signal on bus 2425. As was shown in previous discussion, during the learning process the amount of F-function to be added to the G-function to produce a new and correct G-function appears on bus 2425. The G-function is brought to the summing point of amplifier 2105 through resistor 2104 and the new G-function will appear at the output of amplifier 2105 on bus 2405. Therefore, inserting additional resistances between bus 2425 and the summing point of amplifier 2105 will cause the correction made in forming the new G-function to be less than that required to reduce the error to zero. The capacitance in shunt with these resistances are for making phase adjustments in the signal.

The extreme right hand position of switch 2112 connects point 2113 to bus 2114 which is connected to the automatic error correction circuit shown in FIG. 100 for adjusting parameter C. The operation of this circuit is described in another section. It takes the signal on bus 2425 and automatically attenuates the error signal to be used in correcting the G-function and places the attenuated signal on bus 2114.

Although this description is of a machine which learns to decide that any incoming signal is in one of several categories using one G-function, by storing additional G-functions and having appropriate circuits of the same type as used in System I, a machine can be constructed which will have a separate output for each G-function and these outputs can be interpreted as a unique code identifying a given input signal.

To this end, the System I machine has (FIG. 20) a plurality of G-function heads 2016 of which each registers with a separate G-function record track on the magnetic drum. Any one of the heads 2016 may be selected. By alternating, as described, during learning the roles of storing the G-function and receiving the new G-function between the tracks of heads 2016 and the track of head 230, and by using an even number of sample signals and appropriately manipulating the selector switch 2015, selected ones or all of the tracks for the separate heads 2016 can each have stored thereon a different G-function. Thereafter, by the described "identifying only" procedure, selected ones or all of those stored different G-functions may be separately utilized with the same incoming signal to provide the mentioned unique code. The incoming signal is not erased until it has been interacted with each of the selected ones of the stored different G-functions or with all of those stored G-functions.

SUMMARY OF SYSTEM I

To summarize the detailed description of System I given, the incoming sound signal is picked up by microphone 1401, amplified by amplifier 1402 and subjected to automatic gain control by circuit 1404. The presence of the sound signal at the output of automatic gain control circuit 1404 is sensed by a start circuit shown on FIG. 23 which then produces a signal which causes magnetic recording drum 3301 to begin rotating. During the first revolution of the drum the incoming signal is processed and the result recorded on the drum track associated with magnetic recording head 1421. This processing consists of detecting the envelope of the incoming signal with circuits including diode generally represented by 1519 and using the envelope signal to modulate a higher frequency clock signal obtained from the drum track associated with magnetic recording head 1605. The resulting modulated signal is recorded and is referred to as the F-function. During the second revolution of the drum two computations are made. The F-function is read from the drum by head 1421, squared by circuits including diodes 1705 and the squared value integrated over the duration of the function by circuits including amplifier 1709. The value of the integral at the end of the integration period at the output of amplifier 1709 is referred to as U. The F-function is also multiplied by circuits including quad 1803 with a memory function which has been previously recorded on a track of the drum associated with head 2016 or alternate head 2030 and is referred to as the G-function. The resulting product is integrated over the duration of the function by circuits including amplifier 1818 and the value at the output of amplifier 1818 at the end of the integrating interval is referred to as V. In finding the product, the F and G-functions are both compressed by taking the cube roots of these functions with circuits including amplifier 1720 and 2111, respectively, and the resulting signals are multiplied by circuits including quad 1803. This product is cubed by circuits including diodes 1809 and the result is the product F·G of the F and G-functions.

At the end of the second revolution of the drum, voltages proportional to the values of U and V are made available and are displayed to the operator on electrical meters 1712 and 1830, respectively. A voltage proportional to the $\sqrt{U}$ is obtained by manually adjusting calibrated potentiometer 1713 according to the reading of the meter 1712 which is proportional to the value of U. This value of the $\sqrt{U}$ is one of the three nominal values of B. The other two are $-\sqrt{U}$ and zero. The voltage proportional to $\sqrt{U}$ is an input to a unity gain amplifier 1827 whose output will then be proportional to $-\sqrt{U}$. The reading of meter 1830 indicates the value of V and it may be normalized with respect to the value of $\sqrt{U}$ by connecting, through switch 1828, the meter input to the voltage proportional to $-\sqrt{U}$ at the output of amplifier 1827, and adjusting variable resistor 1829 in series with the meter so that the meter reads unity. When this meter input is switched back to the output of amplifier 1818, which is a volage proportional to V, the meter will now show the ratio of V to $\sqrt{U}$.

After observing the reading of meter 1830 the operator decides whether or not to teach the machine. If the machine is to be taught then the operator throws switch 1821 according to the polarity of the desired result and this connects either $\sqrt{U}$ or $-\sqrt{U}$ to the input of amplifier 1822. Another input to this amplifier is the output of amplifier 1818 which has the value V and the output of subtraction amplifier 1822 is then the difference between V and B which is referred to as the error value $e$. A voltage equal to $e$ divided by U is obtained by having $e$ connected to calibrated potentiometer 1744 which is set according to the value of U read on meter 1712. A potentiometer 1733 is now set so that the ratio of the voltage on its slider to the voltage across the potentiometer is proportional to $e/U$. This is accomplished by connecting, through switch 1731, a reference voltage across potentiometer 1733 and connecting the slider to one side of meter 1748 whose other side is connected to the voltage equal to $e/U$. The potentiometer is now adjusted until the meter shows that its two inputs are equal and at this point the potentiometer is correctly set. The operator now presses button 2012 which causes a new G-function to be generated and recorded, beginning at the next time the drum passes its initial position. Switch 1730 connects the F-function or its negative to potentiometer 1733 whose ratio has been set to $e/U$ so that the signal on the slider of the potentiometer is proportional to $$F \cdot \frac{e}{U}$$

This signal is fed to one input of summing amplifier 2105 whose other input is the output signal of amplifier 2005 which output signal is the old G-function. The output signal of this amplifier 2105 is the sume of these two inputs and is the corrected G-function. This signal is passed through a synchronous demodulator circuit which includes diodes 1501, 1503, 1505 and 1507 and the result is used to modulate the clock frequency with circuits using quad 1604, and this modulated signal is recorded on the track of the drum associated with head 2016 or alternate head 2030. During the next revolution of the drum the F-function and the old G-function are erased by a signal obtained from oscillator 1422, and at the end of that revolution the drum is brought to a halt. This completes an operating and teaches cycle.

*Quad multiplier (FIG. 16)*

Quad multiplier 1604 shown in FIG. 16 is a typical example of a circuit frequently used in Systems I and II. It is of a type widely used by the electronic industry and the principle of its operation is well known. A discussion of the theory of operation may be found in the Institute of Radio Engineers Transaction on Electronic Computers, volume EC-6, No. 1, page 30, in an article by Erich S. Weibel entitled "An Electronic Analog Multiplier Using Carriers." Other similar references may be found on the subject.

*Cube root circuit (FIG. 17)*

One example of the cube root circuits used is shown on FIG. 17 and consists of amplifiers 1717 and 1720. The voltage at the circuit output on bus 2423 is to be the cube root of the voltage on the input, bus 1702. The relation between the current through a germanium diode and the voltage across it may be expressed approximately by the equation:

$$i = A(e^{aV} - 1) \tag{1}$$

where $i$=current, V=voltage, A=a constant, and $\alpha$=a constant.

This equation may also be expressed in the form of a series:

$$i = \left( A \alpha V + \frac{(\alpha V)^2}{2!} + \frac{(\alpha V)^3}{3!} + \cdots \right) \tag{2}$$

The equation of two diodes in parallel with the cathode of one connected to the anode of the other, as are diodes 1724 shown in FIG. 17, can be expressed as:

$$i = 2A \left[ \alpha V + \frac{(\alpha V)^3}{3!} + \frac{(\alpha V)^5}{5!} + \cdots \right] \tag{3}$$

It will be noticed that there are no even powered terms in this equation. Also, if $\alpha V$ is less than one then the terms in the series get smaller as the power of the term increases. In this cubing circuit the voltage is kept low enough so that $\alpha V$ is so small that all terms of order higher than the third may be neglected. The equation for the currents at the summing point of amplifier 1720 is:

$$\frac{V_1}{R_1} + 2A \left[ \alpha V_2 + \frac{(\alpha V_2)^3}{3!} \right] = 0 \tag{4}$$

where $V_1$ is the voltage on bus 1718, $V_2$ is the voltage at point 1722 and $R_1$ is resistor 1719. Amplifier 1717 has a gain of unity, so that the voltage on bus 1702 is the negative of the voltage on bus 1718. If the value of resistor 1753 is low in comparison with the impedance of diodes 1724, then the voltage at point 1722 may be expressed as:

$$V_2 = K_2 V_3 - K_1 V_1 \tag{5}$$

Where $V_3$ is the voltage on bus 2423, $-V_1$ is the voltage on bus 1702 and $K_2$ and $K_1$ are constants determined by the values of resistors 1721, 1723, and 1753. Substituting Equation 5 into Equation 4 gives:

$$\frac{V_1}{R_1} + 2A \left[ \alpha(K_2 V_3 - K_1 V_1) + \frac{\alpha^3 (K_2 V_3 - K_1 V_1)^3}{3!} \right] = 0 \tag{6}$$

which may be rewritten as:

$$\frac{V_1}{R_1} + 2AM(K_1, K_2, V_1, V_3, \alpha) + 2A\alpha^3 K_2^3 V_3^3 = 0 \tag{7}$$

It was found that values of resistors 1721, 1723, and 1753 could be adjusted to give values of $K_1$ and $K_2$ which made the term $M(K_1, K_2, V_1, V_3, \alpha)$ in Equation 7 negligible. In this case, Equation 7 becomes:

$$\frac{V_1}{R_1} = (2A\alpha^3 K_2^3) V_3^3; \quad V_3 = K_3 \sqrt[3]{-V_1} \tag{8}$$

where $K_3$ is a constant depending on A, $\alpha$, $K_2$ and $R_1$. Since $-V_1$ is the voltage on the input bus 1702 and $V_3$ is the voltage on the output bus 2423, the output voltage, is the cube root of the input voltage which was the result desired from this circuit.

*Squaring circuit (FIG. 17)*

The squaring circuit is shown in FIG. 17 and consists of potentiometer 1703, transformer 1704 and diodes 1705. The function of the circuit is to produce a current on its output, bus 1706, which is proportional to the square of the voltage input on bus 1702.

Potentiometer 1703 provides a method of adjusting the signal level of this circuit but is not necessary to achieve the squaring action.

Reference to FIG. 17 shows that the centertap of the secondary of transformer 1704 is grounded and each of the two secondary leads is connected to one of diodes 1705. Therefore the voltage impressed across one diode is equal in amplitude and opposite in polarity from that across the other.

In the discussion of the cube root circuit the equation of the current through a diode and the voltage across it was shown to be:

$$i = A \left( \alpha V + \frac{(\alpha V)^2}{2!} + \frac{(\alpha V)^3}{3!} + \cdots \right) \tag{1}$$

The current on output bus 1706 is the sum of the currents in diodes 1705. The equation of the sum of the current through two diodes having equal and opposites voltages across them is:

$$i = A\left[\alpha V + \frac{(\alpha V)^2}{2!} + \frac{(\alpha V)^3}{3!} + \cdots\right]$$
$$+ A\left[-\alpha V + \frac{(\alpha V)^2}{2!} - \frac{(\alpha V)^3}{3!} + \cdots\right] \quad (2)$$

$$i = 2A\left[\frac{(\alpha V)^2}{2!} + \frac{(\alpha V)^4}{4!} + \cdots\right] \quad (3)$$

If the voltage is small enough the terms of the series higher than the second order may be neglected, Equation 3 shows that this results in the output current being proportional to the square of the input voltage which is the desired circuit performance.

Cubing circuit (FIG. 18)

The cubing circuit is shown in FIG. 18 and consists of amplifiers 1811 and 1814, diodes 1809 and 1810, and resistors 1836, 1837, 1839, and 1840. Input is at point 1838 and the output is taken from point 1812. The circuit function is to produce a voltage at the output which is proportional to the cub of the voltage at the input.

As explained in the discussion of the cube root circuit, the equation for two diodes connected in parallel, as are diodes 1810 may be expressed approximately as:

$$i = 2A\left[\alpha V + \frac{(\alpha V)^3}{3!}\right] \quad (1)$$

where the voltage is kept low enough to neglect higher order terms.

Referring again to FIG. 18, the equation for the sum of the currents to be zero at the summing point of amplifier 1811 is:

$$2A\left[\frac{(\alpha V_1)^3}{3!}\right] + \frac{V_2}{R_1} = 0 \quad (2)$$

where $V_1$ = voltage at point 1833, $V_2$ = voltage at output bus 1835, and $R_1$ = resistor 1834.

This may be rewritten as:

$$V_2 = -2AR_1\left[\alpha V_1 + \frac{(\alpha V_1)^3}{3!}\right] \quad (3)$$

Now the equation for the sum of the currents to be zero at the summing point of amplifier 1814 is:

$$2A\left[\alpha V_3 + \frac{(\alpha V_3)^3}{3!}\right] - \frac{2AR_1}{R_2}\left[\alpha V_1 + \frac{(\alpha V_1)^3}{3!}\right] + \frac{V_4}{R_3} = 0 \quad (4)$$

where $V_3$ = the voltage at point 1838, $V_4$ = the voltage at output point 1812, $R_2$ is resistor 1840, and $R_3$ is resistor 1839.

If the value of resistance 1837 is made low in comparison with the impedance of diodes 1810, then the voltage at point 1833 is a portion of the voltage at point 1838 as determined by the relative values of resistances 1836 and 1837. This may be expressed:

$$V_1 = n \cdot V_3 \quad (5)$$

Substituting this into Equation 4 and rearranging gives:

$$\frac{V_4}{R_3} = 2A\left[\frac{R_1(\alpha n V_3)^3}{R_2 3!} - \frac{(\alpha V_3)^3}{3!}\right] + 2A\left[\frac{R_1 \alpha n V_3}{R_2} - \alpha V_3\right] \quad (6)$$

$$V_4 = 2AR_3\left[\frac{R_1(\alpha n)^3}{R_2 3!} - \frac{\alpha^3}{3!}\right]V_3^3 + 2AR_3\alpha\left[\frac{R_1 n}{R_2} - 1\right]V_3 \quad (7)$$

By adjusting the values of $R_1$ and $R_2$ so that:

$$\frac{R_1 n}{R_2} - 1 = 0 \quad (8)$$

the first order term in Equation 7 is eliminated.

This of course occurs when:

$$R_1 \cdot n = R_2 \quad (9)$$

Substituting Equation 9 back into Equation 7 gives:

$$V_4 = \left(\frac{2\alpha^3 A R_3}{3!}\right)(n^2 - 1)V_3^3 = KV_3^3 \quad (10)$$

where K equals the parenthesis terms which involve constants only.

As mentioned previously, the value of $n$ is determined by the choice of values for resistors 1836 and 1837. It must be less than unity.

Equation 10 shows that the voltage at the output of the circuit is proportional to the cube of the input which is the desired circuit response.

Reference to Equation 7 shows that the first and third power terms of $V_3$ are both present. The purpose of taking part of the signal from the input point 1838 and sending it through amplifier 1811 and back to the summing point of amplifier 1814 is to be able to cancel out the first power term of the signal which comes from point 1838 through diodes 1809 to the summing point of amplifier 1814. This could have been accomplished if a resistor had been used in place of diodes 1810. Reference to Equation 7 shows that both parts of the first power term of $V_3$ are multiplied by A and $\alpha$ the constants which are parameters of the diodes. If a resistor had been used in place of diodes 1810 only the term due to current through diodes 1809 would be multiplied by these constants. In practice it was found that temperatures affected the diode characteristics sufficiently so that if a resistor were used in place of diodes 1810 the first power terms could be cancelled out at one temperature but the resistor value would have to be readjusted if the temperature changed. It was found that by using diodes 1810 and by keeping diodes 1810 and 1809 at the same temperature, the first power terms would remain cancelled out over a large range of temperatures.

The cathode follower circuit shown in FIG. 26 is that represented by symbols 1433 of FIG. 14 and 2006 on FIG. 20 and is used in reading from the magnetic recording heads. The magnetic recording head 2601 and its shunting resistor 2602 are not part of the cathode follower but are shown here for completeness of description.

A signal induced into head 2601 is passed on to the grid of tube 2603, is amplified by tubes 2603 and 2604 and fed to the cathode follower stage of tube 2605. The circuit output is taken from the cathode of tube 2605 through capacitor 2606. Output is fed back through resistor 2607 to the cathode of the input stage tube 2603. This is a negative feedback connection which will tend to stabilize the gain of the circuit and decrease its output impedance.

Microphone preamp (FIG. 27)

FIG. 27 shows the circuit represented by symbol 1402 on FIG. 14 whose function is to amplify the signals from the microphone.

Input from the microphone is on bus 2701. The circuit has a conventional stage of amplification using tube 2702 which is followed by a cathode follower stage using tube 2703. Output is taken from potentiometer 2704 in the cathode circuit of tube 2703 through capacitor 2705. The potentiometer provides a means of adjusting the gain of the circuit.

Automatic gain control circuit (FIG. 28)

This circuit shown in FIG. 28 is connected between the microphone preamplifier and the rest of the learning machine and is represented by symbol 1404 on FIG. 14. Its function is to reduce the dynamic range of the incoming data. It does this substantially by taking an average function of the output signal over a period of time in which the action of gain control is to be effective. Such a function is $KS_0$, where K is constant and $S_0$ is the output signal RMS over the averaging period. Also, $S_0$ could be the integral of the absolute value of the output signal over the same period. Then $KS_0$ is subtracted from a constant C giving $C-KS_0$. The latter is multiplied by the RMS of the input signal $S_1$ yielding $$S_1(C-KS_0)=S_0$$

Solving this for $S_0$ gives $$S_0=\frac{CS_1}{1+K\cdot S_1}$$

The gain is $ds_0/ds_1$ and at $S_1=0$ the gain equals C, the maximum gain. As $S_1\to\infty$ the gain approaches zero, but then $$S_0\to\frac{C}{K}$$

and is nearly a constant output for large values of $S_1$, or the output changes very little then as $S_1$ increases. The output proper is the output signal of which $S_0$ is the RMS value.

Multiplying is done by multiplier quad 2805 which is the same type circuit as that illustrated on FIG. 18. The signal input comes in on bus 2801 to the primary of transformer 2802 and is connected from the secondary of that transformer to the multiplier by bus 2803 and 2804. The other input to the multiplier is on bus 2806 and 2807. FIG. 28 shows that the voltage on bus 2807 is controlled primarily by the amount of current flowing from ground through transistor 2809 and resistor 2817 to the —10 volt supply. In the same manner the current flowing from ground through transistor 2808, resistor 2818 and resistor 2819 to +10 volts determines the potential on bus 2806. The base of transistor 2808 is connected through resistor 2810 to the collector of transistor 2809. Therefore, the more current transistor 2809 conducts the more positive its collector and the base of transistor 2808 become and the more transistor 2808 conducts. The circuits are arranged such that when the voltage on bus 2807 moves in one direction the voltage on bus 2806 moves an equal amount in the opposite direction.

The output of multiplier quad 2805 is the centertap of the secondary of transformer 2802. It is brought out on bus 2811 and connected to the base of transistor 2812 through resistor 2820. Transistor 2812 is connected as a conventional amplifier stage and passes the signal on to the base of transistor 2813. This transistor is connected as an emitter follower and the output on its emitter is connected by bus 2821 through capacitor 2814 and diode 2815 to the base of transistor 2809. Capacitor 2816 is connected from the base of transistor 2809 to its collector.

When there is no signal present, transistors 2809 and 2808 are both cut off which makes the potential on bus 2806 at its maximum positive value and that on bus 2807 at its maximum negative value. Under these conditions any signal input to the multiplier will have its product at the output at a maximum and this signal will be passed through transistors 2812 and 2813 and on through capacitor 2814 to diode 2815. Diode 2815 is oriented in such a manner that the current passed through it will charge capacitor 2816 so that the voltage on the base of transistor 2809 will be negative with respect to that on the collector. This will cause transistor 2809 to conduct and this in turn will cause transistor 2808 to conduct. The effect of this is that the potentials on buses 2806 and 2807 both move toward ground by an amount proportional to the amplitude of the signal on bus 2821. As voltages on buses 2806 and 2807 move closer to ground, the multiplying factor is reduced and the product on bus 2811 is reduced. Thus the negative feedback reduces sig-nals according to their strength which is the desired effect.

FIG. 28 shows that the slider of potentiometer 2824 is connected through a capacitor to the base of transistor 2822. This is connected as a conventional amplifier and the circuit output is taken from its collector through capacitor 2823. Potentiometer 2824 provides a means of manual control of the output signal level.

*Relay driver circuit (FIGS. 29, 71)*

FIG. 29 shows the circuit used for controlling relays which is represented in other drawings by the symbol shown in FIG. 71. These illustrations show two input buses 2908 and 2909 which correspond to buses 7101 and 7102, respectively. In practice any number of inputs including one may be used, and any one of these can operate the relay.

Polarized relays are used, the holding coil is labeled 2902 and the actuating coil 2901. Current will always flow from the power supply through resistor 2903 and coil 2902 to ground. Any current which flows from the power supply through resistor 2904 and actuating coil 2901 to ground must pass through transistor 2905 or 2906. When both transistors are cut off the current through holding coil 2902 will hold the relay in its normal state. If either transistor has a negative signal impressed on its base the transistor will be heavily conducting and its collector will be close to ground potential. At this time there is more current through actuating coil 2901 than through holding coil 2902 because resistor 2903 has been chosen larger than resistor 2904. Coil 2901 overcomes the effect of coil 2902 and the relay is changed to its operated state. It will remain this way as long as the transistor is saturated. Diode 2907 limits the voltage swing which occurs when the current through coil 2901 is cut off.

Although this description shows the relay being actuated by either of two inputs, more inputs can be added by connecting a transistor for each input in the same manner as the two shown in FIG. 29. It is also possible to drive the actuating coils of two relays from a single transistor. The second relay is connected to the common junction of the transistor collectors in the same manner as the one illustrated.

*Flip-flop (FIGS. 30, 90)*

The circuit diagram of the flip-flops represented by the symbol illustrated in FIG. 90 is shown in FIG. 30. It is a saturated flip-flop of conventional type well known in the electronic industry.

Interconnection between transistors 3001 and 3002 insure that only one of them can be conducting at any one time. Transistors 3003 and 3004 are emitter followers whose inputs come from transistors 3001 and 3002 respectively. The output from the emitter of transistor 3003 is labeled A and is at approximately —5 volts when transistor 3001 is conducting and at +7 volts when transistor 3001 is not conducting. The output of the emitter of transistor 3004 is called B and similarly is +7 volts when transistor 3002 is not conducting and at —5 volts when it is conducting. In the description of the operation of the machine, the condition where A is at —5 volts and B at +7 volts is referred to as the A state and the converse condition where B is at —5 volts and A is at +7 volts is called the B state.

The basic flip-flop has two inputs for negative going pulses and each of these inputs is associated with a priming input. The pulse inputs are labeled E and E' and their associated priming inputs are labeled C and D respectively. For a pulse input to be effective, its priming input must have a signal. For example, a negative pulse on the E input will be differentiated by capacitor 3005 and resistor 3006 but will not drive the base of capacitor 3001 sufficiently negative to cut it off unless the priming input C provides a negative pedestal. In the control circuits a signal condition is —5 volts and a no signal condition is +7 volts. Since both must have a signal to be effective, the pulse input and its priming input form a type of AND-gate.

In the most common use of this circuit, the D priming input is connected to the B output and in fact this connection is assumed to exist unless the symbol representing the flip-flop specifically shows otherwise. When this connection is present, a pulse on the E' input will cut transistor 3002 off if it is conducting and of course will not affect the transistor if it is already cutoff. This will change a flip-flop in the B state to the A state, but will not change one already in the B state.

Another connection often made is from the C priming input to the A output. This is similar to the connection described in the preceding paragraph and in this condition a pulse on the E input will cause the flip-flop to go to the B state if it is in the A state and if already in the B state no change will occur. When this connection is made the flip-flop is called self-primed.

If additional inputs are required they may be added to either side of the flip-flop. An example of this is shown in FIG. 30 with the pulse input H and its associated priming input J. These are related to each other in the same way that E and C are but are independent of E and C. That is, if H and J simultaneously have signals, transistor 3001 will be cut off and the flip-flop forced into the B state even if E and C have no signals. The dotted line joining the J priming input to the A output indicates that this self priming connection may be made or not independent of any consideration of the C input.

The reset or R input is connected to the base of transistor 3001 through resistor 3007. R is connected to a bus which is normally maintained at −10 volts. When this is raised to a positive voltage, it raises the voltage on the base of transistor 3001 causing it to conduct and forcing the flip-flop into the A state. This is the method used for setting a group of flip-flops into the A state at the same time. If this feature is not desired, the input R is returned to the −10 volt supply.

*Delay flop (FIGS. 31, 91)*

FIG. 91 shows the standard symbol used for delay-flops and the circuit represented by the symbol is shown in FIG. 31. It is a conventional design of a type well known in the industry.

There are two outputs which are labeled A and B. In the normal state transistor 3101 is made conducting by the connection from its base through resistor 3103 to the +10 volt supply. The voltage divider action of resistors 3104 and 3105 connected between the collector of transistor 3101 to the −10 volt supply will bias the base of transistor 3102 sufficiently negative to cut it off when transistor 3101 is conducting. This causes output A to be at −5 volts and output B at +10 volts. When the delay-flop is activated these conditions are reversed.

The principal pulse input is labeled E and is associatd with a priming input labeled C. In the same manner as described for the flip-flop circuit, FIG. 30, a negative pulse on input E will cut transistor 3101 off if the C priming input is at −5 volts but will not be able to do so if C is at +7 volts. The voltage on the C input is used to govern the times when the delay-flop can be activated by a pulse on the E input. If transistor 3101 is cut off, transistor 3102 will start to conduct and this condition will exist for a time governed primarily by the values of capacitor 3106 and resistors 3107 and 3103.

Additional gated inputs may be connected as illustrated by pulse input H and its associated priming input J. These have the same relation to each other as do inputs E and C, but are independent of E and C. Unless otherwise shown C will be assumed connected to A.

Other pulse inputs shown are labeled E₁ and E₂. These inputs have no associated priming inputs and a pulse on either of them will activate the delay-flop.

*Output utilization circuits (FIG. 32)*

FIG. 32 shows an auxiliary circuit which may be employed to give the machine operator a visual display of the result of the learning process. The machine's output is called V and appears after time A₂ as a voltage on bus 2424, the output of amplifier 1822 shown in FIG. 18, as has been described in another section. Also, described elsewhere is the fact that the desired output of the machine is called B₁ and appears as positive and negative voltages respectively on buses 2421 and 1825 produced by a circuit shown in FIG. 24. Two indicator lamps are provided, one which lights when V is positive and the other when it is negative. Controls are provided which may be set so that neither light will go on unless the absolute value of V is greater than a predetermined portion of the value of B. In FIG. 32 buses 3225 and 3226 may be used for output utilization. Whenever the voltage goes from −10 to near ground on one or the other this fact will constitute a one-bit coded representation of an output state. A multiplicity of such coded outputs may be provided by having a set of parallel circuits of the type described above in connection with System I.

If the value of V is sufficiently large, the circuit will light lamp 3201 when V is negative and lamp 3202 when V is positive. The output value V is on bus 2424 and is connected to the base of transistor 3210 through resistor 3211 and also to the base of transistor 3213 through resistor 3212. The positive voltage value of the B input originates at the slider of rheostat 1713 as shown in FIG. 17 and is brought in on bus 2421. It is connected to the base of transistor 3210 through rheostat 3214, resistor 3215 and switch 3216. Since the B voltage on bus 2421 is always positive it will tend to bias transistor 3210 into a nonconductive state. If the V value on bus 2424 is sufficiently negative to overcome the effect of B and pull the base of transistor 3210 to a negative potential, the transistor will conduct. The emitter of transistor 3210 will then go negative and, as it is connected to the base of transistor 3205 through resistor 3208, will cause transistor 3205 to conduct when its base is at a sufficiently negative potential. Transistor 3205 is normally held at cut off by the connection from its base through resistor 3509 to the +10 volt supply. Indicator lamp 3201 is in the collector circuit of transistor 3205 and will light when that transistor conducts. Thus when the machine output value V is negative by a sufficient amount the lamp 3201 will light. The value of V with respect to B required to accomplish this can be controlled by adjusting rheostat 3214.

The negative voltage of B originates on bus 1825, the output of amplifier 1827 as shown on FIG. 18. It is connected to the indicator lamp circuits at point 3217 which is connected to the base of transistor 3219 through resistor 3218. Transistor 3219 is an emitter follower and its output is connected to the base of transistor 3213 through rheostat 3220, resistor 3221 and switch 3222. Since this connection is always a negative voltage, it will tend to bias transistor 3213 into conduction. If the V input on line 2424 goes positive it will begin to cut transistor 3213 off after it overcomes the effect of the voltage at point 3217. The collector of transistor 3213 is connected to the base of transistor 3206 through resistor 3223. As transistor 3213 conducts less its collector moves in a negative direction which eventually will make transistor 3206 conduct and light indicator lamp 3202. Thus a large enough positive V value will light lamp 3202. The value of the V value relative to the B signal necessary to accomplish this is controlled by adjusting rheostat 3220.

Switches 3216 and 3222 enable the operator to break the connections to the B values, and then lighting the indicator lamps will depend upon the polarity of the V value only and not upon its value relative to B.

Neither lamp nor utilization outputs 3225, 3226 is allowed to operate until the end of the identification process. This is achieved by using the signal on bus 2431, the B output of flip-flop 2208 shown in FIG. 22. This flip-flop is changed from the A to the B state at time $A_2$ so that bus 2431 changes from +7 volts to −5 volts at that time. Bus 2431 is connected through resistor 3207 to the base of transistor 3205 through diode 3204 and also to the base of transistor 3206 through diode 3203. When bus 2431 is at +7 volts the base of transistors 3205 and 3206 are held positive independent of the states of transistors 3210 and 3213. Therefore, neither transistor 3205 nor 3206 can conduct at this time which means neither indicator lamp can be lighted. When bus 2431 goes to −5 volts it is prevented by diodes 3204, and 3203 from affecting the voltage at bases of transistors 3206 and 3205. The indicator lamp circuits are then free to perform as described in the preceding paragraphs. Adjustment of rheostats 3214 and 3220 establishes the value of the range between 1303 and 1304 illustrated in FIG. 13; that is, it establishes the gap 1305 around zero 1306.

Oscillator (FIG. 35)

Oscillator 1422, which is represented by a block on FIG. 14, is the source of signals for erasing magnetic recordings and for providing a recording bias in accordance with standard practice in the magnetic recording industry. The detail of the circuit represented by block 1422 is shown in FIG. 35.

The circuits used are conventional electronic circuits. Tube 3501 is connected so as to oscillate at the desired frequency. Its output signal is connected to the grid of tube 3502 which acts as a driver amplifier and provides enough current on the output bus 1426 to accomplish the erasing. The secondary of transformer 3504 carries the same signal frequency and is connected to the grid of tube 3503. This tube is connected as a cathode follower and the output from its cathode, bus 2406, is connected as an input to the recording ampifiers.

Bus 1425 is connected to the junction of resistor 3505 and capacitor 3506 which is in the path joining the output of tube 3501 to the input of tube 3502. Reference to FIG. 14 shows that bus 1425 goes to relay 1428 and is grounded when the relay is actuated. Grounding the bus prevents the signal from reaching the grid of tube 3502 and consequently at that time no signal will appear on buses 1426 and 2406.

SYSTEM II (FIGS. 41 AND 78)

One form of the invention which utilizes features mentioned in the introduction such as normalization of signal duration, input sequence recognition, output sequence production, steering G's and other features is illustrated in simplified form in FIG. 41 and in more detailed block diagram form in FIGS. 36, 37, 38, and 39.

Input signals from the environment generated by suitable transducers are fed to buffer normalizer 4101 by bus 4102. The buffer normalizer performs several functions. It may or may not transform the input signal by a predetermined transformation designed to enhance differences between certain characteristics of signals and at the same time it may greatly reduce or eliminate certain other differences between input signals, depending upon the requirements. The buffer normalizer also acts as a temporary store of incoming signals in case the environment is presenting them at a faster rate than the machine can process them. It transforms input signals or signal segments of signal sequences into a normal signal of constant duration, and gives a signal on bus 4103 when the end of a sequence of input signals occurs. The buffer normalizer also provides normal signals at a relatively high rate of speed, compressed in time, and synchronized by the memory signals which occur at the same rate.

The normal signal from the buffer normalizer is transferred to a transformation circuit contained in block 4104 by bus 4105. If the normal signal is obtained from part of an input sequence, and is not the first member of the sequence, then the normal signal is transformed into a new signal called the derived signal by a transformation signal on bus 4106. The transformation signal is generated by the previous members of the input sequence in a manner already outlined and which will be detailed hereinbelow. If the normal signal on bus 4105 is not a member of a sequence, or if it is the result of the first member of a sequence, then the normal signal is not transformed by $T_{rk}(t)$ on bus 4106, or then it can be stated that $T_{rk}(t)$ is unity transformation leaving the normal signal unchanged, provided the mode of operation is not mode A.

In case the machine is operating in mode A, then a specific normal signal is held in the buffer normalizer until a sequence of output coded responses is produced corresponding to the specific normal signal. Such a specific signal may be from a single input signal, or it may be the last normal signal obtained from an input signal sequence in mode B. In mode A the specific normal signal is produced from temporary high-speed storage in 4101 by successive read-outs and such recovered normal signals are transformed by the transformation signal on bus 4106 each produced from a coded output signal generated in feedback control unit 4116 which is under control of the output register 4120. These latter units operate to produce the transformation signal $T_{rk}(t)$ for either mode A or mode B operation. $T_{rk}(t)$ carries sequence status. In mode B the cumulative sequence status of each signal segment of a sequence produces a $T_{rk}(t)$ which corresponds. In mode A a signal is held in the buffer normalizer and a series of coded output responses is produced which corresponds to the input signal. In mode A each succeeding $T_{rk}(t)$ differs, which is caused by the operation of a sequence status counter associated with the feedback control 4116 in which the counter is set at zero count when the first read-out of the normal signal occurs, and the count is stepped by one for each succeeding read-out. An end-of-sequence learned bit or code may be produced to stop the mode A sequence. For mode B an end-of-sequence signal may be obtained from the buffer normalizer 4101 on bus 4103 for both teaching and operating. The end-of-sequence may be learned for mode B, and in one adaptation a learned output code is produced which ends the sequence and starts a new mode. This is also true for mode A operation.

The normal signal transformed by the transformation signal $T_{rk}(t)$, as a function of time, is called the derived signal and appears on bus 4107. Such a derived signal is produced by a Q function which takes $$Q[T_{rk}(t), f^*_{r(k+1)}] = f_1^{(k+1)}(t)$$

for mode B, in which index $k$ identifies the ordered position in the input sequence which produces the signal and index $r$ identifies the signal class which is independent of the sequence status. For mode A the corresponding Q function is $Q[T_{rk}(t), f^*_r] = f_1^{(k+1)}(t)$. The index $r$ is fixed since there is one signal which is to produce an output code sequence of mode A, but index $k$ gives the output sequence status. In mode B a sequence of input signals produces one coded output. The last derived signal $$f_1^{(n)}(t) = F_1(t)$$

is called the applied signal in mode B and it is this latter signal which the machine uses to learn to produce the final output code to represent the entire input signal sequence. The previous derived signals will not produce codes which are transferred for output utilization under control of 4103 in teaching, and in operating under control of 4103, or learned control. During teaching the end-of-sequence bus 4103 permits the teaching code assignment in unit 4118 to cause learning by the final selected G-memories of the applied signal. Then feedback by 4116 on 4106 is stopped. Prior to the production of the applied signal on bus 4107, in B mode, the selection or steering G-memories are the ones that operate exclusively, in one adaptation of this invention.

Normalization scalars are computed from the derived signals on bus 4107 by the circuitry in block 4108. The scalars are the energy content $$\int_{t_1}^{t_2} (f_i^{(k)}(t))^2 dt = U_i$$

$\sqrt{U_i}$ and $-\sqrt{U_i}$ which are placed on buses 4109, 4110, and 4117 respectively. The scalars placed on buses 4110 and 4417 are selected by code assignment for each output bit assignment which is to be learned. There is a sequencer in the system to pick corresponding assignments and memory signals for each bit in the output range of bits. The sequencing means is not shown in FIG. 41. Teaching unit 4118 makes code assignments by connecting either 4117 or 4110 to bus 4124 for each bit of output response to be taught according to the assignments, or by placing zero voltage on bus 4124 derived from bus 4126.

The derived signals on bus 4107 are correlated by 4111 with the G-memory signals on bus 4113 which are obtained from the memory unit 4112. The correlation output value $$V_{ij} = \int_{t_1}^{t_2} F_i(t) \cdot G_j(t) dt$$

is placed on bus 4114 and applied to comparator unit 4115. The latter unit has gap control means around the scalar values on buses 4110 and 4117, and produces output digitalized response according to the comparison of the value of $V_{ij}$ in relation to the $\sqrt{U_i}$ and $-\sqrt{U_i}$. The digitalized responses of 4115 are applied via connections generally represented by 4119 to the output register 4120 which may include a shift register and output register. As the sequence of code pulses are applied from 4119 the output register becomes loaded with an output code which represents the input signal to the machine. Bus 4119 also operates the memory selector 4121 which, by means of the selection G-functions, selects final G-memories which are used in forcing the learned production of arbitrarily selected codes.

The feedback control unit 4116 receives the codes from the output register through buses generally represented by 4122. While in general any group or all of the output codes can be transferred to the feedback control 4116, in certain adaptations only those produced from the steering G's are transferred. Bus 4119 feeds into 4116 for those cases where certain specified output bits which occur immediately after the steering bits determines the next mode of operation. Bus 4119 feeds into teaching unit 4118 for such cases as when a code assignment is a self-assignment. That is, the machine teaches itself. In whatever sense an output bit is generated, with zero gap very small or absent in the comparator, in that same sense does the self-assignment teach or assign the code to be learned. This is the type of assignment used for steering G's but it may be used also for the final selected G-memories.

The output $V_{ij}$ on bus 4114 is applied to the G-memory corrector 4123, and $B_{ij}$ on bus 4124 is also applied thereto. A subtractor in 4123 computes $B_{ij} - V_{ij} = e_{ij}$. A divider divides $U_i$, received from bus 4109, into $e_{ij}$ and yields $e_{ij}/U_i$. A multiplier multiplies the quotient by $F_i(t)$, received from bus 4107, giving $$\frac{e_{ij}}{U_i} \cdot F_i(t)$$

A computer, to determine C proportional to the absolute value of the errors produced by a series of received signals, is included in 4123, and C is multiplied by $$\frac{e_{ij}}{U_i} \cdot F_i(t)$$

to yield $$C \cdot \frac{e_{ij}}{U_i} \cdot F_i(t) = \Delta G_{ij}(t)$$

as the adjusted error signal which is placed on bus 4125 and fed to the memory unit 4112 in which it is added to $G_j(t)$ to produce $G^*_j(t) = G_j(t) + \Delta G_{ij}(t)$ which replaces $G_j(t)$ in the memory.

Memory unit 4112 includes storage means of G-memory signal functions arranged preferably as shown in FIG. 78 in which those G's which have superscript $s$ are used for selection of other memory signals. All received input signals are correlated with $G^s$. In the correlation of all steering G's there is no gap around zero, so that all signals will cause either a positive or negative response $V_{ij}$. If a positive response is produced by $G^s$, then $G^s_1$ is selected, and any signal which causes such a selection is temporarily stored and applied, after retrieval from temporary storage, to $G^s_1$ for correlation. The output $V_{ij}$ can be either positive or negative, and either $G^s_{11}$ or $G^s_{10}$ will be selected accordingly, and the operation is continued in the same manner thereafter until one of the horizontal rows of G-memories has been selected. If $G^s$ had produced a negative $V_{ij}$ then $G^s_0$ would have been selected, and further similar operations would have caused the selection of any G-memory in the lower branches. In FIG. 78 the subscripts of G-memories in horizontal rows identifies the row itself while the numbered superscripts identifies the ordered position which a G-memory occupies in each row. The set of G's per row is called a final set of G-memories and any one of these sets produces forced classes of separated input signals.

Any final set of G-memories can learn to select any arbitrarily assigned digitalized output operation out of the entire number of possible output operations. Referring to FIG. 78, any G-function in a final set selects one or the other of the two possible states of a corresponding output bit. For example, $G^1_{001}$ selects the state of the first output bit, $G^2_{001}$ selects the state of the second output bit, $G^3_{001}$ selects the state of the third output bit, and so on up to $G^n_{001}$ which selects the state of the $n^{th}$ and last output bit. If $n=10$ there will be 1024 possible output operations. If $n=20$, there will be about $10^6$ possible digitalized output operations.

In the same manner $G^1_{000}$ or $G^1_{001}$ and so on, can select the state of the first output bit. Every G-function in any row can select that output bit which the superscript identifies. Once a row is picked all further selection is in that same row until a new operation starts. Referring to FIG. 78, it is preferred to utilize the G's with superscript three to select the state of the B mode bit which determines if an input sequence shall continue in B mode even when unit 4101 in FIG. 41 arrives at an end-of-sequence mark. Also, the G's which have superscripts one and two in FIG. 78 can be reserved preferably for the learned determination of the mode of operation into which the machine shall enter next. These can be modes A, B, and C, which will require three of the four possible states of the second and third bit. The fourth possible state can indicate that both modes A and B are permissible. All of the other bits from the fourth to the $n^{th}$ can be reserved for setting up the output utilization codes proper. The option of control in the range of all three gaps is preferred for the final set of G-memories starting with the fourth bit. Such gaps are referred to in connection with FIGS. 12 and 13.

The selection by the steering G's of a positive or a negative value of $V_{ij}$ can be learned in a manner such that one-half of the received signals preferably will give a positive output and the other half of all received signals will give negative response. Then $G^s$ will direct $P=\frac{1}{2}$ of all the received signals to $G^s_1$ and the other half to $G^s_0$. Of all the $P=\frac{1}{2}$ of the signals directed to $G^s_1$ one-half of these will be directed to $G^s_{11}$ and the other half to $G^s_{10}$ such that $G^s_{11}$ and $G^s_{10}$ each will actually receive one-quarter of all signals applied to $G^s$. In the same manner $G^s_{01}$ and $G^s_{00}$ each will receive one-quarter of the total applied signals. The signals received will be separate and distinct. That is, $G^s_{00}$, $G^s_{01}$, $G^s_{10}$, and $G^s_{11}$ in FIG. 78 each will receive input signals which are different from the signals received by any other member in the group.

Selection continues such that of all the signals received by $G^s_{11}$, for example, one-half are directed to $G^1_{111}$ and the other half are directed to $G^1_{110}$, and similarly for the other rows which start with superscript one.

Following the same type of operation which occurs for the last column of $G^s_{ij\ldots k}$'s, each row of G's constituting one final set of G-memories out of the eight sets shown in FIG. 78 receives one-eighth of the total number of signals applied to $G^s$ and the classes of signals received by each final set of G-memories are disjoint from those received by any other final set. Although this last property is present it is not absolutely necessary. The main condition is that each final set receives a small fraction of the total number of input signals and receives them consistently. That is, the same signals going into a certain set should not, at some other time, go into some other set. This requirement of consistency is intrinsic in the properties of the G-functions once learning of steering is established. The figure of $P=\frac{1}{2}$ which has been cited above for steering is not mandatory although preferred. Other fractions may be used, but this will distribute the signals into the final sets unevenly. While FIG. 78 shows eight rows of final sets, it is to be understood that any number of rows can be used actually such as 2, 4, 16, 32, and so on. If one row is used then steering G's are not needed. Other switching schemes for selection of the final sets may be used besides the binary selection scheme illustrated in FIG. 78. It can be arranged so that a set of $G^s$'s can generate a coded output with more than one-bit per selection stage such that each selection stage has access to a multiplicity of $G^s$'s in the next stage, and so on; or the final set can be selected in one step by a code with sufficient bits to cover the full selection range of all final sets.

The functional arrangement of the G-memories shown in FIG. 78 is applicable to unit 4112 illustrated in FIG. 41 in which the steering $G^s$'s are designated as Selection Memories and the set of G-memories is called the Selected Memories. The formula in block 4123 has assignment $B_{ij} = \pm \sqrt{U_i}$ in one form for the final set of G-memories in teaching. For the self-assignments in steering teaching one form of the assignment is the first-type of steering assignment $$B_{ij} = \pm W_{ij} \pm W_{ij} \cdot r \frac{PN_1 - N_2}{PN_1}$$

In this latter assignment $N_1$ represents the number of times, for example, in which $G^s$ has been used in teaching. $PN_1$ is $\frac{1}{2}N_1$ if $P=\frac{1}{2}$. $N_2$ represents the number of times that $G^s_1$ has been used if $G^s_1$ is the next actually selected G-function. It can be seen readily that if $PN_1-N_2=0$, then $G^s_1$ receives half of the signals applied to $G^s$. If $G^s_0$ were selected instead, $N_2$ would represent the number of signals which is received. If $N_2=PN_1$ then $B_{ij}=\pm W_{ij}$ and this is the same as the regular non-steering assignments, which means that no steering correction is needed. $N_1$ and $N_2$ signify respective counts when steering is directed between any two consecutive $G^s_{ij\ldots k}$'s such as $G^s_0$ to $G^s_{00}$, or $G^s_0$ to $G^s_{01}$, or between $G^s_{ij}$ to the G-memories with superscript 1 such as $G^s_{10}$ to $G^1_{101}$, for example. $W_i$ can be $\sqrt{U_i}$ or $$\int_{t_2}^{t_3} |F_i(t)| dt$$

and $r$ is a positive constant whose value is fixed and determines the relative weight of $PN_1-N_2/PN_1$. If $P=\frac{1}{2}$ and $N_2 > \frac{1}{2}$, then $PN_1-N_2/PN_1$ is negative and this means that the $G^s_{ij\ldots k}$ signal associated with $N_2$ receives too many signals. Since the sign on $W_{ij}$ is determined by self-assignment, whatever it may be, it is the same as the sign which directed the steering to the particular $G^s_{ij\ldots k}$ which produced the count $N_2$. If the sign of $V_{ij}$ is positive an upper $G^s_{ij\ldots k}$ has been selected, and with this, if the sign of $PN_1-N_2/PN_1$ is negative, then $B_{ij}$ will be less in value than $W_{ij}$, or $B_{ij}$ can be negative which means that the resulting assignment, because of steering, will cause the preceding $G^s_{ij\ldots k}$ to have added thereto an error function of opposite sign or less than the normal amount, depending upon $r$, to tend to cause the steering to go in opposite direction on future trials. The first-type of steering assignment $B_{ij}$ can be written as $$B_{ij} = \pm W_{ij} \left(1 + r \cdot \frac{PN_1 - N_2}{PN_1}\right)$$

If the sign of $V_{ij}$ is positive and $PN_1-N_2/PN_1$ is positive, then $B_{ij}$ will be increased in value over $W_{ij}$ and the preceding $G^s_{ij\ldots k}$ will have added an error function of value greater than the normal amount to cause more steering in the same direction. If the sign of $V_{ij}$ is negative a lower $G^s_{ij\ldots k}$ has been selected and the sign of $$PN_1 - N_2/PN_1$$

is negative, then $B_{ij}$ will be less in negative value than $-W_{ij}$, or $B_{ij}$ can become positive which means that the error function will be added to the preceding $G^s_{ij\ldots k}$ of opposite sign or less than the negative normal amount which ordinarily causes steering in that direction, thus tending to cause steering to go in the opposite direction on future trials. If the sign of $V_{ij}$ is negative with the sign of $PN_1-N_2/PN_1$ positive, then $B_{ij}$ will become more negative than normal thus tending to cause conditioning of the preceding memory to cause more steering in the same direction.

In the first-type of steering-assignment which is also a self-assignment, the number of degrees of freedom of any particular $G^s_{ij\ldots k}$ under consideration gives the maximum number N of classes of input signals into which the assignments place the signals. The normalized fraction $PN_1-N_2/PN_1$ is in a learning feedback loop forcing $G^s_{ij\ldots k}$ to move towards that position which makes this fraction equal to zero. This happens when $PN_1=PN_2$. There are then as many positive as there are negative self-assignments and they are regular ones; namely, $$B_i = \pm \sqrt{U_i} = \pm W_i$$

and each of the maximum number of N classes of signals have one of these assignments and the average signal in each class $\overline{F}_i(t)$ will give either $+\sqrt{U_i}$ or $-\sqrt{U_i}$ as a response depending upon the class. The N which represents classes has no subscript and represents a different concept from $N_1$ and $N_2$. Moreover, the number of responses which give $+\sqrt{U_i}$ equal the number which give $-\sqrt{U_i}$ in view of $PN_1=N_2$. In $G^s$ each class is large enough so that not more than N of them equals all of the signals. In $G^s_1$ or $G^s_0$ the maximum of N classes, with $P=\frac{1}{2}$, are $\frac{1}{2}$ of the size of the classes of $G^s$, on the average. In each of $G^s_{11}$, $G^s_{10}$, $G^s_{01}$, and $G^s_{00}$, the maximum of N classes are one-quarter of the size of the classes in $G^s_0$ and so on. The number of classes of signals giving a positive $V_{ij}$ multiplied by the size of each class is equal to the number of classes of signals giving a negative $V_{ij}$ response multiplied by the size of each such class. The size of a class is proportional to the total number of signals in the class which are applied as inputs to the learning machine over a period of time used as a reference interval of all classes. The fraction $$PN_1-N_2/PN_1$$

makes the feedback loop tend to move the changes of assignments in a linear manner with respect to $PN_1=N_2$; that is, the corrections in assignments are directly proportional to the negative of the errors of assignments. The statistical considerations previously discussed operate in this case in the same manner to move the memory causing optimum response near the average of the classes. This arrangement with the first-type of steering-assignment also reduces the squares of $e_{ij}$ to a near minimum. The first-type of steering-assignment could also have $\pm W_i = \pm A$, a constant or $\pm W_i = \pm 1$ if normalization of amplitude takes place in some other manner.

A second-type of steering assignment is $$B_{ij} = \pm W_{ij} \cdot r \cdot \frac{PN_1 - N_2}{PN_1}$$

in which the direction of correction is the same as in the first-type except that when $PN_1 = N_2$ then $B_{ij} = 0$. This means that the exact average signal in each assigned class gives zero response, and half of the signals in the class will give a positive $V_{ij}$ and the other half will give negative $V_{ij}$. This second-type will develop as many positive responses as negative ones but each forced class gives both polarities, whereas in the first-type of steering-assignment each forced class gives only one polarity of response. In the second-type, if the probability density around the mean of each class is high, a large number of signals would give a small response close to zero and this would be undesirable, but if the density is low around the mean, then the second-type would be satisfactory. The probability of getting exactly zero or near-zero response can be made low. The first-type of steering-assignment is preferred when the probability density turns out to be high around the means of the forced classes. Details for computing $N_1$ and $N_2$ and the fraction and other details of steering-assignment and control are contained in the descriptions given in connection with FIGS. 64, 65, and 66. In steering teaching it is often desirable to lower the parameter C manually. This can be done by disconnecting the source of AC power either 9929 of FIG. 99 or 10023 of FIG. 100, and then turning the knobs such as 9916 to the desired value of C. In steering teaching it is possible to force the directed classes of input signals into the N forced classes per stage in which the earlier steering stages represent certain gross categories of the respective signal classes, and in the later stages, with smaller forced classes, the categories would be subcategories of the previous classes which are further directed into further subdivisions of categories until the final set of G-memories arbitrarily forces the final coded outputs to the final N forced classes of signals.

In both of the above steering-assignments the ratio $PN_1 - N_2/PN_1$ is designated. It is possible to use also $PN_1 - N_2$ without the $PN_1$ as divisor. When $PN_1$ is used in the divisor the same value of the absolute steering error represents the same fractional deviation of the total count regardless of the count. After learning of steering has progressed to point where substantially adequate steering selection is made with many counts of input signals recorded, it is desirable not to change the memory if errors occur unless they represent a significant percentage of the total count. This is the reason for using $PN_1$ as divisor in the steering assignment ratio.

SYSTEM II (FIGS. 36, 37, 38, AND 39)

A more detailed block diagram of System II is shown in FIGS. 36, 37, 38, and 39, which illustrate certain optional features and other details not shown in the simplified diagram of FIG. 41.

Figure 36:
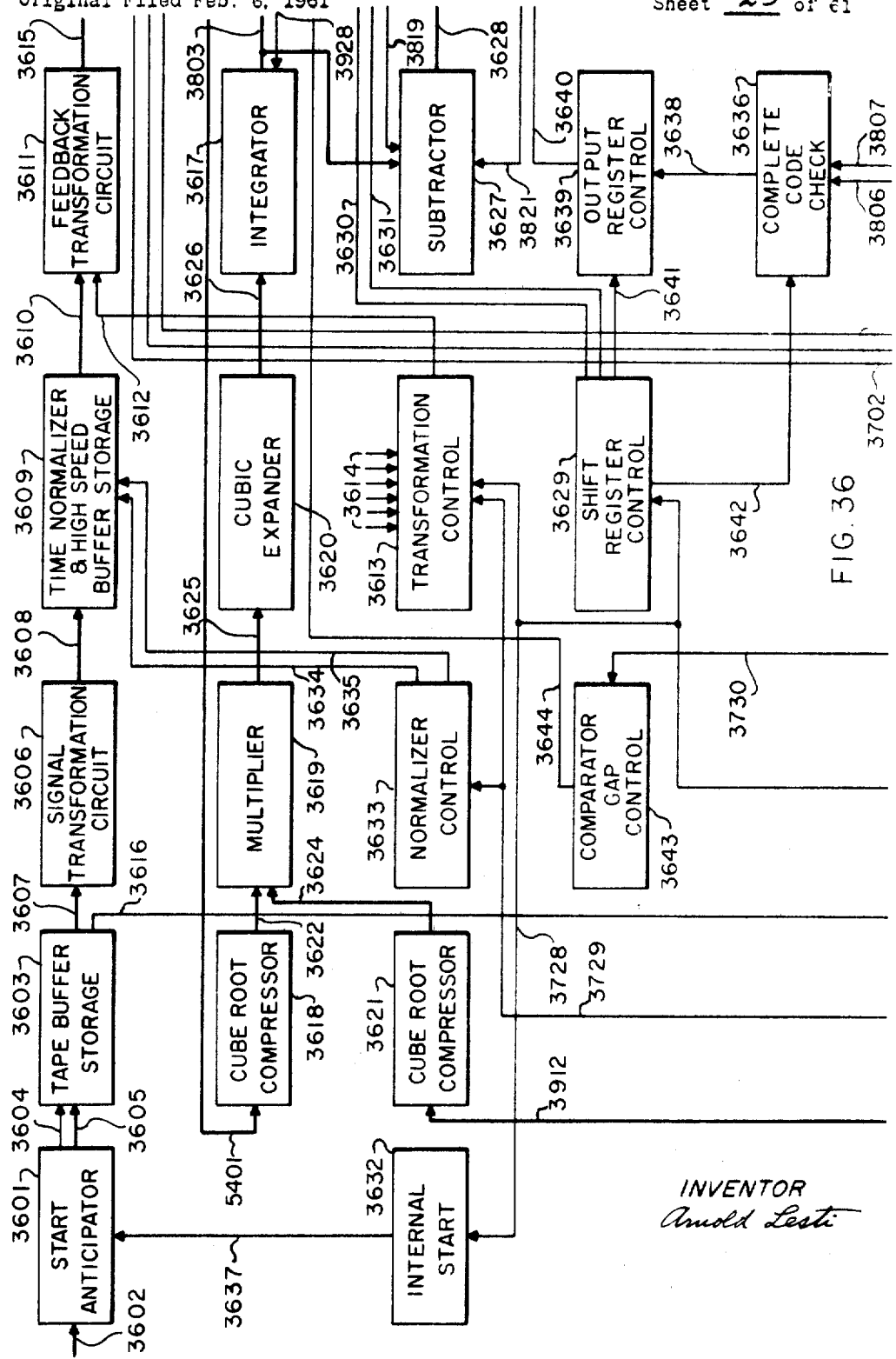
Figure 37:
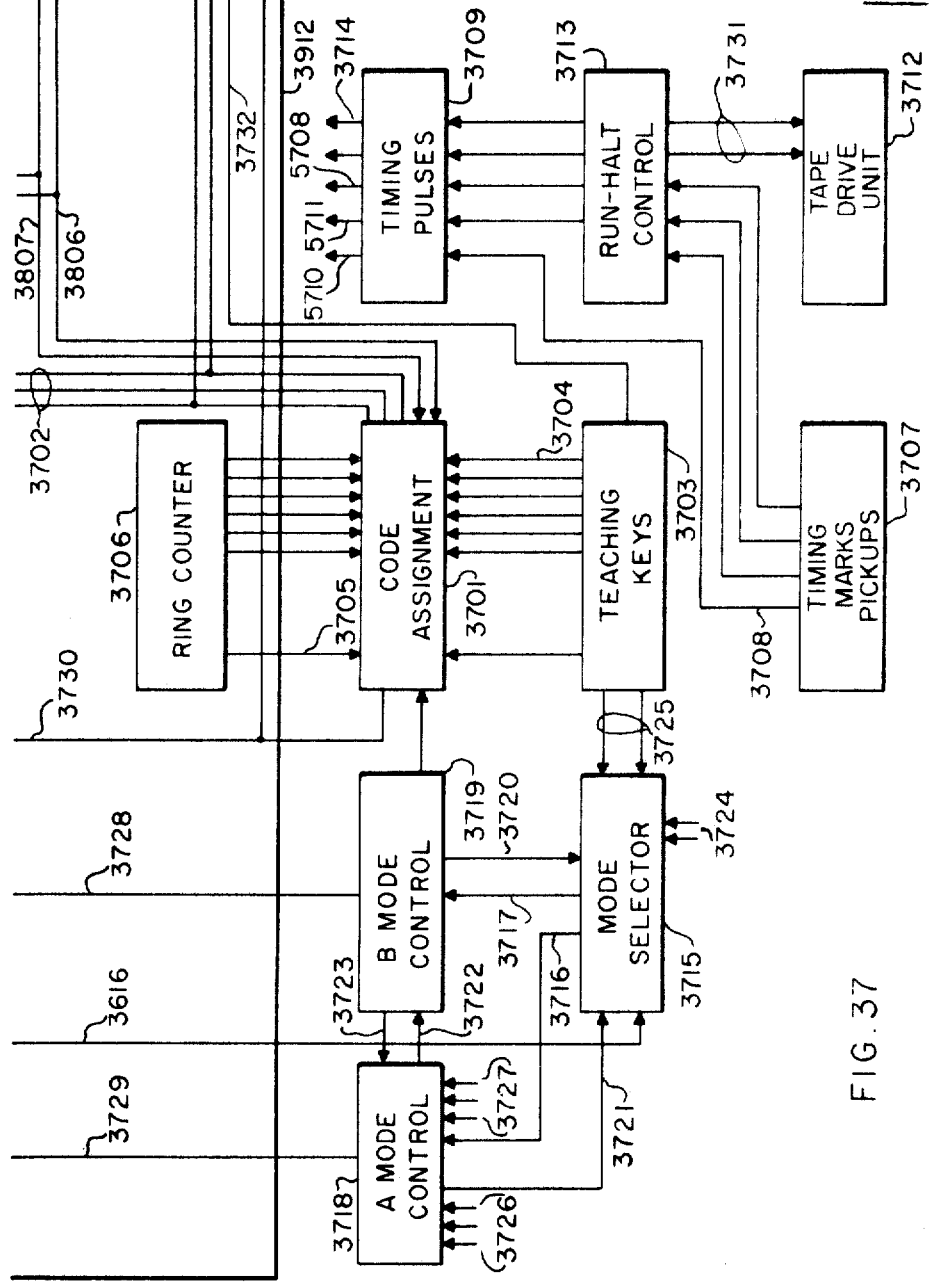

In FIG. 36, 3601 represents the start anticipator which stores and delays, by a small predetermined interval, any received input signal on bus 3602. A start circuit controls the start and stop of the input side of tape buffer storage unit 3603 through bus 3604, while the stored delayed signal is applied through bus 3605 after the tape buffer storage unit has had time to start, so that no portion of the received signals will be lost during the act of starting. Details on the start anticipator are given in connection with the description of FIG. 45.

The tape buffer storage unit 3603 stores signals, such as continuous speech into a magnetic tape which has a recording station head to record the signals received on 3605. The tape starts and stops at this station according to the presence or not of received signals. The tape moves from the recording station into a slack region and then into a reading station. The tape at the reading station is moved independently from the tape at the writing station.

When a read request is made, by circuitry not detailed in FIG. 36, the tape will move at the reading station and the recorded signals are read and delivered to the signal transformation circuit 3606 via bus 3607. If signals are fed into 3603 at a rate which is faster than the learning equipment can process them, the signals will be stored in the slack portion of the tape between the recording and reading stations so that there is no loss of input signals. As the learning equipment makes read requests the tape from the slack portion is moved past the reading station until all of the stored signals are read. An end-of-sequence mark is also generated by unit 3603 and placed on bus 3616. Details of this circuit are contained in the description given in connection with FIG. 46.

The signal transformation circuit 3606 consists of a cathode ray storage tube and associated circuits which stores the information received on bus 3607 at one rate and gives a succession of read-outs of the same signal at another rate, in one adaptation. In such an adaptation in connection with the processing of speech signals each of the read-outs is synchronized with an electronic switch which selects any one of a set of band-pass filters, in turn, to receive each read-out, without any significant delay between successive read-outs, regardless of the duration of the input signal. In response to one input signal on bus 3607, the output of unit 3606 on bus 3608 consists, in the case of speech signals, of a signal made up of a series of filtered and demodulated portions of the same signal whose duration is an integer multiplied by an interval of time which is proportional to the duration of the signal applied on bus 3607. In certain adaptations used for the recognition of images, the use of a cathode ray storage tube in 3606 may be eliminated and suitable filters and non-linear transformation circuits may be included. In the case of speech unit 3606 may be used with the above type of storage tube operation. The output of each band-pass filter is rectified and filtered so as to demodulate the envelope signals of the speech carriers, thus removing phase information of the carriers, but the information regarding the presence of carriers of different frequencies is preserved by the shift in time of each filtered signal. Details of block 3606 are contained in the description given in connection with FIGS. 47 and 48.

The signal on bus 3608 is applied to the time normalizer and high speed buffer storage unit 3609. There is a signal duration counter associated with 3606 and which receives a control signal from 3603, and which is utilized in 3606, and also by 3609. In the latter unit a second cathode ray storage tube is also utilized in which the writing rate of the signal from bus 3608 is constant, but the read-out rate of the stored signal is proportional to the duration of the signal and controlled by the duration counter. Let $s=$ distance of the recording area in the storage plate of the tube, and $W=$ the constant writing velocity. Let $d=$ the duration of the input signal and $K=$ a constant. Then $s=dW$, and $r=Kd$, where $r$ is the reading velocity which is proportional to the duration of the input signal. The constant K means that read-out is at a high speed. Then $$\frac{s}{r} = \frac{d \cdot W}{Kd} = \frac{W}{K} = t_1$$

a constant duration interval, since W and K are constants. The read-out is for a constant interval which covers the whole signal regardless of its input duration. That is, the signal is normalized with respect to time. The internal timing of the machine produces G-functions of the same duration interval $t_1$. When a G-functions starts, the read-out in unit 3609 commences, and there is a separate and distinct read-out for each separate G-function which is presented, and the signal will remain stored in 3609 until all G-functions with which the stored signal is to be correlated, have occurred. After that, the signal is erased from the second storage tube and the circuit is ready for another input signal. The first storage tube in 3606 has its stored signal erased only after the signal is completely read from it as many times as are necessary to go through each filter. The circuit in 3609 requests a signal from 3606 as soon as 3609 is through processing and has erased its signal. The same is true for the circuit in 3606 which requests signals from 3603. Unit 3609 is described in detail in connection with FIGS. 47 and 50.

In connection with the normalized interval $t_1$, if the second storage tube is read into at a rate inversely proportional to the duration and the read-out rate is constant, time normalization will be obtained also. Then, $$W = \frac{K}{d}, \quad s = W \cdot d = \frac{K}{d} \cdot d = K, \quad \frac{s}{r} = \frac{K}{r} = t_1$$

since now $r$ is a constant, $t_1$ is also constant and normalized.

If an input signal $f_1(t)$ is applied at 3602 then the output signal from the unit 3609 on bus 3610 is the normalized signal $f^*_{r(K+1)}(t)$. The latter is fed into feedback transformation circuit 3611. This circuit produces $$Q[T_{rk}(t), f^*_{r(K+1)}(t)] = f_1^{(K+1)}(t)$$

signal from signal $f^*_{r(K+1)}$ at bus 3610, and by pulses received from bus 3612. The pulses are utilized to produce $T_{rk}(t)$, and are obtained from unit 3613 which receives coded signals from the output untilization codes which appear on buses 3614. The $f_1^{(K+1)}(t)$ signal is the derived signal and is placed on bus 3615. One form of the derived signal is $$T_{rk}(t) f^*_{r(K+1)}(t) + \sqrt{f^{*2}_{r(K+1)}(t) dt} \cdot p \cdot T_{rk}(t)$$

which is obtained by two multipliers and an adder. Also, $T_{rk}(t) f^*_{(K+1)}(t)$ may be obtained alone, or the square-root term may be eliminated if the signal is normalized beforehand. The constant $p$ gives the amount of weighting to be placed on the $T_{rk}(t)$ term which carries sequence status information. Also, $H_{rK(+1)}$ may be substituted for $\sqrt{U_{r(K+1)}}$. Details for unit 3611 are given in the description of FIG. 54.

In those cases where the G-functions are stored in the form of analog signals with analog storage in a magnetic medium of tape or drum, for example, certain units shown in blocks 3801, 3618, 3619, 3620, and 3621 are used. The signal at 3615 is applied to modulator 3801 which has a carrier frequency derived from a clock track from the magnetic storage medium, and this modulator is a multiplier of the carrier signal and the $f_1^{(K+1)}(t)$ signal which results in a signal on bus 5401 as the carrier modulated derived signal which is ready to be applied to the learning equipment proper. Details of the type of modulator suitable for block 3801 are given in the description of FIGS. 14, 15, and 16.

The last derived signal in a sequence is called the applied signal. If there is only one signal in the sequence then it becomes the derived signal when it finally reaches bus 5401. These are designated as applied signals $F_i(t)$. All $F_i^{(K+1)}$ also appear on 5401 and are processed in the same general manner and may differ with respect to the G-memories which are used, gap control, and steering control. Let us then call the signal on bus 5401, $F_i(t)$ although it is understood that $f_1^{(K+1)}$ also appears here for processing.

$F_i(t)$ is applied to the cube-root compressor unit 3618 which produces $F_i^{1/3}(t)$. The circuitry for this type of unit is described for FIG. 17. Also, on bus 3912 the memory signal $G_j(t)$ appears, which is applied to cube-root compressor 3621, a detailed description of which appears in connection with FIG. 21, and which produces $G_j^{1/3}(t)$ and places this on bus 3624. $F_i^{1/3}(t)$ is applied to bus 3622. Both buses 3622 and 3624 are applied to multiplier 3619 which produces $F_i^{1/3}(t) G_j^{1/3}(t)$ in a manner as described in connection with FIG. 18. The output of the multiplier is placed on bus 3625 which delivers it to cubic expander 3620 which produces $[F_i^{1/3}(t) \cdot G_j^{1/3}(t)]^3 = F_i(t) \cdot G_j(t)$, and is described in connection with FIG. 18. The use of the multiplier inside of the compressors and expander system increases the dynamic range of the multiplier. The output of 3620 is placed on bus 3626 and applied to the integrator 3617 which is detailed in connection with FIG. 60, and produces $$\int_{t_1}^{t_2} F_i(t) \cdot G_j(t) dt = V_{ij}$$

which is applied on bus 3803. $V_{ij}$ on bus 3803 is applied to the comparator 3804. The latter also receives the steering feedback stabilizing signal on bus 3805 such as is described for FIG. 109 and bus 10909 therein. The comparator with gap control 3804 is described in connection with FIG. 56, and produces digitalized output signals on buses 3806 and 3807 whose state of response is mutually exclusive. Buses 3806 and 3807 feed into shift register 3808 which sets the parallel state of buses 3809 in accordance with each serial successive state of buses 3806 and 3807. Buses 3809 are fed to output register 3810 which sets the state of the output utilization bases 3811 in a parallel state of response similar to that of buses 3809 when they were sampled by control bus 3640. The output register 3810 will hold the digitalized state while the shift register is being shifted for the next coded output. Units 3804, 3808, and 3810 are described in detail in connection with FIGS. 56, 62, and 62 respectively.

$F_i(t)$ on bus 5401 is also applied to unit 3813 which computes $$U_i = \int_{t_1}^{t_2} F_i^2(t) dt$$

as detailed and described for FIG. 72. $U_i$ is placed on bus 3814 and fed to unit 3815 which computes $\pm \sqrt{U_i}$ and places $+\sqrt{U_i}$ on bus 3816 and $-\sqrt{U_i}$ on bus 3817. Unit 3815 is described in detail with FIG. 56. Buses 3816 and 3817 are applied to code selector 3818 in which there are analog gates under the control of code assignment unit 3701. The latter activates one of the three buses designated generally as 3702 to cause the selection by one of the analog gates of the required $+\sqrt{U_i}$ or $-\sqrt{U_i}$, or 0, in code selector 3818, according to the setting of the teaching keys in unit 3703 which applies control via buses 3704, or according to other criteria set manually or automatically, which include forced steering, automatic assignment of the B mode bit, which is the third bit of the final set of bits and such assignment is made in cooperation with the state of bus 3616, forced B mode bit, forced final codes, self-assignment of final codes, final forced bits for B mode feedback, final self-assigned bits for B mode feedback, and other conditions which are detailed in connection with the descriptions of FIGS. 102, 103, and 104. The assigned and selected voltages are applied to buses 3819 and 3820 such that if 3819 has assignment $+\sqrt{U_i}$ then 3820 has assignment $-\sqrt{U_i}$ and vice versa, and such that both buses may be assigned zero.

The assigned voltage on bus 3819 is applied to the subtractor 3627 which takes the differences $B_{ij} - V_{ij} = e_{ij}$ wherein $B_i$ is the $+\sqrt{U_i}$ or $-\sqrt{U_i}$ on bus 3819 according to the assignments which are determined by both the input signal $F_i(t)$ and the particular $G_j(t)$ memory which is involved in the assignment. Each index $j$ identifies a G-memory and a corresponding output bit response which it produces with a given $F_i(t)$ as identified by a specific index $i$. The subtractor 3627 also receives signal voltage on bus 3821 from steering selector ratio circuit 3849 for stabilizing the steering in accordance with the description for FIG. 109. When steering is involved $B_{ij}$ includes the steering assignments which are described in FIG. 109 and other sections herein. The subtractor 3627 is described in detail in connection with FIG. 60. The output of the subtractor is applied to bus 3628, and in one adaptation it is fed into unit 3823 in which the error parameter C is adjusted, at times when teaching is required as controlled by bus 3922, either manually, or automatically as described in FIG. 99 in which 3628 ties to 9927 and 9928 ties to 3824. Block 3823 may be dispensed with and 3628 can be tied directly to bus 3824. In that case the parameter C can be adjusted by inserting the control as set forth hereinbelow. If used, 3823 will deliver attenuated error value represented as $C \cdot e_{ij}$ on bus 3824 and thence to sample and hold #1 designated as 3825 which samples and holds $C \cdot e_{ij}$. The sampling is done at a time set by sampling control unit 3927 via bus 3926 which is at a time after a cycle of correlation is completed and $e_{ij}$ is determined. Shortly thereafter integrator 3617 is discharged by a control signal on bus 3928 from unit 3927. Then a new correlation is started and the error $e_{ij}$ from the previous one would be lost, except for sample and hold #1, 3825 which stores it for a cycle until the next sample pulse occurs on bus 3926. But slightly before the next sample pulse occurs on bus 3926 another sample pulse occurs on bus 3929 which causes sample and hold #2, 3831 to sample the voltage held by 3825 on bus 3830 and to thereafter hold it for a cycle and apply it to bus 3832. In this manner 3831 holds the $C \cdot e_{ij}$ which occurred a cycle ahead of the $C \cdot e_{ij}$ held by 3825. That is, if 3831 holds $C \cdot e_{ij}$ then 3825 holds $C \cdot e_{ij(j+1)}$ wherein $j$ represents a given cycle in which a $G_j(t)$ is correlated with a specific $F_i(t)$, and $(j+1)$ represents the next cycle in which $G_{(j+1)}(t)$ is being correlated by the same $F_i(t)$. The need for two sample and hold circuits arises in the adaptation in which there is a reading station in the memory utilizing movable magnetic media, and there is an erase station separated from the reading station by the distance required to store one G-function, such that if a decision is made to change the G-memory then it must be erased from conditioned storage which will take another cycle. After erasure the error function must be added to the G-memory signal recovered from temporary storage which was recorded into during the first read-out and correlation cycle. The recording of the corrected G-memory must then take place after another cycle in which $C \cdot e_{ij} = \Delta G_j(t)$ must be available, in the second cycle after the finish of correlation. Sample and hold #2 will hold the $C \cdot e_{ij}$ for the second cycle after correlation. Temporary $G_j(t)$ itself is held in temporary storage for at least two cycles before erasure. This requires the use of two sample and hold circuits and the further associated circuitry which will be described below in the present diagrams and in others in more detail. Units 3825, 3927, and 3831 are described in detail for FIG. 60.

Bus 3832 with $C \cdot e_{ij}$ is applied to the multiplier 3833 which is also supplied with $F_i(t)$ on bus 5401. The multiplier produces $C \cdot e_{ij} F_i(t)$ and delivers it to bus 6026 which feeds into divider 3835. The latter accepts $U_i$ from bus 3814 and divides it into $C \cdot e_{ij} F_i(t)$ to produce $$C \cdot \frac{e_{ij}}{U_i} F_i(t) = \Delta G_i(t)$$

which is placed on bus 6002.

Figure 38:
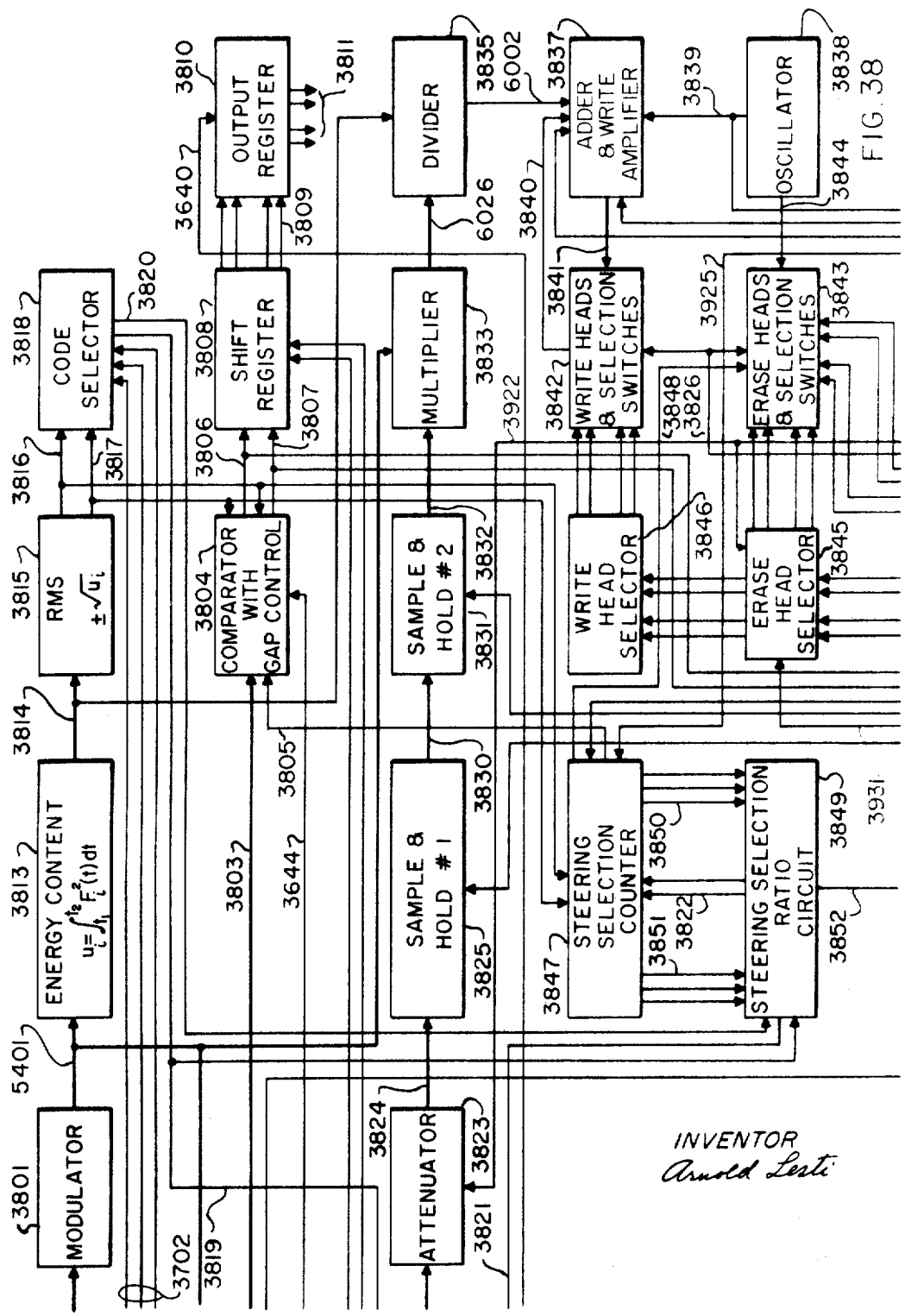

Bus 6002 is shown being connected directly to write amplifier and adder 3837 in FIG. 38. However, in another adaptation where unit 3823 is not used after the subtractor, and equivalent circuit described in FIG. 100 may be placed between units 3835 and 3837 to exercise control over parameter C, wherein bus 6002 is removed from 3837 and connected to 6002 in FIG. 100, and 10048 would be connected to 3837.

Unit 3837 is a write amplifier with current feedback via bus 3840 and a summing point into which bus 6002 is applied through a summing resistor. Oscillator 3838 is also applied to the summing point by bus 3839 into the resistor in 3837, to act as a bias frequency for recording. Another bus 3908 supplies $G_j(t)$ via another resistor to the summing point in 3837. This form of operation is for those adaptations in which analog recording is utilized on a movable magnetic medium. For digital recording of $G_j(t)$ certain modifications are used which will be described below.

On the temporary conditioned track, and in-line with the $G_j(t)$ writing heads, read head R', 3901 is positioned to pickup the temporarily stored $G_j(t)$ function and apply it to amplifier 3902 via bus 3903 as detailed in FIGS. 77 and 93. The amplified signal is placed on bus 3904 and applied to the synchronous demodulator 3905 which is of the type described in connection with FIGS. 14, 15, and 16, and which produces demodulated signals on bus 3906 having positive or negative polarity in accordance with the high-frequency phase of the $G_j(t)$ signal picked up by head 3901. The demodulated signals on bus 3906 are fed to modulator 3907 which is also supplied with the carrier or clock frequency picked up from the clock track in the magnetic memory. This modulator operates in a manner similar to unit 3801 and produces a reclocked or rephased carrier modulated $G_j(t)$ memory signal which is placed on bus 3908 and applied to unit 3837 which adds it to $\Delta G_j(t)$ to produce $G^*_j(t) = G_j(t) + \Delta G_j(t)$. The corrected signal $G^*_j(t)$ is placed on bus 3841 and applied to the selected head in unit 3842 which will write the signal into the memory section of the track which was erased in the previous cycle by a corresponding selected head in unit 3843 driven by bus 3844 and oscillator 3838 which supplies erase bias on that bus. In the cycle preceding the erase cycle, the corresponding selected head in unit 3909 read the $G_j(t)$ signal and aplied it to amplifier 3910 via bus 3911. In turn, amplifier 3910 placed the $G_j(t)$ signal on bus 3912 which was applied to compressor 3621 as previously mentioned. Also, 3912 feeds into write amplifier 3913 which is supplied by write bias on 3839, and the amplifier delivers write current to write head $W^1$, 3914 via bus 3915 with feedback bus 3916 for current feedback writing on the temporary conditioned track which is read two cycles later by R' head 3901. Units 3910, 3913, and 3914 are described in connection with FIG. 65. Read head R'', 3919 reads the temporary conditioned $G_j(t)$ signal on the temporary track in-line with the erase heads and applies the signal on bus 3918 and to the G-memory overload detector 3917 which establishes digitalized voltage on bus 3932 if there is an overload condition. Bus 3932 causes a change in the gain of amplifier 3837 if there is an overload condition. The overload detector 3917 is described in detail in connection with FIG. 61.

The output of the comparator and gap control unit 3804 on buses 3806 and 3807, along with the signals on the corresponding buses from the code assignment circuit are applied to read head selector 3920 in which there are relays or electronic switches to select the G-memories in accordance with the diagram of FIG. 78. While only three banks of $G^s$'s are shown in FIG. 78, a smaller or larger number may be used according to the requirements. The signals on bus 3732 cause the read head selector to permit the signals on buses 3806 and 3807 to select the read heads in operating mode and the signals on two of the buses 3702 to select the read head in teaching mode. The first three bits, as they are delivered successively on the selected pair of buses, will select the G-memories according to the code generated. The selection of the read heads in 3920 is necessary for the operating-mode and teaching-mode.

In teaching-mode the option exists to teach each $G^s_{ij\ldots k}$ memory bank separately. For example, $G^s$ can be taught by permitting, with a manually positioned switch, the correction of $G^s$ alone by causing the count of use of $G^s$ and the count of $G^s_1$ or $G^s_0$ to determine the correction needed for $G^s$. Similarly, $G^s_1$ may be taught to steer properly by setting a switch to permit the count of $G^s_1$ and the count of either $G^s_{11}$ or $G^s_{10}$ to be used to correct $G^s_1$, and the same setting of the switch will permit $G^s_0$ to occur and be corrected by the count of $G^s_0$ and the count of $G^s{}_{01}$ or $G^s{}_{00}$, whichever occurs. In the same manner the switch may be set to correct any vertical bank (FIG. 78) of $G^s{}_{1j...k}$ memories separately. Another manual setting may be made so as to cause the correction of all of the banks at any time.

When the read head selector is operated to select a specific read head then a corresponding erase head selector circuit is primed in erase head selector unit 3845. If a decision is made in teaching criteria unit 3921 that teaching is necessary, then bus 3922 is activated which causes the erase head selector primed in unit 3845 to actually cause selection of a corresponding erase head in 3843 by operating the corresponding switch in 3843 to cause the erase of the selected G-function one cycle after it has been read by the selected reading head in 3909 by 3920. If an erase head has been selected by 3845 and 3843, then a corresponding write head selector circuit in write head selector 3846 is primed, and in the next cycle after the erase cycle a corresponding write switch and head are selected in unit 3842 to cause the writing of $G^*{}_{1j}(t)$ on the erased track.

When the read head selector selects a specific read head, then the steering selector control unit 3923 is activated to cause the priming of a corresponding one of a set of delay circuits which hold for a short predetermined interval when they are operated. Each such circuit is connected to select a corresponding selection switch and erase head in unit 3843. Unit 3923 also transfers the selected read head for a short predetermined interval via bus 3924 which causes a transfer circuit to operate in 3909 to transfer the selected head temporarily on bus 3925 from 3911 and back to 3911 after the predetermined interval. Bus 3925 feeds into steering selection counter 3847 which has a shift register into which the digital code count of the number of times of use of the associated G-memory is placed. The code count is stored in the magnetic medium as a digital recording for a short space which is read on bus 3925 prior to the larger space which stores the associated G-function, which latter G-function is read on bus 3911 after the transfer by 3924 is finished at the end of the short predetermined interval of time. After the full reading of the G-function on bus 3911, the primed circuit in 3923 is activated to cause the corresponding selection switch in 3843 to select the corresponding erase head in the next cycle after the reading cycle. The selected erase head is no longer an erase head when selected by 3923 because there is a transfer switch in 3843 operated via bus 3826 which transfers the selected head from bus 3844 to bus 3848. Bus 3848 will have a digital number signal on it placed thereon by steering selector counter 3847 which has added a one to the count picked up during the reading on bus 3925. The digital count on 3848 is written on the segment of the track which occurs during the short interval in the first part of the next cycle after the reading of $G_j(t)$. After the termination of the short interval of writing the digital count the head is transferred from 3848 to 3844 which supplies erase bias, and the selected head is erased if required as determined by 3921 via 3922. Units 3920, 3845, and 3846 contain bi-stable flip-flops for control of selection and a detailed description of these circuits is given in connection with FIGS. 66, 67, and 68. Unit 3923 contains delay flip-flops or single stability flip-flops and the unit is described in detail in connection with FIG. 64. Units 3909, 3842, 3843 are described in connection with FIG. 65.

Buses 3819 and 3920, under control of code selector 3818 which is under further control by code assignment unit 3701, are fed to steering selector ratio circuit 3849 which receives $+\sqrt{U_1}$ and $-\sqrt{U_1}$ on buses 3819 and 3820 respectively or $-\sqrt{U_1}$ and $+\sqrt{U_1}$ respectively according to the assignments. If the assignment is self-assignment, the state of self-assignment can be determined through buses 3806 and 3807 applied to 3701 which, in turn, transfers the requirement on the appropriate bus of 3702 in digital form which sets the corresponding analog gate to transfer 3816 and 3817 directly on 3819 and 3820 respectively or 3820 and 3819, respectively, according to the assignment. Unit 3849 contains a subtractor and divider to compute $$\pm \sqrt{U_i} \cdot P \cdot \frac{PN_1 - N_2}{PN_1}$$

wherein the sign is determined by the sign of $\sqrt{U_1}$ on buses 3819 and 3820 which have the magnitude in opposite signs. Unit 3849, as detailed in FIG. 64, contains a digital-to-analog decoder wherein the counts of $\frac{1}{2}N_1$ and $N_2$ are applied as digital control of analog gates which pass $+\sqrt{U_1}$ and $-\sqrt{U_1}$ respectively, and $\frac{1}{2}N_1$ digitally controls the feedback path through weighted gates in the same amplifier. The digitally controlled buses for $\frac{1}{2}N_1$ and $N_2$ are designated respectively 3850 and 3851. The steering selector counter 3847 has an input shift register to receive the input coded pulses from the memory on bus 3925, a counter to which the contents of the shift register are transferred, and a final shift register to which the contents of the counter are transferred after one has been added to the count. The final shift register transfers its count in series to bus 3848 for writing onto the memory.

The steering selector 3847 has reference voltages applied thereto consisting of $+\sqrt{U_1}$ and $-\sqrt{U_1}$ on buses 3816 and 3817. There is stabilizing digital memory associated with the bits of the count on buses 3848 and 3925 and in the registers of 3847, and which utilizes one bit for plus and another for minus, in one illustrated adaptation detailed in FIG. 64, although more bits may be used. The stabilizing digital memory controls analog gates to transfer a weighted amount of either $+\sqrt{U_1}$ or $-\sqrt{U_1}$ from buses 3816 and 3817, according to the sign of the stabilizing digital memory which appears on the shift register of 3847. The resultant signal is applied to bus 3805 to the comparator for stability of teaching of steering. In the register of the stabilizing bits, which is transferred to the final shift register in 3847, the plus bits or the minus bits for the stabilizing are set up according to the sign of $$\pm \sqrt{U_i} \frac{PN_1 - N_2}{PN_1}$$

computed in 3849 and transferred to flip-flops in 3847 via buses 3822. This establishes the short term memory referred to in block 10908 in FIG. 109, which will be stored in the digital memory slot by bus 3848, and which will be retrieved at some later time when the same $G_j(t)$ function is used. Then it will appear in the input shift register of 3847. Unit 3847 is detailed in FIG. 64.

The steering selection ratio gap control circuit 3930 receives the error signal from 3849 on bus 3852 and if the error is less than a certain predetermined amount set in 3930 manually, then a signal is placed on bus 3931 to inhibit the erase heads and hence the write heads such that no correction of the memory can take place for learning of steering.

The code assignment unit 3701 receives timed pulses from a set of buses 3705 from the ring counter 3706 which is stepped by the P pulses derived from fiducial marks on the magentic medium of the memory and is reset at the proper time synchronized with the beginning of the first cycle of time in which the first appearing G-function occurs. The timing diagram is detailed in FIG. 79, while in FIG. 77 is shown the relative position of the various heads, and FIGS. 92 and 93 give the head layout and associated equipment applicable to System II. A detailed description of these figures is given in other sections of this specification. Timing marks pickup unit 3707 is detailed in FIGS. 57 and 58. This unit supplies the P pulses, the $P_0$ pulse which occurs after the last P pulses and is used to start the generation of the $$\int_{t_1}^{t_2} |F_i(t)| dt$$

signal for the signal transformation circuit prior to the production of the regular P pulses upon a receipt of a start signal, and the D pulse which is used to go home or finish a coding operation and is used on both the magnetic tape G-memory or the magnetic drum G-memory versions, and is used also for starting the main circuitry on the drum adaptation, but not for the tape version which uses a photoelectric pick-up device to sense the home position. Clock pulses are also delivered from 3707 on bus 3708 and delivered to unit 3709 in which clock pulses appear on bus 5708, while on bus 5711 appear pulses at a reduced rate synchronized with the clock for use on the digital G-memory version which utilizes a decoder and an encoder wherein the pulses on 5711 are the sampling pulses. Clock pulses also appear on 5710 with the sampling pulse missing. The run-halt unit 3713 contains a reset generator R to reset flip-flops in most of the other units when home is reached, and it gates out the regular train of P pulses starting with $P_1$ to $P_n$, wherein $P_1$ starts just after the D pulse. The tape drive unit 3712 is controlled from 3713 to run or to halt via buses 3713, in the tape G-memory adaptation. Units 3707, 3713, 3709, and 3712 are described in detail in connection with FIGS. 57, 58; 57, 58; 64, 57; and 93, respectively. The various timing pulses are generically represented by buses 3714 and are applied to various units of System II where required, although the buses of these and other standard timing pulses are not shown directed to all the units to which they connect in FIGS. 36, 37, 38, and 39 in order to avoid excessive details.

The comparator gap control 3643 is activated by code assignment unit 3701 via bus 3730 and functions to change the gaps of 3804 via bus 3644 when certain final G-memories are switched into operation. The same bus 3730 determines the operation of the teaching criteria unit 3921 under control of the code assignment 3701. The comparator gap control is described in detail in connection with FIGS. 56 and 103, while unit 3921 is detailed in FIG. 56.

The mode selector 3715 can be set manually for obtaining the various modes of operation of the machine. It activates bus 3716 to 3718 to make A mode permissible and it activates bus 3717 to B mode control 3719 to make B mode permissible. If B mode is operating, then bus 3720 is activated to prevent 3715 from changing the mode until mode B is completed, and if A mode is operating then bus 3721 is activated to prevent 3715 from changing until A mode is completed. If A mode is operating then bus 3722 is activated to prevent B mode from starting until A mode is completed. If B mode is operating then bus 3723 is activated to prevent A mode from starting until B mode is completed. The end-of-sequence mark on bus 3616 is applied to the mode selector circuit. This can be used to signify the end of a sequence or not depending upon the manual setting.

Buses 3724 are connected to the first and second bits of the final set of the output register to cause the machine to go into A, B, C, modes or A and B modes permissible by the code combinations on the two buses. These states are a learned production by the machine of the next state into which it will operate. During teaching, buses 3725 are used for setting up, by 3703, the particular codes which are to produce the desired next modes of operation.

In the A mode unit 3718, buses 3726 from the output register cause the end of an A mode sequence if a stop code is present on them. This stop code is decoded in 3718. It is a learned code. Buses 3727 are connected to the teaching keys for teaching the A mode stop code.

When the machine is in mode B bus 3728 is activated. Under certain mode assignments bus 3728 will set the shift register control 3629 which is detailed in FIGS. 102 and 62 to activate bus 3630 to cause shifting of the shift register for the steering bits, and to deactivate 3630 to stop shifting for all bits which occur after the steering bits. Under other conditions, when B mode is used for recirculation of $T_{rk}(t)$ with the full final bits in the feedback, then unit 3629 will allow activation of bus 3630 to permit the shift register to shift all the bits through. Bus 3631 is activated to clear the shift register in such cases, for example, as when a mode B sequence is starting.

The activation of mode B bus 3728 also causes the transformation control circuit 3613 to operate by inserting an identification bit that B mode is in progress and by causing the registers and counters in 3613 to operate in accordance with the code obtained from the buses 3614 which are connected to the shift register stages in one adaptation, and to the output register in another. A further variation is to connect the buses 3614 to certain specified groups of shift-register or teach buses. In a preferred adaptation mode B feedback code is the total code consisting of steering codes as set up in the shift-register which are transferred to another register in 3613, a mode B identifying bit, and sequence status counter bits. Bus 3728 activates this set in 3613 which produces a series of pulses, by a count down of another main counter in 3613 on bus 3612, whose frequency is proportional to the total code. Mode B control bus 3728 also activates internal start unit 3632, which produces an internal start signal and applies it to 3601 via bus 3637 if the machine is waiting in B mode for the next member of an input signal sequence and no signal appears for a predetermined interval of time. This will permit the continuation of the B mode sequence based upon the information in $T_{rk}(t)$ which has the cumulative information of the sequence up to the $K^{th}$ member. Unit 3632 is detailed in FIG. 59.

When the machine is in mode A bus 3729 is activated to set the transformation control 3613 in mode A operation for which, in a preferred form, the mode A feedback code utilizes the same sequence status counter as mode B, but a mode A bit is inserted with no codes from the shift register unless the mode A is to produce codes to identify a complete mode B sequence, in which case the contents of the shift register are transferred and held at the code which existed at the end of the mode B sequence for the duration of the mode A sequence. Count down to produce the pulses at 3612 is similar to mode B. Activation of bus 3729 also causes the normalizer control 3633 to hold, through voltage placed on bus 3634, the signal stored in the time normalizer 3609 for the duration of the entire mode A sequence which may extend through many complete coded outputs of 3810. At the end of a mode A sequence the hold voltage on 3634 is removed and voltage is placed on bus 3635 to permit the reset of the normalizer.

The complete code check unit 3636 receives the output of the comparator on buses 3806 and 3807 and pulses from 3629 on bus 3642 which occur when a code pulse should appear on bus 3806 or 3807. If at least one pulse is not present on either bus 3806 or 3807 during the time in which a complete code should be set up then the complete code check 3636 will place a negative voltage on bus 3638 which will cause the output register control 3639 to inhibit via bus 3640 the production of an output code by output register 3810. Unit 3639 is also responsive from 3629 via bus 3641 to inhibit 3810 via bus 3640 if the shift register is not shifted completely. Details of the complete code check unit 3636 are given in connection with FIG. 56, and details on the output register control 3639 are given in connection with FIGS. 102 and 62.

*Digitalized G-memories*

System II as shown in FIGS. 36, 37, 38, and 39 may be used with digital storage in the G-memories. Either parallel or serial digital store may be used on the movable magnetic media. If serial digital binary code is used FIGS. 107 and 108 illustrate a digital-to-analog decoder and an analog-to-digital encoder respectively for use in conjunction with System II for digitalizing the conditioned memory. Modulator 3801, cube root compressors 3618 and 3621, multiplier 3619, cubic expander 3620, oscillator 3838, write amplifier 3837, read head R″, G-memory overload detector 3917, amplifiers 3902 and 3910, the divider 3835, synchronous demodulator 3905, and modulator 3907 are eliminated. Substituted for these removed units are the units of FIGS. 107 and 108 connected to the buses indicated in those figures. Buses 3615 and 5401 are tied together and the decoder receives $F_i(t)$ on bus 5401 to act as an analog direct or reversed signal reference voltage on the decoder, while the switched head pick-up bus 3911 with digital $G_j(t)$ is connected to the shift register digital input side of the decoder. The action of the decoder produces an output analog product signal $F_i(t)G_j(t)$ which is connected to bus 3626 into integrator 3617. The decoder acts as a multiplier. Bus 10701 in FIG. 107 is tied to bus 3912 of FIG. 39. The clocked $G_j(t)$ signal on 10701 is applied to amplifier 3913, with connection to 3839 and 3912 removed from 3913, causing the digital signal on 10701 to drive head 3914 for digital writing on the temporary conditioned track.

In case the parameter C is adjusted according to FIG. 100 then bus 6026 in FIG. 38 can be connected to bus 6002 in FIG. 100, and bus 10048 in FIG. 100 would go to bus 6026 of FIG. 108. If the parameter C is controlled by 3823, then bus 6026 of FIG. 38 would be tied directly to bus 6026 of FIG. 108. In either case the encoder accepts $e_{ij}F_i(t)$ or $C \cdot e_{ij}F_i(t)$ and produces a serial binary digitalized code representing the input analog signals. These are added to the digital signals from the temporary conditioned memory at bus 3903 applied to the circuitry of FIG. 108 at bus 3903 which feeds into a clocked amplifier and a serial adder which adds, in serial digital binary coded form, $G_j(t) + \Delta G_{ij}(t) = G^*_j(t)$. The latter output of the digital adder is applied to bus 3841 into the selected write head of unit 3842.

In using the digitalized G-memories the erase oscillator and erase heads are unnecessary and they can be eliminated if desired. In that case the spacing on the magnetic medium between the read heads and the write heads can correspond to one cycle instead of two. The control from unit 3920 can be exercised directly into 3846 in the same manner as it is exercised into 3845 when used, and bus 3931 would be connected to 3846 to prevent writing as required by 3930. When writing digitally the previous digital signal is still present but writing destroys it directly and replaces it with the new magnetic digital recording. The one cycle spacing between read and write heads also applies to the temporary conditioned track read and write heads of which there is one each, in one adaptation.

SUMMARY OF SYSTEM II

The description of System II shown in FIGS. 36, 37, 38 and 39 may be summarized as follows. Information from the environment is received by the start anticipator 3601 and shortly thereafter is passed to the tape buffer unit 3603 which was started at the time the signal from the environment was received by the start anticipator. The signal in the tape buffer unit 3603 is passed to the signal transformation circuit 3606 and from there to the time normalizer and high speed buffer storage unit 3609. At the proper time as determined by the normalizer control 3633, the signal stored in 3609 is passed to the feedback transformation circuit 3611. The transformed signal from the feedback transformation circuit is modulated by the modulator 3801 and then correlated with the selected G-function by the correlator which consists of the two cube root compressors 3618 and 3621, the multiplier 3619, the cubic expander 3620 and the integrator 3617. The energy content of the modulated signal is obtained by the circuit 3813 and the plus and minus value of the RMS of the signal is obtained by the circuit 3815. The correlator output is compared with the plus and minus values of the RMS by the comparator 3804 and the comparator output for each correlation is shifted into the shift register 3808. When all correlations have been completed the contents of the shift register are transferred to the output register 3810. The digitalized output signals of the output register are the output of the machine. Corresponding to each of the output bits generated as described above, a different G-function is read from the memory by the read heads 3909 and amplified by the read amplifier 3910. The signal from the read amplifier is fed to the correlator and correlated with the transformed environment input function.

During teaching the teaching code assignment is selected by the code assignment circuit, 3701, from either the teaching keys 3703 or from the comparator output. The teaching code assignment is used to cause the code selector 3818 to supply an analog voltage, obtained from the RMS circuit 3815 to the subtractor 3627. The subtractor calculates the error value which is the difference between the desired output and the integrator output. The subtractor output is attenuated by the attenuator 3823 in one version of the invention and the result is sampled and held by sample and hold circuit #1, 3825, at the time determined by the sampling control circuit 3927. The voltage stored in sample and hold #1 is transferred to sample and hold circuit #2, 3831, approximately one time period later as determined by the sampling control circuit. The output of sample and hold #2 is multiplied with the modulated transformed environment function by multiplier 3833 and divided by the energy content of the signal by divider 3835 to give the error function.

At the time the G-function was read from the track and correlated with the incoming environment function it was also written on the temporary G track by write amplifier 3913 and write head 3914. If the G-function is to be corrected the signal produced by oscillator 3838 is switched to the proper erase head in 3843 and this causes the G-function to be erased. This takes place while the attenuated error value for the G-function is stored in sample and hold #1. The G-function stored on the temporary G track is read by read head 3901, amplified by amplifier 3902, demodulated by synchronous demodulator 3905, and modulated again by modulator 3907. It is then added with the error function from divider 3835 in the adder and write amplifier, 3837, and written on the G-memory by the selected write head in unit 3842.

During steering the read head selector 3920 is furnished signals from the comparator and from the teaching code assignment circuit 3701. These signals are used by the read head selector to cause the proper read head to be selected. The read head selector also furnishes signals to the steering selector control which in turn furnishes signals which select erase heads 3843 for writing of utilization numbers. Signals from the read head selector are also furnished to the erase head selector and will cause the erase head selector to select an erase head and cause erasing if the teaching criteria circuit 3921 furnishes a signal to the erase head selector. The erase head selector also furnishes signals to the write head selector 3846 so that the write head selector will cause a write head to be selected if an erase head has been selected.

The utilization numbers associated with the steering G-functions are read by the selected write head and furnished to the steering selection counter 3847. The steering selection counter furnishes signals to the steering selection ratio circuit 3849 which in turn has an output to the steering selection ratio gap control 3930. The output of the steering selection ratio gap control is used by the erase head selector to cause teaching of the steering G-functions. The steering selection ratio circuit also has analog inputs from the code selector and an analog output to the subtractor which causes the error determined by the subtractor to be modified during the teaching of steering by the steering ratio. The steering selection ratio circuit also has an output to the steering selection counter which, with the new selection count generated by the counter, is written by the erase heads on the G-memory. The steering selection counter also has an output to the comparator which causes the comparator output to be modified by the steering selection ratio determined during the previous time the G-function was used.

The temporary G-memory is read by the read head 3919 and the signal is processed by the G-memory overload detector 3917. The output of the G-memory overload detector is used to attenuate the input from the temporary G-memory to the adder and write amplifier 3837, to keep the memory from becoming saturated.

The run halt control 3713, is supplied with timing pulses from the timing marks pickup 3707, and controls the starting and stopping of the tape drive unit 3712 and also supplies signals to control the generation of timing pulses by 3709. The outputs of 3709 are used throughout the system for control.

For teaching, the desired output of the machine is either established by the teaching keys 3703 or by the comparator output. The code assignment circuit 3701 produces the desired code output in sequence to the code selector 3818 which in turn supplies analog voltages corresponding to the desired code.

The mode selector 3715 determines the permissible modes of operation from either the teaching keys or from the comparator output. The output of the mode selector is used to control the A mode control, 3718, and the B mode control, 3719, and these units in turn have outputs which are used to lock the mode selector and each other so that once a sequence in either mode is started operation in the mode will continue until the end of the sequence is determined. The tape buffer storage unit 3603 provides a signal which may be used to determine the end of B mode sequence. The B mode control controls the shift register control 3629 which in turn controls the shifting and resetting of the shift register. The comparator output and the shift register control supplies signals to the complete code check circuit 3636 which in turn supplies a signal to the output register control 3639. The output register control determines which codes in the shift register are codes to be used as output and only allows those codes to be transferred to the output register. The comparator gap control is controlled either manually, or from the code assignment circuit so that the gaps are modified for teaching of self-assigned codes. The output of the comparator gap control is used to control the gaps in the comparator. The normalizer control 3633 is controlled from the A mode control so that the same normal signal is repeatedly presented for each member of the A mode sequence. The transformation control 3613 is controlled by the A mode control and the B mode control to generate transformation signals from the coded input to the transformation control circuit. The coded input may be derived from the shift register or from the teaching keys. The output of the transformation control is supplied to the feedback transformation circuit which generate the transformation from this signal.

The internal start circuit 3632 is controlled by the B mode control and starts the machine by supplying an internal signal input if a B mode sequence has been started but not finished.

*Magnetic memory organization (FIG. 92)*

FIG. 92 is a diagram showing one physical arrangement of information on the movable magnetic memory medium as an example. The eight tracks generally represented by 9201 on magnetic medium 9208 are used to store the G-functions. Track 9202 is used for the temporary storage of G-functions. Track 9203 is used to store the carrier or clock information depending on whether the G-functions are stored in an analog or digital manner.

On track 9204 is stored a series of magnetized marks $P_1, P_2 \ldots P_n$. These marks produce the master timing pulses of the system and determine the positions of all other information on the magnetic medium. The timing pulses are produced by read-heads located in positions described below.

On track 9205 is stored one magnetized mark 9207, the D pulse, which occurs just before $P_1$. On track 9206 is one mark, $P_0$, which occurs after $P_n$ by an amount described later. Track 9206 is used only in the drum adaptation of the memory and is not used for the tape version of the memory.

In this adaptation of the invention, the steering G-functions are stored between $P_1$ and $P_4$ by way of example. All the final G-functions are stored between $P_4$ and $P_{n-1}$. The two spaces between $P_{n-1}$ and $P_1$ where no G-functions are stored are necessary to allow erasure and rewriting of the last G-function during teaching. In the case of digital storage of the G-functions, one blank space is preferred instead of two after the last G-function since erasure of the information is not necessary before rewriting.

In case of digital storage of the G-functions the information may be stored in a serial fashion on a single track or in parallel on a multiplicity of tracks. In the case of parallel storage each of the tracks 9201 and track 9202 should be thought of as a multiplicity of tracks. The heads corresponding to tracks 9201 and 9202 in the following paragraphs should also be thought of as a multiplicity of heads for the case of parallel digital storage.

*Tape memory (FIG. 93)*

FIG. 93 is a schematic diagram showing the tape drive mechanism and the arrangement of heads. The magnetic tape 9311 is driven in the direction of the arrow by the constantly rotating capstan 9312 when the jam roller 9313 is forced against the rotating capstan by energizing electromagnet 9314 causing the armature 9316 to pivot about pin 9315. Bus 5805, from the run-halt circuit of FIG. 58, is the run bus and when energized causes the associated driver 9323 to operate and thereby operate 9314.

When electromagnet 9319 is energized, armature 9318 is pivoted about pin 9320 pinching the tape 9311 against the fixed member 9317 thereby stopping the tape. Roller 9321 is an idler roller just to guide the tape. Bus 5804, from the run-halt circuit of FIG. 58, is the halt bus and when energized causes the associated driver 9322 to operate and thereby operate 9319.

The block of eight heads generally represented by 9301 are the read heads for tracks 9201. Head 9302 is the write head W' for the temporary storage of G-functions on track 9202. Head 9303 is the read head for track 9203. Head 9304 is the read head for track 9205. Head 9305 is the read head for track 9204. Heads 9301, 9302, 9303, 9304 and 9305 are all in line perpendicular to the line of travel of the tape.

The block of eight heads 9306 are erase heads for tracks 9201. Head 9307 is a read head R" for track 9202. Heads 9306 and 9307 are in a straight line perpendicular to the line of travel of the tape. The distance between the line of heads 9306 and 9307 and the line of heads 9301, 9302, 9303, 9304 and 9305 is equal to the distance on the tape between successive P pulses.

The block of eight heads generally represented by 9308 are write heads for track 9201. Head 9309 is a read head R' for track 9202. Heads 9308 and 9309 are in a straight line perpendicular to the line of travel of the tape. The distance from the line of heads 9308 and 9309 and the line of heads 9306 and 9307 is equal to the distance on the tape between successive P pulses.

Head 9310 is an erase head for track 9202. The distance from head 9310 to head 9309 is unimportant since its only function is to erase track 9202 before head 9302 writes new information on it.

In case the G-functions are stored in digital form, heads 9306, 9307, and 9310 may be eliminated and heads 9308 and 9309 may be placed in the position occupied by heads 9306 and 9307.

Drum memory (FIG. 77)

FIG. 77 is a diagram showing the head positions relative to the drum for the drum version of the magnetic storage medium. The drum 7701 rotates in a counter clockwise direction past four rows of heads 7702, 7703, 7704, and 7705. All rows of heads are parallel to the axis of rotation of the drum. Row 7702 contains read heads for tracks 9201, 9204, 9206, 9205, and 9203 and a write head for track 9202. Row 7703 contains erase heads for track 9201 and a read head for track 9202. Row 7704 contains write heads for track 9201 and read head for track 9202. Row 7705 contains an erase head for track 9202. The distance from row 7702 to 7703 and from 7703 to 7704 are equal to the distance between P pulses on the surface of the drum. The heads are placed in a similar manner in the rows on the drum as was described in detail for the tape memory. Elimination of heads and rearrangement of heads for digital storage would be the same as described previously for the tape versions of the memory. In certain adaptations where the drum surface speed is moderate the heads may actually touch the moving surface as in the tape version. In other adaptations, particularly for digital storage where the drum surface speed is great, then non-contacting heads are preferred.

System II timing (FIG. 79)

FIG. 79 shows some of the principal timing pulses for System II. Waveforms are designated by the numbers of the buses on which these waveforms appear. The primary timing pulses are those on bus 5707 and all other pulses are referred to these pulses. After each of these P pulses there are three other instants of times indicated by A, B, and C. The subscript on A, B, and C specify the number of the P pulse which they follow that is $A_x$ follows $P_x$, etc. A, B, and C each follows its preceding P pulse by a time determined by counting a specified number of clock pulses after P.

System II controls (FIGS. 102, 103, and 104)

Determination of permissible modes of operation

The permissible modes of operation are A mode, B mode, C mode, and A mode and B mode combined. The determination of the permissible modes of operation, by way of example, is made by two bits of information presented at time $P_5$ and $P_6$. The two bits of information are both necessary and sufficient to determine the four permissible modes of operation utilized as an example of control. During operation in operating-mode an option is provided so that the permissible modes may be determined either automatically as learned outputs of the comparator above or the modes may be established manually by the setting of switches. During operation in teaching-mode the permissible modes will always be determined by the setting of the teaching switches. An optional lock out feature is provided so that during either an A mode sequence or a B mode sequence, the permissible modes of operation will not change until the sequence is completed. Without the lock out feature it is possible to terminate a sequence by terminating the permissible mode of operation.

The circuit in FIG. 104 is designed to determine the permissible modes of operation as described above. If flip-flop 10414 is in the B state, A mode is permissible. If flip-flop 10417 is in the B state, B modes is permissible. If neither A mode nor B mode is permissible the operation will be in C mode. Information to set flip-flop 10414, and 10417 to the B state is in the form of pulses on either bus 10306, from the code assignment circuit, or on bus 5636 from the comparator output. Switch 10401 is used to determine whether the mode selection shall be under manual control or under automatic control. During operation in teaching-mode or during manual control, pulses on bus 10306 will be used to determine the permissible modes of operation. During operation in operating-mode and automatic control of modes, pulses on bus 5636 from the comparator will be used to determine the permissible modes of operation. The state of flip-flops 10414 and 10417 are not allowed to change unless bus 10270 is energized. Bus 10270 is not energized, if it is desired to lock the permissible modes of operation during either an A mode or B mode sequence.

During teaching-mode bus 10213 is energized by teach-operate switch 10212 activating OR gate 10405 producing one input to AND gate 10406 and allowing pulses on bus 10306 to pass AND gate 10406 through OR gate 10407, and if bus 10270 is active, through AND gate 10408 to bus 10409. Assume that both flip-flops 10414 and 10417 are normal; that is, in the A state. Flip-flop 10414 is primed by RC4 and therefore if there is a pulse on bus 10409 at time $P_5$, flip-flop 10414 will go to the B state. In a similar manner a pulse on bus 10409 at time $P_6$ will cause flip-flop 10417 to go to the B state.

If the machine is in operating-mode due to the teach-operate switch being in the operate position, bus 10215 is active and if switch 10401 is thrown in the automatic position so as to energize bus 10403, two inputs to AND gate 10410 are active allowing pulses from the comparator on bus 5636 to pass AND gate 10410 through OR gate 10407 and through AND gate 10408 if bus 10270 is active, and in a similar manner and time to that described above, pulses on bus 5636 will set flip-flops 10414 and 10417 to the B state.

If bus 10270 is active at the D time when a pulse appears on bus 5704, then AND gate 10412 will pass the pulse on bus 5704, turning both flip-flops 10414 and 10417 to the A state. If bus 10270 is active at the D time it will remain active until at least the next $P_8$ time so that once flip-flops 10414 and 10417 have been restored to the A state, they will then have a chance to be operated by the next possible pulses on either bus 5636 or 10316. The criteria for determining whether bus 10270 is active will be described in detail below.

Determination of sequences

In a preferred adaptation, if both B mode and A mode are permissible, then B mode will always take precedence over A mode. That is, operation will be in B mode until the end of the B mode sequence is determined at which time operation will then continue in A mode. However, once operation has begun in A mode, operation in B mode will be prohibited until the A mode sequence has been completed.

In FIG. 102 bus 10240 becomes active at time $P_8$ during the first member of a B mode sequence and becomes inactive at time $P_8$ during the last member of a B mode sequence. Bus 10211 becomes active at time $P_n$ during the first member of an A mode sequence and becomes inactive at time $P_n$ during the last member of an A mode sequence. Since the determination of a B mode sequence is always made before the determination of an A mode sequence, B mode will take precedence over A mode.

B mode sequence

If B mode is permissible and the machine is not operating in A mode, then operation will be in B mode until the end of the B mode sequence occurs. Switches are available to decide which of three alternate ways will be used to determine the end of the B mode sequence. In one case, the end of the B mode sequence is determined only by the end-of-sequence mark given by the tape buffer illustrated in FIG. 46. In the second case, the end of the B mode sequence is determined by the end-of-sequence mark from the tape buffer in conjunction with one bit of information presented at time $P_7$. The end-of-sequence bit presented at time $P_7$ comes from the teaching keys during operation in teaching-mode and from the output register during operation in operating-mode. In the third case the end-of-sequence bit alone determines the end of a B mode sequence; however, this is allowed to occur only if the output code from all members of the B mode sequence are allowed to be shifted into the shift register.

In FIG. 102 bus 10240 will be active only when flip-flop 10217 is in the B state. At time $P_8$ a pulse from bus RC8 is applied to the E and E' inputs of flip-flop 10217 and will cause the flip-flop to go to the A state if OR gate 10218 is active, since the gate output on bus 10236 goes to the D input of flip-flop 10217. Flip-flop 10217 will turn to the B state at time $P_8$ if OR gate 10218 is not active since the complemented output of the gate on bus 102100 goes to the C input of the flip-flop.

Flip-flop 10217 will be in the B state only after time $P_8$ during the first member of a B mode sequence and until time $P_8$ during the last member of the B mode sequence.

Any one of the following conditions will cause OR gate 10218 to be active and flip-flop 10217 to be in the A state after time $P_8$.

(1) An A mode sequence is being processed, in which case bus 10211 will be active.
(2) B mode is not permissible, in which case bus 10413 will be active.
(3) The last member of a B mode sequence is being processed, in which case either bus 10219, bus 10220, or bus 10239 will be active.

(1) End of B mode sequences
(a) End-of-sequence mark

The end-of-sequence mark from the input tape buffer in FIG. 46 is given by the tape buffer when the end of the last member of the sequence, as determined by the buffer, which last member is written into the transformation circuit shown in FIGS. 47 and 48. The last member of the sequence is not available to the learning machine proper until after it has been written into the high speed tube buffer of FIGS. 47 and 50. For this reason the end-of-sequence mark is held in a temporary store until the information in the transformation circuit of FIGS. 47 and 48 is written into the high speed tape buffer.

In FIG. 102 flip-flop 10224 is turned to the B state by the end-of-sequence mark, from the input tape buffer, on bus 4686, thereby activating the C input of flip-flop 10228. At the time the information in the transformation circuit is completely written into the high speed tube buffer a pulse appears on bus 5039 which is connected to the E input of flip-flop 10228. If the signal in the transformation circuit had an end-of-sequence mark associated with it, the C input of flip-flop 10228 will be active, and at the time the transformed signal is written into the high speed buffer, flip-flop 10228 will turn to the B state activating bus 10229. At the time flip-flop 10228 goes to the B state flip-flop 10224 is returned to the A state by the signal on bus 10229 which is connected to the E' input of flip-flop 10224. Flip-flop 10228 will remain in the B state until the D time at which time the main reset pulse on bus 5706 will restore flip-flop 10228 to the A state. Bus 10229 will remain active during the entire time that the last input signal segment, which was accompanied by the end-of-sequence mark, is being processed. It will not remain active if this signal is being processed in A mode except during the first member of the A mode sequence.

(b) End-of-sequence bit

An end-of-sequence bit is presented at time $P_7$ from the teaching keys during operation in the teaching-mode and from the comparator during operation in operating-mode. This end-of-sequence bit may be used in conjunction with the end-of-sequence mark from the input tape buffer to determine the end of a B mode sequence, or it may be used alone if the output codes from all members of the B mode sequence are allowed to shift into the shift register.

Referring to FIG. 102, a pulse on bus 10231 at time $P_7$ will turn flip-flop 10230 to the B state since it is primed on C by RC6. During operation in teaching-mode bus 10213 is active allowing pulses on bus 10306 from the code assignment circuit to pass AND gate 10232. Those pulses will cause flip-flop 10230 to turn to the B state at time $P_7$ if a pulse is present at that time on bus 10306. In a similar manner during operation in operating-mode bus 10215 is active allowing pulses on bus 5636 from the comparator to pass AND gate 10234. These pulses will then pass OR gate 10233 to bus 10231 and flip-flop 10230 will turn to the B state at time $P_7$ if a pulse is present at that time on bus 5636 from the comparator.

If an end-of-sequence bit occurred at time $P_7$, flip-flop 10230 will turn to the B state thereby activating bus 10235. Bus 10235 will remain active until the D time at which time the master reset pulse on bus 5706 will return flip-flop 10230 to the A state.

(c) End-of-sequence

If during the processing of a B mode sequence, either bus 10219, or 10220 or 10239 is active at time $P_8$ the B mode sequence will end. Any one of three optional criteria may be selected to end a B mode sequence.

If switch 10221 is thrown so as to activate bus 10222 and bus 10299 is active then AND gate 10243 will become active as soon as bus 10229 becomes active. This will occur as described above under the heading end-of-sequence mark.

If switch 10221 is thrown so as to energize bus 10223 and bus 10299 is active then bus 10219 will be active as soon as both bus 10229 and bus 10235 become active. This will occur as described above under the headings end-of-sequence mark and end-of-sequence bit. If switch 10216 is thrown so as to energize bus 10249, allowing the output codes for all members of the B mode sequence to be shifted into the shift register, and switch 10295 is closed then AND gate 10297 will supply one input to AND gate 10298, so that the end-of-sequence bit when it occurs activating bus 10235, will cause bus 10239 to be active thereby ending the B mode sequence. At the same time bus 10299 will be inactive so that the other two methods of ending a B mode sequence will not be allowed to occur.

A mode sequences

If A mode is permissible and a B mode sequence is not being processed, then A mode sequencing will occur until a specific stop code is presented either on the output register, if operation is in the operating-mode, or on the teaching keys, if operation is in teaching-mode.

In FIG. 102 bus 10211 will be active only when flip-flop 10214 is in the B state. At time $P_n$ a pulse on bus RCN is applied to the E and E' inputs of flip-flop 10214 and will cause the flip-flop to go to the A state if OR gate 10247 is active, since the gate output on bus 10246 goes to the D input of flip-flop 10214. Flip-flop 10214 will go to the B state at time $P_n$ if OR gate 10247 is not active since the complemented output of the gate on bus 10245 goes to the C input of the flip-flop.

Flip-flop 10214 will be in the B state activating bus 10211 only after time $P_n$ during the first member of an A mode sequence and until time $P_n$ after the last code of the A mode sequence has been generated. At all other times flip-flop 10214 will be in the A state activating bus 10251. The last code for all A mode sequences will normally be the same stop-code, however, a number of different stop codes may be used.

Any one of the following conditions will cause OR gate 10247 to be active and flip-flop 10214 to go to the A state at time $P_n$.
(1) A mode is not permissible in which case bus 10416 is active.
(2) A B mode sequence is being processed in which case bus 10240 is active.
(3) An A mode stop code is present in which case bus 10248 is active.

(1) End of A mode sequences

A selected number of bits of the output are chosen to determine the end of an A mode sequence. The number of bits are unimportant and it could be only one bit as was done to determine the end of a B mode sequence. Once the number of bits has been selected a specific code is then selected from these bits to represent an end-of-sequence code for A mode. The buses which will be active when this selected code is present are then made inputs to an AND gate so that the only time the AND gate will be active is when the selected code is present. During operating-mode the stop code will be obtained from the output register and during teaching-mode from the teaching keys.

In FIG. 102 AND gate 10286 will be active during operating-mode when a stop code is present on the output register, since bus 10215 will be active during operating-mode and buses 10284 are presumed to come from the output register in a manner described above. AND gate 10287 will be active during teaching-mode when the teaching keys are set to a stop code since bus 10213 will be acive during teaching-mode and buses 10285 are presumed to come directly from the teaching keys in a manner described above. If either AND gate 10284 or 10287 is active because of a stop code then the output of OR gate 10288 on bus 10248 will be active. Then by causing OR gate 10247 to be active and flip-flop 10214 to be in the A state after time $P_n$, thereby discontinuing the A mode sequence by a stop code.

Shift register control

During the processing of a B mode sequence options are provided for either shifting all output bits into the shift register or for only shifting in the first six output bits, by way of example.

The shift register of FIG. 62 will not be allowed to shift unless bus 10209 in FIG. 102 is active. Bus 10209 will be active when any one of the inputs to OR gate 102102 is active, that is, (1) It will always be active until time $C_7$ since bus 10318 is always active till time $C_7$, as described hereinbelow.
(2) It will be active if a B mode sequence is not being processed, and it will be active after time $P_8$ during the last member of a B mode sequence since 10208 will be active during these times.
(3) It will be active any time switch 10216 is thrown so as to energize bus 10249.

Switch 10216, when thrown so as to energize bus 10249, will allow B mode codes to be shifted all the way into the shift register. If switch 10216 is not shown as stated then during a B mode sequence only input on bus 10318 will be present and only the first six bits will be shifted into the shift register.

The shift register will be cleared at time $P_2$ if a B mode sequence is not being processed. This is to provide a cleared shift register for the case where the B mode code is not shifted all the way so that the transformation code will be correct and not contain bits left over from the last code.

In FIG. 102 bus 10208 must be active at time $P_2$ in order that the shift register may clear. This will be true as long as a B mode sequence is not being processed.

Internal start control

The internal start circuit in FIG. 59 is for the purpose of starting the machine automatically after a predetermined period of time if all the following conditions are met:

(1) The machine is not being taught.
(2) The machine is halted in the home position.
(3) No information is stored in the tape buffer.
(4) No information is being written into the tape buffer.
(5) A B mode sequence has been started but not finished.

In FIG. 102 bus 102103 is active when all the above conditions are met. When bus 102103 becomes active the start circuit of FIG. 59 begins measurement of the time interval to automatically start the machine.

AND gate 10241 will become active only when:

(1) Bus 10215 is active.
(2) Bus 5704 is active.
(3) Bus 4652 is active.
(4) Bus 4660 is active.
(5) Bus 10240 is active.
(6) Switch 10242 is closed.

The first five of these conditions are identical with the requirements stated above. Condition six depends on the switch 10242 which has the function of making the internal start circuit an optional feature since it will never operate unless switch 10242 is closed. When AND gate 10241 becomes active bus 102103 becomes active and the circuit of FIG. 59 begins to operate.

Feedback transformation circuit control

The transformation circuit of FIG. 54 should transform the incoming information under the following conditions:

(1) Each member of a B mode sequence after the first should be transformed.
(2) The same input signal retrieved from storage should be transformed during A mode for each code generated after the first.
(3) In case A mode sequencing follows a B mode sequence the terminating code of the B mode sequence is the first A mode code, so that the first A mode code is generated by a transformed signal by virtue of the fact that it was the terminating code of a B mode sequence.

In FIG. 102 but 10204 is active and its complement on bus 10205 is inactive if OR gate 10250 is active. OR gate 10250 will be active if either of the inputs on bus 10240 or 10211 are present. Bus 10240 will be active during a B mode sequence and 10211 will be active during an A mode sequence as described previously. If bus 10204 is active at time $C_n$ then the next signal will be transformed and if it is not active at time $C_n$ the next signal will not be transformed.

Buses 10204 and 10205 go to FIG. 54 where the state of the buses at time $C_n$ is sampled and remembered by flip-flop 5431 until the next $C_n$.

Each member of a B mode sequence after the first is transformed by a code associated with the previous members of the sequence. The new transformation code is transferred to the transformation circuit register in FIG. 54 at D time from the code selection circuit in FIG. 104 providing a B mode sequence is being processed.

In FIG. 102 a pulse appears on bus 10207 at the D time if a B mode sequence is being processed since bus 10240 will activate one input to AND gate 10238 allowing the pulse on bus 5704 to pass the gate. Bus 10207 is connected to the transfer bus of the register in the transformation circuit of FIG. 54.

A mode transformation codes

In order to obtain a different set of transformation signals for A mode and B mode one bit of the code used to generate the transformation signal is dependent upon whether the transformation is for an A mode sequence or a B mode sequence.

In FIG. 102 flip-flop 10264 is set at the D time by the signal on bus 5704 to the same state as flip-flop 10214. The B output of flip-flop 10264 on bus 10206 will be active only if an A mode sequence is being processed. Bus 10206 is used to set one stage in the main counter of FIG. 54 and therefore causes the set of A mode transformations to be different from the set of B mode transformations. If flip-flop 10214 is in the B state at the D time then flip-flop 10264 will be forced to the B state since the B output of flip-flop 10214 is connected to the C input of flip-flop 10264 and a pulse on bus 5704 at D time is applied to both E and E' inputs of flip-flop 10264. A similar explanation will show that flip-flop 10264 will be forced to the A state at the D time if flip-flop 10214 is in the A state.

*Selection of source of B mode transformation feedback codes*

If during the processing of a B mode sequence only the first six output bits are allowed to shift into the output shift register then the code used to determine the feedback transformation by the circuit of FIG. 54 will be the code generated by the steering G-functions. These particular bits will be in the shift register in groups of three, starting with positions four, ten, sixteen, twenty-two, and etc., from the loading end of the shift register. The number of groups selected for feedback will be determined by the amount of history of the sequence it is desirable to retain for the feedback transformation.

If during the processing of a B mode sequence all output bits are allowed to shift into the output shift register then the code used to determine the feedback transformation by the circuit in FIG. 54 will be the code corresponding to the code generated by the final output G-functions starting with function number seven. In the operating mode this code will be obtained from the shift register from a selected number of bits after the seventh. In the teaching mode if the teaching code assignment is manually selected the code will be obtained from the corresponding buses energized by the teaching switches. If the teaching code assignment is self-assigned in the teaching mode then the code for feedback will be taken from the shift register.

If the teaching code assignment is to be used for feedback, it is preferred to use self-assignment only the first time the input signal is presented to the machine and thereafter it is further preferred to force assign the same code which was self-assigned by the machine the first time.

Typical selection circuits for two of the multiplicity of bits of the transformation feedback code are shown in FIG. 104. The transformation code will appear on buses generally represented by 10420. It will be sufficient to describe the action of the selection circuit for a typical pair of the buses 10420 since all others will be identical. AND gate 10421 will be active only in the teaching mode so that bus 10213 is active, and all the output codes generated during a B mode sequence are allowed to shift into the shift register so that bus 10249 is active, and the teaching code assignment corresponding to the final output bits during a B mode sequence is manually selected so that bus 10368 is active. In this case AND gate 10421 will have an output on bus 10422.

If AND gate 10421 has an output then AND gate 10427 and 10428 will not have an output since bus 10429 will not be active. AND gate 10428 will be active only if bus 10249 is active and AND gate 10421 is not active. This will occur if either or both buses 10213 or 10368 are not active. AND gate 10427 will have an output only if AND gate 10428 and 10421 are not active. This will occur only if bus 10249 is not active. Therefore, the outputs of AND gates 10421, 10427 and 10428 are mutually exclusive and there will always be an output from one and only one of the gates.

If bus 10422 is active, then OR gate 10424 will have an output if and only if bus 10447 is active. Bus 10447 is connected to the bus which is energized by the teaching key for the $k$th bit when the key is thrown so as to teach a plus output. The value of $k$ represents a typical teaching bus and it must be greater than six in this particular adaptation of the invention. If bus 10430 is active then OR gate 10424 will have an output if and only if bus 10432 is active. Bus 10432 is connected to the B side of the $k$th flip-flop in the shift register in FIG. 62. If bus 10431 is active then OR gate 10424 will have an output if and only if bus 10433 is active. Bus 10433 is connected to the B side of one of the flip-flops in the shift register in FIG. 62. The particular flip-flop chosen will be one of those described above for steering code feedback. The output of OR gate 10424 is connected to the C input of one of the flip-flops in register 5418 in FIG. 54. The complemented output of the typical gate 10424 is connected to the D input of the same flip-flop. The action of AND gates 10434, 10435 and 10436 and OR gate 10437 is the same as that described above except that buses 10438, 10439 and 10440 will originate from different stages of the shift register and teaching keys and the output of OR gate 10437 will connect to a different stage of the register 5418.

Memory selection control

The memory selection circuit in FIG. 106 may be used in conjunction with or in place of the transformation circuit in FIG. 54 to process A mode and B mode sequences. During either an A mode or a B mode sequence the output code or portions thereof for a member of the sequence may be used to select a bank of memories which will be used to process the next member of the sequence.

The selection of various memories during a B mode sequence is also possible if the final output bits are allowed to shift all the way into the shift register. When all sequencing is completed, or if sequencing has not occurred, the memory selection circuit of FIG. 106 will be reset so that the normal bank of memories will be selected for the next input signal.

In FIG. 102 OR gate 10250 will be active at the D time if either an A mode or a B mode sequence is being processed and the output of OR gate 10250 on bus 10204 will supply one input to AND gate 10265. If the output code has been allowed to shift all the way into the shift register bus 10209 will be active so that another input to AND gate 10265 will be present. At the D time a pulse on bus 5704 will pass AND gate 10265 and appear on bus 10227. Bus 10227 is connected to the memory selection circuit of FIG. 106 in such a manner that a pulse on bus 10227 will select that bank of memories determined by the code presented to the selection decoder.

If an A mode or a B mode sequence is not being processed at the D time then OR gate 10250 will not be active and the complemented output of OR gate 10250 on bus 10205 will supply one input to AND gate 10266 so that the pulse on bus 5704 at the D time will pass AND gate 10266 and activate the reset generator 10267 which is similar to that detailed in FIG. 58, causing a reset pulse to appear on bus 10226. This reset pulse will cause the memory selection circuit of FIG. 106 to select the normal bank of memories which are used for the start of all sequences and all operations in C mode.

High speed tube buffer control

During A mode sequencing the same signal is held in the high speed tube buffer and transformed by different transformation signals to produce each output code of the A mode sequence. When not processing an A mode sequence the high speed tube buffer of FIGS. 47 and 50 receives a reset signal at D time which causes it to erase the signal which it has in storage and request another signal from the transformation circuit of FIGS. 47 and 48. During an A mode sequence the reset signal to the tube buffer is not given but instead signals are given which will cause the tube buffer to hold the information it has in storage and to stop reading and return to the origin of the stored information until the signals are removed. At the time these signals are removed, reading will resume starting at the origin of the information.

In FIG. 102 AND gate 10289 will always have one input from bus 10211 active during an A mode sequence. Bus 5702 will always be active at the D time so that when bus 5704 becomes active at the D time AND gate 10289 will have an output. Concurrently with the appearance of a signal from AND gate 10289, the signal on bus 10237 disappears and this is used to turn off the read beam of the tube buffer. At the time reading is to start again the signal on bus 5702 from the run halt circuit will disappear causing AND gate 10289 to become inactive thereby turning on the tube buffer beam. The signal on bus 5701 from FIG. 57 is used to hold the tube buffer sweep circuits quiescent at the origin of the stored information.

If an A mode sequence is not being processed, at the D time flip-flop 10214 will be in the A state thereby activating bus 10251 and supplying one input to AND gate 10252. At the D time bus 5704 will cause AND gate 10252 to become active. The output of AND gate 10252 is differentiated by capacitor 10253 and the resulting pulse appears on bus 10202 which is connected to the high speed tube buffer of FIG. 47 and 50 in such a way that a pulse on bus 10202 will cause the high speed tube buffer to erase the information which it has stored and then the tube buffer requests more information from the previous transformation circuit of FIGS. 47 and 48.

Run-halt circuit

The run-halt circuit in FIG. 57 is for the drum version of the magnetic storage media, and that in FIG. 58 is for the tape version of the magnetic storage media.

These run-halt circuits serve the purpose of starting the machine at the proper time to process information in the high speed tube buffer of FIGS. 47 and 50 and stopping the machine when the processing has been completed.

The high speed tube buffer in FIGS 47 and 50 gives a signal when it is loaded with information and ready to be read. The presence of this signal is normally one of the conditions which must be met before the run-halt circuit will accept a start signal. However, if an A mode sequence is being processed the tube buffer will give a read-ready signal only at the beginning of the first member of the sequence. A short time after the signal to stop reading is given to the tube buffer in an A mode sequence another signal is generated to take the place of the read-ready signal normally given by the tube buffer. The delay in generating this substitute read-ready signal is to allow the integrators to be reset before restarting the machine. This delay time is unnecessary for the drum version of the machine since the start signals are generated by the $P_0$ pulse on the drum and the time between the stop-read signal given to the tube buffer until the next $P_0$ pulse is sufficient to allow all integrators to be reset to zero.

Before the machine is allowed to start a number of conditions must be satisfied depending on the mode of operation. These conditions are listed below:

(1) The run-halt circuit must be in the halt condition before any start signal is accepted.
(2) If the machine is operating in the operate-mode then the run-halt circuit will accept a start signal as soon as the high speed tube buffer read-ready signal is present or, if an A mode sequence is being processed, as soon as the substitute ready signal described above is present.
(3) If the machine is processing a B mode sequence and not shifting the output code all the way into the output register the run-halt circuit will accept a start signal as soon as the tube buffer gives a signal that it is loaded with information and ready to be read. This will be true in both operating-mode and teaching-mode.
(4) During operation in the teaching-mode the run-halt circuit will not accept start pulses until a manual switch has been closed in addition to the presence of the conditions listed under (1) above and the presence of either a read-ready signal from the tube buffer or the substitute read-ready signal if an A mode sequence is being processed. This condition will not contradict (3) above.

This requirement allows time for the teaching keys to be set and an indicator light is turned on to indicate that the manual switch must be pushed to start the machine.

In FIG. 102, if bus 10201 is active the run-halt circuit is allowed to start. In the magnetic tape version of the run-halt circuit in FIG. 58 bus 10201 activates the start circuit, and in the magnetic drum version of the run-halt circuit in FIG. 57 the start circuit is activated the first time the drum is in the proper position following the appearance of the signal on bus 10201. Bus 10201 is active only if all the inputs to AND gate 10254 are present.

Inputs to AND gate 10254 on buses 5702 and 5704 will be active only if the run-halt circuit is in the halt position. Buses 5702 and 5704 are connected to AND gate 10254 via delay lines 102104 and 102105 respectively to prevent premature deactivation of the gate.

If the machine is in the operate-mode bus 10215 is active causing OR gate 10258 to have an output on bus 10257 thereby supplying a third input to AND gate 10254. The fourth input to AND gate 10254 on bus 10255 will be present if OR gate 10256 is active. OR gate 10256 will be active if a read-ready signal from the high speed tube buffer is present on bus 5039 or if the substitute read-ready signal described above is present on bus 10259. A substitute read-ready signal on bus 10259 will be present only during the time AND gate 10260 is active. At the D time during the processing of an A mode sequence AND gate 10289 becomes active and after a short delay through delay line 10203 furnishes one input to AND gate 10260. At the same time AND gate 10289 becomes active the pulse on bus 5704 turns delay-flop 10261 to the B state. When the delay-flop returns to the A state AND gate 10260 becomes active causing bus 10259 to become active. When the machine starts bus 10259 becomes inactive since the signal from delay-line 10203 disappears. The delay line 10203 is necessary to allow delay-flop 10261 to be forced to the B state so that no pulse from AND gate 10289 will get through AND gate 10260.

If the machine is processing a B mode sequence bus 10240 is active and if the output code is not being shifted all the way into the shift register switch 10216 will be thrown so as to energize bus 10262 then AND gate 10263 will be active supplying an input to OR gate 10258 thereby causing bus 10257 to become active so that a read-ready signal from the tape buffer on bus 5039 will allow bus 10201 to become active if the machine is halted.

During operation in the teaching-mode bus 10215 will not be active but bus 10213 will be active so that AND gate 10268 will have one input present. At the D time flip-flop 10269 if forced to the A state by the pulse on bus 5704 which is connected to the E' input of the flip-flop. AND gate 10268 will be active then only when flip-flop 10269 is in the B state. If push button 10270 is pushed flip-flop 10269 is forced to the B state causing AND gate 10268 to become active, causing OR gate 10258 to give an output on 10257, and if all other conditions are met then bus 10201 will be active. OR gate 10258 will be inactive only if the operation is in teaching mode and flip-flop 10269 needs to be forced to the B state in order to start the machine. If this condition occurs the indicator light 10293 will be turned on and remain on until the push button switch is closed and forces flip-flop 10269 to the B state. If OR gate 10258 is not active the complemented output causes a negative voltage to be applied to the base of transistor 10292 through the resistor 10291 causing the transistor to conduct and therefore allowing current to pass through lamp 10293. If OR gate 10258 is active the complemented output has a positive voltage which stops transistor 10292 from conducting, and thereby turns the lamp off.

119

*Locking of permissible modes during sequences*

During either an A mode sequence or a B mode sequence the permissible modes of operation may be prevented from changing until the sequence has been completed. The permissible modes of operation will always be prevented from changing during a B mode sequence unless the output codes from all members of the sequence are shifted into the shift register.

In FIG. 102 bus 10270 will be active only during the times when the permissible modes are allowed to change. If neither an A mode sequence nor a B mode sequence is being processed then bus 10270 will be active. If an A mode sequence is not being processed then bus 10251 will be active thereby activating OR gate 10271 and supplying one input to AND gate 10272 and if a B mode sequence is not being processed bus 10208 will be active thereby activating OR gate 10273 and supplying the second input to AND gate 10272. With both inputs available to AND gate 10272 the gate will have an output on bus 10270 thereby allowing the permissible modes to change.

During an A mode sequence bus 10251 is not active so that OR gate 10271 will not have an output unless switch 10274 is closed. If switch 10274 is closed then OR gate 10271 will be active and AND gate 10272 will have an output on bus 10270 thereby allowing the permissible modes to change during an A mode sequence. If switch 10274 is not closed then OR gate 10271 will not have an output thereby preventing AND gate 10272 from activating bus 10270 until the A mode sequence is completed. The permissible modes will therefore be prevented from changing during an A mode sequence unless switch 10274 is closed.

During a B mode sequence bus 10208 is inactive thereby preventing an output from OR gate 10273 unless AND gate 10275 is active. AND gate 10275 will only be active if switch 10216 is thrown so as to energize bus 10249 thereby allowing the output codes from all members of the B mode sequence to be shifted all the way into the shift register, provided switch 10276 is closed. Therefore, the permissible modes of operation may change during a B mode sequence only if switch 10276 is closed and if the output codes from all members of the B mode sequence are allowed to shift into the shift register all the way.

Teaching code assignment

During teaching, the output response which it is desired to teach the machine is used to switch one of three possible analog voltage to the error determination circuit of FIG. 60. The three analog voltages used by the error determination circuit correspond to the three possible outputs of the comparator shown in FIG. 56.

If it is desired that the comparator give an output on bus 5636 then the analog voltage switched to the error determination circuit is $+\sqrt{U}$. If it is desired that the comparator gives an output on bus 5635, then the analog voltage switched to the error determination circuit is $-\sqrt{U}$. If it is desired that the comparator give no output, then the voltage switched to the error determination circuit is zero.

In this particular adaptation of the invention, if the comparator does not give an output on either bus 5636 or 5635, for each output bit, then the output code is called incomplete and the output code is not transferred to the output register. If it is desired to teach the machine not to respond to a signal, in a preferred adaptation it is only necessary to teach one or more of the final G-functions to cause a zero output from the comparator.

In general the teaching code assignment may be established either manually in forced-assignment by setting a set of switches or automatically by self-assignments using the comparator output as the teaching code. The forced assignment of codes by setting the teaching switches will allow any one of the three possible comparator outputs to be taught. However, the self-assignment of codes by the

120 comparator will not allow teaching of zero output by the comparator. This is accomplished by removing the upper and lower bounds on each of the comparator gaps during teaching of self-assigned codes.

In a preferred adaptation while three possible output conditions are desirable for the final bits of the output code, the first six bits are required to make a binary decision for use by the machine, and as a result the code assignment for the first six bits will never include zero as a possibility. In addition, bits 4, 5, and 6 have certain specific functions in the machine which rules out self-assignment for these bits.

The teaching code for the steering bits 1, 2, and 3, may be either self-assigned or forced-assigned by the teaching keys. However, a zero assignment may not be made on these bits.

The teaching code for the two bits which determine the permissible modes of operation, bits 4 and 5, will always be forced-assigned by the teaching keys; however, a zero assignment may not be made.

The teaching code for the end-of-sequence bit for B mode sequence, bit 6, may be assigned either from the teaching keys or may be assigned from the tape buffer's end-of-sequence mark. Regardless of how the teaching code assignment is made, a zero assignment will not be made for this particular bit.

Manual code assignment

In FIG. 103, the row of switches 10309 are the switches used to manually establish a teaching code assignment. The first six switches, counting from the left, are two position switches and are used to manually select the teaching code corresponding to the first six output bits. Only one typical switch is shown after the break indication to represent all other switches, other than the first six. Each of the switches used to select the teaching code corresponding to all output bits after the sixth is a three position switch.

A typical one of the switches is row 10309 will be described to illustrate the way in which the switches are used to establish the teaching code assignment. Consider switch 10312. If switch 10312 is in the position shown, then at time $P_4$ bus RC4 will be active thereby causing AND gate 10314 to have an output on bus 10315 and causing OR gate 10316 to have an output. Assuming for the time being that buses 10317 and 10319 are active, then AND gate 10320 will have an output, thereby causing an output from OR gate 10321, and thereby supplying one input to AND gate 10324. The other input to AND gate 10324 on bus 6485 is present from each P time to the following C time, so that if OR gate 10321 is active, then AND gate 10324 will have an output from $P_4$ time to $C_4$ time on bus 10306. When bus 10306 is active, it causes diode switches 10322 and 10322 to become conductive, thereby allowing the voltage on bus 5603, $+\sqrt{U}$, to appear on bus 10304 and the voltage on bus 5602, $-\sqrt{U}$, to appear on bus 10305. The voltage on bus 10304 is transmitted to the subtractor shown in FIG. 60 where it is used to determine the error. The voltages on buses 10304 and 10305 are used also to calculate the memory selection ratio correction term for the steering G-functions by the circuitry in FIG. 64.

If switch 10312 is thrown so as to energize the input to AND gate 10325, then a similar explanation to that presented above will show that OR gate 10326 is active and AND gate 10327 will have an output causing OR gate 10328 to become active and therefore AND gate 10329 will have an output between time $P_4$ and $C_4$ on bus 10308. When bus 10308 is active, it causes diode switches 10330 and 10331 to become conductive thereby allowing the voltage on bus 5603, $+\sqrt{U}$, to appear on bus 10305 and the voltage on bus 5602 $-\sqrt{U}$, to appear on bus 10304, which is a reversal of the previous switching. If neither AND gate 10324 nor 10329 is active then the complemented outputs of these two gates will causes AND gate 10359 to have an output on bus 10307 and will switch zero voltage to both buses 10304 and 10305. This condition will always prevail from C time to the next P time and will also occur whenever a zero code assignment is chosen by one of the teaching switches, during the time that the switch is active to select the teaching code.

The AND gates in row 10332 which are selected by the switches in row 10309 to be activated, will be activated at different times since the pair of gates associated with each switch is also connected by a common input to a different stage of the ring counter in FIG. 64.

Self-assignment of codes

The comparator output on either bus 5636 or 5635 will be used to select the teaching code if buses 10317 and 10333 are active and bus 10319 is not active. Assuming the comparator has an output on bus 5636, then AND gate 10334 will be active causing OR gate 10321 to be active. As shown before, the voltage on bus 5603 will be transferred to bus 10304 and the voltage on bus 5602 will be transferred to bus 10305 when OR gate 10321 is active. A similar analysis will show that if the comparator has an output on bus 5635, then the diodes switches 10330 and 10331 will become conductive. This constitutes self-assignment.

Tape buffer assignment of end-of-sequence bit code

In FIG. 103 bus 10360 will be active at the time the teaching code assignment for the sixth bit is to be selected only if the code assignment is to be determined by the tape buffer. If an end-of-sequence mark has been given by the tape buffer then bus 10229 will be active so that AND gate 10338 will have an output on bus 10339 thereby causing OR gate 10321 to be active. As was shown before, when OR gate 10321 is active the voltage on bus 5603 is transferred to bus 10304 and the voltage on bus 5602 is transferred to bus 10305.

If bus 10360 is active and bus 10229 is not active then AND gate 10338 will not be active so the complemented output will supply an input to AND gate 10361 causing an output on bus 10341. Bus 10341 will then cause OR gate 10328 to be active and, as was shown previously, will cause the voltage on bus 5603 to be transferred to bus 10305 and the voltage on bus 5602 to be transferred to bus 10304.

*Selection of source of the teaching code assignment*

Each of the three ways of selecting the teaching code assignment discussed above, provided means of causing an output from one or the other but not both of the OR gate 10321 and 10328. Of the six inputs to these two gates only one input will be active at any one time and in the case of zero code assignment none of the inputs will be active. The inputs have been shown to be mutually exclusive in pairs and it remains to be shown that the three pairs are mutually exclusive.

The outputs of AND gate 10342 and of OR gate 10336 are used to select which shall be used of the three possible sources of the teaching code assignment. If AND gate 10342 is active a signal will appear on bus 10360 so that a signal will appear on either bus 10339 or 10341. At the same time bus 10317 will be inactive so that no output will be possible from AND gates 10320, 10334, 10337 and 10327.

If OR gate 10336 has an output then bus 10319 is active and the complemented output on bus 10333 is inactive. Since the signals on buses 10333 and 10319 are mutually exclusive then the outputs of 10320 and 10327 are mutually exclusive with the outputs of 10334 and 10337.

Independent options are provided to select the source of the teaching code assignment corresponding to various output bits. The selection of these options in conjunction with certain timing pulses are used to control the output of AND gate 10342 and OR gate 10336.

Timing

In FIG. 102 flip-flop 10277 is in the A state from the D time until time $C_4$ at which time it will be forced to the B state due to the presence of a pulse on bus 6453 which is connected to the E input of the flip-flop and the fact that a signal is applied to the C input from time $P_4$ to $P_5$ by bus RC4. The flip-flop is forced to the A state at D time by the master reset pulse on bus 5706. Therefore, bus 10225 will be active from D time until $C_4$ time and bus 10278 from $C_4$ time to D time.

The action of flip-flop 10279 is identical to that of flip-flop 10277 except that it will be forced to the B state at $C_6$ time since the C input is activated by the signal on bus RC6. Therefore, bus 10282 will be active from time $C_6$ to time D and bus 10280 from D time to $C_6$ time.

Since bus 10278 is active after time $C_4$ and bus 10280 is active until time $C_6$ AND gate 10281 will have an output on bus 10283 from time $C_4$ to time $C_6$.

In FIG. 103 flip-flop 10335 will have the same action as flip-flops 10277 and 10279 except that it will be forced to the B state at time $C_7$ so that bus 10318 will be active from D time until $C_7$ time and bus 10313 from $C_7$ time until D time.

Since bus 10318 is active from D time until $C_7$ time and bus 10282 from $C_6$ time to D time, AND gate 10345 will have an output on bus 10346 from $C_6$ time to $C_7$ time.

Steering bits

Manual setting of a switch will determine whether the teaching code assignment corresponding to the first three output bits is self-assigned from the comparator output or is determined from the setting of the teaching switches.

Switch 10343 in FIG. 103 controls the source of the teaching code corresponding to the first three output bits or the steering bits. If switch 10343 is closed the teaching code for these bits will be assigned from the setting of the teaching switches and if it is open from the comparator output.

In FIG. 103 if switch 10343 is closed then AND gate 10340 will have an output on bus 10367 until time $C_4$ at which time the other input to AND gate 10340 from bus 10225 disappears. When bus 10367 is active then OR gate 10336 has an output activating bus 10319 thereby supplying one input to AND gates 10320 and 10327. As will be shown later bus 10317 will be active at this time so that either AND gate 10320 or 10327 will have an output, and the teaching code assignment will be selected from the setting of the teaching switches in row 10309.

If switch 10343 is not closed then bus 10367 will not be active and as will be shown later none of the other inputs to OR gate 10336 will be active until after time $C_4$ so that OR gate 10336 will not have an output on bus 10319; however, bus 10333 will be active and since bus 10317 is active at this time AND gates 10334 or 10337 will have an output at the time of the comparator output on either bus 5636 or 5635.

Permissible mode bits

The teaching code assignment for the fourth and fifth bits is always established by the setting of the teaching switches. As was explained previously bus 10283 will always be active from $C_4$ to $C_6$ so that OR gate 10336 will always be active from $C_4$ to $C_6$ supplying one input to AND gates 10320 and 10327 and since bus 10317 will always be active at this time either AND gate 10320 or 10327 will have an output determined by the setting of the teaching keys.

End-of-sequence bit

Manual setting of a second switch will determine whether the teaching code assignment for the sixth, or end-of-sequence bit, is established from the setting of the teaching keys or from the end-of-sequence mark from the tape buffer.

123

Switch 10344 in FIG. 103 controls the source of the teaching code corresponding to the sixth output bit or the end-of-sequence bit. If switch 10344 is open then the teaching code assignment will be established by the setting of the teaching keys and will appear on the output of either AND gate 10320 or 10327. If switch 10344 is closed the teaching code assignment will be established by the tape buffer, and will appear on either bus 10339 or 10341. AND gate 10342 will have an output on bus 10360 between time $C_6$ and $C_7$ if switch 10344 is closed since bus 10346 supplies the other input. At the same time the signal on bus 10317 will disappear thereby prohibiting any signal from AND gates 10334, 10320, 10327, and 10337. OR gate 10336 is always active between time $C_6$ and $C_7$ since bus 10346 supplies one input so that if switch 10344 is open the teaching code assignment will be determined by the teaching keys.

Final output bits

Manual setting of a third switch 10362 will determine whether the teaching code assignment for the final output bits, starting with bit 7, will be established from the comparator output or from the setting of the teaching switches during A mode sequencing, during operation in C mode, and during the processing of the last member of a B mode sequence.

If switch 10362 in FIG. 103 is closed, then the teaching code assignment for the final output bits will be established by the setting of the teaching keys under the conditions stated above. If switch 10362 is not closed then the teaching code assignment will be established by the comparator output under the same conditions. AND gate 10347 is active only if all inputs are present. If switch 10362 is closed one input is active. Bus 10208 will be active only during A mode sequencing, during operation in C mode and during the processing of the last member of a B mode sequence after time $P_8$, and bus 10313 will be active after time $C_7$ so that all inputs to AND gate 10347 will be present under the above conditions and OR gate 10336 will be active causing bus 10319 to be active which means that the teaching code assignment will be established by the setting of the teaching keys. If switch 10362 is not closed then AND gate 10347 will not be active and OR gate 10336 will not be active so that the complemented output on bus 10333 will cause the teaching code assignment to be established from the output of the comparator.

Manual setting of a fourth switch 10348 will determine whether the teaching code assignment for the final output bits, starting with the 7th, will be established from the comparator output or from the setting of the teaching switches during the processing of all members of a B mode sequence except the last. The action of switch 10348 and AND gate 10349 is the same as switch 10362 and AND gate 10347 except that the complemented signal of bus 10208 is supplied to AND gate 10349 on bus 10240 so that AND gates 10349 and 10347 may never be active at the same time and AND gate 10349 can only be active during the processing of members of a B mode sequence except the last.

Selection of G-functions for teaching

The teaching code assignment discussed previously is made regardless of whether the machine is in teaching-mode or operating-mode or whether the code is to be used for teaching. The teaching code assignment is always used to calculate a correction for the G-function but the decision as to whether or not the G-function should be modified by the error function so established is made by the teaching criteria circuit in FIG. 56. For all G-functions except those used to produce the steering bits certain of the conditions which have to be met before teaching is allowed to proceed are established by circuits in FIG. 103, and if these conditions are met a signal will appear on bus 10301. Bus 10301 is connected to the

124 teaching criteria circuit of FIG. 56 and to the error parameter C circuit of FIG. 100. The conditions which must be met before teaching will be allowed are dependent upon the output bits under consideration so that different criteria must be met at different times. The one common criteria which must be met is that the machine must be operating in teaching-mode. If criteria established by the circuits in FIG. 103 are met, a class of G-functions is established which includes those which are taught. Any G-function in that class is said to be considered for teaching.

Steering bits

The conditions for allowing teaching of the G-functions which are used to produce the steering bits are controlled only by the position of switches 6699, 6499, 6698 and 6498 and subdivisions thereof in FIGS. 64 and 66. In addition switches 6699 and 6499 and subdivisions thereof must be in the full clockwise position before teaching will be allowed for any G-function other than those used for steering. The teaching method for the steering G-functions is included in the description of FIGS. 64 and 66.

Permissible mode bits

The G-functions used to produce bits four and five, the bits which are used to control the permissible modes, will be considered for teaching only if the permissible modes are not locked and if the permissible modes are to be established automatically during operating mode. If the permissible modes are locked, or if the selection of the permissible modes during operating-mode is to be established manually, then teaching of the G-functions is unnecessary at these times.

AND gate 10350 in FIG. 103 will have an output from $C_4$ time to $C_6$ time if the conditions mentioned above are met. Bus 10283 is active only from time $C_4$ to time $C_6$. Bus 10270 will be active only if the permissible modes are not locked. Bus 10403 will be active only if switch 10401 is thrown so as to energize bus 10403. When AND gate 10350 is active it supplies one input to OR gate 10351 causing an input to AND gate 10352 so that if operation is in the teaching mode bus 10213 will be active thereby causing an output on bus 10301. If AND gate 10350 does not have an output from time $C_4$ to time $C_6$ then OR gate 10351 will not have an output at that time since all other inputs to OR gate 10351 are inactive at that time. In this case a signal will not appear on bus 10301 and teaching may not take place. Unless bus 10213 is active AND gate 10352 will never have an output, and teaching will not take place.

End-of-sequence bit

The G-function used to produce bit six, the end-of-sequence bit, will be considered for teaching if the tape buffer has produced an end-of-sequence mark and if B mode is permissible. It will also be considered for teaching any time B mode is permissible and the end of a B mode sequence is determined by the end-of-sequence bit alone providing an A mode sequence is not being processed. All the above conditions are dependent on the fact that the machine must be in teaching-mode.

AND gates 10353 and 10354 may be active only from time $C_6$ to time $C_7$ since that is the only interval of time a signal will appear on bus 10346. If B mode is permissible bus 10415 is active and if an end-of-sequence mark has occurred bus 10229 is active so that AND gate 10354 will be active supplying an input to OR gate 10351 and thereby allowing teaching to take place if bus 10213 is active, as was explained previously.

If the end of a B mode sequence is established by the end-of-sequence bit alone bus 10296 is active and if an A mode sequence is not being processed bus 10251 is active and if B mode is permissible bus 10415 is active so that AND gate 10353 will have an output which will supply an input to OR gate 10351 and thereby allow teaching to take place if bus 10213 is active.

Final bits

Teaching of the G-functions which produce the final bits, starting with bit number seven, will be considered if the final output bits are allowed to shift all the way into the shift register and operation is in teaching mode, provided a manual switch is closed for the bits it is desired to consider for teaching. The object of allowing the option of teaching only specific G-functions is useful when, in certain exceptional cases, it is necessary to teach the machine to ignore a signal. In this case it is only necessary to teach one or a few G-functions to give zero output from the comparator.

Circuits to select for consideration for teaching the first and last of the final G-functions are shown in FIG. 103 as typical. Similar circuits are used for all other final G-functions as indicated by the break lines in FIG. 103. A description of one of these circuits will be sufficient to show how all of them function since they are identical except for timing pulses.

If switch 10355 in FIG. 103 is closed one input is supplied to AND gate 10356 and if the final bits are allowed to shift all the way into the output register bus 10209 will be active after $P_8$ time and at $P_8$ time bus RC8 will be active then AND gate 10356 will supply an input to OR gate 10351 which will cause bus 10301 to be active if operation is in the teaching-mode and bus 10213 is active. AND gate 10356 will not allow teaching during the time bus RC8 is active if switch 10355 is open.

Consideration for teaching all other final G-functions is established by similar circuits except that different stages of the ring counter are used to activate the AND gates.

G-function count

The circuit in FIG. 99 which controls the error parameter C requires a count of the number of G-function which are considered for teaching and the number of those considered which are actually taught. During self-assignment of the teaching code all functions which are considered for teaching are taught, so counts of the functions will not be recorded if the teaching code assignment is established by the comparator output and the circuit of FIG. 99 is rendered inoperative under this condition, with the exception that manual control of it may be retained.

If a particular G-function is to be considered for teaching bus 10301 in FIG. 103 will be active until at least the C time following the reading of the function from the G-memory. If the function is to be taught then shortly after the P time following the reading of the G-function bus 5646 in FIG. 56 will become active and remain active until the next P time.

In FIG. 103 AND gate 10357 will pass the pulse on bus 6451 at the B time if bus 10301 is active, indicating the previous G-function is considered for teaching, and if bus 10319 is active indicating the teaching code is not self-assigned. The pulse which passes AND gate 10357 to bus 10310 is used in the circuit of FIG. 99 to step the counter which counts the total number of functions that are considered for teaching.

If the function is actually taught then bus 5646 is active so that the pulse on bus 10310 will also pass AND gate 10358 to bus 10311. The pulse on bus 10311 is used to advance the counter in FIG. 99 which counts the total number of functions which are actually taught.

The G-functions used for steering are not used to establish the counts for the circuits in FIG. 99.

Comparator gap control

The dual gap comparator in FIG. 56 is used to quantize the output of the correlator for use as the machine output. The use of bounded gaps in the comparator allows the quantizing process to be made very discriminating when desired; however, in determining the output bits which are used by the machine to control its own internal operation a binary decision is always required and in this case it is desirable to remove the bounds on the gaps so that the binary decision will be made. A binary decision is also required at all times when the comparator output is used to establish the teaching code assignment.

If a binary decision is required for the above reasons, the lower-bound on the gaps is set at zero and the upper-bound is removed completely. Provision is also made so that the upper-bound may be removed manually at any time by setting a switch.

If bus 10303 in FIG. 103 is active then the lower-bounds of the comparator gaps will be held at zero voltage and if bus 10302 is not active the upper-bounds of the comparator gaps will be removed.

Before time $C_7$ flip-flop 10335 is in the A state causing bus 10318 to be active thereby causing an output from OR gate 10363 on bus 10303 which holds the lower-bound of the comparator gaps at zero. At any time a signal appears on bus 10303 the complemented output of OR gate 10363 is not active so that AND gate 10364 will not have an output on bus 10302 and the upper-bounds of the comparator gaps will be removed.

If the operation is in teaching-mode and the teaching code assignment is self-assigned, bus 10213 and 10333 will be active causing an output from AND gate 10366 which in turn will cause OR gate 10363 to have an output thereby removing the upper-bounds of the gaps and setting the lower-bounds to zero.

The upper-bounds of the gaps may be removed at any time by opening switch 10365 thereby keeping AND gate 10364 from giving an output on bus 10302.

The integral of the square of the signal, or its energy content, appears on bus 7201, and the square root operation of amplifiers 5629 and 5623 together with diodes 5630 and 5631 are described under Square Root Circuit, FIG. 56, given hereinbelow, which explains that plus or minus the square root of the energy content are placed on buses 5602 and 5603.

The output of amplifier 5629 at 5602 has a potentiometer 5621 connected at 5625 to resistor 5622, to ground. The output of amplifier 5604 is connected to resistor 5623, which at junction 5626 connects to potentiometer 5624, to ground. Potentiometer 5621 can be used to manually control the position of the upper gap, while potentiometer 5624 controls the position of the lower gap near zero.

The correlated signal V appears on bus 6001, is amplified by amplifier 5606 and its output at 5601 is applied to amplifier 5605 for reversal which places the signal at bus 5627. The potentiometer signal at bus 5614 is applied through resistors to transistors 5612 and 5609 for upper gap control. For lower gap control the potentiometer signal on bus 5615 is applied to analog switch 5611, to transistors 5613 and 5608. If V at 6001 is minus in sign, then 5601 has plus V, while 5627 has minus V. The polarities can be suitably reversed by the insertion of suitable reversing amplifiers in the chain to 6001. Bus 5627 connects to analog switch 5616 and transistor 5613, combining therein its current with that derived from potentiometer output 5615. Switch 5616 controls current from 5627 into transistor 5609. The signal at 5601 is applied to analog switch 5617 and to transistor 5608, and its current is combined to the base of the transistor with that on bus 5615. Analog switch 5616 controls current to 5609, while analog switch 5617 controls current into 5612. Analog switch 5611 connects to the lower bound potentiometer bus 5615. If bus 10303 is active, it controls gate 5611 to conduct placing 5615 at ground, thus making the lower bound gap equal to zero. If bus 10302 is not active, its connection to switches 5616 and 5617 will open them to remove the upper-bound of the gaps.

Assume that bus 10302 is active while 10303 is not. Further the choice of suitable routine reversals of amplifiers to bus 7201 causes the polarity at 5614 to be minus while that on bus 5615 is plus, and the diodes 5630 and 5631 are suitably polarized. If the absolute value of minus V at 5627 is greater than the value of the lower gap voltage on bus 5615, relatively more negative current will flow into the base of the transistor 5613 thus raising its output voltage positively to the base of transistor 5637, which will produce a negative voltage on bus 5619 to prime C of FF 5632. When the latter has applied to it at E' a pulse from bus 6453, which occurs slightly after P times, then FF 5632 will turn over to the B state activating bus 5636 to the signifying condition that the voltage of V is in the positive or upper gap. If the absolute value of the voltage on bus 5627 is less than the value of the voltage at bus 5615, then the net relative current into transistor 5613 will be positive, thus lowering the voltage into the base of transistor 5637 and causing the voltage at 5619 and prime of C of FF 5632 to be positive, thus preventing the operation of the FF, signifying that V is not in the upper positive gap, but may be in the gap around zero or in the lower or negative gap. On the other hand, the polarity of V at 5601 is opposite to that at 5627. With a reversal of V, currents to transistor 5608 from both 5615 and 5601 perform in the same manner as currents to 5613 and produce the same type of results, except that the chain of signals goes through 5638, 5620, and C of FF 5633. The latter will turn to state B and places a signal on bus 5635 signifying that V is in the lower or negative gap. If V is not of sufficient magnitude to cause priming of FF 5633, the latter will not turn over so that bus 5635 will not have the identifying signal; then, V is in the inside gap around zero. Assume gates 5616 and 5617 are conducting. If 5615 is positive then 5614 is negative and of magnitude according to the setting of 5621. Currents to the base of transistor 5612 from 5617 and 5614 combine such that for the upper gap signals of V, 5617 will deliver positive current to 5612 of less value than the negative current from upper-bound of the upper gap. Therefore, transistor 5612 will remain conducting leaving control to transistor 5613. If V is more positive than the absolute magnitude of the voltage at 5614, then the net current into transistor 5612 will be positive to cut off the flow of current to 5613, resulting in negative current to transistor 5637, thus preventing the prime voltage on C of FF 5632. This causes any V signal, of greater value than the upper-bound of the upper gap, to fail to give on output at bus 5636. V signals actually in the upper gap range will cause such output.

In a similar manner, with V signals in the negative range of absolute values less than that of the greatest negative bound of the lower gap, the voltage at 5627 will be positive and it will cause positive current to flow via 5616 to transistor 5609 which is also fed from bus 5614. With higher negative current from the latter, transistor 5609 will conduct leaving control up to transistor 5608 which operates as explained above. If the positive voltage at 5627 is greater than the absolute value of the greatest negative bound of the lower gap, then a net positive current into the base of transistor 5609 will place it in cut off condition and prevent control by transistor 5608, thus furter preventing, via 5638, 5620 to C of FF 5633, the establishment of a signal on bus 5635. With 10302 inactive 5616 and 5617 are open, with no positive currents to either transistor 5612 or 5609; thus they cannot be cut off resulting in the removal of the upper-bounds on either the positive or negative gaps.

At the appropriate times either FF 5632 or 5633 is reset by P pulses on bus 6449 applied to the respective E terminals.

The teaching criteria enabling circuit is controlled by code assignment buses 10306, 10307, and 10308. The outputs of AND gates 5639, 5640, and 5641 can be activated with FF 5632 normal. Control goes through OR gate 5642, then through AND gate 5643, enabled by teaching criteria enabling bus 10301, to prime C of FF 5644. At P time FF 5644 is turned to state B activating bus 5646 to permit the teaching or alteration of the G function then being processed. DF 5645 also turns over at the same time by being pulsed at E. When DF 5645 restores, there is a negative leading edge at A which will hit E of FF 5644 to restore it and remove the activation of bus 5646. Manual setting by switch 5647 is rendered for the teaching criteria enabling circuit.

The A sides of FF's 5632 and 5633 are applied to AND gate 5618 which enables AND gate 5639. Bus 10307 is activated for zero teach. Plus or minus teach polarities are under control of buses 10306 and 10308. AND gate 5618 also primes DF 5634. The latter is turned over by pulses RC2 or 6216. Pulses at 6216 shift the output shift register. If 5634 is turned over, activation of bus 5607 is prevented and transfer from the shift register to the output register is prevented according to FIG. 62. If every machine operation finds the result in either the positive or negative gap, then DF 5634 cannot operate and bus 5607 is activated, thus permitting transfer to the output register.

*Selection of source of codes for G-memory selector*

The code pulses to operate the G-memory selector in FIG. 66 will originate from the comparator output during operating-mode and from the teaching code assignment during teaching mode.

In FIG. 104 bus 10213 is energized during teaching-mode so that AND gates 10441 and 10442 will pass pulses on buses 10308 and 10306 respectively from the teaching code assignment circuit. These pulses will be transmitted by OR gates 10443 and 10444 to buses 10418 and 10419 which are connected to the circuit in FIG. 66. In operating mode bus 10213 is not energized but bus 10215 is energized so that AND gates 10445 and 10446 will pass pulses on buses 5635 and 5636 respectively from the comparator output. These pulses will be transmitted by OR gate 10443 and 10444 to buses 10418 and 10419 to operate the circuits in FIG. 66.

The circuit of FIG. 58 is the main run-halt circuit for the machine when the tape version of the magnetic storage medium for the G-memories is used. The machine is allowed to start in one of two alternate ways depending on whether the input signal is to be transformed by the circuit of FIG. 54.

If the input signal is to be transformed by the circuit of FIG. 54 then the high speed tube buffer will read the signal into the circuit of FIG. 54 prior to the time the magnetic tape starts to move. This preliminary reading of the signal is used to obtain the integral of the absolute value of the signal before it is transformed. If the input signal is not to be transformed then this preliminary processing is unnecessary and the input tube buffer does not begin reading until time C1.

As soon as all criteria are met for the machine to start, a pulse will appear on bus 10201 from FIG. 102 and if the signal is to be transformed bus 10204 will be active and bus 10205 will not be active so that the pulse on bus 10201 will pass AND gate 5813 forcing, delay-flop 5814 to the B state. If the input signal is not to be transformed then bus 10204 will not be active but bus 10205 will be active so that the pulse on bus 10201 will pass AND gate 5843 and OR gate 5816 forcing flip-flop 5817 to the B state.

The delay time of delay-flop 5814 is set so that it will remain in the B state for the length of time necessary to read the information in the high speed tube buffer. When the delay-flop returns to the A state the pulse on bus 5802 passes AND gate 5815 and OR gate 5816 forcing flip-flop 5817 to the B state.

When flip-flop 5817 is in the B state, bus 5805 is active allowing the signal on bus 6450 to pass AND gate 5818 through OR gate 5819 to bus 5801 and the signal on bus 5820 to pass AND gate 5822 and appear on bus 5807 and the signal on bus 5821 to pass AND gate 5823. The signal on bus 5805 is also used to cause the jam roller for the tape drive mechanism to engage.

In one adaptation of the invention the information to restore flip-flop 5817 to the A state is contained in the form of a light spot or hole in the tape. The arrangement in such that at the time the tape reaches the halt position photocell 5824 is activated causing a signal on bus 5812 and forcing trigger 5825 to the B state. At the time the trigger 5825 goes to the B state a pulse is presented to the E' input of flip-flop 5817 returning it to the A state. At the time flip-flop 5817 goes to the A state the signal on bus 5804 causes the brake for the tape drive to be engaged and the jam roller is released since the signal on bus 5805 disappears.

As long as a signal appears on bus 5801 the high speed tube buffer will read the signal it has stored. If the signal is to be transformed, then the time delay-flop 5814 turns to the B state and bus 5803 causes OR gate 5819 to become active thereby creating a signal on bus 5801 for as long as the delay-flop remains in the B state. When flip-flop 5817 is in the B state bus 5801 will be active from each C time to the following P time which is the time bus 6450 is active.

At the D time when flip-flop 5817 returns to the A state the master reset pulse on bus 5806 is generated by the reset generator consisting of delay-flop 5826, transistor 5827, resistors 5828 and 5829 and capacitor 5830. This general configuration for a reset generator is used in many other places throughout the machine. At the time flip-flop 5817 returns to the A state a pulse on bus 5804 forces delay-flop 5826 to the B state causing the base of transistor 5827 to go negative thereby causing the transistor to stop conducting and allowing bus 5806 to assume a voltage close to the positive voltage applied at point 5831. When delay-flop 5826 is in the A state the base of transistor 5827 is held positive by the voltage applied at point 5831 through resistor 5828 so that the transistor will conduct through resistor 5829 and the voltage on bus 5806 will be a negative value close to the voltage applied at point 5832. The positive voltage pulse appearing on bus 5806 during the time delay-flop 5826 is in the B state is used throughout the system primarily to reset flip-flops.

The P pulses are read from the magnetic memory by the read head 5833 and amplified by the amplifier 5834 in such a way that the pulses are negative on bus 5820. During the time flip-flop 5817 is in the B state and the magnetic tape is moving the P pulses will appear on bus 5807.

The clock pulses are read from the magnetic memory by read head 5835 and amplified by amplifier 5836. The output of amplifier 5836 is used to actuate the trigger 5837 so that a series of negative pulses will appear on bus 5821 to be used as the clock pulses. These pulses will be written on the track as sinusoidals or pulses with a 50% duty cycle so that the time on is equal to the time off. The clock will be written so that there is a series of $k$ pulses in a row separated from the next series of $k$ pulses by one blank space where no pulse appears. The number $k$ is determined by the number of bits, not including the sign bit, provided for digital storage of the G-function when the digital version of the memory is used. There will be an integral number of groups of $k$ pulses plus a blank space between the times when successive P pulses and between each C time and the successive P time or D time, as the case may be. When written on the magnetic medium there will be a clock pulse in each of the first $k$ pulse positions after the P pulse and the $k+1$ position will be left blank. Thus the last pulse position before each P pulse time will be left blank. In one adaptation, it is necessary to have available the following pulse trains all synchronized with the clock track on the magnetic medium. The first pulse train should be the same as that on the magnetic medium but delayed by one pulse period so that no pulse will appear in the first pulse position after each P pulse and a pulse will be in each pulse position preceding a P pulse. The second pulse train should have a pulse in every pulse position. The third pulse train should have a pulse in every position that a pulse is missing in the first pulse train.

The pulse train on bus 5821 will be identical with that on the magnetic medium so that after bus 5805 becomes active the pulse train will pass AND gate 5223 and appear on bus 5834. Delay line 5833 will delay the pulse train one pulse rate period so that the first pulse train described above will appear on bus 5810.

Since the pulse trains on bus 5810 and bus 5834 are relatively displaced by one pulse period and each has one pulse missing out of a total of $k+1$ pulses, then OR gate 5838 will have a pulse on one or the other or both inputs at every pulse time so that bus 5808 will have a pulse train with every pulse position occupied by a pulse.

Since the pulse train on bus 5821 has a 50% duty cycle the complemented pulse train on bus 5839 is delayed one pulse period by delay line 5840 and used to gate out one pulse of the pulse train appearing on bus 5808 which will occur at the time of the missing pulse on bus 5810. The only time a pulse will pass AND gate 5842 will be when the long pulse on bus 5841, corresponding to the missing pulse on bus 5810, allows a pulse on bus 5808 to pass AND gate 5842 and appear on bus 5811. At all other times the pulse trains on bus 5841 and bus 5808 are out of phase so that no pulses will pass AND gate 5842.

Drum run-halt circuit (FIG. 57)

The circuit in FIG. 57 serves the same purpose for the drum version of the magnetic memory as the circuit in FIG. 58 does for the tape version of the memory. Only minor modification to the circuit of FIG. 58 are necessary to make the change from the start stop tape drive unit to the continuously rotating drum. At the time bus 10201 in FIG. 102 becomes active the drum may not be in the start position so the circuit must wait until the drum rotates to the correct position before processing starts. In FIG. 57 flip-flop 5722 serves the same function as delay-flop 5814 in FIG. 58 and flip-flop 5723 serves the same function as flip-flop 5817. All similarly numbered output buses in FIGS. 57 and 58 may be used interchangeably throughout the machine except that FIG. 57 will always be used with the drum memory and FIG. 58 with the tape memory. Throughout all other figures in the specification, numbers from FIG. 57 have been used when buses from the run-halt circuit have been required. Only the ways in which the circuit in FIG. 57 differs from that in FIG. 58 will be described and it should be assumed that all other parts of the circuit in FIG. 57 will be the same as the corresponding parts previously described in FIG. 58.

As before, there are two alternative ways of operation for the circuit of FIG. 57 depending on whether the input signal is to be transformed by the feedback transformation circuit in FIG. 54.

If the signal is to be transformed, then the preliminary processing will take place between the times of the $P_0$ pulse and the D pulse immediately following. The time between the $P_0$ pulse and the D pulse will be equal to the time between any C time and the following P time. At the time of the D pulse the main processing will start. If the signal is not to be transformed the preliminary processing is not done and the circuit of FIG. 57 will not act at the time of the $P_0$ pulse but will wait until the time of the D pulse.

If the input signal is to be transformed when bus 10204 will be active and at the time bus 10201 becomes active AND gate 5717 in FIG. 57 will have an output on bus 5718 which is connected to the C input of flip-flop 5722. $P_0$ pulses are picked up from the drum by read head 5713, and are amplified by amplifier 5715 to appear as a signal on bus 5709. The first $P_0$ pulse after bus 5718 becomes active will force flip-flop 5722 to the B state. Flip-flop 5722 will remain in the B state until the next D pulse picked up by read head 5724 is amplified by amplifier 5716 and appears on bus 5712 at which time flip-flop 5722 will be forced to the A state and flip-flop 5723 will be forced to the B state since its C input is primed by the signal on bus 5703 through OR gate 5721. Flip-flop 5723 will be returned to the A state at the time of the next pulse on bus 5712.

If the input signal is not to be transformed by the circuit in FIG. 54 then bus 10205 will be active so that at the time bus 10201 becomes active AND gate 5719 will have an output on bus 5720 causing OR gate 5721 to prime flip-flop 5723 on C. At the time of the first D pulse on bus 5712 after bus 5720 becomes active flip-flop 5723 will be forced to the B state and it will be returned to the A state at the time of the second D pulse on bus 5712.

Start anticipator (FIG. 45)

The purpose of this device shown in FIG. 45 is to receive a signal from the environment and delay it before passing it on to the input tape buffer. This allows the buffer to start the tape and get it up to speed before the signal arrives.

The device is an endless loop of magnetic recording tape 4514 which is moved continuously by capstan 4515. The tape passes erase head 4504, write head 4505 and reading head 4506 in that order.

Input from the environment is brought in on bus 4501 and passed through amplifier 4502 and automatic gain control circuit 4503. Another possible input is from bus 5902 through a resistor to the summing point of amplifier 4502. The source and the time of occurrence of this input is discussed in connection with FIG. 59.

Automatic gain control circuit 4503 is the same type of circuit shown in FIG. 28. The output of this circuit is connected as one input to the summing point of amplifier 4508 whose other input is from oscillator 4507. This oscillator provides the recording bias frequency used in accordance with common practice in magnetic recording. The output of amplifier 4508 goes to recording head 4505 and this records the incoming signal on tape 4514.

The output of automatic gain control circuit 4503 also goes to rectifier and filter circuit 4511 which is the same type of circuit shown in FIG. 81. The output of rectifier and filter circuit 4511 is connected to the E input of trigger circuit 4512 which is the same type of circuit shown in FIGS. 82 and 88. A signal input to the trigger circuit will actuate it and cause a signal on its B output as long as the input signal is present. The B output is bus 4513 and is connected to the input tape buffer as a signal that data will soon be transmitted on bus 4510.

When the signal recorded by head 4505 reaches reading head 4506, it is picked up and passed through amplifier 4509 and sent on to the input tape buffer over bus 4510.

Input tape buffer (FIG. 46)

The purpose of the input tape buffer is to record data as it is presented by the environment and to furnish this data to the Learning Machine when the machine requests it.

It also detects the end of a sequence of input data segments and records a mark on the tape indicating this.

FIG. 46 is a block diagram illustrating this device. As shown in this figure, it uses a continuous loop of tape 4601 which is moved in a clockwise direction. This is a duel channel tape which passes under erase heads 4605 and 4606, recording heads 4602 and 4627 and read heads 4614 and 4646. One channel is used for recording the input data and the other for recording a mark denoting the end of a sequence of segments of information. An end of sequence is determined by the absence of any input data for a specified length of time. The tape normally stands still and moves only when data is being recorded or read out.

During the recording operation the tape is moved by the action of jam roller 4607 and capstan 4603. Solenoid 4608 is the same circuit whose symbol is shown in FIG. 89 and whose circuit detail is shown in FIG. 80. When a signal is present on bus 4612, solenoid 4608 is energized and attracts the arm attached to jam roller 4607 which causes it to rotate about pivot 4647 and pinch tape 4601 between capstan 4603 and jam roller 4607. Capstan 4603 rotates continuously but does not have enough friction between its surface and the tape to move the tape unless the tape is forced against it by the jam roller.

Tape moved by capstan 4603 is pulled over tape guide 4604 and under erase heads 4605 and 4606 and recording heads 4602 and 4627 and accumulates in a loop shown in FIG. 46 to be to the right of capstan 4603. Erase heads 4605 and 4606 are connected to oscillator 4637 by bus 4638. The oscillator is always on and therefore tape passing under the erase heads will always be erased.

A signal on bus 4613 will energize solenoid 4610 which will attract the arm of brake 4609 and force the brake down pinching the tape between the brake and tape guide 4604. This will prevent the tape from moving.

During the reading operation, the tape is moved by the action of capstan 4615, jam roller 4617, and solenoid 4619 in a manner similar to that described for capstan 4603. Brake 4618 operates in a manner similar to that described for brake 4609. Solenoid 4619 is controlled by a signal on bus 4621 and solenoid 4620 by a signal on bus 4622. Reference to FIG. 46 shows that one of these is the output of AND-gate 4649 and the other the complemented output of that gate. Therefore, one or the other of these solenoids will always be energized but never both.

The loop of tape between capstan 4603 and tape guide 4616 provides space for tape to accumulate when it has recorded data being held for transfer to the signal transformation circuit. The tape passes under roller 4624 which is pulled downward by spring 4625. Normally the spring pulls roller assembly 4624 down so that switch 4626 connects the negative voltage source to bus 4645. If the length of tape between capstan 4603 and tape guide 4616 becomes short enough, roller 4624 will be raised high enough to actuate switch 4626, and connect the negative voltage supply to bus 4644.

Input data comes in on bus 4510 and is passed directly through amplifier 4630 and is present at its output on bus 4631. FIG. 46 shows that bus 4631 is connected to rectifier and filter circuit 4632. This circuit is of the type shown in detail in FIG. 81. The output of rectifier and filter circuit 4632 is bus 4653 and is connected to the input of trigger circuit 4634. As long as the signal on bus 4631 is strong enough there will be a signal on bus 4653 which will keep the trigger circuit actuated. Therefore there will be a signal at its B output on bus 4635 during the time an input signal is present on bus 4510 and a signal at the A output on bus 4660 when no such input signal is present.

Bus 4635 is one input to OR-gate 4661 whose output is connected to the E′ input of flip-flop 4664 and thus this flip-flop will always be in the A state immediately after the start of an input signal. Bus 4635 is also one input to OR-gate 4611 whose output is an input to AND-gate 4666. The other input to AND-gate 4666 is through bus 4665 from the A output of flip-flop 4664. Since both of these inputs to this AND-gate are energized when input is present on bus 4510, at this time there will be a signal at its output on bus 4612. A signal on this bus activates the control of solenoid 4608 and causes capstan 4603 to drive the tape all the time an input signal is present on bus 4510.

The signal present on bus 4631 is also connected to the summing point of amplifier 4636 through resistor 4633. Another input to the summing point is from oscillator 4637 through bus 4638 and resistor 4639 and therefore the output of the amplifier on bus 4640 is the sum of the input signal and the oscillator frequency. The oscillator frequency and amplitude is adjusted to give the proper bias for magnetic recording in accordance with standard practice in the industry. Bus 4640 is connected to recording head 4602 which records the signal on the tape.

When the input signal ceases, the signal on bus 4653 will decrease and trigger circuit 4634 will return to the A state. This removes the B output signal on bus 4635 which results in de-energizing solenoid 4608 and capstan 4603 will cease to drive the tape.

At the end of each segment of input data a determination is made as to whether or not it was the end of a sequence of such segments. The criterion for an end of sequence is that no input data is received for a specified length of time. If it is the end of a sequence, a pulse is recorded on the second channel of the tape.

Reference to FIG. 46 shows that flip-flop 4664 has its E input connected through switch 4667 to bus 4660, the A output of trigger circuit 4634. This switch is closed except when it is not desired to have the input tape buffer determine the end of a sequence. As its input is self primed, flip-flop 4664 will be forced into the B state at the time the input data ceases. It is to be left in this state until more input data arrives or until the length of time which determines an end of sequence has expired. FIG. 46 shows that the A output of flip-flop 4664 is connected to the control of diode switch 4668. Therefore when the flip-flop is in the A state the switch will be conductive. The diode switch is in a path from the output of amplifier 4669 through resistor 4671 and diode switch 4668 to the summing point of the amplifier. Capacitor 4670 is also connected from the summing point to the output of the amplifier and the summing point is connected through resistor 4672 to a negative reference voltage. When diode switch 4668 is not conductive, capacitor 4670 will accumulate a charge at a uniform rate and the voltage output of the amplifier will rise in a positive direction at a uniform rate. The time required for the output of amplifier 4669 to rise to a predetermined voltage level is adjusted to be the length of time required to determine the end of a sequence. The voltage level is detected by means of trigger circuit 4675, making use of the fact that the circuit will be actuated when its input is above ground potential. FIG. 46 shows that the output of amplifier 4669 is connected to a negative potential through resistors 4673 and 4674 and that the junction of these two resistors is connected to the E input of trigger circuit 4675. These resistor values are selected so that when the output of amplifier 4669 is at the desired level then the voltage at the input to the trigger circuit is at ground. Therefore when the voltage at the output of amplifier 4669 reaches the specified level trigger circuit 4675 is actuated and produces a signal on its output, bus 4676.

One connection of bus 4676 is an input to OR-gate 4661 and a signal on this bus will therefore force flip-flop 4664 into the A state. The A output of this flip-flop controls diode switch 4668 and will now close the connection between resistor 4671 and the summing point of amplifier 4669. The output of the amplifier will assume a fixed potential and remain there as long as flip-flop 4664 is in the A state. This potential is determined by the values of resistors 4671 and 4672 and the reference voltage to which resistor 4672 is connected.

Another connection of the output of trigger circuit 4675 is through capacitor 4677 to the input of amplifier 4678. The output of this amplifier is connected to recording head 4627. When the trigger circuit is actuated it pulses the input of amplifier 4678 and a mark will be recorded on the tape.

This end of sequence mark is to be recorded adjacent to the end of the last segment and therefore the tape must not move during the time a determination of the end of a sequence is being made. As shown in FIG. 46, the B output of flip-flop is connected by bus 4613 to solenoid 4610. The A output of this flip-flop is one input to AND-gate 4666. Since the flip-flop is in the B state during the time an end of sequence is being determined, then during this time solenoid 4610 is energized which engages brake 4609 and solenoid 4608 cannot be energized so that capstan 4603 cannot drive the tape. Therefore the tape will be held in place.

The number of input data segments recorded on the tape but not yet transferred to the signal transformation circuit is held in binary counter 4628. Its count is kept current by increasing it one each time data is recorded and decreasing it one each time data is read out. This is a bi-directional counter of the type illustrated in FIG. 55. Input is on bus 4651, the add-bus is 4680 and the subtract-bus 4679. The A output of flip-flop 4648 is bus 4679 and the B output is bus 4680 so that one of these buses is always energized but never both.

At the time the input signal on bus 4510 ceases and trigger circuit 4634 returns to A state, this places a signal on bus 4660 which, as FIG. 46 shows, is connected to the E inputs of delay-flop 4650 and flip-flop 4648. This signal will force delay-flop 4650 into the B state which will activate the add-bus. Delay-flop 4650 is activated by the signal on bus 4660 and subsequently produces a signal on its A output which is connected by bus 4651 to the input of binary counter 4628. Since the add-bus is now activated, a pulse on the counter input will increase the input by one.

Requests from the signal transformation circuit come in the form of pulses on bus 4820 which is connected to the E input of flip-flop 4623. The C priming input of flip-flop 4623 is connected to the output of AND-gate 4654 so no pulse on bus 4820 will be effective unless both inputs to this AND-gate are present. One input is connected by bus 4645 to switch 4626 and through the normally closed contacts of this switch to a negative voltage source. Bus 4645 will always have a signal unless the amount of tape between capstan 4603 and brake 4616 is short enough to raise roller 4624 high enough to actuate switch 4626.

The other input to AND-gate 4654 is bus 4681 which is the output of OR-gate 4655. There is an input to OR-gate 4655 from each stage of binary counter 4628 and so there will be an output from the OR-gate on bus 4681 if the number in the counter is not zero. The complemented output of OR-gate 4655 is made available on bus 4652. As the above discussion shows, the two conditions for a request from the signal transformation circuit to be answered are that counter 4628 indicate that recorded data is available on the tape and that the amount of tape under roller 4624 be greater than minimum allowable.

If the request is to be answered, flip-flop 4623 will be forced into the B state. The B output of this flip-flop is an input to OR-gate 4611 and to AND-gate 4649. Movement of the tape by capstan 4615 is controlled by AND-gate 4649. When this gate has an output capstan 4615 drives the tape and when it has no output its complemented output on bus 4621 causes brake 4618 to be engaged and hold the tape.

During the time a request from the signal transformation circuit is being answered, the tape is to be driven by capstan 4615 except when capstan 4603 is prevented from driving the tape when an end of sequence is being determined as indicated by the B state of flip-flop 4664. However, if flip-flop 4664 should go into the B state while the recorded data is being transferred to the signal transformation circuit, it is desirable to have capstan 4615 continue to move the tape until that segment being read out is finished.

Whether data is being read out or not is indicated by the condition of trigger circuit 4658. Data recorded by head 4602 is picked up by reading head 4614, passed through amplifier 4656 to the input of rectifier and filter circuit 4657 and on to the input of trigger circuit 4658. The action of rectifier and filter circuit 4657 and trigger circuit 4658 is the same as that described for rectifier and filter circuit 4632 and trigger circuit 6434. As long as a signal is being picked up by reading head 4614, trigger circuit 4659 will be in the B state and at all other times it will be in the A state. The B output from trigger circuit 4658 on bus 4642 is one input to OR-gate 4683 whose output on bus 4682 is one input to AND-gate 4649.

The A output of trigger circuit 4658 is one input to AND-gate 4684 whose other input is bus 4665, the A output of flip-flop 4664. When flip-flop 4664 is in the A state, there will always be one input to OR-gate 4683 and consequently a signal on bus 4682 regardless of the state of trigger circuit 4658. If flip-flop 4664 is in the B state there will be a signal on bus 4682 only when trigger circuit 4658 is in the B state.

As a result of the above described connections, at the time a request from the signal transformation circuit is accepted, capstan 4615 will begin to move the tape unless the input tape buffer is waiting to determine the end of a sequence. If capstan 4615 is moving the tape but the recorded data has not yet reached reading head 4614 and the input tape buffer is making the determination of an end of sequence, then capstan 4615 will stop moving the tape until such determination is made at which time it will resume moving the tape.

Recorded data picked up by reading head 4614 is put through amplifier 4656 and on to the signal transformation over bus 4659. The end of sequence marker recorded by recording head 4606 is picked up by reading head 4646 and sent through amplifier 4685 and on to the signal transformation circuit over bus 4686. The outputs of trigger circuit 4658, A on bus 4643 and B on bus 4642, are connected to the signal transformation circuit as signals indicating the times when data is being picked up by reading head 4614.

One input to OR-gate 4611 is bus 4644 which is connected to the normally open contact of switch 4626. Thus when the length of tape between capstan 4603 and brake 4616 is short enough to raise roller 4624 and actuate switch 4626, there will be a negative voltage input to OR-gate 4611 causing capstan 4603 to drive the tape unless prevented by flip-flop 4664 being in the B state and removing the signal on bus 4665 from AND-gate 4666. There is a finite amount of time between the beginning of an input signal on bus 4510 and the time capstan 4503 is driving the tape at its operating speed. Any signal recorded on the tape during this interval will be distorted since the tape is changing speed. If it is desirable to avoid this, switch 4663 can be closed which will establish a path from bus 4513 to an input to OR-gate 4611. Bus 4513 originates in the start anticipator circuit which is shown in FIG. 45 and which the description of that circuit shows, will have a signal in advance of the data signal arriving on bus 4510. This signal on OR gate 4611 will allow capstan 4603 to have the tape up to speed before the data signal to be recorded arrives.

Signal transformation circuit (FIGS. 47 and 48)

This signal transformation circuit is illustrated in FIGS. 47 and 48 which may be joined together as shown in FIG. 49 to show the complete circuit. Its function is to transform the incoming signal in such a manner as to obtain a modified signal which is more adaptable for recognition by the learning equipment.

Transformation is accomplished by recording the incoming voice signal, reading it a number of times and each time passing it through a different frequency selective electrical filter. The output of each filter is rectified and passed through a low pass filter to obtain the modulation envelope.

The incoming voice signal is recorded on a cathode ray storage tube in which memory of the signal is retained as a charge density analog. It is deposited by a variable intensity electron beam on an insulated storage screen as it is raster scanned during the writing of the incoming signal. Read-outs are obtained by lowering the storage screen potential until it functions as a control grid and the stored charge pattern varies the amount of a constant, low intensity read beam current which arrives at a collector anode when the storage screen area is scanned.

For the purpose of clarity in the detailed description the signal transformation circuit will be divided into four parts:

(1) The cathode ray storage tube 4738, read amplifier 4730 and write amplifier 4726 all shown on FIG. 47.
(2) The raster scan sweep circuits shown on FIG. 47 and the cathode ray tube deflection circuits shown on FIG. 48.
(3) The control circuits shown on FIG. 48 which sequence the write, read, erase, and prime operating modes of the storage tube.
(4) The read out filter selector circuits shown on FIG. 48.

The cathode ray storage tube 4738 used in this adaptation is of a known and standard type and contains an electron gun composed of cathode 4701, control grid 4702 and an anode 4703 which is maintained at potential of 3500 volts by high voltage power supply 4704. The electron beam formed by this gun is focused on storage screen 4706 by electromagnetic focus coil 4705. The storage screen consists of a fine-mesh wire screen coated with an insulating storage surface. The high anode potential and the operation of the first screen 4707 at 350 volts forms a deceleration lens which assures that the deflected electron beam will be perpendicular to the first screen.

While the specific cathode ray tube illustrated in FIG. 47 and described herein is adapted to the invention, it is to be understood that this is done by way of example only. It is possible to use other types of storage tubes than the one shown to achieve substantially the same results.

The cathode ray tube is operated in several modes called the standby, write, read-ready, read, erase and prime modes. It always goes through these modes in the sequence just named and returns to the standby mode after completing the prime mode. There is a control flip-flop associated with each mode which is in the B state when the operation is in that mode.

During writing, the storage screen is operated at 350 volts and this is higher than the critical potential at which the secondary emission ratio becomes greater than unity. It is thus possible to control the quantity of positive charge remaining at each point by varying the incident beam current as the storage screen is scanned.

During the read-out the storage screen potential is lowered to 10 volts at which point the negative potential of the uncharged areas of the screen is sufficient to cut off a low-density, constant-current beam. As the storage screen is scanned during reading, the amount of beam current passing through an area is proportional to the charge in that area. The output signal is developed across load resistor 4739 which is in series with collector 4708.

After completing the desired number of read-outs, the storage tube must be erased and primed prior to any subsequent write operation. Erasing is performed by writing with a constant high intensity beam current thus normalizing the scanned area at the full modulation level. Priming consists of uniformly charging the storage surface by reducing the storage screen below the critical potential to 20 volts and scanning the storage area with a constant beam current.

Switching of the storage screen potential is accomplished by vacuum tubes 4709 or 4711 and switching of the beam current is obtained by transistors 4714, 4716, 4718, and 4720. Unless one of these transistors is conducting, the beam current is cut off by a potential of −100 volts on the control grid 4702 obtained from the voltage divider action of resistors 4722 and 4723 across the negative 150 volt output of power supply 4740.

During writing operation both vacuum tubes 4709 and 4711 are cut off allowing storage screen to be at +350 volts, the positive output of power supply 4740. In this mode transistor 4714 is allowed to conduct which causes current to flow through variable resistor 4715 which has been adjusted to produce the proper bias on control grid 4702 for the desired writing beam current.

During the reading operation vacuum tube 4709 is driven into positive grid current operation causing current to flow through resistor 4713 and variable resistor 4710 whose value is adjusted to obtain a potential of +10 volts on storage screen 4706. The transistor 4716 conducts which allows current to flow through variable resistor 4717 establishing the proper control grid bias for the desired read beam current.

During erase operation vacuum tubes 4709 and 4711 are cut off as in the writing mode and transistor 4718 is made to conduct causing current to flow through variable resistor 4719 to produce the proper control grid bias for the desired erase beam current.

During prime operation vacuum tube 4711 is driven into positive grid current operation establishing a current path through resistor 4713 and variable resistor 4712 whose value is adjusted to obtain a potential of +20 volts on the storage screen 4706. Transistor 4720 is allowed to conduct which causes current to flow through variable resistor 4721 producing the proper control grid bias to obtain the desired priming beam current.

During write operation diode switch 4725 is conducting thus connecting the incoming signal on bus 4784 to the input of write amplifier 4726. The write amplifier output drives a gamma correction network 4727 whose transfer characteristic is adjusted to make the beam current a linear function of the incoming signal amplitude.

This gamma correction network is of the biased diode type well known in the electronic industry and a description of its operation may be found on page 5–50 of the "Television Engineering Handbook" by Donald G. Fink, published by the McGraw-Hill Book Company. Battery 4728 biases the zero signal point midway on the transfer characteristic which allows for both positive and negative excursions of the incoming signal.

During read operation diode switch 4729 is made nonconducting which allows the signal appearing on collector 4708 to be amplified by read amplifier 4730.

Deflection of the electron beam is accomplished by current through a two orthogonal axis deflection yoke 4733 which is controlled by deflection amplifiers 4734 and 4735. These are preferably direct coupled negative feedback amplifiers in which the feedback voltage is proportional to the deflection yoke current. Resistors 4736 and 4737 bias the quiescent position of the electron beam to the upper left hand corner of the storage screen.

Raster scan of the storage screen is accomplished by applying a sawtooth voltage waveform to the horizontal axis deflection amplifier 4735 and a stairstep voltage waveform to the vetrical axis deflection amplifier 4734. The horizontal sweep sawtooth is generated by integrating a steady voltage and periodically discharging the integrator. The sweep rate gates 4801 shown on FIG. 48 enable the control circuits to adjust the current input to the sweep rate direct coupled amplifier 4802 whose output is the input to integrating amplifier 4805. The output of amplifier 4805 is on bus 4876 which is connected by bus 4776 to the input of horizontal deflection amplifier 4735.

A positive control voltage on any gate input will allow current to flow from a positive voltage source through the resistor associated with that gate to the summing point of amplifier 4802. The amount of current is determined by the value of the resistor. The output of the sweep rate amplifier 4802 furnishes input to the horizontal sweep integrator composed of direct-coupled inverting amplifier 4805 with capacitor 4806 providing the negative feedback path.

When diode switch 4807 is made conductive it establishes a current path from one side of capacitor 4806 through resistor 4808 to the other side of the capacitor. This allows the capacitor to discharge and sets the integrator back to its initial state. Any input to OR-gate 4803 will make diode switch conductive and in this condition amplifier 4805 will not integrate but will remain in its initial state. If any sweep rate gate is enabled when there is no input to OR-gate 4803, the output of amplifier 4805 on bus 4876 increases at a uniform rate. Bus 4876 is connected to a negative voltage source through resistors 4809 and 4810 and the junction of these two resistors is connected to the E input of trigger circuit 4811. The voltage on bus 4876 will increase until the E input of trigger circuit 4811 goes positive and activates it. The B output of the trigger circuit, acting through OR-gate 4804, will actuate delay-flop 4812 whose B output provides a signal input to OR-gate 4803 for the time period of the delay-flop.

This pulse through OR-gate 4803 causes diode switch 4807 to conduct for the pulse duration restoring the integrator output to its initial state. During the write and read modes of operation the integrator is reset periodically by the other input to the OR-gate 4804 just prior to the change of state of trigger circuit 4811.

The output pulse of delay-flop 4812 on bus 4871 adds one to binary counter 4813. The parallel output of counter 4813 energizes the inputs to digital-to-analog voltage converter 4814. This is the same type of circuit shown in FIG. 52 and from the explanation given in connection with that figure it follows that the output current fed to the summing point of direct coupled inverting amplifier 4815 is proportional to the count in counter 4813. The output voltage of amplifier 4815 thus increases stepwise each time the number in counter 4813 is increased. The output of amplifier 4815 on bus 4875 is connected to bus 4775 shown on FIG. 47 which is the input to the vertical axis deflection amplifier 4734. Once the scan cycle has been initiated the horizontal integrator continues to charge and be reset, thus adding to the number in scan line counter 4813 until the counter produces an end-around-carry on bus 4856 or until some other input to OR gate 4817 activates delay-flop 4816. The A output of delay-flop 4816 resets counter 4813.

Control circuit operation

Assume that the signal transformation circuit has just completed the erase and prime modes of operation and has halted in standby mode with standby mode flip-flop 4818 in the B state. Standby mode flip-flop 4818, acting through its connection by bus 4872 to OR gate 4803, holds diode switch 4807 conducting and halts the horizontal integrator. At this time bus 4872 also enables AND gate 4819 which now will admit pulses from pulse generator 4824 to bus 4820 which provides a signal to the input tape buffer indicating that the signal transformation circuit is in the standby mode awaiting receipt of an input signal. When ready, the tape buffer responds with an input function start pulse appearing on bus 4642 and the incoming signal appearing on bus 4659 which is connected to bus 4784 on FIG. 47. This start pulse on bus 4642 forces standby mode flip-flop 4818 into the A state and write mode flip-flop 4822 into the B state. The B output of flip-flop 4822 is connected to transistor 4714 by bus 4877 which is connected to bus 4777. The negative voltage now on this bus will bias the transistor to conduct to saturation causing current to flow through variable resistor 4715 thus producing the proper bias on cathode ray storage tube control grid 4702 to obtain the desired no signal beam current for write mode operation. Bus 4877 is also connected to diode switch 4725 making it conductive and allowing the incoming signal on bus 4784 through to the input of write amplifier 4726 whose output passes through gamma correction network 4727 and drives the storage tube cathode 4701 to vary the writing beam current. The A output of write mode flip-flop 4822 is connected by bus 4873 to the lower sweep rate gate 4801 which at this time activates the raster scan sweep circuits as described hereinabove.

Pulse counter 4825 receives its input on bus 4874 from pulse generator 4824 and puts out a pulse on bus 4885 to AND-gate 4823 for every tenth pulse received. The B output of write mode flip-flop 4822 on bus 4877 provides the other input to AND-gate 4823 which allows the pulse on bus 4885 to get through to the input of counter 4826 on bus 4886. After receiving one hundred twenty eight pulses, counter 4826 produces a pulse on its output, bus 4858, which adds one to counter 4827 and also, through OR-gate 4828 and OR-gate 4804, activates delay-flop 4812 to reset the horizontal sweep integrator and advance line scan counter 4813 one count as described previously. Counter 4826 continues to count pulses representing distance along each scan line and each time it produces an end-around-carry it advances line counter 4827. This continues until such time as the input tape buffer indicates the end of the input function by providing a pulse on bus 4643. This pulse forces write mode flip-flop 4822 into the A state and read ready flip-flop 4830 into the B state.

Returning write mode flip-flop 4822 to the A state will make transistor 4714 non-conductive restoring the storage tube control grid to cut off. It also makes diode switch 4725 non-conductive which disconnects the incoming signal from write amplifier 4726. In addition it removes its input signal to the lower sweep rate gate 4801 and AND gate 4823. The record of the number of scan lines and the length of the last incomplete line is contained in counter 4827 and counter 4826 respectively. This signal duration code is made available on output buses 4870.

Read-ready flip-flop 4830 has its B output on bus 4887 connected to OR gate 4803 which now holds diode switch 4807 conducting and halts the horizontal sweep integrator. The B output of read-ready flip-flop 4830 is also connected to OR gate 4831 whose output on bus 4888 now causes the transfer of the complement of the number contained in counter 4827 into counter 4833. The output of OR gate 4831 also activates delay-flop 4832 whose A output, after the delay, produces a short pulse through OR gate 4934 which adds one to the counter 4833. Counter 4833 is now set so that it will produce an end-around-carry after receiving a number of pulses equal to the number in counter 4827.

The signal transformation circuit of FIG. 49 will remain in the read-ready state until the time normalizer circuit shown in FIG. 51 indicates it is ready to write by placing a control signal on bus 5023 which enables AND gate 4836 and permits clock pulses from pulse generator 4824 on bus 4874 to pass through and force read-ready flip-flop 4830 to the A state and read mode flip-flop 4837 to the B state.

The restoring of the read-ready flip-flop 4830 to the A state removes the control signal on bus 4887 from OR gate 4803 which makes diode switch 4807 nonconductive and releases the horizontal sweep integrator. The A output of read mode flip-flop 4837 on bus 4881 now enables one of the sweep rate gates thus initiating a raster scan as described hereinabove. The B output of read mode flip-flop 4837 is bus 4878 which is connected to bus 4778 and biases transistor 4716 to saturation causing current to flow through variable resistor 4717 thus producing the proper cathode ray storage tube control grid bias potential to obtain the desired read mode beam current. When the circuit of FIG. 47 is used with that of FIG. 48, AND gate 4741 is not used and bus 4778 connects directly to the transistor circuit. Read mode flip-flop 4837 through its A output on bus 4881 which is connected to bus 4781, and resistor 4742 drives vacuum tube 4709 into positive grid current operation causing current to flow through variable resistor 4710 which is adjusted to reduce the potential of the storage screen 4706 to approximately 10 volts above the cathode potential causing the storage screen to obtain control grid action on the beam current. Bus 4878 also activates delay-flop 4732 which, after approximately a 10 microsecond delay, pulses the E input of flip-flop 4731 and forces it into the B state which makes diode switch 4729 non-conducting and allows the signal appearing on collector 4708 to be applied to read amplifier 4730. Bus 4878 is connected to the time normalizer to indicate the start of read-out. The sweep rate gate 4801 enabled by the A output of read mode flip-flop 4837 on bus 4881 applies ten times more input current to rate amplifier 4802 than the gate enabled by write mode flip-flop 4822. Thus the raster is scanned for reading in one tenth of the time required for writing. The B output of read mode flip-flop 4837 enables AND gate 4838 permitting clock pulses from pulse generator 4824 on bus 4874 to pass through to OR gate 4839 whose output goes to the input of binary counter 4840. After one hundred twenty eight input pulses binary counter 4840 produces an end-ground carry pulse which, acting through AND gate 4835 and OR gate 4834, adds one to binary counter 4833 and also through OR gate 4828 and OR gate 4804 activates delay-flop 4812 which resets the horizontal sweep integrator and advances scan line counter 4813 one count. The circuit continues to scan and read out, adding one to binary counter 4833 at the end of each line until counter 4833 produces an end-around-carry pulse on bus 4861 indicating that the last complete line has been scanned. The end-around-carry pulse on bus 4861 is connected to counter 4840 and causes the transfer of the complement of the number contained in counter 4826 into counter 4840 and also activates delay-flop 4841 whose A output, after approximately 5 microseconds delay, puts a pulse through OR-gate 4839 which adds one to the number in counter 4840. The end-around-carry pulse on bus 4861 also forces flip-flop 4842 into the B state which enables AND gate 4843 and disables AND gate 4835. The scan of the final line continues until counter 4840 produces the end-around-carry pulse to OR-gate 4828 whose output resets the horizontal sweep generator as previously described. The output of OR-gate 4828 also is an input to AND-gate 4843 which is now enabled and will pass this pulse on through OR-gate 4817 to the E input of delay-flop 4816. This activates the delay-flop and as it returns to the A state its output signal on bus 4862 to counter 4813 will cause that counter to reset to zero. A previous discussion showed that this counter controls the signal on bus 4875 which is connected by bus 4775 to vertical deflection amplifier 4734 and therefore the beam will be returned to its initial position at this time.

The pulse output of AND-gate 4843 on bus 4863 is an input to OR-gate 4831 whose output on bus 4888 again transfers the complement of the number contained in counter 4827 into counter 4833 and adds one to the number in counter 4833 as previously described. This starts the second read-out of the stored signal. The pulse output of AND gate 4843 on bus 4863 is also connected to the E and E' inputs of each stage and so steps the ring counter 4844 ahead one stage. The read-outs of the stored signal are repeated, stepping ring counter ahead one stage each time until the last stage of the ring is returned to the A state and provides a signal on bus 4821 which forces the read mode flip-flop 4837 to the A state and erase mode flip-flop 4845 to the B state. Bus 4821 is connected to the time normalizer to indicate the end of the read-outs.

By means of the connections described previously, the restoring of read mode flip-flop to the A state makes transistor 4716 and vacuum tube 4709 non-conductive and disables the associated sweep rate gate 4801 and AND gate 4838. The B output of erase mode flip-flop 485 on bus 4879 is connected to bus 4779 and forces flip-flop 4731 to the A state, causing diode gate 4729 to conduct and ground the input to read amplifier 4730. The control signal on bus 4779 also causes transistor 4718 to conduct to saturation causing current to flow through variable resistor 4719 and produce the cathode ray storage tube control grid bias to obtain the desired beam current for erase mode of operation. The A output of erase flip-flop 4845 on bus 4889 also enables one of the sweep rate gates 4801 causing the raster scan circuits to operate as described hereinabove. The sweep circuits proceed through the raster scan until completion is indicated by an end-around-carry pulse from scan line counter 4813 on bus 4856. This end of scan pulse forces erase mode flip-flop 4845 into the A state and prime mode flip-flop 4846 into the B state.

The restoring of erase mode flip-flop 4845 to the A state cuts off transistor 4718 and disables the associated sweep rate gate 4801.

As flip-flop 4846 changes from the A to B state, its B output on bus 4880 goes from a positive to a negative voltage. Transistor 4847 is normally conducting since its base is returned to ground through resistor 4868, but when bus 4880 goes negative its connection through capacitor 4867 to the transistor base will cause the transistor to be cut off until the charge on capacitor 4867 adjusts to a new value. The collector of the transistor is labeled "R" and is connected to all flip-flops marked with a connection R. This bus has been held negative as long as the transistor is conducting but when the transistor is cut off it will go positive and all the flip-flops connected to it will be forced into the A state except flip-flops 4846 and 4844–1 which are forced into the B state. Bus 4880 is connected to bus 4780 and now biases transistor 4720 to saturation causing current to flow through variable resistor 4721 producing the proper cathode ray storage tube control grid bias to obtain the desired beam current for prime mode operation. The A output of prime mode flip-flop 4846 on bus 4882 is now positive and drives vacuum tube 4711 into positive grid current operation causing current to flow through variable resistor 4712 which is adjusted to reduce the potential of the storage screen to approximately 20 volts above that of the cathode. Bus 4882 also enables the top sweep rate gate 4801 which activates the sweep circuits. The sweep circuits proceed through one raster scan until completion is indicated by an end-around-carry pulse from scan line counter 4813 on bus 4856. This end of scan pulse forces prime mode flip-flop 4846 into the A state and standby flip-flop 4818 into the B state completing one operational cycle.

Read-out filter circuits

The output of the read amplifier 4730 appearing on bus 4748 is connected to ten frequency selective filters 4850. The first filter 4850–1 preferably passes all frequencies with the others passing only selected portions of the frequency spectrum of the signals obtained by read-out from the storage tube. The output of each filter is rectified and passed through an associated low pass filter envelope detector 4851 and the output of each envelope detector is connected to an associated diode switch 4852. These diode switches are normally nonconducting and are made conducting sequentially one at a time by ring counter 4844. During the first read-out ring counter stage 4844–1 causes diode switch 4852–1 to conduct such that the detected envelope of all-pass filter 4850–1 appears on bus 4853. At the start of the second read-out the ring counter advances such that stage 4844–2 causes diode switch 4852–2 to conduct so that the detected envelope of the output of filter 4850–2 appears on bus 4853. In a similar manner as the read-outs proceed, the ring counter sequentially connects bus 4853 to the output of each of the envelope detectors in turn until all filters have been utilized, once at which time the read-out is complete and the unit proceeds to erase the storage as described hereinabove. Bus 4853 connects the read-out signal to the input of the time normalizer circuit.

Signal time normalizer (FIGS. 47 and 50)

The signal time normalizer circuit is shown in FIGS. 47 and 50 which should be joined in the manner shown in FIG. 51 to form the complete circuit. The circuits serve as a temporary storage of the incoming signals from the signal transformation circuit and provide the System II circuits repeated high speed read-outs of the stored signal modified by expansion or compression of the time scale so that all signals will be of equal duration upon read-out. It also serves as a buffer making the high speed processing of the signals by the learning circuits compatible with the slower input signal rate.

This is accomplished by using a cathode ray tube to store the incoming signal as a charge density analog, deposited by a variable intensity electron beam on an insulated storage screen which is raster scanned during writing of the incoming signal. Read-outs are obtained by lowering the storage screen potential until it functions as a control grid allowing the stored charge to vary the amount of a constant low intensity read beam current which arrives at a collector anode.

The cathode ray tube used is similar to that described in connection with the signal transformation circuit shown in FIGS. 47 and 48 and in the same manner also operates in the standby, write, ready-ready, read, erase and prime modes in that order. During read-out the raster is scanned at a sweep rate proportional to the original signal duration. This results in all signals requiring the same duration for read-out.

For the purpose of clarity, the detailed description of the signal time normalizer circuit will be divided into three parts.

(1) The cathode ray storage tube and the read and write circuits shown on FIG. 47. These circuits are identical to those described hereinabove under the signal transformation circuits.

(2) The raster scan sweep and deflection circuits. These circuits are identical to those described hereinabove under the signal transformation except as follows: During the reading mode the input to the sweep rate amplifier 5002 is under control of the decoder network 5018 and is not operated from a gate in the group of gates 5001. Decoder unit 5018 is the same as the circuit shown in FIG. 52 and described in connection with that figure. Parallel digital input to digital-to-analog converter 5018 is supplied by signal duration code register 5019 which has received this code on buses 4870 from counters 4826 and 4827 shown on FIG. 48. During the read mode of operation, the voltage output of sweep rate amplifier 5002 is proportional to the signal duration. Register 5019 is cleared at the termination of the read mode of operation thus causing the output of digital-to-analog converter 5018 to fall to zero. Amplifier 5002 and 5005, resistor 5008, capacitor 5006 and diode switch 5007 correspond to amplifiers 4802 and 4805, resistor 4808, capacitor 4806 and diode switch 4807 shown on FIG. 48 and the description of the operation of these circuits given in connection with FIG. 48 applies to their counterparts in FIG. 58. The ouput of amplifier 5005 is on bus 5076 and is connected by bus 4776 to the input of horizontal deflection amplifier 4735.

The operation of the vertical deflection circuit using trigger circuit 5011, resistors 5009 and 5010, delay-flop 5012, scan line counter 5013, digital-to-analog converter 5014 with reference voltage on bus 5037 and amplifier 5015 is the same as the corresponding circuits designated 4811, 4809, 4810, 4812, 4813, 4814, and 4815 shown on FIG. 48 and previously described in connection with the signal transformation circuit. The output of amplifier 5015 is on bus 5075 and is connected by bus 4775 to the input of vertical deflection amplifier 4734.

(3) The control circuits which sequence the standby, write, read, erase, and prime operating modes.

Assume the time normalizer has just completed the erase and prime modes of operation and has halted with standby mode flip-flop 5021 in the B state. The B output of standby mode flip-flop 5021 on bus 5023 primes write mode flip-flop 5022 and also, acting through OR gate 5025, bus 5051, and OR gate 5003 makes diode switch 5007 conductive which holds the horizontal sweep integrator circuit of amplifier 5005 in its initial state. Bus 5023 is also an output to the signal transformation circuit to indicate that the signal normalizer circuit is prepared to receive incoming information.

Upon receipt of a pulse from the signal transformation circuit on bus 4878 signifying the start of the signal to be recorded, standby-mode flip-flop 5021 is forced to the A state and write mode flip-flop 5022 is forced into the B state. The restoring of standby mode flip-flop 5021 to the A state makes diode switch 5007 non-conducting and allows the horizontal sweep integrator to function. The B output of write flip-flop 5022 on bus 5077 is connected to bus 4777 and will now bias transistor 4714 to conduct to saturation causing current to flow through variable resistor 4715 thus producing the cathode ray storage tube control grid bias potential to obtain the desired write mode beam current. Bus 4777 also controls diode switch 4725 and makes it conducting at this time allowing the incoming signal on bus 4853 from the signal transformation circuit which is connected to bus 4784 to appear at the input of write amplifier 4726. In the same manner described for the signal transformation circuit, the output of amplifier 4726 passes through gamma correction network 4727 and drives the storage tube cathode 4701 to vary the writing beam current. The A output connection of write mode flip-flop 5022 on bus 5052 also initiates the raster scan by enabling the lower sweep rate gate 5001. This is the same type gate as 4801 shown on FIG. 48 and described in connection with that figure. The current admitted by this gate is adjusted such that the longest permissible input signal duration occupies slightly less than one complete raster.

The completion of the transfer of the incoming signal from the signal transformation unit is indicated by a pulse on bus 4821 from that unit which forces write mode flip-flop 5022 into the A state and read-ready mode flip-flop 5026 into the B state and also transfers the code on buses 4870 into signal duration code register 5019. The output register shown on FIG. 62 is the same type circuit as signal duration code register 5019 and operates in the manner described in connection with that figure. The connection of bus 4821 to code register 5019 corresponds to the connection of bus 6218 to the output code register of FIG. 62. The changing of write mode flip-flop 5022 to the A state cuts off transistor 4714, makes diode switch 4725 nonconductive and disables the lower sweep rate gate of gates 5001. The B output of read-ready flip-flop 5026 on bus 5039 now primes read mode flip-flop 5027 and through OR gate 5025 and its output connection on bus 5051 to OR gate 5003, makes diode switch 5007 conducting holding the horizontal sweep integrator in its initial state. Bus 5051 is also an input to OR gate 5017 whose output is connected to the E input of delay-flop 5016 and the delay-flop will therefore be actuated at this time. The output of the delay-flop is connected by bus 5050 to scan line counter 5013 and will reset it to zero.

Bus 5039 is also an output to the circuits shown in FIG. 102 and indicates that the signal normalizer circuit has data available for transfer.

When other circuits of System II which are shown on FIG. 57 have determined that they are ready for the data held by the signal time normalizer, a pulse occurs on bus 5701 which forces read-ready flip-flop 5026 into the A state and read mode flip-flop 5027 into the B state. The restoring of read-ready flip-flop 5026 to the A state releases the horizontal sweep integrator. The B output of read mode flip-flop 5027 is on bus 5078 which is connected by bus 4778 to the input of AND gate 4741. The other input to AND gate 4741 is bus 10237 which originates in the circuits shown in FIG. 102 and the description of those circuits shows that this bus has a signal at all times except when it is desired to interrupt reading. When buses 10237 and 4748 both have signals the output of AND gate 4741 will bias transistor 4716 to conduct to saturation causing current to flow through variable resistor 4717 and establish the proper cathode ray tube control grid bias potential to obtain the desired read mode beam current. The A output of read mode flip-flop 5027 on bus 5081 is now positive. It is connected by bus 4781 and resistor 4742 to the grid of tube 4709 and will now drive vacuum tube 4709 into positive grid current operation causing current to flow through variable resistor 4710. This resistor is adjusted so that under these conditions the potential of the storage screen 4706 is approximately 10 volts above that of cathode 4701. The storage screen now acts as a control grid on the beam current. At this time, but 4778 also activiates delay-flop 4732 which, after a delay of approximately 10 microseconds, forces flip-flop 4731 into the B state which makes diode switch 4729 non-conducting and allows the signal appearing on collector 4708 to be applied to read amplifier 4730.

The parallel output of signal duration code register 5019 on buses 5053 energizes the inputs to a digital-to-analog voltage converter 5018 which is the same type of circuit shown in FIG. 52 and whose method of operation is explained in connection with that figure. Bus 5036 connects a reference voltage to digital-to-analog converter 5018 and buses 5036 and 5049 correspond to buses 5216 and 5219 respectively on FIG. 52. From the explanation of FIG. 52 it can be seen that the current flowing on output bus 5049 to the summing point of direct coupled rate amplifier 5002 is proportional to the number in register 5019. The output voltage of the rate amplifier 5002 and the sweep rate during the reading mode are, therefore, also proportional to the value of the signal duration code in register 5019. Since the sweep rate during reading is proportional to the duration of the input signal, all signals have equal duration upon read-out. The sweep rate is adjusted to make the signal read-out duration compatible with the timing of the rest of the System II circuits. Small differences in timing are prevented from being cumulative by a synchronizing pulse from the circuits shown in FIG. 57 on bus 5701 which is an input to OR gate 5030. FIG. 50 shows that the other input to OR gate 5030 in the A output of flip-flop 5027 and the inverted output of this OR gate is an input to OR gate 5025. As a result of these connections, when flip-flop 5027 is in the B state and bus 5701 goes positive, then there will be an input to OR gate 5025 whose output on bus 5051 will hold the horizontal integrator circuit in its initial state and reset scan line counter 5013 to zero in the manner previously described. This restores the beam to the beginning of the raster.

When it is desired to interrupt the signal time normalizer during the reading, the control circuits of System II cause buses 5701 and 10237 to go positive. This action on bus 5701 causes the deflection circuits to be reset as described above. It has been explained previously that a negative signal on bus 10237 at the input of AND gate 4741 is necessary in order to have beam current in cathode ray tube 4738 during the read mode. Therefore, the beam current is cut off when the signal time normalizer reading is interrupted.

The read-outs will be terminated when the System II control circuits place a pulse on bus 10202. This end of read pulse passes through OR gate 5032 and forces erase mode flip-flop 5033 into the B state and flap-flop 5027 into the A state. It also cuts off transistor 5034 for a short time in the same manner as described for transistor 4847 on FIG. 48 and produces an "R" pulse on bus 5083 which force all flip-flop with an "R" connection to the A state.

Bus 10202 is also connected as an input to OR gate 5025 and the resulting pulse on bus 5051 will thus reset scan line counter 5013 and the horizontal sweep generator in the manner previously described. The A output of flip-flop 5027 on bus 5081 is connected as an input of OR gate 5020 and as the flip-flop returns to the A state at this time it provides a pulse to this gate whose output resets signal duration code register 5019 to zero causing the current output of digital-to-analog converter 5018 to fall to zero.

The A output of flip-flop 5027 now provides an input signal to OR gate 5030. Since the inverted output of this OR gate is an input to OR gate 5025, the state of bus 5701 will have no effect on OR gate 5025 as long as flip-flop 5027 is in the A state.

With flip-flop 5033 now in the B state, its output on bus 5079 through its connection to bus 4779 will now bias transistor 4718 to conduct to saturation causing current to flow through variable resistor 4719 and producing the proper cathode ray storage control grid bias potential to obtain the desired erase mode beam current. The change of voltage on bus 4779 at this time will also actuate the E' input of flip-flop 4631 and return it to the A state. This makes diode switch 4729 conductive and grounds the input of amplifier 4730. The A output of erase mode flip-flop 5033 on bus 5054 also enables the center sweep rate gate of gates 5001 which initiates a raster scan. Upon completion of one complete raster scan, which is indicated by an end-around-carry pulse on bus 5045 from scan line counter 5013, erase mode flip-flop 5033 is forced into the A state and prime mode flip-flop 5035 is forced into the B state. Erase mode operation may be initiated manually by operating momentarily push button switch 5048 which connects the negative supply voltage to one input of OR gate 5032 whose output then transfers flip-flop 5033 to the B state and also produces an "R" pulse on bus 5035 as described hereinabove.

The forcing of prime mode flip-flop 5035 into the B state makes its B output on bus 5080 negative which through its connection to bus 4780 biases transistor 4720 to conduct to saturation causing current to flow through variable resistor 4721 and producing the proper cathode ray storage control grid bias potential to otbain the desired prime mode beam current. The A output of flip-flop 5035 on bus 5082 is now positive and through its connection to bus 4782 drives vacuum tube 4711 into positive grid current operation. The resulting current flow through variable resistor 4712 reduces the potential of storage screen 4706 to approximately 20 volts above cathode 4701. Bus 5082 also enables the upper sweep rate gate of gates 5001 and initiates a raster scan. Upon completion of one complete raster scan, which is indicated by an end-around-carry pulse from scan line counter 5013 on bus 5045, prime mode flip-flop 5035 is forced into the A state and standby mode flip-flop 5021 into the B state. This completes one full cycle of operation.

Feedback transformation (FIG. 54)

The function of the circuit shown in FIG. 54 is to transform the signal output $f_{rk}^*(t)$ of the cathode ray tube signal time normalizer circuits when the machine is operating in either A mode or B mode according to the past history of either output or input sequences respectively. The signal is transformed by a Q-function. The transformation signal itself, $T_{rk}(t)$, is obtained by reversing the state of a binary double stability flip-flop circuit at a rate determined by certain codes which include codes obtained from a sequence status counter or the combination of the counter with a portion of the codes in the shift register. The $T_{rk}(t)$ signal itself is the square wave output of the flip-flop.

The input from the cathode ray tube signal time normalizer circuits, shown on FIG. 47, is received on bus 4748 and the output from the feedback transformation circuits is on bus 5401. Bus 4748 is connected through diode switch 5402 to the primary of transformer 5403. This diode switch and others shown in FIG. 54 are the same type of circuit shown in FIG. 53 and the operation is discussed in connection with that figure. The control of this diode switch is connected to bus 5901 which is held negative at all times except when the external start circuit operates, and as long as this bus is held negative the switch will pass a signal. Transformer 5403 has its secondary leads connected as an input to multiplier quad 5404. This multiplier quad is of the same type as that illustrated in FIG. 16 and previously described in connection with that circuit. The other input quantity to the multiplier comes from the A and B outputs of flip-flop 5405. These connections to the multiplier quad are connected to fixed voltages through diodes 5411 so that the voltage excursions of these inputs to the quad are always equal amounts above and below ground. Changing the state of the flip-flop will reverse the polarity of these voltage inputs to multiplier quad 5404 and consequently the polarity of the signal at the output of the multiplier on bus 5406.

FIG. 54 shows that the multiplier output on bus 5406 is one input to the summing point of amplifier 5407 and that in some positions of switch 5410 there will be another signal input. Output of amplifier 5407 is connected to modulator 5408 where it modulates the clock frequency brought in on bus 5708 and the result is passed on to diode switch 5409. The output of the transformation circuit is allowed to pass through diode switch 5409 to output bus 5401 when a signal is present on the control bus 6450 of the switch. Bus 6450 has a negative control signal from C time to P time, and between these instants of time correlation can take place without interference from other signals.

The rate at which flip-flop 5405 is forced to change state is determined by setting a number in a digital counter, stepping the counter at a fixed pulse rate and detecting the time when the counter overflows. This counter is represented in FIG. 54 by flip-flops 5413 through 5417. The number set in the counted is transferred from register 5418 and binary counter 5419. The number on buses 10420, originating in the circuits shown in FIG. 104 and described in the discussion therein, is transferred to register 5418 by a pulse on bus 10207 at D time or stop time. Binary counter 5419 holds a count of the number of members of the sequences which have preceded the present one. Flip-flop 5415 is the only stage which is not set from either register 5418 or binary counter 5419. Its J priming input is connected to bus 10206 which, the explanation of circuits in FIG. 102 shows, has a signal only when the machine is operating in the A mode. Thus the only time this flip-flop can be set to the B state is when the machine is in the A mode.

FIG. 54 shows that each state of the counter represented by flip-flops 5413 through 5417 has its E and E' inputs connected to the A output of the stage shown on its left except flip-flop 5413, which has its E and E' inputs connected to the output of AND gate 5421. Thus flip-flop 5413 is the lowest order bit position in the counter and every pulse output of AND gate 5421 will increase the count by one. One input to this AND gate is the clock pulse on bus 5708 and the other two inputs are the A outputs of flip-flops 5422 and 5423. Therefore, the counter will be stepped along at the clock rate as long as flip-flop 5422 and 5423 are both in the A state. Flip-flop 5423 is normally in the A state. The E' input of flip-flop 5422 is connected to bus 6453 which previous discussion of FIG. 64 shows has a negative going signal starting at time C. The E input as connected to bus 5707 carries P pulses which are described in connection with the circiuts shown in FIG. 57. Therefore, this limits the period in which the counter can be stepped to that between a C time and the following P pulse. The P pulse on bus 5707 is also an input to reset generator 5424 and the output of this generator goes to the "R" inputs of flip-flops 5413 through 5417 which will result in the counter being set to zero by each P pulse. Reset generator 5424 is the same type of circuit as is shown on FIG. 58 and described in connection with that figure.

Register 5418 is the same type of circuit as the output register shown in FIG. 62. A pulse on bus 10207 will transfer the number on buses 10420 to register 5418 in the same way that a pulse on bus 6218 transfer a number from the shift register to the output register as described in connection with the circuits of FIG. 62. The description of the circuits in FIG. 102 explains that there will be a pulse on bus 10207 at D time when a B mode sequence is being processed and therefore a number will be transferred into register 5418 only during B mode operation. There are three options under manual control in the codes which may be transferred into register 5418. One option is to transfer the steering codes. The second option is to transfer a predetermined set of final codes. And the third option is to transfer the codes set up in the teaching buses corresponding to the predetermined set of final codes in the second option.

Each stage of register 5418 and binary counter 5419 has its B output connected to the J priming input of an associated stage of the transformation circuit binary counter represented by flip-flops 5413 to 5417 with the exception of flip-flop 5415 as previously mentioned. The output of OR gate 5425 is bus 5426 and is connected to the H inputs of all stages of the transformation circuits binary counter. Therefore, an output of this OR gate will cause all stages of the transformation circuit counter whose J priming inputs are energized to go to the B state. If the stages of the transformation circuit binary counter are all in the A state at the time a pulse occurs on bus 5426, then the effect of this pulse will be to transfer the numbers held in register 5418 and binary counter 5419 into the transformation circuit binary counter. As mentioned previously, the state of flip-flop 5415 is not determined by either of these sources but by the signal on bus 10206. One input to OR gate 5425 is bus 6418 which previous discussion of FIG. 64 has shown will go negative at B time. Therefore, the transformation circuit binary counter will have the numbers transferred into it at this time.

In a previous paragraph it was explained that beginning at time C, the transformation circuit binary counter gets stepped at the rate of the clock pulses on bus 5708. This will continue until the counter overflows, which is at the time flip-flop 5417 changes from the B state to the A state. The A output of this flip-flop is bus 5420 and is connected to the E input of flip-flop 5423. FIG. 54 shows that flip-flop 5423 is self primed and therefore the pulse on bus 5420 will force the flip-flop into the B state. This removes the signal on its A output which is connected to AND gate 5421 and prevents the transformation circuit counter from being stepped. The B output of flip-flop 5423 is an input to OR gate 5425 and will therefore at this time cause a pulse on its output bus 5426 and transfer the numbers in register 5418 and binary counter 5419 into the transformation circuit counter in the same manner as described previously.

The B output of flip-flop 5423 is also one input to AND gate 5427 whose other input is the clock pulse on bus 5708. The output of the AND gate is the input to binary counter 5428 and therefore the counter will now be stepped along at the clock pulse rate. When binary counter 5428 overflows it produces a pulse on bus 5429 which is connected to the E' input of flip-flop 5423 and will force the flip-flop into the A state. This will restore the A output signal of flip-flop 5423 to AND gate 5421 and again allow the transformation circuit binary counter to be stepped along at the clock pulse rate. The purpose of binary counter 5428 is to provide an accurate time interval between the overflow of the transformation circuit counter and the time it begins counting again.

The process of transferring a number into the transformation circuit counter and stepping the counter until it overflows will be repeated until a P pulse on bus 5707 forces flip-flop 5422 into the B state and removes the signal on its A output from AND gate 5421. Since the clock pulses which step the transformation circuit binary counter occur at a fixed rate, the pulse on bus 5420 at the time of overflow will occur at regular intervals which are determined by the number transferred into the counter.

Reference to FIG. 54 shows that bus 5420 is one input to AND gate 5412 and the other input is the B output of flip-flop 5430 on bus 5458. The output of AND gate 5412 is connected to the E and E' inputs of flip-flop 5405. Therefore, as long as flip-flop 5430 is in the B state, flip-flop 5405 will change state every time the transformation circuit counter overflows and bus 5420 goes negative.

Flip-flop 5430 has its C priming input connected to the B output of flip-flop 5431 by bus 5436. The C priming input of flip-flop 5431 is connected to bus 10204 and the D priming input connected to bus 10205. These buses originate in the circuits shown in FIG. 102 and in the discussion of those circuits it is explained that bus 10204 will be at a negative potential when the next input signal is to be transformed and bus 10205 will be negative when it is not to be transformed. The E and E' inputs of this flip-flop are connected to the B output of delay-flop 5432. The B output of delay-flop 5432 will become active at time $C_n$ since it is primed on C by RCN and the pulse on bus 6453 occurs at C time. Flip-flop 5431 will therefore be forced into the B state at time $C_n$ if the next input signal is to be transformed and into the A state if the next input signal is not to be transformed. The B output of flip-flop 5431 on bus 5456 is connected to the C priming input of flip-flop 5430 and the E input of flip-flop 5430 is connected to bus 10201. In the description of circuits shown on FIG. 102 it was shown that bus 10201 will have a pulse just before the signal time normalizer circuit shown in FIG. 50 starts transmitting data on bus 4748. If the data held by the signal time normalizer is to be transformed and AND gate 5432 is conductive, flip-flop 5431 will be in the B state allowing for flip-flop 5430 to be forced into the B state when a signal occurs on bus 10201. The B output of flip-flop 5430 on bus 5458 is connected to the input of binary counter 5419 and therefore will cause the count to be increased by one at this time. When flip-flop 5430 is in the B state it will remain in this state until a pulse on its "R" input from bus 5706 forces it into the A state. The discussion of the circuits on FIG. 57 show that this pulse occurs at D time. Once flip-flop 5431 is in the B state it will remain in this state until bus 10205 has a signal and AND gate 5432 is conductive at which time it will be forced into the A state. As previously mentioned, this will occur when the next transmission from the signal time normalizer circuit is not to be transformed. The A output of flip-flop 5431 on bus 5457 is one input to AND gate 5448 and the other input is bus 5704 which the description of the circuits on FIG. 57 shows has a pulse at D time. The output of AND gate 5448 on bus 5460 is the input to reset generator 5432 and the output of this reset generator is connected by bus 5461 to binary counter 5419 and register 5418. Therefore, if the next operation of the machine requires no transformation of the input signal, binary counter 5419 and register 5418 both will be cleared at D time.

The signal on bus 4748 is called the normal signal $f_{rk}*(t)$, and the output of multiplier quad 5404 on bus 5406 may be called $T_{r(k-1)}(t)f_{rk}*(t)$, where $T_{r(k-1)}(t)$ is the transformation signal due to the successive states of flip-flop 5405. When switch 5410 is in the center position, bus 5406 is the only input to the summing point of amplifier 5407. The index $k$ identifies the sequence position of the signal, and index $r$ identifies the signal or signal class.

When switch 5410 is in the left hand position shown in FIG. 54 it is connected through capacitor 5449 and bus 5459 to the point on multiplier quad 5404 which receives an input from the A output of flip-flop 5405. In this connection the output of amplifier 5407 will be the sum of its two inputs and may be expressed $$T_{r(k-1)}(t) \cdot f_{rk}*(t) + T_{r(k-1)}(t)$$

The right hand position of switch 5410 connects the summing point of amplifier 5407 to a signal which is proportional to the product of the transform function $T_{r(k-1)}(t)$ and the input function $f_{rk}*(t)$. Reference to FIG. 54 shows that the input function on bus 4748 is connected to the primary of transformer 5433. The secondary leads of this transformer are connected through diodes 5434 and resistors 5450 to bus 5435 which is connected through diode switch 5436 to the summing point of amplifier 5438. Diodes 5434 are oriented so that only signals of positive polarity are passed on to bus 5435 and therefore the input to amplifier 5438 is proportional to the absolute value of the signal on bus 4748.

Amplifier 5438 has capacitor 5451 connected between its summing point and its output and therefore will integrate the signal to its input. The integration is controlled by diode switches 5439, 5440 and 5436. Diode switch 5439 connects the output of the amplifier through resistor 5452 to its summing point and diode switch 5440 connects the summing point through resistor 5453 to ground. Both these switches are controlled by the output of AND gate 5441, and when conducting will discharge the capacitor and hold the output of the amplifier at ground. Diode switch 5436 is controlled by the output of AND gate 5437, and when conducting will allow the signal on bus 5435 to go to the summing point of amplifier 5438. FIG. 54 shows that bus 5704 is an input to AND gates 5441 and 5437 and that bus 5702 is an input to AND gate 5441 and bus 5703 is an input to AND gate 5437. The description of the circuits illustrated on FIG. 57 shows that buses 5703 and 5702 originate from the two outputs of a flip-flop so that one or the other will always carry a signal. This same description shows that, when the machine is halted and waiting for an input, buses 5702 and 5704 carry a signal. While buses 5702, 5703, and 5704 are designated as connected to the circuit of FIG. 57, it is to be understood that corresponding buses 5802, 5803, and 5804 can be utilized also from the circuit of FIG. 58. Under the stated condition there will be produced an output from AND gate 5441 causing diode switches 5439 and 5440 to conduct and hold the output of amplifier 5438 at ground potential. When a signal is received and stored by the signal time normalizer circuit, it is desirable to calculate a value proportional to the integral of the absolute value of the signal before transforming it and processing it further. This is accomplished by making diode switches 5439 and 5440 nonconductive and diode switch 5436 conductive during the time the signal time normalizer circuit scans through the function once. The description of the circuits on FIG. 57 shows that at the time when the signal from the signal time normalizer circuit first appears on bus 4748, the signal on bus 5702 disappears and a signal appears on bus 5703. This makes diode switches 5439 and 5440 nonconductive and diode switch 5436 conductive, and with the switches in this condition amplifier 5438 will integrate the signal on bus 5435. The signal on bus 5704 ceases at the time the signal time normalizer circuit has completed one scan through the stored data. This will result in diode switch 5436 becoming nonconductive and the output of amplifier 5438 on bus 5442 will retain the value it had at that time. This value will be of the absolute value of the signal on bus 4748 integrated over the time of one scan period.

Bus 5442 is the input to amplifier 5443 which is a unity gain amplifier so that its output on bus 5454 is equal in amplitude to the signal on bus 5442 but of opposite polarity. These two buses form one pair of inputs to multiplier quad 5444 which is the same type of circuit as multiplier quad 5404. The other pair of inputs come from the secondary connections of transformer 5445. Amplifier 5446 has its output connected to the primary of transformer 5445 and has as its input the transform function $T_{rk}(t)$ through its connection by bus 5462 to capacitor 5449. The output current of the multiplier quad through bus 5447 when switch 5410 is in the extreme right position may then be expressed as:

$$p \cdot T_{r(k-1)}(t) \int_{t_1}^{t_2} |f_{rk}*(t)| dt$$

The interval of time from $t_1$ to $t_2$ is the duration time when diode switch 5436 is conducting, and where $p$ is a weighting constant determined by the value of resistor 5455 and the other resistor connected to the summing point of 5407. When the switch is in the right hand position the output of amplifier 5407 will be proportional to the sum of the signals on buses 5406 and 5447 and may be expressed as:

$$Q = T_{r(k-1)}(t) f_{rk}*(t) + p \cdot T_{r(k-1)}(t) \int_{t_1}^{t_2} |f_{rk}*(t)| dt$$

When the index $k$ equals $n$ the last input sequence member is $f_{rn}(t)$ which is changed into normal signal $f_{rn}*(t)$, then the last Q function is $Q = F_1(t)$ the applied signal which is learned by the learning equipment proper. This situation holds for mode B feedback wherein the feedback codes are steering feedback codes. When all feedback codes are learned and forced in mode B, the Q function may have the same form or any of the forms under control of switch 5410. In mode A output sequencing the normal signal is the same on successive presentations and the Q function is $Q[T_k f_i*(t)]$ which also may be any one of the forms under control of switch 5410 and, where the index $i$ identifies the input signal which does not change for the duration of a particular A mode sequence, and the index $k$ changes and identifies each successive member of the output codes of the A mode sequence up to the last.

Squaring and integrating circuit (FIG. 72)

The function of the circuit shown in FIG. 72 is to produce a voltage on its output bus 7201 which is proportional to the square of the signal on bus 5401 integrated over time $P_1$ to time $P_2$.

Transformer 7202 and diodes 7203 are the same squaring circuit as transformer 1704 and diodes 1705 shown in FIG. 17 and operate in the manner described in the discussion of the circuits of that figure. The current through bus 7204 is proportional to the square of the voltage on the primary of the transformer bus 5401.

Amplifier 7206 is connected as the same type of circuit as amplifier 5438 shown on FIG. 54 and the description of the operation of that circuit applies to it as well. When there is a control signal on bus 5704, diode switches 7207 and 7208 will be conducting and the input and output of the amplifier held at ground potential. When these diode switches are not conducting, the output of the amplifier on bus 7201 will be the integral of the current to its summing point.

In a previous discussion of the circuits shown in FIG. 57 it was shown that there is a negative control signal on bus 5704 when the machine is halted but is removed before time period $P_1$. As illustrated in FIG. 79, bus RC1 is negative from time $P_1$ to time $P_2$. Therefore, when the control signal RC1 makes diode switch 7205 conducting at time $P_1$ amplifier 7206 is free to integrate the signal coming from bus 7204 through the diode switch to the amplifier summing point. At time $P_2$ when bus RC1 goes positive, output bus 7201 will have a voltage proportional to the square of the signal on bus 5401 integrated between time $P_1$ and time $P_2$ and will retain that voltage until the next D time when a negative control signal appears on bus 5704 and makes diode switches 7207 and 7208 conductive.

Integrator (FIG. 60)

In FIG. 60 there is illustrated the main integrating circuit which is shown as block 3617 of FIG. 36.

Bus 3626 carries the signal $F_i(t)G_j(t)$ and is connected to the input of amplifier 6006. Diode switches 6007 and 6008, capacitor 6009 and amplifier 6006 form the same kind of integrator circuit as diode switches 5439 and 5440, capacitor 5451 and amplifier 5438 shown on FIG. 54 and the explanation of those circuits given previously applies to these circuits. The controls of diode switches 6007 and 6008 are connected to the B output of flip-flop 6010 so that as long as the flip-flop is in the B state the input of amplifier 6006 and its output on bus 6001 are held at ground potential. When flip-flop 6010 is forced into the A state by a pulse on bus 6453 which the description of the circuits on FIG. 64 shows happens at C time, amplifier 6006 will integrate the signal on bus 6005 and the output on bus 6001 may be expressed as:

$$V_{ij} = \int_{t_1}^{t_2} F_i(t) G_j(t) dt \qquad (1)$$

where $t_1$ and $t_2$ are the beginning and end of the time of integration.

Error function generator (FIG. 60)

In FIG. 60 there is also shown circuits for the error function generator, which are designated as blocks 3627, 3825, 3831, 3833, and 3835 on FIGS. 36 and 38.

Amplifier 6011 is a subtractor with three inputs, one through each of resistors 6014, 6015, and 6016. Resistor 6016 is connected to bus 6001 which carries the signal $V_{ij}$. FIG. 60 shows that the signals to resistors 6014 and 6015 are controlled by switch 6012 and relay 6013 and that bus 10304 is connected to switch 6012. Bus 10304 originates in the circuits shown in FIG. 103 and the discussion of that figure shows that it carries an assigned signal $+\sqrt{U_i}$ or $-\sqrt{U_i}$ or zero, but during steering zero cannot be placed on the bus. Bus 6464 originates in the circuits shown in FIG. 64 and the description of that circuit shows that it carries a signal labeled $$\pm \sqrt{U_i}\left(\frac{\tfrac{1}{2}N_1 - N_2}{\tfrac{1}{2}N_1}\right)$$

Relay 6013 is controlled by bus 10225 which originates in the circuits shown in FIG. 102 and the description of the circuits shown on that figure shows that it carries a control signal only during the time steering is taking place.

The output of amplifier 6011 is on bus 6031 and is called $e_{ij}$. When steering is not taking place, then bus 10304 is connected through switch 6012 to either resistor 6014 or through the normally closed contact of relay 6013 to resistor 6015 and since resistors 6014 and 6015 are equal the output of amplifier 6011 may be expressed as $e_{ij} = B_{ij} - V_{ij}$, where $B_{ij}$ can be either $+\sqrt{U_i}$, $-\sqrt{U_i}$, or zero.

If switch 6012 is in the upper position and steering is taking place, relay 6013 actuated, then resistor 6015 is connected by relay 6013 to bus 6464 and the output of amplifier 6011 may be expressed as:

$$e_{ij} = \pm \sqrt{U_i} \pm \sqrt{U_i}\left(\frac{\tfrac{1}{2}N_1 - N_2}{\tfrac{1}{2}N_1}\right) - V_{ij} \qquad (2)$$

If switch 6012 is in the lower position and steering is taking place resistor 6015 is connected through relay 6013 to bus 6464 then the signal on bus 10304 is ignored and resistor 6014 has no signal input and the output of amplifier 6011 may be expressed as:

$$e_{ij} = \pm \sqrt{U_i}\left(\frac{\tfrac{1}{2}N_1 - N_2}{\tfrac{1}{2}N_1}\right) - V_{ij} \qquad (3)$$

Reference to FIG. 60 shows that the output of amplifier 6011, bus 6031, can go through connection 6033 to the input of amplifier 6017 or through connection 6032 to bus 9927. The circuit operation that will be described first is when connection 6033 is closed and connections 6032 and 6034 are open.

Amplifier 6017 together with diode switch 6018 and amplifier 6019 together with diode switch 6020 are sample and hold circuits of the same type as amplifier 9516 together with diode switch 9515 shown in FIG. 95 and the description given of the operation of that circuit also applies to these samples and hold circuits. Diode switch 6020 is controlled by bus 6004 which is connected to the B output of delay-flop 6021. The E input of delay-flop 6021 is connected to bus 5707 which previous description of FIG. 57 has shown carries P pulses. At each P time delay-flop 6021 will be actuated and diode switch 6020 is made conductive for the time period of delay-flop 6021. The output of amplifier 6019 will now assume a value proportional to the output of amplifier 6017 and will retain this value after diode switch 6020 stops conducting. As delay-flop 6021 returns to the A state, its A output will trigger off delay-flop 6022. The B output of delay-flop 6022 is bus 6003 and controls diode switch 6018. At this time the output of amplifier 6017 will assume a value proportional to the output of amplifier 6011, which as explained previously is $e_{ij}$. Thus after each P time the output of amplifier 6017 is the last value of $e_{ij}$ and the output of amplifier 6019 is the value of $e_{ij}$ previous to that. When delay-flop 6022 falls back into the A state, its A output provides a pulse to the E input of flip-flop 6010 and forces it into the B state which will cause the input and output of amplifier 6006 to be held at ground. This circuit is now ready for the next integration process.

Amplifier 6023 is a unity gain amplifier which has its input conected to the output of amplifier 6019. The output of amplifiers 6019 and 6023 are one set of inputs to multiplier quad 6024 and the other inputs are from the secondary connections of transformer 6025. This is the same type of multiplication circuit shown in FIGS. 16 and 94 and other places and operates as previous discussion has shown. The output of multiplier quad 6024 is on bus 6026 and is the product of the voltage on the output of amplifier 6019 and the signal on the primary of transformer 6025. Bus 5401 is connected to the primary of transformer 6025, and discussion of the circuits shown in FIG. 54 shows it carries the signal $F_i(t)$. Therefore, the signal on bus 6026 may be expressed as $e_{ij}F_i(t)$.

Amplifiers 6027 and 6028, multiplier quad 6029 and transformer 6030 form a divider circuit the same as amplifiers 9431 and 9429, multiplier quad 9430 and transformer 9438 shown on FIG. 94 and the description of the operation of that circuit applies here. From that description it can be seen that the output on bus 6002 is the quotient of the signal on bus 6026 divided by the voltage on bus 7201. The description of the circuits shown on FIG. 72 shows that bus 7201 carries the signal called $U_i$ and the signal on bus 6002 may be expressed as:

$$\Delta G_{ij}(t) = \frac{e_{ij}F_i(t)}{U_i} \qquad (5)$$

This is the correction to be made to memory function $G_j(t)$.

If connection 6033 is opened and connections 6032 and 6034 are closed, the output of amplifier 6011 will be connected to bus 9927 and the input of amplifier 6017 will be connected to bus 9928. Discussion of the circuits of FIG. 99 show that the circuit takes the signal on bus 9927, multiplies it by parameter C and brings it out on bus 9928. The value on bus 9927 now is $e_{ij}$ and, if the multiplying factor is called C, the input to amplifier 6017 on bus 9928 will therefore be $Ce_{ij}$. With this connection the output on bus 6002 will now be:

$$\Delta G_{ij}(t) = \frac{Ce_{ij}F_i(t)}{U_i} \qquad (6)$$

This multiplying factor C as controlled by the circuits of either FIG. 99 or FIG. 100 could be inserted many places. For example, bus 6002 can be normally connected to the circuits shown in FIG. 100. Also, instead of putting the buses 9927 and 9928 of FIG. 99 between amplifiers 6011 and 6017, they could be inserted between the output bus 6002 shown in FIG. 60 and the input of the write amplifier 3837.

In case the digital divider is used and it is desired to use the C parameter adjustment circuit of FIG. 100, then connection 10051 of FIG. 100 would be opened and connection 10052 would be closed. In that case, bus 6002 of FIG. 60 would go to bus 6002 of FIG. 100, and the divider circuit of FIG. 60 would be retained to divide by $U_b$, and provide the signals for integrator 10002. However, bus 6026 of FIG. 60 would now connect to bus 6026 of FIG. 100. Then the parameter C would be introduced as an attenuation of the signal $e_{ij}F_i(t)$ giving $Ce_{ij}F_i(t)$ on bus 10048. This latter bus would then connect to bus alternately marked 10048 in FIG. 108 for digital processing.

Adjustment of parameter C should be done with either one or the other of the circuits of FIG. 99 or FIG. 100 but not both. The circuit of FIG. 100 is preferred since it works under conditions in which the circuit of FIG. 99 will not.

Square root circuit (FIG. 56)

The square root circuit is shown in FIG. 56 and consists of amplifiers 5629 and 5604 and diodes 5630 and 5631. Input is on bus 7201 and outputs are taken from points 5602 and 5603. The input voltage on bus 7201 is always positive and the purpose of the circuit is to produce a negative voltage at point 5602 and a positive voltage at point 5603 both of which are equal in amplitude to the square root of the voltage on bus 7201.

Amplifier 5604 has unity gain and therefore if the voltage on bus 5602 is called $V_2$ then the voltage on bus 5603 is $-V_2$. Diodes 5630 and 5631 will therefore have voltages of equal amplitude but opposite polarity impressed across them.

If $i_1$ represents the current through resistor 5610 and $i_2$ and $i_3$ the currents through diodes 5630 and 5631 respectively, then the equation for the summing point of amplifier 5629 is:

$$i_1 + i_2 + i_3 = 0 \qquad (1)$$

In the discussion of the cubing circuit it was shown that the equation relating the current through a diode to the voltage across it may be expressed as $$i = A\left[\alpha V + \frac{(\alpha V)^2}{2!} + \frac{(\alpha V)^3}{3!} + \frac{(\alpha V)^4}{4!} + \cdots\right] \qquad (2)$$

Let the voltage on bus 7201 be represented by $V_1$ and the value of resistor 5610 by $R_1$ and, by using these and Equation 2, then Equation 1 may be rewritten as:

$$\frac{V_1}{R_1} + A\left[\alpha V_2 + \frac{(\alpha V_2)^2}{2!} + \frac{(\alpha V_2)^3}{3!} + \frac{(\alpha V_2)^4}{4!} + \cdots\right] + A\left[-\alpha V_2 + \frac{(\alpha V_2)^2}{2!} - \frac{(\alpha V_2)^3}{3!} + \frac{(\alpha V_2)^4}{4!} + \cdots\right] = 0 \qquad (3)$$

or $$\frac{V_1}{R_1} + 2A\left[\frac{(\alpha V_2)^2}{2!} + \frac{(\alpha V_2)^4}{4!} + \cdots\right] = 0 \qquad (4)$$

It will be noticed that there are no odd powered terms in Equation 4. If the voltage $V_2$ is kept small enough then the terms of the series of powers greater than two become small enough to be ignored and Equation 4 becomes:

$$\frac{V_1}{R_1} = (-A\alpha^2)V_2^2, \text{ or } V_2 = K \cdot \sqrt{V_1} \qquad (5)$$

where K is a constant depending on $\alpha$, R and A. Since $V_1$ is the input voltage and $V_2$ the output voltage, Equation 5 shows that the circuit achieves the desired result.

Shift register and output register (FIG. 62)

The function of the shift register shown in FIG. 62 is to store each bit of the output code as it is determined by the machine. After the entire code is available it can be transferred in parallel to the output register which is also shown in FIG. 62. Both registers are constructed of the standard flip-flops whose symbol is illustrated in FIG. 90 and whose circuit is shown in FIG. 30. The shift register consists of flip-flops 6202 through 6208. The utilization output of the machine is available on all the B terminals of flip-flops 6209 through 6215 respectively, as the output buses designated generally as 3811 in FIG. 38. The complemented output utilization code is available on the A terminal sides of flip-flops 6209 through 6215. These same flip-flops constitute the output register.

Reference to FIG. 62 shows that the E and E' inputs of each stage of the shift register are joined together and all are tied to bus 6216. Each stage, except flip-flop 6202, has its C priming input connected to the B output of the stage to the left and the D priming input connected to the A output of the stage to the left. As a result of these connections, when a negative pulse appears on bus 6216 each stage will be forced into the same state as that held by the stage to the left. In effect the number held in the register is shifted one stage to the right.

Input to the shift register comes from the dual gap comparator shown in FIG. 56 on buses 5636 and 5635 which are connected to the C and D priming inputs respectively of flip-flop 6202. There is a signal on bus 5636 when the dual gap comparator determines that the machines result was in the positive gap and a signal on bus 5635 when the result was in the negative gap. Therefore, after a pulse on bus 6216 the first stage of the shift register, flip-flop 6202, will be in the B state if the dual gap comparator found a signal in the positive gap and in the A state if in the negative gap.

The shifting pulse occurring on bus 6216 is controlled by AND-gate 6228. One input to the AND-gate is the B output of flip-flop 6229. FIG. 62 shows that this flip-flop is self-primed and has its E input connected to RC2 and its E' input connected to RCN. Thus it will be in the B state and permit shifting from the beginning of RC2 till the beginning of RCN.

Another input to AND-gate 6228 is bus 10209 which carries a signal originating in the circuits shown in FIG. 102. This signal will always be present to allow the first six bits to be shifted in, but the rest will be shifted only under specified conditions of operation which are described in the discussion of FIG. 102.

The other input to AND-gate 6228 is the timing pulse on bus 6451. Thus when the other two inputs are present shifting will occur at the time of a pulse of this line.

Provision is also made for simultaneous resetting all stages of the shift register to the A state. The R input of each stage is connected to bus 6217 which is the output of R-generator 6227. This generator derives its input from the output of AND-gate 6226. One input to this AND-gate is bus 10208 which carries a signal originating in the circuits illustrated in FIG. 102 and is present when it is permissible to clear the shift register as is described elsewhere. If this signal is present clearing will take place when the other signal input, RC2, begins.

Each stage of the shift register is associated with a stage of the output register by having its A and B outputs connected to the D and C priming inputs respectively of the associated stage of the output register. The E and E' inputs of each stage of the output register are tied together and are connected to bus 6218. When a pulse occurs on bus 6218 every stage of the output register will be forced into the same state as its associated stage in the shift register. Transfer to these stages is controlled by AND-gate 6225 whose output is bus 6218. One input to this AND-gate is bus 10209 which was mentioned previously in connection with AND-gate 6228. Another input is bus 5607 which contains a signal originating in the circuits shown in FIG. 56 and is present as long as the dual gap comparator finds that every result of the machines operation lies in either the positive or negative gap. Delay-flop 6229 will supply a pulse to AND gate 6225 at $C_{N-1}$ time causing transfer to take place if the other two inputs are present.

Automatic control of the error parameter C of the error function (FIGS. 99 and 100)

FIG. 99 illustrates one version of the circuits utilized for automatic control of the error parameter of the error function. Control of the error parameter is obtained by means of a motor driven variable potentiometer which acts as a servo controlled attenuator of the error function, thus introducing the parameter C. The servo is under control of the average errors produced over a predetermined number of applications of input signals.

Potentiometers 9919 and 9920 are ganged and operated by a solid shaft 9915 which extends from control knob 9916 through to the limit switch operating flange 9921. The shaft 9915 may be rotated by energizing the two phase motor 9910 which through gear 9911, drives gear 9912. Gear 9912 runs free on shaft 9915 as a bearing and drives flange 9914 through friction washer 9913. Flange 9914 is rigidly fastened to shaft 9915. Pressure is maintained on the friction washer by means of disc spring 9917 which is compressed against gear 9912 by flange 9918. This whole assembly forms a slip clutch which permits the shaft to be positioned manually by knob 9916 and permits slippage of the shaft at either of the two limits of rotation.

One winding of the two phase motor 9910 is continuously energized directly from the alternating current power source 9929 and the other winding is energized by amplifier 9925 through a 90° phase shift network 9926.

Thus if the input to amplifier 9925 is obtained from the upper terminal of the secondary winding of transformer 9924, the output of the amplifier, phase shifted by the 90° network, causes the motor to rotate gear 9912 in a clockwise direction, as viewed from control knob 9916, at an angular velocity directly proportional to the current applied to the summing point of 9925. If input is obtained from the lower terminal of the secondary winding on transformer 9924 the motor drives gear 9912 in a counterclockwise direction. Flange 9921, which is rigidly fastened to shaft 9915, is equipped with a protruding pin which depresses the operating lever of switch 9922 closing the contacts of switch 9922 at the limit of counterclockwise rotation of shaft 9915. The same pin depresses the operating lever closing the contacts of switch 9923 at the limit of clockwise rotation of shaft 9915. If switch is closed by extreme counter clockwise rotation of shaft 9915 the lower terminal of the secondary winding on transformer 9924 is connected through a resistor to the input of amplifier causing the motor to drive gear 9912 in a clockwise direction until switch 9924 is allowed to open. Similarly, if switch 9923 is closed by extreme clockwise rotation of shaft 9915, the upper terminal of transformer 9924 is connected through a resistor to the amplifier input causing the motor to drive gear 9912 in a counter clockwise direction until switch 9923 is allowed to open.

In FIG. 99 the potentiometer 9919 has a top side connected to bus 9932, a low side connected to a fixed resistor 9931 which provides a current path to ground, and slider connected to bus 9933. Potentiometer 9920 has a top side connected to bus 9927, a low side connected to resistor 9930 which provides a current path to ground and a slider connected to bus 9928. Bus 10310 from System II has voltage pulses whenever the learning machine is in the teaching mode and P pulses are produced for the final forced group of G-functions. Each of these pulses causes counter 9901 to step up one count. At the end of a predetermined count bus 9939 will have a pulse on it to actuate the delay flip-flop 9902 and thereby place a negative pulse on bus 9904 for a fixed interval of time after 9902 restores. During the time in which a negative pulse exists on 9904 diode switch 9907 will be conducting and pass current from bus 9934 to bus 9935 and to the summing point of amplifier 9925. When the machine is in teaching mode or operating-and-learning mode, and an error of sufficient size occurs to require teaching there will be a negative pulse on bus 10311 for each final G-function passed to step 9905 and count therein. The stages of counter 9905 are connected to a series of analog diode switches and associated weighted resistors which act as a decoding circuit 9906 to change the code count of counter 9905 into corresponding current flow into bus 9934 and bus 9935 to the summing point of amplifier 9925. The said current is AC with driving voltage supplied by bus 9936 from transformer 9924 and its phase is locked to the phase of the AC current flowing in buses 9937 into the motor 9910. At the time when diode switch 9907 conducts the current flow through it is combined with the current on bus 9933 and through resistor 9938 which is connected to the slider of potentiometer 9919 whose top side receives AC voltage on bus 9932 of opposite phase to the voltage from bus 9936. The voltage is attenuated by the potentiometer in accordance with its setting by rotation of the shaft 9915. The attenuated voltage supplies current through resistor 9938 of opposite sign to that supplied by the decoder 9906. If the count on 9905 is great enough the current supplied by 9906 will be greater than that supplied through resistor 9938 at the time that diode switch 9907 conducts. Then there will be a net current into the summing point of amplifier 9925 of the same sign as that supplied by the decoder. The amplified current is fed through phase shifter 9926 and to the other winding of the two-phase motor 9910 causing it to move the shaft in such a direction so as to bring the slider of potentiometer 9919 nearer to the top side which is connected to bus 9932 thereby increasing the current through resistor 9838 which tends to cancel the current from the decoder. At the same time potentiometer 9920 is moving the same way so that the error signal at bus 9927 is attenuated less as it appears on the slider and output bus 9928. Bus 9927 receives the output of the subtractor and bus 9928 supplies the error multiplied by the scaling action of 9920 which is the value of the error parameter C and the result is fed into the first sample and hold circuit of System II. Buses 9927 and 9928 can be replaced by buses 6602 and 6002 respectively whereby the error function would then be multiplied as a whole by C. Other suitable circuit points may be used. If the count of counter 9905 is low enough so that the decoder current is lower than that supplied through resistor 9938, the net AC current into the amplifier and motor will be of opposite phase, and the motor will move in the opposite direction and the potentiometer sliders will move towards the low end. The current through 9936 will decrease tending to balance the current through the decoder. Potentiometer 9920 will then decrease the value of C thus attenuating the error more. When the motion of the shaft causes the potentiometers to reach the ends of the travel either switch 9922 or 9923 is rendered conducting permitting current of opposite phase to enter the summing point of 9925 so as to prevent further motion in the direction which actuates the respective switch. Resistor 9930, connected from the low end of 9920 and ground, prevents the parameter C from going to zero, and establishes a minimum value of C. A corresponding resistor 9931 on potentiometer 9919 maintains linearity between the two potentiometers. Switch 9940 when closed maintains $C=1$ at all times. If power is removed from 9929 the knob 9916 may be turned manually to set C at any desired value in the permissible range. The restore of 9902 places a negative voltage on bus 9941 to actuate reset generator 9942 which resets 9901 and 9905 via reset bus 9903. The reset generator is detailed in FIG. 58. The circuit of FIG. 99 is to be used for self-assignment in these memories.

FIG. 100 illustrates another manner of adjusting the parameter C automatically. The motor driven potentiometers and manual knob are the same as in FIG. 99. Bus 10028 has pulses for each required G-function passed and the pulses are applied to an integrator 10007 through a suitable resistor. The integrator will store and hold the pulses from 10028 at output circuit 10008 at which point the voltage is proportional to the count of the number of times the machine has received input signals when it is in the teaching-mode. There is a resistor and source of voltage at 10010 of opposite polarity to the voltage at 10008 to maintain the trigger flip-flop 10009 in a normal state when the voltage at 1008 is lower than predetermined value. When the voltage at 10008 rises sufficiently to indicate that a specified number of signals have been applied trigger circuit 10009 turns over and the voltage at 10011 goes negative. This causes the delay flip-flop 10012 to turn over for a specified interval of time and then restore. This places a negative voltage on bus 10006 which causes diode switch 10003 to conduct.

The error function $$\frac{e_i}{U_i}F_i(t)$$

either on bus 2425 of System I or from bus 6002 subject to 10027 of System II, is applied as indicated to bus 10014 and to transformer 10013. The secondary winding of 10013 is used in a full-wave rectifier type operation with series resistors connected to the diodes to give current proportional to $$\left|\frac{e_i}{U_i}F_i(t)\right|$$

The arrangement goes into the summing input of integrator amplifier 10002 and is generally represented by 10001. The output of the integrator at 10004 is proportional to the sum of the absolute error functions received and placed on bus 10014. When delay flip-flop 10012 restores, it causes the operation of delay flip-flop 10015 through bus 10016. At B of 10015 a negative voltage is maintained until 10015 restores. Bus 10017 connects through OR-gates 10018, 10019 and then through to respective diode switches 10020, 10021 which are rendered conductive at the time that 10017 has a negative signal, thereby restoring or discharging integrators 10007 and 10002 and placing the circuit in readiness for another series of input signals. When diode switch 10003 conducts current flows from 10004 to 10005 through the contacts of vibrator 10046 to the summing point of amplifier 10022. The vibrator or chopper is operated from the same AC source 10023 which also supplies the motor 10024 which is connected as motor 9910 of FIG. 99 which operates in the same manner.

The current to 10022 is interrupted by 10046 synchronously with the AC applied to the motor. There is a 90° phase shifter which serves the same purpose as the one in FIG. 99. Voltage on bus 10025 is applied to the summing point of 10002 through a resistor and is algebraically added to the rectified signals, but the polarity of the current through 10025 is opposite to that from the rectifiers and is derived from the pulses at 10028 which are of standardized negative amplitude and duration. The integrator 10002 will summate both the positive rectified signals and the negative current through 10025. If the latter has a greater average effect the voltage at 10004 will be of a sign controlled by 10025 and the current through 10003 will cause the motor to turn the potentiometers to cause the integrated currents from the two separate sources to tend to become equal so that zero voltage obtains at 10004. In case the current through 10025 has greater effects the potentiometer will turn so as to lower C, otherwise, if the rectified currents have greater effects, the potentiometer will turn to increase C. The error signal at bus 10014 is applied through conducting connection 10051 to the top side of potentiometer 10026 whose slider goes to bus 2114 of System I or 10048, FIG. 65, of System II, or to bus 6026 of FIG. 108. The low side of the potentiometer is connected to a resistor the same as 9930 of FIG. 99. Bus 6026 and connection 10052 are used when the digital memory system is used. Then connection 10051 is opened.

In the circuit of FIG. 100 a switch 10030 is provided to control the C parameter where teaching of steering takes place or when teaching of the final group of G-functions take place. Diode switch 10027 is rendered conductive during those intervals of time when the error functions occur of the G-functions which are considered for teaching. This diode switch is controlled by bus 10029.

Manually set switch 10030 can be set to the left for automatic adjustment of the parameter for steering G's. Flip-flop 10032 will be turned to the B state by the signal on bus 6418 which is activated at B time after bus RC3 is activated which primes flip-flop 10032. The B bus of flip-flop 10032 is connected as an input of AND gate 10031 via bus 10050. Also, the A terminal of flip-flop 10041 is connected as another input to AND gate 10031. When flip-flop 10032 is in the B state, flip-flop 10041 is in the A state, switch 10030 is turned activating bus 10033, bus 10213 is energized, then AND gate 10031 will pass a signal via bus 10036 to OR gate 10039, to bus 10044, and to AND gate 10045. Bus 10213 is active during teaching mode and bus 6450 is active between C time and P time when the error functions can occur. Under the above conditions, bus 10029 is energized rendering diode switch 10027 conductive and the error functions on bus 6002 will pass through 10027 to bus 10025 and to the transformer 10013 for processing. At time RC6 flip-flop 10041 is primed through its C input and at the next B time bus 6418 is energized to cause flip-flop 10041 to go to the B state thereby removing voltage from bus 10035 and blocking AND gate 10031 thus rendering diode switch 10027 non-conductive after that time. Under the above conditions, with switch 10030 turned to the left for control of steering, diode gate 10027 will be conductive only during those intervals of time when the error functions of the steering G's may appear on bus 6002. When bus 10029 is energized negative current will pass through diode 10038 to bus 10028 for use by the integrator amplifier 10007, and for use as the reference current through the potentiometer shown in FIG. 100 which corresponds to 9919 in FIG. 99, through bus 10025 and a resistor to the summing point of amplifier 10002.

If manual switch 10030 is set to the right, negative voltage is removed from AND gate 10031 and placed on bus 10053 to AND gate 10037. When flip-flop 10041 goes to the B state bus 10040 to AND gate 10037 is activated. Bus 10301 to the C input of flip-flop 10043 is activated with the final set of G-functions are considered for teaching and at that time flip-flop 10043 is primed. Then the next B time pulse on bus 6418 to E of 10043 will cause flip-flop 10043 to go into the B state, thus priming flip-flop 10054 which has its C and D inputs connected to the B and A buses respectively of flip-flop 10043. Thus flip-flop 10043 goes to the B state if a G-function has just been passed which is considered for teaching. Its error function will appear one cycle later, so that when the next P pulse occurs on bus 5707, flip-flop 10043 is reset via its E' terminal and flip-flop 10054 is turned to the B state via its EE' terminals which are connected to bus 5707. Then bus 10042 is activated causing AND gate 10037 to pass a signal to bus 10055, through OR gate 10039, to bus 10044, through AND gate 10045, to bus 10029, to render diode switch 10027 conductive and provide current for diode 10038 to bus 10028. This occurs at the time when the error function exists on bus 6002 for the G-function which took place in the previous cycle, it being understood that bus 6450 is active during the intervals of occurrence of any $\Delta G_i(t)$. If bus 10301 is not active at P time since no G-function is then considered for teaching, then flip-flop 10043 is not primed, and at the next B time pulse flip-flop 10043 will not be turned over. Then at the next P time pulse on bus 5707 flip-flop 10054 turns over to the A state if it is in the B state, or if it is in the A state it will stay that way. That is, the relation between flip-flops 10043 and 10054 is that of a shift register. Flip-flop 10054 will be set into the state of flip-flop 10043. Therefore, via bus 10042 and the other enumerated circuitry, diode switch 10027 will be either rendered conductive or not according to the existence or not in the previous cycle of a G-function which is considered for teaching. At those times when 10027 is conductive the respective error functions occur and are transferred through the diode switch for use in the computation of the parameter C. When the machine reaches home the reset pulse will occur on bus 5706 to restore flip-flops 10032, 10041, and 10043 if they are in the B states. Switch 10049 is closed momentarily to place negative voltage on bus 10050 to reset the integrators at the start of teaching.

The relations involved in both FIGS. 99 and 100 may be analyzed approximately as follows: Let $E$=the sum or integral of all the squared errors or absolute values thereof produced upon application of a predetermined number of signals with respect to the G-functions which are being taught. This corresponds to the output at 9934 or at 10004 at the time when the diode switches 9907 or 10003 are rendered conductive. Let $P$=the fraction of the potentiometer range held by the slider. Let $V$=the reference voltage equal either to the voltage on bus 9932 for FIG. 99 or $$V = \int_a^b kV_1 dt$$

for the case of FIG. 100, wherein $V_1$ is the voltage on bus 10028 and $a$ and $b$ are the beginning and end respectively of the integrating time $t$. Then $$\frac{dp}{dt} = PV - E$$

That is, the change of P per unit time of reckoning is equal to the setting of the potentiometer multiplied by the reference voltage and subtracted by the cummulative absolute error. The sense of E is negative because the rate of change of P should be negative if E is large and vice versa. Rearranging the equation there is obtained $$\frac{dp}{dt} - PV = -E$$

wherein $-E$ is the driving voltage. If at starting time $t=0$, the parameter $c=1$; therefore $p=1$, the equation has the solution $$P = \frac{E}{V}(1 - e^{-vt}) + e^{-vt}$$

which indicates that the fractional setting P of the potentiometer which equals C itself is proportional to E, since V is a constant and the transient terms decay if time is reckoned over a sufficiently long period. This means that if the average errors are small C becomes small and vice versa. The parameter C is not permitted to become smaller than the lowest setting of the potentiometer by the fixed resistor located on the low side, that is, it is applicable for $E > \epsilon$ and not for any E's below $\epsilon$. By closing switch 10047, $C=1$ under all conditions at the option of the operator.

Learned selection of conditioned memories
(FIGS. 64–70 and 110)

In general, the learned selection of conditioned memories serve to permit multiple memory units, each of limited capacity, to be organized to share the load presented by a quantity of input signals too large in number for any single memory unit to cope with.

This is accomplished by teaching a series of selection or steering G-functions to consistently select, for each input signal, one of many possible groups of final G-functions. The actual selection is done by selecting the memory in which the function is stored. The input signal is then processed with the selected group of final G-functions and a unique code identifying the input signal is produced in the manner previously described. The selection G-functions preferably should divide the totality of signals the machine is expected to identify in such a manner that all groups of final G-functions receive substantially equal numbers of input signals to identify.

In the particular implementation which will now be described by way of example seven selection G-functions route or steer substantially equal numbers of input signals to each of eight groups of final G-functions. The seven selection G-functions are divided into three levels, with the one function in the first level labeled $G^s$, two in the second level labeled $G^s_0$ and $Gs_1$ and the remaining four in the third level labeled $G^s_{00}$, $G^s_{01}$, $G^s_{10}$, and $G^s_{11}$. An incoming signal is sequentially correlated with one selection G-function from each level. It is first correlated with $G^s$ and the result is used to control the selection of either $G^s_0$ or $G^s_1$ for use in second level processing. In the same manner the result of the correlation with a steering G-function of the second level controls the choice between two of the third level steering G-functions and a result of correlation with a G-function of the third level controls the choice between two of the final G-functions. For example, if $G^s_0$ is used in the second level, then the third level G-function will be $Gs_{00}$ or $Gs_{01}$, but if $Gs_1$ is used in the second level then the third level will use either $G^s_{10}$ or $G^s_{11}$. Referring to FIG. 78, the eight groups of final G-functions are denoted by subscripts of G and the position of a function in its group by a superscript, thus $G^1_{000}$, $G^1_{001}$, $G^1_{010}$, $G^1_{011}$, $G^1_{101}$, $G^1_{110}$, and $G^1_{111}$ are the first functions in each of the eight groups. Each final G-function group contains one G-function for each final binary digit in the output code. FIG. 69 shows a partial view of the magnetic recording surface illustrated in FIG. 92 and comprises only tracks 9201 and in addition shows the relative positions of read, erase and write heads, for these tracks, which are illustrated in FIG. 93 by 9301, 9306, and 9308 respectively and in FIG. 77 by 7702, 7703, and 7704 respectively. FIG. 69 shows that read heads 6901, erase heads 6902, and write heads 6903 are spaced along the tape so that as the tape moves the recorded data will pass under the heads in the order just named and as shown by the arrow in FIG. 69. Selection G-functions of the same level are in the same sectors on the tape and these sectors are in the same order as the levels of the selection G-function they contain. FIG. 69 shows the first level selection G-function is just ready to pass under one of the write heads of 6903, the second level functions $G^s_0$ and $G^s_1$ are just beginning to pass under erase heads 6902 and the third level functions $G^s_{00}$, $G^s_{01}$, $G^s_{10}$, and $G^s_{11}$ are just beginning to pass under read heads 6901. If the tracks are numbered one through eight from left to right, as shown in FIG. 69, functions $G^s$, $G^s_0$, $G^s_{00}$, and $G^1_{000}$ are recorded on the first track, function $G^1_{001}$ on the second track, functions $G^s_{01}$ and $G^1_{010}$ on the third track, function $G^1_{011}$ on the fourth track, functions $G^s_1$, $G^s_{10}$, and $G^1_{100}$ on the fifth track, function $G^1_{101}$ on the sixth track, functions $G^s_{11}$ and $G^1_{110}$ on the seventh track and function $G^1_{111}$ on the eighth track.

During teaching of the G-functions, the decision to modify or not modify a specific G-function is made after completion of the processing of that function. If the function is to be modified, the one magnetic erase head of the erase head group 6902 which is associated with the track of that function is energized for one function duration to erase only that portion on the track occupied by the function to be modified. As it passes under the corresponding magnetic write head of the write head group 6903, the modified G-function is then rewritten in the same location on the magnetic tape. During teaching of the selection G-functions, the number of times each function has been selected is recorded digitally in the region preceding the recording of the function itself. This number is designated as the G-function utilization count and is recorded by using the erase heads as writing heads.

The detailed description of the learned selection of conditioned memory circuits will be divided into two parts.

(1) Those circuits which control selection and switching of the magnetic heads along with the associated read and write amplifiers and bias and erase oscillator.

(2) Those circuits which during teaching of the G-functions assure equal division of the incoming signals by each selection G-function.

Relay selection of magnetic heads (FIG. 65)

The magnetic head selection system consists of a relay and relay driver associated with each of the eight read, the eight erase and the eight write magnetic heads as shown in FIG. 65. These relay drivers are controlled by a group of fifteen three stage shift registers of the types shown in FIGS. 67 and 68 and connected together as illustrated in FIG. 66. All relay drivers shown in FIG. 65 are of the type shown in FIG. 70 and are described in connection with that figure.

Figure 39:
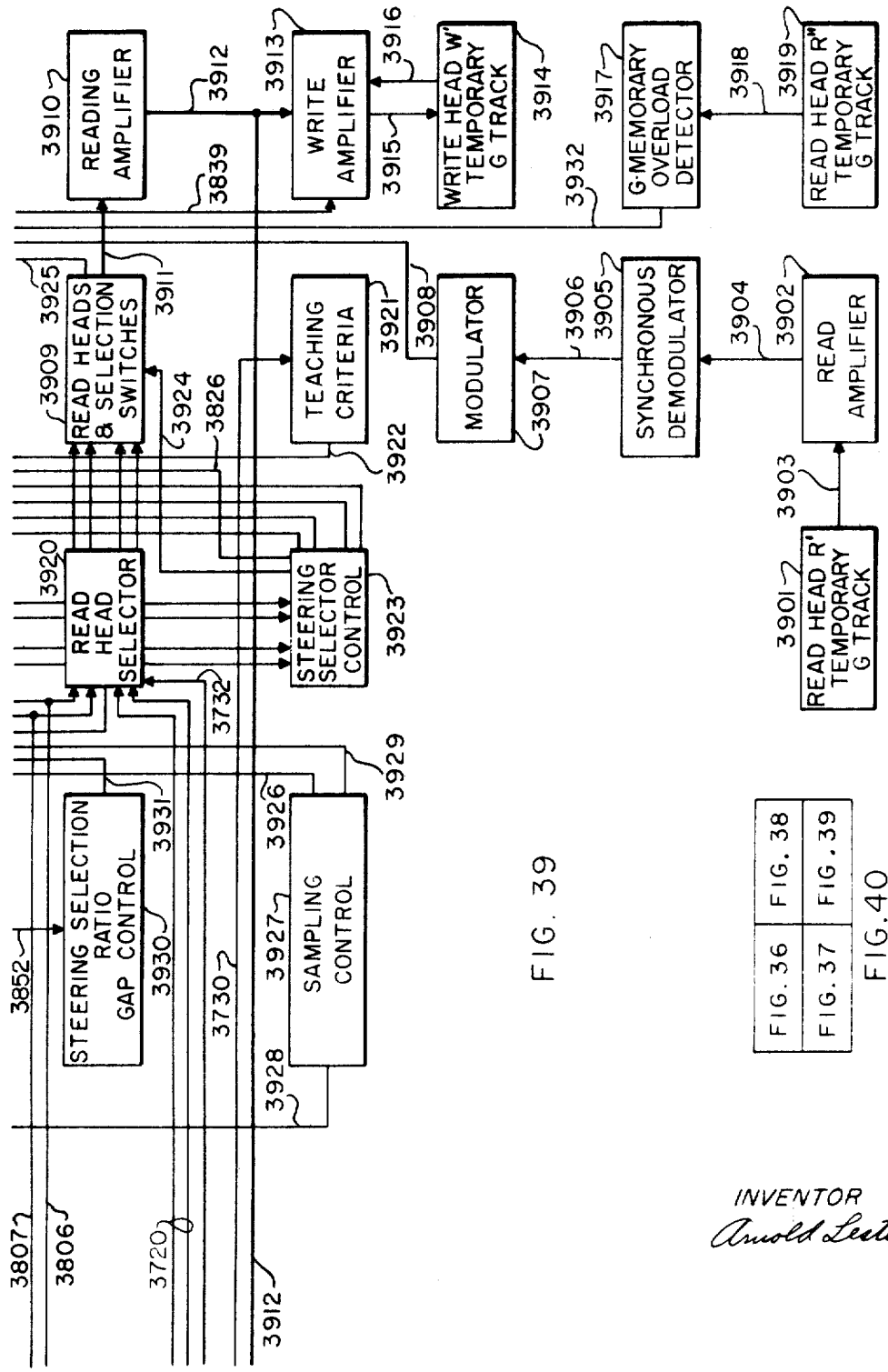

FIG. 65 shows that any one of the group of eight read magnetic heads 6501, 6502, 6503, 6504, 6505, 6506, 6507, or 6508 can be connected to bus 6510 by energizing their associated relay drivers 6511, 6512, 6513, 6514, 6515, 6516, 6517, or 6518 respectively. These eight read magnetic heads are the ones represented collectively by numeral 6901 in FIG. 69, 9301 in FIG. 93 and 7702 in FIG. 77. The last digit of the number associated with each head is the same as the number of the track in FIG. 69 which the head reads. That is, head 6501 reads track number 1, head 6502 reads track 2, etc. Only one of these read heads will be connected to bus 6510 at any one time. Read head 6508 has potentiometer 6569 shunted across it and the slider of the potentiometer is connected to the contacts of the associated relay. The adjustment of the potentiometer governs that amount of the total voltage developed across read head 6508 which is passed on to bus 6510. Each reading head has such a potentiometer connected across it and by adjusting these potentiometers the output levels of all heads can be equalized. Bus 6510 normally is connected to the input of read amplifier 6565 through the normally closed back contact of relay 6520. The output of amplifier 6565 is connected by bus 3912 to other circuits for processing as shown in FIG. 39. When bus 6421 is negative, relay driver 6519 will operate relay 6520 which disconnects bus 6510 from amplifier 6565 and connects it to bus 6420 which is connected to digital read amplifier 6408 shown in FIG. 64.

Any one of the group of eight erase magnetic heads 6521, 6522, 6523, 6524, 6525, 6526, 6527, or 6528 can be connected to bus 6530 by activating their associated relay drivers 6531, 6532, 6533, 6534, 6535, 6536, 6537, or 6538, respectively. These erase heads are the ones designated collectively by the numeral 6902 in FIG. 69, 9306 in FIG. 93 and 7703 in FIG. 77. The last digit of the number associated with each head is the same as the number of the track in FIG. 69 which the head erases. That is, head 6521 erases track number 1, head 6522 erases track number 2, etc. Only one erase head will be connected to bus 6530 at a time. Bus 6530 normally is connected to erase oscillator 6529 through the normally closed contact of relay 6540. The selected erase head can be connected to the output of digital write amplifier 6427 shown on FIG. 64 by activating relay driver 6539 via bus 6419, causing relay 6540 to connect bus 6530 to bus 6428.

When relay 6540 is closed the G-function utilization count may be written on the tape by the selected erase head.

Any one of the group of eight write magnetic heads 6541, 6542, 6543, 6544, 6545, 6546, 6547, or 6548 can be connected to bus 6550 by activating their associated delay drivers 6551, 6552, 6553, 6554, 6555, 6556, 6557, and 6558, respectively. These write heads are the ones designated collectively by the numeral 6903 in FIG. 69, 9308 in FIG. 93 and 7704 in FIG. 77. The last digit of the number associaated with each head is the same as the number of the track in FIG. 69 on which the head writes. Only one write head will be connected to bus 6550 at a time. Bus 6550 is normally connected to the output of analog write amplifier 6549 through the normally closed back contact of relay 6560. A signal on bus 6419 will activate relay driver 6559 which will operate relay 6560 and disconnect bus 6550 from write amplifier 6549. This is done to prevent accidental writing of analog information in the space reserved for writing the digital number representing the G-function utilization count.

Relay driver circuit (FIG. 70)

The relay driver circuit is illustrated in detail in FIG. 70. Power for operation of relay coil 7001 is obtained from the negative ten volt power supply applied to bus 7002. Transistor 7003 is normally biased to collector current cut off by the positive base current supplied through resistor 7004 from the positive ten volt power supply applied to bus 7015. This condition prevails if all of the input buses 7006, 7008, 7010, and 7012 are either disconnected or maintained at a potential positive with respect to ground. If any one of the input buses 7006, 7008, 7010, or 7012 is driven sufficiently negative with respect to ground, the corresponding diode 7007, 7009, 7011, or 7013 conducts sufficient negative current through resistor 7005 to exceed the positive current through resistor 7004 causing negative base current flow in transistor 7003 and saturating the transistor. This reduces the collector potential to within a few tenths of a volt above that of the grounded emitter and the resulting current flow through tthe coil of relay 7001 operates the relay. Diode 7014 is connected to the −15 volt supply on bus 7013 and limits the collector potential to a negative fifteen volts which prevents damage to transistor 7003 by the transient back voltage which occurs each time the relay coil current is interrupted by transistor 7003.

Recording connection

The output of the selected read head appearing on bus 6510 through the normally closed contact on relay 6520 is applied as an input to amplifier 6565 whose output on bus 3912 is connected to the input of amplifier 6564 which energizes the temporary G track write head 6509. This is the same head as head 9302 in FIG. 93 and writes on track 9202 in FIG. 92. High frequency bias is applied to magnetic head 6509 through amplifier 6564 from erase oscillator 6529 to linearize the magnetic recording characteristic in accordance with standard recording techniques. Write amplifier 6564 is the same amplifier as that designated by block 3913 in FIG. 39 and erase oscillator 6529 is illustrated in detail in FIG. 35 and is described in connection with that figure. Erase oscillator 6529 is also designated by block 3838 in FIG. 38.

The selected magnetic write head is energized by amplifier 6549. This amplifier is the same one represented by block 3837 on FIG. 38. It sums the error function brought in either on bus 6002, or on bus 10048 if the C parameter circuit in FIG. 100 is used, with the G-function brought in on bus 3908 and receives the customary recording bias from oscillator 6529. The input on bus 3908 is applied to amplifier 6549 via resistor 6563 which is normally short circuited by relay 6562. This relay is controlled by relay driver 6566 whose input is bus 6101. Bus 6101 originates in the circuits shown in FIG. 61 and the time when it carries a signal is described in connection with that figure. But 6101 normally provides a signal which holds relay 6562 closed. When the relay is open the signal on bus 3908 must pass through resistor 6563 to reach the summing point of amplifier 6549 and the additional resistance attenuates the signal to the amplifier. The output of amplifier 6549 is connected through the selected write head to the resistor network 6561. This network is used to give a current flow through the head proportional to the sum of the input voltages applied to the input resistors of summing amplifier 6549. A detailed discussion of this type of current monitoring feedback is contained in the specification for System I.

*Head selection shift registers*

(1) Typical shift register

The selection of the individual magnetic heads for reading, erasing and writing is determined by fifteen three-stage shift registers, 6601 through 6615, interconnected as illustarted in FIG. 66. The details of shift register 6601 are shown in FIG. 67 and those of all other shift registers are shown in FIG. 68. The bus connections to the shift registers in FIG. 66 have the same special configuration as the corresponding detail diagrams in either FIG. 67 or FIG. 68.

As shown in FIG. 68, each shift register contains three flip-flops. Flip-flops 6801, 6802, and 6803 are called the read, erase and write flip-flops respectively and their B outputs are used to control the head selection relays shown in FIG. 65. The B output of read flip-flop 6801, on bus 6814, is used in the control of one of the relay drivers numbered 6511 through 6518, the B output of erase flip-flop 6802, on bus 6815, is connected to one of the relay drivers numbered 6531 through 6538 and the B output of write flip-flop 6803, on bus 6816, is connected to one of the relay drivers numbered 6551 through 6558.

Bus 6813 is connected to the R input of the flip-flops and a positive pulse on this bus will force them all into the A state. The C, E, E' and D inputs to read flip-flop 6801 are brought out separately on buses 6811, 6812, 6805, and 6810 respectively. The B output of read flip-flop 6801 is also connected to the C priming input of erase flip-flop 6802 so that the erase flip-flop cannot be forced into the B state unless the read flip-flop is in the B state. This means that a track cannot be selected for erasing unless it has been selected for reading. The A and B outputs of erase flip-flop 6802 are connected to the D and C priming inputs respectively of write flip-flop 6803. Bus 6809 is connected to the E and E' inputs of write flip-flop 6803 and to the E' input of erase flip-flop 6802. A pulse on this bus will cause the write flip-flop to go into the same state as the erase flip-flop. It will also cause erase flip-flop 6802 to go into the A state if its D priming input on bus 6806 has a negative voltage at that time. The E input of flip-flop 6802 is brought out separately on bus 6804. The A output of the read flip-flop on bus 6807 and the B output on bus 6808 are used to prime two of the read flip-flops in the next level of selection for all levels except the last.

The shift register shown in FIG. 67 is identical with the one shown in FIG. 68 with one exception. Bus 6713, which corresponds to bus 6813 in FIG. 68, is connected to the reset inputs of the flip-flops in such a manner that a positive signal on it will force read flip-flop 6701 into the B state and erase flip-flop 6702 and write flip-flop 6703 into the A state. Otherwise, the description of the operation of the circuit in FIG. 68 applies to FIG. 67.

Head selection shift registers (FIG. 66)

The interconnection between the selection shift registers is shown in FIG. 66. Shift registers are represented by blocks numbered 6601 through 6615 and the spatial relationship of the input and output connections is the same as shown in FIGS. 67 and 68. As shown in FIG. 66, the shift registers are arranged in four columns with each column containing a different number of registers. Shift register 6601 in column 1 controls the selection of the read, write and erase heads for the first level selection G-function $G^s$. Shift registers 6602 and 6603 in Column 2 control the selection of the read, write and erase heads for the second level selection G-functions $G^s_0$ and $G^s_1$. Shift registers 6604, 6605, 6606, and 6607 in column 3 control the selection of the read, write and erase heads for the third level selection G-functions $G^s_{00}$, $G^s_{01}$, $G^s_{10}$, and $G^s_{11}$. Shift registers 6608 through 6615 in column 4 control the selection of the read, write and erase for all the final G-functions. Only one shift register in each column is active during the processing of one input signal. All B outputs of read flip-flops in shift registers in columns 1, 2, and 3 are connected to AND gates whose other inputs are timing pulses from the ring counter shown in FIG. 64. The outputs of these AND gates are connected to the appropriate head selection relay drivers shown in FIG. 65. For example, the B output of the read flip-flop of shift register 6601 on bus 6679 is an input to AND gate 6677 and the other input to this AND gate is RC–1. The output of this gate is connected to relay driver 6511 by bus 6631. As mentioned in the discussion of FIGS. 68 and 67, the B outputs of the erase and write flip-flops of each shift register are connected to appropriate relay drivers shown in FIG. 65. For example, buses 6632 and 6633 connect the outputs of the erase and write flip-flops respectively of shift register 6601 to relay drivers 6531 and 6551.

The reset inputs, which correspond to buses 6813 and 6713 in FIGS. 68 and 67, of all shift registers in FIG. 66 are connected to bus R which is connected to bus 5706. In the description of FIG. 27 the explanation shows that bus 5706 has a positive plus at D time. Therefore, when the machine begins processing an input signal all the shift registers will be reset by a pulse on bus 5706 occurring at the end of the processing of the previous input signal. This places all flip-flops in the A state except the read flip-flop of shift register 6601 which will be in the B state. The resulting signal on bus 6631 to relay driver 6511 operates the associated relay and connects read head 6501 to bus 6510. This head is associated with the track designated 1 on FIG. 69 and therefore, the machine always begins its operations by reading from track 1 which previous discussion shows has the selection function $G^s$.

*Read head selection*

At the P time after processing is completed with the selected G-function in any given selection level, a signal appears on either bus 10419 or 10418. The signals on these two buses are used to select which one of two possible tracks will be used for further processing.

Reference to FIG. 66 shows that bus 10419 is connected to the E pulse input of the read flip-flop in shift register 6603 which corresponds to bus 6812 on FIG. 68. Bus 10418 is connected to the corresponding input to shift register 6602. The B output of the read flip-flop in shift register 6601 is on bus 6617 and is connected to the C priming inputs of the read flip-flops of shift registers 6602 and 6603 at inputs which correspond to bus 6811 in FIG. 68. Thus at time $P_2$, the C priming inputs of the read flip-flops of shift registers 6602 and 6603 are both energized. A signal on bus 10419 will cause the read flip-flop of shift register 6603 to go to the B state and a signal on bus 10418 will cause the read flip-flop in shift register 6602 to go into the B state. Since these two buses never have a signal at the same time, only one shift register will have its read flip-flop changed to the B state.

The E' input of the read flip-flop of shift register 6601 is connected to the output of AND gate 6681 whose two inputs are the timing signal on bus RC–2 from the circuits in FIG. 64 and a bus designated E'. The E' bus is connected to bus 6451 which originates in the circuits of FIG. 64 and the explanation of this figure shows that this bus goes negative at B time. FIG. 66 shows that the D priming input of the read flip-flop of shift register 6601 is connected to bus 6617 which is the B output of the same flip-flop. As a result of these connections, when E' goes negative at $B_1$ time it will have no effect on shift register 6601. Bus RC–2 will have a signal between $P_1$ and $P_2$ and therefore when E' goes negative after time $B_2$, AND gate 6681 will have an output and the read flip-flop of shift register 6601 will be forced to the A state.

From the above description it can be seen that the read flip-flop of two shift registers have been in the B state at the same time. This will not result in two read selections relays being operated simultaneously since the B outputs of the read flip-flops of the shift registers in one column are AND gates with a different timing signal. For example, the B output of the read flip-flop of shift register 6601 is gates with RC–1 and the corresponding outputs of shift registers 6602 and 6603 are gates with RC–2. At time $P_2$ the signal on RC–1 disappears and a signal appears on RC–2 so that at this time the control of the read selection relays changes from shift register 6601 to one of the shift registers in column 2.

Reference to FIG. 66 shows that the B output of the read flip-flop of each sift register in column 2 energizes the C priming input of the read flip-flops of two shift registers in column 3. This connection between shift register 6603 and shift registers 6606 and 6607 is on bus 6623 and the one between shift register 6602 and shift registers 6604 and 6605 is on bus 6622. The E inputs of the read flip-flops of shift registers 6607 and 6605 are connected to bus 10419 and the corresponding inputs of shift registers 6604 and 6606 are connected to bus 10418. Now at time $P_3$ either bus 6622 or 6623 will have a signal and either bus 10418 or bus 10419 will become negative. As a result of these signals the read flip-flops of one of the four shift registers in column 3 will be forced to the B state at this time. The E' inputs of the read flip-flops of the shift registers in columns 2 and 3 are all connected to the bus designated E'. The D priming inputs of the read flip-flops of shift registers 6602 and 6603 are connected by bus 6616 to the A output of the read flip-flop of shift register 6601 which previous description has shown will be in the A state after bus E' has gone negative at time $B_2$. Therefore, when E' goes negative at time $B_3$, the read flip-flop of shift register 6602 or 6603 which has been in the B state will be returned to the A state.

FIG. 66 also shows that the B output of the read flip-flop of each shift register in column 3 is connected to the C priming input of the read flip-flops of two shift registers in column 4. This connection between shift register 6604 and shift register 6608 and 6609 is on bus 6624, the connection between shift register 6605 and shift registers 6610 and 6611 is on bus 6625, the connection between shift registers 6606 and shift registers 6612 and 6613 is on bus 6626 and the connection between shift register 6607 and shift registers 6614 and 6615 is on bus 6627. The E inputs of the read flip-flops of shift registers 6608, 6610, 6612 and 6614 are all connected to bus 10418 and the corresponding inputs of shift registers 6609, 6611, 6613 and 6615 are all connected to bus 10419. At time $P_4$ one of buses 6624, 6625, 6626, and 6627 will have a signal and bus 10418 or bus 10419 will become negative. Therefore, at this time one of the read flip-flops of the shift registers in column 4 will be forced to the B state. This selects the track containing the final G-functions which will be used. No more track switching is done after the read flip-flop in column 4 is selected and this read flip-flop is left in the B state until bus 5706 produces a positive pulse on the R bus at the next D time. This will reset all flip-flops of the shift registers shown in FIG. 66 to their initial state as has been previously described.

From the description just given it can be seen that the selection process always begins with shift register 6601 selected; at time $P_2$ one of the shift registers in column 2 is selected; at time $P_3$ one of the shift registers in column 3 is selected and at time $P_4$ one of those in column 4 is selected.

Erase and write head selection

When teaching of G-functions is permitted, the decision to teach or not is made after the function has been read. If teaching is to take place, then the function to be taught is erased in the time period following reading and the corrected function is rewritten in the following time period. For example, the selection G-function $G^s$ is read between times $C_1$ and $P_2$ and if it is to be taught it will be erased between times $C_2$ and $P_3$ and rewritten between times $C_3$ and $P_4$.

The decision to teach a selection G-function is dependent upon the position of switches 6699, 6499, 6698, and 6498 and the output of the memory selection ratio gap control circuit shown on FIG. 64, whose operation is described in connection with that figure. The gap control circuit output is on bus 6470 and must be negative shortly after B time before teaching can take place. Bus 6470 is an input to AND gate 6676 and the output of this AND gate on bus 6628 is used to actuate the appropriate erase flip-flop of the selection shift registers. One input to AND gate 6676 is the B output of delay-flop 6686 whose input is connected to bus 6449. This bus originates in the circuits shown in FIG. 64 and the description of that figure explains that this bus has a pulse every P time except at $P_1$. The time period of delay-flop 6686 is made longer than the time from a P time to the following B time. Since there will be no input to the delay-flop at $P_1$ time, there will be no signal output from it to AND gate 6676 at this time and consequently no output from the AND gate between times $P_1$ and $P_2$. Another input to AND gate 6676 is from bus 6451. The description of FIG. 64 shows that bus 6451 goes negative at B time and remains negative until C time. If there is an output from AND gate 6676 on bus 6628, it will come at the time delay-flop 6678 returns to the A state.

Bus 6628 is connected to the moving contact of switch 6699–2. This section of switch 6699 controls which levels of the selection G-functions may be taught. There are four positions of the switch. If the switch is in the position shown in FIG. 66 where the moving contact is in the downward position, only the first level selection G-function may be taught. If the switch is rotated clockwise one position only, the second level selection G-function may be taught, and if the switch is rotated clockwise one more position only the third level may be taught. In the fourth or top position of switch 6699–2, all or none of the selection G-functions may be taught depending on the state of switch 6698. With switch 6699–2 in the top position and when switch 6698 is open no selection G-functions may be taught and when it is closed all selection G-functions may be taught. Switch 6699–2 achieves its control by connecting the signal on bus 6628 to the selection shift registers associated with the selection G-functions it is desired to teach. For example, with switch 6699–2 in the position shown in FIG. 66, bus 6628 is connected to bus 6680 which is connected to shift register 6601 at the E input to the erase flip-flop of that shift register. As shown in previous discussion, the first level selection function $G^s$ is read between times $P_1$ and $P_2$ and if the function is to be taught then a signal will appear on bus 6628 at the time following $B_2$ when delay-flop 6678 returns to the A state. Since the read flip-flop of shift register 6601 is still in the B state, the C priming input of the associated erase flip-flop has a signal and the signal on the E input of the erase flip-flop, which comes from bus 6628 through switch 6699–2 and bus 6680, will force the erase flip-flop into the B state. The B output of the erase flip-flop is connected by bus 6632 to relay driver 6531 shown on FIG. 65 and causes head 6521 to be connected to bus 6530. FIGS. 67 and 66 shows that E' input of the erase flip-flop and the E and E' inputs of the write flip-flops of shift

167 register 6601 are connected to bus 6449. It has been previously explained that this bus has a pulse at each P time except at $P_1$. Therefore, at $P_3$ time the pulse on this bus will cause the erase flip-flop of shift register 6601 to go to the A state and the write flip-flop to go to the B state. This removes the signal on bus 6632 and places one on bus 6633 causing relay driver 6531 to disconnect erase head 6521 from bus 6530 and relay driver 6551 to connect write head 6541 to bus 6550. At $P_4$ time the pulse on bus 6449 will cause the write flip-flop of shift register 6601 to go to the A state which stops the signal on bus 6633 and relay driver 6551 will disconnect write head 6541 from bus 6550. The teaching of selection function $G^s$ will be complete at this time.

If it is desired to teach the second level G-functions then switch 6699–2 is rotated one position clockwise from the position illustrated in FIG. 66. This connects bus 6628 to bus 6687 which is connected to shift registers 6602 and 6603 at the input which corresponds to bus 6804 on FIG. 68. Shift registers 6602 through 6615 have their inputs which correspond to bus 6809 on FIG. 68 all connected to bus 6449. Therefore, the operation of the erase and write flip-flops of the shift register whose read flip-flop has been selected will be the same as that described for teaching the first level selection function $G^s$ except that the P times involved are all one time period later.

When switch 6699–2 is rotated clockwise two positions from the position shown in FIG. 66, but 6628 will be connected to shift registers 6604, 6605, 6606 and 6607 and teaching will be accomplished in the same manner as for the second level selection G-functions except that the P times involved are all one time period later.

If switch 6699–2 is in the upper position, bus 6628 will be connected to switch 6698 and when switch 6698 is open the signal on bus 6628 is not connected to any shift register and no selection G-function can be taught. When switch 6698 is closed bus 6628 is connected as an input to AND gates 6682, 6683, and 6684. As shown in FIG. 66, the other input to AND gate 6682 is timing signal RC–2 which is present from time $P_2$ to time $P_3$. The output of AND gate 6682 is connected through diode 6618 to bus 6680. Therefore, if the selection function $G^s$ is to be taught a signal will appear on bus 6628 between time $P_2$ and $P_3$ and produce a signal on bus 6680 which will force the erase flip-flop of shift register 6601 into the B state and erasing and writing will take place in the manner described previously. Similarly, the pulse on bus 6628 will be gated through diode 6619 to shift registers 6602 and 6603 between times $P_3$ and $P_4$ and through diode 6620 to shift registers 6604, 6605, 6606, and 6607 between $P_4$ and $P_5$ and cause teaching of the appropriate selection G-functions to take place in the manner previously described.

Switches 6699–2 and 6699–1 are ganged so they will both be in any position at the same time. In the top position of the switch teaching of the final G-functions is permitted because bus 5646 is connected to shift registers 6608 through 6615 at the inputs which corresponds to bus 6804 in FIG. 68. Bus 5646 originates in the circuit shown in FIG. 56 and the explanation of that circuit shows that if a final G-function is to be taught this bus will go negative shortly after the first P pulse occurring after the G-function has just been read. The pulse on bus 5646 will cause the erase flip-flop whose associated read flip-flop is in the B state also to go to the B state and erasing and writing will proceed as previously described for the selection G-functions.

Timing

Many of the timing signals used throughout the system are generated by circuits in FIG. 64. Some of the more important of these signals are shown in FIG. 79. A detailed description of these signals follows.

168

Ring counter

The ring counter 6400 consists of a group of flip-flops interconnected to operate as a shift register. The R pulse obtained from bus 5706 resets, at D time, all flip-flops to the A state except the first, 6401, which is set to the B state. The binary state of one, thus inserted in the first stage, is shifted one stage to the right at the occurrence of each P pulse on bus 5707.

The first stage flip-flop 6401 is set to the B state by each R pulse as described hereinabove. The B output of flip-flop 6401 produces negative output signal on bus RC–0 which primes the D input of flip-flop 6401 also and primes the C input on flip-flop 6402. Thus at the occurrence of the first P pulse $P_1$ on bus 5707, flip-flop 66401 is reset to the A state causing the signal on bus RC–0 to disappear and flip-flop 6402 to be set to the B state thereby producing a negative output signal on bus RC–1. The signal on bus RC–1 primes the C input of the third stage flip-flop 6403. The D input of flip-flop 6402 is primed by the A output of flip-flop 6401. Thus at the occurrence of the second P pulse $P_2$ on bus 5707, flip-flop 6402 is reset to the A state causing the signal on bus RC–1 to disappear and flip-flop 6403 to be set to the B state thereby producing a negative output signal on bus RC–3.

In like manner each subsequent stage is primed to be set to the B state by the B output of the preceding stage and is primed to be reset to the A state by the A output of the preceding stage. Thus the binary state of one, originally inserted in stage one, is caused to step one stage to the right upon the occurrence of each P pulse on bus 5707.

Timing pulses

Each P pulse on bus 5707 is applied to the E input of flip-flop 6406, which is self primed, forcing it to the B state and causing bus 6485 to become negative. When bus 6485 is negative, AND gate 6407 will pass the clock pulses on bus 5708 causing binary counter 6409 to start counting. When the eight stage binary counter 6409 overflows after counting 256 clock pulses, a pulse appears on bus 6452 forcing flip-flop 6406 to the A state and causing bus 6485 to become positive, thereby preventing further clock pulses from passing AND gate 6407. The appearance of the overflow pulses on bus 6452 establishes the C instants of time shown in the timing diagram of FIG. 79.

At the time binary counter 6409 has counted 128 pulses, bus 6413, which is connected to the B output of the last stage of the counter, becomes active and forces flip-flop 6414 to the B state. Bus 6417 is connected to the B output of the fifth stage of the binary counter. Sixteen pulses after bus 6413 becomes negative bus 6417 will become negative and force flip-flop 6414 to the A state. The instant of time of the start of the pulses on bus 6413 establishes the A instants of time shown in the timing diagram of FIG. 79. Each of the first times that bus 6417 becomes negative after bus 6413 becomes negative establishes the B instants of time shown in the timing diagram of FIG. 79. The number of clock pulses from P time to A time is therefore, 128 and from P time to B time is 144, and from P time to C time is 256.

Flip-flop 6414 is in the B state from A time to B time and the B output supplies one input to AND gate 6415 so that the sixteen clock pulses from bus 5708 between A time and B time are allowed to pass the gate and appear on bus 6416.

At P time the pulse on bus 5707 forces flip-flop 6412 to the B state causing bus 6419 to become negative. At B time bus 6418 becomes negative and forces flip-flop 6412 to the A state. Therefore, bus 6419 is negative from each P time to the following B time. The signal on bus 6419 is used as explained in the description of FIG. 65 to cause the output of digital write amplifier 6427 on bus 6428 to be connected to bus 6530 and the output of analog write amplifier 6549 to be disconnected from bus 6550. At B time the negative pulse on bus 6418 forces flip-flop 6429 to the B state where it remains until the C time when the pulse on bus 6452 forces the flip-flop to the A state. At the time flip-flop 6429 goes to the A state the pulse on bus 6453 causes delay-flop 6454 to be forced to the B state. At the time delay-flop 6454 returns to the A state, which is shortly after C time, a negative pulse appears on bus 6486.

At the time of each P pulse on bus 5707, delay-flop 6404 is forced to the B state and shortly thereafter returns to the A state causing bus 6405 to become negative.

Flip-flop 6424 is primed on its C input by the signal on bus RC–1 and is therefore forced to the B state at $P_2$ time by the pulse on bus 5707. The flip-flop is returned to the A state at time $A_5$ by the pulse on bus 6413 and the fact that the D priming input is present from $P_5$ to $P_6$ from the signal on bus RC–5. The B output of flip-flop 6424 causes one input to AND gate 6423 to be present from $P_2$ time to $A_5$ time.

*Memory selection counter circuits*

If a specified level of selection G-functions is to be taught then the utilization number of the selected G-function in the level under consideration and the utilization number of the G-Function selected by the selection G-function in the level under consideration are read by the selected read head and appear on bus 6420.

Shortly after the P time preceding the selection G-functions which are to be taught, the pulse on bus 6405 clears shift register 6425. At the time of each of the sixteen pulses on bus 6416 a corresponding one of the bits of the sixteen bit utilization number is picked up from the memory and then causes a signal on bus 6420. The signal on bus 6420 is sampled by pulses on bus 6416 and amplified by amplifier 6408. The output of digital amplifier 6408 causes a negative signal on bus 6490 and a positive signal on bus 6491 to represent a binary number 1. The signals on these two buses are reversed to represent a binary 0. The clock pulses on bus 6416 are used to shift shift register 6425. At the B time all sixteen bits of the utilization number have been read from the memory and are stored in shift register 6425. At the next C time the signal on bus 6453 causes binary counter 6455 to be reset to zero and shortly thereafter the signal on bus 6486 causes twelve bits of the binary number stored in shift register 6425 to be transferred to the binary counter. At the next P time the signal on bus 5707 causes one to be added to the number stored in the binary counter and shortly thereafter the pulse on bus 6405 causes the number in the binary counter to be transferred to shift register 6426.

A number which is one larger than it was when read from the memory is now stored in shift register 6426. The next sixteen pulses on bus 6416 will cause this number to be shifted out serially to the input of amplifier 6427. After the fourteenth pulse the last two stages of shift register 6426 are set according to the outputs of AND gates 6473 and 6474. The digits stored in these last two stages are the utilization bits and are shifted to the input of amplifier 6427 at the time of the fifteenth and sixteenth pulses on bus 6416. The output of reclocked amplifier 6427 on bus 6428 is connected to the appropriate erase head as described elsewhere herein and causes the new number to be written in place of the old one in an area of the memory just preceding that of the associated G-function.

As the number is shifted out of shift register 6426 a new number is read from the memory and stored in shift register 6425 in the manner previously described. After shifting is completed the last two stages of shift register 6425 contain the stabilization bits. The B outputs of the last two stages are connected by buses 6488 and 6489 to AND gates 6483 and 6484 respectively to control the polarity of the output on bus 6479 as described in another section.

*Register and counter details*

FIG. 110 shows more detail of shift registers 6425 and 6426 and binary counter 6455 shown in FIG. 64. The first twelve of the sixteen bits read from the memory and passed through amplifier 6408 are the utilization count number and the last two are stabilization bits. The thirteenth and fourteenth bits are not used. Flip-flop 11001 through 11015 form the shift register designated 6425 in FIG. 64. Data is brought in from amplifier 6408 on buses 6490 and 6491, with a one digit indicated when bus 6490 is positive and bus 6491 negative and a zero digit indicated when these polarities are reversed. The shifting pulses are brought in on bus 6416. At the end of the shifting, the twelve bits making up the utilization count are stored in flip-flops 11001 through 11012 and the two stabilization bits are stored in flip-flops 11014 and 11015.

The description of FIG. 64 shows that a pulse occurs on bus 6405 shortly after each P time. The pulse on bus 6405 actuates reset generator 11022 whose output on bus 11025 resets all flip-flops to the A state except flip-flop 11014 which is set to the B state. The A output of flip-flop 11013 provides one input to AND gate 11017 through its connection by bus 11019. The shifting pulses on bus 6416 begin at A time and the first one will therefore be passed by AND gate 11017 and produce a pulse on bus 11023. All the E and E' inputs of flips-flops 11001 through 11013 are connected to bus 11023 and the C and D priming inputs of each of flip-flops 11002 through 11013 are connected to the B and A outputs respectively of the flip-flop shown to its left. The C and D priming inputs of flip-flop 11001 are connected to the B and A outputs respectively of flip-flop 11014. As a result of these connections, each pulse on bus 11023 will cause flip-flop 11001 to assume the same state as that held by flip-flop 11014 and each of flip-flops 11002 through 11013 to assume the state of the flip-flop on its left.

Bus 6416 is also an input to delay-flop 11016 whose delayed output is connected by bus 11024 to the E and E' inputs of flip-flop 11014. The pulse on bus 11024 will cause flip-flop 11014 to assume a state dependent upon buses 6490 and 6491. It will go to the B state if they indicate a one digit and will go to the A state if they indicate a zero digit.

As mentioned previously, flip-flop 11014 is placed in the B state at P time. The first pulse on bus 6416 will cause flip-flop 11001 to go to the B state and at each subsequent pulse on bus 6416 this B state is shifted one stage to the right. After the thirteenth pulse on bus 6416, the first twelve bits from amplifier 6408 are stored in flip-flops 11001 through 11012 and flip-flop 11013 will be in the B state for the first time. This removes the signal from the A output of flip-flop 11013 on bus 11019 and places a signal from its B output on bus 11026. No more pulses will appear on bus 11023, but the fourteenth, fifteenth and sixteenth pulses on bus 6416 will now be able to pass through AND gate 11018 and appear on bus 11027. The C and D priming inputs of flip-flop 11015 are connected to the B and A outputs respectively of flip-flop 11014 and the E and E' inputs of flip-flop 11015 are connected to bus 11027. The pulses on bus 11027 will cause flip-flop 11015 to assume the state held by flip-flop 11014 and after the sixteenth pulse on bus 6416, the fifteenth and sixteenth bits from amplifier 6408 are stored in flip-flops 11015 and 11014 respectively.

Reference to FIG. 64 shows that buses 6453 and 6486 are connected to binary counter 6455. This binary counter is the same type of a parallel loaded counter represented by flip-flops 5413 through 5417 in FIG. 54 and whose operation is described in connection with that figure. Binary counter 6455 is connected to flip-flop 11001 through 11012 in the same manner that the shift register in FIG. 54 just referred to is connected to register 5418.

The description of the circuits in FIG. 64 has explained that a pulse appears on bus 6453 at C time and shortly after that on bus 6486. The pulse on bus 6453 is used to clear the binary counter and the pulse on bus 6486 causes the utilization count number held in flip-flops 11001 through 11012 to be transferred in parallel into the binary counter. At the next P time the pulse on bus 5707 at the input of binary counter 6455 causes the count to increase by one.

Shift register 6426 showin FIG. 64 is represented by flips-flops 11028 through 11033 in FIG. 110. The K and J priming input of each of the flip-flops 11028 through 11031 are connected to the A and B outputs respectively of an associated stage of binary counter 6455. FIG. 110, shows that bus 6405 is connected to the H and H′ inputs of flip-flops 11028 through 11031. As explained in the description of FIG. 108 and elsewhere, the K, H′, H and J inputs to a flip-flop correspond to and perform the same functions as the D, E′, E and C inputs, respectively. Therefore, a pulse on bus 6405 will cause the number held in binary counter 6455 to be transferred to shift register 6426. The description of FIG. 64 shows that a pulse appears on bus 6405 shortly after each P time.

The E and E′ inputs of flip-flops 11029 through 11031 are connected to bus 11023. The C and D priming inputs of each of flip-flops 11029 through 11031 are connected to the B and A outputs respectively of the flip-flop shown on its left. Flip-flop 11028 has its D priming input connected to its B output and its E′ input connected to bus 11023. These conections make flip-flops 11028 through 11031 a shift register in which the number stored will be shifted to the right by pulses on bus 11023. Previous description has shown that beginning at A time a train of thirteen pulses appear on this bus. These pulses causes the number held in shift register 6426 to be shifted out on bus 11037 through OR gate 11034 and delay-line 11035 to bus 11036 which connects it to amplifier 6427 shown in FIG. 64.

Flip-flops 11032 and 11033 are loaded and shifted separately from the other stages of shift register 6426. FIGS. 110 and 64 show that the J priming input of flip-flop 11032 is connected by bus 6481 to the output of AND gate 6474 and the J priming input of flip-flop 11033 is connected by bus 6487 to the output of AND gate 6473. The H pulse inputs of both flip-flops are connected to bus 11041. Previous description has shown that the fourteenth, fifteenth and sixteenth pulses of the train appearing on bus 6416 produce pulses on bus 11027. FIG. 110 shows that bus 11027 is connected as one input to AND gate 11040 and also to the E input of flip-flop 11038. This flip-flop is self primed and therefore the first pulse on bus 11027 will force it to the B state. The B output of flip-flop 11038 is connected through delay line 11039 to bus 11041. The signal on bus 11041 will cause flip-flop 11032 to go to the B state if bus 6481 has a signal and flip-flop 11033 to go to the B state if bus 6487 has a signal. In the description of FIG. 64 it was shown that these buses indicate the value of the stabilization bits to be recorded with the utilization count number. Thus, shortly after the first pulse on bus 11027 flip-flops 11032 adn 11033 will store the two stabilization bits.

Bus 11041 is also connected as the second input to AND gate 11040. The purpose of delay line 11039 is to delay the signal appearing on bus 11041 until the first pulse on bus 11027 has disappeared and thus the first pulse on bus 11027 will not pass AND gate 11040 and cause a pulse on bus 11042. The second and third pulses on bus 11027 will cause pulses on bus 11042 which is connected to the E and E′ inputs of flip-flops 11032 and 11033. These pulses cause the stabilization bits to be shifted out on bus 11043 and through OR gate 11034 and delay line 11035 to bus 11036. Flip-flops 11038, 11032 and 11033 are reset to the A state by a signal on bus 11025 which was previously shown to go positive after P time.

From the above description it can be seen that the first- twelve pulses on bus 6416 cause the utilization count number to be shifted out on bus 11036 and that the fifteenth and sixteenth pulses on bus 6416 cause the stabilization bits to be shifted out on bus 11036. The output of delay line 11035 on bus 11036 is applied as input to digital write amplifier 6427 as shown in FIG. 64. Delay line 11035 serves the purpose of preventing disappearance of the pulse in the reclocked amplifier 6427 during clocking. A delay flop may be substituted for delay line 11035.

Head selection for writing utilization numbers

The appropriate erase head for use in writing the utilization number is selected by one of the eight delay-flops 6430, 6432, 6434, 6436, 6438, 6440, 6442, or 6444. P pulses $P_2$ through $P_5$ are required to activate these delay-flops. These are obtained by applying all P pulses from bus 5707 to one input of AND gate 6446 through a one microsecond delay line 6447. AND gate 6446 is normally enabled by the A output of delay-flop 6448. Delay-flop 6448 is primed on the C input by ring counter output on bus RC–0 such that upon the occurrence of pulse $P_1$ appearing on bus 5707, delay-flop 6448 produces a positive output disabling AND gate 6446 prior to the arrival of pulse $P_1$ via delay line 6447. $P_1$ is thus inhibited from appearing at the output of AND gate 6446 on bus 6449. Delay-flop 6448 is allowed to return to the A state prior to the occurrence of pulse $P_2$, thus AND gate 6446 is enabled and admits pulse $P_2$ and all subsequent P pulses to bus 6449. The output of AND gate 6446 is applied to one input of AND gate 6423 which is enabled from $P_2$ through $P_5$ by the B output of flip-flop 6424 as described hereinabove. Thus pulses $P_2$ through $P_5$ appear at the rotary contact of switch 6499–3. Between P time and B time, bus 6419 is negative activating 6539 and operating relay 6540 to permit writing via bus 6428.

Switch 6499–3 is positioned as shown during the teaching of selection function $G^s$. All switches with 99 in the third and fourth decimal digits are ganged together. As explained in the description of FIG. 66, under these conditions there will be a signal on bus 6631 between times $P_1$ and $P_2$. This primes the C input of delay-flop 6430 which will be operated by the occurrence of a pulse at time $P_2$ from the output of AND gate 6423. The resulting signal on bus 6431 activates relay driver 6531 causing the associated relay to connect erase magnetic head 6521 to bus 6530 which is connected through the front contacts of relay 6540 to the output 6428 of digital write amplifier 6427 and results in writing the utilization count on track 1 just preceding function $G^s$ on the same track. If selection function $G^s_0$ is selected by the read selection flip-flop of shift register 6602, there will be a signal on output bus 6634 which primes the J input of delay-flop 6430. At the time $P_3$ at which a pulse output from AND gate 6423 occurs delay flop 6430 is activated. Activated delay-flop 6430 and the resulting signal on bus 6431 operates relay driver 6531 causing the associated relay to connect erase magnetic head 6521 to bus 6530 which is connected through the front contacts of relay 6540 to the output bus 6428 of write amplifier 6427 and results in writing the utilization count on track 1 just preceding function $G^s_0$ which is on the same track. If selection function $G^s_1$ is selected by the read selection flip-flop of shift register 6603, there will be a signal on output bus 6637 which primes the L input of delay-flop 6432 and allows it to operate upon occurrence of a pulse from AND gate 6423 at time $P_3$.

The K priming input and the L pulse input and also the N priming input and the M pulse input correspond to and perform the same functions as the C priming input and the E pulse input. Therefore, delay-flop 6432 is actuated and the resulting signal on bus 6433 activates relay driver 6535 causing the associated relay to connect erase magnetic head 6525 to bus 6530 which is connected through the front contacts of relay 6540 to the output 6428 of digital write amplifier 6427 and results in writing the utilization count on track 5 just preceding function $G^s_1$.

To teach selection functions $G^s_0$ and $G^s_1$, switch 6499 is advanced clockwise one position. In this position, if selection function $G^s_{00}$ is selected by the read selection flip-flop of shift register 6604, there will be a signal on output bus 6640 which primes the L input of delay-flip 6430 and allows it to operate via switch 6499-3 upon the occurrence of a pulse from AND gate 6423 at time $P_4$. The resulting signal on bus 6431 activates relay driver 6531 causing the associated relay to connect erase magnetic head 6521 to bus 6530 which is connected through the front contacts of relay 6540 to the output 6428 of write amplifier 6427 and results in writing the utilization count on track 1 just preceding function $G^s_{00}$. If selection function $G^s_{01}$ is selected by the read selection flip-flop of shift register 6605, there will be a signal on output bus 6643 which primes the C input of delay-flop 6434 and allows it to operate upon the occurrence of a pulse from AND gate 6423 at time $P_4$. The resulting signal on bus 6435 activates relay driver 6533 causing the associated relay to connect erase magnetic head 6523 to bus 6530 which is connected through the front contacts of relay 6540 to the output on bus 6428 of digital write amplifier 6427 and results in writing the utilization count on track 5 just preceding function $G^s_{10}$. If selection function $G^s_{11}$ is selected by the read flip-flop of shift register 6607, there will be a signal on output bus 6649 which primes the C input of delay-flop 6436 and allows it to operate upon occurrence of a pulse from AND gate 6423 at time $P_4$. The resulting signal on bus 6437 activates relay driver 6537 causing the associated relay to connect erase magnetic head 6527 to bus 6530 which is connected through the front contacts of relay 6540 to the output 6428 of digital write amplifier 6427 and results in writing the utilization count on track 7 just preceding function $G^s_{11}$.

For teaching of selection functions $G^s_{00}$, $G^s_{01}$, $G^s_{10}$, and $G^s_{11}$, switch 6499 is advanced clockwise to the third position. In this position, if function $G^1_{000}$ is selected by the read selection flip-flop of shift register 6608, the signal on output bus 6652 primes the N input of delay-flop 6430 and allows it to operate via switch 6499-3 upon occurrence of a pulse from AND gate 6423 at time $P_5$. The resulting signal on bus 6431 activates relay driver 6531 causing the associated relay to connect erase magnetic head 6521 to bus 6530 which is connected through the front contacts of relay 6540 to the output on bus 6428 of digital write amplifier 6427 and results in writing the utilization count on track 1 just preceding function $G^1_{000}$. If function $G^1_{001}$ is selected by the read selection flip-flop of shift register 6609, the signal on output bus 6655 primes the C input of delay-flop 6438 and allows it to operate upon the occurrence of a pulse from AND gate 6423 at time $P_5$. The resulting signal on bus 6439 activates relay driver 6532 causing the associated relay to connect erase magnetic head 6522 to bus 6530 which is connected through the front contacts of relay 6540 to the output on bus 6428 of digital write amplifier 6427 and results in writing the utilization count on track 2 just preceding function $G^1_{001}$. If function $G^1_{010}$ is selected by the read selection flip-flop of shift register 6610, the signal on output bus 6658 primes the J input of delay-flop 6434 and allows it to operate upon occurrence of a pulse from AND gate 6423 at time $P_5$. The resulting signal on bus 6435 activates relay driver 6533 causing the associated relay to connect erase magnetic head 6523 to bus 6530 which is connected through the front contacts of relay 6540 to the output on bus 6428 of digital write amplifier 6427 and results in writing the utilization count on track 3 just preceding function $G^1_{010}$. If function $G^1_{011}$ is selected by read selection flip-flop of shift register 6611, the signal on output bus 6661 primes the C input delay-flop 6440 and allows it to operate upon occurrence of a pulse from AND gate 6423 at time $P_5$. The resulting signal on bus 6441 activates relay driver 6534 causing the associated relay to connect erase magnetic head 6524 to bus 6530 which is connected through the front contacts of relay 6540 to the output on bus 6428 of digital write amplifier 6427 and results in writing the utilization count on track 4 just preceding function $G^1_{011}$. If function $G^1_{100}$ is selected by the read flip-flop of shift register 6612, the signal on output bus 6664 primes the J input of delay-flop 6432 and allows it to operate upon occurrence of a pulse from AND gate 6423 at time $P_5$. The resulting signal on bus 6433 activates relay driver 6535 causing the associated relay to connect erase magnetic head 6525 to bus 6530 which is connected through the front contacts of relay 6540 to the output on bus 6428 of digital write amplifier 6427 and results in writing the utilization count on track 4 just preceding function $G^1_{011}$. If function $G^1_{100}$ is selected by the read flip-flop of shift register 6612, the signal on output bus 6664 primes the J input of delay-flop 6432 and allows it to operate upon occurrence of a pulse from AND gate 6423 at time $P_5$. The resulting signal on bus 6433 activates relay driver 6535 causing the associated relay to connect erase magnetic head 6525 to bus 6530 which is connected through the front contacts of relay 6540 to the output on bus 6428 of digital write amplifier 6427 and results in writing the utilization count on track 5 just preceding function $G^1_{100}$. If function $G^1_{101}$ is selected by the read selection flip-flop of shift register 6613, the signal on output bus 6667 prices the C input of delay-flop 6442 and allows it to operate upon the occurrence of a pulse from AND gate 6423 at time $P_5$. The resulting signal on bus 6443 activates relay driver 6536 causing the associated relay to connect erase magnetic head 6526 to bus 6530 which is connected through the front contacts of relay 6540 to the output on bus 6428 of digital write amplifier 6427 and results in writing the utilization count on track 6 just preceding function $G^1_{101}$. If function $G^1_{110}$ is selected by the read selection flip-flop of shift register 6614, the signal on output bus 6670 primes the J input of delay-flop 6436 and allows it to operate upon occurrence of a pulse from AND gate 6423 at time $P_5$. The resulting signal on bus 6437 activates relay driver 6537 causing the associated relay to connect erase magnetic head 6527 to bus 6530 which is connected through the front contacts of relay 6540 to the output on bus 6428 of digital write amplifier 6427 and results in writing the utilization count on track 7 just preceding function $G^1_{110}$. If function $G^1_{111}$ is selected by the read selection flip-flop of shift register 6615, the signal on output bus 6673 primes the C input of delay-flop 6444 and allows it to operate upon occurrence of a pulse from AND gate 6423 at time $P_5$. The resulting signal on bus 6445 activates relay driver 6538 causing the associated relay to connect erase magnetic head 6528 to bus 6530 through the front contacts of relay 6540 to the output on bus 6428 of digital write amplifier 6427 and results in writing the utilization count on track 8 just preceding function $G^1_{111}$.

The output pulse duration of delay-flops 6430, 6432, 6434, 6436, 6438, 6440, 6442, and 6444 are adjusted to assure closure of the erase head selection relays during the writing of the utilization count, between A time and B time, and opening of the relays prior to C time which corresponds to a signal on bus 6452.

All erase flip-flops of the memory selection shift registers illustrated in FIG. 66 are reset to the A state by the occurrence of a pulse at P time on bus 6449. The time interval between the occurrence of each P pulse and the enabling of AND gate 6415, 128 clock pulses later, is sufficient to allow the relays to drop out and disconnect any previous head selection prior to the occurrence of write pulses at the output of digital write amplifier 6427. The next selection of an erase flip-flop does not occur until flip-flop 6429 is set to the B state by the A output on bus 6418 of flip-flop 6414 which is reset just after the admission of the last clock pulse through AND gate 6415. Thus for normal erasure of the G-Function none of the erase magnetic heads are selected by the erase flip-flops of FIG. 66 during the writing of the sixteen pulses from amplifier 6427 for the digital utilization number.

Reading utilization numbers

The utilization numbers are read from the magnetic storage medium by the read head which has been selected as described previously. The output of the read head on bus 6510 is transferred to bus 6420 by the front contact of relay 6520 during the time the utilization number is passing under the read head, only if the numbers are to be used for teaching. This is accomplished as follows:

Relay 6520 is energized by relay driver 6519 which is activated by the B output of delay-flop 6411 appearing on bus 6421. Delay-flop 6411 is activated by either of the signals appearing at the rotary contacts of switches 6499-1 and 6499-2 through OR gate 6422. Switches 6499-1, 6499-2, 6499-3, 6499-4, 6699-1, and 6699-2 are mechanically ganged and are placed in the position indicated while teaching the first selection G-function $G^s$. These switches are advanced one position clockwise for teaching selection G-functions $G^s_{10}$ and $G^s_1$. These switches are advanced two positions clockwise for teaching selection G-functions $G^s_{00}$, $G^s_{01}$, $G^s_{10}$, and $G^s_{11}$. These switches are advanced clockwise to the last position for teaching all final G-functions. While teaching selection G-function $G^s$, delay-flop 6411 is activated at $P_1$ by the signal on bus RC-1 through switch 6499-1 and OR gate 6422, and at $P_2$ by the signal on bus RC-2 through switch 6499-2 and OR gate 6422. The output of the selected read head appearing on bus 6510 is transferred by the front contacts of relay 6520 to the input of digital read amplifier 6408 for the duration of the pulse output of delay-flop 6411. The pulse width output of delay-flop 6411 is adjusted to assure that relay 6520 is energized from the time of the occurrence of a P pulse beyond the occurrence of the pulse output of binary counter 6409 appearing on bus 6417 which is at B time. However, relay 6520 must be restored thus connecting bus 6510 to the input of amplifier 6565 through the back contacts of the relay prior to the occurrence of the pulse output of binary counter 6409 appearing on bus 6452 which is at C time.

While teaching selection G-functions $G^s_0$ and $G^s_1$, delay-flop 6411 is activated at time $P_2$ by the signal on bus RC-2 through switch 6499-1, which has been advanced one position clockwise, and OR gate 6422 and at time $P_3$ by the signal on bus RC-3 through switch 6499-2 and OR gate 6422. While teaching $G^s_{00}$, $G^s_{01}$, $G^s_{10}$, and $G^s_{11}$, delay-flop 6411 is activated at time $P_3$ by the signal on bus RC-3 through switch 6499-1, which has been advanced two positions clockwise, and OR gate 6422 and at time $P_4$ by the signal on bus RC-4 through switch 6499-2 and OR gate 6422. While teaching the final G-functions, switch 6499 is advanced clockwise to the final position. In this position delay-flop 6411 is not activated unless switch 6498-1 is closed which permits teaching of all selection G-functions.

If switch 6498-1 is closed, delay-flop 6411 is activated at time $P_1$ by the signal on bus RC-1 through the lower contact of switch 6498-1, switch 6499-2 and OR gate 6422 and by P pulses $P_2$, $P_3$, $P_4$, and $P_5$ admitted through AND gate 6423 by the B output of flip-flop 6424. This flip-flop is set to the B state at $P_2$ time as described previously.

Memory selection ratio

At the time of the thirteenth clock pulse after the A time, the utilization number, for the selection G-function which was selected at the previous P time, will be in place in shift register 6425. At the same time, the utilization number of the selection G-function which was used to select the G-function whose utilization number is in register 6425 will be in binary counter 6455. The utilization number $N_1$ of the selection G-function being taught is in the binary counter and the utilization number $N_2$ of the selection G-function which was selected by the selection G-function being taught is in the shift register 6425. It is desired to teach the selection G-function so that $N_2 = N_1/2$. If this distribution is maintained each of the final G-function will be used an equal number of times on the average. The numbers $N_1$ and $N_2$ are used to calculate the ratio $$\pm \sqrt{U}\left(\frac{\frac{1}{2}N_1 - N_2}{\frac{1}{2}N_1}\right)$$

and a voltage is generated which is proportional to this ratio. The analog voltage so generated is used to modify the teaching correlation in such a way as to tend to make the voltage go to zero. The utilization count $N_2$ is applied in parallel to the inputs of digital-to-analog conversion network 6456 and the utilization count, $N_1$, is applied in parallel to the inputs of digital-to-analog conversion networks 6457 and 6458. These networks are the same type of circuit shown in FIG. 52 and their operation is described in connection with that figure. The value $\pm\sqrt{U}$, of the incoming environmental function is applied on bus 10304 to the analog input of conversion network 6457 and the inverted value $\mp\sqrt{U}$ is applied on bus 10305 to the analog input of conversion network 6456. These inputs correspond to bus 5216 on FIG. 52. All resistor values in conversion networks 6457 and 6458 are chosen to be twice the value of the corresponding resistors in conversion network 6456, thus effectively dividing the count of $N_1$ by two. Conversion networks 6456 and 6457 are summed at the input of direct coupled inverting amplifier 6459, while conversion network 6458 is utilized as the negative feedback path. Thus the output of amplifier 6459 on bus 6461 is proportional to $$\pm \sqrt{U}\left(\frac{\frac{1}{2}N_1 - N_2}{\frac{1}{2}N_1}\right)$$

The output of amplifier 6459 appearing on bus 6461 is applied through the front contacts of relay 6463 to the subtractor circuit shown on FIG. 60 by bus 6464. Relay 6463 is energized by relay driver 6462 which is controlled through switch 6499-4. During teaching of all selection G-functions, relay driver 6462 is activated by the B output of flip-flop 6424 which is in the B state from $P_2$ through $P_5$. During teaching of the final G-functions, switch 6499-4 is advanced clockwise to the last position which disconnects relay driver 6462 from flip-flop 6424 unless switch 6498-2 is closed indicating that all G-functions are to be taught.

Amplifier 6459 is provided with a second feedback path, network 6460, which consists of two silicon Zener diodes connected in series, cathode to cathode, with a resistor. Each silicon diode is chosen to have a reverse voltage breakdown potential just exceeding the full scale output voltage of amplifier 6459. This prevents amplifier 6459 from overloading during those intervals when the count in the binary counter may be zero which will open the feedback path provided by conversion network 6458. If the output of amplifier 6459 exceeds the normal range in either polarity, one Zener diode is forward biased and the other reversed biased into the Zener conduction region, thus allowing conduction of current from the output bus 6461 through the diodes and the resistor to the summing point and providing the negative feedback path necessary to prevent the amplifier from overloading. For output voltage excursions within the normal operating range of amplifier 6459, one or the other of the Zener diodes is reverse voltage biased below the Zener knee, thus presenting a high impedance to current flow and may be considered open circuited for practical purposes.

Feedback network 6458 may be eliminated and a fixed resistor may be substituted for it in the feedback path.

In this latter condition the output on bus 6461 would be proportional to $\pm\sqrt{U}(\frac{1}{2}N_1-N_2)$ which would be utilized in place of the ratio formula given above.

Memory selection ratio gap control

The output of amplifier 6459 on bus 6461 is also applied to the memory selection ratio gap control which consists of direct coupled inverting amplifier 6465, potentiometer 6466, transistor 6467 and 6468, trigger circuit 6469, and the associated resistors. Amplifier 6465 inverts, with unity gain, the incoming signal on bus 6461. The value of positive $\sqrt{U}$ from the circuit shown in FIG. 56 is on bus 5603 and is connected to the end of potentiometer 6466. The wiper of potentiometer 6466 is applied through resistors to the bases of transistors 6467 and 6468 causing the transistor collector currents to remain cut off unless the negative current supplied directly from bus 6461 to the base of transistor 6668 or from the output of amplifier 6455 to the base of transistor 6667 exceeds the positive base current obtained from the wiper of potentiometer 6466. Trigger circuit 6469 is normally held in the A state by negative current at its input which exceeds that obtained from the positive power supply whenever both transistors 6667 and 6668 are cut off. If either transistor 6667 or transistor 6668 conducts because the signal obtained from bus 6461 exceeds the threshold adjusted by potentiometer 6466, the current supplied from the negative power supply is shunted to ground through the conducting transistor causing the input to trigger circuit 6469 to be positive thus changing the state of the trigger circuit and causing the output on bus 6470 to change from positive to negative. This output is applied to AND gate 6676 shown in FIG. 66 and is used to determine if a selection function is to be erased and rewritten. The range of voltage values on bus 6461, both positive and negative, which can be tolerated as errors of the steering ratio are under control of the potentiometer 6466. Errors of magnitude smaller than a pre-determined amount set by the potentiometer will not cause any corrections of steering.

Learned memory selection stabilization circuit (FIG. 64)

The memory selection utilization counter circuits described hereinabove constitute a negative feedback servo system which is effectively equivalent to two integrators within the feedback loop. Such a system is unstable and subject to an oscillation which may be eliminated by shunting one of the integrators with a direct path as described hereinbelow under Stability in Learning of Steering in connection with FIG. 109.

The last two bits of the sixteen which are written in front of each selection G-function and the first of the final G-functions, are utilized to provide such a direct path. Referring to FIG. 64, if the output signal on bus 6461 of amplifier 6459 is positive, trigger circuit 6471 will be in the B state with its B output negative thus enabling one input to AND gate 6473. If the output signal on bus 6461 of amplifier 6459 is negative, the output of unity gain, inverting, direct coupled amplifier 6465 is positive. This positive output is applied to the input of trigger circuit 6472 causing its B output to be negative which enables one input to AND gate 6474. The polarity of the signal on bus 6461 thus determines which of the AND gates 6473 and 6474 is enabled. If the output 6470 of trigger circuit 6469 is negative, which previous description has shown indicates that correction of a steering G-function is to be made, the second input of both AND gates 6473 and 6474 is enabled. The ouputs of AND gates 6473 and 6474 are connected to the J priming inputs respectively of flip-flops 11033 and 11032 by buses 6487 and 6481. In the description of the memory selection ratio gap control it was shown that the voltages which determine the inputs to AND gates 6473 and 6474 will have reached a stable condition by the time of the fourteenth pulse in the train of sixteen pulses which appear on bus 6416. Therefore, the outputs of the AND gates will be stable at that time and when the pulse appears on bus 11041 flip-flops 11032 and 11033 will be set as previously described in connection with FIG. 110.

From the above description and that given in connection with FIG. 110 it can be seen that if the voltage on bus 6461 is positive and the function is to be taught then a digit will be recorded in the fifteenth digit space of the sixteenth digit number recorded just preceding the record of the function. If the voltage on bus 6461 is negative under these conditions, then a digit will be recorded in the sixteenth space and if the function is not taught then there will be no digit in either the fifteenth or sixteenth space.

Each time a utilization code is read from the memory as previously described, the last two bits are shifted into flip-flops 11014 and 11015 as previously described in connection with FIG. 110. The B output of the flip-flop 11015 is connected by bus 6488 to one input to AND gate 6483 and the B output of flip-flop 11014 is connected by bus 6489 to one input to AND gate 6484. Both AND gates 6483 and 6484 are enabled by the B output of flip-flop 6476 which is set to the B state at $P_1$ by the action of ring counter output RC-1 on its E input and is reset to the A state after $P_4$ by the action of RC-4 on the D priming input in conjunction with the E' input connection to the B output of flip-flop 6429 appearing on bus 6451. Thus, if during the time that steering flip-flop 11015 is set to the B state, diode switch 6478 is rendered conductive by the output of AND gate 6483 and this transfers the value $+\sqrt{U}$ obtained from bus 5603 to bus 6479. If flip-flop 11014 is set to the B state, diode switch 6477 is rendered conductive by the output of AND gate 6484 and this transfers the value $-\sqrt{U}$ obtained from bus 5602 to bus 6479. If neither flip-flop is set, both switches remain open and no signal appears on bus 6479. The signal on bus 6479 is applied to amplifier 5606 through resistor 5648 in the comparator circuit shown in FIG. 56. The description of FIG. 110 has shown that flip-flops 11014 and 11015 will have finished shifting by B time and reset after the following P time. Therefore, the voltage on bus 6479 will be available during this time.

The stabilization of learning of the steering circuit illustrated in FIG. 64 involves the steering selection ratio gap circuit with input bus 6461 and trigger 6469. In this simplified form one bit for positive and one bit for negative polarities to represent the signal on bus 6461 are used for stabilization of learning of steering. A more refined circuit may be employed without the use of the ratio gap circuit and trigger. In such a circuit a standard analog-to-digital encoder may be used with its input consisting of the signal on bus 6461. Its digitalized output, including a sign bit, would be applied to the shift register 6426 wherein as many bit positions would be provided as are produced by the encoder to substitute for the two bits from AND gates 6473 and 6474. Such encoded bits would be inserted in the same manner as those from gates 6473 and 6474, except that more bit positions would be used. With this more refined system, shift register 6425 would have a subgroup of additional buses corresponding to the input buses from the said encoder into shift register 6426. Such additional busses from shift register 6425 would be fed as input directly into a standard digital-to-analog decoder whose bipolar ouput would connect to bus 6479. The resistor 5648 associated with bus 6479 then would be eliminated. Also, units 6483, 6484, 6477, and 6478 would be eliminated.

Nomenclature of memories and signals

In FIG. 78 the circles with the G's marked therein may be considered as representing the G signals or the G memories or both. These may include the associated equipment such as the heads, relays, shift registers and flip-flops, amplifiers, correlation means, and other units as shown in FIGS. 93 and 77 and other figures. FIGS. 69, 78, and 93 are illustrations of ordered arrangements of G-memories. The entire number of G-memories or memory signals $G(t)$ can be considered as constituting a set of memory signals or memories. In FIG. 78, for example, the G functions $G^s$, $G^s_1$, $G^s_{11}$, $G^1_{111}$, $G^2_{111}$, $G^3_{111}$, $G^4_{111}$, $G^5_{111}$, $G^6_{111}$, ... $G^n_{111}$. Another set is $G^1_{011}$, $G^2_{011}$, $G^3_{001}$, $G^4_{001}$, $G^5_{001}$, $G^6_{001}$, ... $G^n_{001}$. Similarly, in FIG. 78 each horizontal row of G's is a subset of the entire set of G-functions. The entire number of G's in the horizontal rows is also a set, but if all of the $G^s$ or steering G's are called a first set then all of the G's in the horizontal rows can be called a second set of G's. Each horizontal row of G's can be designated as a final set or final subset of G's. Each final row of G's is included in a selection means which can select any output operation in the total set of output operations. All the G's with the same superscript such as $G^1_{000}$, $G^1_{001}$, $G^1_{010}$, $G^1_{011}$, $G^1_{100}$, $G^1_{101}$, $G^1_{110}$, and $G^1_{111}$ also constitute a subset. The above subsets are ordered, but not all possible subsets need be ordered. FIG. 106 shows one form of the selection means associated with ordered subsets of memory signals or memories. One subset is selected by selection relays 10601, the next subset in order is selected by 10602, and so on up to the subset selected by 10603. We can designate the associated equipment with each set of G's also as comprising a set or subsets thereof of such associated equipment. Instead of using the designation of set and subset or subsets, we can use also the designation to convey the same ideas as group and subgroup or subgroups of G-memories or G-functions or equipment, as the case may be. The input signals which operate with certain sets, subsets, groups or subgroups of G-functions may be designated also as sets, subsets, groups, or subgroups of input signals. A class of related input signals is referred to usually in connection with a forced class which uses a degree of freedom of a G memory.

G-memory overload detector (FIG. 61)

In those adaptations of System II of the learning machine in which analog storage of the G-memories takes place an overload detector is desirable so that the particular G-function being monitored may be prevented from overloading the storage medium. If the detector senses an overload condition the transfer of the G-function from the temporary memory to the regular memory takes place at reduced gain thus reducing the corresponding G-function to prevent overload of the recording medium. This type of operation is particularly effective if the gap around zero is small or non-existent. FIG. 61 illustrates one method of overload detection which is preferred when analog storage on a magnetic medium is used. Head R" 6125 is a playback head on the temporary conditioned track of System II in the same relative timing position as the erase heads. Signals picked up by 6125 are fed to amplifier 6102 and the amplified output is applied to a back contact of relay 6103, to the input of reversing amplifier 6104. The latter's output is applied to PNP transistor 6105 whose base is normally biased positively by potentiometer 6106. If any signal applied via 6104 to 6105 is of sufficient negative amplitude 6105 will conduct causing point 6107 to go towards ground. This will cause the input 6121 of trigger circuit 6108 to go positive which will cause 6108 to make bus 6109 go negative. The signal at bus 6110 must be positive when 6105 receives negative signal voltages because of the reversing amplifier 6104. When the signals at 6110 are negative 6105 cannot be made to conduct. Negative signals on 6110 are applied to transistor 6111 which is identical to 6105 and will conduct when signals at 6110 are sufficiently negative. In both 6105 and 6111 the bias established by 6106 determines how large the signals at 6110 must be to cause a drop in voltage at 6107 and operation of trigger 6108 to cause negative voltage at 6109. Bus 6109 is applied through a back contact of relay 6103 to the E input of flip-flop 6112 which turns over if 6108 operates. Flip-flop 6112 will stay turned over once if actuated, and then bus 6113 becomes negative to prime flip-flop 6114 on input C. If 6114 is primed signals have been picked up whose instantaneous positive or negative amplitudes are larger than the predetermined amount set by potentiometer 6106. The signal on the output of 6102 going through the back contact of relay 6103 is also applied through another back contact to the input of transformer 6115 whose secondary is center-tapped to ground and its push-pull output is applied to full wave rectifier diodes with series resistors with the whole unit generally represented by 6116. The output of 6116 is applied through a back contact of relay 6117 to integrator 6118 whose output, in turn, is attenuated by potentiometer 6119 and placed on bus 6120 which is applied to a front contact of relay 6103. Relay 6103 is operated at the time of the P pulse when a negative voltage appears on bus 6004 which operates relay driver 6123 and thence the relay itself. A delay flip-flop 6021 holds the negative voltage on 6004 for a short time after the P pulse appears. During the time of operation of 6103 voltage from bus 6120 is applied to bus 6110 which will cause actuation or not of 6111, 6108, and 6114 depending upon the amplitude of the signal on 6120, which is proportional to $$\int_{t_1}^{t_2} |F_i(t)| dt$$

and upon whether or not 6114 was previously primed by the operation of 6112. It can be seen that the operation of relay 6103 also transfers 6109 to 6122 to permit the operation of 6108 to operate 6114 if 6112 was operated and primed 6114. The overload detector of FIG. 61 determines both the existence of predetermined values of peak positive or negative voltages in the G-track, and also the existence of excessive summed absolute signal values predetermined by potentiometer 6119. Instead of the summed absolute signal value the RMS can be used also as detailed in other sections of this specification. Shortly after the release of relay 6103, relay 6117 operates by the negative voltage appearing on bus 6003 which operates driver 6124 and thence the relay 6117 itself. The voltage on 6003 is held for a short interval of time by a delay flip-flop 6022 actuated when the voltage on 6004 disappears. The flip-flops are in the circuit shown in FIG. 60. When 6117 operates it discharges the integrator 6118 and, upon restoring, the integrator is ready for integrating the signals at 6117 due to the next appearing G-function. Both relays are normal when the next G-function starts. If flip-flop 6114 operates bus 6101 becomes positive and this causes the release of a relay to remove a shunt around a series resistor, in FIG. 65, which lowers the gain of recirculation of the G-function which was tested by the overload circuits. By lowering 6106 and raising 6119 the effects of the summed absolute value alone determines the overload condition and not the peaks. By raising 6106 on lowering 6119 only the high signal peaks will be used for overload determination. Other intermediate positions of 6106 and 6119 will determine overload by a combination of peaks and summed absolute values. Flip-flop 6114 is restored at all P pulses by bus 5707 and shortly thereafter may be set up when relay 6103 operates. Flip-flop 6112 releases at C time, which in near the time when the new G-function starts, by a negative pulse at bus 6453. After being released flip-flop 6112 waits to be turned over by the peak signals if they occur in sufficient amplitude. While 6112 is waiting for such an event flip-flop 6114 has been turned over or not shortly after the preceding P pulse, and 6114 holds or not during the rest of the cycle to correct or not the need for recirculation gain change for the recirculation that is then occurring while flip-flop 6112 and circuits 6116 and 6118 are making a determination of the need for gain change for the next G-function which will be recirculated in the next cycle. As is indicated in various diagrams of this specification both electromechanical relays 6103 and 6117 may be replaced by equivalent electronic or solid state switching

B mode internal start circuit (FIG. 59)

When System II is processing a B mode sequence which it has previously learned and the input stops before the end of the sequence has been determined, it is desirable to have the machine attempt to identify the sequence from the segments already received. The circuits shown in FIG. 59 accomplish this by detecting the length of time the machine remains in the halt state during a B mode sequence, and if the halt duration exceeds a specified time a noise signal is injected into the input of the machine to substitute for the missing input signal segments.

FIG. 59 shows that bus 102103 is connected through a resistor to the base of transistor 5903. This bus originates in the circuits shown in FIG. 102 and the discussion of those circuits show that bus 102103 has a negative signal only during the time the conditions for automatically restarting the machine are met. Transistor 5903 has its collector connected to a positive voltage source through resistors 5904 and 5906. If bus 102103 is positive current will flow through transistor 5903 and resistors 5904 and 5906 and junction 5905 will be held close to ground potential. Resistor 5904 is relatively small compared to resistors 5906 and 5908 and serves only to limit the current through transistor 5903. Reference to FIG. 59 shows that junction 5905 is connected through resistors 5907 and 5908 to a negative voltage source and also through capacitor 5909 to ground. If bus 102103 is negative then transistor 5903 does not conduct and junction 5905 will move toward a positive voltage determined by the relative values of resistances 5906, 5907 and 5908 and the voltage sources to which they are connected. The rate at which the voltage on junction 5905 changes is dependent upon the value of these resistances and capacitor 5909. These values are chosen so that when junction 5905 is at ground potential then bus 5910, the junction of resistors 5907 and 5908, will be negative, and that when transistors 5903 is not conducting junction 5905 will charge toward a positive potential which will raise bus 5910 above ground potential. Capacitor 5909 is chosen so that the interval between the time when the transistor is cut off and the time when bus 5910 reaches ground potential is the predetermined interval selected as indicating that the machine should be restarted.

Bus 5910 is connected to the input of trigger circuit 5911, and when this bus reaches ground potential it will actuate the circuit. The B output of trigger circuit 5911 is connected to the E input of delay-flop 5912 which will be activated also at this time and produce a control signal on its B output, bus 5913, for the time period of the delay-flop.

Bus 5913 is connected to the control of diode switch 5914 and will make this switch conducting as long as the control signal is present. This will allow the output of noise generator 5915 to pass through the switch to the output bus 5902. In one adaptation, bus 5902 is connected to the input of the start anticipator circuit shown in FIG. 45 and the noise signal on this bus will actuate the machine start circuits. Other suitable inputs may be used to the machine when the start anticipator is not used.

Another connection of bus 5913 is to the E input of flip-flop 5916 which is self-primed and which will be forced into the B state at the time delay-flop 5912 is actuated. The control signal on the A output of the flip-flop will disappear until the next D time when there will be a pulse on bus 5706 which is connected to the "R" input of the flip-flop. Bus 5901 is connected to the transformation circuit shown in FIG. 54 and the absence of a control signal on this line will keep the output of the cathode ray tube buffer from getting into the transformation circuits as explained in the discussion of FIG. 54.

Learned selection of memories (FIG. 106)

The learned production of a digitalized output code may be used to select other conditioned memories than the memories which were used in the production of the code. In turn, the selected memories may be used to produce the learned selection of still other output codes, and so on. A specific set of output codes may be reserved for the selection of memories, so that the corresponding memories can be selected when those codes are produced. An advantage of this type of operation is that greater capacity to recognize a larger number of input signals and signal classes is provided than would be the case if one memory bank alone were used.

FIG. 106 is an illustration of this type of learned selection. A bank of relays generally represented by 10601, when operated, selects a bank of memories of the type used in System I, for example. The relays shown could be used to select the writing heads one of which is designated as 10604 selected by one of the relays 10617 in bank 10601. The other relays in 10601 select corresponding similar writing heads. Each of the relays in bank 10601 is connected to common transistors 10609 and 10610 with respective base connections 10611 and 10612. There are driving buses marked 10605, 10606, 10607, and 10608 which may be connected by way of example, to buses such as 6666, 6669, 6672, and 6675, respectively for the selection of specific heads and storage sections, cyclically in accordance with the requirements of the timing system and the logical organization utilized in connection with System II. If bus 10608 is driven negatively, for example, driver 10613 is operated which may be a transistor driver of the type illustrated in FIG. 70. Unit 10613 will provide ground to force current to 10626 through relay 10617, rectifier 10618, and transistors 10609 and 10610 when the bases are suitably controlled. When the learning machine is in the normal position and waiting for an input signal there are a series of flip-flops such as 10619 and 10620 which are also in their normal states with buses 10621 and 10622 held at a negative potential. These and other similar flip-flops have their normal A buses connected to AND gate 10623. When the machine is normal all negative voltages applied to 10623 will permit it to produce a negative signal at its output 10624 which will cause inverter 10625 to produce a positive voltage at 10629 which connects to base bus 10612 via a resistor, thus keeping transistor 10610 in the nonconducting condition. The bus 10611 will be at a negative potential due to the negative voltage source 10626 provided through a resistor which supplies the collector of 10610 and base of 10609. This keeps transistor 10609 conducting, thus causing current to flow through relay 10617 and rectifier 10618. The relay operates and closes contacts 10627 and this connects write coil 10604 to bus 6550, as a typical connection point for use in the writing of memory signals.

Each of the cyclic control buses 10608, 10607, 10606, and 10605 will have negative voltage placed on them at different times to operate respective drivers 10613, 10614, 10615, and 10616, in cyclic order which will cause relays 10617, 10630, 10631, and 10632 to become operated in cyclic order to close contacts and connect through to bus 6550 write coils 10604, 10633, 10634, and 10635 also in cyclic order at the times when recording of the corresponding stored signal from the magnetic medium is necessary. The storage sections under control of relay bank 10601 are the first to be used when the learning machine starts to operate from a normal condition, all other storage sections under control of relay banks such as 10602 and 10603 will be incapacitated by the normal positions of the flip-flops such as 10619 and 10620 in which buses 10621 and 10622 are held at a negative potential.

In the operating mode of the machine AND gates such as 10636 and 10637 will be primed by operating control bus 10215. The AND gates have respective input buses 10639 and 10655. If a code reserved for the selection of the memory sections under control of relay bank 10602 is produced at the output register of the machine, buses such as 10639 which are connected to the output register and their complements, in accordance with the designated code, will have negative voltages placed on them simultaneously which will cause AND gate 10636 to pass a negative voltage to bus 10640. In turn, 10640 is connected to OR gate 10641 which will make bus 10642 negative. Inverter 10643 will cause negative voltage to be placed on the C input of flip-flop 10619 and positive voltage on the D input of the same flip-flop, which state of the inputs is opposite to that which exists if the AND gate 10636 had not been activated. When the learning machine returns to home position; that is, a signal has been processed, and with other suitable conditions, bus 10227 is activated with a negative going pulse. This is applied to terminals E, E' of each of the flip-flops, and if C is primed negative, and D positive on a flip-flop, it will turn over. In the case of 10619, when 10227 is energized, 10619 will turn over if AND gate 10636 is passing a signal. Then 10621 will swing positively which will block AND gate 10623 and this will cause 10610 to conduct, causing 10611 to drop to ground potential and cutoff 10609, thus stopping the current flow through any of the relays in bank 10601 which may be picked for operation by any of the active buses, 10608, 10607, 10606, and 10605.

With the relay bank 10601 incapacitated by the operation of any flip-flop such as 10619 and 10620, another bank of relays will be activated. If AND gate 10636 is operated then positive voltage will appear on bus 10621 which will cause transistor 10645 to become non-conductive thus causing bus 10651 to go negative. The latter bus is connected to the base of transistor 10646 which is then caused to become conductive thus permitting relay bank 10602 to operate under control of buses 10608, 10607, 10606, and 10605 in a manner similar to the control which is exercised when the relay bank 10601 is operating. When bank 10602 is thus activated the relays therein will connect write coils, such as 10647, to output bus 6550.

If the machine is in teaching mode then the teaching keys which are connected to buses such as 10648 and 10654 will cause the operation of AND gate 10649 if the code on the teaching keys buses matches the 10649 AND gate. Then bus 10650 will have negative voltage placed thereon and the control exercised will be the same as when AND gate 10636 is operated. In order to prime any of the AND gates for teaching such as gates 10649 and 10638 it is necessary that the teaching mode bus 10213 is activated with a negative voltage.

In a manner similar to the above, if in teaching, AND gate 10638 is activated or if in operating-mode AND gate 10637 is operated, then flip-flop 10620 is operated, bus 10622 has positive voltage, transistor 10652 becomes nonconductive, transistor 10653 becomes conductive to cause the operation of any relay in bank 10603 under control of buses 10608, 10607, 10606, and 10605. Relay bank 10601 will be incapacitated by the operation of any of the AND gates such as 10649, 10636, 10638, and 10637, because AND gate 10623 then will not pass any signal, since one of its input buses is positive.

Under the conditions described in connection with the circuitry in FIG. 102, bus 10227 shown in FIG. 106 will cause any of the flip-flops to turn over when they are suitably primed by the respective AND gates. In the same description the conditions are given for the activation of bus 10226 which causes any flip-flop such as 10619 and 10620 to restore to normal condition. This can occur at the end of a B mode sequence if in such a sequence final codes are used for each input signal segment processed, and at the end of any A mode sequence.

The relays in relay banks 10601, 10602, 10603 may be replaced by corresponding solid state or electronic switching circuitry as shown in FIGS. 73 and 74. While a single typical output connection 6550 is shown for read-out in FIG. 106, it is to be understood that a multiple set of banks and pickup and writing head can be switched in the same manner. For example, bus 10628 would be connected to more diodes such as 10618 and relays such as 10617, but the latter would connect to another set of coils which would go to another common bus for reading such as 6510 from the memory. Still further relays similarly connected would control switching into a common bus 6530 for erasing. The same connections can be made for buses 10656 and 10657 and other similar buses.

Combined digital and analog multipler (FIG. 107)

The circuit shown in FIG. 107 has two inputs, one digital and one analog, and its function is to produce at its output an analog voltage which is proportional to the product of the two inputs. It is used in the digital version of System II to obtain the product $F_i(t) \cdot G_j(t)$ and its two input buses 5401 and 3911 and its output bus 3626 are connected to the machine at the places indicated by the corresponding numbers on FIG. 38.

This circuit is composed of a digital-to-analog decoder 10705 which is the same as that shown in FIG. 52, and analog inverter 10706 which is the same as that shown in FIG. 75, a shift register 10703 which is the same as that shown in FIG. 62 and a code register 10704 which is the same as the output register shown in FIG. 62. All these circuits have been described in the discussions of their associated drawings.

The digital input $G_j(t)$ is brought in from the G-track on bus 3911 to the input of amplifier 10702. This is a conventional digital amplifier which will reclock the input with the clock pulse brought in on bus 5708. The amplifier output is connected by bus 10701 to the input of shift register 10703 and the data will be shifted into the shift register by pulses on bus 5708. A pulse on bus 5711 will cause the number held by shift register 10703 to be transferred to code register 10704. Each stage of the code register 10704 is connected by one of the buses 10709 to an associated input to digital-to-anolog decoder 10705 except the stage containing the sign bit, which is connected by bus 10710 to analog inverter 10706.

The analog input is $F_i(t)$ and is brought in on bus 5401 and sent through delay-line 10711 to analog inverter 10706. This delay is necessary to get $F_i(t)$ into proper synchronism with $G_j(t)$. Bus 10712 connects the output of analog inverter 10706 to digital-to-analog decoder 10705. Analog inverter 10706 will invert the signal or not according to the sign bit information on bus 10710, and place the result on bus 10712 which serves the same purpose as bus 5216 in FIG. 52, while bus 5219 in FIG. 52 serves the same purpose as bus 10714 in FIG. 107.

The discussion of the digital-to-analog decoder given in connection with FIG. 52 shows that the current at the output on bus 10714 is proportional to the product of the voltage on bus 10712 and the number held in the code register.

Bus 10714 is the input to amplifier 10713 and the voltage at the amplifier output on bus 3626 is proportional to the current at its input. Therefore, the voltage on bus 3626 is proportional to the product of the digital number $G_j(t)$ brought in on bus 3911 and the analog voltage $F_i(t)$ on bus 5401.

Combined analog and digital divider and digital adder (FIG. 108)

The circuits shown in FIG. 108 determines a digital number which is proportional to the quotient of two analog signals and adds this number to another digital number. The two analog inputs are $U_1$ on bus 3814 and $C \cdot e_{ij} F_i(t)$ on bus 6026. Their quotient appears serially on bus 10806 and is added to the digital number $G_j(t)$ brought in on bus 3903 and the sum is present at the output on bus 3841. In the digital version of System II these circuits are connected to the other parts of the machine at the same places as buses 3814, 6026 and 3841 shown in FIG. 38.

185

This circuit contains a ring counter represented by flip-flops 10807, 10808, 10809 and 10810 which is similar to the ring counter shown in FIG. 64 and described in connection with that figure. There is a code register represented by flip-flops 10811, 10812, 10813, and 10814 and there is also a shift register represented by the remaining flip-flops each of which is similar to the one shown in FIG. 62 and previously described in connection with that figure.

The number which is the quotient is determined serially. One of each of the bits is established in the code register each time the ring counter is stepped. The highest order bit is determined first, the other bits in descending order, and the sign bit is determined last. The number is held in the code register as it is developed and when complete is transferred in parallel into the shift register. This number is shifted out of the shift register in serial order while at the same time a new number is being established in the code register.

Reference to FIG. 108 shows that the B output of each stage of the code register is connected to the control of an associated diode switch and that one of the analog input sides of all these switches is connected to bus 3814. The other side of each diode switch is connected through a resistor to the summing point of amplifier 10819. These resistors have values inversely proportional to the order of the bit held in the associated stage of the code register. For example, flip-flop 10811 contains the highest order bit, and has its B output connected to the control of diode switch 10820. The diode switch is also connected to the summing point of amplifier 10819 through resistor 10821 which has a value equal to 2R. Flip-flop 10812 will contain the next order bit and its B output is connected to the control of diode switch 10822. The diode switch is also connected to the summing point of amplifier 10819 through resistor 10823 whose value is 4R. These diode switches and their associated resistors form a decoder network similar to that used in the digital-to-analog converter shown in FIG. 52 and described in connection with that figure. If the voltage on bus 3814 is called $U_i$ and the digital number held in the code register is called N, then the total current flowing through the diode switches and associated resistor to the summing point of amplifier 10819 is proportional to $NU_i$. The signal $U_i$ is always a positive voltage.

Bus 6026, or if the circuit of FIG. 100 is used, the same bus marked 10048 is connected to analog inverter 10805 and also to the E input of trigger circuit 10824. Unit 10805 is of the type described for FIG. 75. The signal on bus 6026 is called $C \cdot e_{ij} F_i(t)$ and can be either positive or negative. It is the function of the analog inverter and trigger circuit to present this signal on bus 10827 always as a negative voltage. If $C \cdot e_{ij} F_i(t)$ is positive it will cause trigger circuit 10824 to be in the B state. The B output of the trigger circuit is connected to the analog inverter by bus 10825 and a control signal on this bus will result in the signal on bus 6026 being inverted and appearing on bus 10827 as a negative voltage. Bus 10827 is connected to the summing point of amplifier 10819 through resistor 10828. Unit 10805 passes the signal directly without reversal if the signal is negative, since then 10824 will not operate.

Since the voltage on bus 3814 is always positive and the voltage on bus 10827 is always negative the currents flowing to the summing point of amplifier 10819 will be in opposite directions. The circuit operates to change the number held in the code register until the two currents are equal at which time the following expression holds:

$$NU_i = C \cdot e_{ij} F_i(t) \quad (1)$$

This may be rewritten as:

$$N = \frac{C \cdot e_{ij} F_i(t)}{U_i} \quad (2)$$

186

Thus the digital number held in the code register when the two currents are equal is proportional to the voltage on bus 6026 divided by the voltage on bus 3814 and is therefore the desired result.

The sequence of operations is started by a pulse on bus 5711. It forces flip-flops 10807 and 10811 to the B state through their reset inputs R and all other stages of the code register and ring counter to the A state also through their reset inputs R. The B output of flip-flop 10811 is connected to the control of diode switch 10820 and makes it conducting at this time. This allows the maximum weight current to flow from bus 3814 through resistor 10821 to the summing point of amplifier 10819.

Amplifier 10819 is shown in FIG. 108 with diodes 10829 connected as the feedback path from its output, which will make a very nonlinear amplifier having high gain for very small inputs and low gain for large inputs. As a result, the output of the amplifier on bus 10830 is quantized; that is, for all positive inputs larger than a minimum the output on bus 10830 will be the same negative value and for all negative inputs larger than a minimum the output will have the same positive value. The gain of amplifier 10819 is made large so that these minimum values of input are very small. Thus amplifier 10819 is a comparator whose output is positive if the current to its summing point from bus 10827 is greater than the current from bus 3814 through the diode switches.

As mentioned previously, a pulse on line 5711 puts flip-flops 10807 and 10811 in the B state and this in turn makes diode switch 10820 conducting. If the voltage on bus 10830 is positive it indicates that the current from bus 3814 through diode switch 10820 and resistor 10821 is less than the current from bus 10827 through resistor 10828. This means that in order to equalize these two currents diode switch 10820 must be left conducting and other diode switches made conducting to increase the current flowing from bus 3814 to the summing point of amplifier 10819. If, however, bus 10830 is negative, this indicates that the current from bus 3814 through diode switch 10820 is larger than the current from bus 10827 and therefore diode switch 10820 must be made nonconducting and a diode switch which allows less current to flow must be made conducting.

Reference to FIG. 108 shows that bus 10830 is an input to AND-gate 10831 and that the other input to the AND-gate is bus 5710. A pulse on bus 5710 will produce a pulse on the output of the AND-gate on bus 10832 if the current from bus 3814 to the summing point of amplifier 10819 is larger than that from bus 10827. There will be no output if the current from bus 10827 is the larger.

Bus 10832 is connected to the E' input of each stage of the code register and each stage of the code register has its D priming input connected to the B output of an associated stage of the ring counter and its C priming input connected to the B output of the preceding stage of the ring counter. Since only one stage of the ring counter is in the B state at a time, only one stage of the code register will have its D priming bus energized and only the succeeding stage of the code register will have its C priming input energized.

A series of pulses will now appear on bus 5710 and one bit of the output code will be determined at each pulse time. Bus 5710 is connected to the E inputs of all stages of the code register except flip-flop 10811 and to the E and E' inputs of all stages of the ring counter except flip-flop 10807 where it is connected to the E' input only. At the time of the first pulse on bus 5710, a pulse will occur on bus 10832 if the current from bus 3814 through diode switch 10820 is too large. The D priming input of flip-flop 10811 is energized so the pulse at its E' input on bus 10832 will force it into the A state which will cause diode switch 10820 to become nonconducting and stop the flow of current through it. If there was no pulse on bus 10832 then the current from bus 3814 needs

187 to be increased and since flip-flop 10811 is left in the B state diode switch 10820 will continue to conduct. The first pulse on bus 5710 will also force flip-flop 10812 to go to the B state which will make diode switch 10822 conduct and allow current to flow from bus 3814 through resistor 10823 to the summing point of amplifier 10819. Each pulse on bus 5710 will also advance the ring counter one step. Thus at each pulse on bus 5710 the state of one stage of the code register is determined by comparing the currents flowing from bus 3814 and bus 10827 to the summing point of amplifier 10819 and after all stages have been determined the number held in the code register is the desired output number.

FIG. 108 shows that each stage of the code register has its B output connected to the J priming input and has its A output connected to the K priming input of the associated stage of the shift register. The J priming input corresponds to the C priming input and the K priming input corresponds to the D priming input. The H and H' input correspond to the E and E' inputs and bus 5711 is connected to the H and H' inputs of all stages of the shift register except flip-flop 10833 where it is connected to the E and E' inputs.

After the number of pulses which have appeared in succession on bus 5710 are equal to the number of stages of the code register a pulse will appear on bus 5711. This will cause the number in the code register to be transferred in parallel to the shift register. The description of the transfer from the shift register to the output register given in connection with FIG. 62 also applies to this transfer.

It has been mentioned previously that the sign of the signal $U_1$ on bus 3814 is always positive. Therefore the sign of the output quotient is the same as the sign of the signal on bus 6026. It is also shown that trigger circuit 10824 will be in the B state if bus 6026 is positive and in the A state if the bus is negative. Thus the state of trigger circuit indicates the sign of the output. The B output of the trigger circuit is connected to the D priming input of flip-flop 10833 by bus 10825, the A output of the trigger circuit connected to the C priming input by bus 10826 and the E and E' inputs of the flip-flop connected to bus 5711. At the time a pulse on bus 5711 causes the number in the code register to be transferred to the shift register, it will also cause flip-flop 10833 to go to the A state if bus 6026 is positive or to the B state if the bus 6026 is negative. The pulse on bus 5711 also forces flip-flops 10807 and 10811 to the B state and all other stages of the ring counter and code register to the A state in the manner described previously.

Bus 5710 is connected to the E and E' inputs of all stages of the shift register except flip-flop 10833 where it is connected to the H and H' inputs. The next series of pulses on bus 5710 will cause the number to shift in the same manner previously described in the discussion of the shift register shown on FIG. 62. This number will appear one digit at a time in the last stage, flip-flop 10833, and the B output of this stage on bus 10806 is the desired digital number proportional to the quotient.

Bus 10806 is connected as one input to serial digital adder 10817. This serial digital adder can be any one of a number of types commonly used in the industry and familiar to anyone skilled in the art of digital computer circuits. Many references are available in the literature, one example is on page 128 of "Arithmetic Operations in Digital Computers" by S. K. Richards, published by the D. Van Nostrand Co., Inc., 1955.

Bus 3903 comes from the temporary G-track as shown in FIG. 39 and is connected to the input of amplifier 10815. This is a conventional digital amplifier in which the input is reclocked with the clock pulse on bus 5708 and the output available on bus 10835. The two inputs to serial digital adder 10817 are buses 10806 and 10835 and these buses present their numbers with the sign bit first and other bits in ascending order. The function of

188 the serial digital adder is to accept these input numbers in this form and produce the digital number which is their sum on its output.

The output of serial digital adder 10817 is connected to the input of amplifier 10836. This is a conventional digital amplifier which reclocks the input with the clock pulse on bus 5708 and the result is available on bus 3841.

Input signal processor for image recognition (FIGS. 94, 95 and 96)

The function of this device is to scan an image and pass the signals derived from it on to the signal time normalizer. A diagram of the system is shown in FIGS. 94 and 95 and the orientation of these two figures is given in FIG. 96.

Scanning is done by cathode ray tube 9401 with the vertical deflection controlled by current through coils 9409 and horizontal deflection by coils 9410. The scanning spot of light on the face of the cathode ray tube is focussed by lens 9402 onto the scanned object to be recognized which is located in the general area designated as 9403 and the reflection off of this object is picked up by photocell 9405. It is preferred that the spot on the cathode ray tube is moved continuously in the vertical direction by the signal output of triangular wave generator 9411 of conventional design acting through amplifier 9412 and 9413 to change the current through coils 9409. A sawtooth generator also may be used instead of the triangular wave generator. Photocell 9405 may be a photomultiplier type of pickup.

Control of the horizontal scanning is arranged so that, once it is initiated by a signal from the signal time normalizer shown on FIG. 51, the scanning will proceed at a high speed along a horizontal line until a signal is picked up by photocell 9405. At this time the sweep is changed to a slower rate for scanning the image. The image scanned from the first time that a signal appeared until it first disappears is the image which the machine will later recognize as an entity. During the first time this image is scanned, the error distance from the axis of the average position of the vertical excursions of the scan to a parallel axis through the centroid of the light flux of the image is calculated. At the end of the first scan the vertical sweep is corrected by this amount so that during subsequent scans the vertical excursions will be centered about a horizontal line through the centroid of the image. The horizontal sweep circuits are now adjusted so that a second sweep begins at the place where the signal was first detected. A signal is sent to the signal time normalizer indicating that data is now being transferred. The image is now scanned twice at low horizontal speed at the end of which time the signal to the signal time normalizer is removed indicating that data transmission is complete. Horizontal movement of the scanning is stopped and no further action takes place until a signal from the signal time normalizer causes the operation described in this paragraph to be repeated. Each time that such a starting signal is received from the signal time normalizer these operations will repeat until the horizontal sweep reaches the maximum excursion which is permitted. When this happens the horizontal deflection circuits are set back to the beginning position, and the controls can be established so that at this same time the vertical deflection circuits cause the next scanned area to be above or below the areas just scanned, or any other predetermined area.

All during the time the horizontal deflection is proceeding at slow speed, pulses from an oscillator are allowed to step a binary counter so that at the end of this time the counter contains a number proportional to the duration of the sweep. This number is transmitted to the cathode ray tube buffer.

When the signal time normalizer is ready to receive data it places a signal on bus 5023 which, as shown in FIG. 95, is connected to the E input of flip-flop 9501. This flip-flop is self-primed and will be forced into the B state at this time. The B output is bus 9523 and is connected to the control of diode switch 9517 which will now allow current to flow from potentiometer 9524 through switch 9525, diode switch 9517 and resistor 9526 to the summing point of amplifier 9519. Reference to FIG. 95 shows that capacitor 9527 is connected across amplifier 9519 and therefore the circuit acts as an integrator. The voltage at the output of amplifier 9519 will change at a uniform rate and is one input to amplifier 9528. Current through coils 9410 comes through bus 9520 and is controlled by tube 9529 whose grid is connected to the output of amplifier 9528. Thus the current through diode switch 9517 will cause the horizontal deflection of the beam of cathode ray tube 9401 to proceed at a uniform rate. This rate can be varied by potentiometer 9524 and is adjusted to cause scanning at a rapid rate.

Vertical deflection of the cathode ray tube beam is controlled by the current through tube 9413 whose grid is connected to the output of amplifier 9412. There are two inputs to the summing point of amplifier 9412, one from the output of amplifier 9414 and the other from the triangular wave generator 9411. Sync bus 9466 with the main clock pulses may be used to lock the triangular waves to the main G-memory, although this is not absolutely necessary. The voltage from amplifier 9412 will establish the average vertical position of the horizontal line to be scanned and the voltage from the triangular wave generator will cause rapid deflection above and below that line. The triangular wave generator runs continuously so that vertical scanning is always taking place.

As explained in a preceding paragraph, a signal on bus 5023 will start horizontal deflection at the rapid rate. This will continue until a signal is picked up by phototube 9405. A signal output of the phototube will be passed on to the summing point of amplifier 9408 by one of the two paths controlled by switch 9407. One path is directly from the phototube and the other through amplifier 9406. This is a unity gain amplifier so that throwing switch 9407 reverses the polarity of the signal input to amplifier 9408. The negative of an image scanned with switch 9407 in one position will give the same signal to the input of amplifier 9408 as the positive of an image scaned with the switch in the opposite position. The output of amplifier 9408 on bus 9416 is clamped to ground by diode 9415 so that signal on this bus is always a positive voltage. Bus 9416 is connected to the input of trigger circuit 9506 through diode 9530. The input of trigger circuit 9506 is connected to ground through capacitor 9536 and resistor 9535 and to a negative voltage supply through resistor 9554. The voltage divider action of resistors 9535 and 9554 will normally keep trigger circuit 9506 in the A state. A signal picked up by photocell 9405 will therefore charge capacitor 9536 and cause trigger circuit 9506 to go to the B state and remain there as long as the signal continues. When the signal ceases, trigger circuit 9506 will remain in the B state until the charge on capacitor 9536 is sufficiently dissipated through resistors 9535 and 9554 to allow the trigger circuit input to reach ground potential. The B output of the trigger circuit is an input to ring counter 9507 which is the same type of circuit shown on FIG. 64. As explained in connection with FIG. 64, only one ring counter output bus is active at a time, and pulsing the input causes the output buses to be energized in sequence. At the time scanning begins the ring counter is in its home position, that is, with an output signal on bus 9508. After the first input, the signal on bus 9508 will disappear and one will appear on bus 9509.

One connection of bus 9509 is to the E input of flip-flop 9502 so that a signal appearing on this bus will force the flip-flop into the B state. The B output of flip-flop 9502, on bus 9531, is shown to be connected to the E′ input of flip-flop 9501 and also to the control of diode switch 9518. At the time flip-flop 9502 goes into the B state, flip-flop 9501 will be forced into the A state which removes the signal from its B output on bus 9523. This will cause diode switch 9517 to stop the flow of current through it to the summing point of amplifier 9519. At the same time the signal now on bus 9531 will close switch 9518 and allow current to flow from potentiometer 9532 through switch 9518 and resistor 9526 to the summing point of amplifier 9519. The current through this path can be varied by potentiometer 9532 to control the rate of horizontal deflection in the same manner as described for potentiometer 9524. Potentiometer 9532 is set to give a slower horizontal sweep rate than potentiometer 9524.

Another connection of bus 9509 is to OR gate 9538 and the output of this gate on bus 9512 is connected to the control of diode switch 9513. The action of potentiometer 9537, diode switch 9513 and amplifier 9514 is the same as that described for potentiometer 9524, diode switch 9517 and amplifier 9519. When diode switch 9513 is conducting, amplifier 9519 will integrate the current coming through the switch and the output voltage of the amplifier will change at a uniform rate. Potentiometer 9537 is adjusted so that the rate of voltage change at the output of amplifier 9514 is equal to the rate of voltage change at the output of amplifier 9519 when it is integrating current flowing through diode switch 9518.

The image to be recognized will now be scanned at the lower horizontal rate and the faster vertical rate. It is necessary to compute the distance between the axis of the average vertical deflection to the axis parallel to it which goes through the centeroid of the image using this formula:

$$\overline{Y} = \frac{\int_0^T S(t) \cdot y(t) dt}{\int_0^T S(t) dt} \quad (1)$$

where $\overline{y}$ is the vertical error distance from the center axis to the axis through the centroid, and $y(t)$ is the instantaneous vertical distance from the center of vertical scan, and $S(t)$ is the instantaneous value of the signal, and T is the time required to scan image.

Triangular sweep generator 9411 drives the sweep above and below its average position so that the output on bus 9417 is the value $y(t)$ in the equation above. It is connected to the primary of transformer 9418 and the secondary of this transformer is connected to multiplier quad 9419. This multiplier quad is the same type of circuit shown on FIG. 16 as well as many other places in Systems I and II.

The signal on bus 9416 and the output of amplifier 9408 is the value of $S(t)$ in the above equation. It is the input to amplifier 9420 which is constructed to have unity gain so that its output on bus 9421 is equal in amplitude but of opposite polarity from that of amplifier 9408. Buses 9416 and 9421 are input buses to multiplier quad 9419. The operation of this multiplier is the same as that illustrated in FIG. 16 and the product $y(t)S(t)$ is on its output bus 9422.

Reference to FIG. 94 shows that bus 9422 is connected through a resistor to the summing point of amplifier 9423. There are two paths connecting the output of this amplifier to its summing point, one through capacitor 9425 and one through diode switch 9424. When the switch is not conducting this circuit will behave as an integrator, and when it is conducting the integrator is held to its initial state. The control of diode switch 9524 is on bus 9508 which previous discussion showed carried a signal until the time the first signal is picked up by phototube 9408. Since there has been no output from the phototube up to this time there will not have been any output from multiplier 9419 to amplifier 9423. When the signal on bus 9508 disappears, amplifier 9423 will begin to integrate the signal at its input and after the image has been scanned the value at its output will be the quantity in the numerator of Equation 1.

S(t) on bus 9416 is the input to amplifier 9426 which is the same type of circuit as amplifier 9423 described in the above paragraph. The diode switch across amplifier 9426 is also controlled by bus 9508 so that this circuit will start integrating at the same time as amplifier 9423 and when the image has been scanned, the output of amplifier 9426 will be the quantity in the denominator of Equation 1.

The division required to solve Equation 1 is accomplished by means of multiplier quads 9427, 9430 and 9433, transformers 9434, 9435, 9436 and 9438, amplifier 9431 and filter 9437. The multiplier quads are the same type of circuit as multiplier quad 9419. Oscillator 9534 is a conventional oscillator whose output on bus 9533 carries a carrier signal which is a sine wave of frequency ω and serves to make transformer coupled circuits possible in the divider even though two DC signals are divided. Bus 9533 is connected to the primary of transformer 9434 whose secondary connections are inputs to multiplier quad 9427. Amplifier 9428 has unit gain and gets its input from the output of amplifier 9423 which previous discussion has shown to be the integral of the product $y(t) \cdot S(t)$. The outputs of amplifiers 9423 and 9428 are connected as inputs to multiplier quad 9427 and therefore the output of the multiplier on bus 9439 may be expressed as $$\sin \omega t \int_0^T y(t) S(t) dt$$

where T is the length of time integration has taken place. Amplifier 9429 has unity gain and derives its input from the output of amplifier 9426 whose output value is the integral of S(t). The outputs of amplifiers 9426 and 9429 are connected as inputs to multiplier quad 9430 and the other inputs to the multiplier are the secondary connections of transformer 9438. The output bus of amplifier 9431 is bus 9432 and is connected to the primary of transformer 9438. If the signal on bus 9432 is called $q$ then the output of multiplier quad 9430 on bus 9440 may be expressed as $$q \int_0^T S(t) dt$$

where again T is the length of time in which integration has taken place. Buses 9439 and 9440 are inputs to amplifier 9431 and the equation of the output of this amplifier is:

$$q = A \left[ \sin \omega t \int_0^T y(t) S(t) - q \int_0^T S(t) dt \right] \quad (2)$$

where A is the gain of the amplifier. This may be rewritten as:

$$q \left[ \frac{1}{A} + \int_0^T S(t) dt \right] = \sin \omega t \int_0^T y(t) S(t) dt \quad (3)$$

If A is made very large its reciprocal may be negligible with respect to the integral of S(t) and may be ignored. In this case Equation 3 becomes:

$$q = \sin \omega t \frac{\int_0^T y(t) S(t) dt}{\int_0^T S(t) dt} \quad (4)$$

This equation shows that the output of amplifier 9431 is the quotient desired in Equation 1 multiplied by the output of oscillator 9534. This is synchronously demodulated by multiplying it by the output of the oscillator and filtering out the high frequency component. Bus 9432 is the input to the primary of transformer 9436 and the secondary connections are inputs to multiplier quad 9433. The output of oscillator 9534 on bus 9533 is the input to the primary of transformer 9435 and the secondary connections of the transformer are inputs to multiplier quad 9433. Therefore, if the output of the multiplier on bus 9437 is called Z it may be expressed as:

$$A = \sin^2 \omega t \frac{\int_0^T y(t) S(t) dt}{\int_0^T S(t) dt} \quad (5)$$

This may be placed in the form:

$$Z = \tfrac{1}{2} [1 - \cos 2\omega t] \frac{\int_0^T y(t) S(t) dt}{\int_0^T S(t) dt} \quad (6)$$

If the carrier frequency component is removed by the filtering action of resistor 9441 and capacitor 9442, then the equation becomes:

$$Z = \tfrac{1}{2} \left[ \frac{\int_0^T y(t) S(t) dt}{\int_0^T S(t) dt} \right] \quad (7)$$

At the time the image has been fully scanned the upper limit of integration becomes T and the signal is reached and Equation 7 becomes:

$$Z = \overline{y} \quad (8)$$

At the time the signal has been fully scanned the signal on bus 9437 is proportional to the error distance between the average vertical scanning and the axis parallel thereto going through the centroid of the light flux of the scanned image. The constant ½ is absorbed by gain adjustment in resistor 9444 which feeds the vertical deflection system to correct the error of the position of the average vertical scanning.

It was previously explained that as long as phototube 9405 is picking up a signal there will be a signal on bus 9416 which will keep trigger circuit 9506 in the B state. If the signal disappears for a specified length of time this is defined as the end of the image and trigger circuit 9506 is allowed to return to the A state. This length of time is determined by the time constant of resistors 9435 and 9554 and capacitor 9536.

FIG. 95 shows that the A output of trigger circuit 9506 is connected to the E input of delay-flop 9505, the B output of the flip-flop is an input to OR gate 9551 and the OR gate output is connected to the control of diode switch 9515. When trigger circuit 9506 falls back into the A state it will actuate delay-flop 9505 which will place a signal on the control of diode switch 9515 for the time period of the delay-flop. Diode switch 9515, amplifier 9516 and their associated circuits form a sample and hold circuit of the same type as that described in connection with the circuits shown in FIG. 60. When diode switch 9515 is conducting, the output of amplifier 9516 will assume a voltage proportional to the voltage output of amplifier 9514. After the signal is removed from the control of diode switch 9515, the voltage output of amplifier 9516 will remain at whatever value it had when the signal was removed. The output of amplifier 9516 is an input to the summing point of amplifier 9528 so that the horizontal deflection is proportional to the sum of the outputs of amplifiers 9516 and 9519.

It has been pointed out that amplifier 9514 begins integrating at the same time amplifier 9519 begins integrating the current through diode switch 9518 and that the voltages on the amplifier outputs change at the same rate. At any time the voltage output of amplifier 9514 is equal to that part of the voltage at the output of amplifier 9519 which was due to integration of the current flowing through diode switch 9518. When a signal appears on the control of diode switch 9515, the output of amplifier 9516 will become equal to the negative of the voltage output of amplifier 9514 and therefore will subtract from the summing point of amplifier 9528 a current equal to that part of the input to that summing point current from amplifier 9519 which was due to integrating the current through diode switch 9518. This will set the horizontal deflection of the cathode ray tube beam back to the position it held at the time the slow horizontal sweep began and will do so every time that switch 9515 is rendered conductive. Current is still flowing through diode switch 9518 so horizontal deflection will begin again from this position and proceed at the same slow rate.

The cathode ray tube will now be scanning the image at the same place as it was when a signal was first picked up by phototube 9405. The signal will of course be picked up again and cause trigger circuit 9506 to go to the B state in the same manner as previously described. This pulses the input of ring counter 9507 and steps it one position which will result in the signal on bus 9509 disappearing and a signal appearing on bus 9510.

FIG. 95 shows that one connection of bus 9510 is to the E input of delay-flop 9503 and that the B output of the delay-flop is connected by bus 9522 to the control of diode switch 9443. Therefore, after a signal appears on bus 9510 diode switch 9443 will conduct for the time period of delay-flop 9503. The voltage value on bus 9437 has been shown to be proportional to the desired vertical correction to the scanning. When diode switch 9443 is conducting bus 9437 is connected through resistor 9444 to the summing point of amplifier 9414 and the amplifier will integrate the current flowing through this path. The value of resistor 9444 is chosen so that the change in the output voltage of amplifier 9414 will produce the desired change in the vertical position of the scanning which is indicated by the voltage on bus 9437, thereby correcting the center of vertical scanning.

Another connection of bus 9510 is as an input to OR gate 9538 whose output on bus 9512 is connected to the control of diode switch 9513. This will keep the diode switch conducting and amplifier 9514 will continue the integration process it began at the time a signal appeared on bus 9509. Bus 9510 is also connected to the control of diode switch 9445 therefore, at this time the switch is conducting and will allow the signal on bus 9422 to pass through diode 9446 to an input of amplifier 9449. The anode of diode 9446 is connected to diode switch 9445 and with this orientation only signals whose polarity is positive will pass through to amplifier 9449. Amplifier 9449 has its output preferably connected to the input of low pass filter 9450 whose function is to remove the high frequency components of the signal which carry no information. Bus 9451 connects low pass filter 9450 to the signal time normalizer, and bus 9451 carries the output proper of the image signal processor. Bus 9510 is also connected to the signal time normalizer as a signal to begin reading the data available on bus 9451. Bus 9451, in one adaptation, connects to bus 4784 in FIG. 47 and bus 9510 connects to bus 4878 in FIG. 50, and buses 9545 connect to buses 4870 in FIG. 50 to replace the buses from the transformation circuit. Bus 9521 connects to bus marked 4821 in FIG. 50. When the scanning reaches the end of the scanned object for the second time the control circuits set the horizontal deflection back to the position where slow scan started and step ring counter 9507 in the same manner as described previously. The object to be recognized will be scanned again at the slow horizontal sweep rate.

Stepping the ring counter this time will cause the signal on bus 9510 to disappear and a signal to appear on bus 9511. This will result in changing diode switch 9448 to a conductive state and diode switch 9445 to a nonconductive state. Also, the signal is removed from bus 9512 rendering switch 9513 nonconductive thereby stopping the integration by amplifier 9514. The signal on bus 9422 will now pass through diode switch 9448, diode 9447 and a resistor to the summing point of amplifier 9449. Diode 9447 has its cathode connected to diode switch 9448 and with this orientation will allow only signals of negative polarity to pass through to amplifier 9449.

Thus during the second time the image is scanned at the slow horizontal rate signals of positive polarity are allowed to pass from bus 9422 to amplifier 9449 and during the third time signals of negative polarity are passed. This is preferred because of the bandwidth limitations of the G-memories. It was shown that the signal on bus 9422 is the product of the signal on bus 9416 and the vertical displacement signal of scan with respect to its average position which is made available on bus 9417. Bus 9416 is clamped to ground by diode 9415 so that the signal on bus 9416 always has positive polarity. Therefore, the output of multiplier quad 9419 on bus 9422 will depend upon the polarity of the signal on the other input, bus 9417. The signal on this bus will have one polarity representing one side of the average position of the vertical scan and the opposite polarity to represent the other side. Bus 9422 will be of one polarity while the upper half of the image is being scanned and the opposite polarity for the lower half. The result of rendering conductive diode switch 9445 during one scanning period and diode switch 9448 during the next scanning period is to feed to the input of amplifier 9449 signals from the upper part of the image during one period and from the lower part of the image during the next period. The output of amplifier 9449 is preferably passed through filter circuit 9450 to bus 9451 which connects it to the signal time normalizer. Filter circuit 9450 removes the high frequency part of the signal which is due to the vertical deflection signal and leaves the low frequency part which carries the information. If the scanning process were not divided into gross separation of times for the upper and lower parts of the image, then scanning an image about the axis would tend to have short term averages and cancel information at the output of filter circuit 9450, which then would not contain the desired type of information.

Any stretch of vertical displacement of an image with scanned signals $S(t)$ to one with scanned signal $S^*(t)$ with respect to the axis of vertical scan will produce $S^*(t)y(t) = K_1 S(t)y(t)$ substantially, if the signal is averaged over one-half of a cycle of the triangular wave $y(t)$, where $K_1$ is a positive stretch or contraction constant. Averaging over longer periods can be permitted in view of the gross separation referred to above.

Within the half-cycle of triangular wave scan of duration $\Delta t$, the signal on bus 9451 substantially will be proportional to $$\int_t^{t+\Delta t} K_1 S(t)y(t) = K_1 \int_t^{t+\Delta t} S(t)y(t)dt$$

where $\Delta t$ is a time interval in which the signal is smoothened by 9450, but significantly longer intervals are not integrated. With this bandwidth limitation, the output signal on bus 9451 is $K_1 S(t) \cdot y(t)$. Since the learning equipment is invariant with respect to amplitude stretch of a signal it will recognize all images as the same whose signal differ only by the value of the positive stretch constant $K_1$. Such images are magnified or contracted in the vertical direction. A change of intensity of $S(t)$ which is in the same proportion for all elements of the picture will yield $K_2 S(t)$. This will produce $K_1 K_2 S(t) \cdot y(t) = KS(t) \cdot y(t)$ to which the learning equipment will give the same response regardless of any change of value of positive constant $K$. Invariance with respect to stretch in the horizontal direction is taken care of by the time normalizer circuit to which bus 9451 is connected.

When the scanning reaches the end of the scanned object which may be a picture or printed or written material, trigger circuit 9506 will fall back into the A state in the same manner as previously described. This triggers 9505 which causes analog switch 9515 to sample the voltage output of 9514, but this voltage has not changed during the third horizontal scan because 9513 was made nonconductive at the beginning of the third scan. Therefore, the voltage on the output of 9516 does not change as a result of the last sampling by switch 9515. This will cause the horizontal position of the scan to stay at the extreme right side of the scan position and stay there. This latter position will be the start position for the next complete operation initiated by a new request signal on bus 5023. The A output is an input to AND gate 9541 and the other input is bus 9511. This is the only time that trigger circuit 9506 has gone into the A state when bus 9511 has carried a control signal and therefore the first time AND gate 9541 can give an output. One connection of this AND gate output is to the E input of delay-flop 9504 and will actuate it at this time. The B output of this delay-flop is an indication that the scanning of this image is completed and serves as an input to OR gate 9542. The output of OR gate 9542 is bus 9521 and furnishes a signal to the signal time normalizer showing that no more signals from this image will be transmitted. While bus 9422 is shown connected to analog gates 9445 and 9448, this is done only when invariance with respect to vertical magnification or contraction of the image is desired. Without this requirement, the two analog gates should be disconnected from bus 9422 and connected instead to circuit point marked 9467, the output of amplifier 9408 before clamping.

Another connection from the output of AND gate 9541 is to the E' input of flip-flop 9502 and this will force the flip-flop into the A state at this time. The control signal on its B output, bus 9531, will disappear and diode switch 9518 becomes nonconductive which will halt the horizontal scanning movement.

Bus 9531 is also an input to AND gate 9544 whose other input is the B output of trigger circuit 9555 on bus 9556. Reference to FIG. 95 shows that the input to trigger circuit 9555 is the output of oscillator 9534 on bus 9533. This will result in the trigger circuit changing state each time the oscillator output changes polarity. Therefore, the binary counter will be stepped at a uniform rate all the time flip-flop 9502 is in the B state and the number it contains will be proportional to the duration of time required for scanning the image. The signal from the signal time normalizer on bus 5023 which initiates the scanning as described previously, also actuates reset generator 9539 which is the same type circuit shown on FIG. 58 and will reset binary counter 9540 to zero before flip-flop 9502 is forced into the B state by the process previously described. The outputs of binary counter 9540 are made available to the signal time normalizer on buses 9545.

Bus 9521 is also connected to the input of reset generator 9543 and the pulse on this line at the termination of scanning will set ring counter 9507 back to the initial position in which it has an output on bus 9508, to keep 9423 and 9426 at their initial states. Another connection of the output of reset generator 9543 is to the R input of flip-flop 9502 which at this time will be forced into the A state if it is not already in that state.

The process described above which begins with a control signal on bus 5023 and ends with a pulse on bus 9521 will be repeated until the horizontal deflection of the scan has moved as far as it is permitted to go. This is detected by the circuit in box 9546 which is the same circuit as formed by trigger circuit 5011 and delay-flop 5012 shown on FIG. 50. As explained in connection with the circuits of FIG. 50, when the voltage input to this circuit reaches a certain level, the output will have a control signal for the duration of the time period of the delay-flop. The input to box 9546 is the cathode of tube 9529 whose voltage is proportional to the horizontal position of the scan. Therefore, when the scan reaches a certain position the circuits in box 9546 will be actuated, and produce an output which FIG. 95 shows is connected as an input to OR gate 9547. The output of OR gate 9547 is bus 9552 and is connected to the control of diode switch 9548. A control signal here will make the diode switch conductive and establish a current path from the summing point of amplifier 9519 through resistor 9549 and diode switch 9548 to the output of the amplifier. This will allow capacitor 9527 to discharge and will return the horizontal deflection of the beam of cathode ray tube 9401 to its initial position. A negative voltage placed on bus 9553 can be done through an external switch to control reset of the entire circuit before starting or when desired.

Another connection of bus 9552 is to the control of diode switch 9550 and thus the integrating circuit of amplifier 9514 will be reset to its initial state at the same time and in the same manner as that of amplifier 9519 which has been previously described. The output of OR gate 9547 is also an input to OR gate 9551 whose output will result in making diode gate 9515 conductive at the same time as the output of amplifier 9514 is set to its initial condition and therefore the output of amplifier 9516 will be set to this same initial condition.

Bus 9552 is also an input to OR gate 9542 and a signal here will produce a pulse on bus 9521 and reset ring counter 9507 to its initial state and flip-flop 9502 to the A state in the same manner as described previously.

Another connection of bus 9552 is through capacitor 9452 to the primary of transformer 9453. This will result in a pulse on the secondary of this transformer at the time when the horizontal deflection circuit is reset to its initial position. If switch 9454 is in the lower position, then current will flow through diode 9459 or diode 9460, switch 9458, resistor 9457, switch 9454 and resistor 9455 to the summing point of amplifier 9414. The direction of the current will depend upon the position of switch 9458 as diodes 9459 and 9460 are oriented so that the directions of current which will flow through one is opposite to that which will flow through the other. A current pulse to the summing point of amplifier 9414 will be integrated and result in a step change in the average position of the vertical deflection. The direction of the step will depend on the direction of current flow at the summing point of the amplifier as determined by the position of switch 9458.

If switch 9454 is in the upper position current will flow continuously from potentiometer 9456 through switch 9454 and resistor 9455 to the summing point of amplifier 9414. This will result in the average position of the vertical deflection changing at a uniform rate governed by the setting of potentiometer 9456.

The circuits in box 9461 are the same as those in box 9546 already described. When the vertical scanning has reached the maximum deflection allowed, then box 9461 will have an output and, if switch 9462 is on the left hand position, diode switch 9463 will be made conducting and the vertical deflection reset to its initial position in the same manner as previously described for the horizontal deflection circuits. When switch 9462 is in the center position then the vertical deflection can be manually reset by closing, switch 9464, and when switch 9462 is in the right hand position it can be reset by a pulse from an external source on bus 9465.

Alternate methods of scanning (FIGS. 97 and 98)

FIG. 97 shows another method of scanning an image in which the image of the object is focussed into a television camera tube 9701 and this replaces the cathode ray tube 9401 and phototube 9405 shown in FIG. 94. The television camera tube may be a vidicon or image orthicon or other type used by the television industry. Deflection coils 9702 and 9703 are connected into the circuits shown in FIG. 94 in place of coils 9409 and 9410 and will cause any illuminated object in space 9704 to be scanned in the same manner as described for 9403. Lens 9706 focusses the object at 9704 onto the image area of 9701 in accordance with standard practice. The output of the camera tube on bus 9705 is connected to the circuits in place of the output of phototube 9405. That is, bus 9705 could connect to the inputs of 9406 or 9408.

Another form of scanner which can be employed in place of cathode ray tube 9401 is shown in FIG. 98. In this form several planar mirrors are fastened to a rotating shaft 9801. FIG. 98 shows as an example mirror 9802 and seven other mirrors arranged to form a surface with eight equal sides. Light from any object at 9803 is directed by lens 9804 onto mirror 9802 and is reflected by the mirror through aperture 9805 and is picked up by phototube 9806. The focal plane is the plane of the aperture. The output of phototube 9806 is amplified by amplifier 9807 and made available on bus 9808 which can be connected to the circuits of FIG. 94 in place of the output of phototube 9405. That is, bus 9808 could connect to the inputs of 9406 or 9408.

As the mirror rotates about shaft 9801 the angle of reflection is changed which will result in a line on object 9803 being scanned. Each mirror will come into a position in which it can reflect light from the image to the phototube and cause the same line to be scanned. This is a standard scanning technique well known to the industry. The output of phototube 9806 can be connected into the circuits shown in FIG. 94 in place of the output of phototube 9405. If the mirrors rotating about shaft 9801 are used to get vertical scanning, then horizontal scanning can be done by mechanically moving the object at 9803 or by inserting another group of rotating mirrors between the image and those rotating about shaft 9801, or orienting them in a manner which will produce horizontal scanning in accordance with method and means which are well known to the art.

OR gate (FIGS. 83, 84)

The OR gate symbol shown in FIG. 84 represents the preferred circuit shown in FIG. 83 as one of many possible forms. This type of circuit, in general, is used in a known and standard manner by the industry and its function is to provide a signal on its output if there is a signal on any one of its several inputs. A signal condition is represented by a negative voltage level, while a no signal condition is represented by a positive voltage level. In FIG. 83 the inputs are buses 8302, 8303, and 8304 which are represented by buses 8401 in FIG. 84. The output is on bus 8305 which corresponds to bus 8402 in FIG. 84 and the complemented output is on bus 8306 which is represented by bus 8403 in FIG. 84.

The presence of a signal on an input bus holds the associated transistor base negative biasing it into a saturated conducting state. During the absence of a signal the base is at a positive potential biasing the associated transistor into a nonconductive state. When there are no signal inputs, transistors 8310, 8311, and 8312 are all cut off and the common junction of their collectors assumes a negative potential, since this junction is connected through resistor 8314 to a negative voltage source. The complemented output, bus 8306, is also connected to this junction and is therefore negative under a no signal condition. Transistor 8313 will be biased to a heavily conducting state since its base is connected to this junction through resistor 8315. Output bus 8305 is connected to the collector of transistor 8313 and will therefore be at a positive voltage at this time.

If a signal is present on any input, the transistor associated with that input will conduct and bus 8306, the common junction of the collectors of transistors 8310, 8311, and 8312 will be at a positive voltage. Having more than one input present will not appreciably change this potential. This condition will cut off transistor 8313 and its collector will go to a negative voltage. The presence of any input signal will therefore cause a negative potential on output bus 8305 and a positive potential on the complemented output bus 8306.

Only three inputs are shown in FIG. 83, but others can be added by connecting them in the same manner as those illustrated.

AND gate (FIGS. 85, 86)

FIG. 86 shows the symbol of the AND gate and represents a preferred conventional circuit which is detailed in FIG. 85 as one among many possible forms of such a circuit. The number of inputs is variable, and others can be added by connecting them in the manner illustrated in FIG. 85. This illustration shows three inputs which are buses 8502, 8503, and 8504 which correspond to the buses 8601 in FIG. 86. The output is on bus 8506 which corresponds to bus 8602 in FIG. 86 and the complemented output is on bus 8511 and corresponds to bus 8603. The output will appear only when all inputs are present. A negative voltage level represents a signal, while a positive voltage level represents no signal.

As illustrated in FIG. 85, each input is connected to the base of an associated transistor and the three transistors 8507, 8508, and 8509 are connected in series. The emitter of one is tied to the collector of another. Therefore, all three transistors must be able to conduct before current can flow through the series. Thus when signals are on all three input buses, the transistor base voltages are sufficiently negative to bias the associated transistors into a conducting state. When no signal is present on any one of the input buses, the base of that transistor is held at a sufficiently positive potential to cause that transistor to be nonconductive; thus no current will flow in the series although the other two transistors are biased to be conductive. Under this condition the complemented output on bus 8511 will be at a negative potential due to the connection through resistor 8505 to a negative voltage source. This point is also connected to the base of transistor 8510 through resistor capacitor network 8512 causing transistor 8510 to conduct at saturation. The output, at this time, on bus 8506 which is connected to the collector of transistor 8510 will be at a positive potential.

The presence of signals on all inputs will cause current to flow through the series transistors and the complemented output on bus 8511 will now be positive. This will bias transistor 8510 to a cut off condition and the output on bus 8506 will be negative.

Trigger circuit (FIGS. 82, 88)

FIG. 82 shows the detail of the preferred circuit which is represented in other figures by the symbol shown in FIG. 88. The circuit has one input labeled E and two outputs labeled A and B. The A state of the trigger circuit is defined as the condition when the A output is at a negative potential and the B output at a positive potential. The B state is defined as the converse, that is when the B output is negative and the A output is positive. When the E input is at a negative potential the trigger circuit is in the $a$ state and when the E input is at a positive potential it is in the B state.

Referring to FIG. 82, it can be seen that when E is negative the voltage at the base of transistor 8202 is below that of its emitter and that transistor 8202 is cut off. The values of resistors 8204, 8205, and 8206 are chosen so that in this condition the base of transistor 8203 is held at a positive potential which will cause it to conduct. This causes the collector of transistor 8203 to be at its most negative potential. Resistor 8207 connects the collector of transistor 8203 to the base of transistor 8208 and the negative potential on the base of this emitter follower will cause it to conduct more. The A output, which is taken from the emitter of transistor 8208, will be negative at this time.

The collector of transistor 8203 is connected to the base of transistor 8211 through resistor 8209 and the emitters of transistors 8203 and 8211 are joined together. As a result of these connections when transistor 8203 is conducting transistor 8211 will be cut off. The collector of transistor 8211 is then at its most positive potential and since this point is connected through resistor 8212 to the base of transistor 8213 and the positive potential on the base of this emitter follower 8213 will cause it to conduct less. The B output, which is taken from the emitter of transistor 8213, will swing positive at this time.

If the input E is raised slightly above ground then transistor 8202 will begin to conduct and additional current will flow through resistor 8204. This makes the potential on the base of transistor 8203 go more negative and that transistor will conduct less than before which will make its collector go more positive. As the collector of transistor 8203 moves in a positive direction it makes the base of transistor 8211 go positive because of the connection through resistor 8209. Transistor 8211 will begin to conduct and more current will flow through resistor 8214 causing the emitters of transistors 8203 and 8211 to move in a positive direction. Raising the potential of the emitter of transistor 8203 cause it to conduct less and adds to the effect of its negatively moving base. This is positive feedback which causes a regenerative action that continues until transistor 8203 is cut off and transistor 8211 is conducting heavily. In this condition transistor 8213 will conduct more and transistor 8208 will conduct less which makes the B output negative and the A output positive. Because of the regenerative action the transition from one state to another will be very rapid.

When the E input is brought back below ground the regenerative action operates to make the change back to the A state very rapid.

Solenoid control (FIGS. 80, 89)

The symbol used for a solenoid and its control is shown in FIG. 89 and the circuit it represents is shown in more detail in FIG. 80.

In FIG. 80 the solenoid winding is represented by coil 8004 which is shown connected in series with transistor 8003. Input to the circuit is on bus 8002 which is connected through a resistor to the base of the transistor. Bus 8002 in FIG. 80 corresponds to bus 8901 on the symbol in FIG. 89 and can be connected to either AND gates or OR gates of the type shown in FIGS. 83 and 85. When it is desired to energize the coil, bus 8002 is held at −5 volts which will cause the transistor to conduct and allow current through coil 8004. At the times when the solenoid is not to be energized, bus 8002 is held at +7 volts which will bias the transistor into a nonconducting state.

Rectifier and filter circuit (FIG. 81)

The rectifier and filter circuit is connected between an AC signal and the input of a trigger circuit. It has a DC output whose amplitude is dependent upon that of the input.

Details of the circuit are shown in FIG. 81. Input is brought in on bus 8101 and passed through capacitor 8102 to diode 8103. The diode is oriented so that on the positive half cycle of the input signal current will flow through the diode and switch 8104 and charge capacitor 8105 positively. During the negative half cycle, of the input signal, the diode is cut off allowing the charge accumulated on capacitor 8105 to bleed off through switch 8104 and resistor 8106. The amount of charge which leaks off depends on the time constant of capacitor 8105 and resistor 8106 in relation to the period of the input signal. Switch 8104 allows selection of different capacitors to obtain a suitable time constant. The negative current, supplied through resistor 8108 to output bus 8107, is applied to establish a reference level so that in a no signal condition, on input bus 8101, and if bus 8107 is connected to E of the trigger circuit, shown in FIG. 82, it is assured of being in the A state. The current through resistor 8108 also establishes a minimum input signal or threshold level that will be transferred by the filter circuit. This threshold value must be exceeded by an input signal before an output on bus 8107 will be realized. The level of the threshold may be adjusted by choice of resistor 8108.

Diode switch (FIGS. 53, 87)

The diode switch illustrated symbolically by FIG. 87 and schematically by FIG. 53 is a high speed all electronic single pole, single throw switch capable of handling bipolar analog signals. Referring to FIG. 87, signal switching action occurs between buses 8701 and 8702. The switch is conducting if either bus 8703 or 8704 is negative with respect to ground and nonconducting if both buses 8703 and 8704 are positive with respect to ground. Buses 8701 and 8702 correspond to buses 5301 and 5302 on FIG. 53 and buses 8703 and 8704 correspond to buses 5324 and 5317.

The diode switch circuit contains four semiconductor diodes connected in a ring as illustrated in FIG. 53. Switch action between terminals 5301 and 5302 is accomplished by means of a control voltage applied between point 5332, the junction of the cathodes of diodes 5303 and 5304, and point 5333, the junction of the anodes of diodes 5305 and 5306. To make the switch conduct, the control signal provides positive current flow from point 5333 to point 5332 causing the diodes to establish a conducting path between buses 5301 and 5302. If the polarity of the control signal is reversed, the switch diodes are biased in the reverse direction which opens the circuit path between buses 5301 and 5302.

The incoming switch control signals are applied to buses 5324 and 5317. Both of these buses must be maintained at a positive five volts or more with respect to ground when it is desired to prevent conduction between switch terminals 5301 and 5302. Conduction between buses 5301 and 5302 occurs if inputs 5324 or input 5317 is a negative 4 volts or more below ground.

Assume the inputs 5317 and 5324 are both held at a positive five volts or above and that resistor 5322 and resistor 5323 values are so chosen as to make the potential applied to the base of transistor 5321 more positive than the positive ten volt supply potential applied to the emitters of transistors 5314 and 5321. If resistors 5316 and 5315 are similarly chosen the collector current of both transistors 5314 and 5321 will be cut off. Under these conditions current will flow from the positive 20 volt power supply on bus 5326 through resistor 5307 and semiconductor diode 5309 from there on to the negative 20 volt power supply by two parallel paths, one through resistor 5311 to bus 5327 and the other through resistors 5319 and 5320 to bus 5329. The resistors are so chosen that, under the above conditions, the potential at point 5333 is a negative 11 volts and the potential applied to the base of transistor 5318 at the junction of resistors 5319 and 5320 is more negative than the negative 10 volt supply potential applied to the emitter of transistor 5318 at bus 5331. Under these conditions the collector current of transistor 5318 is cut off, thus allowing current to flow from the positive 20 volt supply potential appearing on bus 5330 through resistor 5312, diode 5310 and resistor 5308 to the negative 20 volt supply potential appearing on bus 5329. Resistor 5312 and resistor 5308 are so chosen that the potential appearing at point 5332, the junction of resistor 5308 and diode 5310, is a positive 11 volts.

Under the conditions assumed above, diodes 5303, 5304 and 5306 remain reverse biased and thus nonconducting for all potential excursions appearing on buses 5301 and or 5302 between the limits of a positive 9.5 volts and a negative 9.5 volts. This constitutes the nonconducting or open state of the switch between buses 5301 and 5302.

To make the switch conduct, either bus 5324 or bus 5317 is driven negative with respect to ground. Assume for example, bus 5324 is driven to a negative 5 volts. Resistor 5323 is chosen such that the negative current from bus 5324 exceeds the current flowing in resistor 5322 by an amount sufficient to assure collector current saturation of transistor 5321. Under this condition the collector potential rises to a few tenths of a volt less positive than the positive 10 volt supply potential appearing on bus 5328. The cathode of diode 5309 thus rises to approximately a positive 9.8 volts. Resistor 5319 is chosen such that the positive current flowing under the above conditions exceeds that through resistor 5320 by an amount sufficient to furnish base current adequate to saturate transistor 5318 causing its collector to fall to a few tenths of a volt above the emitter potential of a negative ten volts applied at bus 5331.

Under the above conditions, diode 5309 and diode 5310 are both reverse biased and current flows from the positive 20 volt potential appearing at bus 5326 through resistor 5307 to point 5333 and from there on to point 5332 by two paths, one through diodes 5306 and 5303 and the other through diodes 5305 and 5304. From point 5332 the path continues through resistor 5308 to the negative 20 volt potential appearing at bus 5329.

Diodes 5303, 5304, 5305 and 5306 will remain forward biased, providing a conducting path between buses 5301 and 5302 for potential excursions between a positive 9.5 volts and a negative 9.5 volts. The signal current flowing between buses 5301 and 5302 must not exceed the turn on current flowing in resistors 5307 and 5308 since any current larger than the turn on current will cause the switch to open.

The conducting state of the switch also may be obtained by driving terminal 5317 to a negative 4 volts or below causing transistor 5314 to conduct to saturation. This in turn will cause the circuit to operate as described hereinabove when transistor 5321 was conducting.

Equivalent switches (FIGS. 73, 74)

FIG. 73 shows symbols for an electromechanical single pole switch and an electronic switch which perform the same functions and can be used interchangeably throughout Systems I and II.

Relay control 7301 is the same symbol and the same circuit shown in FIGS. 29 and 71. Electronic switch 7302 is the same symbol and circuit shown in FIGS. 53 and 87. Bus 7303 corresponds to bus 7306, bus 7304 to bus 7307 and bus 7305 to bus 7308. A negative control signal on bus 7305 will establish a conducting path between buses 7303 and 7304 and in the equivalent electronic circuit a negative control signal on bus 7308 will establish a conducting path between buses 7306 and 7307.

FIG. 74 shows an electromechanical single pole double throw switch and an equivalent electronic circuit which can be used interchangeably throughout Systems I and II. They are extensions of the circuits shown in FIG. 73.

Bus 7401 corresponds to bus 7405, bus 7402 to bus 7406, bus 7403 to bus 7407 and bus 7404 to bus 7408. When the control signal on bus 7404 is positive there will be a signal path between bus 7401 and 7402 and when the control signal on bus 7404 is negative there will be a signal path between buses 7401 and 7403.

Bus 7408 is connected to the control of diode switch 7411 and when it is positive the diode switch will not conduct. Bus 7408 is also connected through a resistor to the base of npn transistor 7409 and when bus 7408 is positive this transistor will conduct and its collector will be negative. Bus 7412 connects the collector of transistor 7409 to the control of diode switch 7410 and will make the switch conductive at this time. Thus when bus 7408 is positive there will be a conducting path between buses 7405 and 7406. When bus 7408 is negative transistor 7309 will be cut off and its collector will be positive which will make diode switch 7410 nonconductive. The negative control signal on bus 7408 will make diode switch 7411 conductive and establish a conducting path between buses 7405 and 7407.

Switched analog signal inverter (FIG. 75)

The switched analog signal inverter illustrated in FIG. 75 is utilized to accomplish a switched inversion of an area balanced analog signal. Referring to FIG. 75 the output voltage $E_o$ on bus 7513 will be equal to the input voltage $E_i$ on bus 7501 at all times when control input 7508 of diode switch 7507 is positive and will be equal to the negative of the input voltage $E_i$ whenever control input 7508 of the diode switch is negative. Diode switch 7507 is the same type shown in FIGS. 87 and 53 and described in connection with those figures.

Input voltage $E_i$ appearing on bus 7501 is applied to the primary winding of transformer 7502. The secondary winding has twice the number of turns as the primary and is center tapped. The center tap of the secondary winding is connected to ground thus producing voltage $-E_i$ on bus 7503, with respect to ground, and voltage $E_i$ on bus 7506. The voltage $-E_i$ appearing on bus 7503 is applied to the input of high gain inverting amplifier 7511 through resistor 7509. Negative feedback from the amplifier output to the input is provided through resistor 7512 producing the conventional summing amplifier as described in Electronic Analog Computers, second edition, Korn and Korn, pages 13, 14, 15, and 16. Resistors 7509 and 7512 are equal in value producing a gain from bus 7503 to the amplifier output on bus 7513 of precisely minus one, thus with diode switch 7507 open the output $E_o$ on bus 7513 is $-1(-E_i)$ or $E_i$.

Resistor 7510 is chosen equal to one half the value of resistor 7512 such that the gain from the action of diode switch 7507 and resistor 7510 to the output of the amplifier on bus 7513 is precisely minus two.

Thus, when a negative voltage is applied to bus 7508 diode switch 7507 will conduct and amplifier 7511 will have inputs through resistors 7509 and 7510 and the resultant voltage from this summation on output bus 7513 will be $-E_i$.

The transformer secondary windings are loaded with resistors 7504 and 7505 to minimize the effect of switching.

Digital-to-analog converter (FIG. 52)

The digital-to-analog converter illustrated in FIG. 52 serves to convert a binary number presented in parallel to an electrical resistance analog whose conductance is proportional to the value of the binary number.

The binary number is presented in parallel on buses 5202, 5205, 5208, 5211 and 5214. Each input bus controls a high speed electronic switch of the type shown in FIGS. 87 and 53 and whose operation is described in connection with those figures. A switch is made conducting if the binary digit on its input is a one and is nonconducting when that digit is a zero. Associated with each electronic switch is a resistor whose value of conductance is proportional to the significance of the bit on the input bus controlling that switch. When a switch is conducting it establishes a current path from bus 5216 through the electronic switch and its associated resistor to bus 5219. Since these paths are all in parallel, the conductance between buses 5216 and 5219 is the sum of the conductance of all the paths.

Referring to FIG. 52, assume that the most significant bit is connected to bus 5202 which controls electronic switch 5201 and therefore the current through its associated resistor 5203. Also assume that the second most significant bit is connected to bus 5205 and the third most significant bit is connected to bus 5208 which controls the current through resistors 5206 and 5209, respectively. If the value of resistance 5203 is R, then the value of resistor 5206 will be 2R and that of resistor 5209 will be 4R. The value of a resistor associated with an input bit is twice the value of the resistor associated with the next most significant bit.

If a voltage E is impressed on bus 5216 and the binary number presented is N, the total current I on bus 5219 may be expressed as:

$$I = KNE \qquad (1)$$

where $K = 1/R_m$ and $R_m$ is the value of resistor 5215 which is associated with the least significant bit input.

In many applications of this circuit the voltage on bus 5216 is a reference voltage and the current on bus 5219 is then proportional to the binary number input. In other applications the voltage on bus 5216 may vary and the current on bus 5219 is then proportional to the product of the voltage on bus 5216 and the binary number input.

Reversible binary counter (FIG. 55)

FIG. 55 shows flip-flops 5502, 5503, 5504 and 5505 connected as a reversible binary counter. These are the same type flip-flops shown in FIGS. 30 and 90 and the counter circuit is a type well known in the industry. The input is bus 5501, the add-bus is bus 5506 and the subtract bus is bus 5507. If the add-bus is held at a negative potential then a pulse on bus 5501 will increase the count by one and conversely if the subtract-bus is held negative the pulse will decrease the count by one. The two buses 5507 and 5506 are connected so that one is always at a positive potential and the other at a negative potential.

Bus 5508 is connected to the reset input of each stage so that a pulse on this bus will cause all stages to be set to the A state. Binary one is represented by the B stage and binary zero by the A state.

All the flip-flops have their E and E' inputs connected together and are self primed. When connected in this manner a pulse on the E and E' connections will always cause the flip-flop to change state. The E and E' connection receives a pulse from the preceding stage through a gate network with the exception of the first stage. During adding, the pulse is taken from the A output and during subtracting from the B output of the previous stage. Gates are used in making the selection. For example, the E and E' input for flip-flop 5503 is connected to the output of OR gate 5509. The two inputs to the OR gate are the outputs of AND gates 5510 and 5511. Bus 5507 and the B output of flip-flop 5502 are the inputs to AND gate 5510, therefore, when the subtract bus has a signal and when flip-flop 5502 goes to the B state there will be an output from AND gate 5510 which will be passed through OR gate 5509 to the E and E' input of flip-flop 5503. In a similar manner when the add-bus has a signal and flip-flop 5502 goes to the A state, a pulse will be placed on the E and E' input of flip-flop 5503.

The method of using outputs from one side of the flip-flop for additions and from the other for subtraction is well known to those acquainted with the art of digital computers.

Stability in learning of steering ( FIG. 109)

The use of counts $N_1$ of the number of times of utilization of a steering G-memory, the counts $N_2$ of the number of times of utilization of the next selected G-memory, has been referred to hereinabove. FIG. 109 illustrates the feedback connections involved in this type of operation. The steering counter and registers and detailed circuitry are illustrated in FIG. 64 and described in connection with that figure. In FIG. 109 unit 10901 represents the counter giving $\tfrac{1}{2}N_1$, and 10902 represents the counter which gives $N_2$. The determination is made in pairs of successively utilized G's to correct the first occurring member of the pair. In FIG. 109 the input signal at 10903 is applied directly to 10901 to count the number of times of use of the corresponding G-memory. The next selected G-memory causes 10902 to count every time it is operated, which takes place from bus 10903 to the input of correlator 10904, to bus 10905, to comparator 10906, and then to 10902. The number of times of operation $N_2$ is under control of the conditioned memory 10907 and a stabilizing steering short-term memory 10908 which applies its output to bus 10909 and to comparator 10906, whereas 10907 applies its output to bus 10910 and thence to the correlator. Amplifier 10911 generically represents the gain existing in the loop, while subtractor 10912 takes the difference of the output on bus 10913 and the output on bus 10914 and directs it to 10911 via bus 10915. The output of 10911 feeds into units 10908 and 10907.

The stability of learning of the steering system is determined as follows: In the first analysis the difference $\tfrac{1}{2}N_1-N_2=E$ will be used without the divisor $\tfrac{1}{2}N_1$. For this case the circuitry shown in FIG. 64 would have no feedback network 6458 used for dividing by $\tfrac{1}{2}N_1$. In FIG. 109 connections 10920 and 10916 would conduct, and connection 10917 would be open. Let $\tfrac{1}{2}N_1$ be the driving signal at 10913. Then $\tfrac{1}{2}N_1-N_2=E(t)$ is the error of the counts, wherein $t$ is the time of measure which corresponds to the number of signals actually applied to the machine. This error E is amplified by 10911 and is combined with other terms and applied to the conditioned memory to change it in accordance with the method and means set forth in other sections herein. The action of changing the conditioned memory is an integrating one since the memory is essentially an accumulator adding successive error functions. Block 807 in FIG. 8, which is applicable to all systems herein, shows a summation sign for the accumulator action. This can be replaced by an integral sign if we consider the smoothening action of the statistical process over a long period of time. The gain of 10911 and the gain constant due to the error parameter C and other constants can be lumped into one positive constant $K_1$ as the constant which is applicable to the conditioned memory 10907. Its output on 10910 can then be considered as being equal to $K_1 \int E(t)dt$. There is a short-term memory consisting of a digital number, which has no additive, accumulating or integrating action, and which is detailed in FIG. 64. This short-term memory carries sign information and may consist of one or more bits per positive and negative sign, and it gives information on E and applies it directly to the comparator. A second constant which includes the gain A of 10911 and of the circuitry associated with 10908 can be lumped as a positive $K_2$, and the $K_2E$ is the output of 10908 on bus 10909 to 10906. The two inputs of the comparator are combined and applied to the $N_2$ counter 10902 which acts as a second integrator. The transfer constant of 10902 is taken as unity herein since the constants mentioned for 10907 and 10908 can be selected to absorb it. The final output on 10914 will then be $N_2 \int [(K_1 \int Edt)+K_2E]dt$. Since $\tfrac{1}{2}N_1-N_2=E(t)$, then $E+N_2=\tfrac{1}{2}N_1$, and $$E+\int[(K_1 \int Edt)+K_2E]dt=\tfrac{1}{2}N_1$$

wherein $\tfrac{1}{2}N_1$ is the driving force and is a function of time $\tfrac{1}{2}N_1(t)$; and $\tfrac{1}{2}N_1$ is the reference count with the time variable being measured only when there is an actual input. Make $\tfrac{1}{2}N_1(t)=t$ itself. If we differentiate the last integral equation twice we obtain, $$\frac{d^2E}{dt^2}+K_2\frac{dE}{dt}+K_1E=\tfrac{1}{2}\frac{d^2}{dt^2}N_1(t)=0 \qquad (1)$$

In this analysis the objective is to determine the gross stability conditions of the learning process in steering. The solution of (1) is $$E=C_1e^{\alpha_1 t}+C_2e^{\alpha_2 t}$$

where $\alpha_1=-\tfrac{1}{2}K_2+\sqrt{\tfrac{1}{4}K_2^2-K_1}$ $\alpha_2=-\tfrac{1}{2}K_2-\sqrt{\tfrac{1}{4}K_2^2-K_1}$ This indicates that the system will have oscillatory action unless $\tfrac{1}{4}K_2^2 \geq K_1$. If $K_2=0$ the system is unstable. That is the reason for the insertion in the system of the steering short-term memory unit 10908 which supplies the $K_2$ constant. The constants $C_1$ and $C_2$ determine initial conditions. The constants $K_1$ and $K_2$ can be chosen to avoid unstable or undesirable oscillatory action by control of the gain of the conditioned memory portion of the loop in relation to the gain of the steering short-term memory unit in which a resistor is provided designated 5648 in FIG. 56 whose value sets the gain of 10908 in FIG. 109. The above solution of Equation 1 and interpretation thereof are valid only when a long period of time is considered in which the discrete processes are smoothened and approximated by the formulas. It can be seen from the solutions that, with the appropriate choice of values of $K_1$ and $K_2$, E will converge asymptotically to zero and in a short period of time will attain values close enough to zero to satisfy the requirements. This indicates that $\frac{1}{2}N_1 = N_2$ substantially, which is the desired objective of steering $\frac{1}{2}$ of the signals which are processed by the G-memory associated with the count $N_1$ to the G-memory associated with the count $N_2$.

Next the condition will be analyzed wherein $$\frac{\frac{1}{2}N_1 - N_2}{\frac{1}{2}N_1} = E$$

For this, the feedback network 6458 in FIG. 64 would be connected as shown. In FIG. 109, connections 10916 and 10920 would be disconnected, and connection 10917 would be made conductive, while unity voltage, or a fixed reference voltage would be applied to bus 10913 which connects directly into subtractor 10912. Under these conditions the steering counter 10902 supplies its count $N_2$ to divider 10918 via bus 10919 to act as dividend, and unit 10901 supplies its count to divider 10918 to act as divisor. The quotient $N_2/\frac{1}{2}N_1$ is applied through connection 10917 to bus 10914 and to subtractor 10912 which subtracts it from unity on bus 10913. The operation is represented by $$1 - \frac{N_2}{\frac{1}{2}N_1}$$

and is equivalent to $$\frac{\frac{1}{2}N_1 - N_2}{\frac{1}{2}N_1}$$

Then it follows that, $$t \cdot N_2 = t \cdot E(t) \tag{2}$$

With the same expression for $N_2$ involving the double integrals as is given above but now substituted in (2), there is obtained $$t \cdot E + \int [(K_1 \int E \, dt) + K_2 E] \, dt = t \tag{3}$$

Differentiation (3) twice and rearranging terms will yield $$t \frac{d^2 E}{dt^2} + (K_2 + 2) \frac{dE}{dt} + K_1 E = 0 \tag{4}$$

This differential equation can be solved by a power series. The indicial equation has roots $$m_1 = 0 \text{ and } m_2 = -(K_2 + 1).$$

With $m_1$, one solution is $$Y_1 = \left[ 1 - \frac{K_1 t}{(K_2 + 2)} + \frac{(K_1 t)^2}{1 \cdot 2 (K_2 + 2)(K_2 + 3)} - \frac{(K_1 t)^3}{1 \cdot 2 \cdot 3 (K_2 + 2)(K_2 + 3)(K_2 + 4)} + \cdots \right] \tag{5}$$

and with $m_2$ the other solution is $$Y_2 = t^{-(K_2 + 1)} \left[ 1 - \frac{K_1 t}{(-K_2) \cdot 1} + \frac{(K_1 t)^2}{(-K_2)(1 - K_2) 1 \cdot 2} - \frac{(K_1 t)^3}{(-K_2)(1 - K_2)(2 - K_2) 1 \cdot 2 \cdot 3} + \cdots \right] \tag{6}$$

For all $K_2 > 0$ but so long as $K_2$ is not a positive integer these solutions are distinct and a complete solution is $$E(t) = A Y_1 + B Y_2$$

The terms in the brackets converge absolutely for all values of $t$. In the machine the maximum value of $t$ is the maximum count of the counters of $\frac{1}{2}N_1$ and $N_2$. If $K_1$ and $K_2$ are large compared to the maximum value of $t$ then for (5) we can set $pK_2 = K_1$ and $Y \simeq e^{-pt}$ which becomes small as $t$ increases; that is, the error is reduced to a low value. Expression (6), under the same assumption, and for the positive powers of $t$ wherein $K_2 + 1 \geq n$, is given approximately by $$\frac{t^{-w}}{C_1} e^{-pt}$$

wherein $0 < w < 1$ and $K_2 + 1 = K_{20} + w + 1$, where $K_{20}$ is a positive integer and $C_1 = (-K_2)(1 - K_2)(2 - K_2) \ldots (n - K_2) \cdot 1 \cdot 2 \cdot 3 \ldots (n+1)$. The approximate expression for (6) becomes small as $t$ increases from the initial conditions, and is small also because of the large $C_1$ divisor. As a result of the stated conditions expression (7) will reduce to a very small error as $t$ increases.

For positive integer values of $K_2$, $Y_2$ is equivalent to $Y_1$ and another pair of solutions can be found of the form $$E = (A_0 + B_0 \log t) Y_3 + B_0 t^{-(K_2+1)} \frac{\partial Z}{\partial M} \qquad M = M_2 \tag{8}$$

wherein $Y_3$ is similar to $Y_2$ but with terms eliminated with powers of $t$ less than $K_2 + 1$, and withi finite value at $t = 0$, and Z is equivalent to the term in the brackets of (6) but with the M values inserted for differentiation before substitution of $M = M_2$. Under the same assumptions of large $K_2$ compared to the maximum value of $t$, the terms of (8) may be treated as (5) and (6) since a large divisor such as $C_1$ is involved, with the $(n - K_2)$ cancelled out, and E will be reduced as $t$ increases up to the maximum value. The constants A, B or $A_0$, $B_0$ are determined by initial conditions. One of these constants can be equal to zero. In either (1), (7) or (8), by a suitable choice of $K_1$ and $K_2$ the error E will be reduced to a sufficiently low value as the teaching of steering progresses which will make $N_2$ approximately equal to $\frac{1}{2}N_1$.

Amplitude normalizing (FIGS. 42, 43, and 44)

FIGS. 42, 43, and 44 are general diagrams of linear systems illustrating various methods of normalizing amplitude. In FIG. 42 the input signal on bus 4201 is applied to the energy content circuit 4202 which computes $$U_i = \int_{t_1}^{t_2} F_i^2(t) \, dt$$

This is fed via bus 4203 to unit 4204 which computes the square root of $U_i$ giving $\pm \sqrt{U_i}$. Switch 4205 selects $\pm \sqrt{U_i}$, the selection being with both signs. That is, 4206 represents two wires, one with $+\sqrt{U_i}$ and the other with $-\sqrt{U_i}$. These values are applied to code assignment unit 4207 which is the teaching unit proper in which either $+\sqrt{U_i}$ or $-\sqrt{U_i}$ or zero from bus 4229 is selected according to the assignment. Input signal $F_i(t)$ is also applied to unit 4208 which takes the integral of the absolute value of $F_i(t)$ as $$\int_{t_1}^{t_2} |F_i(t)| \, dt = H_i$$

Two wires 4209 connect $+H_i$ and $-H_i$ respectively to switch 4205. The latter can be turned to select both $\pm H_i$ and place them on 4206 which supplies both of these separately to unit 4207 in which one or the other is selected according to the assignments. Unit 4207 will place on bus 4210 either $+\sqrt{U_i}$, $-\sqrt{U_i}$, $+H_i$, or $-H_i$, or zero which is applied to the subtractor 4211 which computes the error $e_i$. Both of the plus and minus reference voltages are applied to comparator 4212 which compares the actually produced voltage $V_i$ on bus 4228 with the reference voltages and produces a digitalized output on a set of leads generally designated as 4227, marked output, if $V_i$ lies within certain predetermined ranges of the reference voltages from leads 4206. Input signal $F_i(t)$ and memory signal $G(t)$ from memory unit 4213 and bus 4214 are multiplied by multiplier 4215 producing $F_i(t)G(t)$ on bus 4216 which, in turn, is applied to integrator 4217 which produces $$V_i = \int_{t_1}^{t_2} F_i(t)G(t)dt$$

and places $V_i$ on bus 4228. The latter feeds the subtractor and comparator. If the various assignable values $+\sqrt{U_i}$, $-\sqrt{U_i}$, $+H_i$ and $-H_i$ are generally designated as $B_i$, then the subtractor produces $B_i - V_i = e_i$ and places this on bus 4218 which supplies it to attenuator 4219. The latter unit sets the error parameter C and multiplies it with $e_i$ to produce $C \cdot e_i$ on bus 4220. In turn, $C \cdot e_i$ is multiplied by multiplier 4221 with $F_i(t)$ to produce $F_i(t)C \cdot e_i$ on bus 4222. The latter is applied to divider 4223 which accepts divisor signal from bus 4203 and produces $$\Delta G_i(t) = \frac{F_i(t) \cdot C \cdot e}{U_i}$$

on bus 4224. This is applied to adder 4225 which produces $G^*(t) = G(t) + \Delta G_i(t)$. The adder receives $G(t)$ from bus 4214 and memory unit 4213. $G^*$ is applied on bus 4226 from which it is delivered to G-memory 4213 to replace $G(t)$ therein. The system of FIG. 42 is invariant with respect to amplitude changes of $F_i(t)$ because if $F_i(t)$ is multiplied by $K \cdot F_i(t)$, where K is a positive number no further learning is needed to recognize the stretched or contracted signal. This follows from $$\int_{t_1}^{t_2} K \cdot F_i(t) \cdot G(t) dt = \pm \sqrt{\int_{t_1}^{t_2} K^2 F_i^2(t) dt} = \pm K\sqrt{U_i}$$

This reduces to $$\int_{t_1}^{t_2} F_i(t) \cdot G(t) dt = \pm \sqrt{U_i}$$

since the K's cancel. That is, the response is $\pm\sqrt{U_i}$ according to the learning regardless of K. If $H_i$ is used instead, then $$\int_{t_1}^{t_2} K \cdot F_i(t) \cdot G(t) dt = \pm \int_{t_1}^{t_2} K \cdot |F_i(t)| dt = \pm K \cdot H_i$$

This reduces to $$\int_{t_1}^{t_2} F_i(t) \cdot G(t) dt = \pm H_i$$

according to the learning regardless of K. Some assignments $B_i = 0$.

In FIG. 43 the input signal $f_i(t)$ on bus 4301 is applied to energy content computer unit 4302 to produce $U_i$ and to divider 4303. Unit 4302 feeds 4304 to take the square-root of $U_i$. The three units 4302, 4303, and 4304 operate in a manner similar to the system described in FIG. 76. On bus 4305 an amplitude normalized signal $F_i(t)$ appears which is constant for variations of the amplitude of those signals $f_i(t)$ on 4301 which differ only by a multiplicative constant. In FIG. 43 the reference voltage of plus unity or minus unity is preferred and supplied by 4306 and delivered on separate leads to code assignment unit 4307 in which either $(+)$ or $(-)$ or zero from bus 4311 is selected. The operation of the system of FIG. 43 is the same as that described for FIG. 42 with respect to all the correspondingly designated units which are similar. The difference is the fact that there is no divider between multiplier 4308 and adder 4309. The reason for this is that normalizing is present at 4305. If the error function $$\Delta G_i(t) = \frac{F_i(t)C \cdot e_i}{U_i}$$

of FIG. 42 is examined, and if $$F_i(t) = \frac{f_i(t)}{\sqrt{U_i}}$$

is substituted, and $B_i = \pm 1$, so that $\pm 1 - V_i = e_i$, then $$\frac{F_i(t)C \cdot e_i}{\int_{t_1}^{t_2} \frac{f_i^2(t)}{U_i} dt}$$

which is the error function placed on bus 4310, so that a divider is unnecessary between units 4308 and 4309.

In FIG. 44 input signal $f_i(t)$ is applied on bus 4401 which is applied to units 4402, and 4403 to compute $H_i$ and $U_i$ respectively. Then $H_i$ on 4404 is applied to 4405 which divides it into $f_i(t)$ from 4401. The quotient signal is $F_i(t)$ on bus 4406. $H_i$ is also applied to 4408 to compute $H_i^2$ which is placed on 4407 and applied to divider 4410 which also receives $U_i$ from bus 4409. Divider 4410 computes $U_i/H_i$ and places it on bus 4411 which applies it to divider 4412. In other respects the units in FIG. 44 operate in the same manner as the corresponding units in FIGS. 42 and 43. The divider 4412 operates in the same capacity as divider 4223 of FIG. 42. If $$\Delta G_i(t) = \frac{F_i(t)C \cdot e_i}{U_i}$$

of FIG. 42 is again examined as the error function on bus 4224, and if the substitution is made that $$F_i(t) = \frac{f_i(t)}{H_i}$$

then there is obtained $$\frac{F_i(t)C \cdot e_i}{U_i/H_i^2} = \frac{f_i(t)C \cdot e_i \cdot H_i}{U_i}$$

the left hand member of which appears in 4412 of FIG. 44.

In FIGS. 42, 43, and 44, the attenuator unit which multiplies by C can be placed just before the unit which adds $\Delta G_i(t)$ or after the multiplier such as 4221, or on the bus 4201 before it feeds into 4221, for example. Detailed circuits for the C parameter adjustment are given in FIGS. 99 and 100. Other circuits of these figures are detailed in various sections of the specification herein.

Serial connection of learning machines (FIG. 63)

High efficiency in the use of memory capacity can be achieved in the serial connection of learning machines in which the coded output of one machine is transformed into a $T(t)$ function of time and the $T(t)$ function is presented as input to another learning machine, whose coded output in turn can be processed similarly and applied to another machine, and so on, up to a final machine in the series. The $T(t)$ transformation may be produced in a manner similar to that described for the production of the $T_{rk}(t)$ in connection with FIG. 54. The serial use of learning machines in this manner may be done in either mode A or mode B operation.

In FIG. 63 an input signal sequence can be applied at bus 6301. Learning machine #1B in mode B marked 6302 con produce an output code when a sequence of signals, such as a sequence of words or a sequence of signal segments of a sentence, for example, is produced. The output code on buses 6303 are applied to the $T(t)$ generator 6304 which produces a corresponding $T(t)$ as a function of time, which uniquely represents the code on buses 6303, and places this on bus 6305. The $T(t)$ signal on the latter bus is applied as input to the learning machine #2B in mode B designated as 6306. This machine, in turn, produces a coded output on buses 6307 which are transformed as a $T(t)$ function of time in 6308 and this is applied to bus 6309. This process is repeated for as many machines as is desirable up to the $n^{th}$ learning machine #nB, 6310 in mode B which produces a coded output on buses 6311. The latter may be used as output utilization buses, if necessary. The coded output on buses 6311 will represent the coded meaning of many sequences of sequences of input signals.

In mode B input sequence recognition the degrees of freedom of the conditioned memory needed does not depend upon the length of any given sequence nor the number of signal segments in the sequence, but it depends upon the total number of sequences or sequence classes which the machine must recognize. If learning machine #1B produces output codes which represents short signal sequences, the total number of codes equals the total number of short signal sequences which are coded, and the memory capacity of machine #1B depends upon this number. The output of the $T(t)$ generator 6304 produces a sequence of $T(t)$ functions and each $T(t)$ function represents a sequence of signals into machine #1B. Therefore, a sequence of $T(t)$ functions into machine #2B represents a sequence of sequences. Machine #2B will produce output codes on buses 6307 in which each code represents a sequence of sequences of signals into machine #1B. For example, if the output codes of machine #1B each represents a spoken sentence, then each output code of machine #2B can represent a specific spoken paragraph. The memory capacity of machine #2B need cover only the number of different paragraphs which must be distinguished from each other.

While sentences and paragraphs are cited as illustrations, it is to be understood that various other subdivisions can be made based upon the meaningful categories required. The manner in which the machine may segment a continuous or nearly continuous signal is an internal machine function and does not limit the proper output codes which should be produced. Machine #2B is not required to carry memory capacity regarding each sequence of machine #1B, but machine #2B must have memory capacity to recognize those sequences of sequences of machine #1B which are meaningful according to the use or needs. In the same manner other machines in the series will require memory capacity to recognize sequences of sequences of sequences, and so on. The final codes on buses 6311 can represent a tremendous amount of concentrated and organized information. The details of the information are carried by preceding machines in the sequence. The number of signal segments need not be the same per sequence in each machine. The first machine receives the signals directly from the environment, and the other machines in the sequence do not, but the latter must learn to recognize the significant sequences out of the total possible. It may happen that some of the sequences coded in a machine in a later stage may involve less actual signal segments or units than a machine in an earlier stage in the sequence.

In order to simplify the calculations let us assume that each machine codes a sequence of five signal segments of the preceding machine, and the first input signal segments will not be treated as information units, but each coded output of machine #1B will be considered as a 1st order information unit. Assume that there are five machines in a sequence. Each coded output of the second machine is a 2nd order information unit and represents 5 outputs of the first machine or five 1st order information units. Each coded output of the third machine is a 3rd order information unit and represents 5 outputs of the second machine and 25 1st order information units. Each coded output of the fourth represents 125, 1st order information units, and each coded output of the fifth and final machine represents 625 1st order information units. If the last machine must have 1000 distinct coded outputs, then 625,000 1st order information units are involved in the last machine but its memory capacity need only take care of 1000 distinctions. If each preceding machine must have a capacity of 1000 output codes, the total capacity would be 5000 for all the machines with corresponding conditioned G-memory capacity required.

It must be remembered that while each machine can produce 1000 output codes the number of permutations of the 1000, $T(t)$ signals applied as input to each machine is very large, but only 1000 of the possible ones are actually coded because these are the ones which actually occur and have useful significance. Since, by definition of the example, the last machine of the sequence need not be required to learn more than 1000 different coded representations of 1000 input sequences out of the total possible, the preceding machines should not be expected to have greater capacity, in this example. However, the capacity of each machine need not be the same. It might be expected to increase in the later machines in the series. Nevertheless, by organizing information hierarchically in information units of information units according the actual needs and use, it is possible to effect great savings in the total memory capacity required.

In the above example there is a total of 5000 information units of various orders. If each of the information units above the first order also carried its detailed structure consisting of all lower order information units, then the combined memory capacity requirements would be respectively for each order: 1000; 5000; 25,000; 125,000 and 625,000 which totals 781,00. This is the way information is ordinarily stored in dictionaries, books, and conventional data processing devices. This is to be contrasted in the example with information storage requirements of only 5,000 units for 5 machines in the B mode series of FIG. 63. In a book, for example, every word is spelled out, every sentence contains every spelled word, every paragraph contains every sentence with every word spelled, and so on for pages, sections, and the whole book.

In FIG. 63 the various coded outputs such as 6303, 6307, and 6311 may be used for any output utilization purpose. Coded output 6311 can be applied to unit 6312 which produces a $T(t)$ as a function of time. Then it can be placed on bus 6313 which serves as input to a second series of learning machines each connected in mode A operation. The first member of the second series is learning machine #1A marked 6314 which accepts a single input from bus 6313 and converts it into a sequence of codes on buses 6315. Each of the codes in 6315 is converted into a corresponding $T(t)$ function of time by unit 6316 which places $T(t)$ on bus 6317. There is a unique $T(t)$ for each code produced, so that a whole sequence of $T(t)$ function will be placed on bus 6317 when only one $T(t)$ function is applied on bus 6313. In turn, each sequence on 6317 is applied to learning machine #2A marked 6318. For each $T(t)$ into 6318 a sequence of codes is produced on buses 6319 which are applied to unit 6320. The latter produces a corresponding $T(t)$ function of time for each code and delivers it to bus 6321. This operation can be continued for other machines until learning machine #$n$A is reached which produces a sequence of output codes on output utilization buses 6323 for each $T(t)$ signal applied to its input. Unit #$n$A is designated 6322.

In the second series of learning machine in FIG. 63, all of which are in mode A, a single input signal function of time applied to its input will cause a very long series of output codes to be produced on buses 6323. This second series of machines in code A also produces great economies of requirements of memory capacity. This may be understood by the following example: Let there be 4 machines and the 4th machine can produce 64 different alphanumeric coded output responses on buses 6323 which can be used for print-out of spelled words and numerals. Let the 4th machine or #4A have a capacity to recognize 1000 words. If there are on the average of 6 letters and space per word then the conditioned memory of the #4A machine must be of a size to recognize 6000 different information units of the 1st order. This is true because each letter of a word is a forced response.

When a $T(t)$ function is applied to the input of machine #4A a sequence of codes will be produced at 6323 to spell each letter of a word. If another $T(t)$ function is applied to the input then another series of codes will be produced to represent each letter of another word. If a whole sequence of T(*t*) functions is applied then a sequence of coded spelled words will be produced to yield a sentence on the output 6323 consisting of a sequence of codes each corresponding to a letter. If machine #3A has the same capacity as #4A, namely 6000 different information units but of the 2nd order, then each T(*t*) signal applied to the input of #3A may produce, for example, a series of six T(*t*) input signals into #4A, each of which can cause a word print-out. The six words can represent a sentence. Then each T(*t*) applied to #3A produces a spelled out sentence at 6323. There can be 1000 of such T(*t*) applied to #3A. In a similar manner each T(*t*) applied to the input of #2A produces six T(*t*) input signals into #3A each of which in turn produce six T(*t*) into the input of #4A. Then each T(*t*) into #2A produces a sequence of spelled out sentences at 6323 or a paragraph.

In a similar manner each T(*t*) applied at the input of #1A will cause a whole page to be spelled in code or printed if the codes from 6323 are applied to an electric typewriter, for example. The information units of #2A are of the 3rd order, and those of #4A are of the 4th order. It is assumed that the capacity of each machine is 6000 of its respective information units. Then the combined memory requirement of the 4 machines is 24,000 information units. A ratio of six-to-one per machine of output sequence codes per input signal is assumed. Machine #1A can recognize 1000 received input signals from bus 6313 with 6324 conducting. Machine #1A could also receive input signals from the environment from 6325 which would be conducting while 6324 would be open. Each input signal into #1A spells out a whole page at output utilization buses 6323 in which each page is made up on the average of 6 paragraphs, and each paragraph is made up of 6 sentences, and each sentence is made up of 6 words, and each word is made up of 6 letters and space, on the average. This equals 1296 letters per page, so that each input into 6314 or #1A can cause the print-out of 1296 letters. The 1000 recognizable inputs into #1A collectively can cause the print-out of 1,296,000 letters in meaningful order.

The four learning machine units of FIG. 63 in mode A connected in series together should have a memory capacity to deal with the recognition of 24,000 information units, but because of the hierarchical organization of the information in each of the machines in relation to the others, 1,296,000 forced responses of letters can be produced on the output 6323 by inputs to #1A.

The ratio of six-to-one for each machine was assumed by way of example only. Each machine may have a ratio which differs from the others, and not all output code sequences in mode A in the same machine need consist of the same number of component codes. In FIG. 63 the buses 6317 and 6321 and similar buses may serve as independent inputs. This also applies to buses 6305 and 6309. When bus 6313 is connected to machine 6314 via connection 6324 the mode B series of machines is connected to the mode A series. Since the output codes at 6311 contain highly concentrated information which corresponds to great detail in input signal structure at 6301 even if the codes of 6311 are relatively simple, it is appropriate that 6313 serves as input to 6314 because the mode A series will produce a highly detailed output response at 6323 from the signal at 6311 and 6313. The overall memory requirement for the combination of the two sets of machines in both modes is very low in relation to the large mass of organized detailed information which is processed. While the various machines in FIG. 63 have been shown as separate units, this is done by way of example only, for the various machines can be incorporated into one machine in which the functions of the separate machine units are performed by common time shared equipment. In one preferred adaptation, the major equipment which is not time shared would be the G-memories of the various machine units.

While I have described above the principles of my invention in connection with specific apparatus, it is to be clearly understood that this description is made only by way of example and not as a limitation to the scope of my invention.

I claim:

1. A signal classifying system comprising, front end input means having circuitry to receive a large plurality of meaningful multidimensional vector signals each comprised of $n$ vector component values of ranging magnitude, reference function supply means providing at least one multidimensional vector memory function comprised of $n$ vector component values by which said signals are selectively resolvable into separate gross recognition classes of which each includes ones of said signals of different significance, scalar signal computing means coupled to said input means by circuit means which is transmissive of ranging magnitude values and is characterized by circuitry adapted to deliver to said computing means as separate values the said $n$ values of any received one of said signals, said computing means being jointly controlled by said $n$ delivered signal values and by said $n$ values of said function to perform product-forming and summing operations on such values for all magnitudes thereof so as to develop a scalar signal of a value determined by those operations, acceptance range discriminator means definitive of simultaneous nonoverlapping alternative acceptance ranges for the scalar signal value and responsive to selective concurrence of that value with each of said different ranges to distinguishably and energetically manifest such different concurrences, and register means selectively energized in response to each of said distinguishably manifested concurrences to provide a held output indicative for different ones of those concurrences of a resolving by said function of received signals into different selected ones of said gross recognition classes.

2. A system as in claim 1 in which said discriminator means is definitive of two such ranges of which one and the other correspond to ranges of value for such scalar signal which are of different polarity relative to a reference value for that signal, and in which said register means is responsive to each polarity of said signal when the value thereof is in the corresponding range to provide different held outputs for different polarities of such signal.

3. A system as in claim 1 in which said discriminator means is definitive of simultaneous non-overlapping alternative acceptance ranges for magnitude values of said scalar signals, each of said ranges corresponding to a respective one of said gross recognition classes, and in which said discriminator means is interposed between sadi scalar signal computing means and said register means and includes circuit means to reject scalar signal magnitude values outside said ranges so as to render said register means responsive only to values of such signal which are within those ranges.

4. A system as in claim 3 in which each of said acceptance ranges is a range of permitted variation in magnitude from an adjustable magnitude level, said system further comprising, means responsive to the vector component values of any received one of said vector signals to form a level control signal which is a measure of the vector magnitude of the entire received signal, and means responsive to said control signal to adjust the level of the acceptance range for the scalar signal derived from the received signal so as to shift the magnitude values included in such range in accordance with said vector magnitude.

5. A system as in claim 1 in which said scalar signal computing means comprises linear correlator means providing a scalar signal which is the inner product of the received vector signal and the vector memory function.

6. A signal classifying system comprising, source means of a plurality of multidimensional vector signals representable by corresponding vectors which have a common fixed origin point and of which any two have a positive inner product, said vectors being sub-divisible into at least two vector groups each corresponding to a respective one of two different gross recognition classes for said signals, the vectors in one of said groups being each perpendicular to a respective one of a plurality of hyperplanes spaced from said original point in the direction of said vectors, and the vectors in the other of said groups being each perpendicular to a respective one of another plurality of hyperplanes spaced from said original point in the direction opposite to that of said last-named vectors, reference function supply means providing a multidimensional vector memory function representable by a vector which has a fixed origin point the same as that of said signal vectors, and which terminates in a space separated from said origin point by at least one hyperplane from each of said pluralities of hyperplanes, said memory function being a selective resolver of said signals into said classes, scalar signal computing means coupled to receive said signals from said source means and jointly controlled by the values of a received one of said signals and by those of said function to supply at terminal means for one signal at a time a scalar signal of a value determined by said joint control, a plurality of branch output channels which are commonly in signal-coupled relation with said one terminal means, acceptance range discriminator means definitive of a plurality of simultaneous non-overlapping alternative acceptance ranges for the scalar signal value and operable in response to selective concurrences of such value with each of said different ranges to distinguishably and energetically manifest such different concurrences, there being one-of-one correspondence between said classes, ranges, and channels, and branch channel selector means energetically responsive to each of said distinguishably manifested concurrences to selectively and correspondingly energize each of said different channels so as to provide by the selected channel an energetic output indicative of a resolving by said function of the received signal into a selected one of said classes.

7. A system as in claim 6 in which each of said first-named vectors is of unit length to thereby be commensurate with a form of the corresponding vector signal wherein the vector component values of the signal are normalized in magnitude.

8. A signal classifying system comprising, input means for receiving one at a time a large plurality of meaningful signals, temporary storage means for any received one of said signals, reference function supply means providing a plurality of different memory functions, means to retrieve the received signal from said temporary storage means a plurality of times corresponding to that plurality of functions, scalar signal computing means jointly responsive at each retrieval to the values of the retrieved signal and to those of a different one of said functions to develop a sequence of scalar signals of which each is produced as a result of and corresponds to a respective one of said retrievals and multi-digit code-forming means providing a permutable output code having a sequence of digit positions each corresponding to a respective one of the scalar signals in said sequence, said code-forming means being responsive to each of such scalar signals to select for the corresponding digit position of the output code a digit determined by that signal and to thereby develop a particular output code which is representative of a classification for said received signal.

9. A system for classifying different non-uniform signals comprising, input means for receiving a large plurality of meaningful multidimensional vector signals, reference function supply means providing a hierarchy of ranks of multidimensional vector memory functions of which each is a selective resolver of said signals into separate gross recognition classes respective to that function and different for each function, and of which the number of functions per rank increases from rank to rank in the direction from higher to lower rank, a function of relatively higher rank being a resolver of a larger number of said signals in said plurality than a function of relatively lower rank, and a function of relatively lower rank providing greater inter-class resolution of the received signal than a function of relatively higher rank, classifying means by which any received one of said signals is classified by a plurality of effective classifying actions of which each corresponds to a respective one of said ranks and is provided from interaction of such signal with a function in that one rank, said classifying actions conjointly providing an output indicative of a classification for the received signal, and function selector means controlled by each such classifying action associated with a function in a rank having a next lower rank to select within that lower rank the function providing the effective classifying action associated with such lower rank.

10. A system as in claim 9 in which said meaningful signals and memory functions are each comprised of vector component values, and in which each signal-function interaction is effected by performance on the signal and function vector component values involved in that interaction of operations which are the same for all such interactions.

11. A system as in claim 9 in which said classifying means comprises, register means responsive to a separate indication of classifying significance received from each of said ranks to provide said output, each such significant indication from a rank being developed by an interaction of the received signal with a function in that rank, and means responsive to the significant indication from any rank having a next lower rank to render a selected one of the functions of that lower rank the source of the significant indication received from such lower rank by said register means.

12. A system as in claim 9 in which said classifying means comprises means to produce a time sequence of signal-function interactions progressing through said hierarchy of ranks in the direction from higher to lower rank, the received signal interacting in each rank with only one function in that rank and each such interaction providing a classifying indication from that rank for the received signal, and steering means responsive to the classifying indication from any rank having a next lower rank to select the function of that lower rank which is next interacted with the received signal.

13. A system as in claim 9 in which each rank of functions consists of $2^{y-1}$ functions where $y$ is the number of that rank in the hierarchy thereof, $y$ being equal to 1 for the highest rank.

14. A signal classifying system comprising, front end input means having circuitry to receive a large plurality of meaningful vector signals each comprised of $n$ vector component values which are many in number and comprise a value distribution characteristic of that signal, reference function supply means providing a plurality of memory functions of which each is comprised of $n$ vector component values which are many in number and comprise a value distribution of a configuration by which said signals are selectively resolvable on the basis of their whole respective value distributions into separate gross recognition classes, said classes being different from function to function and each including ones of said signals of different significance, scalar signal deriving means jointly controlled by any received one of said signals and by said reference function supply means to effect separate interactions of the value distributions of each of said functions with the full values of the value distribution of said received signal and to develop by such interactions a plurality of corresponding scalar signals of which each is rendered by the corresponding interaction into a particular one of plural states which are alternatively assumable by that scalar signal and are selectively determined therefor by the corresponding interaction and are comprised of a plurality of signal-recognition states, and a plurality of output stages each corresponding to a respective one of said scalar signals, and each being selectively energized by the corresponding scalar signal when in each of said signal-recognition states to conjointly develop a permutable output code comprised of separate held outputs of which each is derived from and only from a respective one of said scalar signals and is selectively indicative of the state thereof, said memory functions being selectively differentiated and interdependently related in respect to the gross classes into which each is adapted to resolve received signals so as to render different permutations of said output code indicative of a selective resolving by said functions of received signals into different ones of a plurality of recognition subclasses of which each is specific to ones of said signals of the same significance, the number of said recognition subclasses being greater than the number of said functions.

15. A system for classifying a plurality of different non-uniform signals each with components having values to distinguish each signal comprising, input means for said signals, initial classifying means for resolving different ones of said signals in accordance with the whole value distribution of all the components of each signal into different primary recognized-signal classes, a plurality of subclassifier means in one-for-one correspondence with said classes and each adapted to resolve different signals in the corresponding class into different recognized-signal subclasses within such class and also in accordance with the value distribution of all the components of each signal, circuit means to subject a signal from said input means to the cumulative effect of separate resolving actions by said initial means and by one of said subclassifier means, subclassifier selector means responsive to each of the different resolving actions of said initial means to select for further resolving of a signal that one of said subclassifier means which corresponds to the primary class of such signal, and circuit means energetically responsive to each of said resolving actions of each of said subclassifier means to produce a different operation-selecting energetic output upon occurrence of each of such different actions.

16. A system for classifying a plurality of different nonuniform multidimensional vector signals which are all of the form $F_{ij}$ where $i$ is in index designating the several vector components of each signal, $F_i$ represents vector component value, and $j$ is an index designating the several ones of such signals, said system comprising, input means for receiving said signals, means providing a plurality of different multidimensional vector memory functions $G_j$ of which each includes a combination of said signals which are weighted to be of the form $a_jF_{ij}$ where $a_j$ is a weighting factor having magnitude and sign, signal processing means responsive to received ones of said signals and controlled by each of said functions to selectively classify different of said signals into different recognized signal classes associated with that function, and a plurality of output stages each corresponding to a respective one of said functions and each having alternative energetic output states corresponding one-for-one to the recognized signal classes associated with that function, each of said stages being selectively energized in response to each such classifying action of the associated function to assume and maintain different of its states in correspondence with separate classifying of signals by that function into different of said states, and each different permutation of the assumed respective output states of said plurality of stages being representative of a different over-all classifying of signals by said system.

17. A system for classifying received different meaningful nonuniform vector signals comprising, signal processing means operable with the full value distribution of the component values of each vector signal and having terminal means for one scalar signal at a time and operable to derive at said terminal means from each of said received signals a scalar signal representative by its value of a resolving of the received signal into a selected one of a plurality of gross recognized signal classes, acceptance range discriminator means definitive of simultaneous nonoverlapping alternative acceptance ranges for the scalar signal value and operable in response to selective concurrences of such value with each of said different ranges to distinguishably and energetically manifest such different concurrences, means providing a plurality of branch output channels which are commonly in signal-coupled relation with said one terminal means, there being a one-for-one correspondence between said classes, ranges, and channels, and branch channel selector means energetically responsive to each of said differentiably manifested concurrences to selectively and correspondingly energize each of said different channels to provide respective energetic outputs of which different of said outputs are representative of classifyings of received signals in different of said classes.

18. In a signal classifying system, means to receive one at a time a plurality of meaningful dynamic multidimensional vector signals, storage means for a retrievable multidimensional vector memory signal, means to retrieve said memory signal as a dynamic vector signal from said storage means when any one of said meaningful signals is received, correlator means separate from said storage means and comprised of dynamic signal multiplier means and dynamic signal summing means, said correlator means being jointly responsive to separate inputs thereto of said received signal and said dynamic vector memory signal to form by a dynamic interaction of said two input signals a scalar signal which is the inner product of said two input vector signals, and a signal-compressor means disposed ahead of said correlator means to precompress at least said received signal before the same is supplied as an input to said correlator means.

19. A signal classifying system comprising, input means for receiving a plurality of dynamic multidimensional vector signals each comprised of component values, means responsive to any received one of said vector signals to derive therefrom a secondary vector signal having component values which are the squares of the component values of the received signal, summing means responsive to such squared values to develop a signal representative of the sum thereof, square-root-extractor means to derive from such sum signal a scalar measure of the root-mean-square of the energy content of the received signal to thereby be a measure of the vector magnitude of the entire received signal, means definitive of a plurality of signal classes, means controlled by said class-defining means for classifying the received signal in a selected one of such classes, and circuit means controllable in operation in accordance with said scalar measure to relate the classifying of the received signal to said scalar measure.

20. A system as in claim 19 comprising means to divide each vector component value of said received vector signal by a factor which varies in accordance with said scalar measure.

21. A system as in claim 20 in which said factor is equal to the square of the value represented by said scalar measure.

22. A system as in claim 19 in which said classifying means is jointly controlled by said class-defining means and said received vector signal to develop a scalar signal, and in which said system comprises means for comparing the value of such scalar signal to said scalar measure so as to relate the classifying of said signal to such measure.

23. In apparatus for classifying a plurality of received vector signals each comprised of vector component values, the improvement comprising, means to derive from the vector component values of each received one of such vector signals a secondary vector signal having component values which correspond to those of said received signal but are transformed into unidirectional values of the component values of said received signal, vector component summing means responsive to the component values of said secondary vector signal to form a first scalar signal representative of the vector magnitude of the entire received signal, and signal normalizing means for dividing the component values of the received vector signal by said scalar signal to produce a resultant vector signal whose vector magnitude is substantially independent of that of said received vector signal.

24. The improvement as in claim 23 further comprising, reference function supply means providing at least one reference vector memory function having vector component values, scalar signal computing means jointly responsive to said received vector signal and to said reference vector memory function to interact the respective vector component values of such signal and function by way of product-forming and summing operations performed on such values so as to develop a second scalar signal, scalar signal comparator means jointly responsive to such first and second scalar signals to derive therefrom an output of a value jointly determined by such two signals, and register means responsive to different values of such output to indicate different classifications of received signals.

25. In apparatus for classifying a plurality of received vector signals each comprised of vector component values, the improvement comprising, means to derive from the component values of each received vector signal a secondary vector signal having component values which correspond to those of said received signal but are representative of the squares of the component values of said received signal, summing means responsive to the component values of such secondary vector signal to develop a signal representative of the sum thereof, square root extractor means to derive from such sum signal a first scalar signal representative of the root mean square of the energy content of the received signal to thereby be a measure of the vector magnitude of the entire received signal, and means utilizing said first scalar signal to render the classifying of the received vector signal independent of said vector magnitude.

26. The improvement as in claim 25 in which said utilizing means comprises circuit means operable before said received vector signal is classified to divide each component value of such vector signal by said first scalar signal.

27. The improvement as in claim 25 in which said received vector signal is classified by being interacted with at least one reference vector memory function and by developing from such interaction a second scalar signal, and in which said utilizing means comprises means jointly responsive to such first and second scalar signals to determine the classification of the received signal.

28. In an adaptive system in which a plurality of received vector signals are each comprised of vector component values and are interacted one at a time with at least one stored vector memory function provided by vector component storage means and comprised of vector component values corresponding in order to those of said received signals, and in which each such interaction is productive of a scalar output signal of a value determined by that interaction, the improvement comprising, source means of scalar teaching signals of which one is produced when each of successive different ones of said received signals is interacted with said function to produce one of said scalar output signals, scalar signal comparator means jointly responsive to such a teaching signal and to the corresponding scalar output signal to produce an electrical scalar error quantity representative of the scalar difference if any between the respective values of those two scalar signals, error-vector computing means jointly responsive to inputs corresponding to, respectively, said error quantity and one of the vector quantities of the signal and function involved in the interaction productive of that error quantity to produce by interaction of those inputs and in response to successively presented sets of such inputs a succession of different electrical error vector signals each comprised of vector component values which correspond in order to those of said memory function, stored function accessing means operable upon the production of each of such error vector signals to access said storage means to permit storage thereby of corrected vector component values for said vector memory function and vector component correction means for adding each component value of each of said successive error vector signals to the corresponding previously stored vector component value of said accessed function to thereby form corrected vector component values for said function, said correction means being operable upon the production of each such error vector signal and while said storage means is so accessed to replace in storage each such previously stored component value of said function by the corrected value therefor, so as to produce by cumulative replacements of such character at least a long term progressive reduction in the error between said scalar teaching and scalar output signals.

29. The improvement as in claim 28 in which said error vector computing means comprises function-generating means to derive from said scalar error quantity a signal representative of a unidirectional function of said quantity, read-out means operable while said storage means is accessed to retrieve therefrom said stored function in signal form, and partial differentiator means jointly responsive to said unidirectional function signal and to said retrieved function in signal form to produce said error vector signal by proportioning the several vector component values thereof in accordance with the value of the partial derivative of said unidirectional function signal with respect to said vector memory function in signal form.

30. The improvement as in claim 29 in which said error vector computing means further comprises, additional partial differentiator means to obtain a signal representative of the partial derivative of said scalar error quantity with respect to said retrieved vector memory function in signal form, integrator means for such partial derivative signal, and means to proportion the several vector component values of said error vector signal in accordance with the value of the reciprocal of such partial derivative signal.

31. The improvement as in claim 28 in which linear correlator means effects the interaction between each of said received signals and said memory function so as to form by that interaction a scalar output signal which is the inner product of such signal and function, and in which the error vector computing means comprises means to multiply a received vector signal $F_i$ by a scalar error quantity $e$ representative of the difference between the scalar output signal from that received signal and a corresponding scalar teaching signal so as to proportion the vector component values of the error vector signal in accordance with the quantity:

$$F_i \cdot e$$

where $i$ is an index designating the several vector components of both said received and said error vector signals, and $F_i$ represents vector component value.

32. The improvement as in claim 31 in which said error vector computing means further comprises, component squaring and summing means to derive from the vector component values of a received vector signal the scalar quantity:

$$\sum_{x=a}^{x=b} F_i^2 = U$$

means for producing an error parameter C, and signal-dividing means to divide by U said quantity $F_i \cdot e$ so as to obtain an error vector signal of the form:

$$F_i \cdot \frac{e}{U} \cdot C$$

33. The improvement as in claim 31 further comprising, adjustable circuit means for producing an error parameter signal C of selectively adjustable value, and multiplier means for further multiplying by said C signal said $F_i$ signal as multiplied by said $e$ quantity so as to render the vector component values of said error vector signal proportioned in accordance with the quantity:

$$F_1 \cdot e \cdot C$$

34. The improvement as in claim 32 further comprising teaching signal proportioning means responsive to a received vector signal to derive from the root mean square of the energy content of such signal a corresponding teaching signal of a magnitude value representative of said root mean square of the energy content of such received signal.

35. The improvement as in claim 28 further comprising, additional computing means responsive to a received vector signal to derive from the energy content thereof a scalar signal representative of said energy content, and teaching signal scaling means responsive to said last-named scalar signal to proportion the magnitude of said teaching signal in accordance with the value of said energy content.

36. In an adaptive classifying system in which a plurality of received vector signals are each comprised of vector component values and are interacted one at a time with at least one stored memory function stored by storage means and comprised of vector component values corresponding in order to those of said received signals, and in which each such interaction is productive of a scalar classifying signal representative by its value of at least a tentative classification of the received signal, the improvement comprising, source means of scalar teaching signals of which one is produced when each of successive different ones of said received signals is interacted with said function to produce one of said scalar classifying signals, each such teaching signal being representative by its value of a classification selected for the associated received signal, scalar signal comparator means jointly responsive to such a teaching signal and to the corresponding scalar classifying signal to produce an electrical scalar error quantity representative in value of the difference if any between the respective classifications designated by those two scalar signals, error-vector computing means jointly responsive to inputs corresponding to, respectively, said error quantity and one of the vector quantities of the signal and function involved in the interaction productive of that error quantity to produce by interaction of those inputs and in response to successively presented sets of such inputs a succession of different electrical error vector signals each comprised of different vector component values which correspond in order to those of said memory function, stored function accessing means operable upon the production of each of such error vector signals to access said storage means to permit storage thereby of corrected vector component values for said vector memory function, and vector component correction means for adding each component values of each of said successive error vector signals to the corresponding previously stored vector component value of said accessed function to thereby form corrected vector component values for said function, said correction means being operable upon the production of each such error vector signal and while said storage means is so accessed to replace in storage each such previously stored component value of said function by the corrected value therefor so as to produce by cumulative replacements of such character an automatic and iteratively convergent forcing of the vector component values of said memory function to a value distribution for which a subsequent one of said received vector signals is represented by the ensuing classifying signal as being of the classification previously selected for that vector signal by a teaching signal.

37. The improvement as in claim 36 in which said one memory function is adapted to resolve different ones of said received signals into different ones of a plurality of recognized signal classes, and in which said source means comprises teaching signal generator means for producing different teaching signals each designating a respectively corresponding one of said plurality of classes as a class selected for a received signal, and teaching signal selector means for controlling said generator means to effect production thereby of a one of said teaching signals determined by said selector means and selected thereby from among said different teaching signals.

38. In a system in which successive received vector signals are each interacted with at least on adaptive vector memory function stored by storage means and adapted to produce by such interaction a response capable of differing by an error from a response desired for that interaction, the improvement comprising, stored function accessing means operable upon the occurrence of each such interaction to access said storage means to permit adaptive correction of the vector component values of said stored function, vector component correction computing means responsive to each of successive errors produced by successive ones of said interactions for adding to each previously stored vector component value of said function a correction proportioned in accordance with such error and tending to reduce such error, such computing means being operable while said storage means is so accessed to replace in storage each such previously stored value of said function by the corrected value therefor so as to produce by successive corrections of such character to the vector component values of said function an automatic and iteratively convergent forcing of said adaptive function which effects a long term progressive reduction in said errors, means to control the rate of such forcing by an adjustable error parameter factor, error summing means to accumulate the sum of respectively derived unidirectional values of said errors produced by said interactions in each of successive accumulation cycles, and parameter correction means controlled by the sum of error values accumulated per cycle to adjust the value of said error parameter factor so as to produce relatively faster and slower forcing rates when said sums are, respectively, relatively greater and relatively smaller.

39. In an adaptive system in which successively received vector signals are each interacted one at a time with at least one stored vector memory function provided by vector component storage means and composed of vector component values forming a value distribution of a configuration by which different ones of said signals are resolvable into different ones of at least first and second signal classes having a dividing region therebetween determined by said configuration, and in which each such interaction is productive of an output signal and interactions of said function with different ones of said received signals are productive of first and second different output signals representative of the resolution of the corresponding received signal into, respectively, said class and said second class, the improvement comprising, output signal counting means responsive to said first and second output signals to develop a cumulative signal of a value representative of the relative number of past resolutions of received signals into, respectively, said first class and said second class, source means of a reference signal of a value representative of a desired relative numerical distribution of received signals among said two classes, comparator means jointly responsive to said cumulative signal and reference signal to provide an error signal representative of the difference in value if any between said cumulative and reference signals, stored function accessing means operable between interactions of said function with received signals to access said storage means to permit storage thereby of corrected vector component values for said function, and vector component correction computing means responsive to said error signal while said storage means is so accessed to supplement in storage the previously stored vector component values of said function by corrections thereto determined by said error signals and correcting the configuration of the overall value distribution of said function so as to force the probable future relative numerical distribution of received signals among said two classes towards the desired relative numerical distribution represented by said reference signal.

40. In a system in which successively received vector signals with component values are each interacted with at least one adaptive memory function with component values to produce by such interaction a response capable of differing by an error from a desired response for that interaction, the improvement comprising, scalar signal computing means responsive to both the vector component values of the received vector signal and the vector component values of said memory function to produce an output scalar signal, means for producing a teaching scalar signal according to the response desired for such received signal, means for camparing the output scalar signal and teaching scalar signal to produce an error signal, means responsive to said error signal and one of the vector quantities used to compute the output scalar signal to produce an error vector, means for developing an error parameter, means for multiplying the error vector by the error parameter means for adding the multiplied result to the memory function so as to produce a modified corrected memory function, means for transforming the error signals derived from a succession of received signals into unidirectional error signals, means for summing such unidirectional error signals, and means for adjusting the error parameter according to the summed unidirectional error signals to thereby adjust the rate of correction of the modified memory function.

41. An adaptive system comprising, first storage means for at least one memory function, means for retrieving the memory function from storage, means for receiving a plurality of vector signals, means for storing each received signal, means for retrieving the stored received signal from storage, means for interacting a retrieved received signal and a retrieved memory function to produce an output signal determined by such interaction, source means for teaching signals representative of the signal desired from such interaction, means jointly responsive to said output and teaching signals to provide an indication of an error, if any, between the said output signal and said desired signal, computer means responsive to said error and to said retrieved received signal for generating an error-vector, means for adding the error-vector to the retrieved memory function to produce a modified memory function, means for placing the modified function in storage to replace the retrieved memory function, and means for similarly and reiteratively substituting modified memory functions for preceding memory functions upon successive presentations of retrieved received signals to thereby develop at least a long term progressive reduction of error.

42. An adaptive system comprising, first storage means for at least one vector memory function comprised of vector component values, scalar signal computing means adapted by interacting the vector component values of said function with the vector component values of each, one at a time, of a succession of received vector signals to produce by each such interaction an output scalar signal determined by such interaction, source means of a scalar teaching signal representative of the signal desired from such interaction, means jointly responsive to said output and teaching signals to provide an indication of an error, if any, between said output signal and said desired signal, second storage means for storing the received signal in memory during interaction of that signal with said function, means to retrieve such received signal from said second storage means after such interaction, error vector computing means responsive to said retrieved received signal and to an input signal representative of the error associated with such retrieved received signal to form by interaction of said retrieved signal and input signal an error vector signal, and function-modifying means, responsive to each of a succession of so-formed error vector signals corresponding to successive received signals to add each such error vector signal to the then stored vector memory function so as to provide in said first storage means a modified vector memory function adapted upon subsequent interaction with a received signal to reduce the error between the output signal produced from the interaction and the signal desired therefor.

43. A system comprising, means to receive a string of electrical data, reference function supply means providing a plurality of memory functions, signal processing means adapted to interact each of a sequence of signals supplied thereto with a different one of said functions so as to produce a corresponding sequence of coded outputs, means to supply data in such string to said processing means as the first signal in said sequence of signals, feedback transformation means jointly controlled by the resulting first coded output and by data in said string to form a signal derived from such first output and said data, means to substitute said derived signal for data in said string as the second signal supplied to said processing means, and means providing for reiteration of said forming and substituting operations so as to generate by such reiteration the remainder of said sequence of coded outputs.

44. A system as in claim 43 in which said string of electrical data comprises a received vector signal and in which said system further comprises, temporary storage means to store said received signal as a retrievable signal, means to supply said received signal as such first signal to said processing means, and means operable upon the production of each coded output to retrieve said received signal from storage and to form the derived signal for the next interaction from said retrieved signal and from that coded output.

45. A system comprising, means to receive a sequence of signal components, reference function supply means providing a first and a second plurality of vector memory functions, signal processing means responsive to signals supplied thereto to interact each of such signals with a different one of such functions and to thereby produce a coded output, means to supply the first component in said sequence as a first signal to said processing means for a succession of interactions of signals thereto with said first plurality of functions, means jointly controlled by the first and each of subsequent ones of said outputs produced in the course of such succession of interactions to form from each such output and the next higher numbered component of the sequence a derived signal which is a function of such output and such component, and which is supplied to said processing means as the signal for the next interaction in that succession, temporary storage means for storing as an applied signal the last signal so derived in the course of such succession of interactions, means to retrieve said applied signal from storage a first time and to supply such retrieved signal to said processing means as a first signal thereto for a subsequent succession of interactions of signals thereto occurring with said second plurality of functions and productive of another succession of coded outputs, said retrieving means being further adapted to retrieve said applied signal from said temporary storage means a subsequent number of times corresponding to the number of said last-named outputs, and means jointly controlled by said applied signal on each subsequent retrieval thereof and to the then available coded output to form a derived signal which is a function of that applied signal and such output, and which is supplied to said processing means for the next interaction.

46 A system for classifying received strings of electrical data having a meaningful information content comprising, reference data supply means providing a plurality of vector memory functions, string classifying means jointly controlled by data in each of received ones of said strings and by each of ones of said memory functions to produce by vector interaction of such data with each of said memory functions a set of coded first outputs, each of such outputs being derived from a respective one of such interactions and being characterized by a specific one of a plurality of different energetic states alternatively assumable by that output and selectively determined therefor as a function of the corresponding interaction, and each such set of outputs being representative of the meaningful information content of the corresponding received string of data, and second string classifying means actively responsive to each of the different energetic states of each such coded first output to derive from each of ones of produced sets of said first coded outputs a second coded output which is representative with greater coding efficiency than the corresponding set of first coded outputs of the meaningful information content of the corresponding received string of data.

47. A system for classifying received strings of electrical data having a meaningful information content comprising, reference data supply means providing a plurality of hierarchal trees of vector memory functions, each tree being comprised of at least one function of relatively higher rank and at least two other functions of relatively lower rank within the hierarchy of that tree, string-classifying means jointly controlled by data in each of received ones of said strings and by said function trees to produce by vector interaction of such data with at least one memory function in each rank of each tree a set of first coded outputs representative as a set of the meaningful information content of the corresponding received string of data, and coded output classifying means responsive to each of ones of produced sets of said first coded outputs to derive from that set a second coded output representative with greater coding efficiency than the corresponding set of first coded outputs of the meaningful information content of the corresponding received string of data.

48. A system for classifying received strings of electrical data having differently interpretable categories and subcategories of meaningful information content comprising, string-classifying means responsive to data in each of received ones of said strings to provide a set of first coded outputs which forms at least one coded vector signal representative of an interpretable subcategory of information content of the corresponding received string, reference data supply means providing at least one vector memory function, and coded output classifying means jointly controlled by said coded vector signal and by said memory function to form as a function of said joint control a second coded output representative with greater coding efficiency than said coded vector signal of the meaningful information content of the corresponding received string of data, the said second coded output representing interpretable coded meaningful categories of which the said first coded outputs represent meaningful subcategories.

49. A system for classifying received strings of electrical data having a meaningful information content and having a specified electrical data density comprising, first reference function supply means providing a first plurality of vector memory functions, first string-classifying means jointly controlled by each of received ones of such strings and by each of ones of said memory functions to produce by interaction of data in each such string with each of such functions a first string of coded data representative of the meaningful information content of the corresponding received string and having a coded data density less than that of the received string, second reference function supply means providing a second plurality of vector memory functions, and second string-classifying means jointly controlled by each of ones of produced first strings of coded data and by each of ones of said second plurality of memory functions to produce by interaction of data in each such first string with each of such functions a second string of coded data representative with greater coding efficiency than the corresponding first string of the meaningful information content of the corresponding received string of data, and said second string of coded data having less coded data density than the said first string of coded data.

50. In a series of connected recognition machines each adapted to produce a number of digitalized output operations of specified number of digitalized positions as a response to each of a multiplicity of input signal sequences, means for connecting the machines which comprises means for utilizing any digitalized output operation of any machine in the series except the last of the series to produce a corresponding transformation signal which increases the number of digitalized positions, and means for applying the transformation signal as input signal to the next machine of the series.

51. In a series of connected recognition machines each adapted to produce a number of sequences of digitalized output operations each of specified number of digitalized positions as a response to each of a multiplicity of input signals, means for connecting the machines which comprises means for utilizing any digitalized output operation of any machine in the series except the last of the series to produce a corresponding transformation signal which increases the number of digitalized positions, and means for applying the transformation signal as input signal to the next machine of the series.

52. A signal classifying system for received signals comprising, signal sorter means responsive to each of said received signals one at a time to perform a succession of classifying operations on such signal according to an initially selected one and a subsequently selected one of at least two modes of classification for that signal, register means responsive to each of said succession of operations to develop a multi-position permutable code representative as a whole of an overall classification for the received signal and comprised of a succession of outputs of which each output is derived from a corresponding one of said operations and is rendered by such operation in one of at least two operation-determined states alternatively assumable by that output, and mode selector means for controlling the mode of classification of said sorter means, said mode selector means being controlled by an output of intermediate position in said code and being selectively responsive to a predetermined one of the states alternatively assumable by such intermediate output to switch the mode of classification of said sorter means from the initially selected one to the other one of said two modes.

53. In apparatus for classifying a plurality of time-varying input waveforms of variable duration, the improvement comprising, temporary storage means for said waveforms, means to write each received one of said wave forms into said storage means at a first rate, means to retrieve such received waveform from said storage means at a second rate, one of said rates being constant and the other being variable, means responsive to said received waveform to form a signal which is a measure of the duration of such waveform, and means responsive to said last-named signal to control said variable rate so as to equalize it to said constant rate multiplied by such duration, each of said received waveforms as retrieved from storage being thereby rendered of the same duration.

54. In apparatus for classifying a plurality of wave-forms comprised of different spectra of frequency components, the improvement comprising, temporary storage means for each received one of said signals, means to write such signal into said storage means at a first rate, a succession $n$ of band pass filters each characterized by a respective one of a plurality of frequency pass bands which are successive in the overall frequency range of the frequency components of said wave-forms, means to retrieve said written-in signal from storage $n$ times with negligible time delay between consecutive retrievals and at a rate for each retrieval which is $n$ times that of said first rate, means to apply said retrieved signal during each of said $n$ retrievals to a different one of said $n$ filters, and means to combine the outputs of said filters so as to form a transformed signal of substantially the same duration as said received signal.

55. An image scanning system comprising, means to scan an image by a scanning spot in orthogonal $x$ and $y$ directions at, respectively, a slow rate and a fast rate so that a sequence of Y scans are included within one X scan, means to obtain from said sequence of Y scans a first time-sequential signal representative of the tone density variations of said image encountered during such sequence of scans, means to concurrently obtain a second time-sequential signal representative at any instant during said sequence of Y scans of the $y$ displacement of said spot relative to an axis transverse in the direction of Y-scanning, means to multiply in a time-sequential manner said first and second signals so as to form an instantaneous product signal, means to integrate said last named signal over the period of said X-scan to form a third signal, means to integrate said first signal over said period so as to form a fourth signal, means to divide said third by said fourth signal, and means to shift said axis as a function of the value of the quotient of said third and fourth signals.

56. An image scanning system comprising, means to scan an image once and then again on two sides of an axis passing through the tone density centroid center of said image, means operable in the first scan to obtain a first time-sequential signal representative of the directed tone-density centroid moments of the elemental areas of said image which are on one side of said axis, means operable in the second scan to obtain a second time-sequential signal representative of the directed tone-density centroid moments of the elemental area of said image which are on the other side of said axis, means to render said second signal of the same polarity as said first signal, and means to thereafter combine said first and second signal to form a third time sequential signal representative of the respective absolute magnitudes of the tone-density centroid moments of all the elemental areas in said image.

57. In a signal classifying system in which a received vector signal is comprised of vector component values which are correlated with corresponding vector component values of a stored vector memory function to form a scalar signal for classifying the received signal, the improvement comprising, digital storage means for storing said memory function as a retrievable digital signal having digital vector component values, digital-to-analog decoder multiplier means having analog input means and digital input means, means to apply said received signal as a signal having analog vector component values to said analog input means, means to retrieve said digital signal from said storage means and to apply the digital vector component values thereof to said digital input means synchronously with the application to said analog input means of the corresponding analog vector component values of said received signal so as to develop by said decoder multiplier means the analog product of each corresponding pair of analog and digital vector component values of, respectively, said received signal and said retrieved signal, and summing means coupled to such decoder multiplier means to derive said scalar signal from the sum of the products so developed by said decoder means.

58. A system for classifying received strings of electrical data having a meaningful information content wherein said meaningful content represents broad meaningful categories and implying meaningful subcategories not directly represented comprising, first reference function supply means providing a first plurality of vector memory functions, first classifying means jointly controlled by data in each of received ones of said strings and by each of ones of said memory functions to produce by interaction of data in such string with each of said functions a first string of coded data representative of the broad meaningful information content of the corresponding received string, second reference function supply means providing a second plurality of memory functions, and second classifying means jointly controlled by each of ones of produced first strings of coded data representing broad meaningful categories and by each of ones of said second plurality of memory functions to produce by interaction of data in each such first string with each of such functions a second string of coded data representative with greater coding detail than said first string and representing directly the implied meaningful information subcategories content of the corresponding received string of data.

59. A system for processing input strings of electrical data having directly represented meaningful information content and implied information content not directly represented comprising, first signal processing means responsive to each of ones of said input strings of data to provide an intermediate multicomponent coded signal directly representative of the meaningful information content of such string and comprised of a plurality of coded components, and second signal processing means responsive to each of ones of such intermediate multicomponent signals to provide an output multicomponent coded signal directly representative of the implied meaningful information content of the corresponding input string of data and comprised of a plurality of coded components providing a different density of coding detail per coded signal than the coded components of the corresponding intermediate coded signal.

60. A signal classifying system comprising, source means for a plurality of signals each comprised of digital coding in the form of digitalized signal values at ones of ordered usable positions for such values, ones of said signals being different by virtue of having different digital codings, signal transforming means responsive to each of said plurality of signals to convert the initial digital coding thereof into an expanded digital coding having a greater number of ordered usable positions for digitalized signal values than the initial coding of such signal, and signal sorting means responsive to different ones of said transformed signals with different expanded digital codings to resolve such different signals into different signal classes.

61. A system comprising, input means for vector signals having vector component values, circuit means providing stored vector component values, computing means adapted by interacting the vector component values of said signals with said vector component values provided by said circuit means to produce scalar outputs of variable value, threshold establishing means definitive of at least two different thresholds for the values of said scalar outputs, and value discriminator means selectively responsive to the values of said scalar outputs in relation to said thresholds so as to differentiate ones of said outputs providing a greater value than one of said thresholds and a lesser value than the other of said thresholds from ones of said outputs which fail to satisfy such greater-lesser condition.

62. In a signal classifying system in which vector component values of each of a plurality of received vector signals are interacted with vector component values stored by such system between interactions to develop by each such interaction a scalar signal of a value determined by that interaction, the improvement comprising, range establishing means definitive of at least one continuous range of acceptable scalar signal values which is bounded on at least one side by a range of unacceptable scalar signal values, first value discriminator means selectively responsive to ones of such scalar signals of values in such acceptable range to produce an energetic signal representative of acceptance of such scalar signals, second value discriminator means selectively responsive to ones of such scalar signals of values in such unacceptable range to produce an energetic signal representative of rejection of the latter scalar signals, and register means responsive to said energetic signals to develop a held energetic output indicative of whether one of such acceptance signals or one of such rejection signals is produced in response to interaction of a particular received vector signal with said stored vector component values.

63. The improvement as in claim 62 in which said range establishing means comprises first range bounding circuit means establishing a least upper bound for said range of acceptable scalar signal values, and second range bounding circuit means establishing a greatest lower bound for such range.

64. In a signal classifying system in which vector component values of each of a plurality of received vector signals are interacted with vector component values stored by such system between interactions to develop by each such interaction a scalar signal of a value determined by that interaction, the improvement comprising, range establishing means definitive of at least one continuous range of acceptable scalar signal values and of at least two ranges of unacceptable scalar signal values disposed on opposite sides of said one range to render such one range bounded at each end thereof, first value discriminator means selectively responsive to ones of such scalar signals of values in such acceptable range to produce an energetic signal representative of acceptance of such scalar signals, second value discriminator means selectively responsive to ones of such scalar signals of values in either of such unacceptable ranges to produce an energetic signal representative of rejection of the latter scalar signals, and register means responsive to said energetic signals to develop a held energetic output indicative of whether one of such acceptance signals or one of such rejection signals is produced in response to interaction of a particular received vector signal with said stored vector component values.

65. In a signal classifying system in which vector component values of each of a plurality of received vector signals are interacted with vector component values stored by such system between interactions so as to develop by each interaction a scalar signal of a value determined by that interaction, the improvement comprising, range establishing means simultaneously definitive of at least three nonoverlapping ranges of values for scalar signals so developed, first, second and third value discriminator means selectively responsive to ones of such scalar signals with respective values in, respectively, the first, second and third of such ranges to produce, respectively, a first, a second and a third energetic signal representative of concurrence of the value of a developed scalar signal with, respectively, said first, said second and said third range, and register means responsive to said energetic signals to develop a held energetic output indicative of which one of said first, second and third signals is produced in response to interaction of a particular received vector signal with said stored vector component values.

66. In an electrical signal classifying system in which vector component values of each of a plurality of received vector signals are interacted with vector component values of at least one memory function stored by said system between interactions so as to develop by each such interaction a scalar signal output of a value determined by that interaction, the improvement comprising, range establishing means simultaneously definitive of a plurality of non-overlapping alternative ranges of acceptable values for the scalar signal output, means for resolving each of said received signals according to the acceptance range in which the corresponding scalar signal output lies into recognized signal classes of which each includes different ones of the said received vector signals, a plurality of value discriminator means each corresponding to a respective one of said ranges and each producing an energetic signal when a scalar signal output is developed which lies in the acceptance range corresponding to that discriminator means, and register means responsive to such energetic signals from said plurality of discriminator means to develop a held energetic output indicative of which one of said discriminator means produced such an energetic signal in response to interaction of a particular received vector signal with said vector component values of said stored memory function.

67. A system as in claim 66 in which said range establishing means comprises range-defining circuit means simultaneously definitive along with said ranges of acceptable values of at least one continuous range of unacceptable scalar signal output values which is non-overlapping with said acceptable ranges, said system further comprising, value discriminator means to produce an energetic signal when a scalar signal is developed which lies in said unacceptable range, and output means responsive to said last-named energetic signal to produce an energetic held output providing an active indication of rejection of the corresponding received vector signal.

68. A signal classifying system comprising, input means for a plurality of vector signals each formed of vector component values, data storage means providing a set of stored vector memory functions each formed of vector component values, function selector means to select different subsets of functions out of said set of functions for interaction with different ones of said plurality of vector signals, computing means adapted to interact said vector component values of each of said plurality of vector signals with said vector component values of each function in the subset of functions selected for that signal to provide an output from each such interaction, and class indicating means jointly controlled by at least ones of the plurality of outputs derived from the interactions of each interacted vector signal with the subset of functions selected for interaction with that signal to indicate that such signal is in a selected one of a plurality of separate signal classes into which said plurality of vector signals are resolvable.

69. A system as in claim 9 in which said meaningful signals and memory functions are each comprised of vector component values and in which said classifying means comprises computing means for effecting each signal-function interaction by performing product-forming and summing operations on the signal and function vector component values involved in that interaction.

70. A system as in claim 69 in which said computer means comprises linear correlator means effecting each signal-function interaction by performing said product-forming and summing operations so as to develop a scalar signal which is the inner product of the vector signal and vector function involved in such interaction, said system further comprising value discriminator means selectively responsive to the different respective values of scalar signals so developed to provide different classifying actions for differently valued ones of such scalar signals.

References Cited

UNITED STATES PATENTS

| 2,858,981 | 11/1958 | Goldman | 235—189 |
|---|---|---|---|
| 2,924,709 | 2/1960 | Morrill | 235—189 |
| 3,044,701 | 7/1962 | Kerstukos et al. | 340—172.5 |
| 3,091,665 | 5/1963 | Schroeder | 235—181 |
| 3,093,732 | 6/1963 | Clark | 235—189 |
| 3,114,132 | 12/1963 | Trimble et al. | 340—146.3 |
| 3,140,466 | 7/1964 | Greanias et al. | 340—146.3 |
| 3,163,750 | 12/1964 | Lindsey et al. | 235—181 |
| 3,168,699 | 2/1965 | Sunstein et al. | 235—181 |
| 3,211,901 | 10/1965 | Comley et al. | 235—193.5 |
| 3,222,650 | 12/1965 | Lazarus | 340—172.5 |
| 2,646,465 | 7/1953 | Davis et al. | 179—1 |
| 2,685,615 | 8/1954 | Biddulph et al. | 179—1 |
| 2,947,971 | 8/1960 | Glauberman et al. | 340—172.5 |
| 2,978,675 | 4/1961 | Highleyman | 340—146.3 |
| 2,995,727 | 8/1961 | Quade | 340—146.3 |
| 3,022,005 | 2/1962 | Dickinson | 340—172.5 |

(Other references on following page)

UNITED STATES PATENTS

| | | | |
|---|---|---|---|
| 3,030,609 | 4/1962 | Albretcht | 340—172.5 |
| 3,037,076 | 5/1962 | Williams et al. | 179—1 |
| 3,067,937 | 12/1962 | Hinkeim et al. | 340—172.5 |
| 3,075,178 | 1/1963 | James | 340—172.5 |
| 3,106,699 | 10/1963 | Kamentsky | 340—172.5 |
| 3,114,884 | 12/1963 | Jakowatz | 340—172.5 |
| 3,166,640 | 1/1965 | Dersch | 340—146.3 |

OTHER REFERENCES

Cameron et al.: Bionic Symposium, WADD Technical Report, pp. 197–306, September 1960.

Chow: "Optimum Character Recognition System Using Decision Function," IRE WESCON Convention Record, part 4, pp. 121–129, 1957.

Glantz: "On the Recognition of Information With A Digital Computer," Journal of the Association for Computing Machinery, pp. 178–188, April 1957.

PAUL J. HENON, *Primary Examiner.*

U.S. Cl. X.R.

179—1; 235—189; 340—146.3